US012227077B2

(12) United States Patent
Stoltz et al.

(10) Patent No.: US 12,227,077 B2
(45) Date of Patent: Feb. 18, 2025

(54) SYSTEM AND METHOD OF A MOBILE ELECTRICAL SYSTEM

(71) Applicant: Eaton Intelligent Power Limited, Dublin (IE)

(72) Inventors: Thomas Joseph Stoltz, Allen Park, MI (US); Matthew Richard Busdiecker, Beverly Hills, MI (US); Sarah Elizabeth Behringer, Redford, MI (US); Elizabeth Jane Mercer, West Bloomfield, MI (US); Viken Rafi Yeranosian, Farmington Hills, MI (US); Glenn Clark Fortune, Farmington Hills, MI (US); Lesley Earl Candler, Milford, MI (US); Nicole Downing, Ferndale, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/615,713

(22) Filed: Mar. 25, 2024

(65) Prior Publication Data

US 2024/0227535 A1 Jul. 11, 2024

Related U.S. Application Data

(63) Continuation of application No. 17/644,936, filed on Dec. 17, 2021, now Pat. No. 11,938,825, which is a (Continued)

(30) Foreign Application Priority Data

Nov. 7, 2017 (IN) ............................ 201711039647
Dec. 18, 2020 (IN) ............................ 202011055198

(51) Int. Cl.
*B60K 6/48* (2007.10)
*B60K 6/28* (2007.10)
(Continued)

(52) U.S. Cl.
CPC ................. *B60K 6/48* (2013.01); *B60K 6/28* (2013.01); *B60K 6/36* (2013.01); *B60K 6/405* (2013.01);
(Continued)

(58) Field of Classification Search
CPC ... B60K 6/48; B60K 6/28; B60K 6/36; B60K 6/405; B60K 17/28; B60K 25/00;
(Continued)

(56) References Cited

U.S. PATENT DOCUMENTS

2021/0339617 A1* 11/2021 Ohkuma ............ H01M 50/242

* cited by examiner

*Primary Examiner* — Carlos Amaya
(74) *Attorney, Agent, or Firm* — Talem IP Law, LLP

(57) ABSTRACT

An example system includes a motor/generator selectively coupled to a drive line of a vehicle, and configured to selectively modulate power transfer between an electrical load and the drive line; a battery pack; a DC/DC converter electrically interposed between the motor/generator and the electrical load, and between the battery pack and the electrical load; a covering tray positioned over a plurality of batteries of the battery pack, the covering tray comprising a connectivity layer that has a charging circuit allowing each of the plurality of batteries to be discharged individually; a plurality of battery microcontrollers, each of the plurality of battery microcontrollers associated with a corresponding one of a plurality of batteries of the battery pack; and a primary DC/DC controller configured to command operations of the DC/DC converter; wherein the plurality of battery microcontrollers are operationally coupled to the primary DC/DC controller.

20 Claims, 167 Drawing Sheets

Related U.S. Application Data continuation-in-part of application No. 16/183,436, filed on Nov. 7, 2018, now Pat. No. 11,349,331.

(60) Provisional application No. 63/127,875, filed on Dec. 18, 2020, provisional application No. 62/582,384, filed on Nov. 7, 2017.

(51) Int. Cl.

| | |
|---|---|
| ***B60K 6/36*** | (2007.10) |
| ***B60K 6/405*** | (2007.10) |
| ***B60W 10/08*** | (2006.01) |
| ***B60W 10/26*** | (2006.01) |
| ***B60W 10/30*** | (2006.01) |
| ***B60W 20/30*** | (2016.01) |

(52) U.S. Cl.

CPC ............. *B60W 10/08* (2013.01); *B60W 10/26* (2013.01); *B60W 10/30* (2013.01); *B60W 20/30* (2013.01)

(58) Field of Classification Search

CPC .... B60K 6/26; B60K 25/06; B60K 2025/005; B60K 2001/005; B60W 10/08; B60W 10/26; B60W 10/30; B60W 20/30; H02J 7/1423; H02J 7/1492; H02J 7/16

See application file for complete search history.

| FUNCTIONS | CONCEPT 1 | CONCEPT 2 | CONCEPT 3 | CONCEPT 4 | CONCEPT 5 | CONCEPT 6 |
|---|---|---|---|---|---|---|
| TORQUE TRANSFER TO THREADS | | | | | | |
| SLIP AFTER LOCKING | | | | | | |
| SEALING | | | | | | |
| AVOID LOOSENING DUE TO VIBRATIONS | | | | | | |
| STANDARD WRENCH SIZE | | | | | | |
| ASSEMBLY | | | | | | |

SYSTEM AND METHOD OF A MOBILE ELECTRICAL SYSTEM

TECHNICAL FIELD

The present application relates to, but not exclusively to, integrated electrical power systems for mobile applications.

BACKGROUND

The use of electrification of loads and accessories for vehicles is increasing for a number of reasons. Electrified accessories and loads allow for greater control, utilization of otherwise wasted energy such as braking and regenerative energy, and provide for incremental improvements toward fully electric vehicles that do not have combustion engines, and (depending upon the source of electrical energy) that can potentially reduce the production of greenhouse gases. Additionally, it is desirable to reduce non-useful operating time for prime movers, such as idling internal combustion engines when motive power is not required.

Presently known systems for electrically powering loads on a vehicle suffer from a number of challenges. Some of these challenges are even more prevalent in heavy-duty commercial sleeper cab trucks. Fully electric systems, such as a series hybrid electrified system, suffer from inefficiencies such as two-way electric power conversion (e.g., from direct current (DC) to alternating current (AC), and then back to DC), and/or require that systems be oversized relative to the required load to ensure that the system can regenerate or recharge batteries while at the same time powering the load. Additionally, fully electric systems for many loads require high voltages to ensure reasonably sized connections and electric conduits. However, high voltage systems require additional integration and testing work, expensive connectors, and/or systems isolated from the vehicle chassis ground systems to ensure they are safe. Further, many vehicles presently on the road retain internal combustion engines as a prime mover, and full electrification of loads and accessories cannot readily be integrated with systems having a highly capable non-electric prime mover without redundancy and expense.

Presently known electrical storage systems for medium capability electrical systems additionally suffer from a number of challenges. High capability battery technologies such as lithium ion require careful control of battery pack charge, temperature environment for the battery, and are expensive to implement, install, and replace. Lower capability battery technologies require large numbers of heavy batteries that require replacement one or more times over the vehicle life to provide sufficient useful storage under presently known operation and management techniques.

Implementing electrical power to drive loads in many applications is subject to a number of challenges. Presently available systems for providing non-motive power to loads tend to require that the vehicle be stopped before the motive engine can be switched to support non-motive power, that an auxiliary or additional engine be added to provide the non-motive power, and/or that intermediary power transfer systems, such as a hydraulically operated load driving system, be introduced to ensure that smooth and controllable power is provided for the non-motive loads. The implementation of electrical power directly into such system can increase cost, increase overall system risk (e.g., higher voltage paths present), and/or not achieve benefits in terms of efficiency or reduced fuel consumption. For example, in a system having an auxiliary engine and a hydraulic intermediary power transfer system, merely changing the auxiliary engine or the hydraulic intermediary power to an electric motor would introduce a number of integration challenges and would not be likely to yield any benefit in system efficiency.

BRIEF SUMMARY

Various enabling technologies promote reduced risk, simple, integrated, reliable solutions for enabling an intermediate voltage (e.g., 48V) electrical systems in mobile applications, such as commercial vehicle applications (e.g. light/mild hybrid systems). Example embodiments of the present disclosure provide for case of system design to meet a given capability, reduced time for integration of components, for example at a time of manufacture and/or upfit of a previous system, case of service, including providing case of access, tools to isolate failed components, or the like. Without limitation to any aspect of the present disclosure, example components, features, assemblies, or the like that support rapid, flexible design, and low cost, reduced risk design, integration, and service, are described following. A top cover for batteries provides for rapid and secure coupling between batteries of a battery pack, a DC/DC converter, and between battery packs where multiple battery packs are present. Example embodiments of the top cover and battery box provide for rapid design that is flexible to multiple battery footprints, and that provide rapid and low risk battery access, installation, and service. Example features to support rapid and secure battery access include an open battery box with securing of the batteries, a reduced vibration environment for the batteries, and case of battery removal and installation—both with regard to accessing and removing the batteries, and with regard to quickly and securely connecting the batteries into the system. Additionally, service disconnects and connectors herein provide for rapid, single-point circuit completion and/or disabling, visible feedback in the event of improper installation of a battery, and configurable access points for disconnects and connectors to accommodate available space, installation orientations, and servicing preferences. An example service disconnect is used to ensure power disconnection before servicing, and reduce the risk of exposure of personnel to elevated voltages. Example features to promote configurability to meet varying power and/or energy storage requirements, including the utilization of an easily extendible DC/DC converter (e.g., using a flexible number of phases, simplified extensible board design, and extensible housing providing cooling and support functions), flexible interfacing to a driveline of a vehicle, and flexibility to adjust operations for variability in clutch components, transmission components, and interfaces to a driveline, prime mover, and vehicle systems. Example connection flexibility for battery coupling and power routing includes busbars, foil, and/or braided wiring integrated into a top cover that provide for convenient and rapid installation, with case of use features that make a proper installation both quick and reliable. Example features herein extend battery life and/or battery utilization (e.g., reducing a number of batteries required and/or extending a time between battery replacement and/or service events). For example, and without limitation, aspects of the present disclosure reduce battery vibration, detect and mitigate events that are detrimental to battery life, protect the batteries from deleterious environmental conditions (e.g., overtemperature events, exposure of terminals, and/or excessive discharge), promote even utilization between batteries, and determine battery parameters at an individual battery level to allow for early compensation to battery degradation, and delaying the time to battery replacement and/or service while maintaining mission performance capability.

Certain features herein promote efficient utilization of system energy, such as the amount of energy utilized by the mobile application that is converted into mission capable work. Such features reduce a carbon footprint of the system, allow for greater capability with a reduced battery pack size, reduced motor/generator size, and/or reduced system voltage and/or current ratings, while maintaining or improving system capability to deliver power where desired. Example aspects of the present disclosure to promote efficient utilization of system energy include, without limitation: utilization of power buses and electrical connectivity to reduce component sizes and conductive materials (e.g., copper) without a reduction in capability; utilization of power source shifting between sources based on which sources are more efficient; utilization of shift assistance operations to improve performance, reduce shocks that may cause wear, and improve fuel economy of a prime mover; utilization of power conversion techniques to reduce losses within electrical components and/or to resistive heating; reduction in wear of components reducing materials for servicing and/or replacing of components; utilization of start-up and shutdown operations to improve the effectiveness of operations such as power transfer, ability to perform supporting electrical functions, and improving operations such as shift assistance and/or prime mover restart operations; features to utilize data across a group of vehicles to improve the performance of each vehicle; and/or consolidation of coupling points to reduce service times, reduce the time to develop and maintain service procedures, and reduce the number of operations of installation and service procedures, where each operation introduces a risk that the operation will not be performed correctly.

Certain features herein promote case of integration into varying systems, whether the integration relates to a number of coupling interfaces, footprint utilization, or verifying the capability of a system to meet performance criteria. Example aspects that promote case of integration into varying systems include, without limitation: a self-contained battery box having a predictable and flexible footprint, with accommodation for a DC/DC converter within the battery box space, and securing of batteries and the DC/DC converter without reliance on outside utilization of vehicle space; a reduced number of interfaces, such as cooling, number of electrical power connections, and a number of communication connections; extensibility of DC/DC converter capability while maintaining a same interface to the vehicle; flexibility of coupling a PTO device to multiple driveline points, while maintaining a simple and consistent interface to common interface points such as typical PTO interface positions; provision for cooling and electrically integrating a motor/generator while limiting the number of interfaces between the motor/generator and the vehicle; the utilization of standardized and ordinarily available electrical connections to the vehicle; and/or utilization of a simplified cover tray and/or DC/DC converter geometry and securing.

An example system and method includes a driveline power take off (PTO) device that selectively provides power to a shared load utilizing driveline power and/or stored electrical power. An example system and method includes a driveline PTO device that applies selected gear ratios between a motor/generator and a shared load, between the motor/generator and the driveline, and/or between the driveline and the shared load. An example system utilizes one or more planetary gear assemblies to provide selected gear ratios. An example system and method includes a PTO device configured for case of installation with a variety of transmission systems and driveline configurations. An example system and method includes a number of operating modes, including powering a shared load with a driveline, powering the shared load with a motor/generator, powering the motor/generator with the driveline, and/or powering the driveline with the motor/generator including in a creep mode or in a cranking mode. An example system and method further includes power transfers throughout devices in the system, including operating loads when a prime mover is offline, storing regenerative power from a driveline, and/or using power transfer to a driveline to enhance operations of a motive application such as a vehicle. An example system and method includes control of a forward or reverse application of power to a driveline, and/or efficient integration where control of the forward or reverse application of power to the driveline is managed elsewhere in the system.

An example system includes a PTO device engaging a countershaft of a transmission, a selected gear in the transmission, a PTO interface of the transmission, and/or engaging other driveline components. An example system and method includes engaging a countershaft at a rear and/or axial position of the countershaft. An example system and method includes selectively engaging a driveline with selected directions and/or ratios for power flow through the system, and/or utilizing a neutral device to disengage a shared load and/or a motor/generator from the driveline. An example system includes a multi-ratio light hybrid system, and/or powering of electrical loads or accessories selectively between driveline power and electrical power. An example system includes a simplified driveline interface having a low number of actuators for case of integration and reduced failure rates.

An example system and method includes hardware features, system integration aspects, and/or battery management aspects providing for improved capability, utilization, and battery life for modestly capable battery technologies such as lead-acid batteries. In certain embodiments, hardware features, system integration aspects, and/or battery management aspects described herein reduce a number of batteries required for a given capability of the system, reduce a number of replacement and/or service events, and/or extend capabilities for systems having highly capable battery technologies such as lithium ion batteries. Example systems and methods herein provide for capability to support multiple load types and duty cycle requirements, including loads having multiple electrical interface requirements. Example systems and methods herein provide for capability to remove one or more aspects of presently known systems, including in certain embodiments a starting motor, one or more belt driven accessories, redundant heating and air conditioning (HVAC) systems, auxiliary power units (APUs), and/or separated battery packs for storing power for offline operation and prime mover starting.

Example systems and methods herein provide for capability to reduce reliance on infrastructure such as electrical charging stations and/or shore power, providing for the ability to reduce undesirable operation such as idling engine time, while providing the capability for unconstrained routing, delivery, and transport scheduling, which may further provide for additional system level and/or fleetwide efficiencies beyond the direct vehicle or application on which a particular embodiment of the present disclosure is installed. Example systems and methods herein provide for interfacing between electrical systems on a vehicle, and advantageously utilizing available systems to generate additional capability and efficient use of energy sources. Example systems and methods herein flexibly support a number of potential loads, including compressor/HVAC loads, mixers, hydraulic pumps, any PTO load, hoteling loads, and/or any accessory load. Example systems and methods herein have a variety of power capabilities for supported loads, including loads up to at least a 5 KW nominal load, a 10 kW nominal load, a 15 kW nominal load, and/or a 30 kW nominal load. Example systems and methods herein are additionally capable of supporting peak and/or transient loads that are higher than the nominal loads. Example systems and methods herein include more than one PTO device for certain applications.

BRIEF DESCRIPTION OF THE DRAWINGS

The present disclosure will become more fully understood from the detailed description and the accompanying drawings, wherein:

FIG. 120 depicts a flow chart for monitoring and managing a battery.

FIG. 121 depicts a flow chart for monitoring and managing a battery.

FIG. 122 depicts examples of interpreting a battery health event.

Figure 123A:
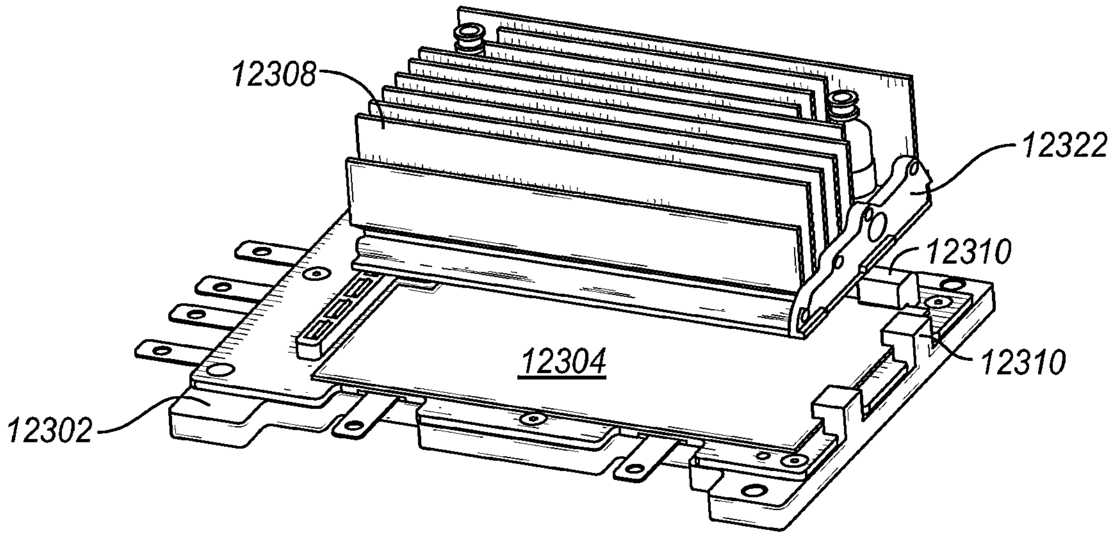
Figure 123B:
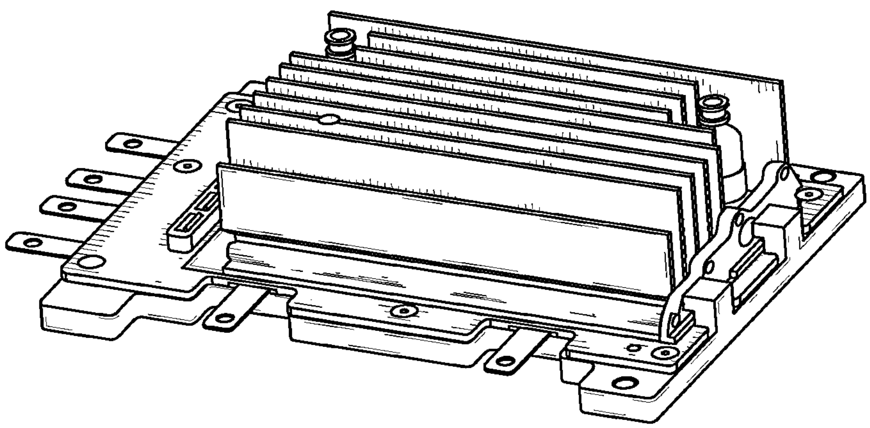
Figure 123C:
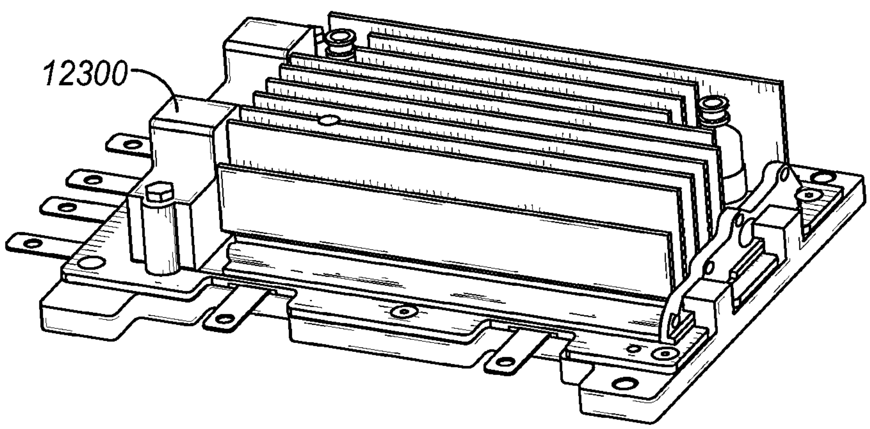

FIG. 123A, FIG. 123B, and FIG. 123C depict an embodiment of DC/DC converter locating and locking using tabs and service disconnect.

Figure 124:
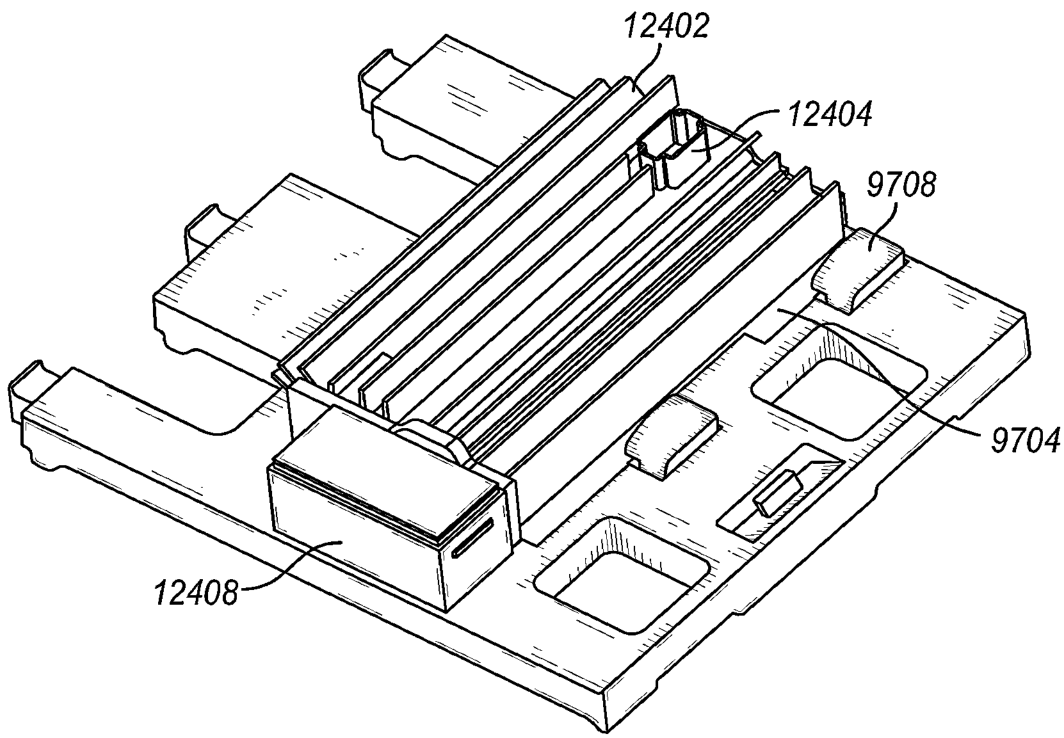

FIG. 124 depicts the DC-to-DC converter with slots in flanges along the lower length to facilitate engagement with tabs on the battery tray.

Figure 125:
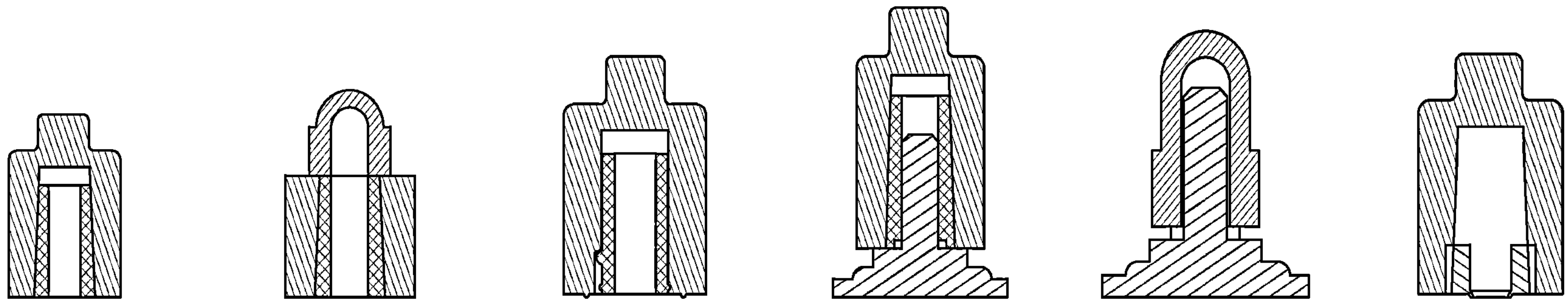

FIG. 125 depicts a summary of terminal cap embodiments.

FIG. 126A, FIG. 126B, FIG. 126C, FIG. 126D, and FIG. 126E depict various terminal cap embodiments.

Figure 127A:
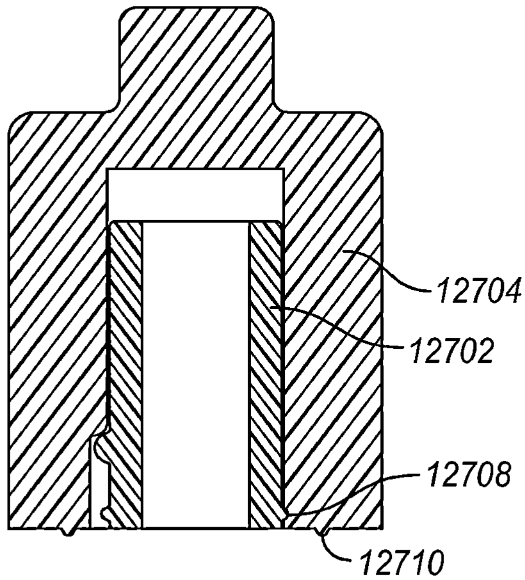
Figure 127B:
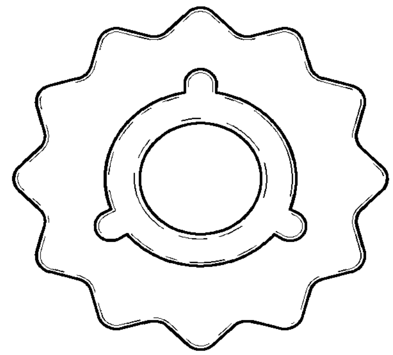

FIG. 127A and FIG. 127B depict various terminal cap embodiments.

Figure 128A:
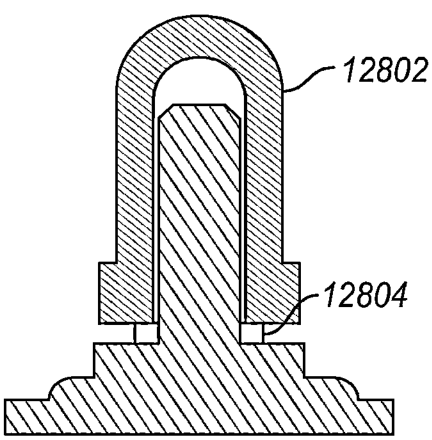
Figure 128B:
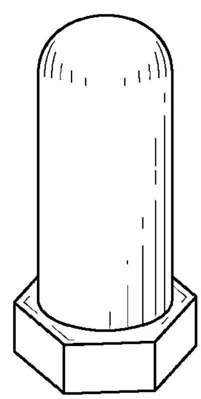
Figure 128C:
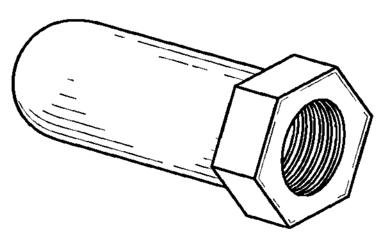

FIG. 128A, FIG. 128B, and FIG. 128C depict various terminal cap embodiments.

Figure 129A:
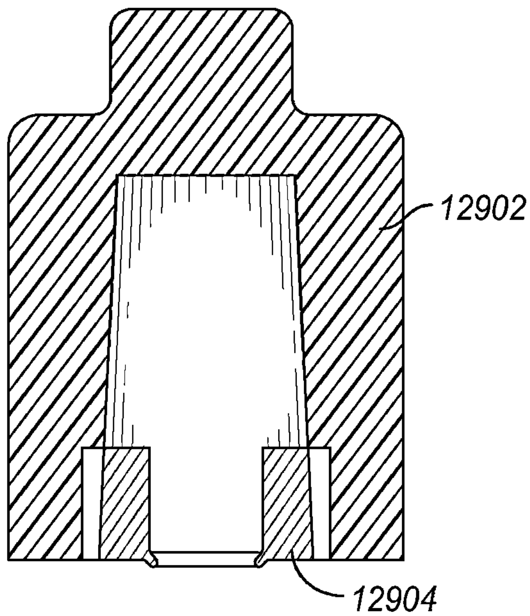
Figure 129B:
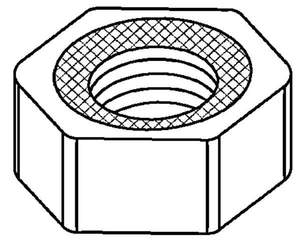

FIG. 129A and FIG. 129B depict various terminal cap embodiments.

Figure 130A:
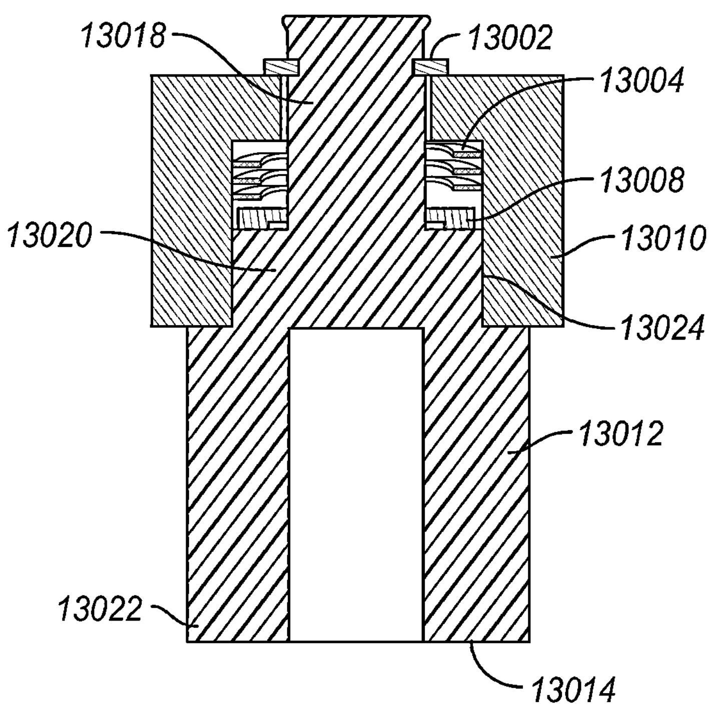
Figure 130B:
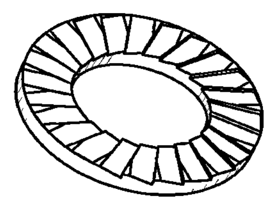

FIG. 130A and FIG. 130B depict various terminal cap embodiments.

Figure 131A:
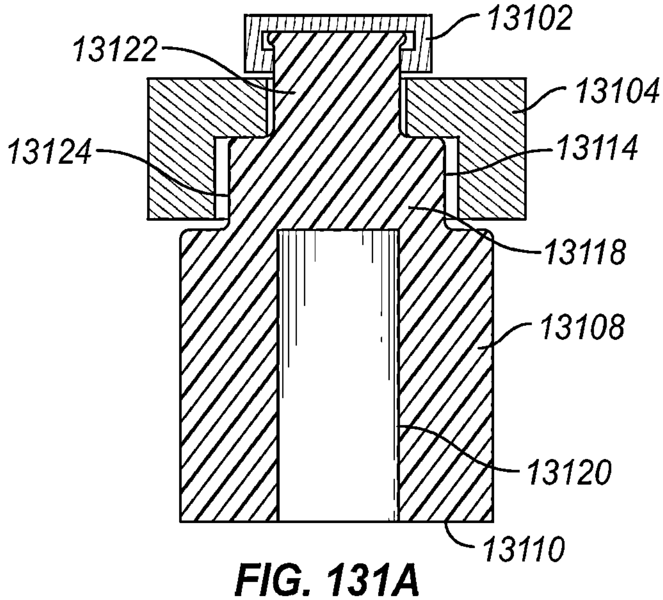
Figure 131B:
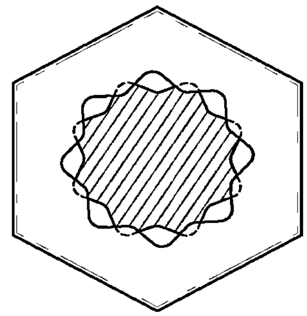

FIG. 131A and FIG. 131B depict various terminal cap embodiments.

Figure 132A:
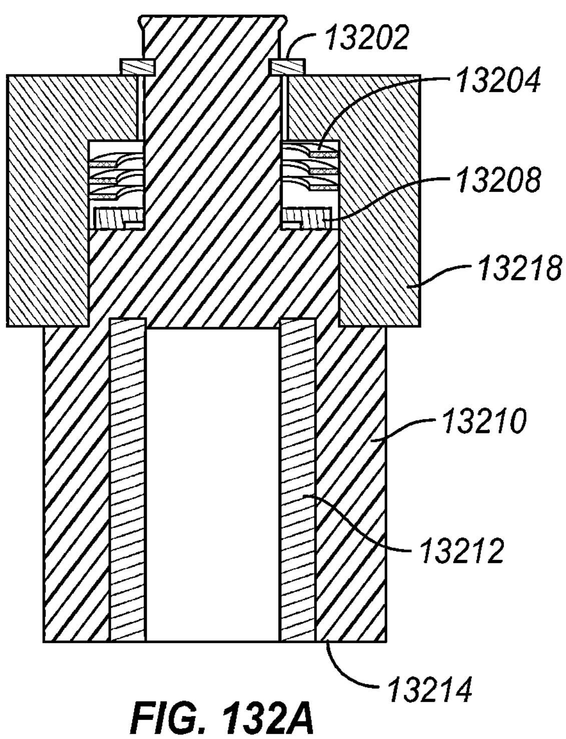
Figure 132B:
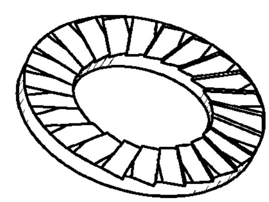

FIG. 132A and FIG. 132B depict various terminal cap embodiments.

Figure 133A:
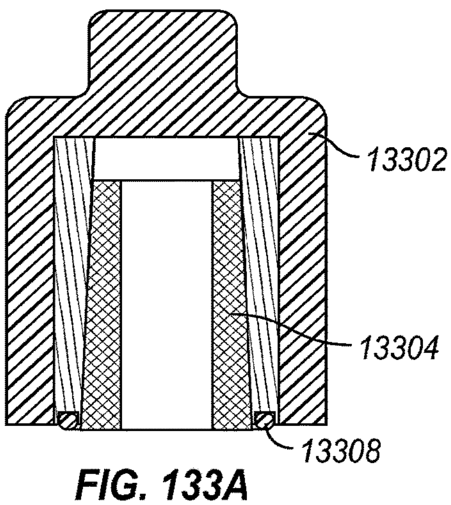
Figure 133B:
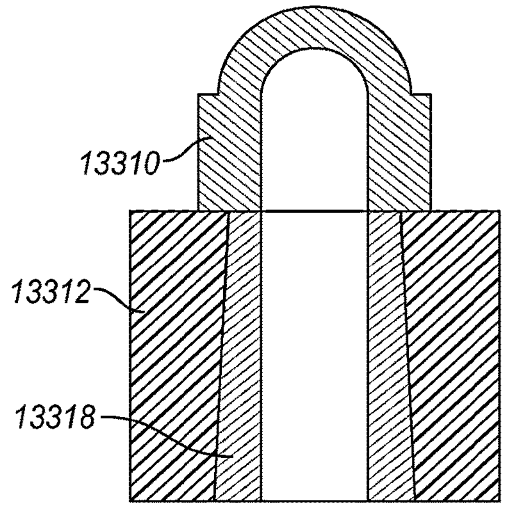

FIG. 133A and FIG. 133B depict various terminal cap embodiments.

Figure 134A:
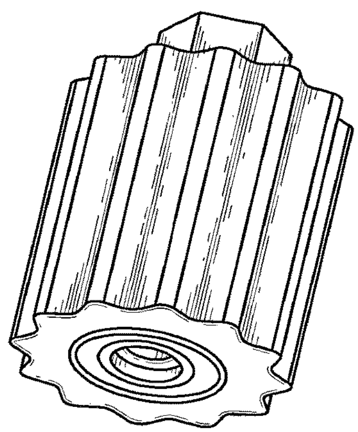
Figure 134B:
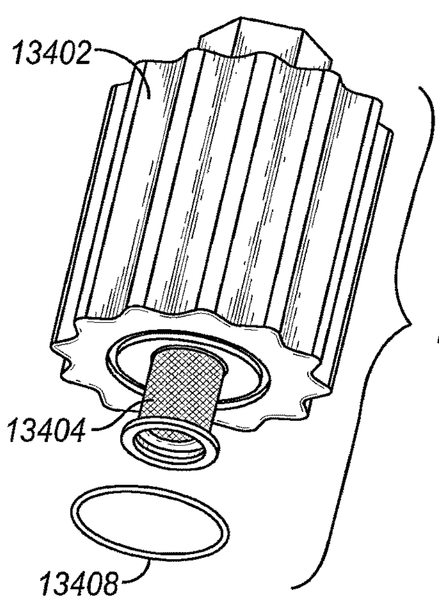
Figure 134C:
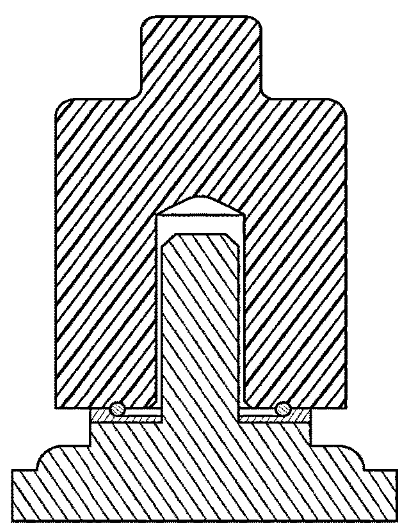

FIG. 134A, FIG. 134B, and FIG. 134C depicts terminal cap sealing.

Figure 135:
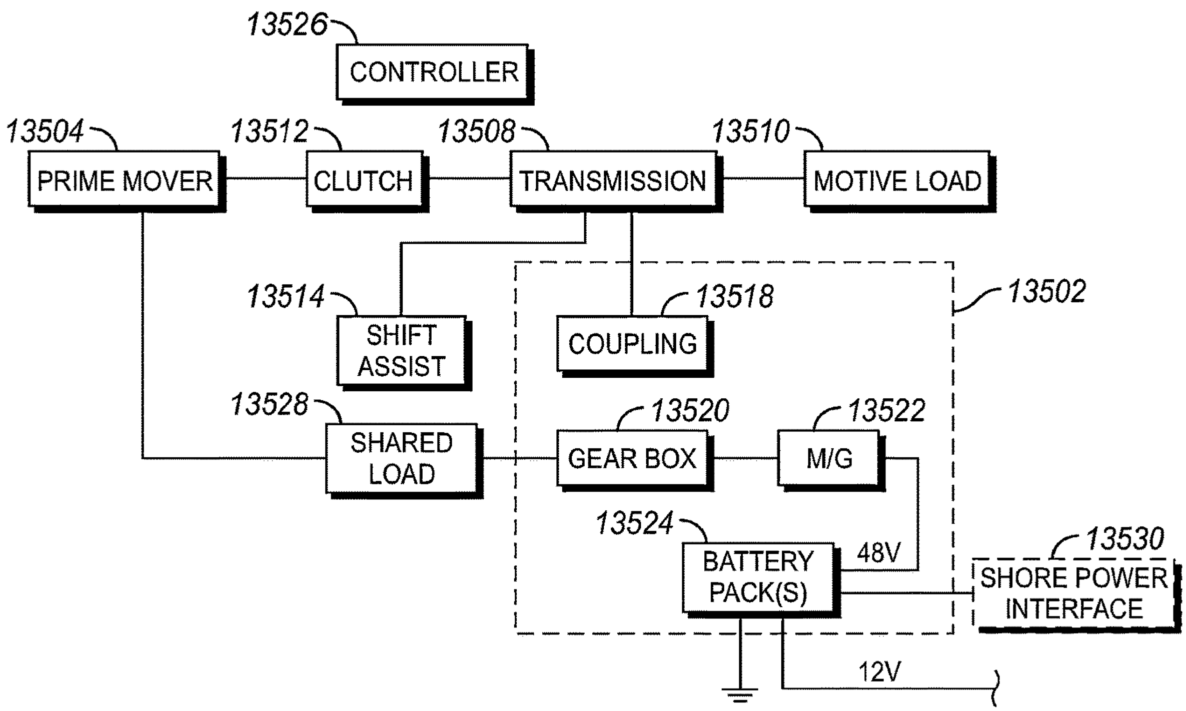
Figure 136:
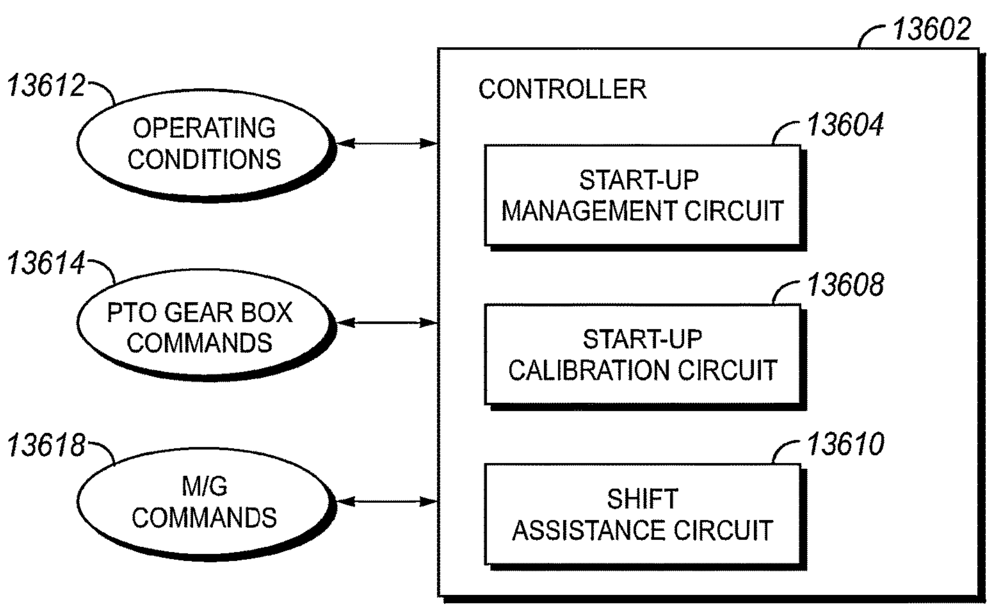
Figure 137:
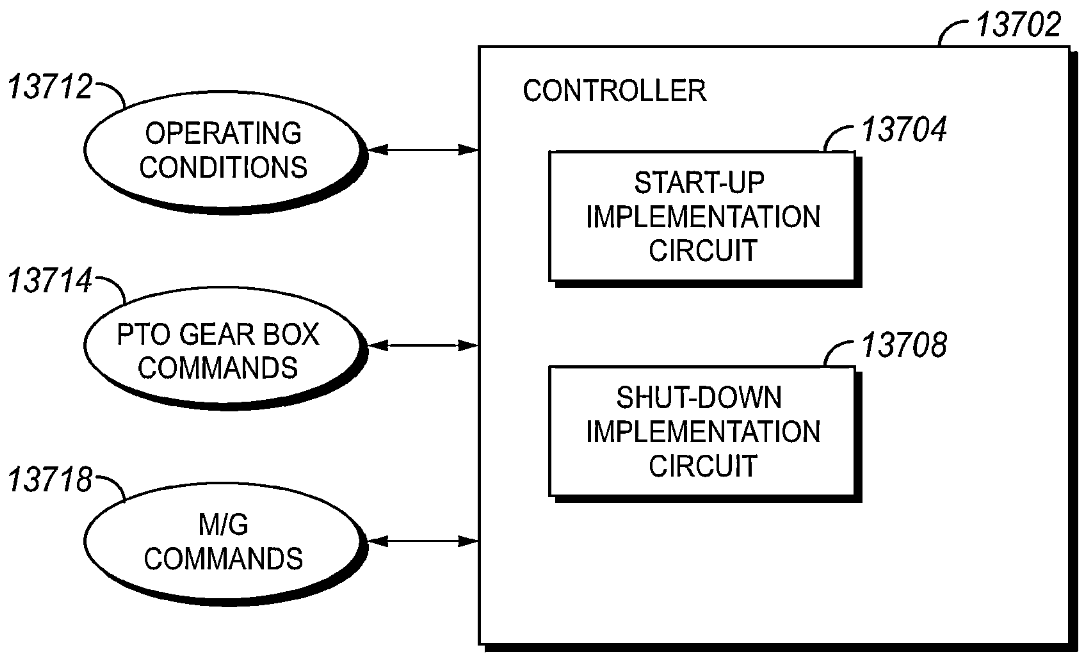
Figure 138:
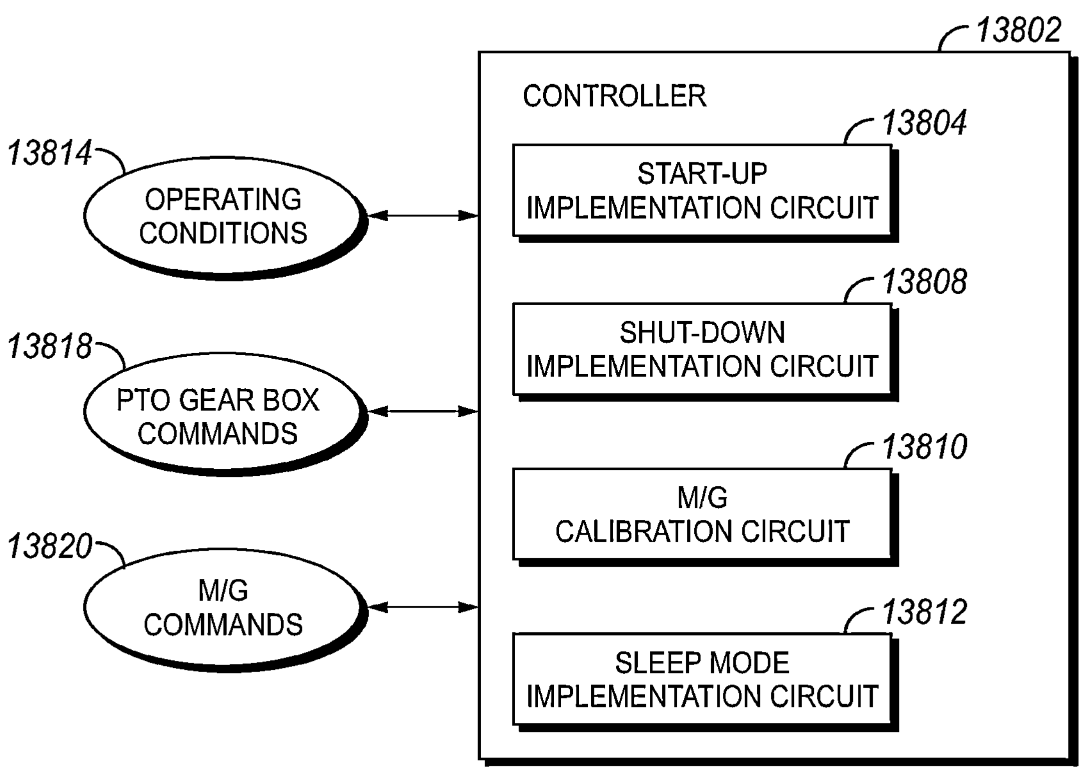
Figure 139:
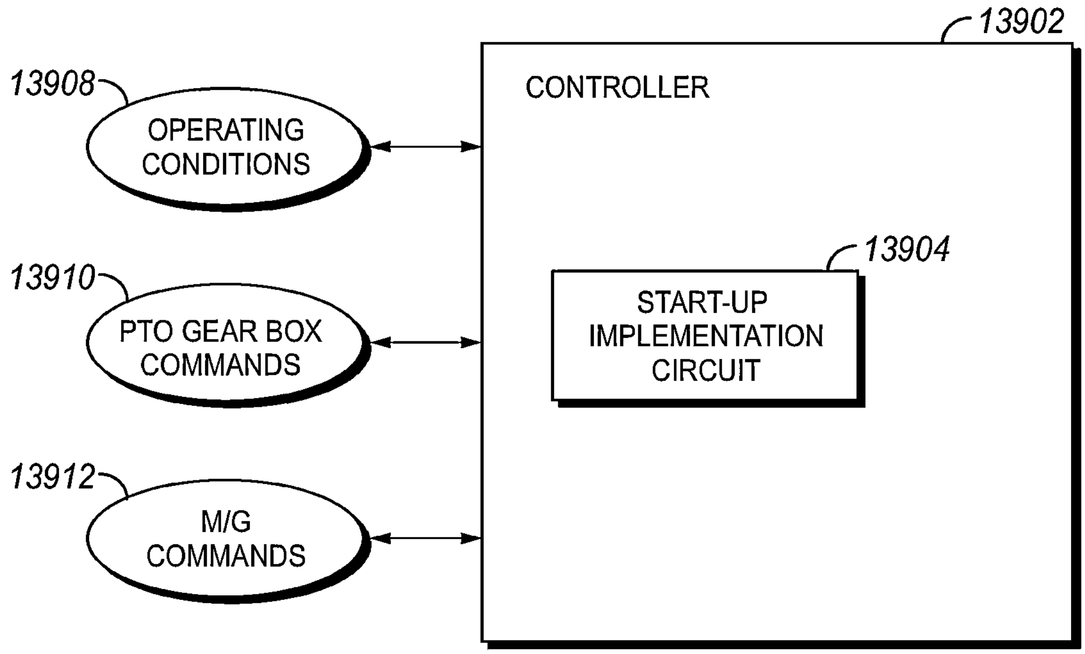
Figure 140:
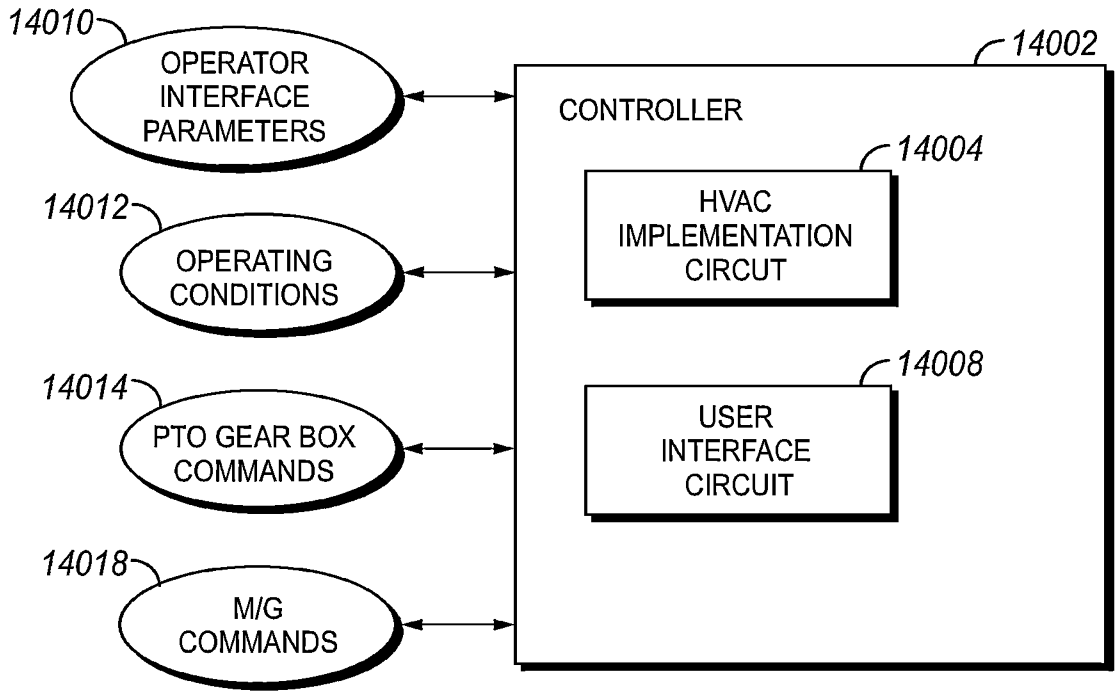
Figure 141:
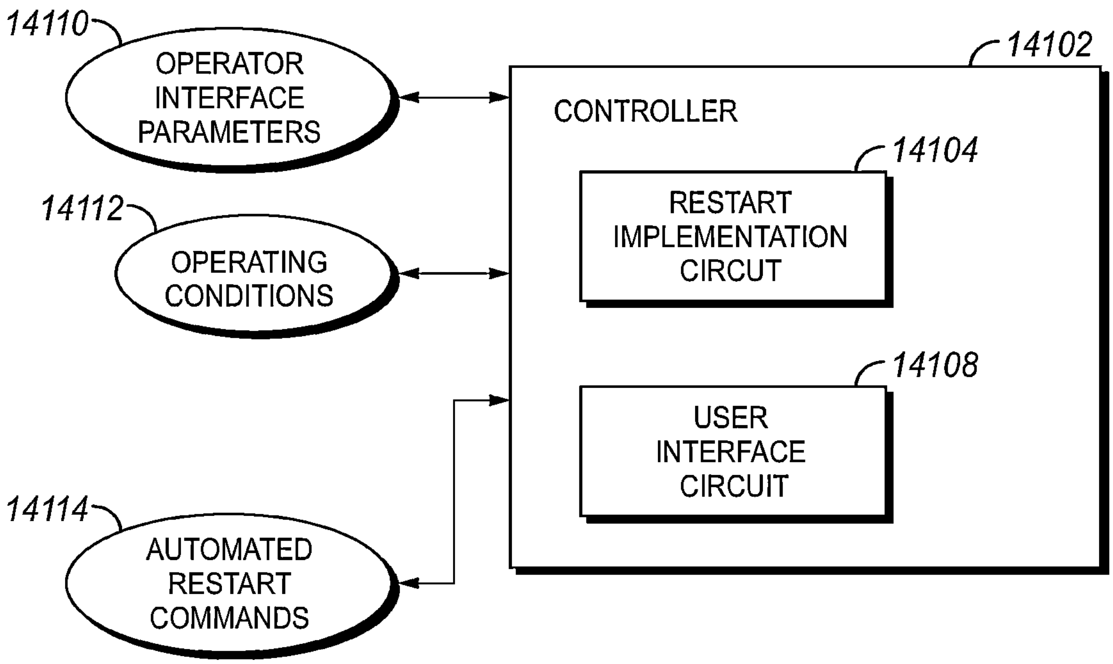
Figure 142:
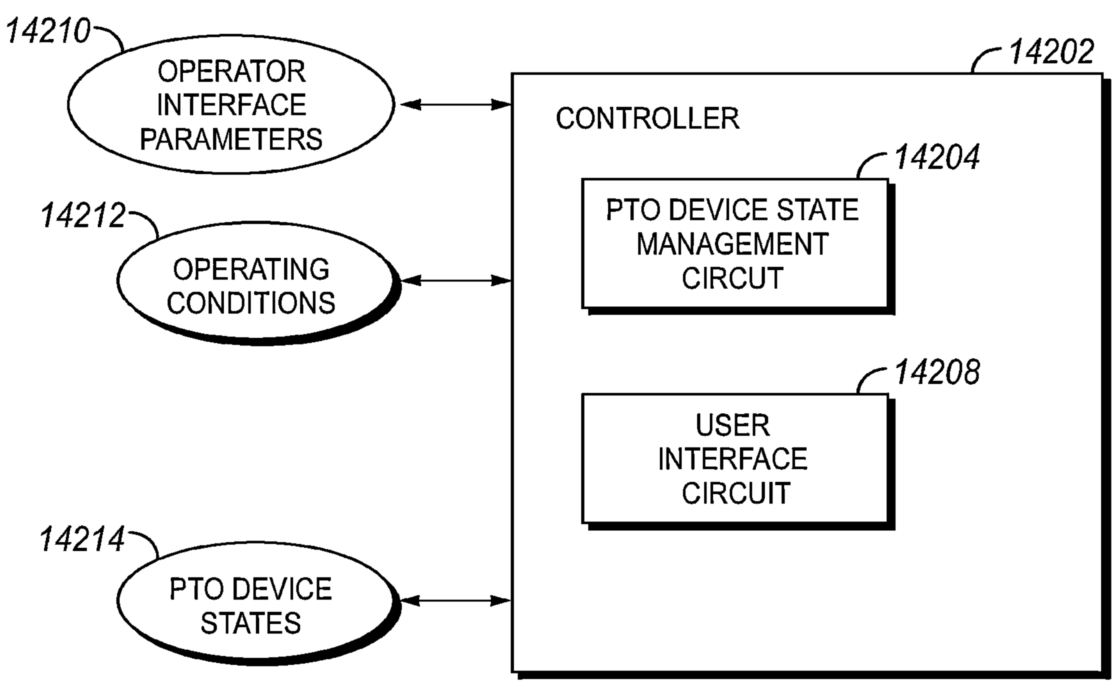
Figure 143:
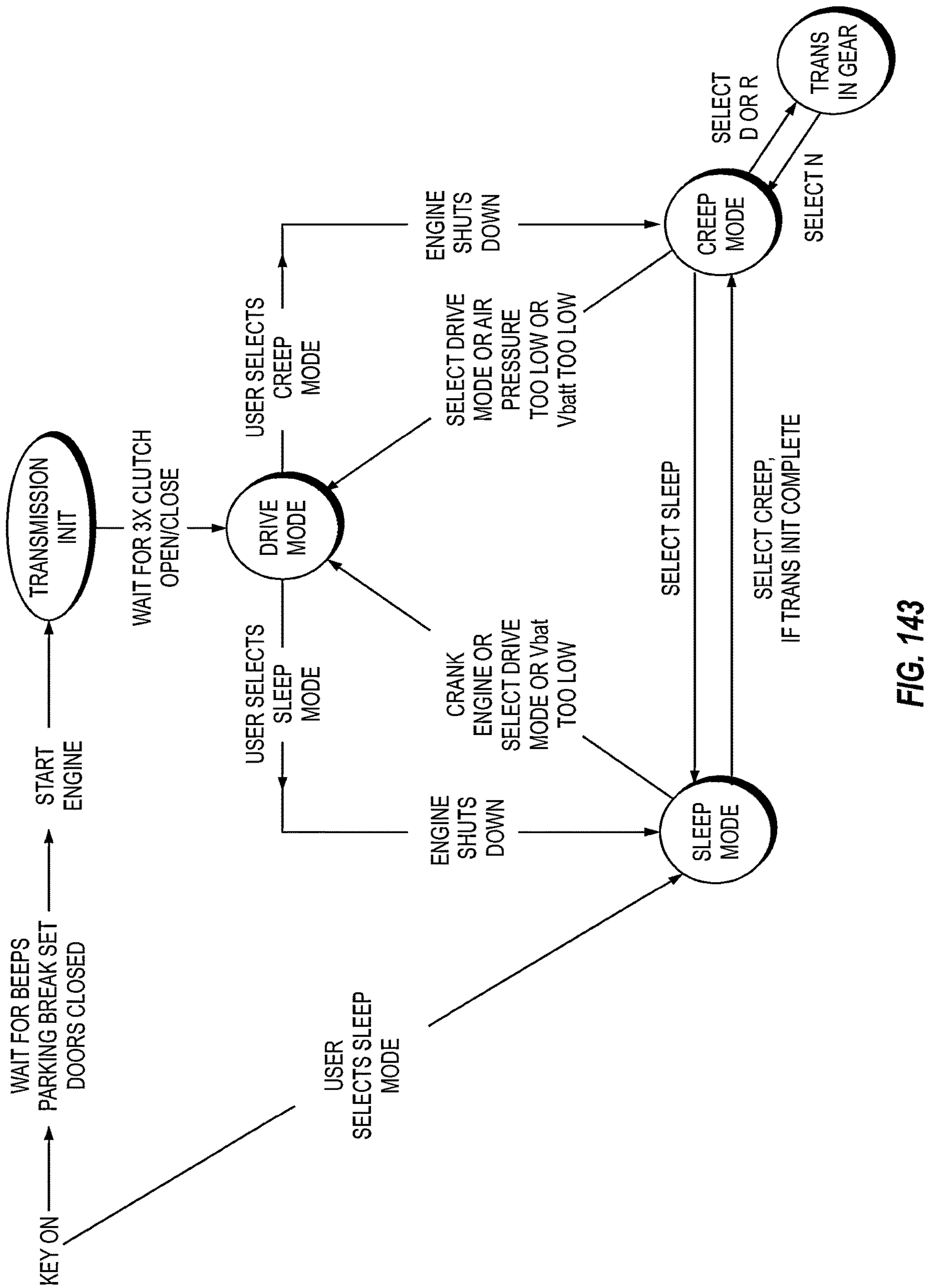

FIG. 135 is a top-level schematic block diagram for a system including a driveline PTO device of the present disclosure;

FIG. 136 is a schematic block diagram of an apparatus for controlling start-up operations for a mobile application;

FIG. 137 is a schematic block diagram of an apparatus for controlling shut-down operations for a mobile application;

FIG. 138 is a schematic block diagram for controlling cranking operations of a prime mover for a mobile application;

FIG. 139 is a schematic block diagram for providing overspeed protection for a motor/generator of a PTO device for a mobile application;

FIG. 140 is a schematic block diagram for providing power management operations for a mobile application;

FIG. 141 is a schematic block diagram for providing automatic prime mover starting operations for a mobile application;

FIG. 142 is a schematic block diagram for providing user interface and power management operations for a mobile application;

FIG. 143 is a schematic depiction of operating states for a PTO device; and

Figure 144:
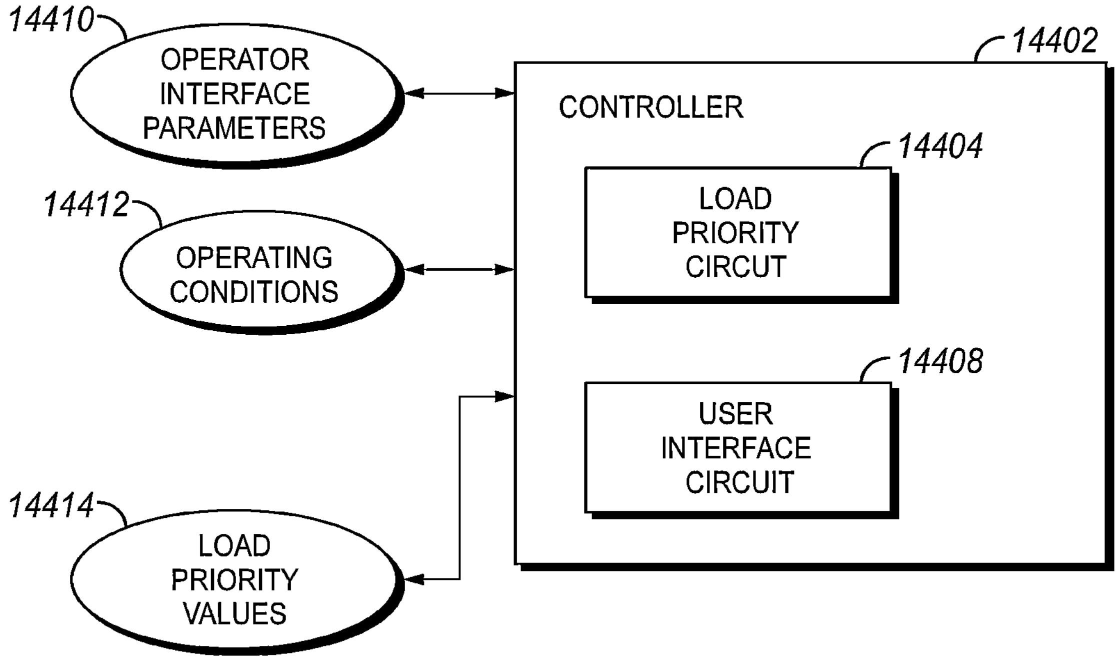

FIG. 144 is a schematic block diagram for providing operations to discriminate between loads of a mobile application.

Figure 145:
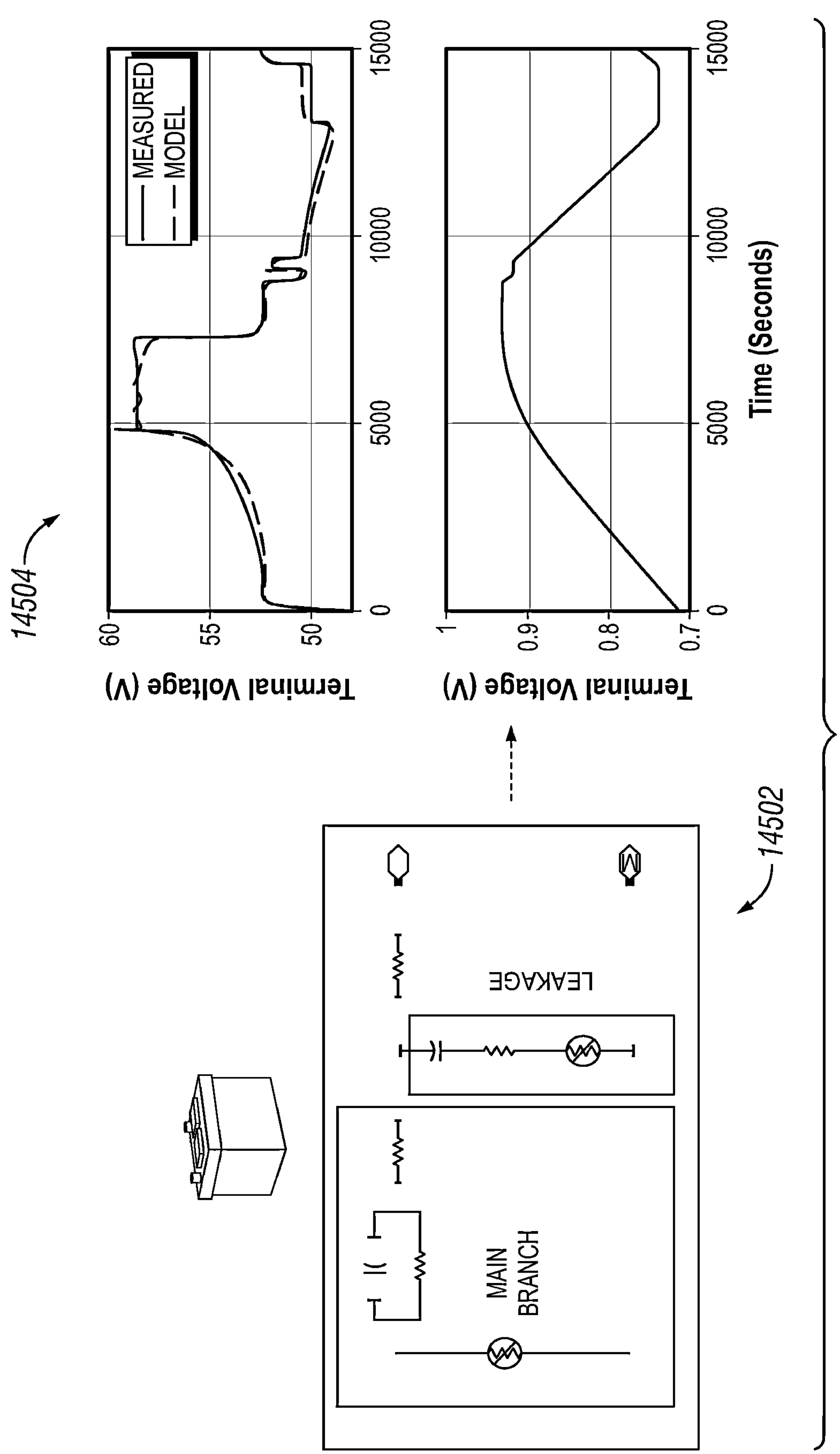

FIG. 145 is an example lead-acid battery circuit model and illustrative matching data.

Figure 146:
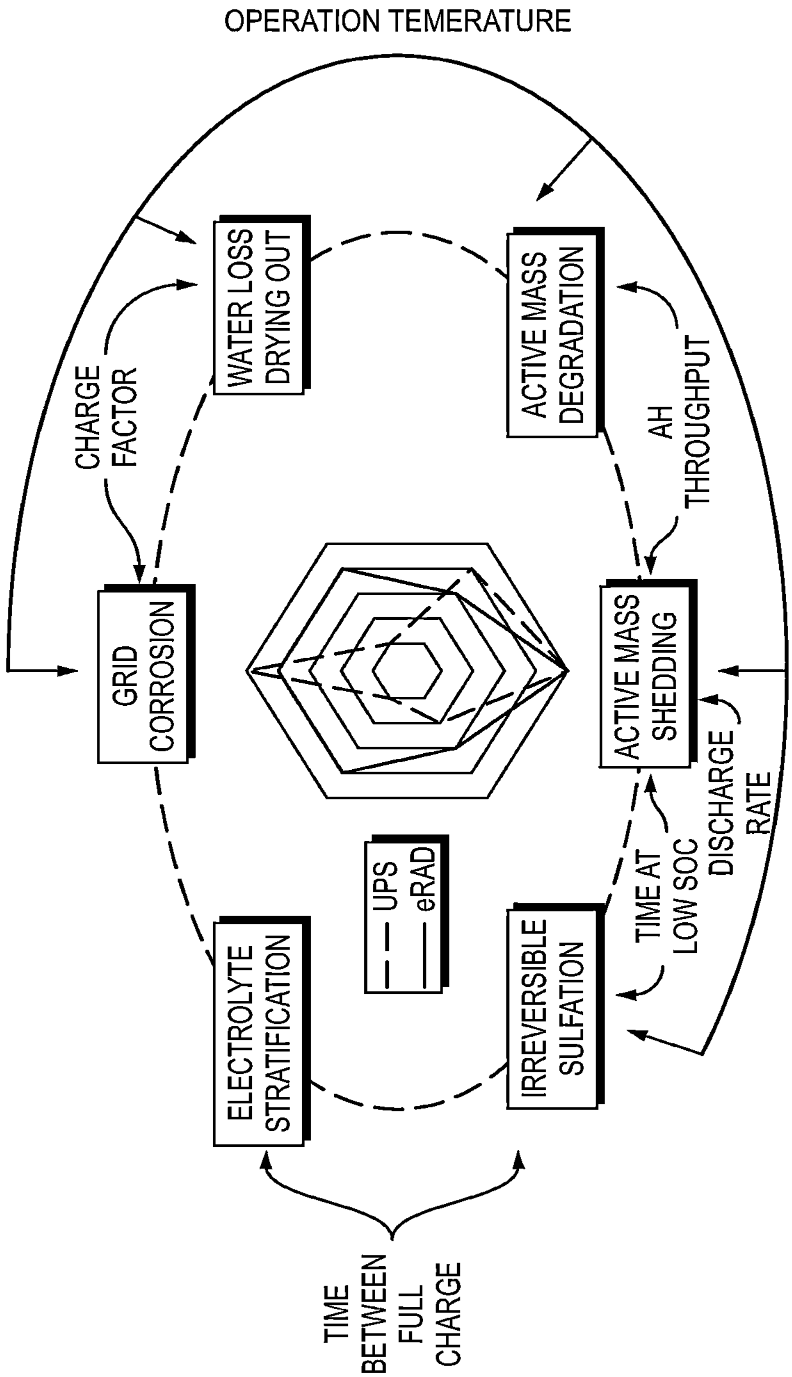

FIG. 146 is a schematic diagram of degradation mechanisms and stress factors for a lead-acid battery.

Figure 147:
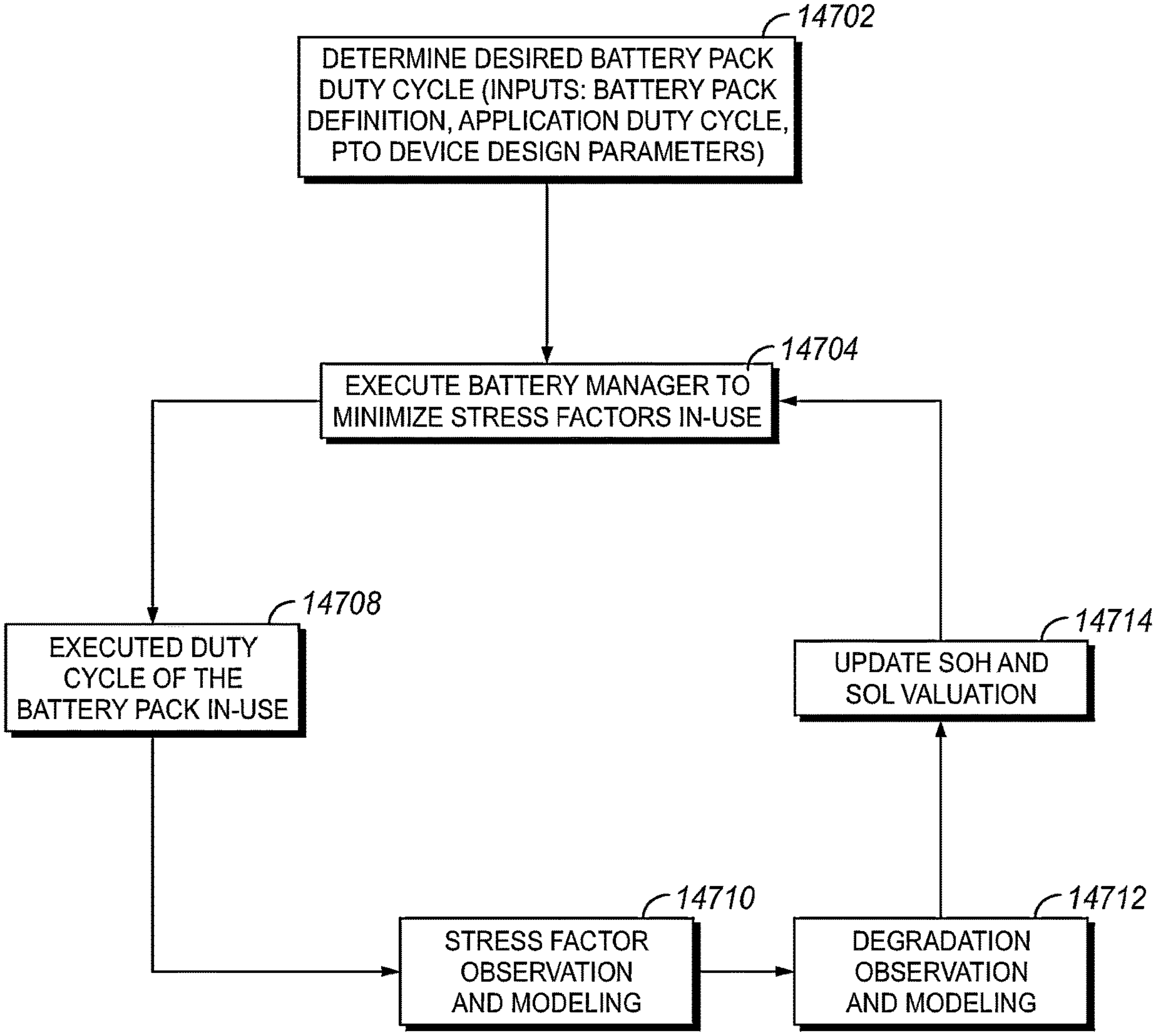

FIG. 147 is a schematic flow diagram of an operating cycle for a battery management system.

Figure 148:
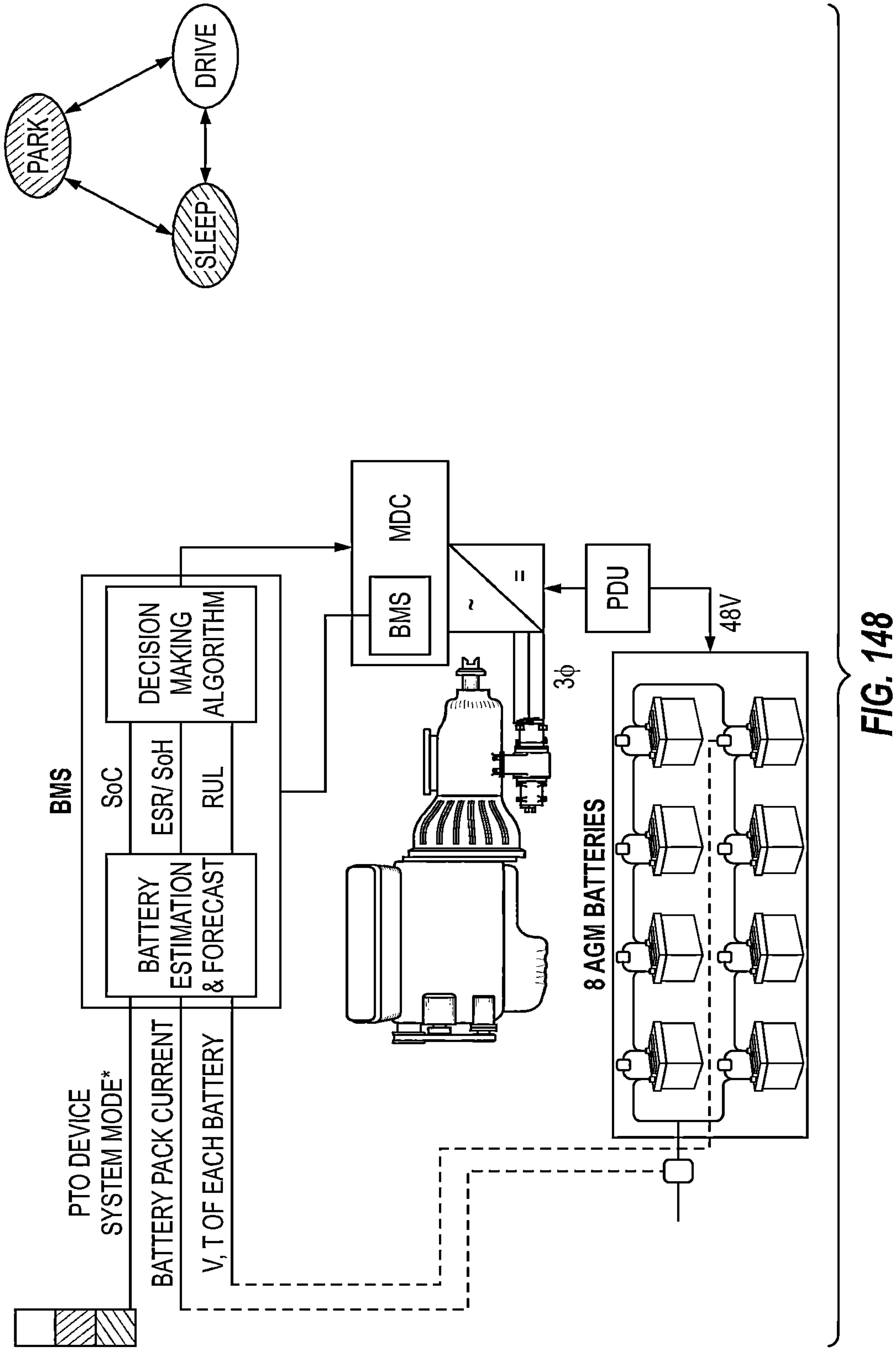

FIG. 148 is a schematic diagram of a battery management system.

Figure 149:
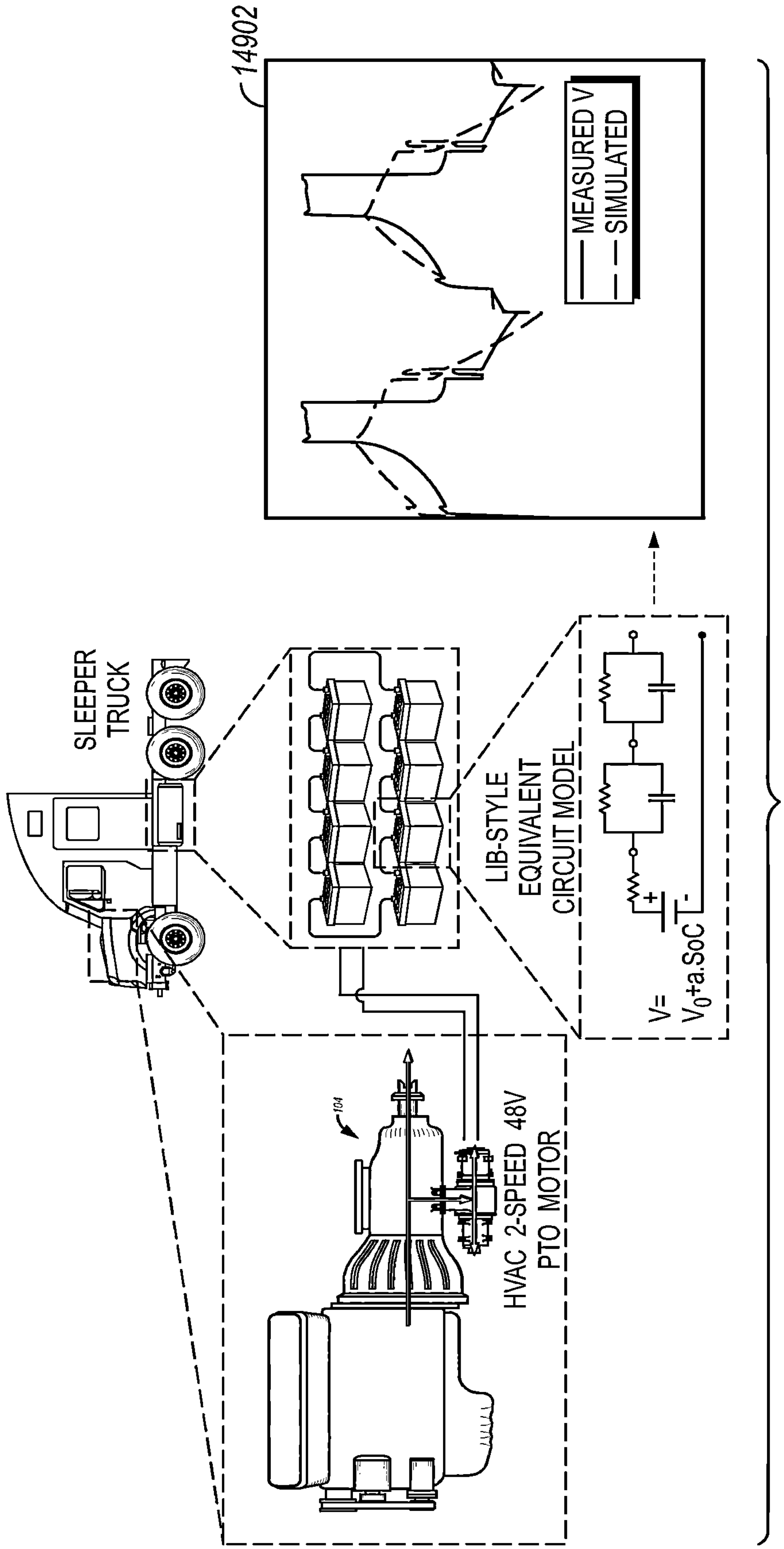

FIG. 149 is a schematic diagram of a resistive-capacitive model and illustrative matching data.

Figure 150:
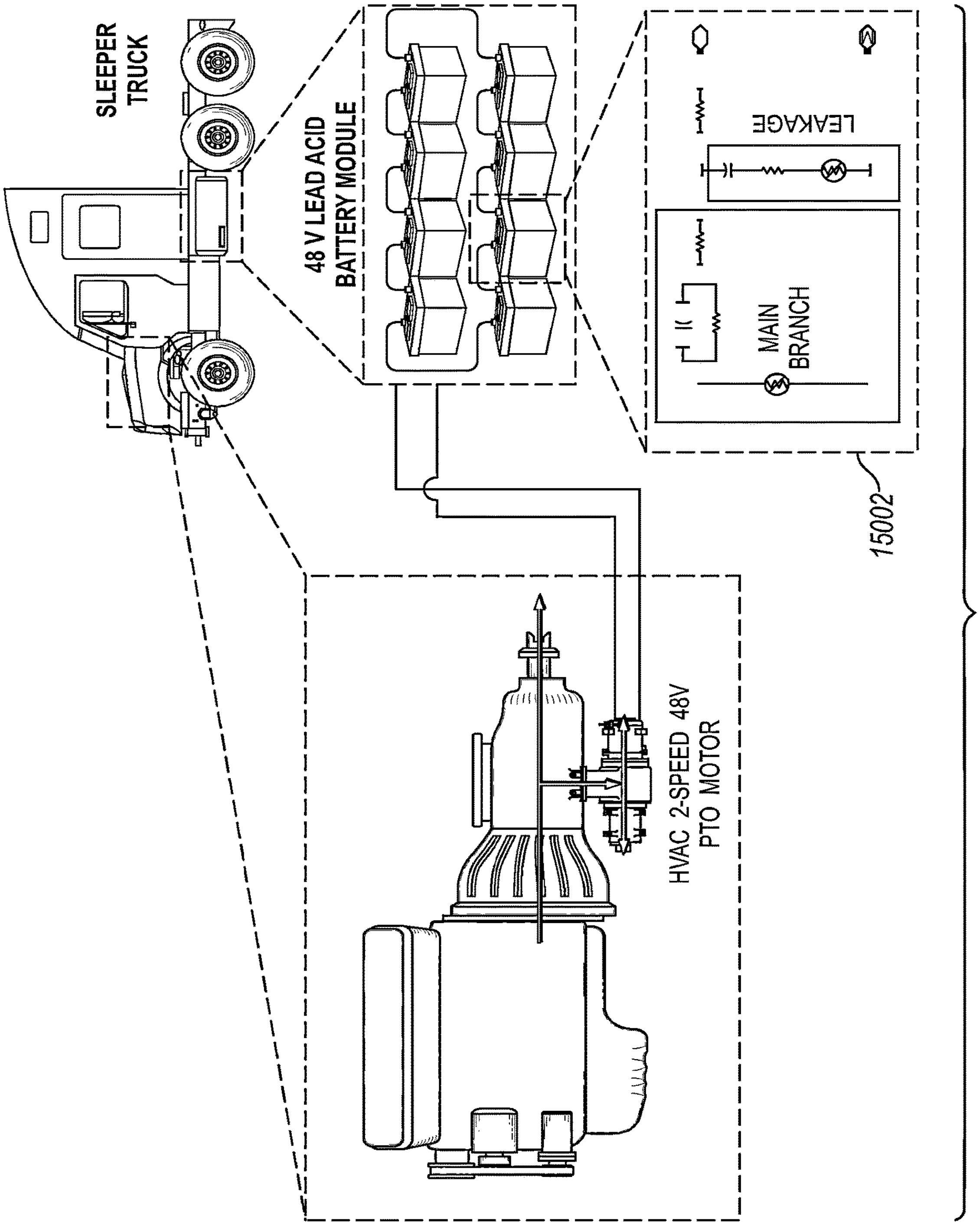
Figure 151:
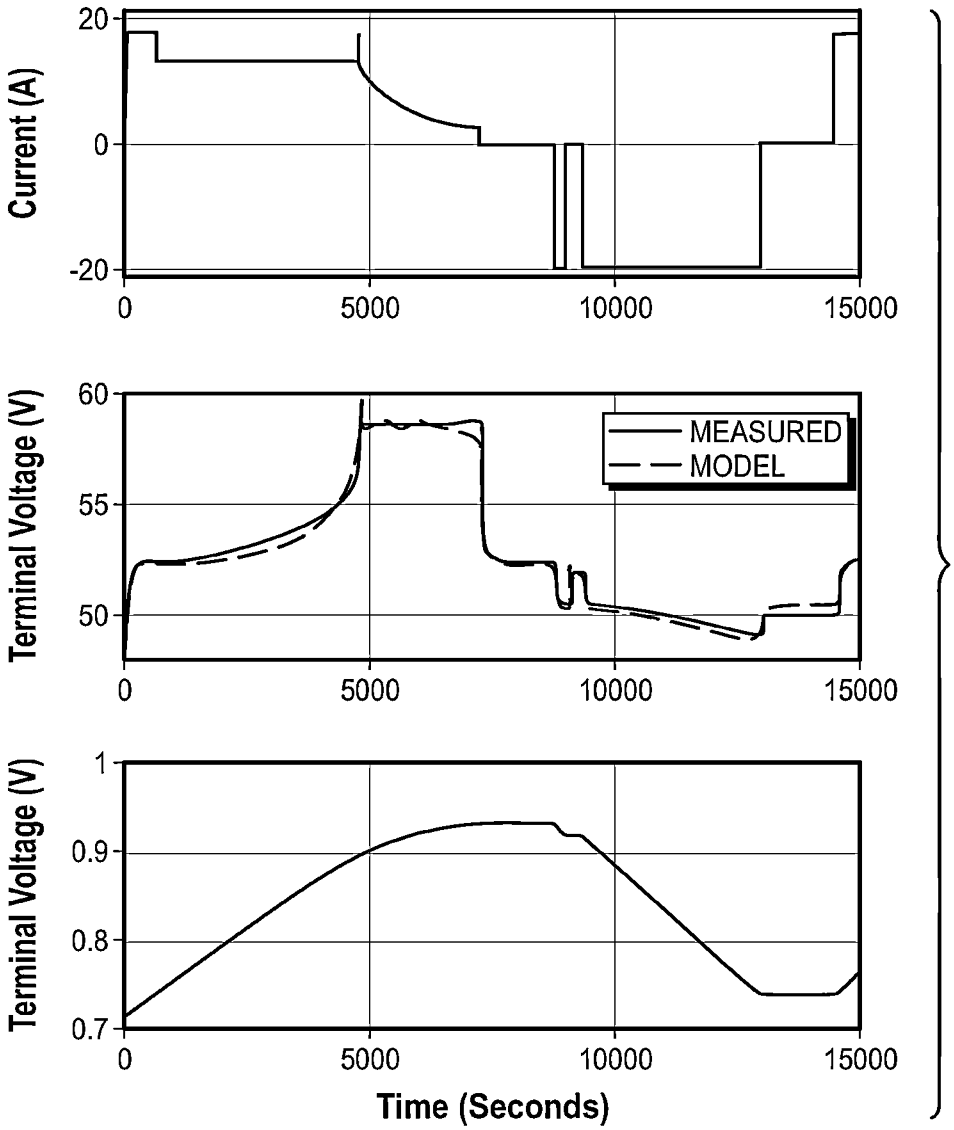

FIG. 150 is a schematic diagram of the lead-acid battery model and FIG. 151 presents illustrative matching data.

Figure 152:
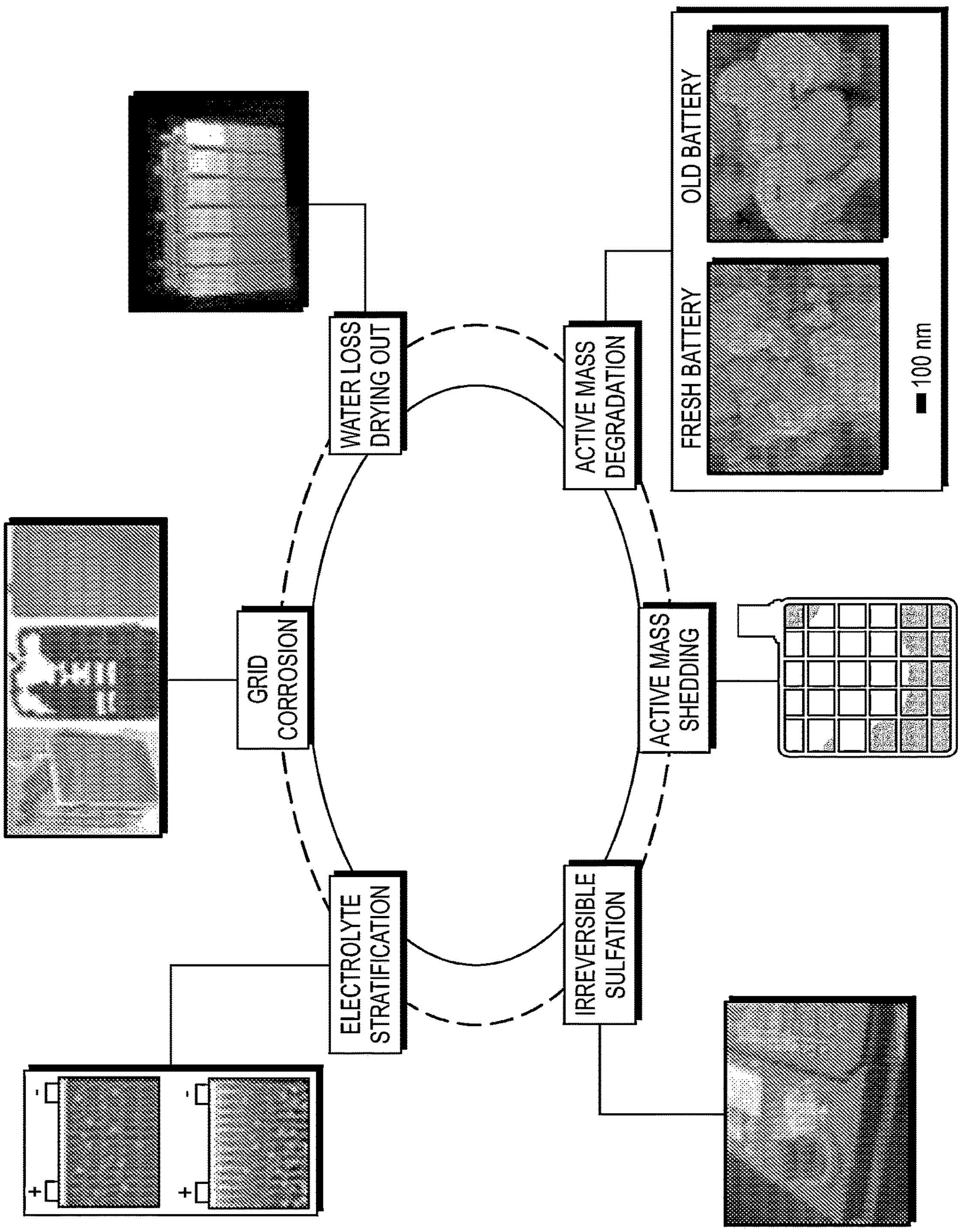

FIG. 152 is a schematic diagram of the degradation mechanisms for a lead-acid battery.

Figure 153:
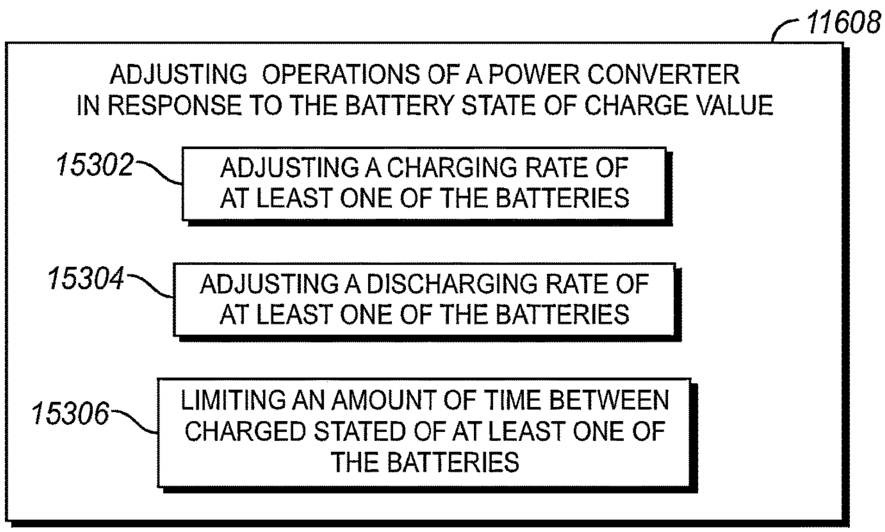

FIG. 153 depicts examples of adjusting operations of a power converter in response to the battery state of charge value.

Figure 154:
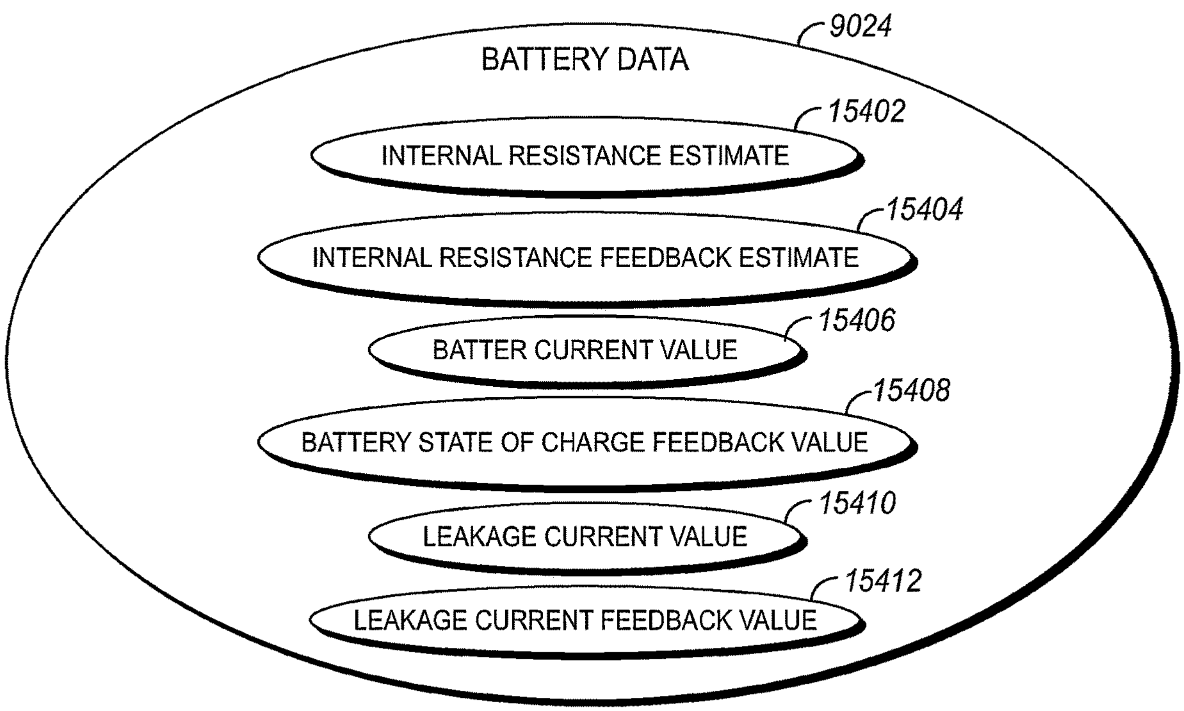

FIG. 154 depicts examples of battery data.

Figure 155:
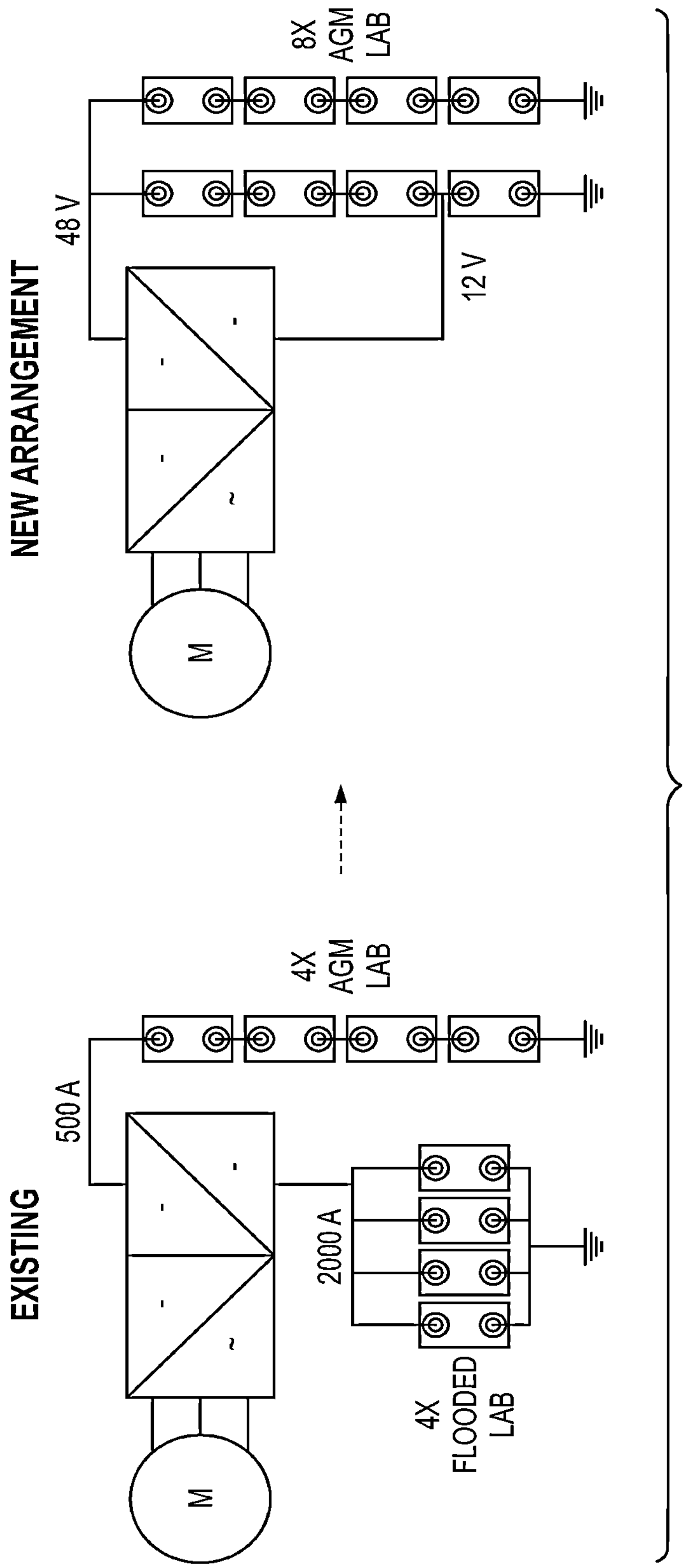

FIG. 155 is a schematic diagram of example battery arrangements for a PTO device.

Figure 156:
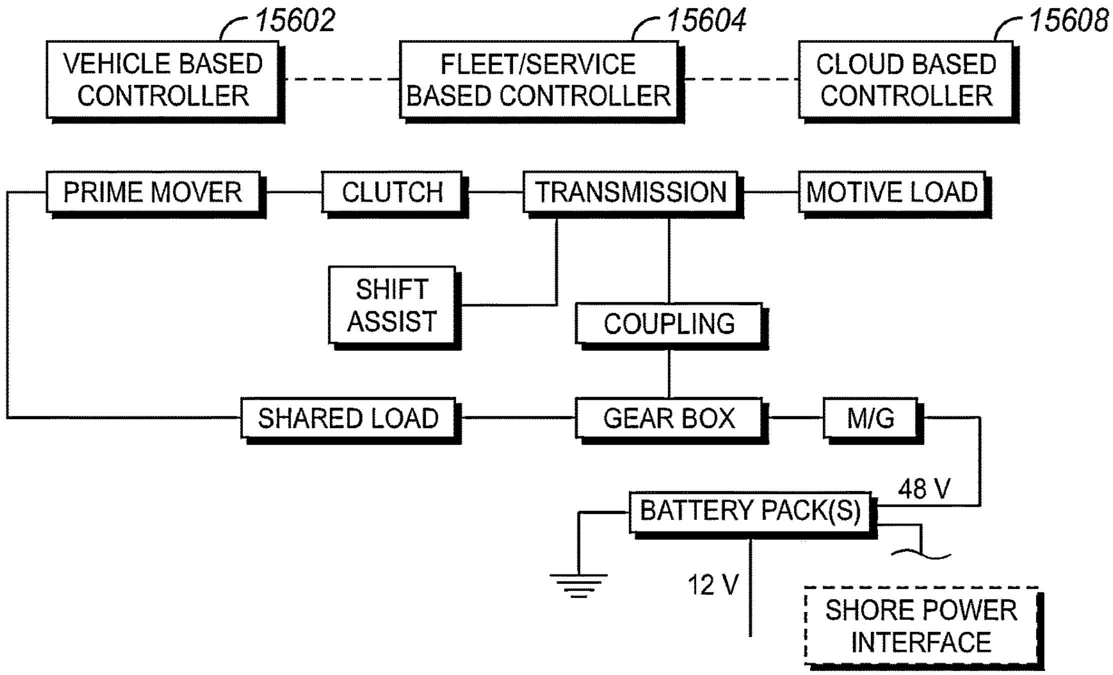

FIG. 156 is a top-level schematic block diagram of an alternate embodiment for a system including a driveline PTO device of the present disclosure.

Figure 157:
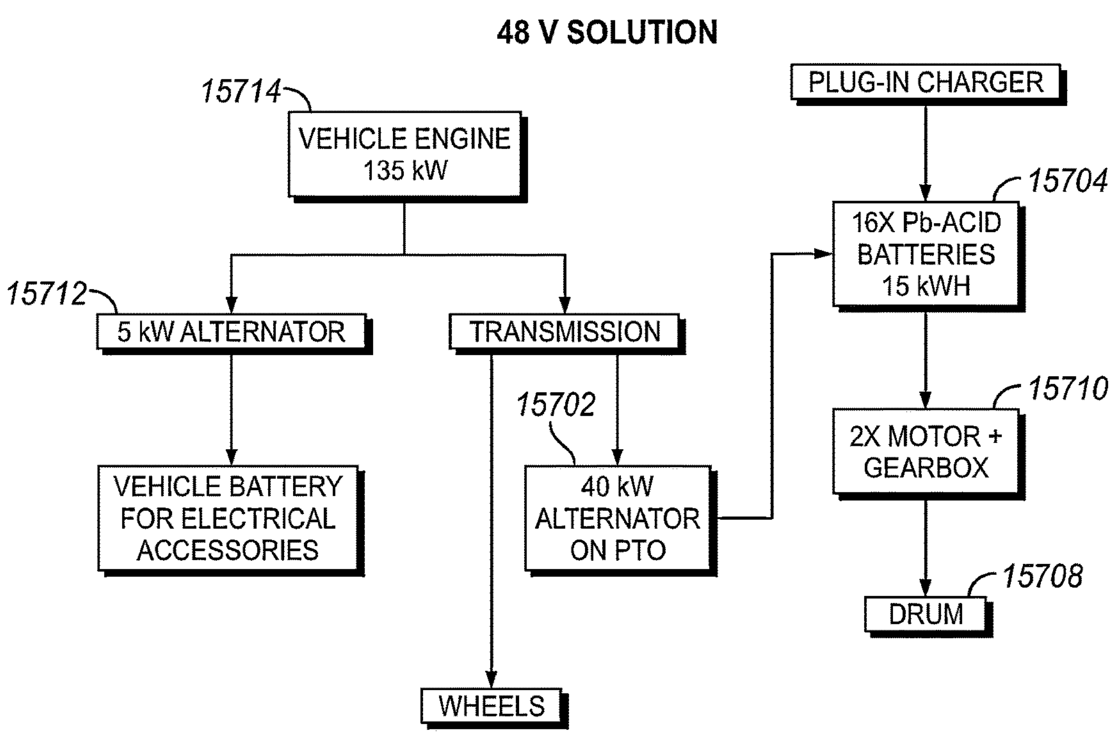

FIG. 157 depicts a system with two electric motors to support non-motive loads.

Figure 158:
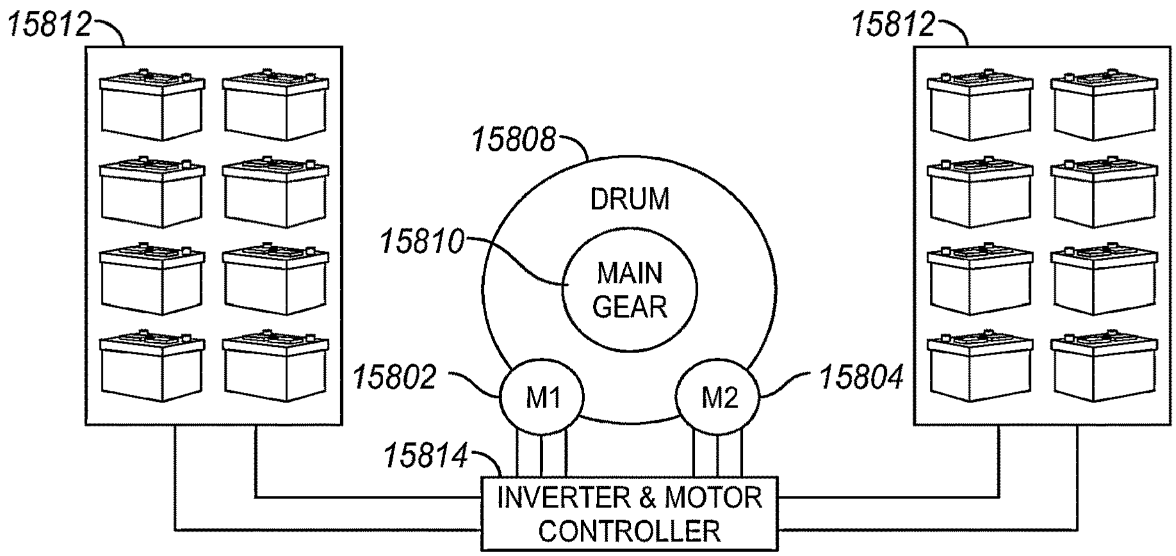

FIG. 158 depicts a system for driving a non-motive load using electrical power.

Figure 159:
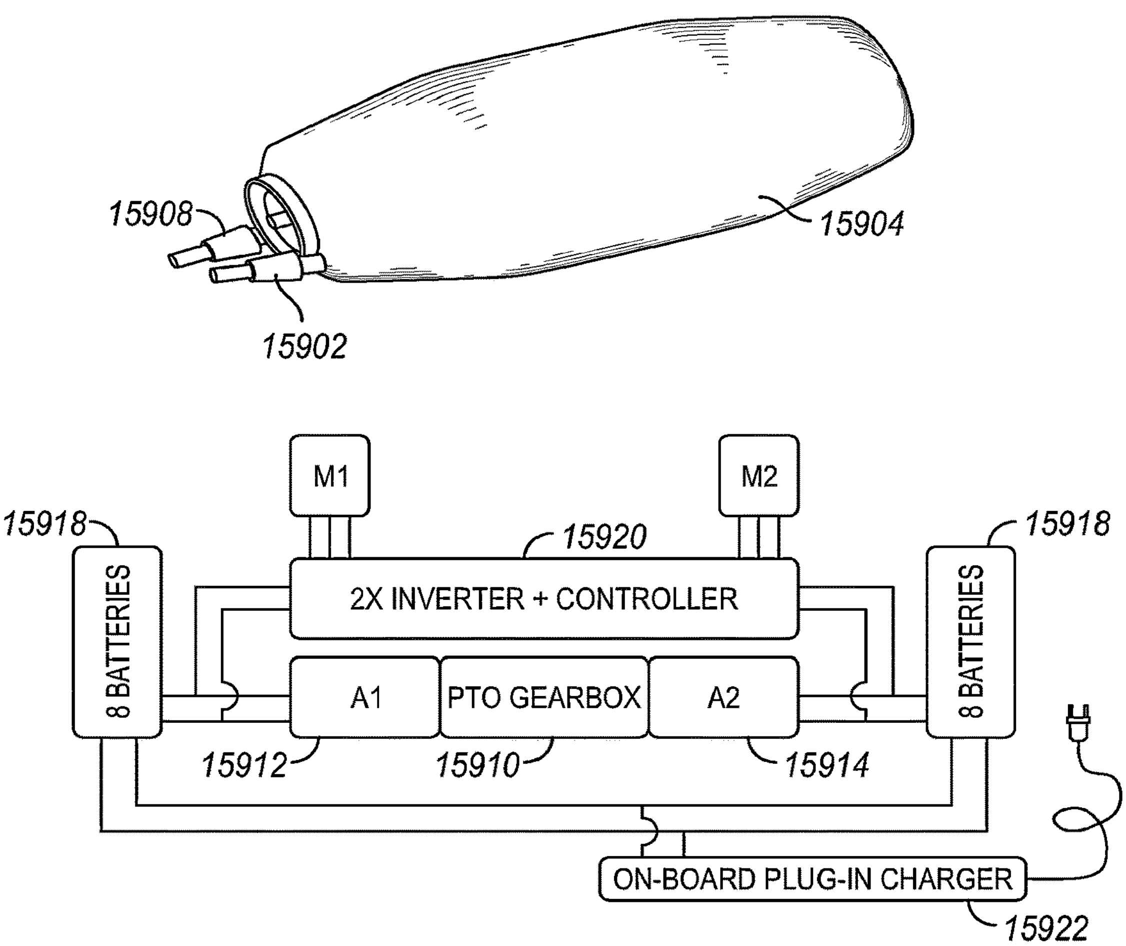

FIG. 159 depicts a system for driving a non-motive load using electrical power.

Figure 160:
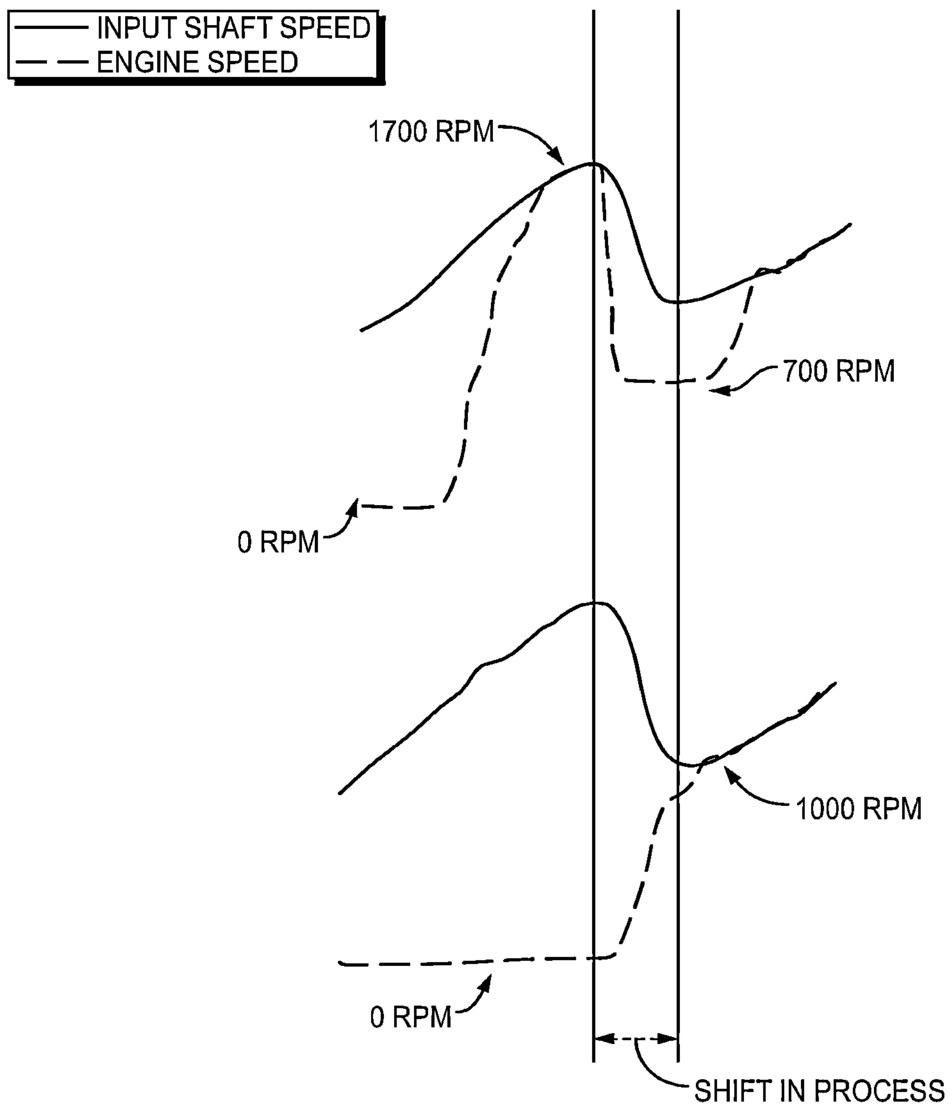

FIG. 160 depicts a method for improving fuel efficiency by cranking engine during a shift for a hybrid vehicle.

Figure 161:
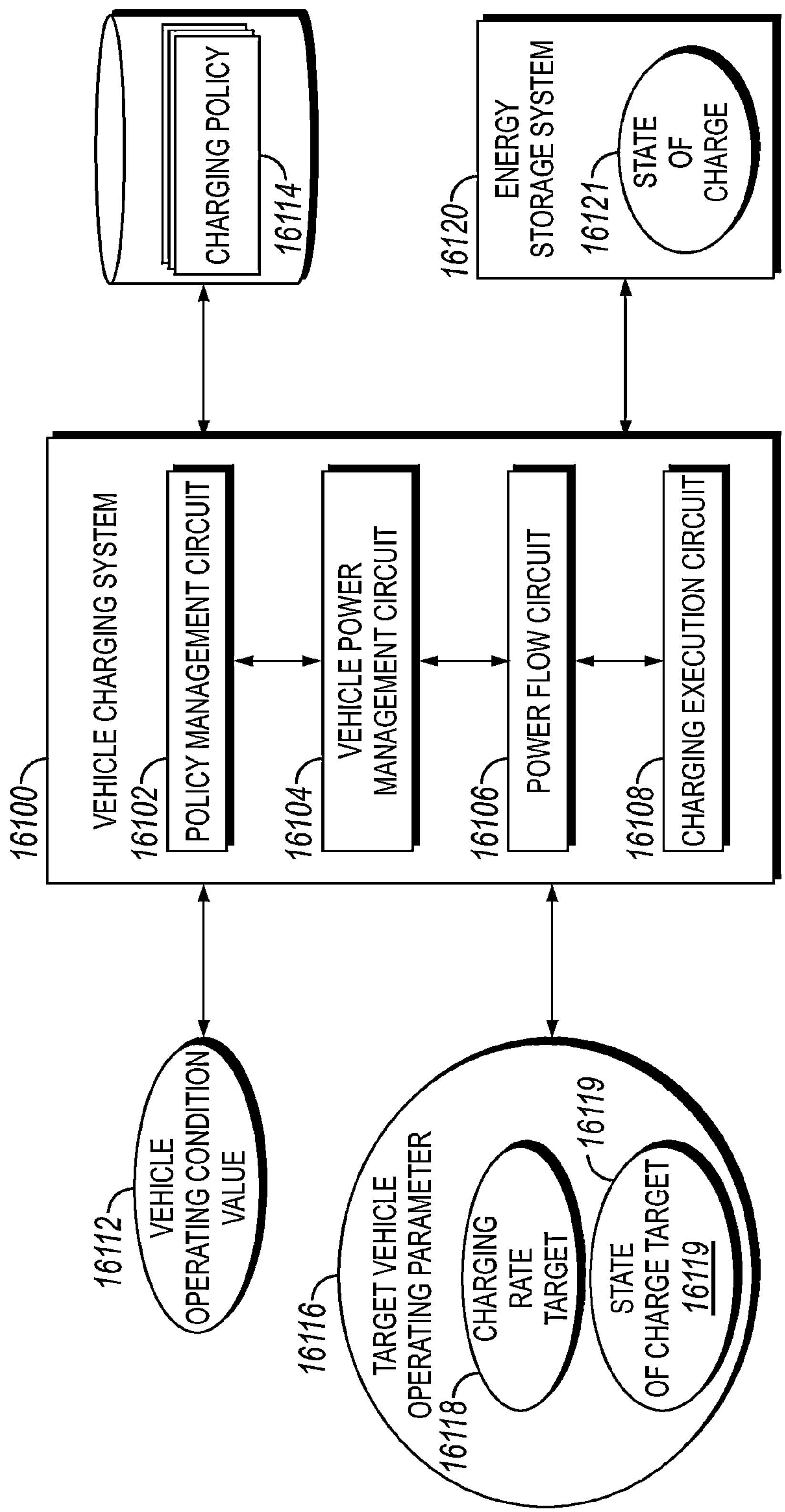

FIG. 161 depicts a vehicle charging system.

Figure 162:
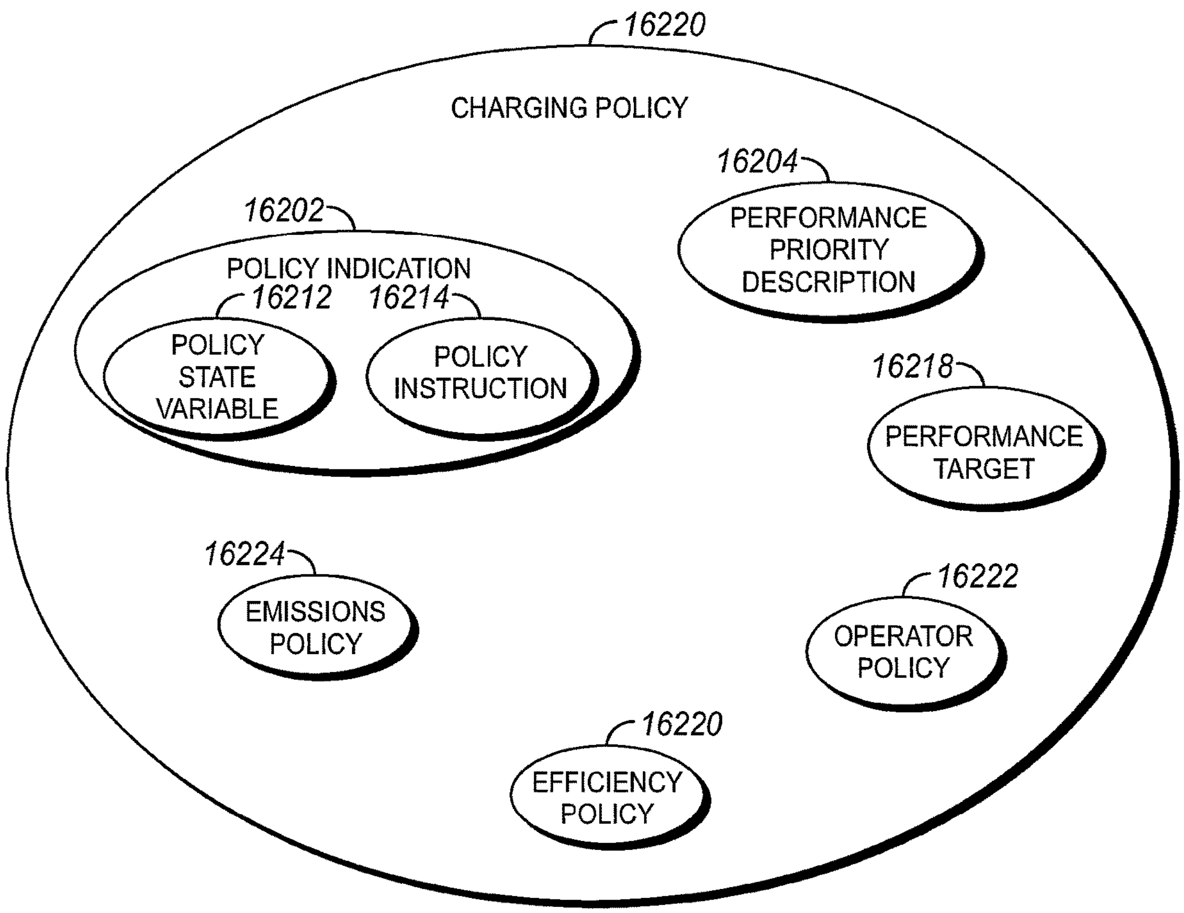

FIG. 162 depicts examples of charging policy content.

Figure 163:
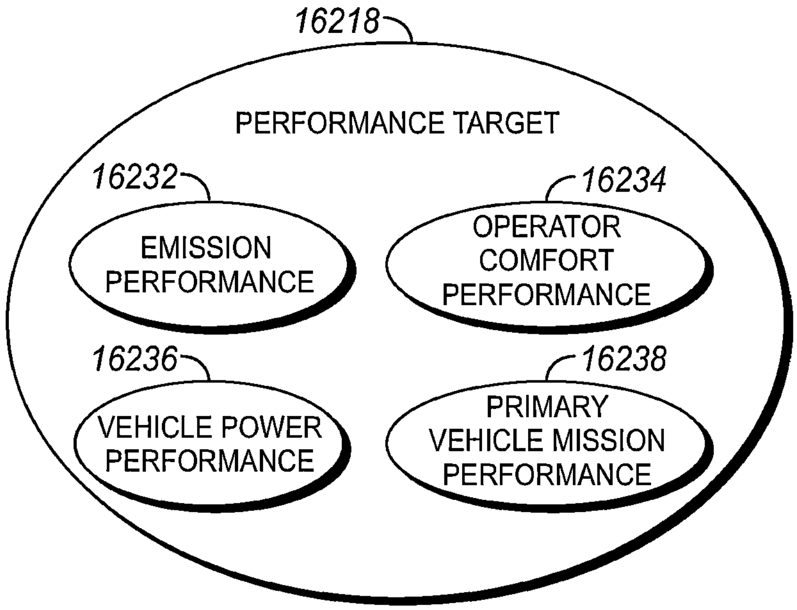

FIG. 163 depicts examples of performance targets.

Figure 164:
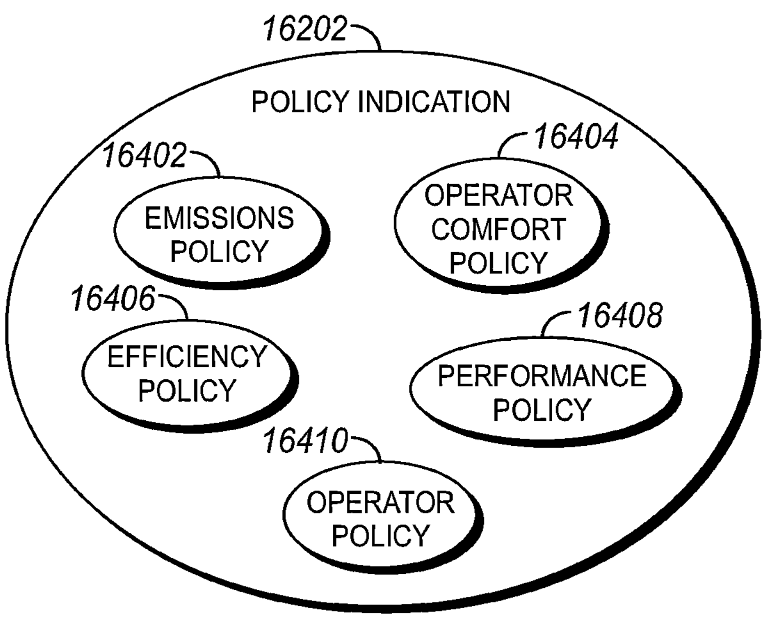

FIG. 164 depicts examples of a policy indication.

Figure 165:
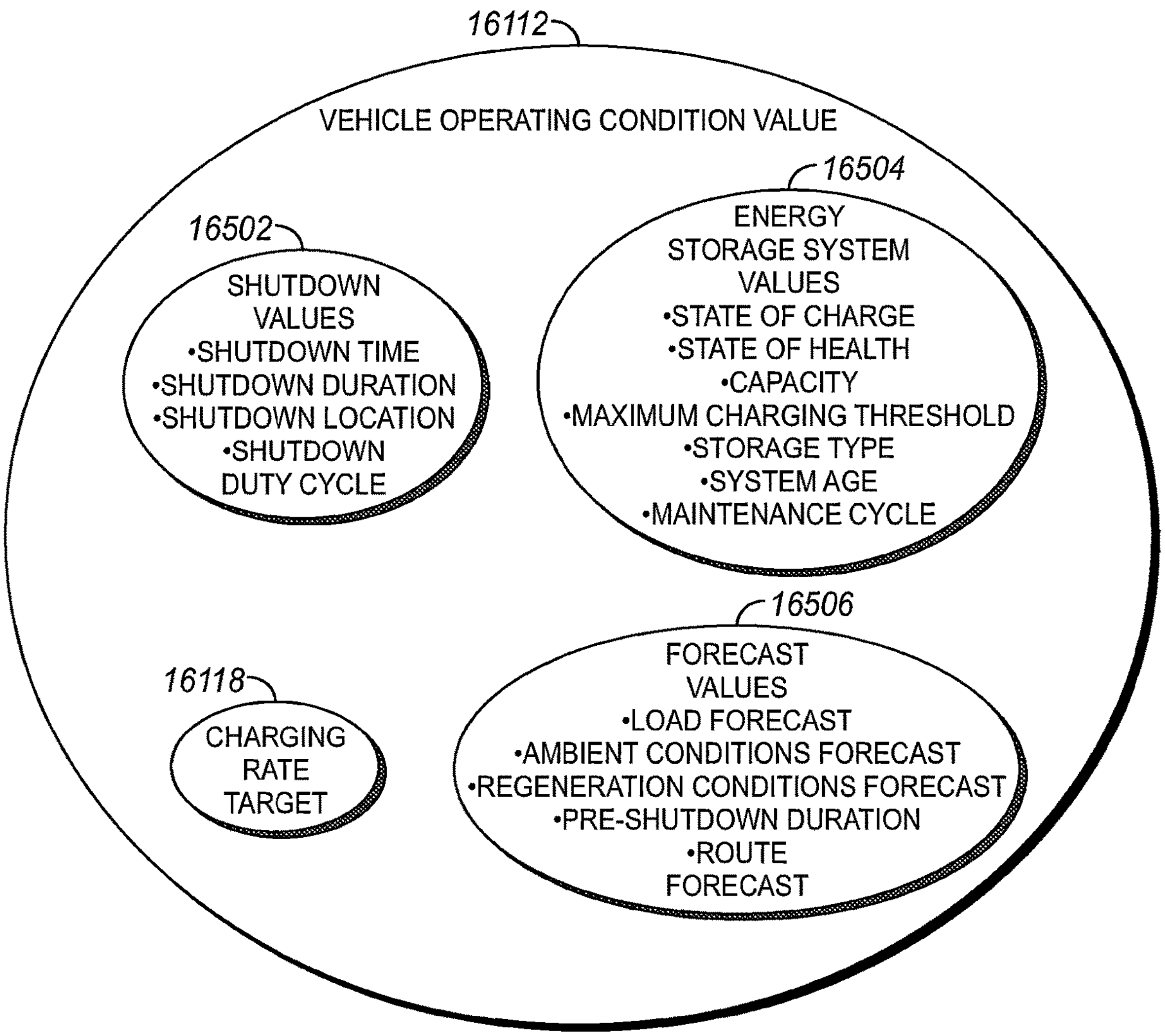

FIG. 165 depicts examples of vehicle operating condition values.

Figure 166:
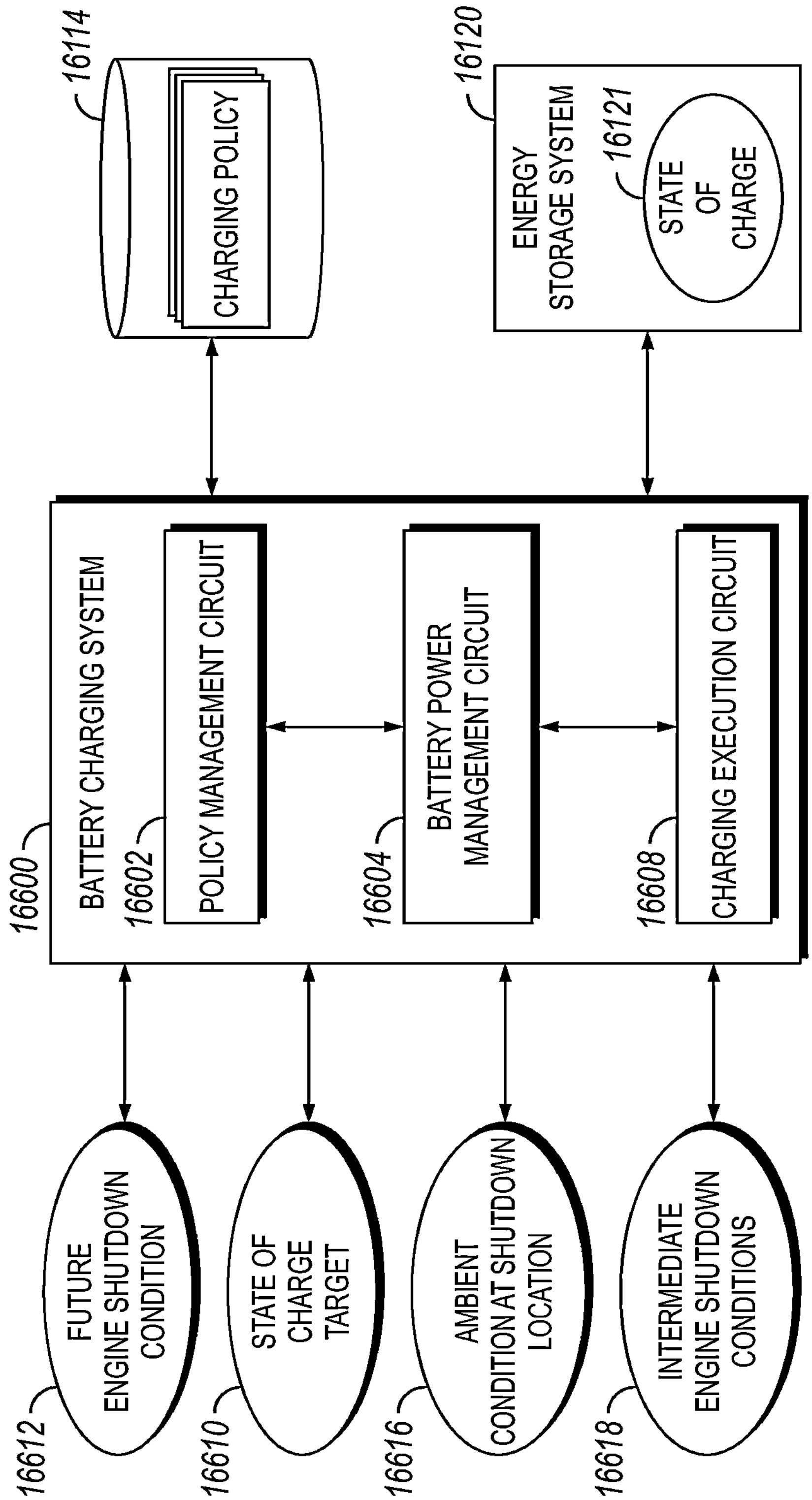

FIG. 166 depicts a vehicle charging system.

Figure 167:
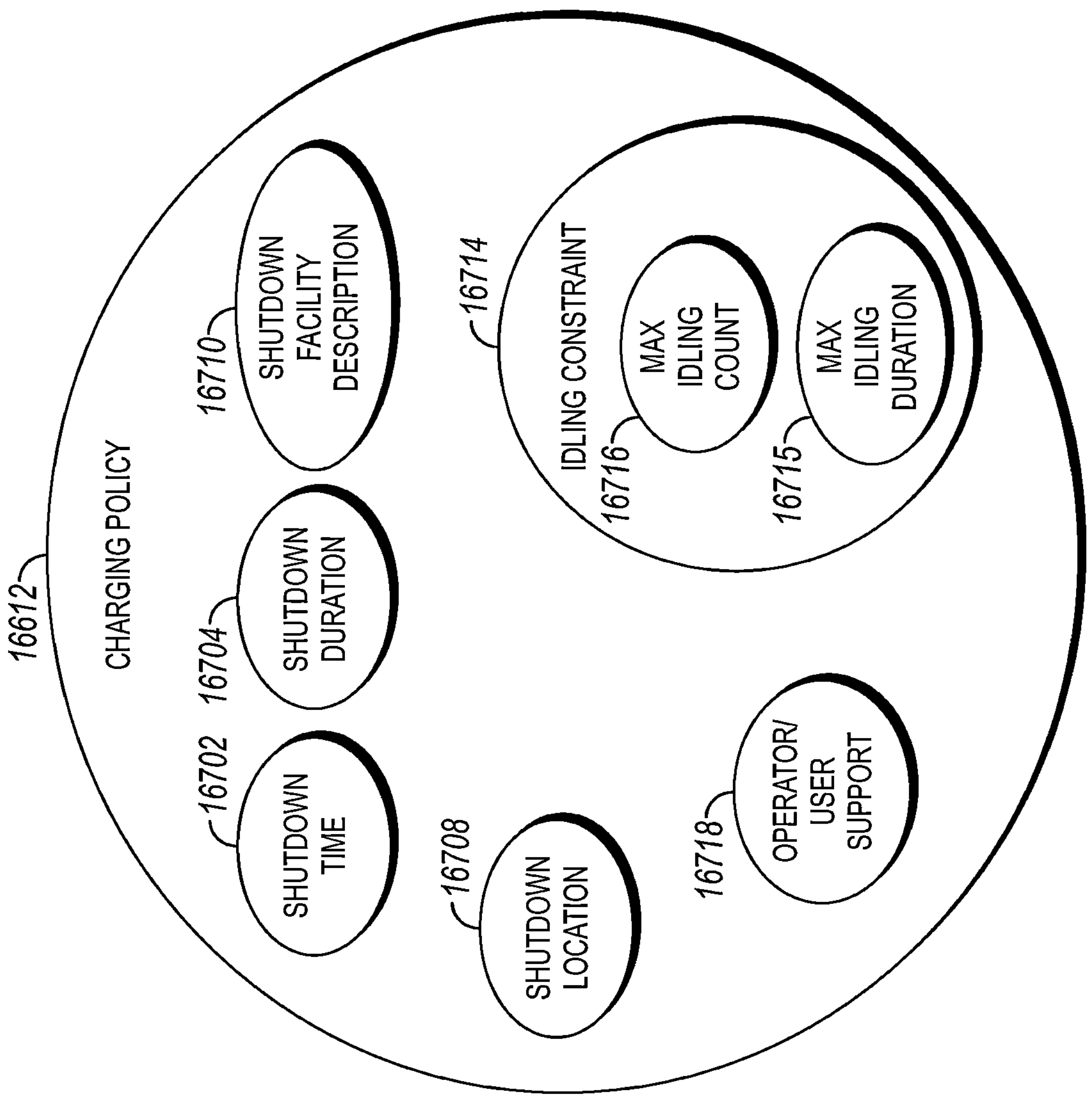

FIG. 167 depicts future engine shutdown conditions.

Figure 168:
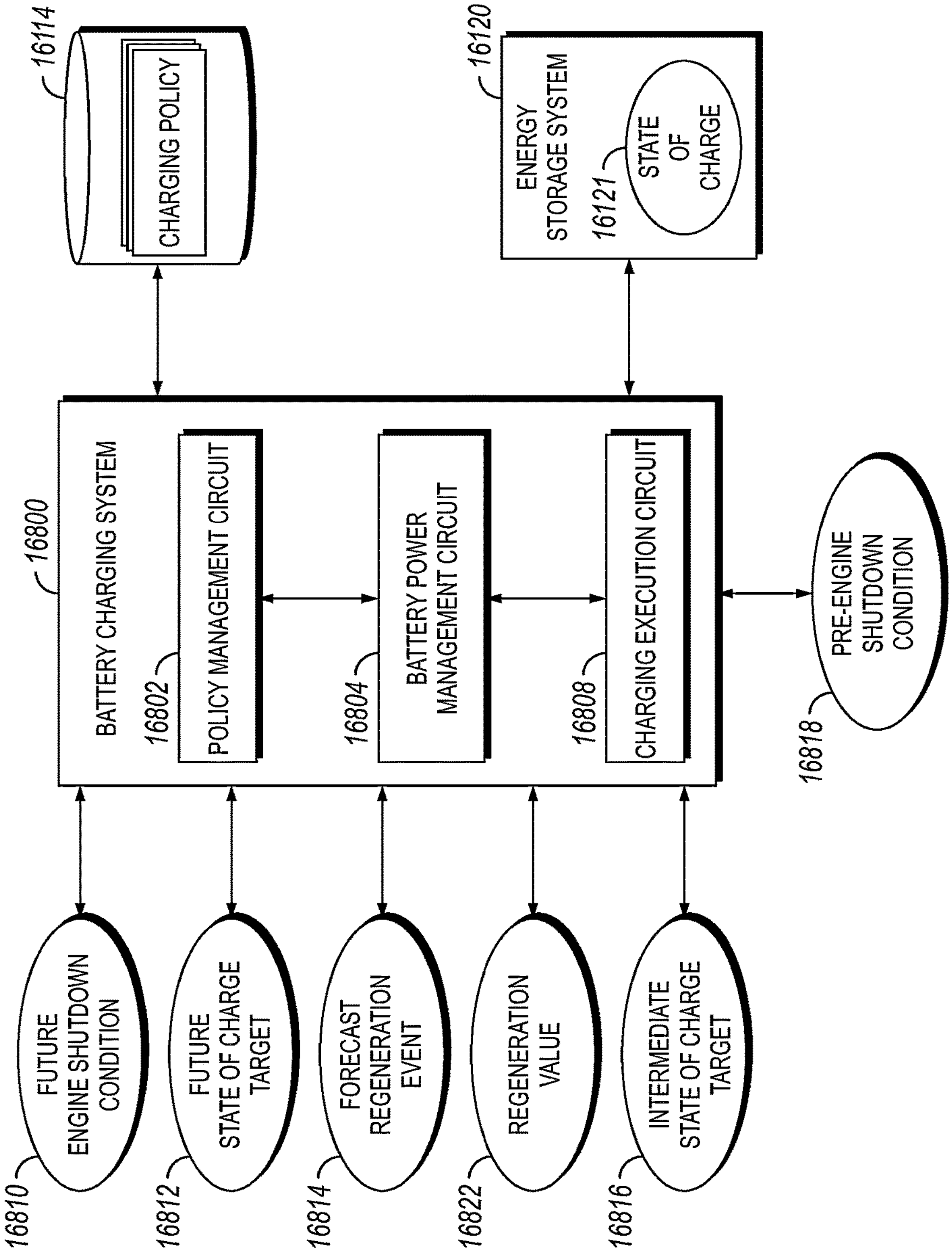

FIG. 168 depicts a vehicle charging system.

Figure 169:
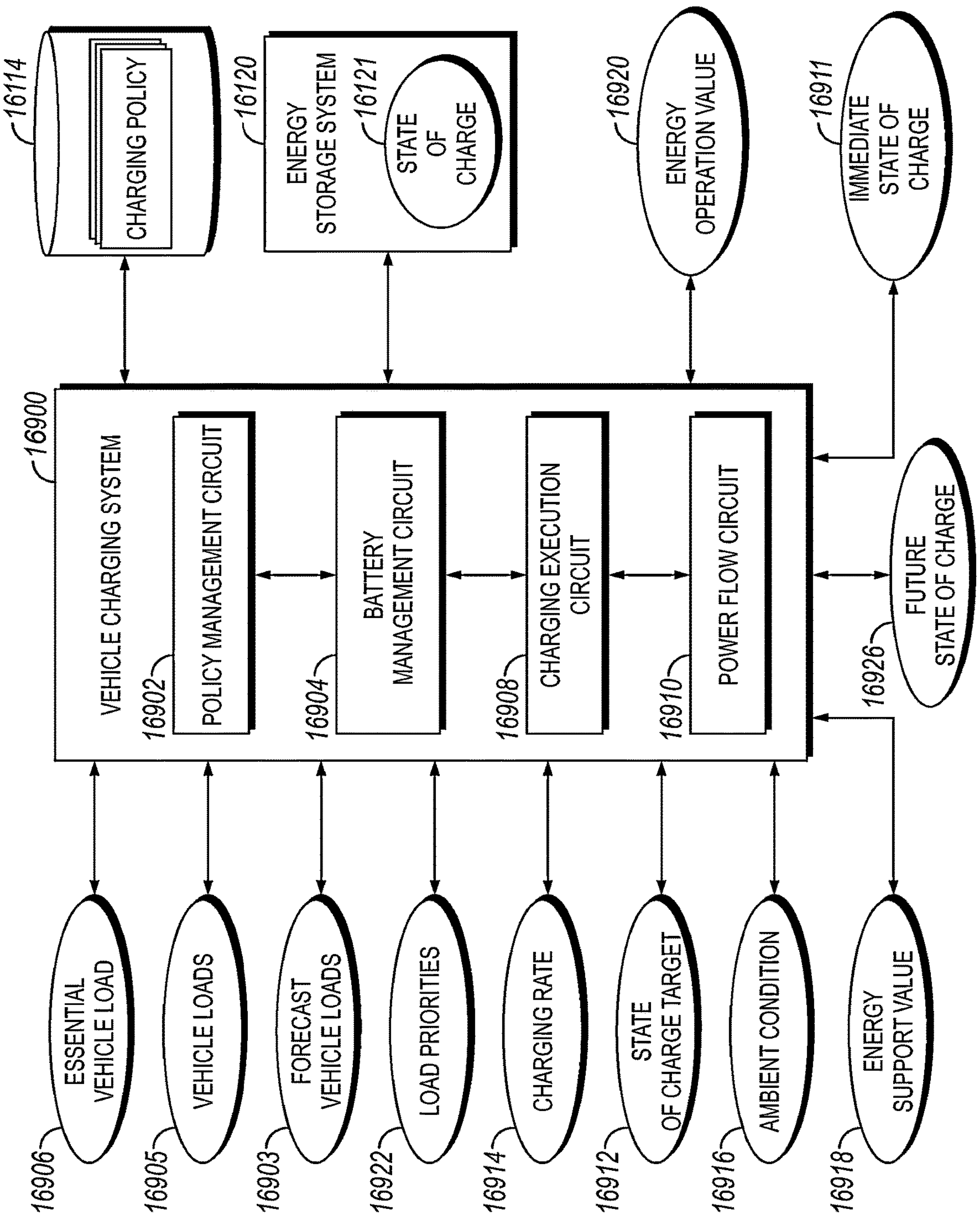

FIG. 169 depicts a vehicle charging system.

Figure 170:
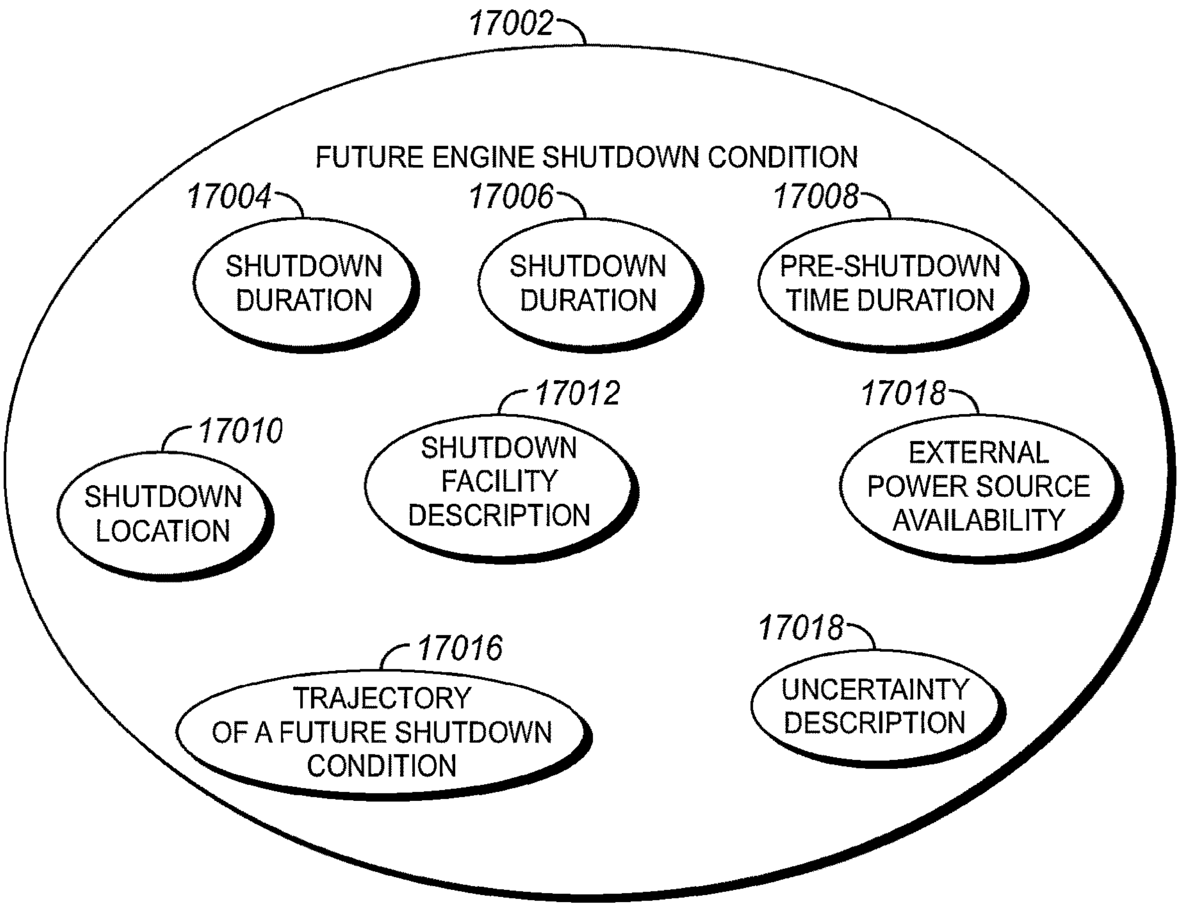

FIG. 170 depicts future engine shutdown conditions.

Figure 171:
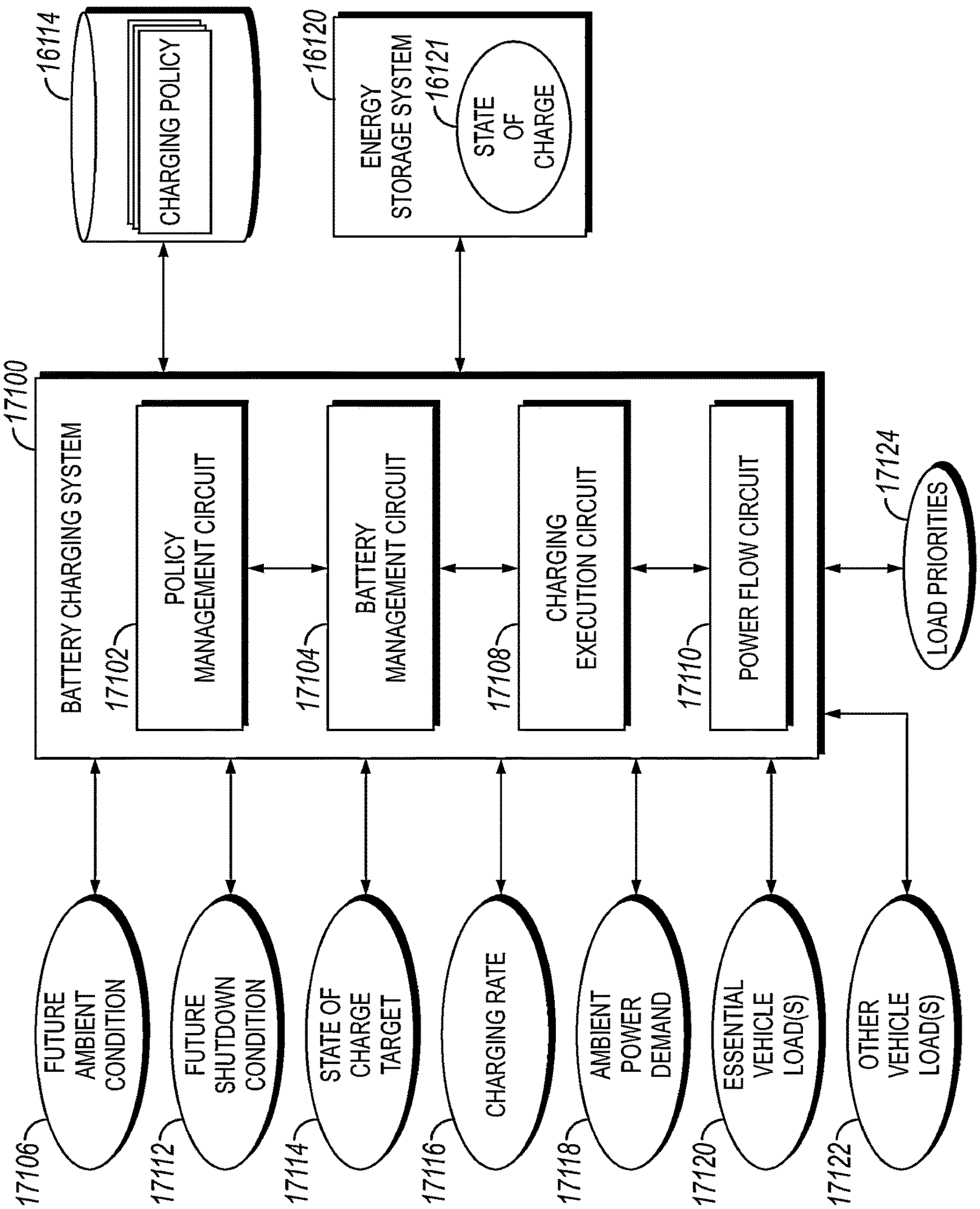

FIG. 171 depicts a vehicle charging system.

Figure 172:
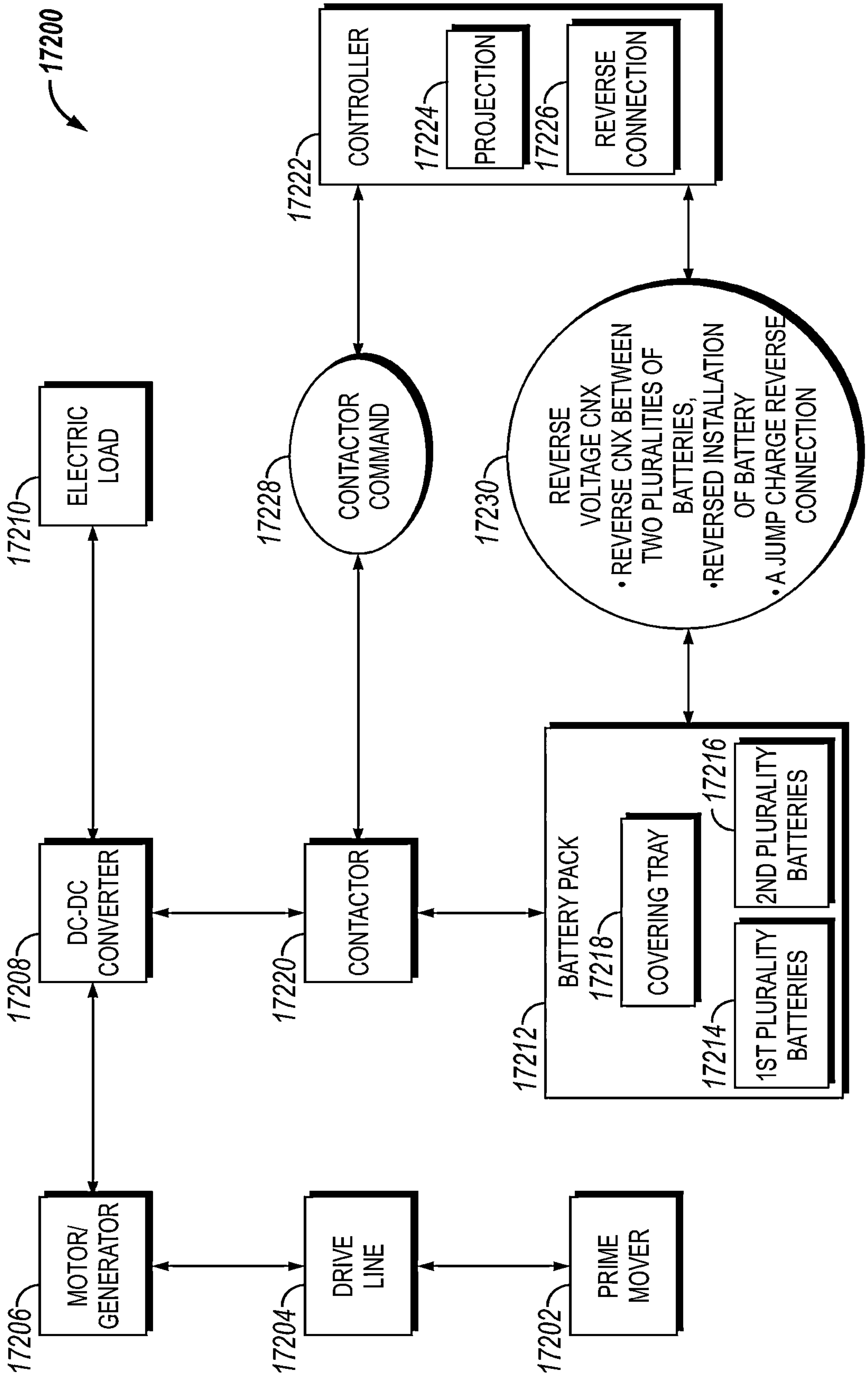

FIG. 172 depicts a vehicle with reverse battery protection.

Figure 173:
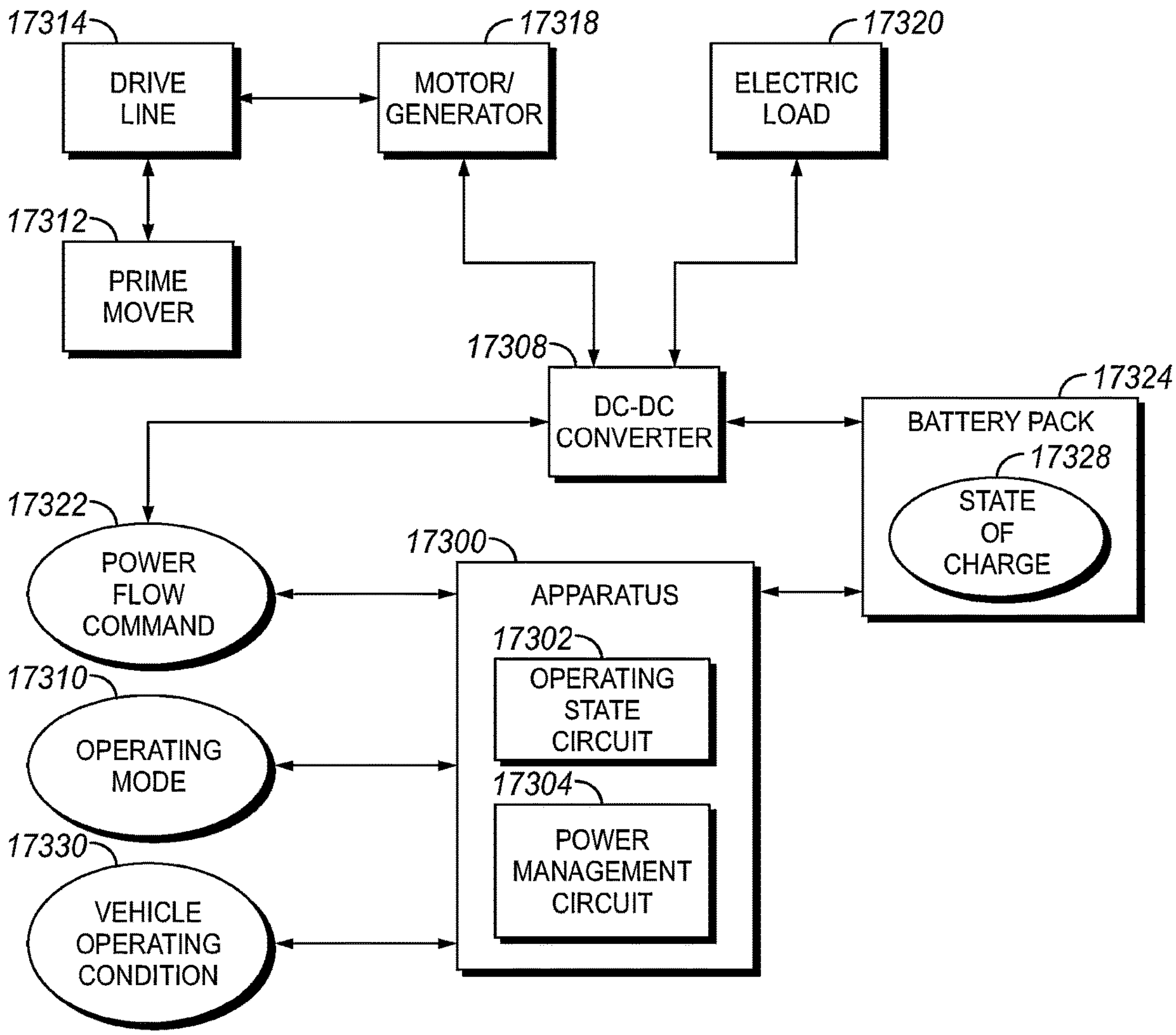

FIG. 173 depicts an apparatus for power management based on operating mode.

Figure 174:
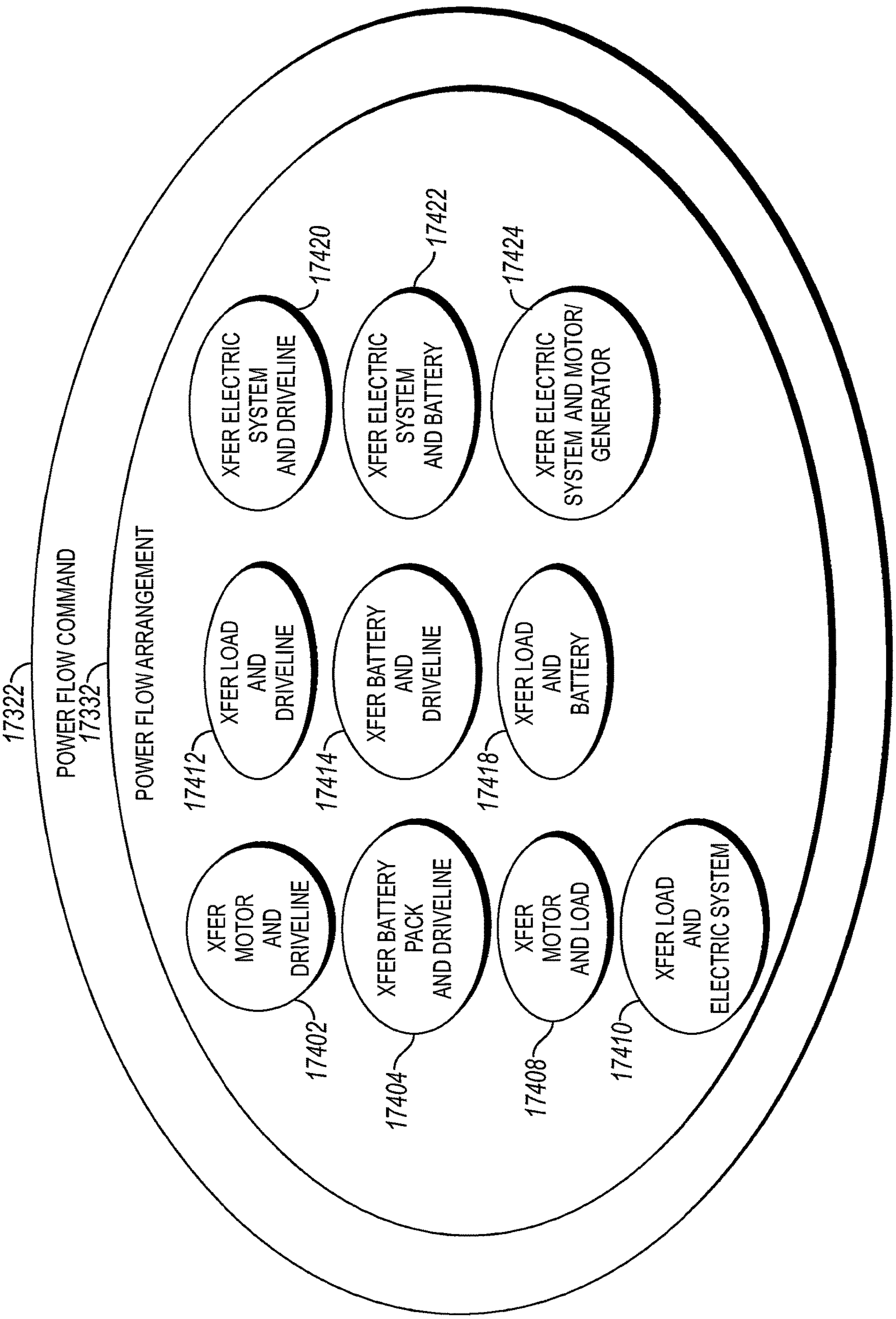

FIG. 174 depicts power flow arrangements.

Figure 175:
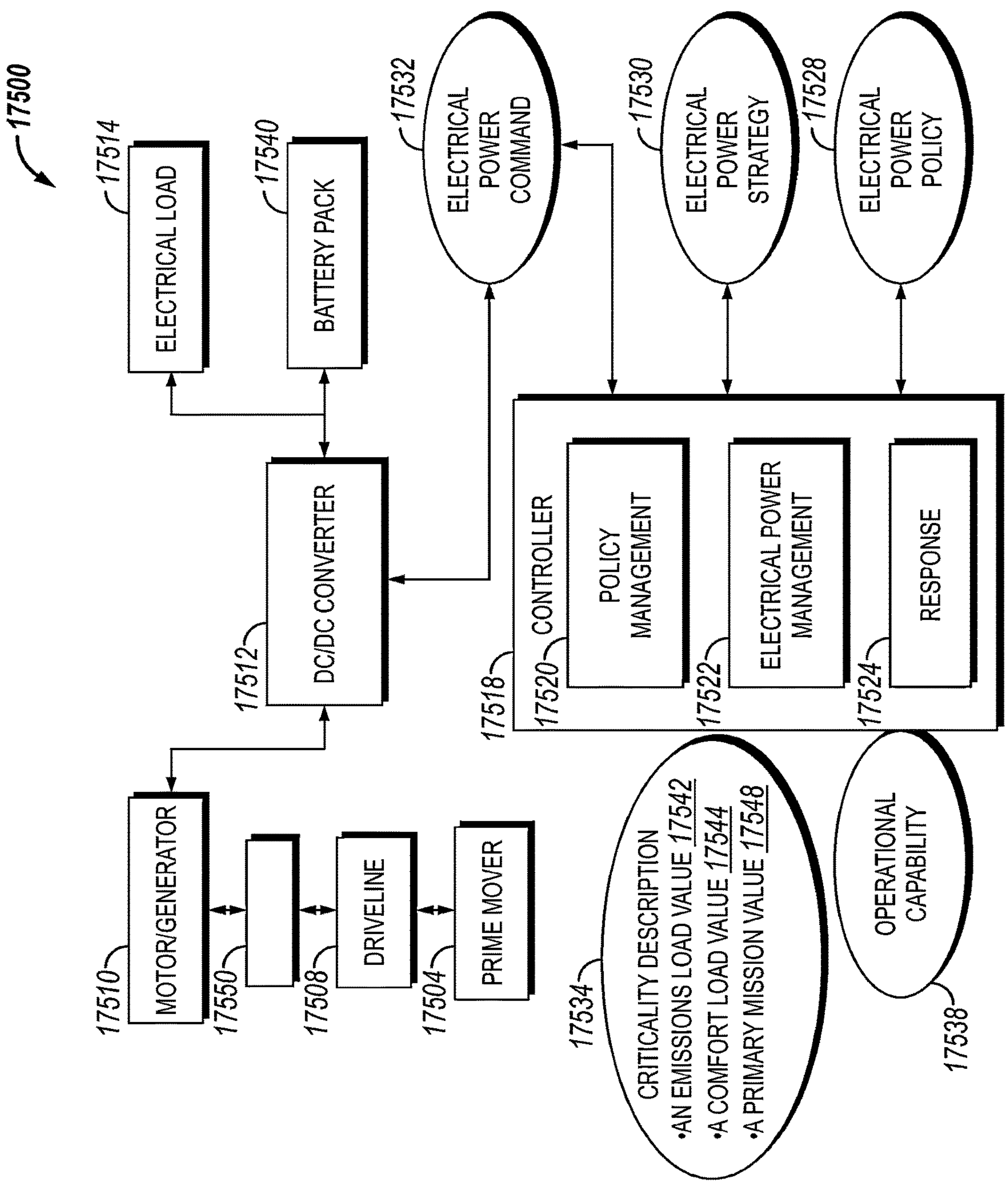

FIG. 175 depicts a vehicle transportation system.

Figure 176:
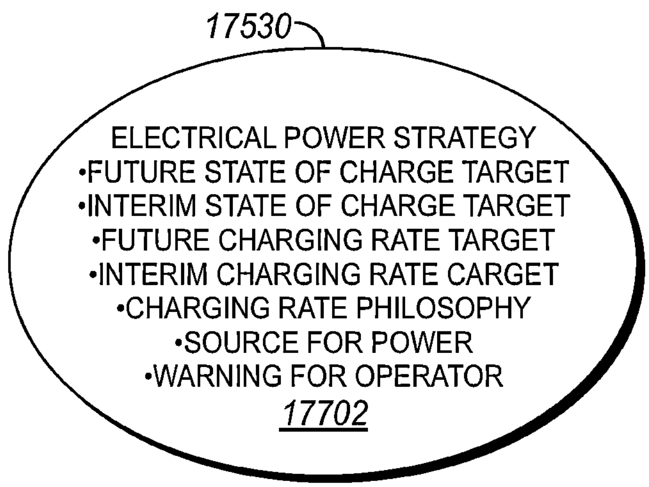

FIG. 176 depicts electrical power strategies.

Figure 177:
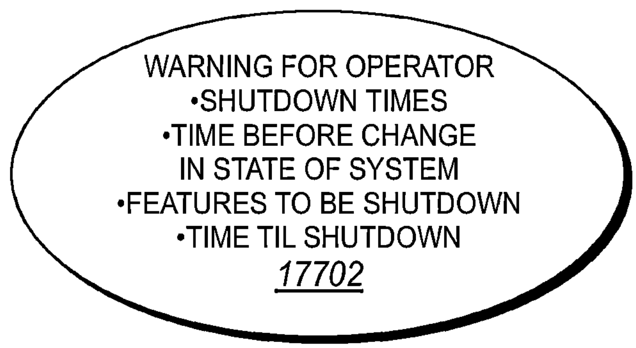

FIG. 177 depicts user warnings.

Figure 178:
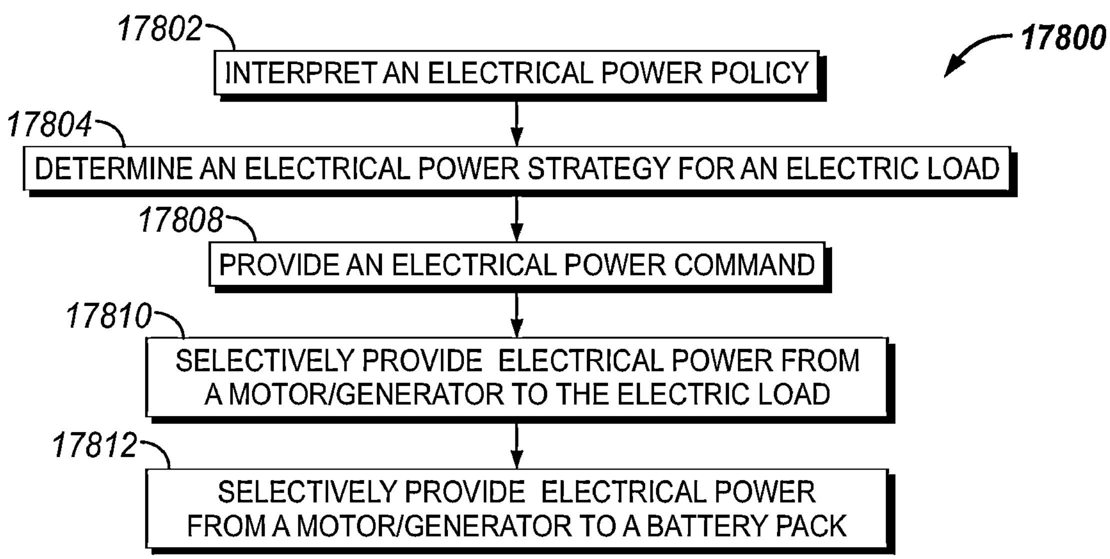

FIG. 178 depicts a workflow for power management.

Figure 179:
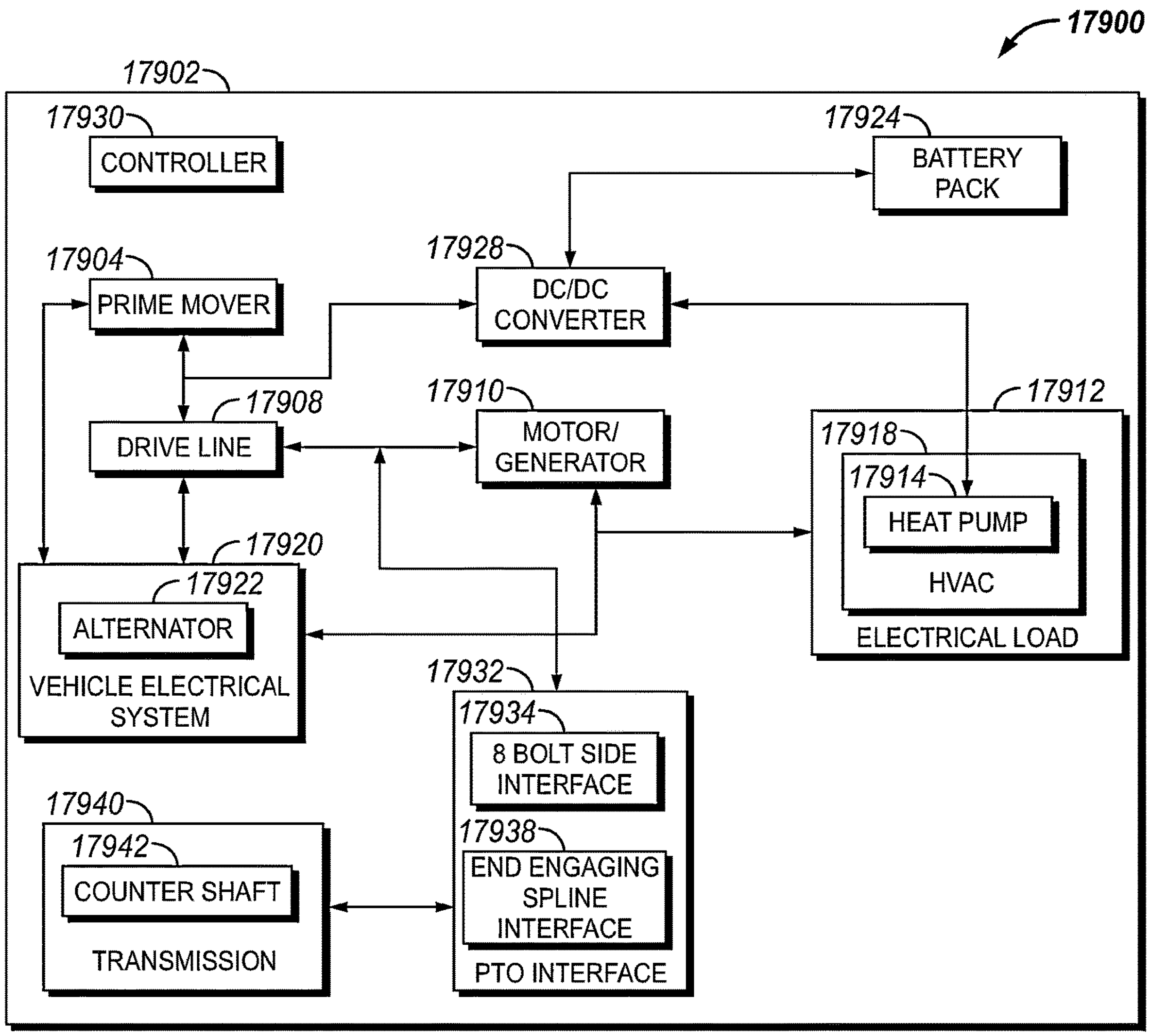

FIG. 179 depicts a system for a heat pump for an HVAC.

Figure 180:
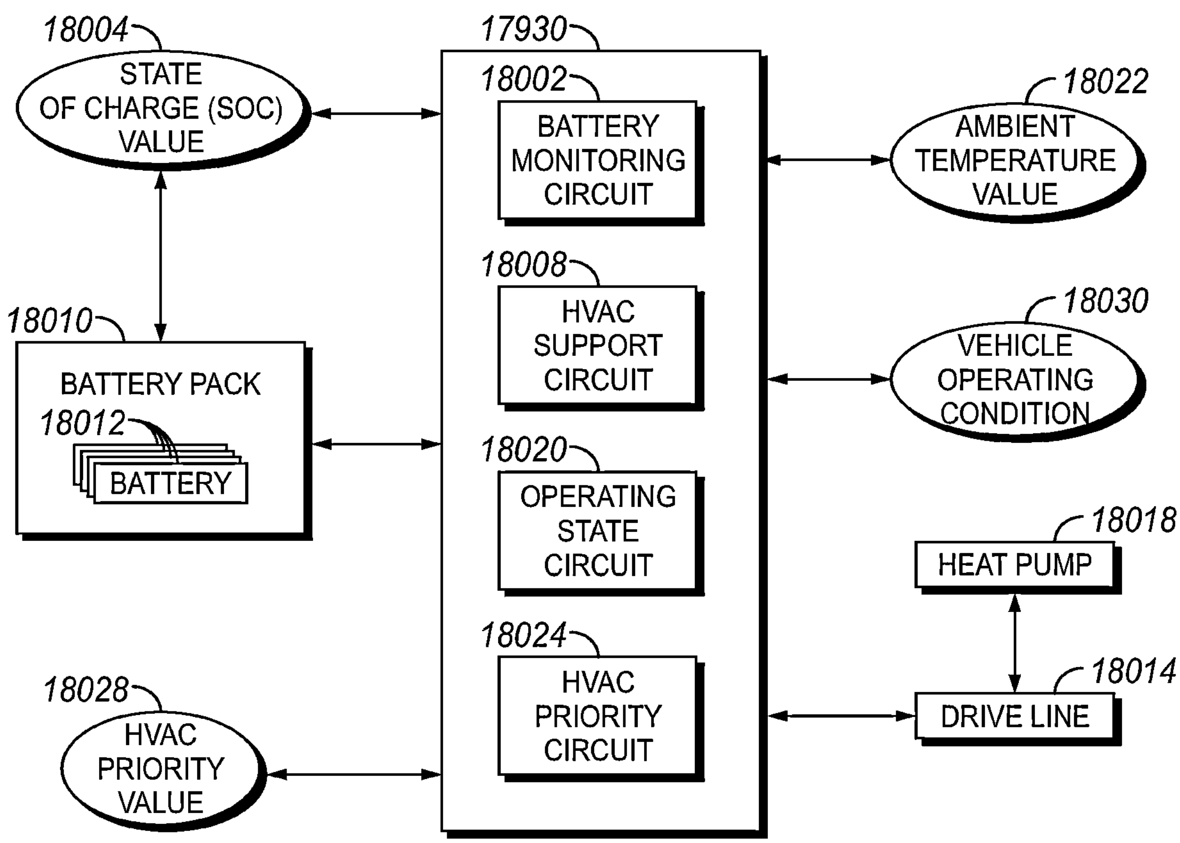

FIG. 180 depicts a controller for controlling the system depicted in FIG. 179.

FIG. 181A, FIG. 181B, FIG. 181C, FIG. 181D, FIG. 181E, and FIG. 181F depict a flow diagram of basic operational steps of the circuits depicted in FIG. 180.

Figure 182A:
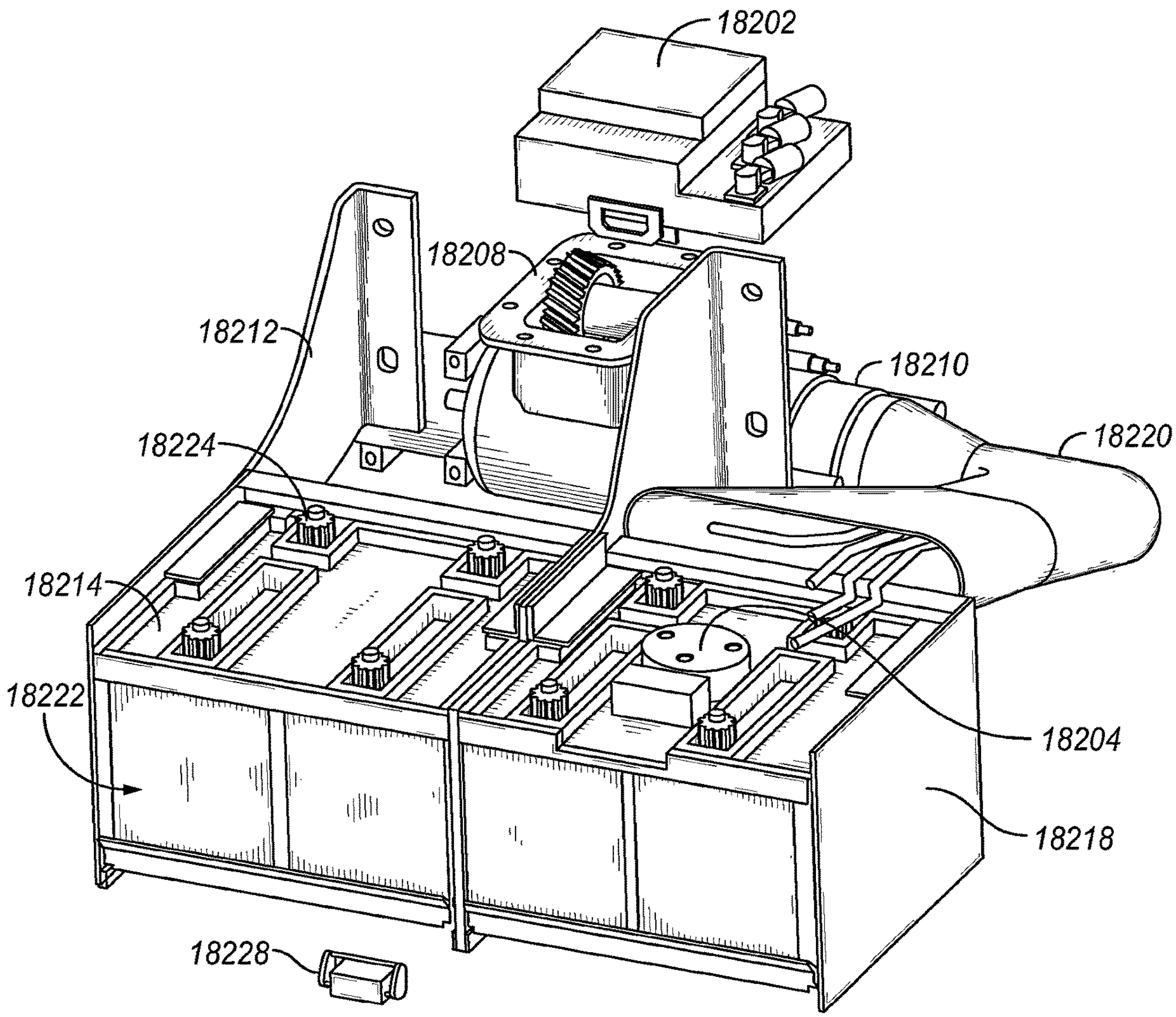

FIG. 182A is a schematic depiction of a battery assembly embodiment.

Figure 182B:
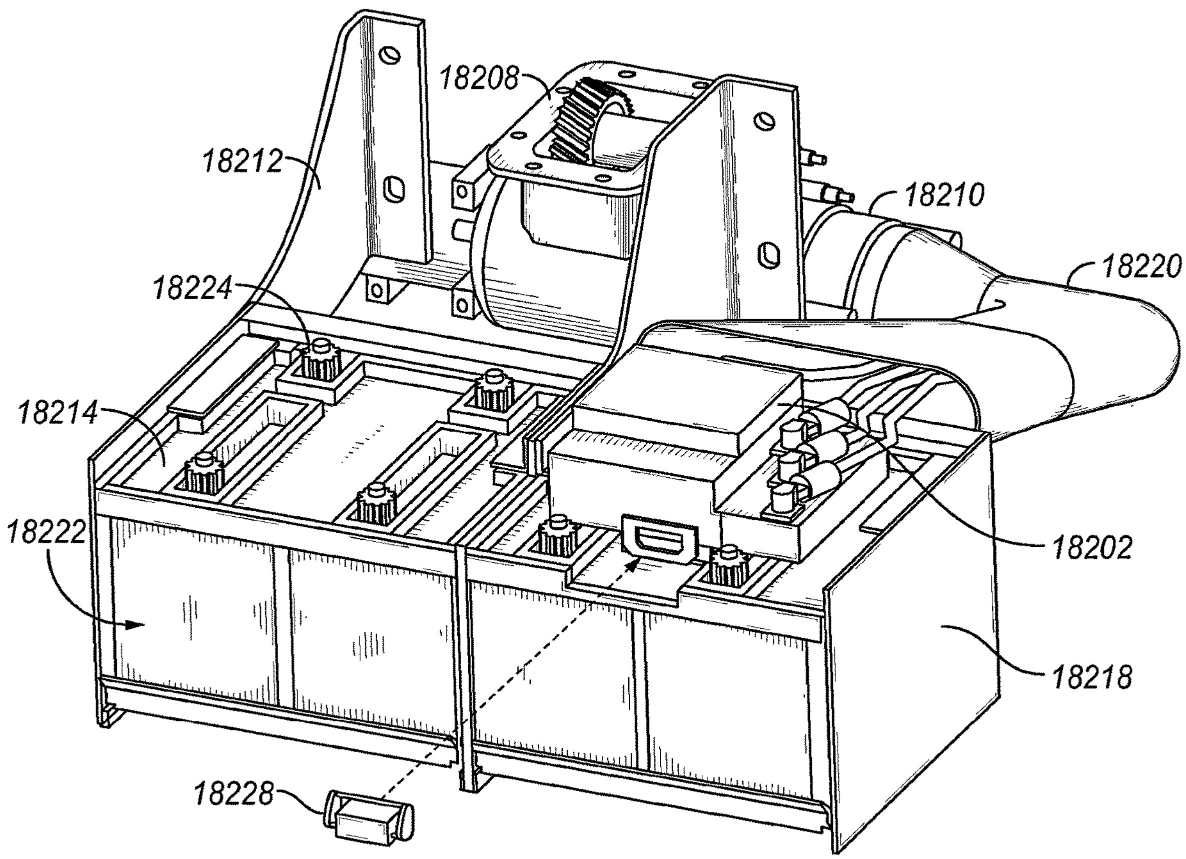

FIG. 182B is a schematic depiction of a battery assembly embodiment.

Figure 183:
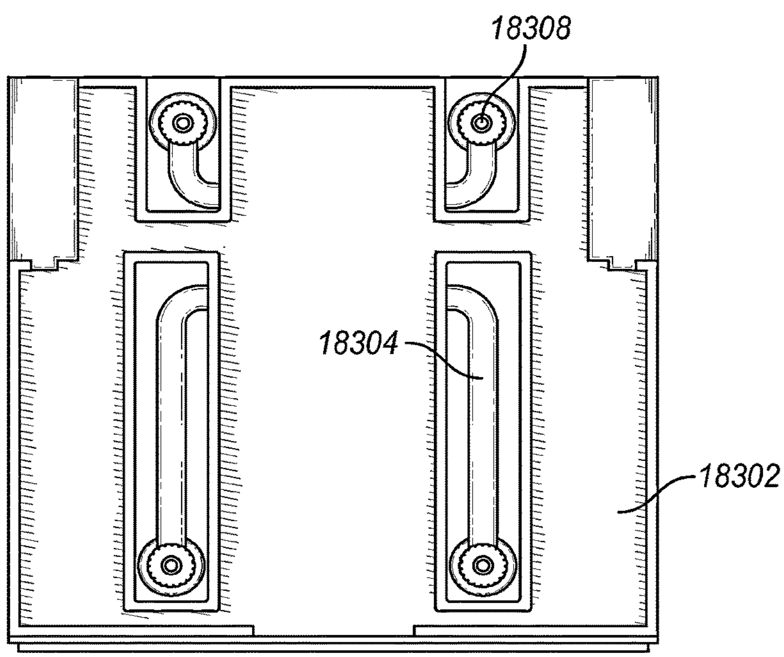

FIG. 183 is a schematic depiction of a battery cover of a battery assembly embodiment.

Figure 184:
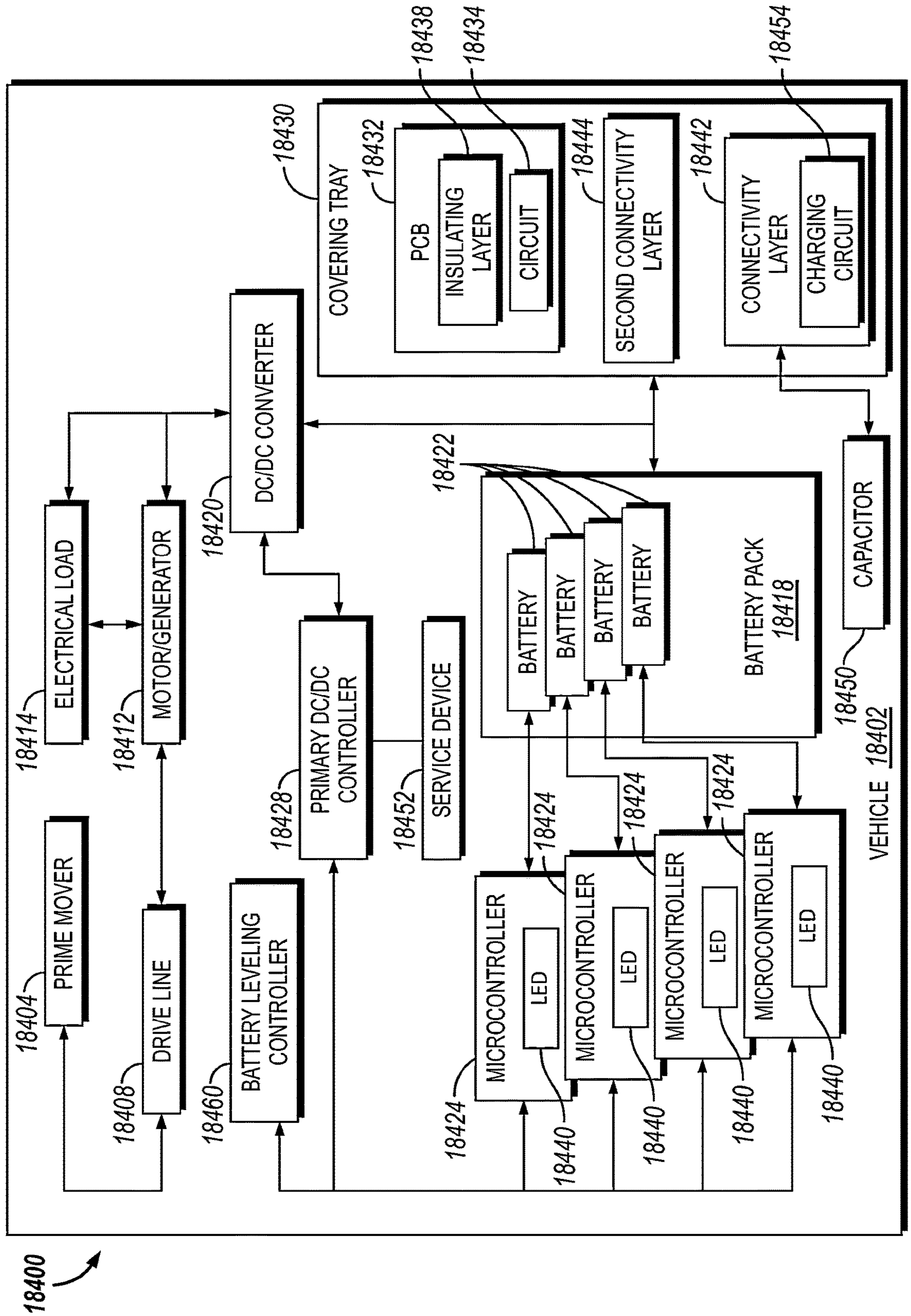

FIG. 184 depicts a DC/DC controller architecture.

Figure 185:
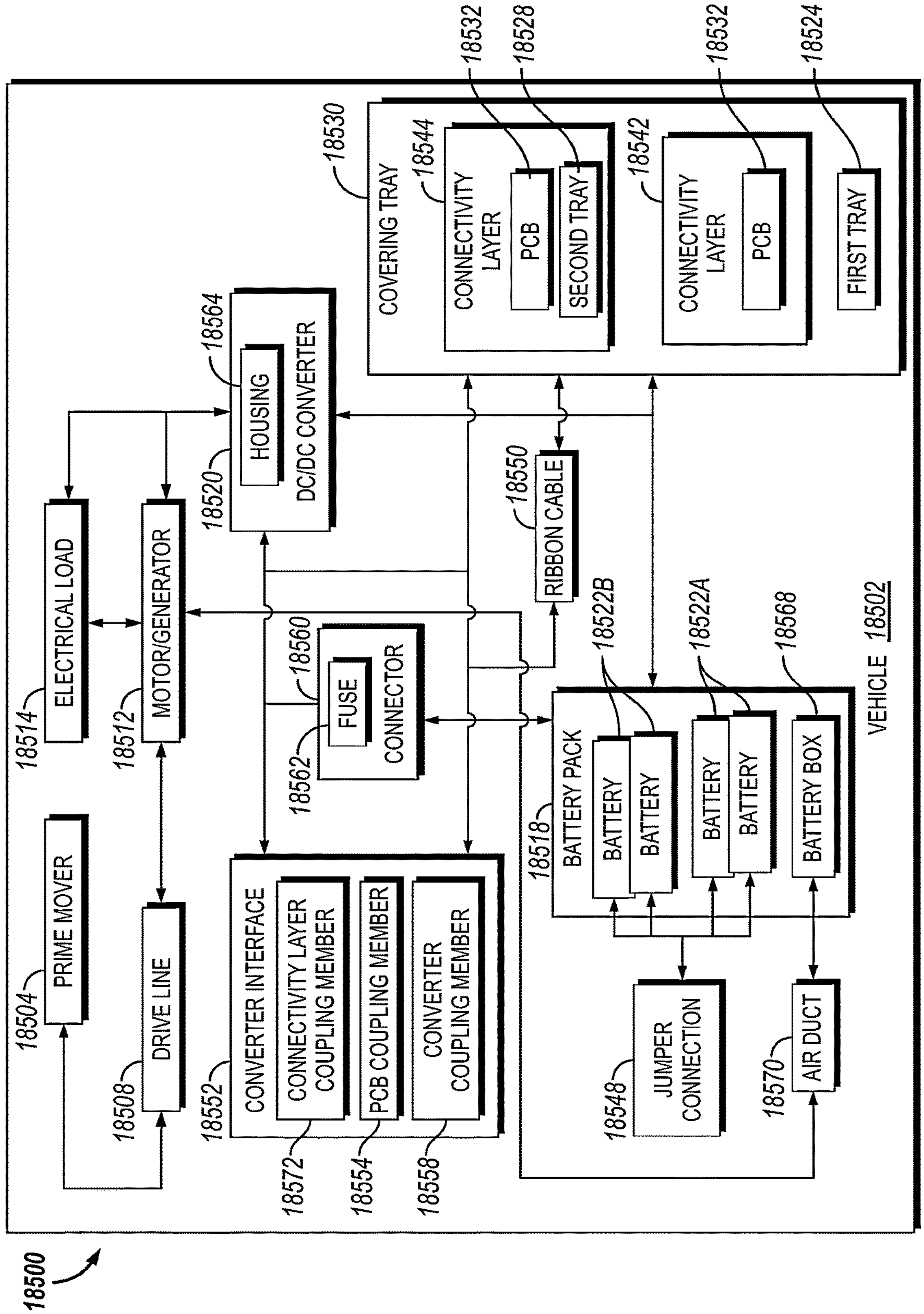

FIG. 185 depicts a schematic depiction of a battery assembly embodiment.

Figure 186:
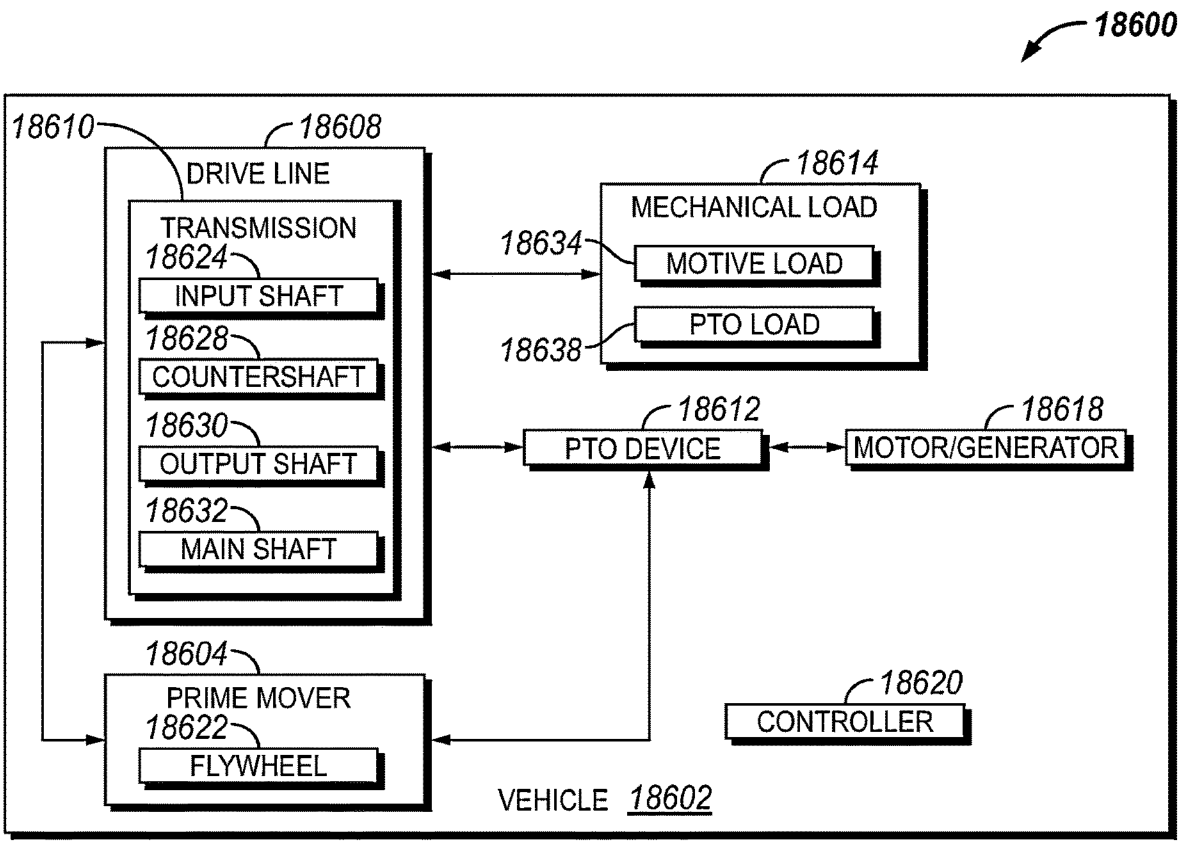

FIG. 186 depicts an example system for providing shift assistance operations using a PTO device.

Figure 187:
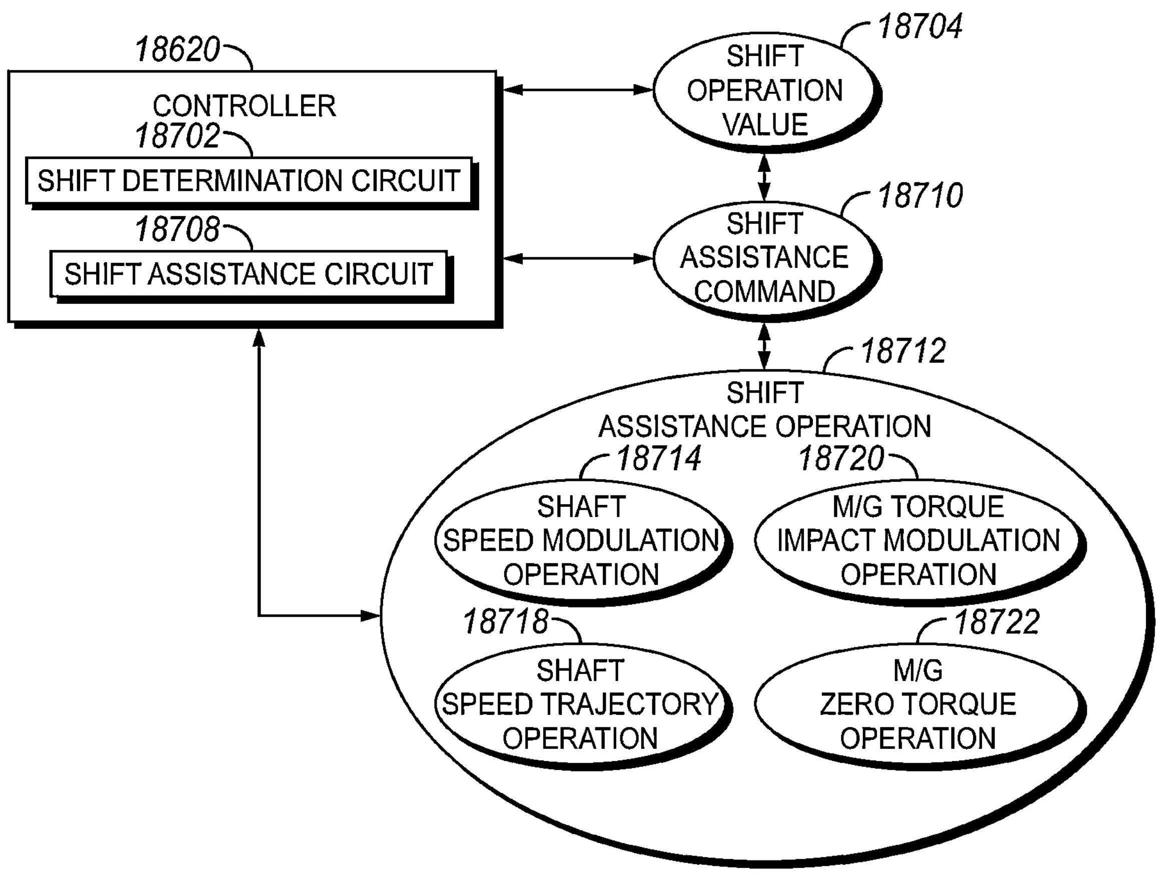

FIG. 187 depicts a controller configured to functionally execute shift assistance operations.

Figure 188:
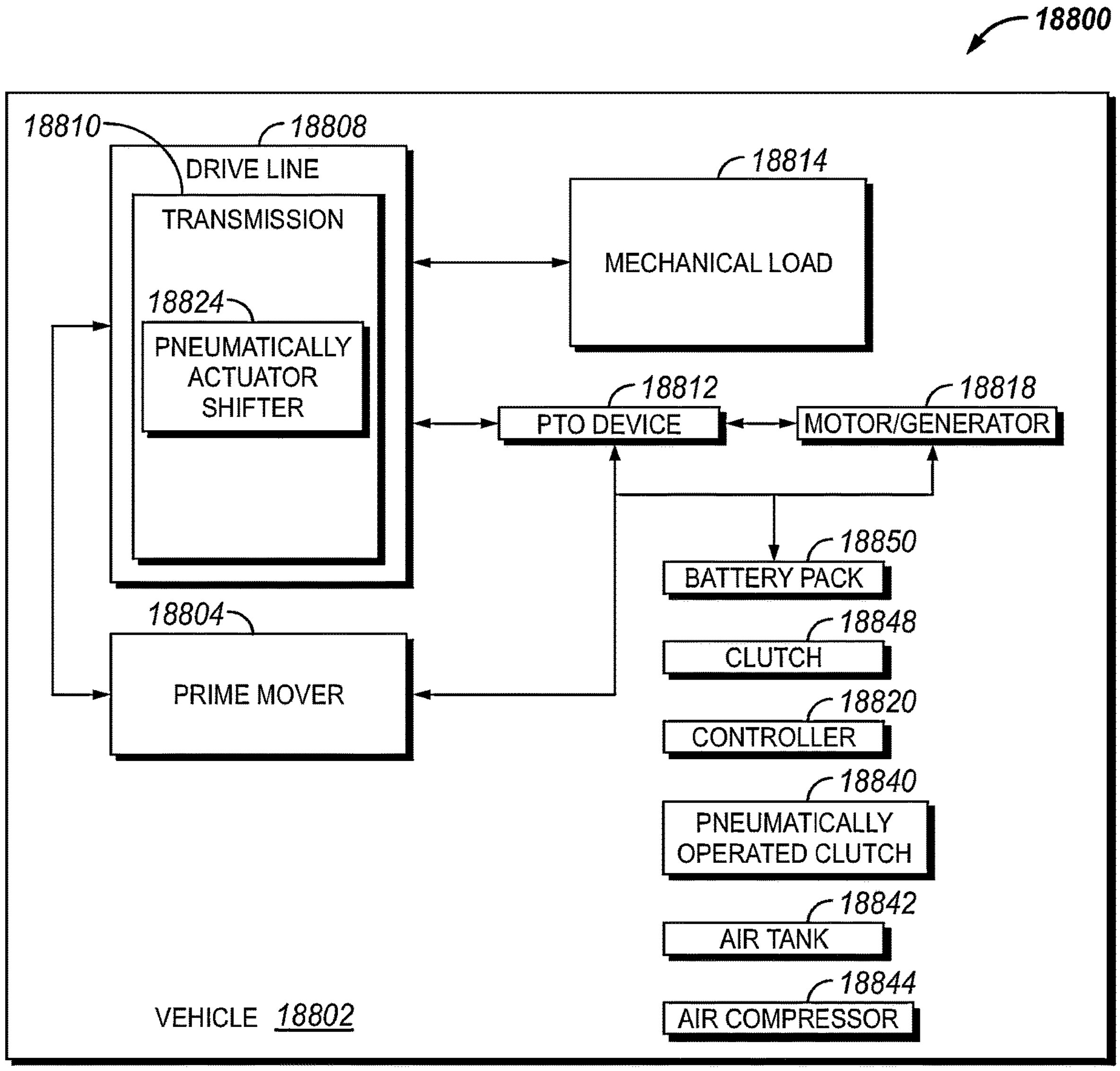

FIG. 188 depicts an example system featuring start-up and shutdown sequencing.

Figure 189:
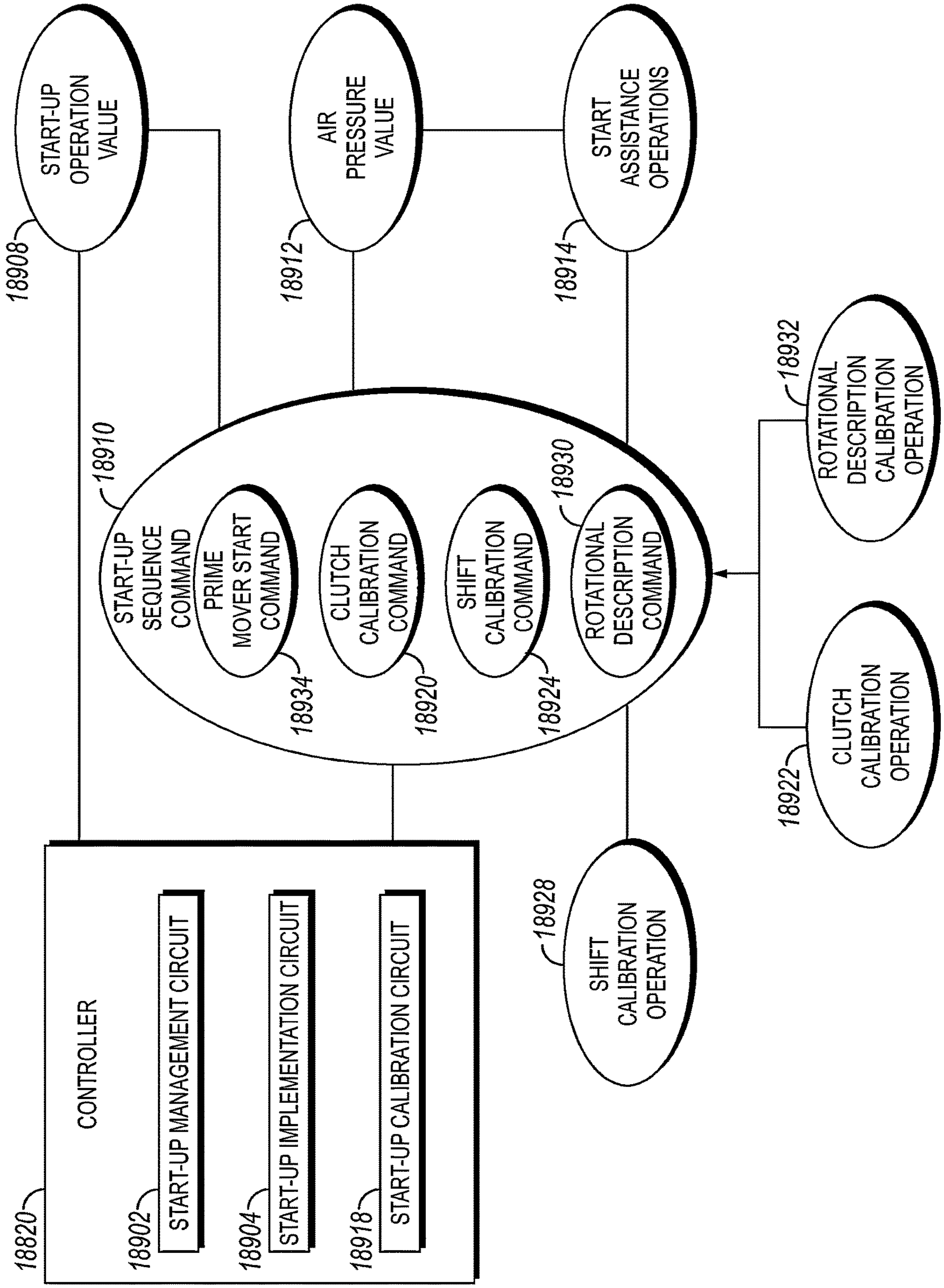

FIG. 189 depicts a controller configured to functionally execute start-up sequencing.

Figure 190:
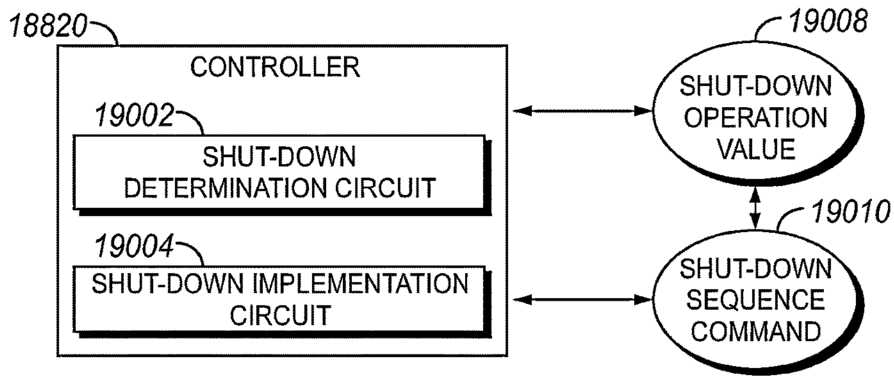

FIG. 190 depicts a controller configured to functionally execute shut down sequencing.

Figure 191:
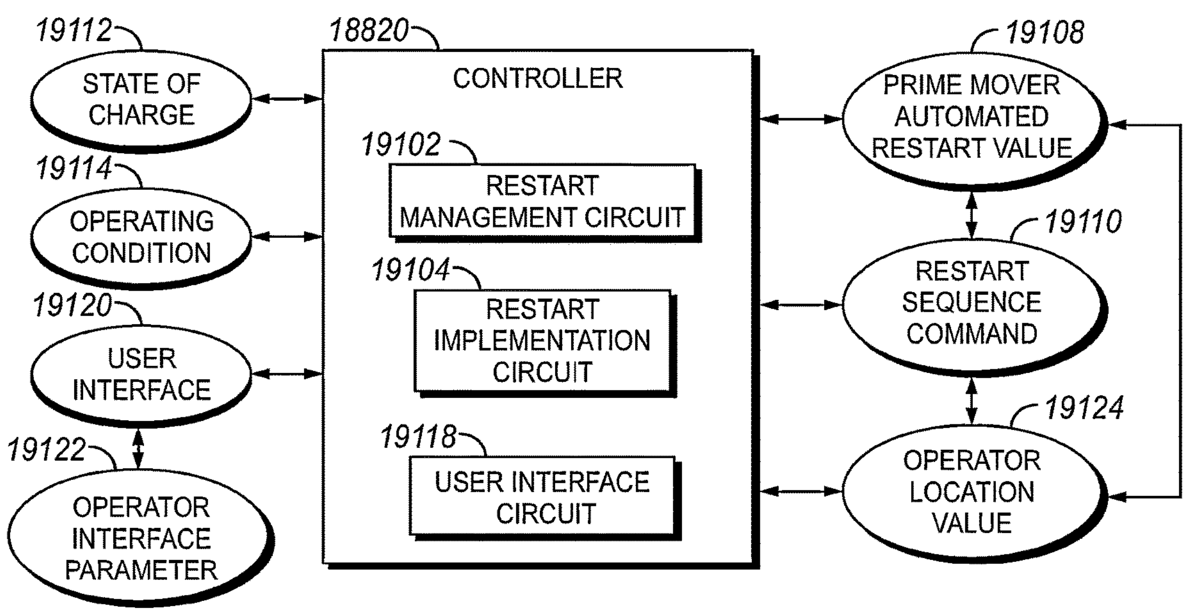

FIG. 191 depicts an example controller configured to perform prime mover restart operations.

Figure 192:
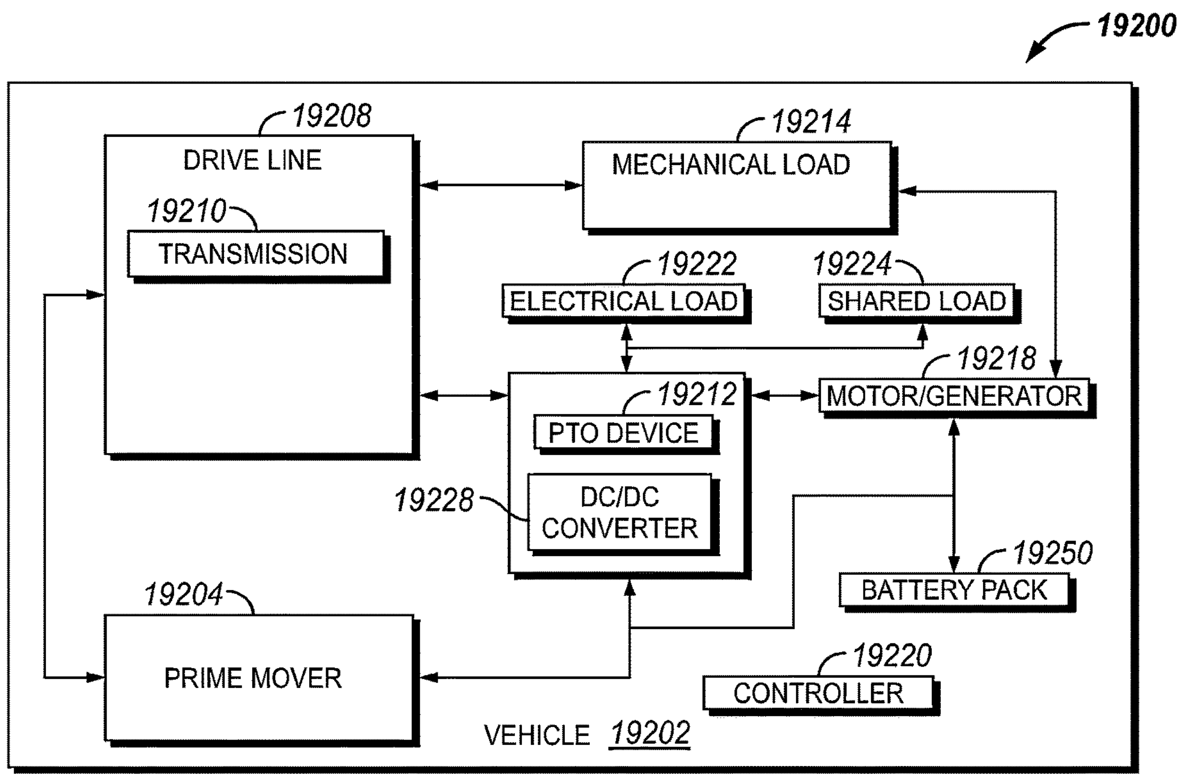

FIG. 192 depicts an example system for controlling operations of a PTO device.

Figure 193:
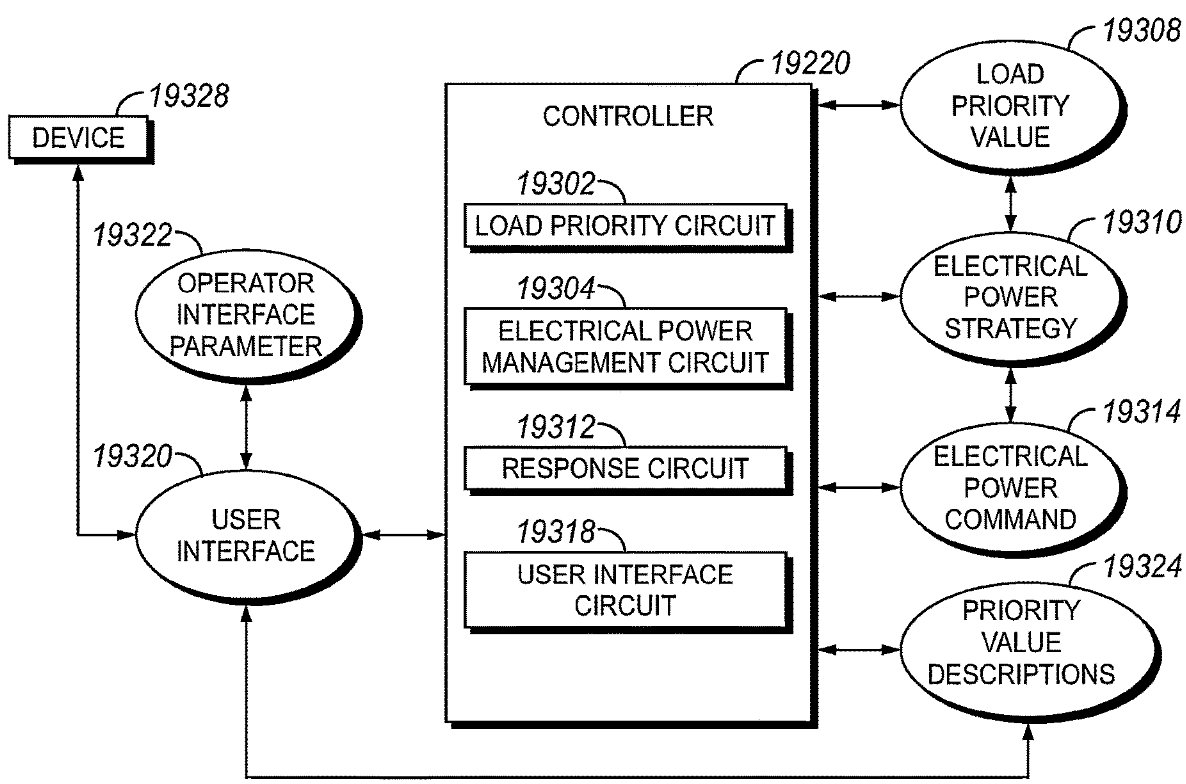

FIG. 193 depicts an example controller including a load priority circuit.

Figure 194:
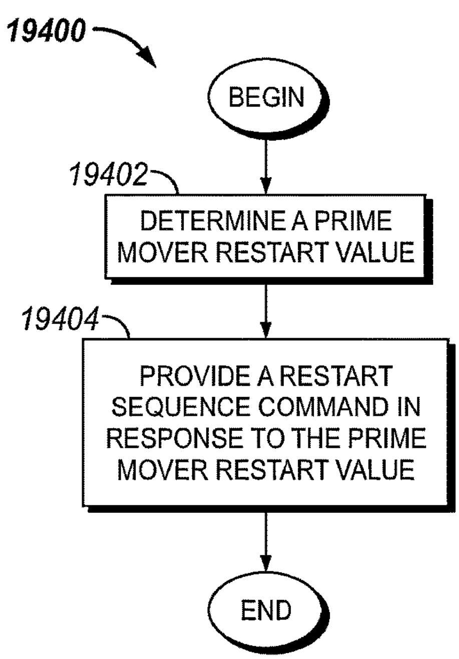

FIG. 194 depicts an example procedure to provide a restart sequence command.

Figure 195:
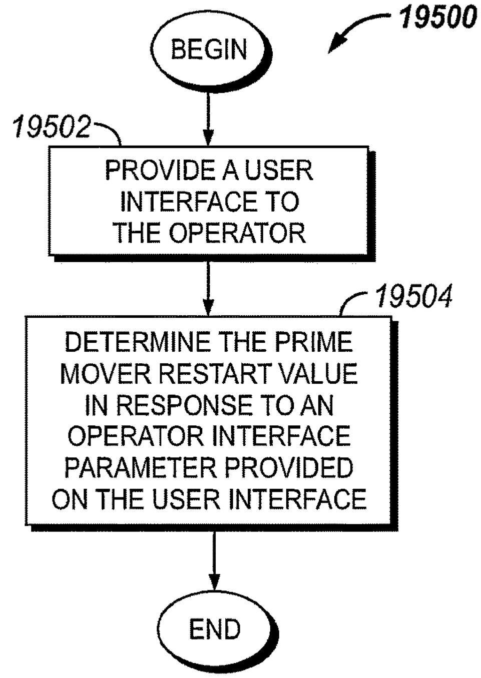

FIG. 195 depicts an example procedure to determine a prime mover restart value.

Figure 196:
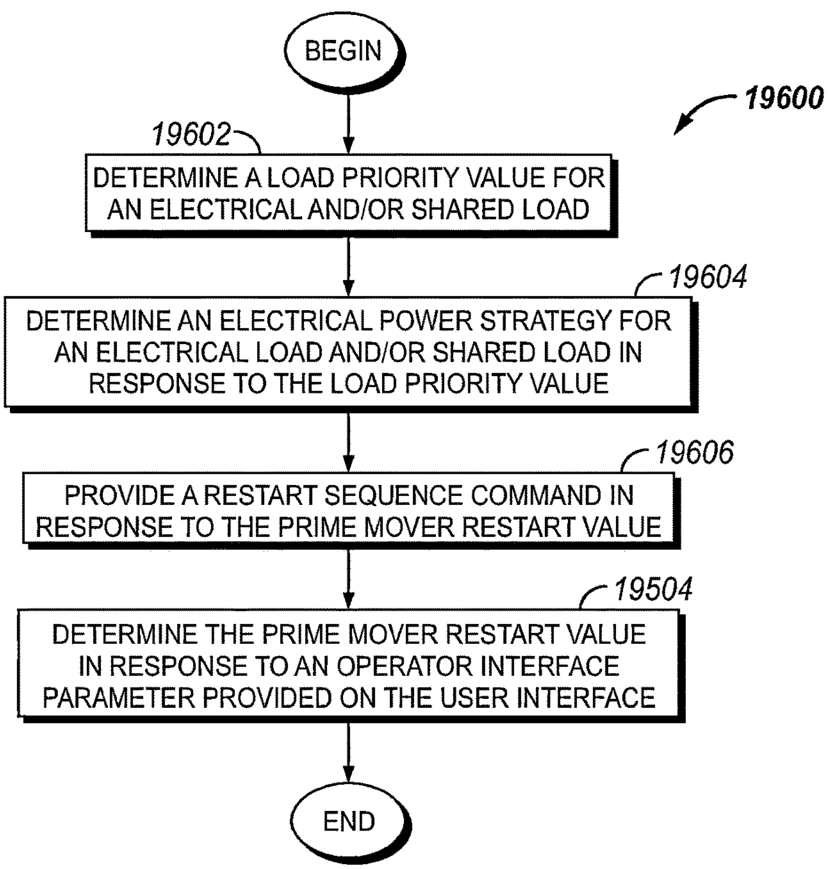

FIG. 196 depicts an example procedure to determine a prime mover restart value.

Figure 197:
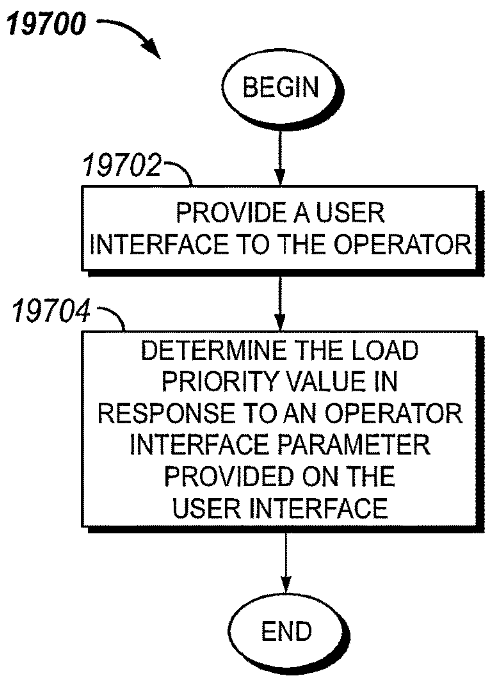

FIG. 197 depicts an example procedure to determine a load priority value in response to an operator interface parameter.

Figure 198:
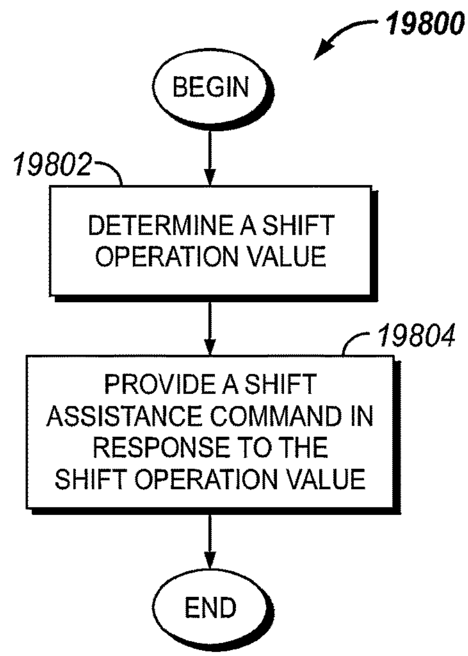

FIG. 198 depicts an example procedure to provide a shift assistance command in response to a shift operation value.

Figure 199:
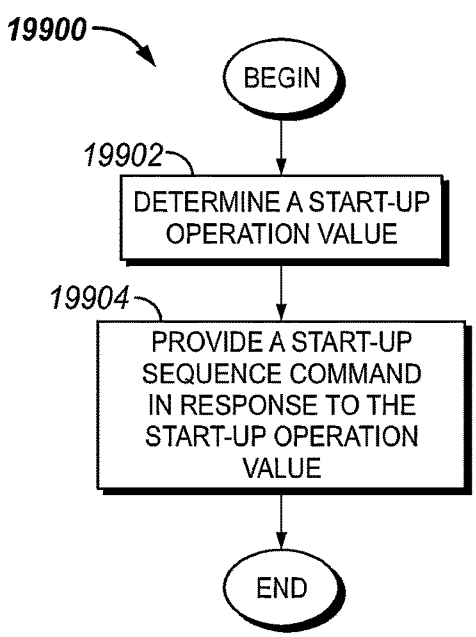

FIG. 199 depicts an example procedure to provide a start-up sequence command.

Figure 200:
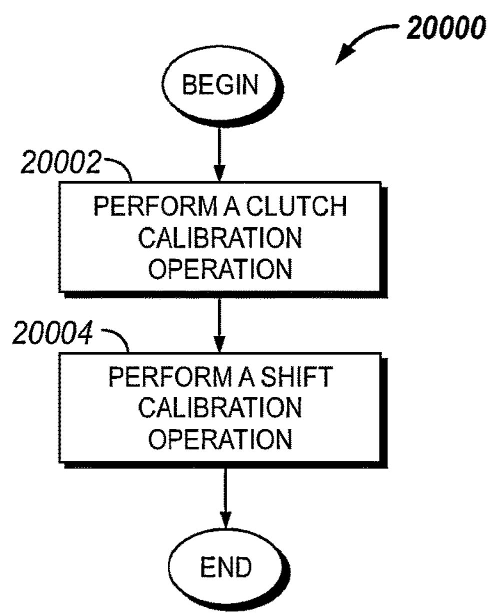

FIG. 200 depicts an example procedure to perform calibration operations.

Figure 201:
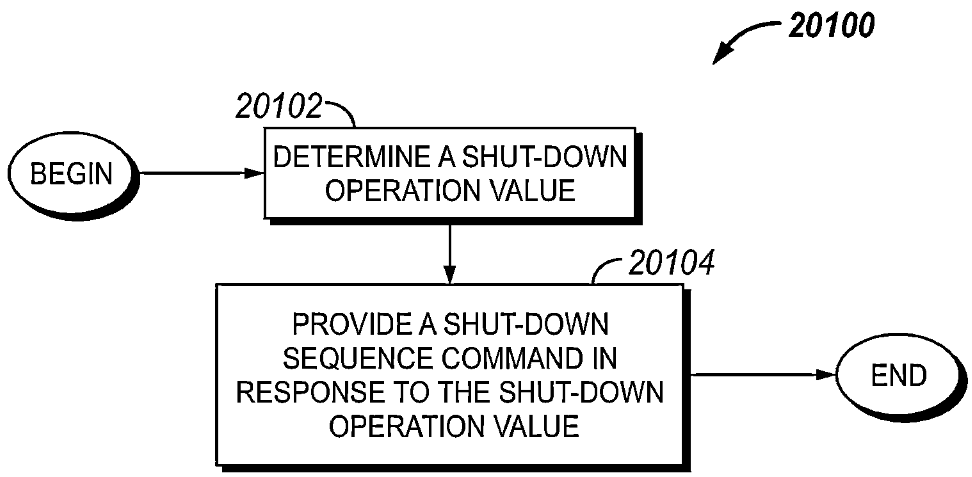

FIG. 201 depicts an example procedure to provide a shut-down sequence.

Figure 202:
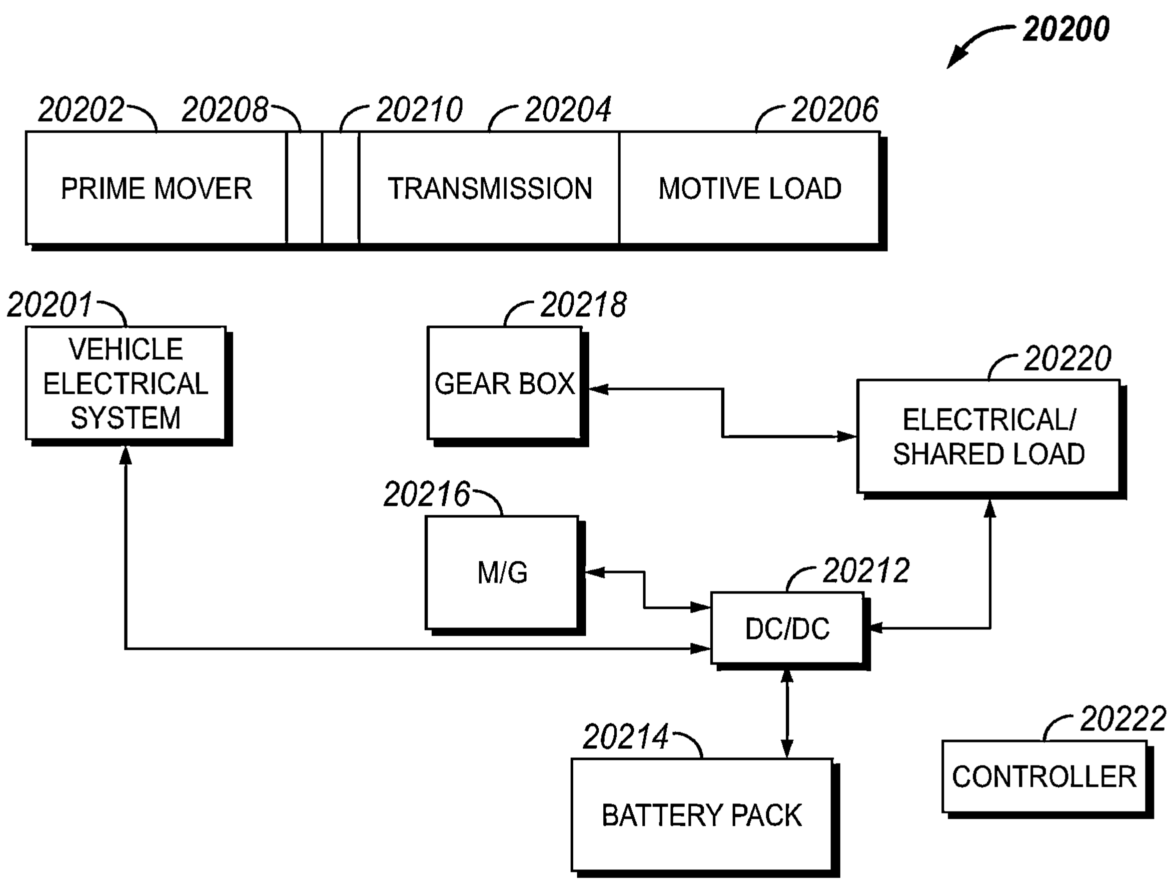
Figure 203:
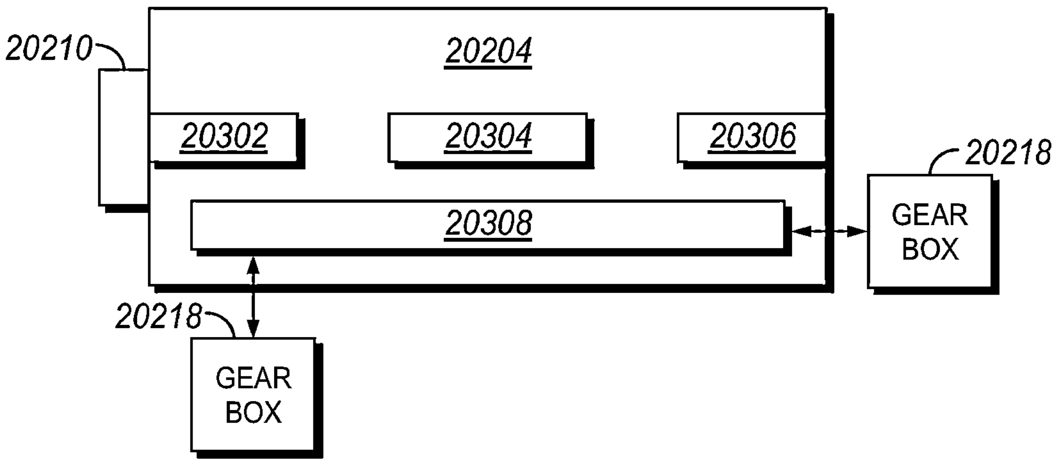

FIG. 202 depicts an example system for providing power to an electrical load of a mobile application FIG. 203 depicts an example transmission with example engagement positions for a gear box.

Figure 204:
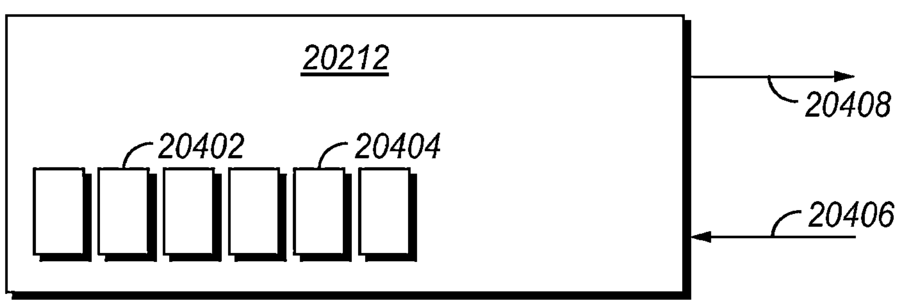

FIG. 204 depicts an example DC/DC converter.

Figure 205:
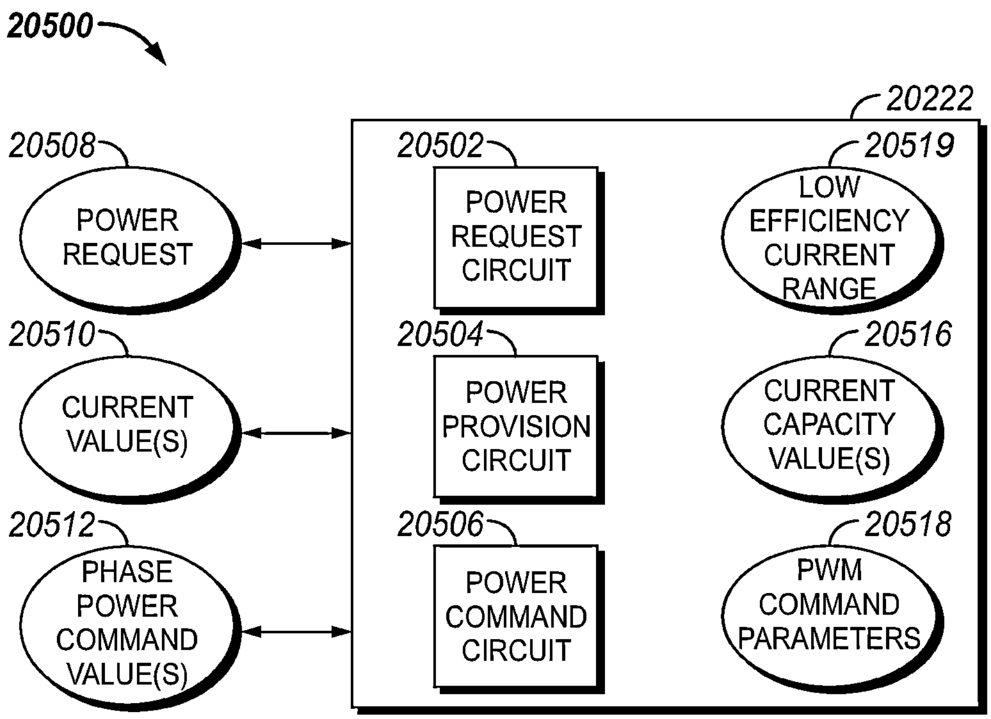

FIG. 205 depicts an example controller including a power request circuit, a power provision circuit, and a power command circuit.

Figure 206:
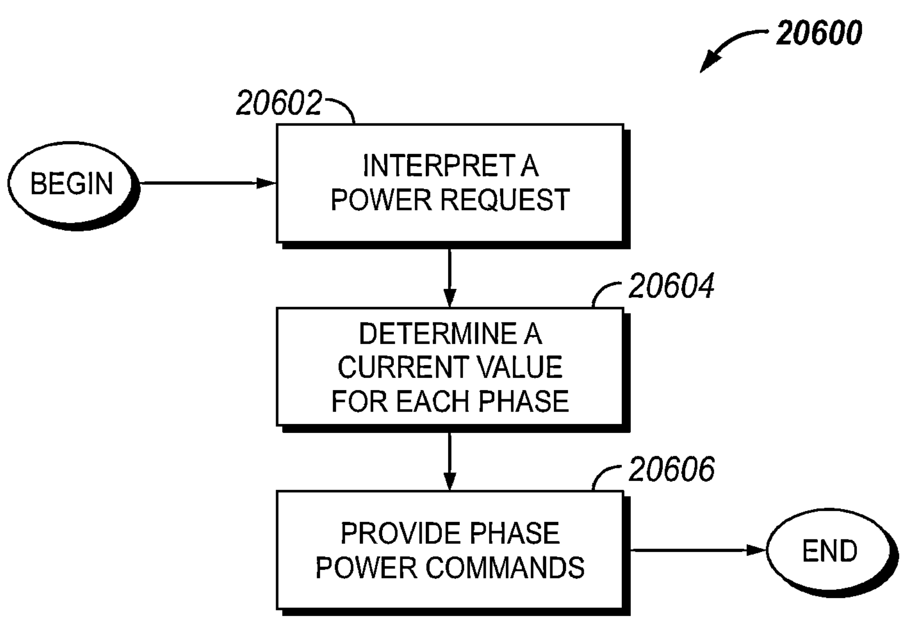

FIG. 206 depicts an example procedure for controller power supply phases of a DC/DC converter.

Figure 207:
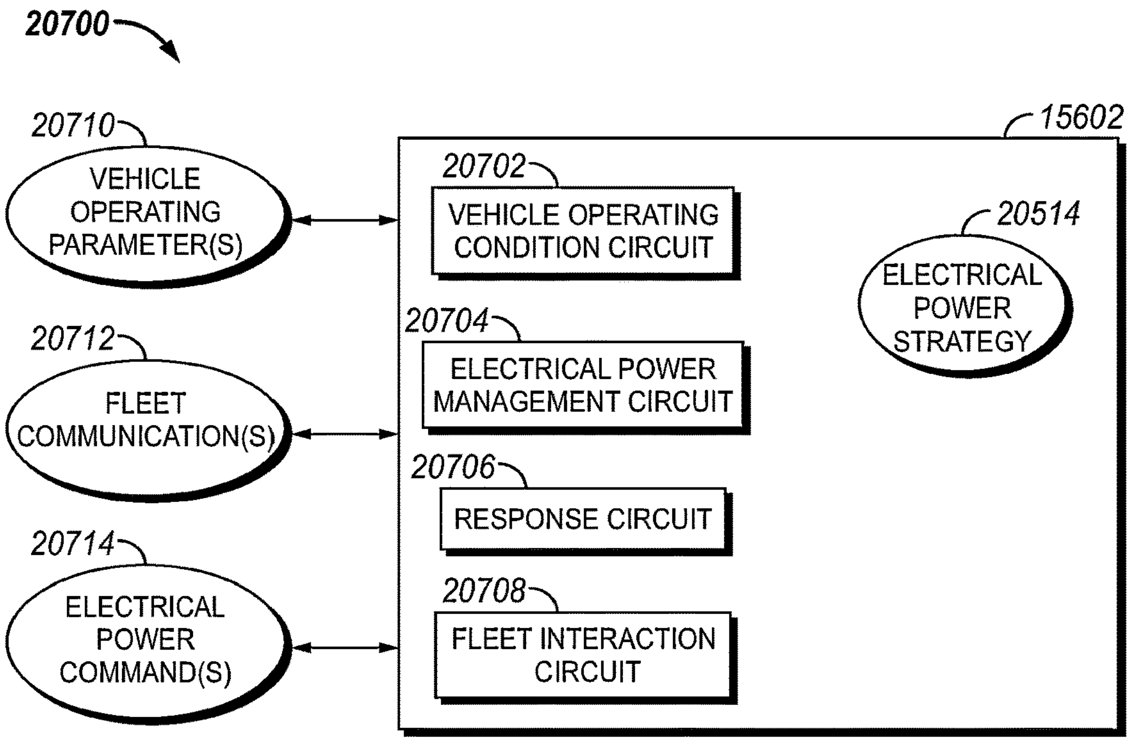

FIG. 207 depicts an example controller configured to perform fleet interaction operations for a vehicle.

Figure 208:
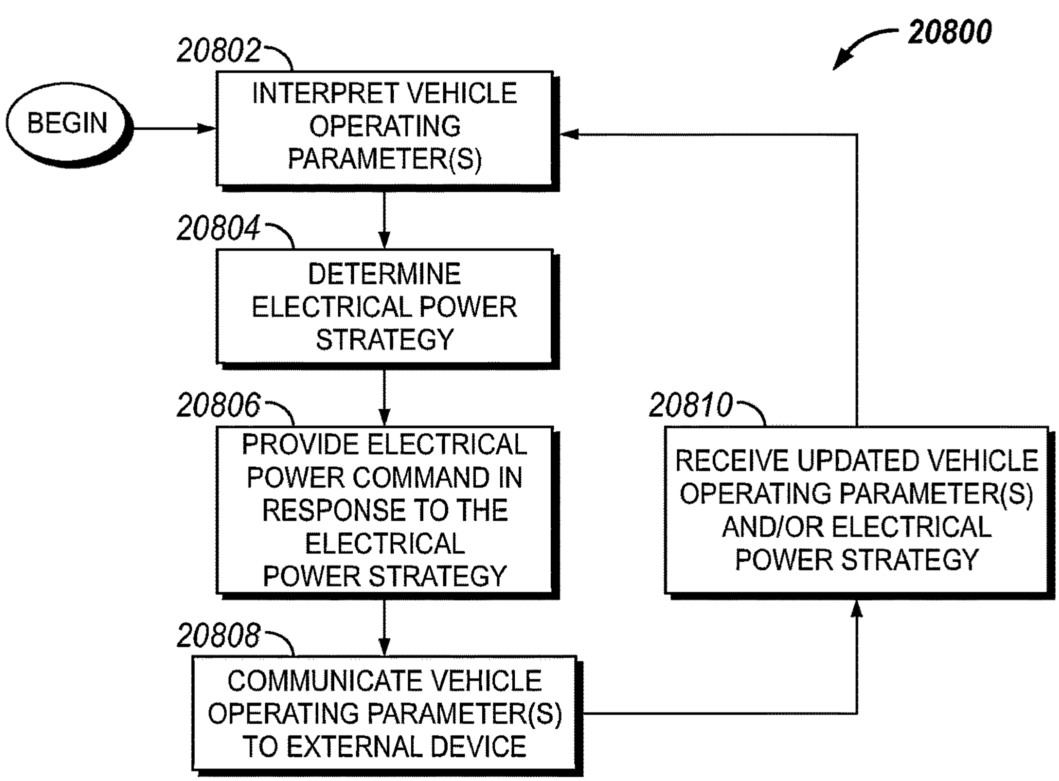

FIG. 208 depicts an example procedure to update vehicle operating parameters and/or electrical power strategy values for a fleet of vehicles.

Figure 209:
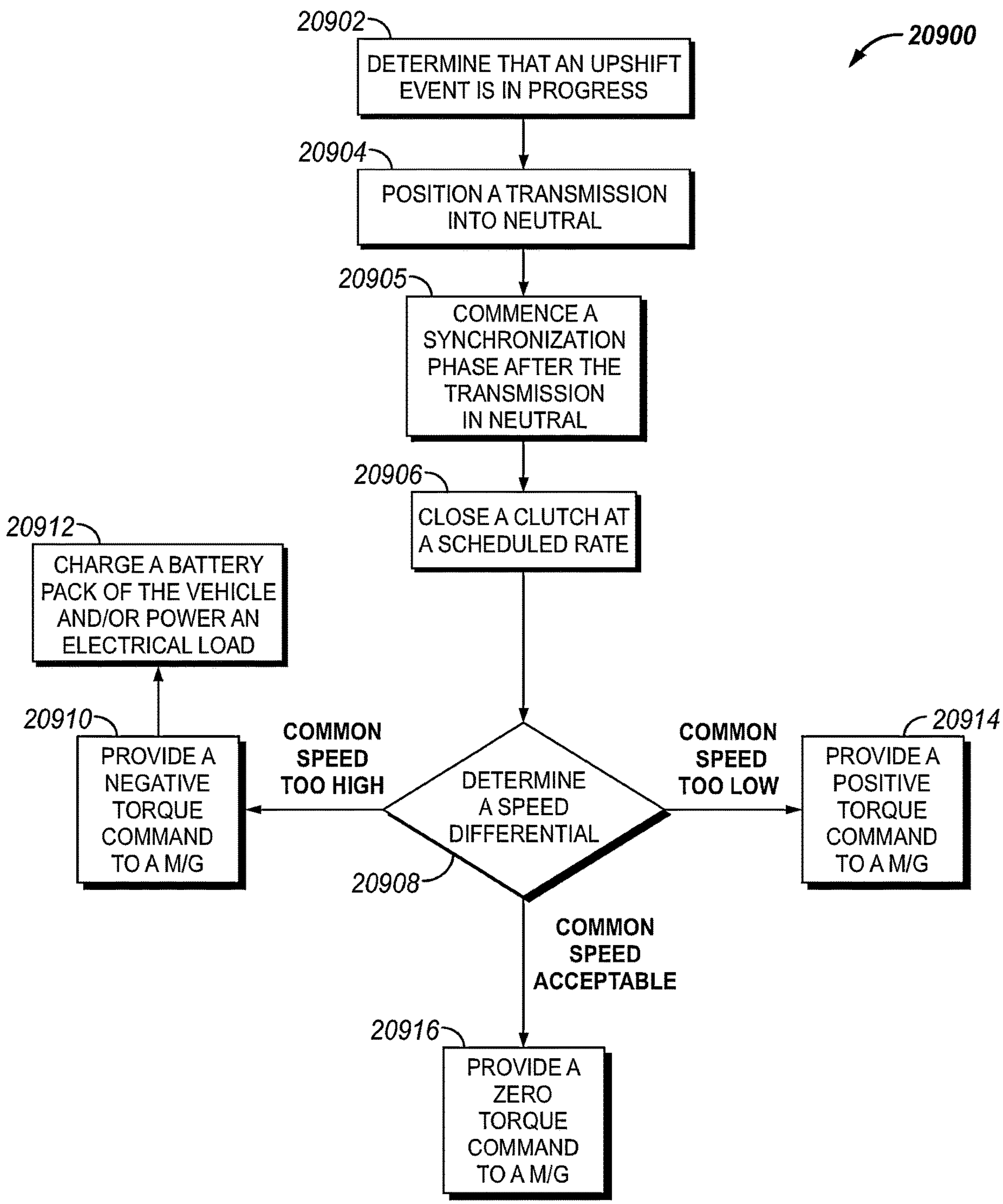

FIG. 209 depicts an example procedure to perform a shift assistance operation.

Figure 210:
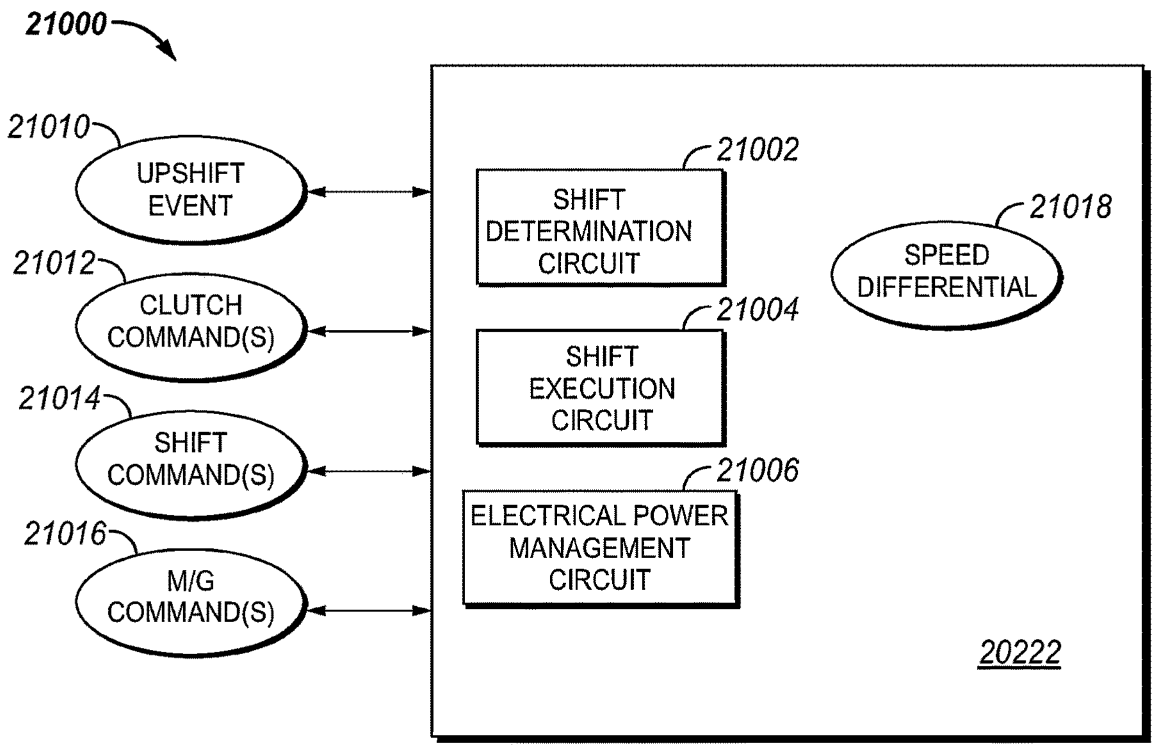

FIG. 210 depicts an example controller for performing shift assistance operations.

Figure 211:
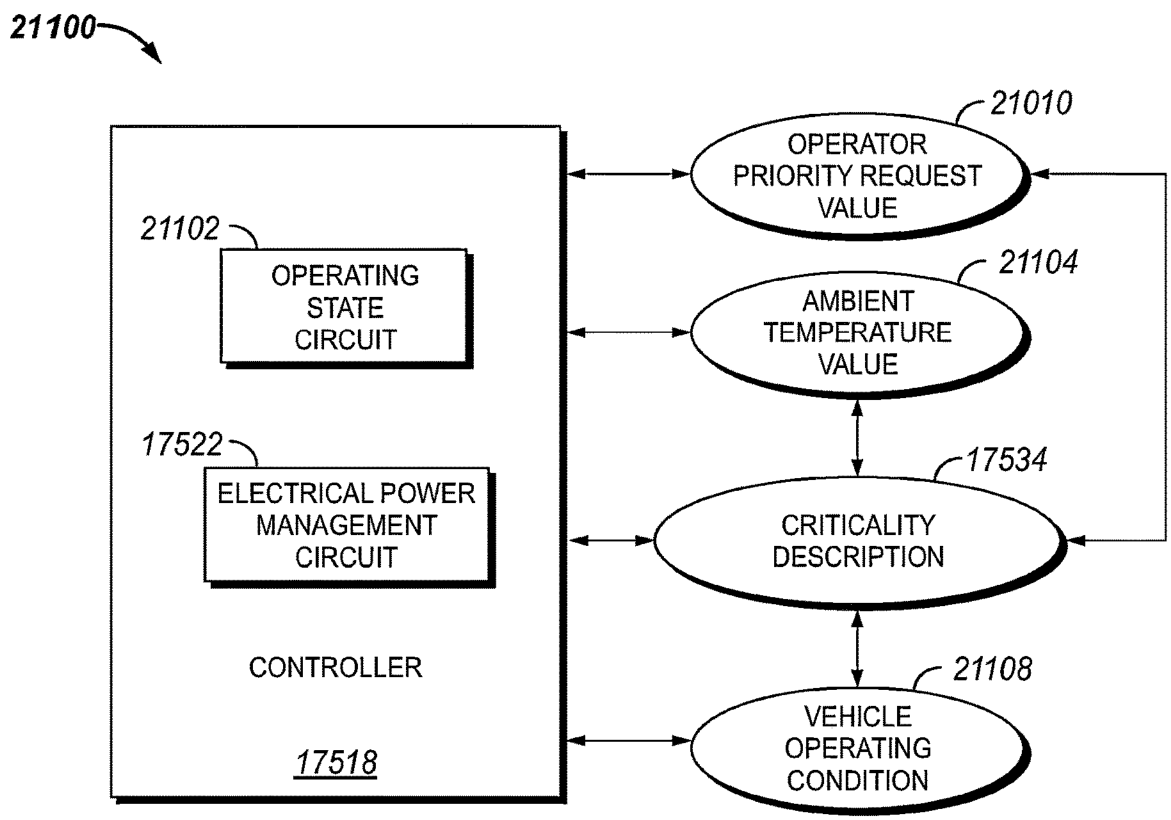

FIG. 211 depicts an embodiment of a controller.

Figure 212A:
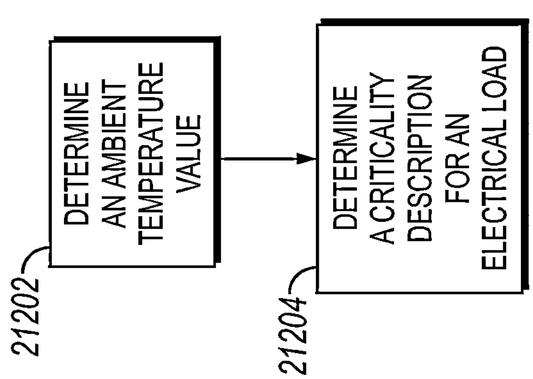
Figure 212B:
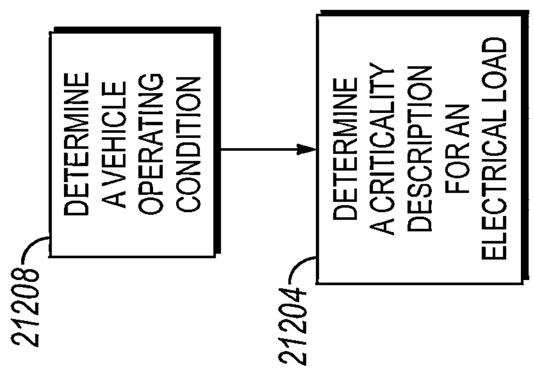
Figure 212C:
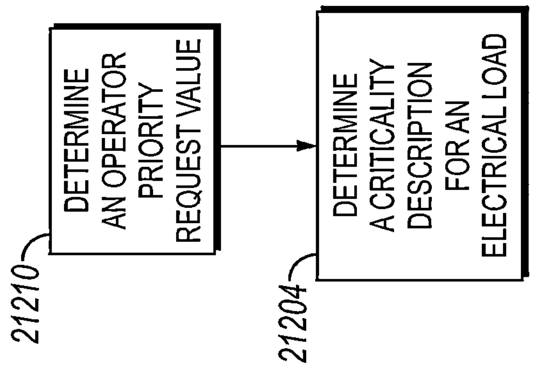

FIG. 212A-C depict workflows for power management.

DETAILED DESCRIPTION

As will become appreciated from the following discussion, the instant disclosure provides embodiments that support powering one or more loads in a shared manner between a driveline and a PTO (PTO) device, and/or replaces one or more aspects of previously known vehicle electrical systems and/or belt driven powering interfaces for devices. While the disclosure throughout contemplates using the apparatus, system, and process disclosed to drive an auxiliary load, for clarity of description, one or more specific loads such as an HVAC, mixer, and/or hydraulic pump may be referenced in certain examples. All references to specific load examples throughout the present disclosure are understood to include any load that can be powered electrically and/or with a rotating shaft. Further, while the disclosure throughout contemplates using the apparatus, system, and process disclosed as coupled with a motive load, for simplicity the description herein may refer to the motive load as a driveline and/or as a wheeled system. All references to specific motive loads throughout this disclosure should also be understood to be references to any motive load and/or portion of a driveline between a prime mover and a final motive engagement (e.g., wheels, tracks, etc.)

In an example, in commercial long-haul class 8 vehicles, commonly referred to as "18-wheeler sleeper cabs", traditionally a front-end accessory drive (FEAD) powers accessory components such as the electrical charging system (e.g., the alternator), the compressor that drives the HVAC air conditioner, fans, power steering, air compressors, fluid pumps, and/or other accessory loads depending upon the specific implementation. Historically, operators of such vehicles would run the engine nearly all the time including while driving for propulsion and idling while stopped to maintain the accessory functions such as "hotel loads" including lights, television, refrigerator, personal devices (e.g., a CPAP, electronic device charging, etc.), and HVAC cooling in summer months. In an effort to improve fuel economy and/or reduce emissions, fleet policy and laws in many locations prohibit idling for extended periods of time. Many solutions to provide the required electricity and cooling have been commercialized, including the addition of a small engine for that function (APU), addition of batteries that run an electrical air conditioner that are charged while driving, utilization of locations that have shore power available, and/or periodic cycling of the engine.

Previously known systems have followed two paths for engine off air conditioning. In a first implementation, the existing belt driven compressor is used while driving and a second electrically driven compressor is used while the engine is off. Such a solution adds cost and complexity. In a second implementation, a purely electrically driven compressor is operated for all of the HVAC demand. The disadvantage of a full-time electric HVAC system are two-fold: First, the increase in power demand exceeds the available power in 12V systems driving the industry to higher system voltage (especially 48V). Secondly, the system efficiency suffers when the engine shaft power is converted to electricity then converted back to shaft power to drive the compressor while driving.

References throughout the present disclosure to any particular voltage level should be understood to include both nominal voltages (e.g., a 12V battery) and actual system voltages. For example, a nominal 12V lead-acid battery typically operates at 14V or 14.5V during operations where the battery is in electrical communication with a charging device such as an alternator. Further, a nominal 12V battery may operate below 12V during discharge operations such as during cranking, and may be as low as 10.5V during certain operations. Further still, while certain voltages are described herein for clarity of description and due to ordinary terminology in industry (e.g., 12V, 48V, etc.), it will be understood that the features of the present disclosure are applicable to a wide range of voltages, and the specific voltages described are not limiting. For example, a nominal 48V system may be 56V or 58V during certain operations of a system, or as low as 42V during other operations of the system. Additionally, without limitation, features and operations for a nominal 48V system may be applicable to a nominal 12V system and/or a 24V. In certain examples, as will be understood to one of skill in the art having the benefit of the present disclosure, some voltage ranges may change the operating principles of a system, such as a high voltage system (e.g., more than 60V) that may require additional aspects to certain embodiments such as an isolated ground, and/or a low voltage system where a high power requirement may limit the practicality of such systems. The voltage at which other system effects may drive certain considerations depends upon the specific system and other criteria relating to the system that will be understood to one of skill in the art having the benefit of the present disclosure. Certain considerations for determining what range of voltages may apply to certain example include, without limitation, the available voltages of systems and accessories on a specific vehicle, the regulatory or policy environment of a specific application, the PTO capability of available driveline components to be interfaced with, the time and power requirements for offline power, the availability of regenerative power operations, the commercial trade-offs between capital investment and operating costs for a specific vehicle, fleet, or operator, and/or the operating duty cycle of a specific vehicle.

The present disclosure relates to PTO devices having a motor/generator, where the PTO device is capable to selectively transfer power with the driveline, such as at a transmission interface. In embodiments, a 48V PTO may replace the traditional engine mounted, belt driven alternator, HVAC compressor, and/or the flywheel mounted brush starter with a transmission PTO mounted electrical machine on a common shaft with the HVAC compressor. The disclosed PTO device accessories on the transmission enable several modes of operation, independent of engine speed, using proven parts such as simple planetary gears and shift actuators. Without limitation, example PTO devices disclosed herein allow for operating the load (e.g., an HVAC compressor) with the same electric machine used to charge the battery while driving and/or during engine-off operations such as sleeping, hoteling, or waiting (e.g., at a loading dock, construction site, or work site), and the ability to operate the charging and load mechanically from the driveline (e.g., during coasting or motoring). In certain embodiments, an example PTO system reduces total ownership costs and/or enhances the ability to meet anti-idling requirements while allowing the operator to maintain climate control or other offline operations. An example system also improves system economics for the vehicle manufacturer, fleet, owner, or operator, by reducing green-house gas (GHG) emissions, improving fuel economy, improving operator comfort and/or satisfaction, and enabling original equipment manufacturer (OEM) sales of various feature capabilities supported by the PTO system. Certain example systems disclosed herein have a lower initial cost than previously known systems (e.g., diesel or battery APUs and/or redundant HVAC systems) while providing lower operating costs and greater capability.

In embodiments, a PTO device can be mounted to a driveline, such as a transmission. A power system can be charged, for example, a lead battery. Then, the power system can be utilized to power a device such as an HVAC system via the PTO device. Also, the power system can be utilized during start-up of an affiliated engine or vehicle prime mover.

In one example, a 48V PTO enables "anti-idle" technologies, such as no-idle hoteling with an e-driven AC compressor. Such an arrangement reduces green-house gasses when, for example, a sleeper cab of a long-haul tractor is placed in a hotel mode. However, the PTO is not limited to such a vehicle and the PTO can be applied to other vehicles.

Engine-off operations such as coasting or motoring can be used to regeneratively charge the 48V power system and/or mechanically power a shared load. Electricity can be routed to assist power steering during engine-off operations. Other aspects of engine-off operations, intelligent charging, electrical HVAC, and/or stop/start modes complement the disclosed PTO device. The PTO device improves fuel economy by converting otherwise wasted energy to usable electricity and achieves a reduction in green houses gases.

The design can eliminate other engine-mounted components to reduce vehicle weight and integration costs, and to reduce the engine system footprint. For example, it is possible to utilize a PTO device in lieu of one or more of a traditional alternator, starter, and/or AC compressor. In certain embodiments, redundant systems can also be eliminated. For example, some previously known systems include a first circuit relying on the engine for power to evaporative circuits and the air conditioning. Then, a second system is mounted for engine-off operations, which second system also includes an evaporation circuit and an air conditioning circuit.

In another example, the alternator port and AC compressor port can be removed from the engine, allowing for a reduction in component and integration costs, and reducing parasitic loads on the engine. In certain embodiments, aspects of a starter can be omitted, for example where the PTO device is utilized to start the engine. The auxiliary drive aspect of the PTO device can couple to the evaporator circuits and the air conditioner. In an example, the air conditioner does not couple through the engine, but through the PTO device. When needed, the AC compressor and electric alternator can be moved from engine-mounted to mounting on the PTO device, which may be mounted to an interface on the transmission.

An example auxiliary drive includes the air conditioner (AC) and/or other powered electrical systems. Regenerated coasting energy can be captured via the motor/generator coupled to the driveline, and later utilized to power electrical loads on the vehicle. An example system includes managed lead acid batteries. The electrical system can include an air-cooled system.

An example PTO device includes a motor/generator having a motor rating of 5 kW continuous output and 10 kW peak output. The motor can be used as part of the motor/generator. Various motor types are compatible with the disclosure, including permanent magnet type, wire-wound synchronous type, and induction motor type. External excitation can be applied to the wire-wound synchronous type motor. Other components can include a housing or other adapter for the PTO device, gearing to couple to the transmission or other driveline component to the PTO device, gearing to step up or down between the motor/generator, auxiliary drive, and/or transmission or driveline. An example PTO device includes a gear change actuator such as a gear selector, an inverter, a converter, and/or an electric steering circuit.

The disclosed PTO device variants provide numerous benefits, including in certain embodiments: capturing motive energy that would be otherwise lost, prime mover stop/start mode operation, intelligent charging, reduced system and system integration costs, and fuel savings. Certain embodiments include fewer engine-mounted components, reducing the engine footprint, and improving driver visibility around the engine via reductions in the mounting space. Certain embodiments provide for a reduced load on the serpentine belt. Certain embodiments provide for higher system power within the same footprint, and/or for greater utilization of system power and reduced overdesign of power to support variability in applications and duty cycles.

This application incorporates U.S. patent application Ser. No. 16/795,382 filed Feb. 19, 2020, entitled "TRANSMISSION MOUNTED ELECTRICAL CHARGING SYSTEM WITH IMPROVED BATTERY ASSEMBLY", in its entirety for all purposes.

This application incorporates U.S. patent application Ser. No. 17/478,075 filed Sep. 17, 2021, entitled "TRANSMISSION MOUNTED ELECTRICAL CHARGING SYSTEM PTO GEAR ARRANGEMENT", in its entirety for all purposes.

Figure 1:
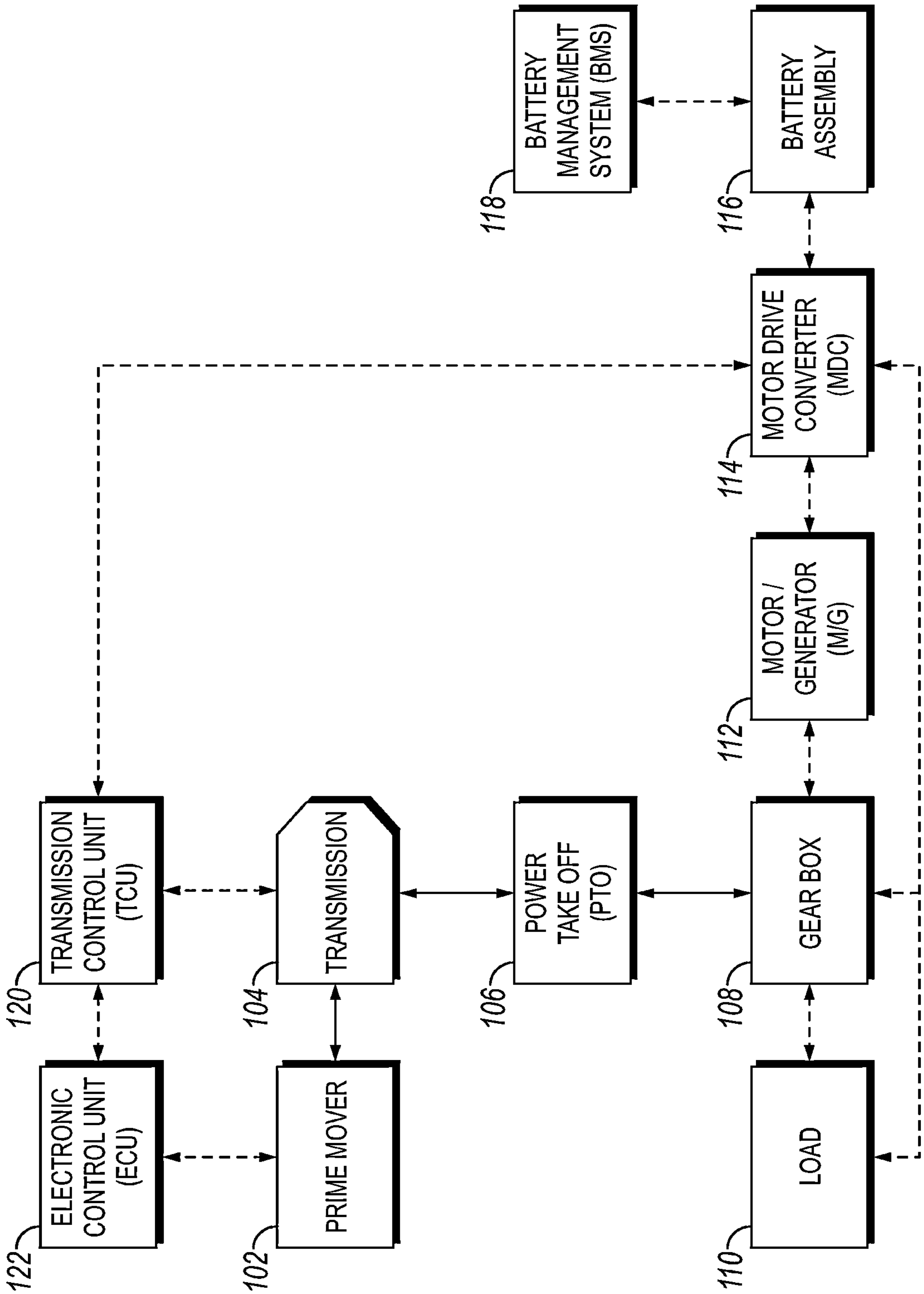
FIG. 1 is a top-level schematic block diagram for an electrically regenerative accessory drive in an embodiment of the present disclosure.

Referring to FIG. 1, an embodiment functional block diagram is provided for a PTO device configured with a prime mover 102 (e.g., an internal combustion engine) coupled with a transmission 104. An electronic control unit (ECU) 122 may provide control functions to the prime mover 102 and a transmission control unit (TCU) 120 may provide control functions to the transmission 104. In embodiments, the PTO device may include a motor/generator (M/G) 112 and a load 110 (e.g., an HVAC system) drivingly coupled by a gear box 108 that is further drivingly coupled to the transmission 104 through the PTO device 106. The motor/generator 112 is provided drive and control signals from a motor drive converter (MDC) 114 that is powered by a battery assembly 116 (e.g., with 48 v and 12 v supply voltages). The battery assembly 116 may be managed by a battery management system (BMS) 118. The description including various controllers 122, 120 is a non-limiting example, and control functions of a system may be distributed in any manner. In certain embodiments, control functions described throughout the present disclosure may be present in an engine controller, transmission controller, vehicle controller (not shown), a motor drive controller, a single device, and/or distributed among various devices. In certain embodiments, control functions described throughout the present disclosure may be performed, at least in part, in a separate controller remote from the vehicle—for example from a controller at least intermittently in communication with the vehicle, in a service tool, in a manufacturing tool, and/or on a personal device (e.g., of an operator, owner, fleet personnel, etc.). Controllers in this disclosure may be present in whole or part on another device such as a transmission controller, engine controller, vehicle controller, and/or a controller related to a PTO device such as an MDC controller. Aspects of the controller may be implemented as instructions stored on a computer readable medium, whereupon a processor performs one or more of the aspects when executing the instructions. Aspects of the controller may be performed by operations of sensors, actuators, network communications, logic circuits, and/or hardware devices configured to perform those aspects.

Figure 2:
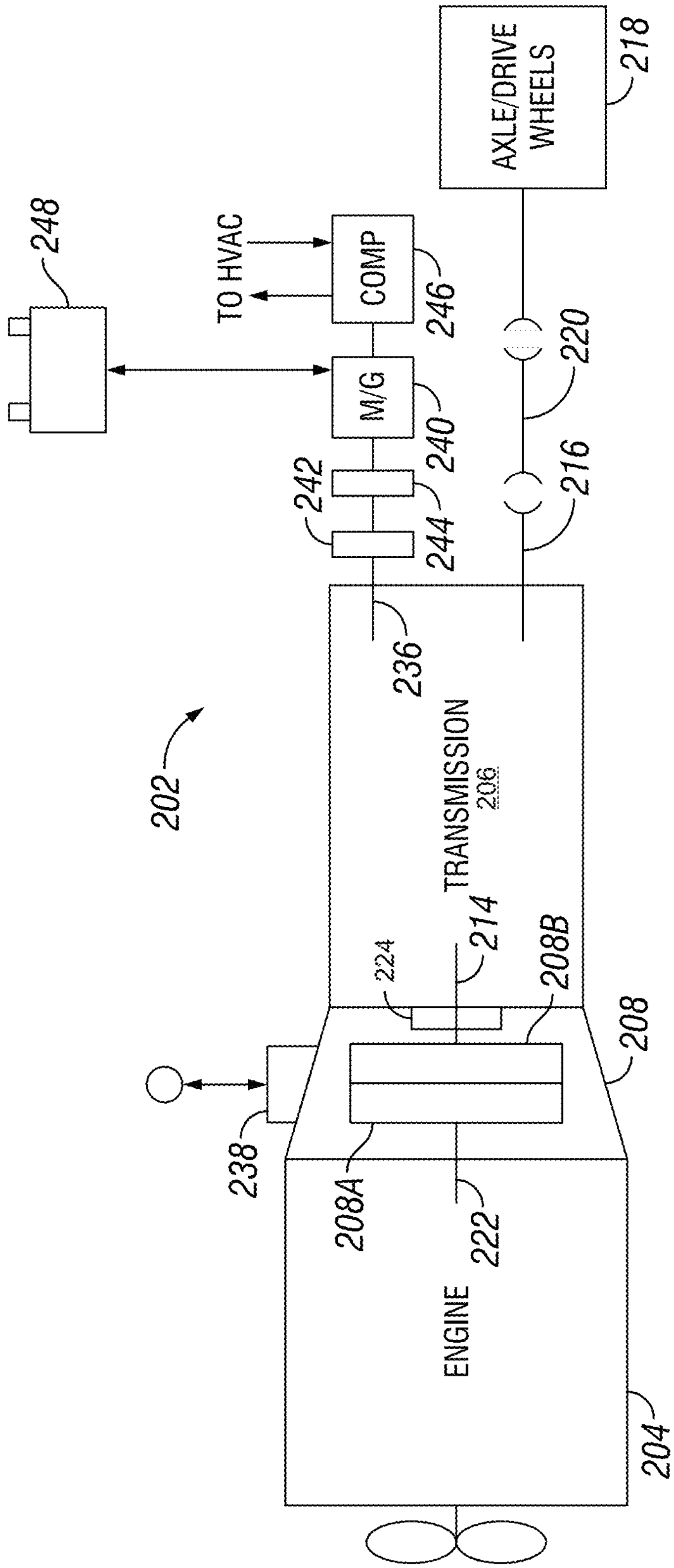
FIG. 2 is a schematic of driveline including an engine and a transmission having a PTO device with a motor/generator coupled to a countershaft according to one example of the present disclosure.

With reference to FIG. 2, an example system 202 constructed in accordance to one example of the present disclosure is schematically depicted. The example system 202 includes a prime mover 204 (e.g., a diesel engine), a transmission 206, and a clutch 208 positioned therebetween that selectively couples the prime mover 204 to the transmission 206. The example transmission 206 may be of the compound type including a main transmission section connected in series with a splitter (e.g., forward gear layers on the input shaft 214) and/or range-type auxiliary section (e.g., rearward gear layers to the output shaft 216). Transmissions of this type, especially as used with heavy duty vehicles, typically have 9, 10, 12, 13, 16 or 18 forward speeds. A transmission output shaft 216 extends outwardly from the transmission 206 and is drivingly connected with vehicle drive axles 218, usually by means of a drive shaft 220.

The clutch 208 includes a driving portion 208A connected to an engine crankshaft/flywheel 222, and a driven portion 208B coupled to the transmission input shaft 214, and adapted to frictionally engage the driving portion 208A. An electronic control unit (ECU) may be provided for receiving input signals and for processing same in accordance with predetermined logic rules to issue command output signals to the transmission system 202. The system 202 may also include a rotational speed sensor for sensing rotational speed of the engine 204 and providing an output signal (ES) indicative thereof, a rotational speed sensor for sensing the rotational speed of the input shaft 214 and providing an output signal (IS) indicative thereof, and a rotational speed sensor for sensing the speed of the output shaft 216 and providing an output signal (OS) indicative thereof. The clutch 208 may be controlled by a clutch actuator 238 responding to output signals from the ECU.

An example transmission 206 includes one or more mainshaft sections (not shown). An example mainshaft is coaxial with the input shaft 214, and couples torque from the input shaft 214 to the output shaft 216 using one or more countershafts 236. The countershaft(s) 236 are offset from the input shaft 214 and the mainshaft, and have gears engaged with the input shaft 214 and the mainshaft that are selectably locked to the countershaft 236 to configure the ratios in the transmission 206.

An example mainshaft is coupled to the output shaft 216, for example utilizing a planetary gear assembly (not shown) which has selected ratios to select the range.

In embodiments of the present disclosure, a motor/generator 240 can be selectively coupled to the driveline, for example through torque coupling to the countershaft 236. Example and non-limiting torque coupling options to the driveline include a spline shaft interfacing a driveline shaft (e.g., the countershaft 236), a chain assembly, an idler gear, and/or a lay shaft. As will become appreciated herein, the motor/generator 240 is configured to run in two opposite modes. In a first mode, the motor/generator 240 operates as a motor by consuming electricity to make mechanical power. In the first mode the vehicle can be moved at very low speeds (such as less than 2 MPH) from electrical power, depending upon the gear ratios between the motor/generator 240 and the driveline. Traditionally, it is difficult to controllably move a commercial long-haul class 8 vehicle at very low speeds, especially in reverse using the clutch 208.

In a second mode, the motor/generator 240 operates as a generator by consuming mechanical power to produce electricity. In one configuration a clutch 242 (which may be a controllable clutch and/or a one-way clutch) and a planetary gear assembly 244 can be coupled between the second countershaft 236 and the motor/generator 240. The planetary gear assembly 244 can be a speed-up gear assembly having a sun gear. A planetary carrier may be connected to or integral with the second countershaft 236, which is connected drivably to the motor/generator 240. In an example, the planetary gear assembly 244 can fulfill requirements of a 21:1 cold crank ratio, for example to crank the engine 204 when the motor/generator 240. An example motor/generator 240 includes motor/generator 240 as a 9 kW Remy 48V motor.

By way of example only, the motor/generator 240 can be a 6-20 KW, 24-48 volt motor. The motor/generator 240 can be ultimately driven by the second countershaft 236 and be connected to an HVAC compressor 246 through a clutch. The compressor 246 can then communicate with components of the HVAC as is known in the art. The motor/generator 240 can charge a battery 248 in an energy storage mode, and be powered by the battery 248 in an energy use mode.

Various advantages can be realized by mounting the motor/generator 240 to the countershaft 236 of the transmission 206. In one operating mode, as will be described in greater detail below, the engine can be turned off (defueled) while the vehicle is still moving or coasting and the motor/generator 240 is regenerating resulting in up to three percent fuel efficiency increase. In other advantages, the battery 248 (or batteries) can be mounted in an engine compartment near the motor/generator 240 reducing battery cable length over conventional mounting configurations. Moreover, various components may be eliminated with the transmission system 202 including, but not limited to, a starter, an alternator, and/or hydraulic power steering. In this regard, significant weight savings may be realized. In some arrangements, the transmission system 202 can be configured for use on vehicles with electric steering and/or other pumps or compressors.

The controller 224 can operate the transmission system 202 in various operating modes. In a first mode, the controller 224 operates the clutch 208 in an open condition with the transmission 206 in gear. In the first mode or engine off coasting, the controller turns the engine off or defuels the engine 204 while the vehicle is moving based on vehicle operating conditions and routes rotational energy from the output shaft 216, through the second countershaft 236 and into the motor/generator 240. According to various examples, the vehicle operating conditions can include input signals related to any operating conditions including but not limited to a global positioning system (GPS) signal, a grade sensor signal and/or a vehicle speed sensor signal. As can be appreciated, it would be advantageous to run the transmission system 202 in the first mode when the vehicle is travelling downhill. Elevation changes can be attained from a GPS signal and/or a grade sensor for example.

In a second mode, the controller 224 operates the clutch 208 in a closed condition with the transmission 206 in neutral. In the second mode, the controller 224 can facilitate engine start and idle generation. In a third mode, the controller 224 operates the clutch 208 in a closed condition and the transmission 206 in gear. The third mode can be used for normal cruising (e.g., driving or vehicle motion) and generation.

Additional operating modes provided by the transmission system 202 specific to engagement and disengagement with the compressor 246 will be described. As used herein, the modes are described as a "crank mode", a "creep mode", a "driving with no HVAC mode", a "driving with HVAC mode," and a "sleep mode". In certain embodiments, driving modes are referenced herein as a "cruise mode" and/or as a "motive load powered mode." These modes are described in sequence below.

In an example, in the crank mode, a high ratio (e.g., 21:1) between the countershaft 236 and the motor/generator 240 is provided. Other ratios are contemplated. The HVAC compressor 246 would be disengaged such as by the clutch. The transmission 206 would be in neutral with the clutch 208 closed. The motor/generator 240 would turn the engine 204 with sufficient torque to crank the engine 204.

In an example, in the creep mode, a high ratio (e.g., 21:1) between the countershaft 236 and the motor/generator 240 is provided. Other ratios are contemplated. The HVAC compressor 246 would be disengaged such as by the clutch. The transmission 206 would be in first gear or low reverse gear. The clutch 208 would be held open with the engine 204 stopped (or idling). The motor/generator 240 would have sufficient torque to move the vehicle in forward or reverse such as at 0 MPH to 2 MPH with outstanding speed and torque control, allowing a truck to back into a trailer or a dock without damage. The utilization of the motor/generator 240 in the creep mode provides for a highly controllable backing torque output, and greater case of control by the operator.

In an example, in the driving with no HVAC mode, a medium ratio (e.g., 7:1) between the countershaft 236 and the motor/generator 240 is provided. Other ratios are contemplated. The HVAC compressor 246 would be disengaged such as by the clutch. The transmission 206 would be in the appropriate gear and the clutch 208 would be closed while propelling the vehicle, and open with the engine off when motoring or coasting.

In an example, in the driving with HVAC mode, a medium ratio (e.g., 7:1) between the countershaft 236 and the motor/generator 240 is provided. The HVAC compressor 246 would be engaged with a selected ratio (e.g., 3.5:1) to the motor/generator 240. The transmission 206 would be in the appropriate gear, and the clutch 208 would be closed while propelling the vehicle, and open with the engine 204 off when motoring or coasting. The HVAC system is directly driven by the engine or the driveline, eliminating the efficiency loss of converting power to electricity and back to work. Also, the HVAC system could provide cooling in the engine off mode, converting the inertia of a vehicle on a downgrade to cooling for additional energy recovery, improving fuel savings.

In the sleep mode, the motor/generator 240 would be disconnected from the countershaft 236. The motor/generator 240 would be coupled to the HVAC compressor 246 through a selected ratio (e.g., 3.5:1). The motor/generator 240 uses energy previously stored in the battery 248 during the driving portion of the cycle to operate the HVAC. This provides the cooling function without the addition of a separate motor and power electronics to power the HVAC compressor, and/or without the addition of a separate HVAC compressor capable of being powered by an APU, electrically, or the like. A number of mechanical solutions involving sliding clutches, countershaft type gears, concentric shafts with selectable gear engagements, and planetary gears can be used to obtain the selected ratios in each operating mode. In certain embodiments, a single actuator is used to change between the above the described modes.

Figure 3:
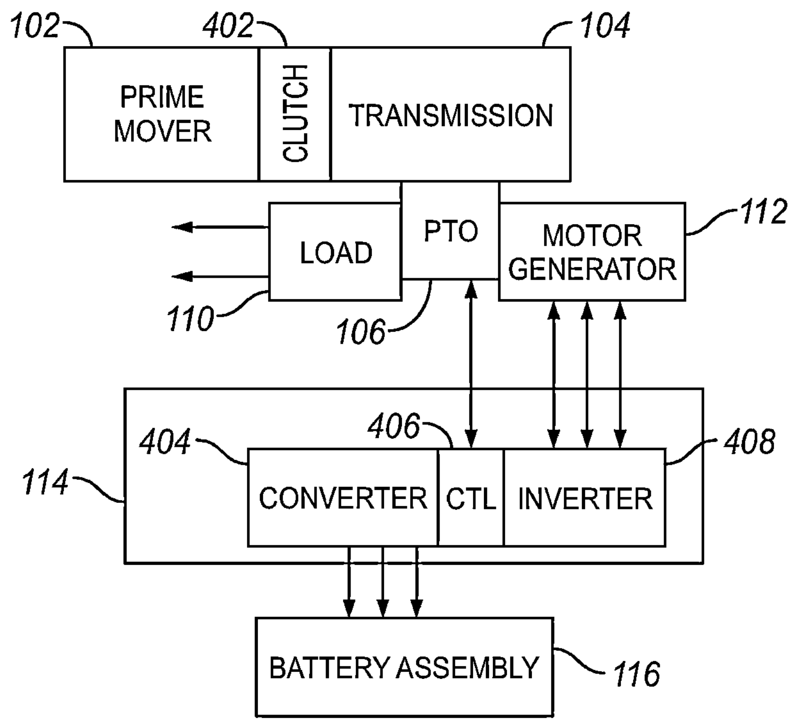
FIG. 3 is a functional block diagram for an electrically regenerative accessory drive in an embodiment of the present disclosure.

Referring to FIG. 3, a schematic block diagram of a PTO device is presented. Here, the prime mover 102 (e.g., engine) is drivingly coupled to the transmission 104 through a clutch 402. The motor/generator 112 selectively couples to the load 110 and to the transmission 104 via a torque coupling (e.g., PTO 106, which may include gear box 108). The MDC 114 is shown as including a DC-to-DC converter 404, a controller 406, and an inverter 408, where the converter 404 provides control signals to the battery assembly 116, the controller 406 provides control signals to the PTO 106, and the inverter 408 provides phased power to the motor/generator 112.

In embodiments, a PTO device coupled with a transmission 104 and prime mover 102 may support different modes of operation, such as cruise mode (e.g., accessories driven by an engine), motive load mode (e.g., accessories driven by wheels in an engine-off down-grade condition of travel), sleep mode (e.g., motor/generator operating as motor drives an HVAC with the engine off), crank mode (e.g., starting engine from the motor/generator operating as a motor, such as with a low PTO gear needed for crank-torque), creep mode (e.g., motor/generator operating as motor drives truck in low-PTO precision backing (e.g., 0-2 mph)), and the like. It will be understood that mode names are provided for clarity of description, and are not limiting to the present disclosure. Additionally or alternatively, in certain embodiments and/or in certain operating conditions, the arrangements and/or configurations of the driveline (e.g., engine, transmission, and/or wheels) may not be known to the PTO device, and/or may not be important to the PTO device. For example, in the example cruise mode and motive load mode, the driveline provides power for the shared load 110, and the PTO device may be arranged to transfer power from the driveline to the load 110 in either of these modes. In certain embodiments, the PTO device may perform distinct operations in a mode even where the power transfer arrangements are the same, and the arrangements and/or configurations of the driveline may be known and considered by the PTO device (and/or a controller of the PTO device). For example, the PTO device may have a controller configured to determine the amount of time the vehicle operates in the cruise mode relative to the motive load mode, and accordingly the controller may make duty cycle determinations, battery charging determinations, or perform other operations in response to the time spent in each mode.

Figure 4:
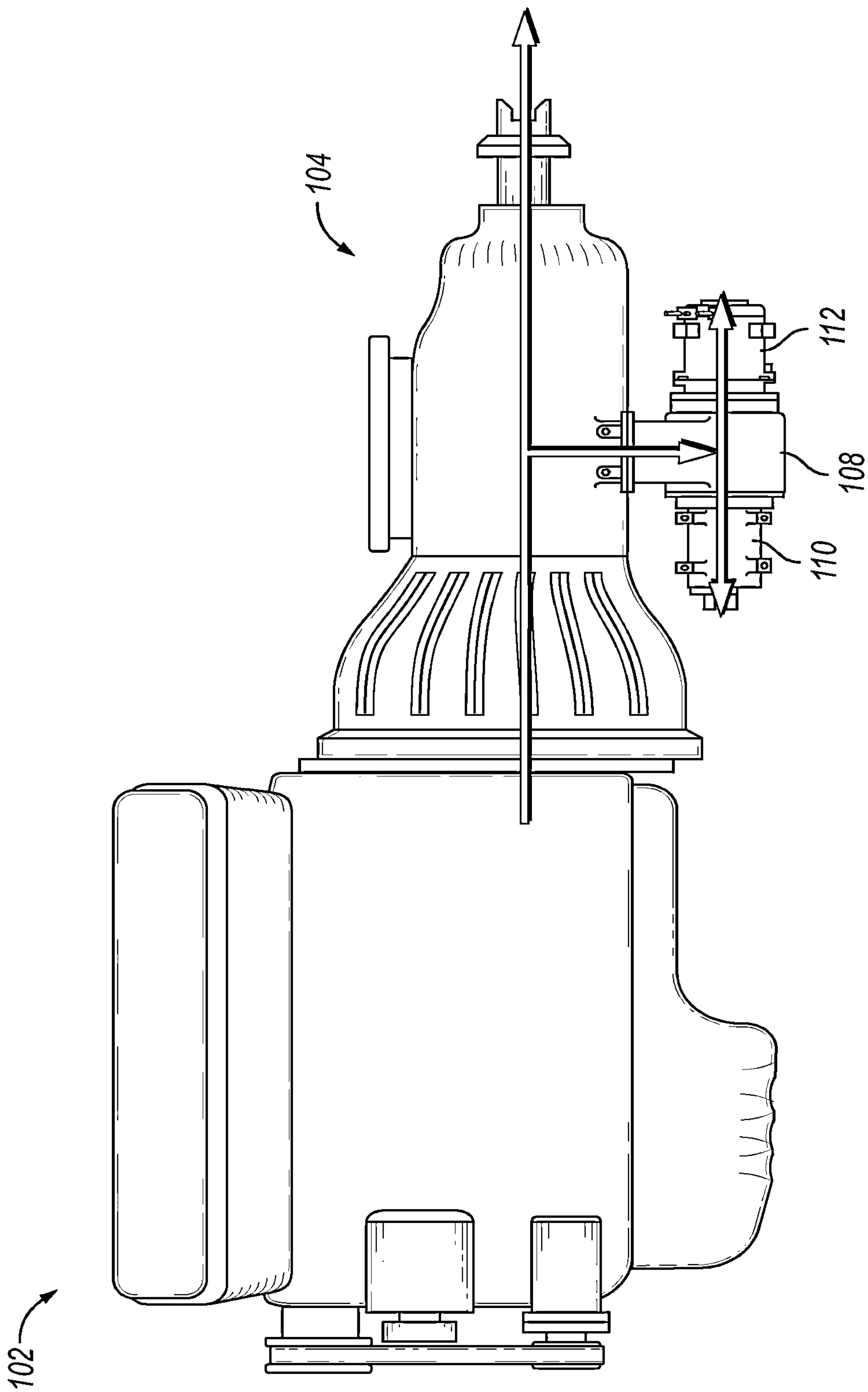
FIG. 4 illustrates a cruise configuration in an embodiment of an electrically regenerative accessory drive.

Referencing FIG. 4, power flows for an example PTO device operating in a cruise mode with a prime mover 102 and transmission 104 are depicted. In the example cruise mode, the PTO device provides for efficient powering of the load 110 through a mechanical coupling to the drive line. In an example, a vehicle equipped with a PTO device may be able to efficiently provide power to the load 110 from the prime mover 102, and further power the motor/generator 112 operating as a generator for producing electrical energy to the electrical system including for example charging a battery assembly 116 to store energy for future use in another operating mode.

Figure 5:
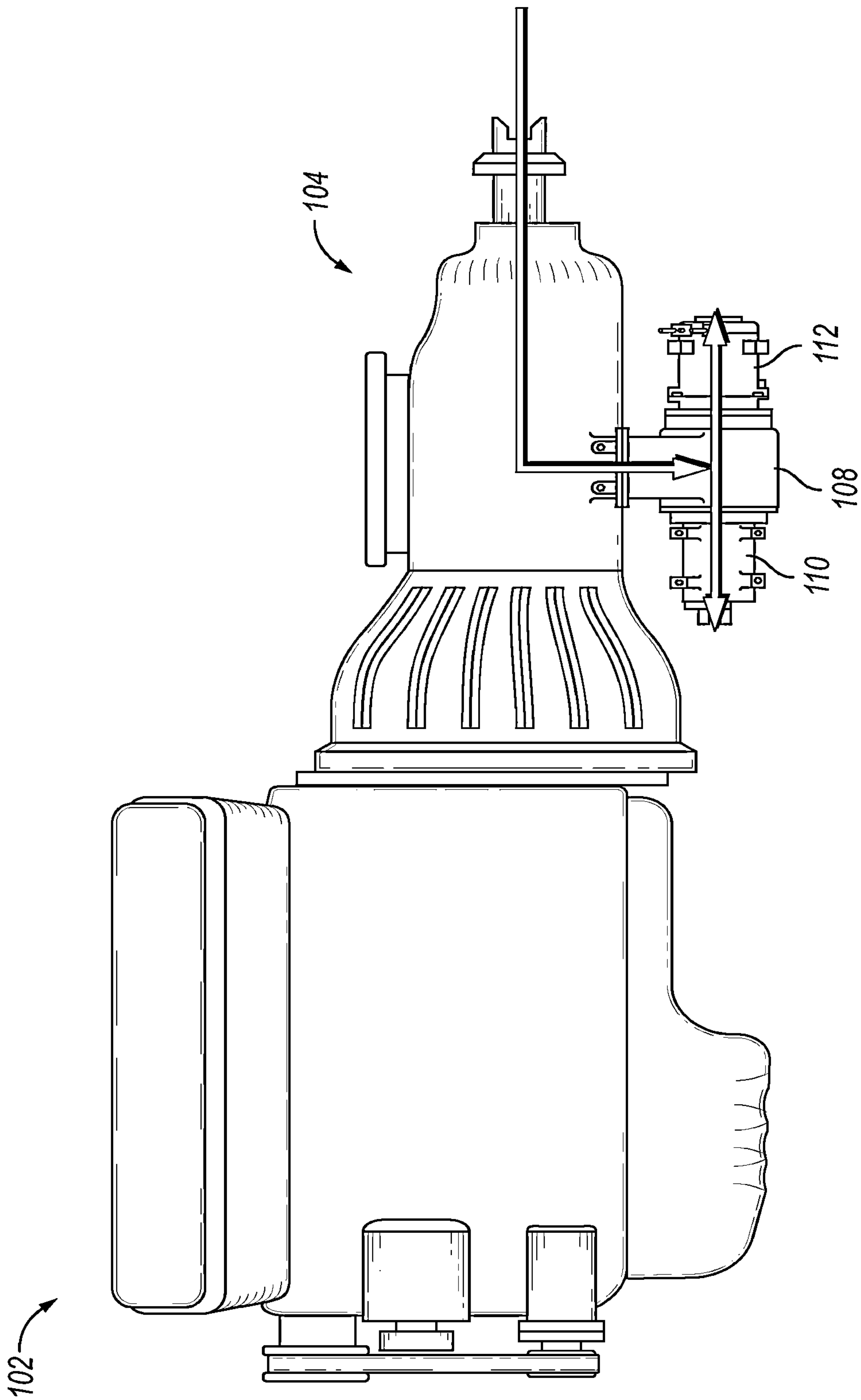
FIG. 5 illustrates a motive load powered configuration in an embodiment of an electrically regenerative accessory drive.

Referencing FIG. 5, power flows for an example PTO device operating in a motive load powered mode (e.g., where the motive load such as kinetic energy through the wheels is being used to power devices) is depicted. In the example motive load powered mode, the PTO device may be able to efficiently provide power to the load 110 from the motive load, and further power the motor/generator 112 operating as a generator for producing electrical energy to the electrical system including for example charging a battery assembly 116 to store energy for future use in another operating mode.

Figure 6:
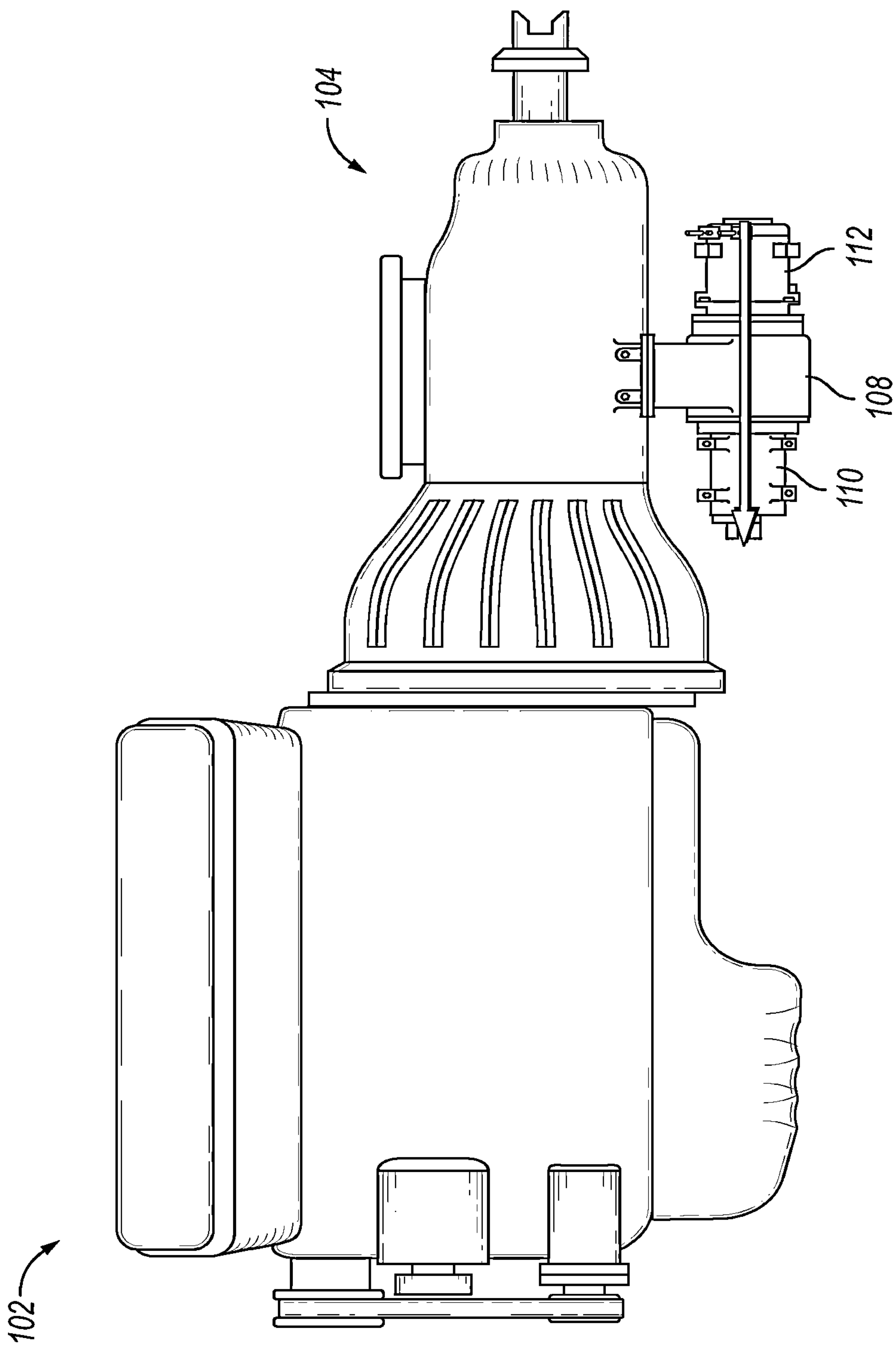
FIG. 6 illustrates a neutral or sleep configuration in an embodiment of an electrically regenerative accessory drive.

Referencing FIG. 6, power flows for an example PTO device operating in a sleep mode (e.g., where the driveline is not capable of providing power to loads, and/or where operating conditions make driveline power undesirable) are depicted. In certain embodiments, the sleep mode may be utilized when motive loads are not available (e.g., the vehicle is not moving) and/or when the prime mover is not turning. In certain embodiments, the sleep mode may be utilized when torque engagement with the driveline is not desired—for example during shifting operations, when the prime mover is motoring but a vehicle speed is below a vehicle speed target, etc. In the example sleep mode, the PTO device is de-coupled from the driveline, and the motor/generator 112 powers the load 110 using stored energy from the electrical system, such as the battery assembly 116.

Figure 7:
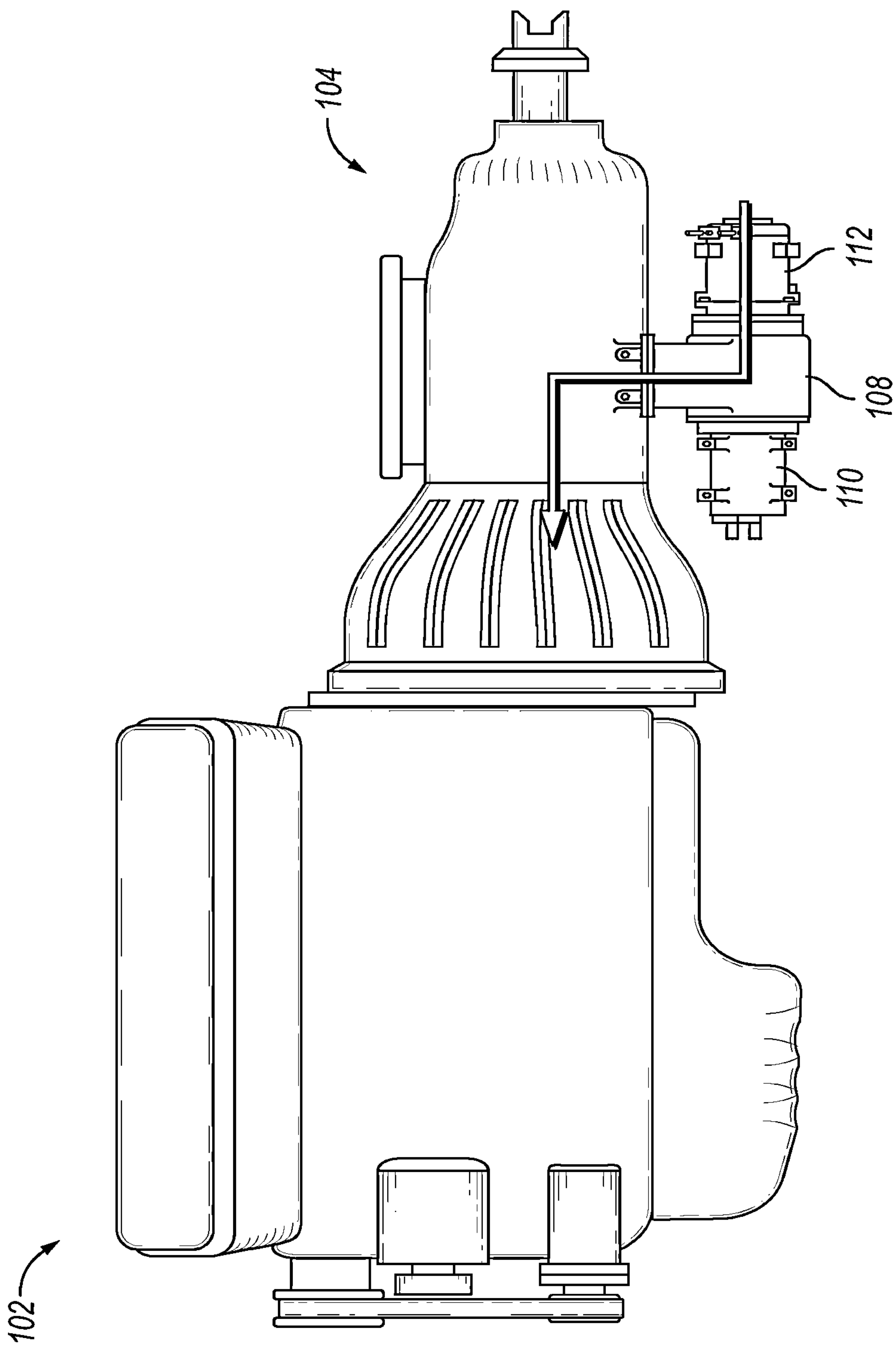
FIG. 7 illustrates a crank configuration in an embodiment of an electrically regenerative accessory drive.

Referencing FIG. 7, power flows for an example PTO device operating in a crank mode (e.g., where the prime mover 102 is not yet started) are depicted. The example crank mode of FIG. 7 depicts the motor/generator 112 providing power to the driveline, and the load 110 is de-coupled from the motor/generator 112 and the driveline.

Figure 8:
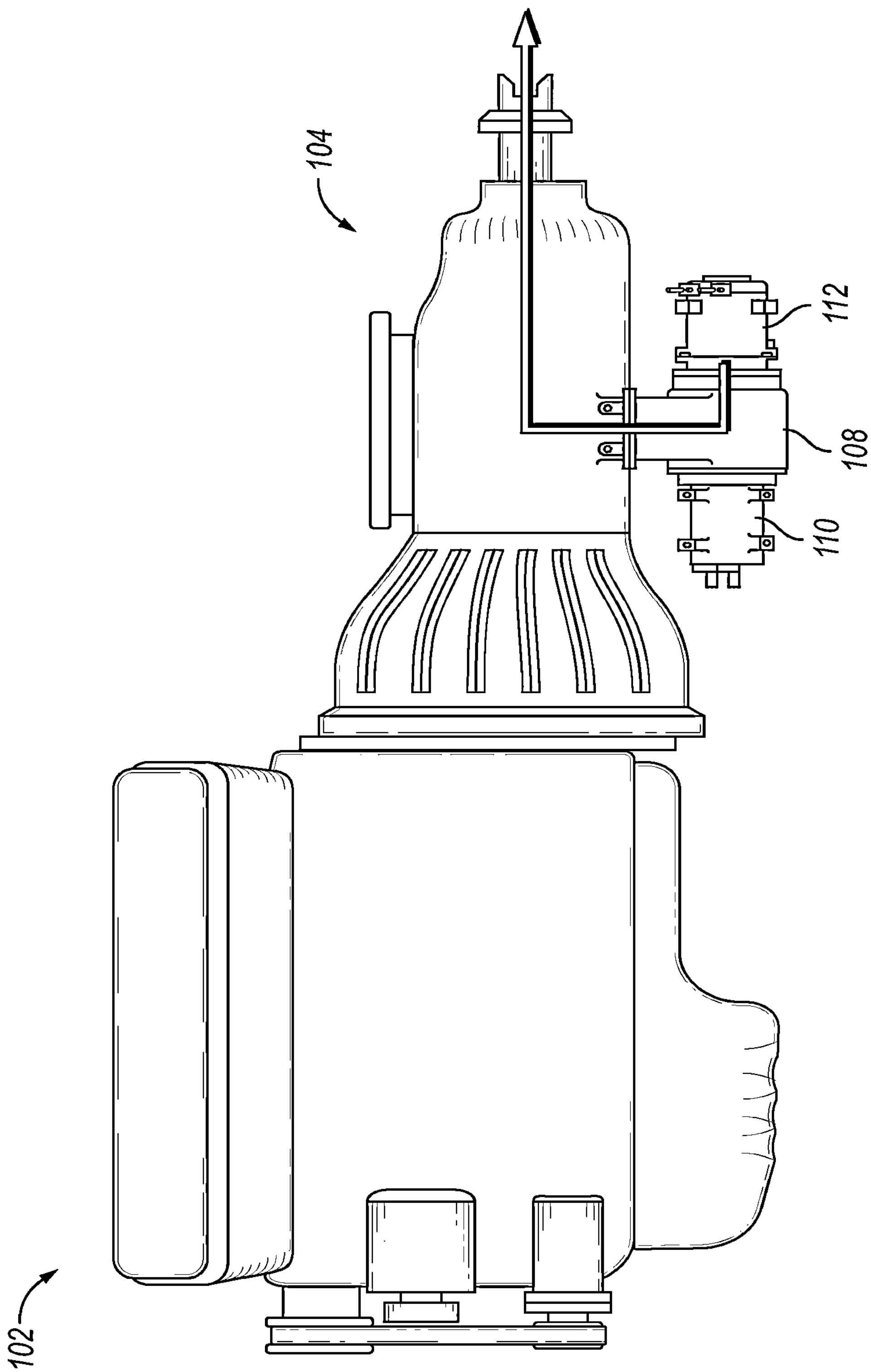
FIG. 8 illustrates a creep configuration in an embodiment of an electrically regenerative accessory drive.

Referencing FIG. 8, power flows for an example PTO device operating in a creep mode (e.g., where the motor/generator 112 provides motive power to the driveline) are depicted. The example creep mode of FIG. 8 depicts the motor/generator 112 providing power to the driveline, and the load 110 is de-coupled from the motor/generator 112 and the driveline. It can be seen that, in certain embodiments, the PTO device operates in the same manner in the crank mode as in the creep mode, and the system including the driveline enforces whether motor/generator 112 power to the driveline is applied to the motive load (e.g., the wheels) or to the prime mover 102. In certain embodiments, for example where the PTO device enforces a reverse or forward position, where the PTO device uses a different gear ratio between the PTO device and the driveline in the crank mode versus the creep mode, where a controller of the PTO device notifies the system that a creep mode is being engaged, and/or where a torque response of the motor/generator 112 changes between the crank mode and the creep mode, the PTO device may operate in a different manner in the crank mode versus the creep mode.

Figure 9:
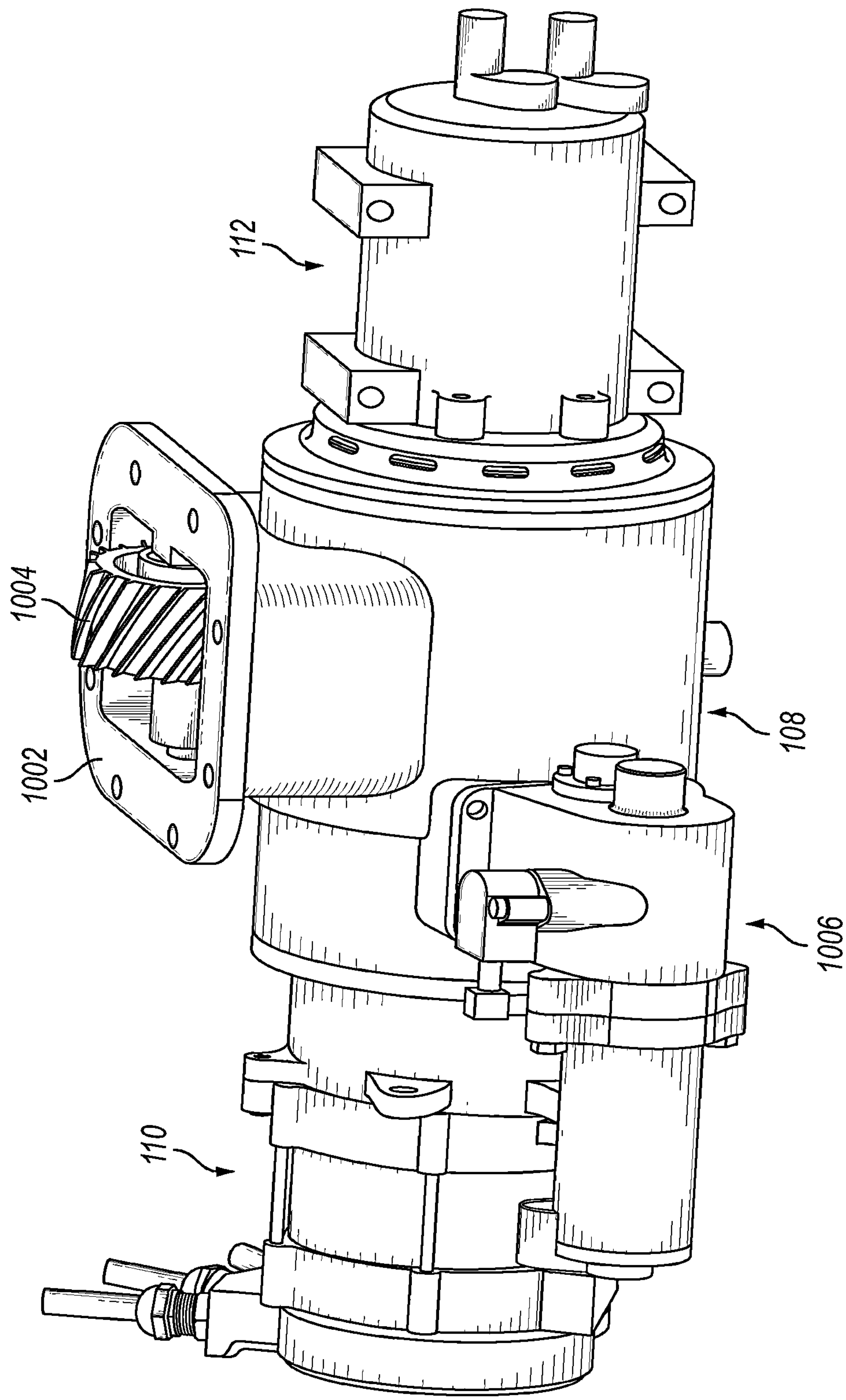
FIG. 9 illustrates a physical representative embodiment for components in an electrically regenerative accessory drive.

Referencing FIG. 9, an example perspective illustration of the mechanical layout of a PTO device is depicted. The example PTO device is configured to mount to a transmission at a PTO interface—for example to an 8-bolt PTO interface at the flange 1002. The example PTO device includes a gear box 108, which may be a planetary gear assembly. The example PTO device includes a torque coupling (idler gear 1004 in the example), a motor/generator 112, and a load 110. The example PTO device further includes a shift actuator 1006 configured to arrange the gear box 108 to provide the desired power flow arrangement.

One of skill in the art, having the benefit of the disclosure herein, will understand that gear ratio selections, including both actable run-time options and fixed design time selections, can be made to support a number of operating modes, loads, and the like. Certain considerations for determining gear ratio selections include, without limitation: the torque profile and operating parameters of the motor/generator; the torque requirements of the driveline including PTO torque and power limitations; the torque capabilities of the driveline including the prime mover and/or transmission; cranking torque and speed requirements of the prime mover; final gear ratios to the wheels or motive load; the torque, speed, and power requirements of the shared load; the available installation space for the PTO device; the driveline engagement options for the system (e.g., transmission PTO interfaces and available gears for coupling); the operating modes to be supported; the torque and speed maps of various devices in the system (e.g., the prime mover, the motor/generator, the transmission, and/or the vehicle system in use); the duty cycle of the vehicle and/or PTO device; offsetting costs and/or space savings from omitted devices due to the PTO device; and/or the commercial sensitivities of the system having the PTO device to capital expenditures, engineering and integration costs, and operating costs.

Figure 10:
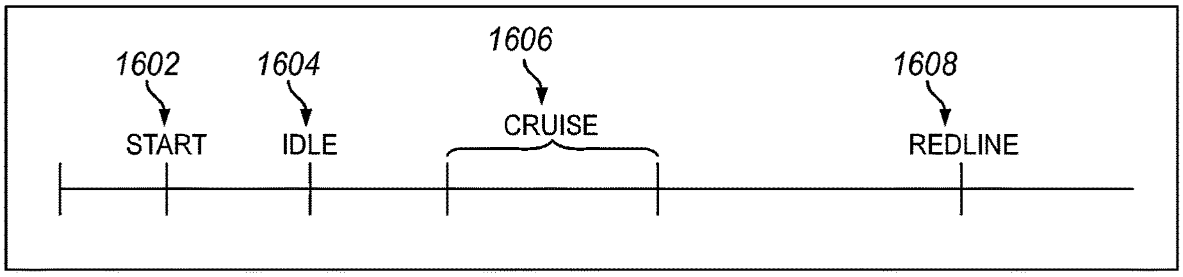
FIG. 10 depicts driveline speed ranges for an electrically regenerative accessory drive in an embodiment of the present disclosure.

Referencing FIG. 10, example operating speed ranges for the prime mover 102 are depicted. Example operating speed ranges can be determined for any aspect of the driveline and/or the system, and can be utilized to determine desired capabilities for the motor/generator 112 and/or for selecting gear ratios in the PTO device. In the example of FIG. 10, an operating speed 1602 for "start" is depicted, which may, for example, be utilized to determine gear ratios and/or motor/generator 112 capabilities for a crank mode operation. An operating speed 1604 for "idle" is depicted, which may, for example, be utilized to determine requirements to support the load 110 (e.g., as the load 110 is generally designed for proper operation at a proportion of prime mover speed, with the idle speed as the lower normal operating limit). An operating speed 1606 for "cruise" is depicted, which may for example be utilized to determine motor/generator 112 capabilities for nominal charging operations (e.g., where the motor/generator 112 is being charged by the driveline in cruise operations). An operating speed 1608 for "redline" is depicted, which may for example be utilized to determine the highest prime mover 102 speed expected during operation of the vehicle. The actual values for the speed ranges 1602, 1604, 1606, 1608 are design considerations for a particular system, but a system can be configured with a PTO device for any speed ranges 1602, 1604, 1606, 1608.

An example PTO device includes one or more aspects to protect from an overspeed operation of the motor/generator 112. In an example, a 2-speed gearbox 108 is mounted on the PTO 106 with the motor/generator 112 and load (e.g., HVAC compressor) connected on either side. The motor/generator 112 is connected to the prime mover 102 (e.g., the engine) through a 28:1 speed ratio in the cranking mode. In an example, cranking speed of the prime mover 102 varies from 150 to 400 RPM, and in an example when the engine starts it speeds up (e.g., to 840 rpm). In certain embodiments, the clutch 108 is opened as soon as the engine starts (e.g., reaches a predetermined speed such as 400 RPM). The opening of the clutch 108 prevents the engine speed excursion from providing an overspeed condition to the motor/generator 112. Additionally or alternatively, a clutch (not shown) between the motor/generator 112 and the load drive shaft may be utilized to prevent an overspeed condition of the motor/generator 112.

The example 28:1 speed ratio (motor faster) cases the torque requirement on the motor/generator 112 (e.g., relative to a lower ratio such as 21:1), and allows for greater off-nominal starting capability (e.g., cold start, which may have a greater torque requirement). However, a greater speed ratio may increase the likelihood that a motor/generator 112 overspeed may result without overspeed protection aspects.

In certain embodiments, an operation to dis-engage the clutch 108 as soon as engine 102 starts is sufficiently responsive to prevent an overspeed event. For example, an engine may take 500 ms to overspeed to 840 rpm after start speed is reached, and a clutch response time can be between about 150 ms (e.g., for dis-engagement) to 250 ms (e.g., for engagement). The use of the clutch 108 may be desirable in certain embodiments where the designer of the PTO device also has access to controls of the clutch 108 and/or where appropriate communication messages to the transmission are available, and/or where the vehicle application allows utilization of the clutch 108 during start-up operations.

In another example, engine cranking is brought close to, or into, the idle range and/or the start range, before engine fueling is enabled. For example, where the start range is considered to be 400 rpm, the motor/generator 112 operating in the crank mode may bring the engine speed close to (e.g., 350-400 rpm) and/or into (e.g., 400-425 rpm) the start range before engine fueling is enabled. In a further example, such as where the engine idle speed is 500 rpm, the motor/generator 112 operating in the crank mode may bring the engine speed close to and/or into the idle range before engine fueling is enabled. The lower speed error (e.g., close to the start and/or idle speed) and/or negative speed error (e.g., above the start and/or idle speed) introduced by the crank operations reduces (or briefly eliminates) the fueling target by the fueling governor of the engine, reducing the engine speed overshoot and accordingly the tendency for the motor/generator 112 to experience an overspeed event. The use of engine fueling control may be desirable in certain embodiments where the designer of the PTO device also has access to the controls of the engine 102 and/or where appropriate communication messages to the engine are available.

In another example, the motor/generator 112 can be switched from the motoring mode to the generating mode as soon as the engine starts (e.g., reaches a start speed, reaches an idle speed, and/or begins fueling). Accordingly, the motor/generator 112 can directly dampen the engine speed excursion and reduce the tendency of the motor/generator 112 to overspeed. Additionally, energy harvested from the engine on startup can be stored in the battery assembly 116. Any or all of the described overspeed control operations and/or aspects may be included in a particular system.

Figure 11:
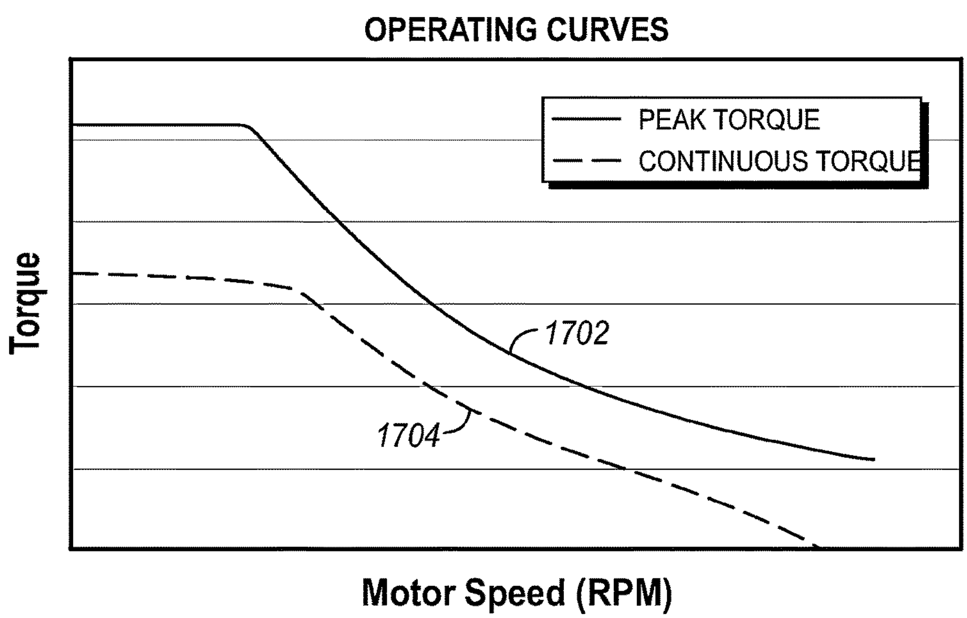
FIG. 11 depicts example operating curves for an electrically regenerative accessory drive in an embodiment of the present disclosure.
Figure 12:
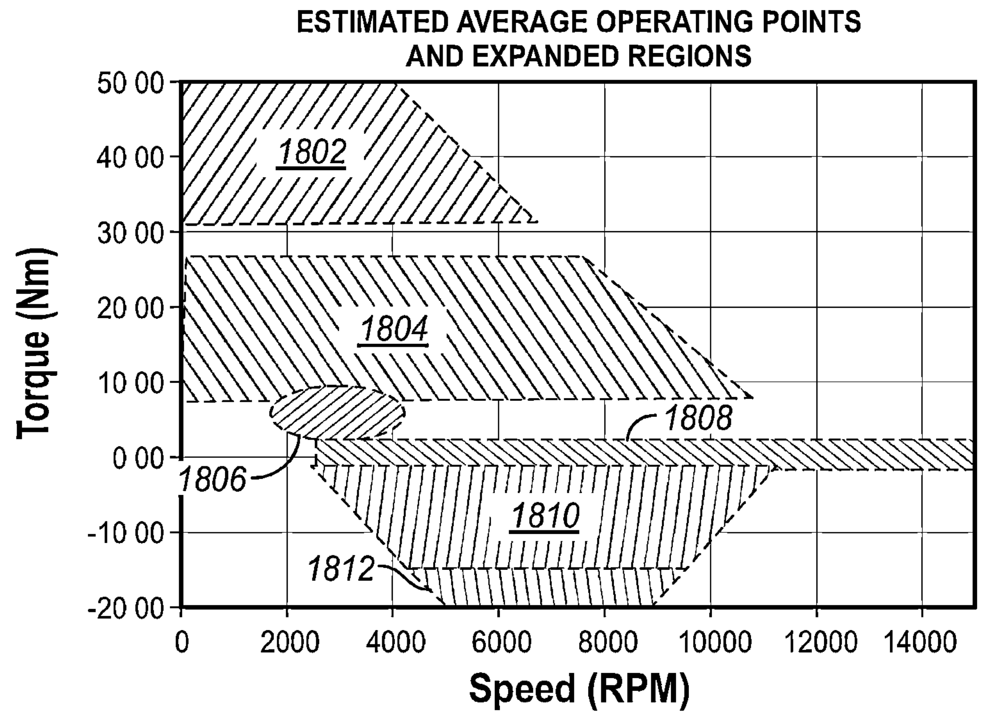
FIG. 12 depicts motor speed-torque ranges for an electrically regenerative accessory drive in an embodiment of the present disclosure.
Figure 13:
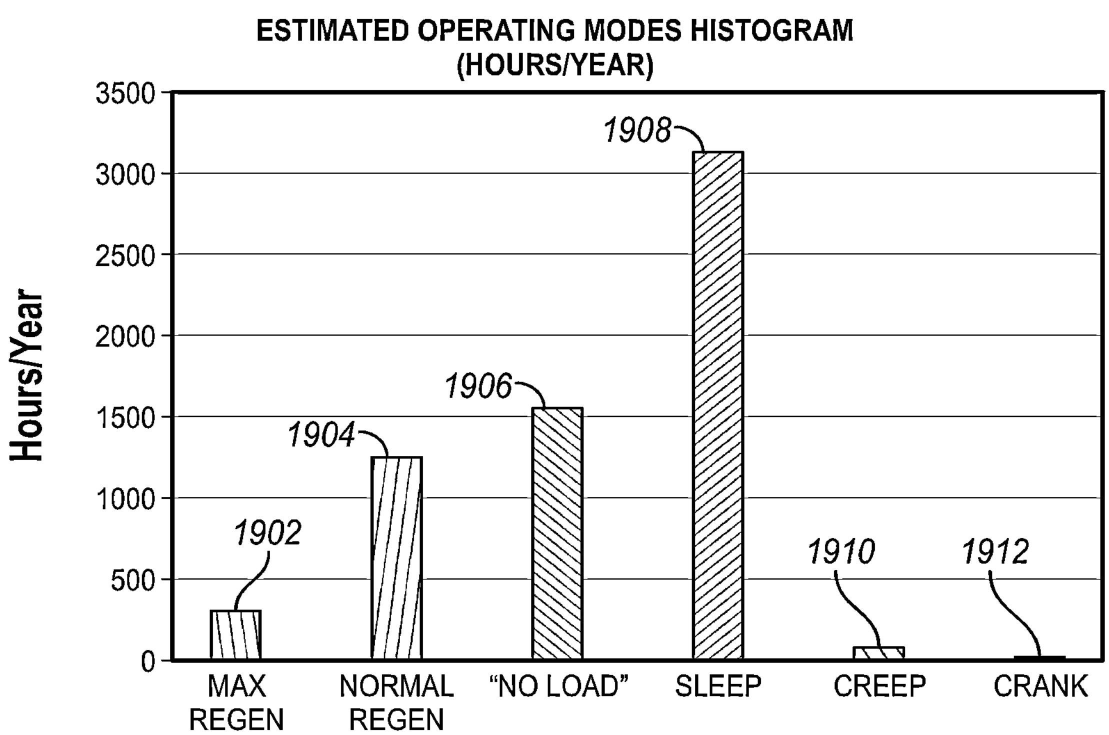
FIG. 13 depicts an example operating mode duty cycle for an electrically regenerative accessory drive in an embodiment of the present disclosure.

Referencing FIG. 11, example operating curves for a motor/generator 112 are depicted. The actual values of the operating curves are design considerations for a particular system, but a system can be configured for any motor/generator 112 having sufficient torque (with appropriate gear ratios) and power capability (e.g., a function of the torque multiplied by the speed) to perform the desired interactions with the load and the driveline, and to support the desired operating modes of the PTO device. Referencing FIG. 12, example operating regions for the motor/generator 112 are depicted. In the example, region 1802 represents a maximum power output region (e.g., crank mode), region 1804 represents a high power output region (e.g., creep mode), region 1806 represents a nominal power output region (e.g., sleep mode, such as when the motor/generator 112 is powering the load 110 and de-coupled from the driveline), region 1808 represents a nominal no load region (e.g., where the motor generator 112 is not coupled to the driveline or powering the load 110), region 1810 represents a normal regeneration mode (e.g., cruise mode), and region 1812 represents a maximum regeneration mode (e.g., regeneration from a high motive power load, such as in descending a steep hill). The actual values of the operation regions are design considerations for a particular system, but a system can be configured to support whichever operating regions are expected to be present on the vehicle. Referencing FIG. 13, an example duty cycle histogram is presented for a vehicle, with expected hours to be experienced in a max regen 1902 condition, a normal regen 1904 condition, a no load 1906 condition, a sleep 1908 condition, a creep 1910 condition, and a crank 1912 condition. The actual values of the duty cycle histogram are design considerations for a particular system, and can be used to determine, without limitation: gear ratios; which gear ratio selections should be supported; the requirements for the motor/generator 112 capabilities including peak and continuous ratings and high efficiency operation regions; and/or sizing of the battery assembly 116. Certain further considerations for the motor/generator 112 and/or the battery assembly 116 include, without limitation: the required power levels; the driveline speeds at various operating conditions; the time and power output of the sleep mode; the availability to regenerate the battery assembly 116 away from the sleep mode; crank requirements (torque, time, temperature, and speed slew rate or trajectory); the efficiency profile of the motor/generator 112 at various speed and torque values; the cost in components, integration, and design for the provision of multiple gear ratios; and the durability and life expectations of the motor/generator 112.

In certain embodiments, characteristics of the motor/generator 112 beyond just the torque and speed considerations may be valuable for certain embodiments, and may be less desirable for other embodiments. For example, a permanent magnet motor may have higher efficiency at certain operating conditions, but may be higher cost, higher inertial torque, and lower torque capability. A permanent magnet motor may be capable of high speed operation, but may generate undesirable EMF on the motor phase lines. In another example, an externally excited motor may have lower operating efficiency, but have a low cost and the ability to selectively disable the rotor field, minimizing drag torque during no load operation. In another example, an induction motor may have a medium efficiency and high torque capability, but have higher cost, size, and weight compared to an externally excited motor. The capabilities of a particular motor further depend on the specific design, so these criteria may be different for motors of these types depending upon the specific design. Additionally or alternatively, certain aspects such as expected bearing life, brushes, control of rotating torque (e.g., a disconnecting clutch and/or capability to turn off the magnetic field), and/or maintenance requirements may make a particular motor favored or disfavored for a particular system.

In certain embodiments, depending upon the desired operating modes, it may be desirable that a PTO device has an extended lifetime. For example, in certain embodiments, the PTO device, and the motor/generator 112 specifically, operates both during the day (e.g., regenerating the battery assembly 116 and/or recovering motive power) and during the night (e.g., providing climate control and powering personal devices in the sleep mode). Accordingly, the usage of the PTO device over a given period of the vehicle operating cycle may be higher than other accessories on the vehicle. Accordingly, robustness of typical failure components such as bearings may be a strong consideration for system design. Additionally, temperature control of components and/or reduced operating speeds (e.g., through gear ratio selections and/or additional gear options) for the PTO device may have particular value for certain embodiments.

Incorporation of an PTO device having a motor/generator 112 system into a traditional production electrical system may include changes to the electrical system, such as conversion of power distribution from a 12V system to a 12V/48V system, removal of the starter and alternator, restructuring the startup sequence, control of accessory and ignition modes, and the like. In embodiments, a networked communication system (e.g., Controller Area Network (CAN)) may provide for communications amongst PTO electrical components, such as with the ECU 122, TCU 120, and the like.

For the startup sequence of a prime mover 102 having a PTO device integrated therewith, the starter and/or the alternator may be removed and replaced by the PTO device components (e.g., load 110, gearbox 108, motor/generator 112, and the like). In the traditional production system, starting is controlled through a network of relays, which could be cumbersome to control all of the available operating modes for the PTO device, so the PTO device sequence, operating states, and other state control functions may be managed through a networked communication system. For example, a general engine start sequence may be as follows: (1) a driver turns the key to an ignition position, (2) ECU 122, TCU 120, and MDC 114 are turned on, (3) the driver turns the key to a start position, (4) control units check for the system being ready to start (e.g., the TCU 120 checks that transmission is in neutral and broadcasts over network, ECU 122 checks that the engine is ready to start and broadcasts over the network, and the like), (5) engine is started (e.g., MDC 114 cranks engine, ECU 122 starts fueling and controlling the engine, and the like), and (6) the driver returns the key to the ignition position. The PTO device may include a shift control override, such as where the transmission cannot be shifted with PTO load on the countershaft. For example, before each shift, the TCU 120 commands the MDC 114 to bring the motor shaft to zero torque. The PTO device may include a sleep mode and wake mode, such as where the load 110 (e.g., HVAC compressor) can be enabled with the engine off.

In embodiments, the motor drive converter (MDC) 114 may be a combined motor drive and DC/DC converter intended to support electrification of vehicles, such as using a multi-rail 48 V/12 V architecture. The motor drive supports starter and generator operation of a motor/generator 112 (e.g., a permanent magnet synchronous motor, wire-wound synchronous motor, induction motor, and the like) and the DC/DC converter bridges system voltages (e.g., a 48V system and a 12V system with bidirectional power flow). Motor position information is provided from a sensor in the motor/generator 112, such as fed to a field-oriented control algorithm running on a processor in the MDC 114. The MDC 114 may provide for continuous and peak power (e.g., 10 kW peak/5 kW continuous power), such as providing transient 10 kW power (e.g., 30 seconds) during crank mode, continuous 5 kW power during cruise mode in flat road conditions (e.g., split between the 48V sub-system and the DC-to-DC converter sub-system), continuous 3 kW continuous power during sleep mode, and the like. The MDC enclosure may be configured to efficiently dissipate heat, such as being made of an aluminum heatsink. The assembled MDC 114, when mated with electrical connectors, may provide ingress protection for the internal components, as well as olcophobic and hydrophobic protection, such as with a vent to reduce structural loads on the enclosure when exposed to altitude and temperature gradients.

The location of the MDC 114 may be near to both the transmission 104 and battery assembly 116 to minimize heavy cabling and voltage drop in the system. For example, the MDC 114 may be located on a surface of battery box of the battery assembly 116. In certain embodiments, the MDC 114 may be distributed and have certain aspects located throughout the system.

Figure 14A:
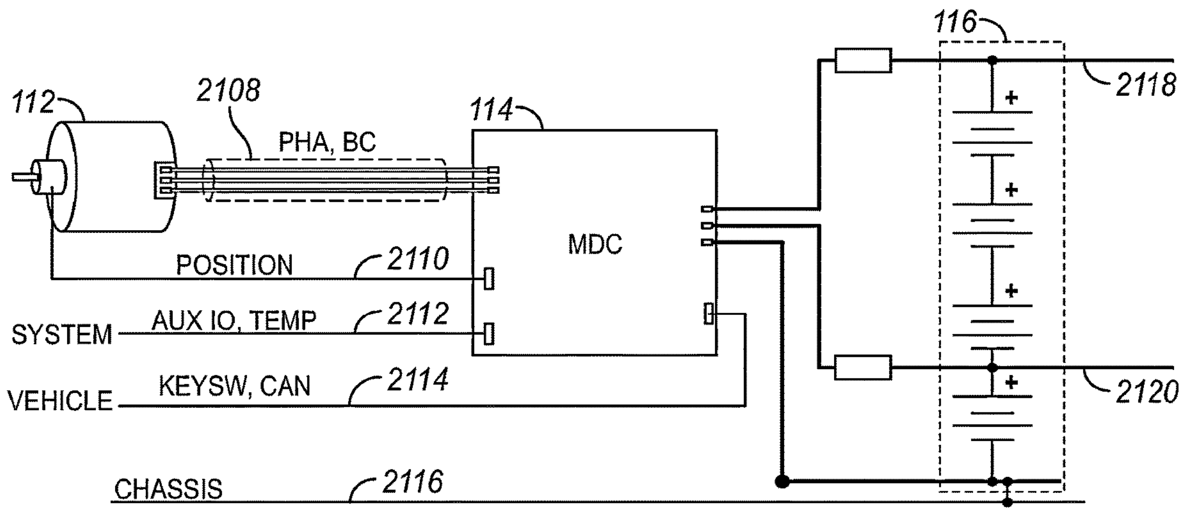
FIG. 14A schematically depicts a motor drive controller with a split battery configuration for an electrically regenerative accessory drive in an embodiment of the present disclosure.
Figure 14B:
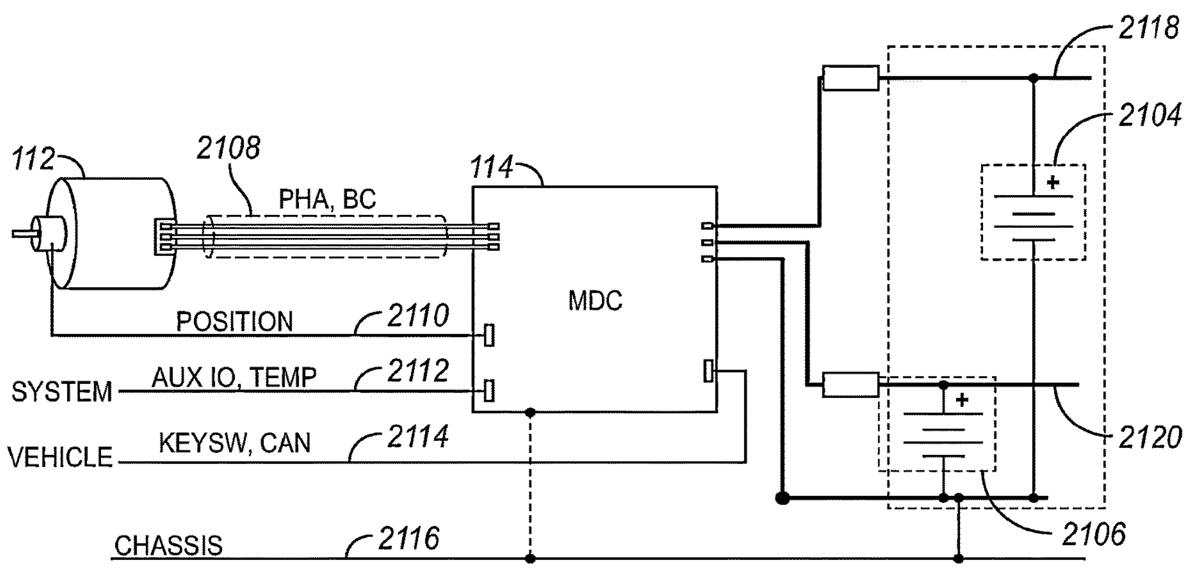
FIG. 14B schematically depicts a motor drive controller with a two-battery configuration for an electrically regenerative accessory drive in an embodiment of the present disclosure.
Figure 15:
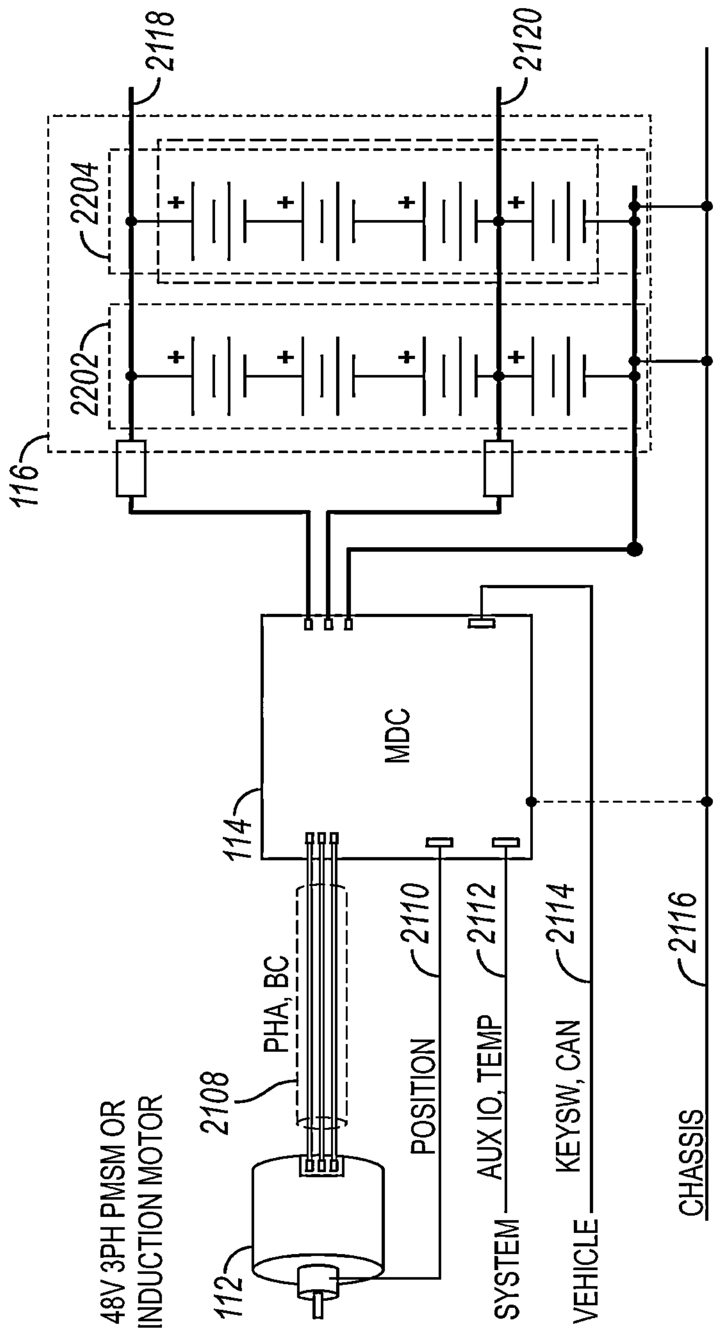
FIG. 15 schematically depicts a motor drive controller with a dual split battery configuration for an electrically regenerative accessory drive in an embodiment of the present disclosure.

Referencing FIG. 14A, an example power distribution configuration for a PTO device is depicted. Power distribution may be configured to run off one or more configurations of the battery assembly 116, such as banks of 12V batteries, separate 12V and 48V batteries, and the like. For example, as depicted in FIG. 14A, the battery assembly 116 may be configured of a battery pack of four 12V batteries in series, providing a 48V power interface 2118. In the example of FIG. 14A, the battery assembly 116 further includes a quarter-tapped 12V power interface 2120, providing for the 12V power. The example of FIG. 14A further includes communications to the MDC 114 such as a motor speed (e.g., provided by the motor and/or a speed sensor), communications 2112 with a system (e.g., providing auxiliary I/O, temperatures, etc.), and/or communications 2114 with a vehicle (e.g., providing vehicle state information, keyswitch signal, CAN communications, or the like). The example of FIG. 14A further includes a chassis electrical coupling 2116 (e.g., for grounding), and communications between the MDC 114 and the motor 112 (e.g., three-phase AC power from controlled inverters on the MDC 114). Referencing FIG. 14B, a PTO device further includes the battery assembly 116 having a single 48V battery 2104 (e.g., a Li-ion battery), with a separate 12V battery to provide the 12V power interface 2120. Referencing FIG. 15, an example battery assembly 116 further includes a two battery packs 2202, 2204 each having 4 four 12V batteries in series (8 total batteries in the example of FIG. 15). In the example of FIG. 15, the 12V power interface 2120 may include a single 12V battery providing the 12V power, or a pair of 12V batteries in parallel (e.g., one from each of the battery packs), depending upon the amount of 12V energy storage is desired for the system. The selection of the number of batteries to include in a battery assembly 116 is a design choice that depends upon the system voltages desired (e.g., both the number of distinct voltages, and the values of those voltages), the total amount of energy that is to be stored in the battery pack, the amount of current to be delivered by the battery pack, and the voltages, energy capacities, and current capacities of the batteries in the battery pack.

As depicted in FIG. 15, a first bank of 12V batteries 2202 and second bank of 12V batteries 2204 may be utilized. The 12V and 48V outputs may be connected through the MDC's DC-to-DC converter and monitored by the battery management system (BMS) 118. The BMS 118 may monitor and report back current, voltage, and temperature measurements and, when the DC-to-DC converter is off, may have the ability to send a wake signal to enable charging and balancing. The BMS 118 may monitor battery conditions for life-time characteristics, such as voltages for different batteries throughout the charge-discharge, and provide active balancing via discharge control to manage the batteries to the same voltage. The PTO device electrical system may implement a single point ground 2116, such as with a central ground located on the negative terminal of the MDC 114, with battery strings grounded to that point. As depicted in FIG. 14A, FIG. 14B, and FIG. 15, the MDC 114 provides the three-phase power lines 2108 to the motor/generator 112, such as input voltages when the motor/generator 112 is operating as a motor and output voltages when the motor/generator 112 is operating as a generator. Control and sensor signals may also be provided to/from the MDC 114 in the control of the PTO system, such as position information 2110 from the motor/generator 112, auxiliary I/O and temperature data 2112 for the system, key switch information and network data 2114 for the vehicle, and the like.

Figure 16:
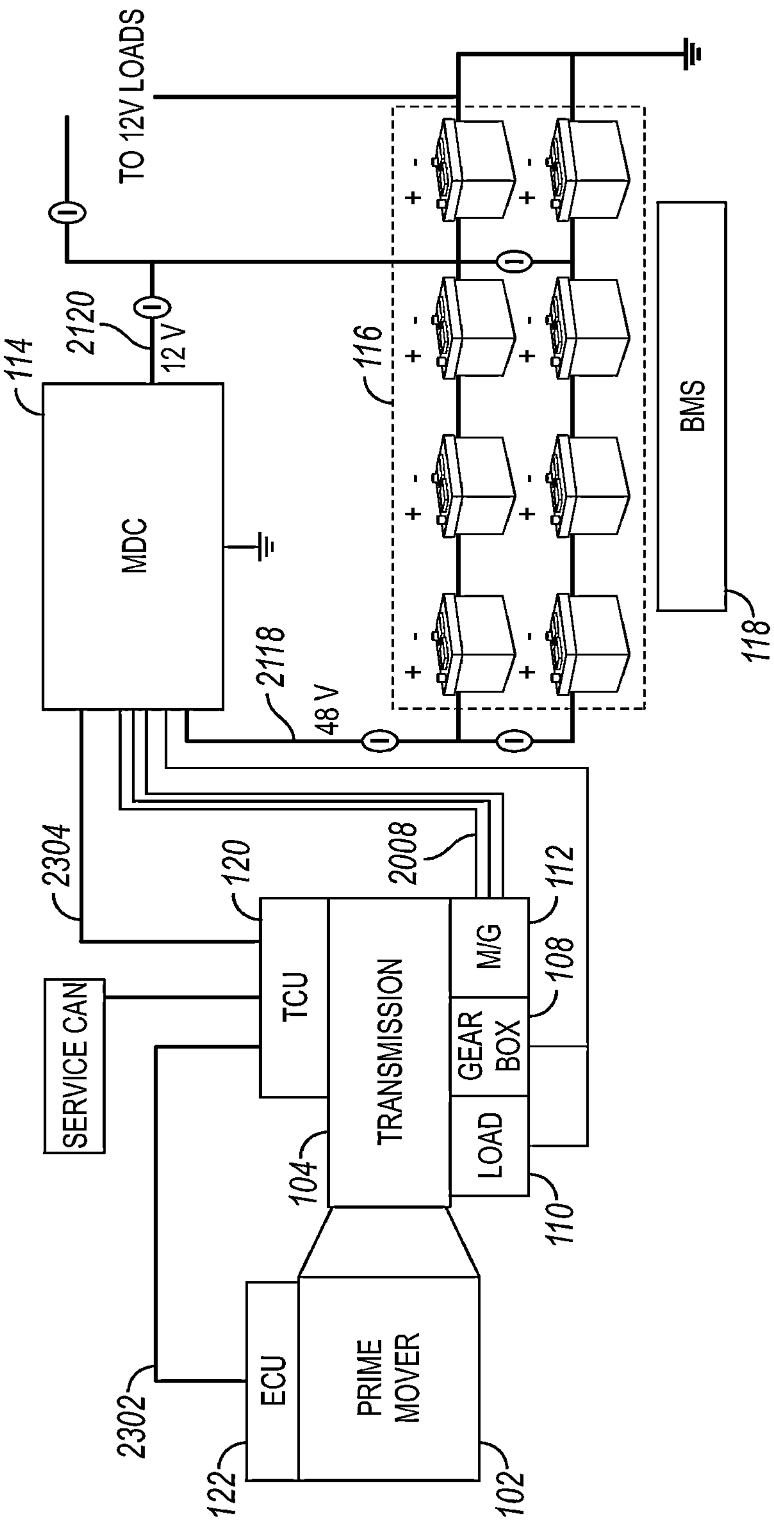
FIG. 16 schematically depicts a system architecture for an electrically regenerative accessory drive interfacing with two separate load voltages in an embodiment of the present disclosure.

FIG. 16 depicts a 48-volt system architecture for an electrically regenerative accessory drive in an embodiment of the present disclosure. In addition to other examples depicted throughout the present disclosure, the example of FIG. 16 depicts a number of communication networks distributed around the vehicle. For example, communication link 2302 is depicted with the ECU 220 in communication with the TCU 120, for example on a private CAN link, or on a J1939 public datalink, and/or a network having any known communication protocol. Communication link 2304 similarly is depicted between the TCU 120 and the MDC 114, which may be the same communication link as link 2302, or a separate link, and may be private or public. Additionally or alternatively, any one or more of the datalinks may be a wireless datalink. The example of FIG. 16 utilizes two battery packs, each having 4 batteries in series.

Figure 17:
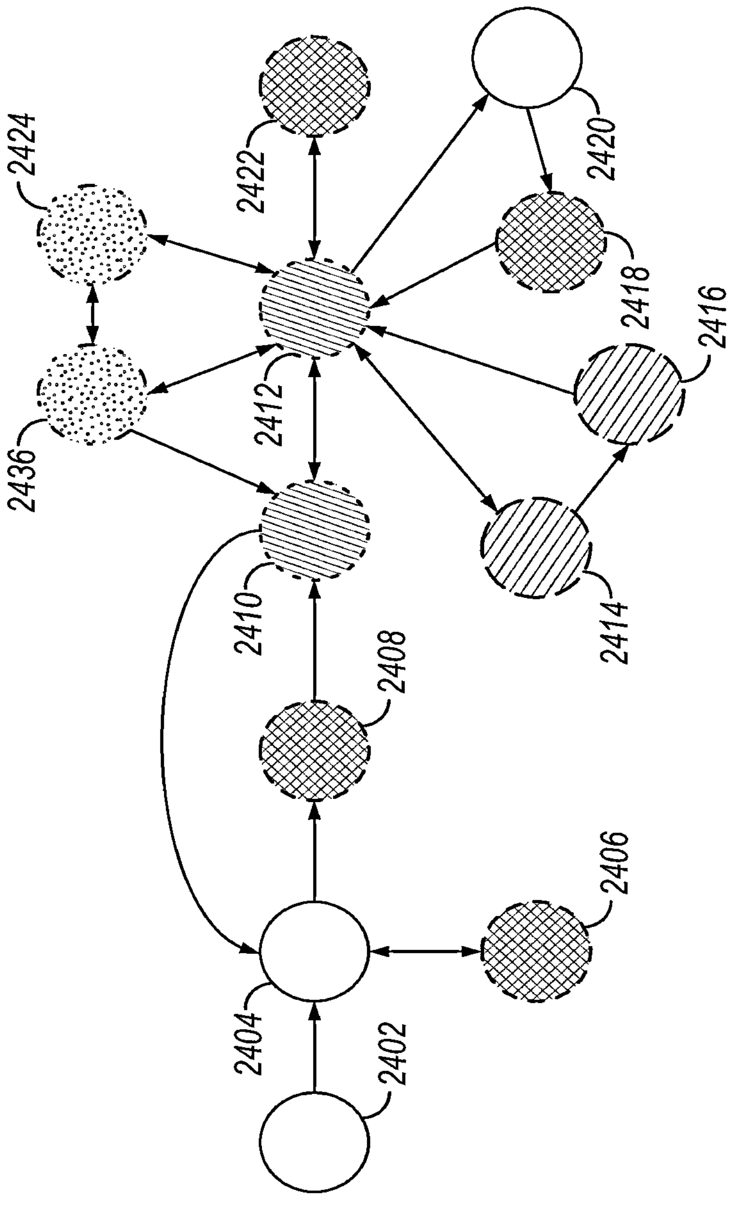
FIG. 17 depicts an example state diagram for an electrically regenerative accessory drive in an embodiment of the present disclosure.

FIG. 17 depicts a state diagram for an example motor/generator 112. The example state diagram includes a keyoff state 2402, for example a starting condition for the motor/generator 112 applied by the MCU 114 at a startup time for the vehicle. The example state diagram depicts a transition to an engine off state 2404, for example in response to a keyswitch signal before the engine is started. The example state diagram further depicts a transition to a sleep state 2406, for example in response to a system shutdown and/or an auxiliary input (e.g., from a sleeper cab console or a selected keyswitch position) to the MCU 114 indicating that powering of a shared load 110 is desired even though the engine is not running. The example state diagram further includes a transition back to the engine off state 2404 when conditions are met (e.g., an auxiliary input is no longer present). The example state diagram further includes a transition to crank state 2408 (to start the engine), and/or a neutral state 2410 (e.g., the PTO device is not in torque communication with the driveline). The driving state 2412 (or cruise, etc.) can be transitioned to when the vehicle is moving, and the states 2414 (driving in coast) and 2416 (driving with engine off—e.g., motoring) are available under the appropriate system conditions. The crank state 2418 is depicted from the engine stop state 2420 (e.g., for a start/stop embodiment of the PTO device), but the crank state 2408 may additionally or alternatively be utilized. The creep engine on state 2436 and creep engine off states 2424 are depicted, depending upon the conditions present in the system, and the desired configuration to engage a creep mode. Finally, the drive shifting state 2422 is depicted, which may be utilized, for example, to provide for the PTO device to decouple from the driveline (e.g., engage a neutral position of the shift actuator 1006) during a shifting event. The depicted states are non-limiting, and the state diagram provides an example framework to control the transitions of the PTO device between operating modes.

An example system includes a PTO device that selectively couples to a driveline of a vehicle, a motor/generator 112 electrically coupled to an electrical power storage system, a shared load 110 selectively powered by the driveline or the motor/generator 112. The example system further includes where the PTO device further includes a coupling actuator (e.g., shift actuator 1006, gear box 108, idler gear 1004, and/or planetary gear assembly) that couples the shared load 110 to the motor/generator 112 in a first position, and to the driveline in a second position.

An example system includes where the coupling actuator further couples the driveline to the motor/generator in the second position, where the coupling actuator includes a two-speed gear box, and/or where the coupling actuator couples the motor-generator to the shared load in a first gear ratio in the first position (e.g., neutral or sleep mode), and couples the motor-generator to the driveline in a second gear ratio in the second position (e.g., cruise mode). An example system includes where the coupling actuator couples the motor/generator to the driveline in a second gear ratio in the second position (e.g., cruise mode), and in a third gear ratio in a third position (e.g., crank or creep mode); where the coupling actuator further couples the motor/generator to the driveline in the second gear ratio in response to the driveline providing torque to the motor/generator; and/or where the coupling actuator further couples the motor/generator to the driveline in the third gear ratio in response to the motor/generator providing torque to the driveline. An example system includes where the coupling actuator further decouples the motor/generator from the driveline in the first position.

Figure 18:
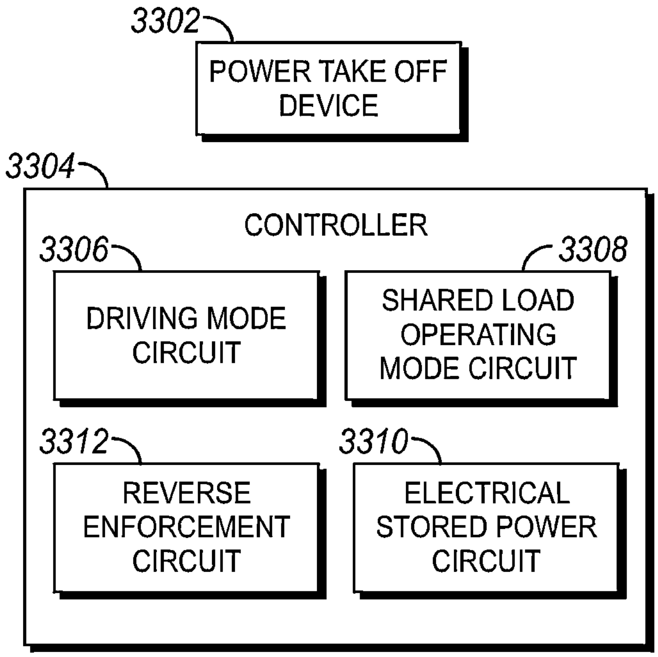
FIG. 18 is a schematic control diagram of an example PTO device.

Referencing FIG. 18, an example system includes a PTO device 3302 having a coupling actuator (e.g., shift actuator 1006, gear box 108, idle gear 1004, and/or planetary gear assembly) configured to couple a shared load 110 to a motor/generator 112 in a first position (e.g., neutral or a sleep mode), and to couple the shared load to a driveline of a vehicle in a second position (e.g., a cruise mode); a controller 3304 including a driving mode circuit 3306 structured to determine a current vehicle operating mode (e.g., utilizing keyswitch, network signals, operations exercising a state diagram, vehicle conditions such as vehicle speed, power or torque output, etc.) as one of a sleep mode or a motive mode (e.g., cruise, driving, etc.); and a shared load operating mode circuit 3308 structured to command the coupling actuator to the first position in response to the sleep mode, and to command the coupling actuator to the second position in response to the motive mode.

An example system includes the coupling actuator further configured to de-couple the driveline from the shared load and the motor/generator in the first position. An example system includes where the coupling actuator is further configured to couple the driveline of the vehicle to the motor/generator in a third position and/or where the driving mode circuit 3306 is further structured to determine the current vehicle operating mode as a creep mode, and where the shared load operating mode circuit 3308 is further structured to command the coupling actuator to the third position in response to the creep mode. An example system includes a load drive shaft selectively coupled to the shared load, where the motor/generator powers the load drive shaft in the first position, and where the driveline powers the load drive shaft in the second position; a shared load coupling actuator structured to selectively de-couple the shared load from the load drive shaft; and where the shared load operating mode circuit 3308 is further structured to command the shared load coupling actuator to de-couple the shared load from the load drive shaft in response to the creep mode. An example system includes where the driving mode circuit 3306 is further structured to determine the current vehicle operating mode as a crank mode, and where the shared load operating mode circuit 3308 is further structured to command the coupling actuator to the third position in response to the crank mode. An example system including where the coupling actuator is further configured to selectively couple the motor/generator to the driveline of the vehicle in the second position; an electrical stored power circuit 3310 structured to determine a state of charge of an electrical power storage system (e.g., battery assembly 116), and where the shared load operating mode circuit 3308 is further structured to command the coupling actuator to couple the motor/generator to the driveline of the vehicle in the second position in response to the state of charge of the electrical power storage system; and/or the coupling actuator is further configured to couple the driveline of the vehicle to the motor/generator in a third position, and where a first gear ratio between the motor/generator and the driveline of the vehicle in the second position is distinct from a second gear ratio between the motor/generator and the driveline of the vehicle in the third position (e.g., gear ratio between motor/generator and driveline is different between cruise mode and creep mode).

Figure 19:
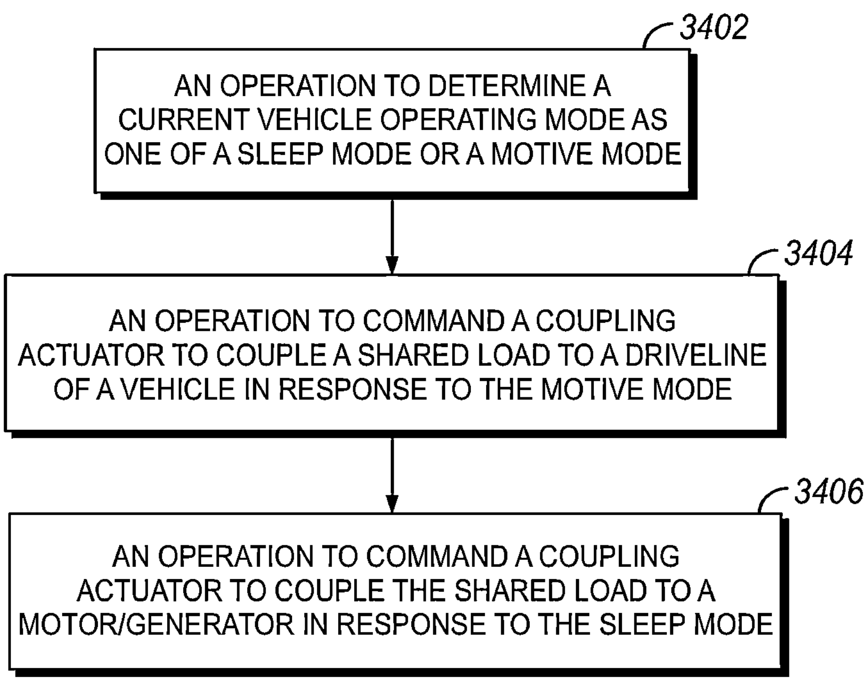
FIG. 19 is a schematic flow diagram of a procedure for controlling a PTO device in selected modes.

Referencing FIG. 19, an example procedure includes an operation 3402 to determine a current vehicle operating mode as one of a sleep mode or a motive mode; an operation 3404 to command a coupling actuator to couple a shared load to a driveline of a vehicle in response to the motive mode; and an operation 3406 to command the coupling actuator to couple the shared load to a motor/generator in response to the sleep mode.

An example procedure further includes an operation to de-couple the driveline of the vehicle from both of the shared load and the motor/generator in response to the sleep mode. An example procedure further includes an operation to determine the current vehicle operating mode as a creep mode, and to command the coupling actuator to couple the motor/generator to the driveline in response to the creep mode. An example procedure further includes an operation to determine the current vehicle operating mode as a crank mode, and to command the coupling actuator to couple the motor/generator to the driveline in response to the crank mode. An example procedure further includes an operation to selectively couple the driveline to the motor/generator in response to the motive mode (e.g., cruise mode, driving mode, etc.); an operation to determine a state of charge of an electrical power storage system, and where the selectively coupling the driveline to the motor/generator is further in response to the state of charge. Example and non-limiting operations to selectively couple the driveline to the motor/generator in response to the state of charge include one or more of the following operations: determining that a state of charge of the electrical power storage system (e.g., battery assembly) is below a threshold; determining that a state of charge of the battery assembly is sufficiently low that an estimated amount of regeneration activity of the vehicle can be stored; determining that a state of charge of the battery assembly is below an amount estimated to provide sufficient upcoming sleep mode operation for a predetermined amount of time; and/or determining that a battery assembly charge level should be increased to protect the battery assembly state of health. An example procedure further includes an operation to determine the current vehicle operating mode as one of a crank mode or a creep mode, an operation to command the coupling actuator to couple the motor/generator to the driveline in response to the one of the crank mode or the creep mode; and/or an operation to command the coupling actuator to couple the motor/generator to the driveline at a first gear ratio in response to the motive mode, and to couple the motor/generator to the driveline at a second gear ratio in response to the one of the crank mode or the creep mode, and where the first gear ratio is distinct from the second gear ratio.

Again referencing FIG. 18, an example system includes a PTO device having a coupling actuator configured to couple a shared load to a motor/generator in a first position, to couple the shared load to a driveline of a vehicle in a second position, and to couple the motor/generator to the driveline of the vehicle in a third position. The system further includes a controller 3304 including a driving mode circuit 3306 structured to determine a current vehicle operating mode as one of a sleep mode, a motive mode, or a creep mode, and a shared load operating mode circuit 3308 structured to command the coupling actuator to the first position in response to the sleep mode, to command the coupling actuator to the second position in response to the motive mode, and to command the coupling actuator to the third position in response to the creep mode.

Certain further aspects of an example system are described following, any one or more of which may be present in certain embodiments. An example system includes where the controller 3304 further includes a reverse enforcement circuit 3312 structured to determine a reverse gearing position. Operations to determine a reverse gearing position include providing and/or receiving messages on a datalink to confirm gear configurations, receiving a transmission state value indicating whether a reverse gearing position is present, and/or receiving a creep permission value indicating that creep operations that may cause vehicle movement are permitted. In certain embodiments throughout the present disclosure, datalink communications and/or other messages may be received by receiving a dedicated datalink message, by receiving an agreed upon message that is not dedicated but that provides an indication of the received information, determining the information for a message from other information available in the system (e.g., a positive forward vehicle speed could be utilized to preclude a reverse creep operation), communicating with a sensor detecting the value (e.g., a transmission gear position sensor), and/or by receiving an indicator (e.g., a voltage detected at a location, such as a controller I/O location, a hardwired input to the MDC 114, or other indicator) of the requested value. An example shared load operating mode circuit 3308 is further structured to command the coupling actuator to the third position in response to the reverse gearing position. An example system includes where the shared load operating mode circuit 3308 is further structured to provide a motor/generator direction command value in response to the creep mode, and where the motor/generator is responsive to the motor/generator direction command value. For example, in certain systems, a creep mode may allow the PTO device to provide either forward or reverse motive power the vehicle, and the direction selection may be performed by a gear selection (e.g., requesting a reverse gear shift by the transmission) and/or by controlling the rotating direction of the motor/generator. In certain embodiments, creep operations may be combined with other protective operations, such as decoupling the prime mover from the driveline (e.g., opening the clutch 108) to prevent reverse rotation of the prime mover. Additionally or alternatively, a reversing gear can be provided in the gear box 108, for example for coupling the PTO device to the driveline for the creep mode (and/or for the crank mode, such as where the normal coupling results in a reverse gear). An example system includes the driving mode circuit 3306 further structured to determine the current vehicle operating mode as a crank mode, and where the shared load operating mode circuit 3308 is further structured to command the coupling actuator to the third position in response to the crank mode; where the shared load operating mode circuit 3308 is further structured to provide the motor/generator direction command value further in response to the crank mode; and/or where the shared load operating mode circuit 3308 is further structured to provide the motor/generator direction command value as a first direction in response to the crank mode, and as a second direction in response to the creep mode. An example system includes where a first rotational coupling direction between the motor/generator and the driveline in the second position is opposite a second rotational coupling direction between the motor/generator and the driveline in the third position.

Figure 20:
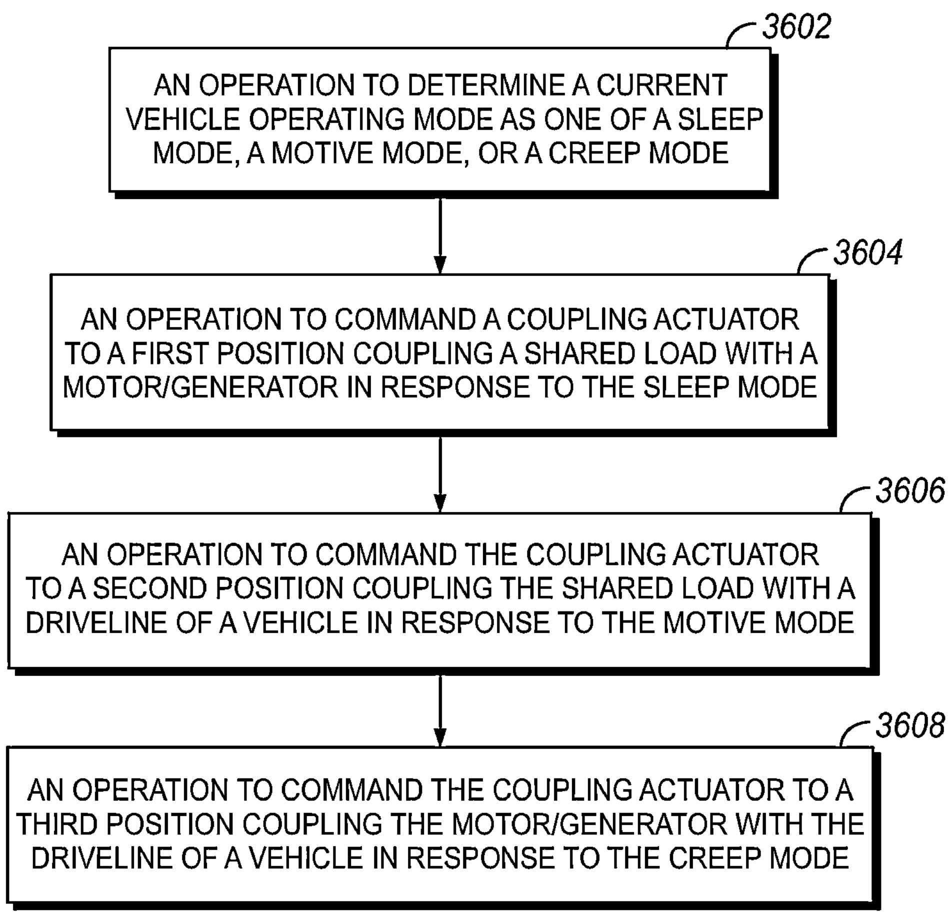
FIG. 20 is a schematic flow diagram of a procedure for operating a PTO device in selected operating modes and ratios.

Referencing FIG. 20, an example procedure includes an operation 3602 to determine a current vehicle operating mode as one of a sleep mode, a motive mode, or a creep mode; an operation 3604 to command a coupling actuator to a first position coupling a shared load with a motor/generator in response to the sleep mode; an operation 3606 to command the coupling actuator to a second position coupling the shared load with a driveline of a vehicle in response to the motive mode; and an operation 3608 to command the coupling actuator to a third position coupling the motor/generator with the driveline of the vehicle in response to the creep mode.

Certain further aspects of an example procedure are described following, any one or more of which may be present in certain embodiments. An example procedure further includes an operation to determine a reverse gearing position, and to command the coupling actuator to the third position further in response to the reverse gearing position; an operation to determine the reverse gearing position in response to a transmission state value; an operation to determine the reverse gearing position in response to a creep permission value; an operation to provide a motor/generator direction command value in response to the creep mode; an operation to determine the current vehicle operating mode as a crank mode, and commanding the coupling actuator to the third position in response to the crank mode; and/or an operation to provide the motor/generator direction command value as a first direction in response to the creep mode, and as a second direction in response to the crank mode.

Certain further aspects of an example procedure are described following, any one or more of which may be present in certain embodiments. An example procedure further includes an operation to determine a reverse gearing position; an operation to command the coupling actuator to the third position in response to a predetermined correlation between: one of the crank mode or the creep mode; and the reverse gearing position.

An example system includes a countershaft transmission, having an input shaft coupled to a prime mover, an output shaft coupled to a motive driveline, and a countershaft selectively transferring torque from the input shaft to the output shaft at selected gear ratios. The transmission further includes a PTO gear including a transmission housing access at a selected gear on the countershaft (e.g., a side access providing a coupling access to a selected gear on the countershaft). The example system further includes a PTO device structured to selectively couple to the selected gear on the countershaft; a motor/generator electrically coupled to an electrical power storage system; a shared load selectively powered by one of the selected gear or the motor/generator; and where the PTO device further includes a sliding clutch structured to couple the shared load to the motor/generator in a first position, and to the selected gear in a second position.

Certain further aspects of an example system are described following, any one or more of which may be present in certain embodiments. An example system includes a main shaft of the transmission coupled to the output shaft of the transmission (e.g., through a planetary gear assembly), and where the countershaft transfers torque to the output shaft through the main shaft (e.g., the countershaft receives torque through a first gear mesh from the input shaft, and transfers torque through a second gear mesh to the main shaft, thereby transferring torque to the output shaft). An example system includes where the selected gear on the countershaft corresponds to a direct drive gear of the input shaft (e.g., a gear at a lockup position between the input shaft and the main shaft). An example system includes where the transmission housing access includes an 8-bolt PTO interface. An example system includes where the PTO device further includes an idler gear engaging the selected gear.

An example system includes a countershaft transmission, having an input shaft coupled to a prime mover; an output shaft coupled to a motive driveline; and a countershaft selectively transferring torque from the input shaft to the output shaft at selected gear ratios; a PTO access including a rear transmission housing access positioned at the countershaft; a PTO device structured to selectively couple to the countershaft; a motor/generator electrically coupled to an electrical power storage system; a shared load selectively powered by one of the selected gear or the motor/generator; and where the PTO device further includes planetary gear assembly structured to couple the shared load to the motor/generator in a first position, and to the countershaft in a second position.

Certain further aspects of an example system are described following, any one or more of which may be present in certain embodiments. An example system includes where the PTO device further includes a splined shaft engaging the countershaft. An example system includes a clutch interposed between the motor/generator and the planetary gear assembly, where the clutch is structured to selectively disconnect the planetary gear assembly from the countershaft. An example system includes where the planetary gear assembly is further structured to further couple the motor/generator to the countershaft in the second position, and/or where the planetary gear assembly is further structured to couple the motor/generator to the countershaft in a third position, to provide a first gear ratio between the motor/generator and the countershaft in the second position, and to provide a second gear ratio between the motor/generator and the countershaft in the third position.

An example system includes a PTO device structured to selectively couple to a driveline of a vehicle; a motor/generator electrically coupled to an electrical power storage system; a shared load selectively powered by one of the driveline or the motor/generator; and where the PTO device further includes a coupling actuator structured to couple the shared load to the motor/generator at a first selected ratio in a first position (e.g., a neutral or sleep mode), and to couple the shared load to the driveline at a second selected ratio in a second position (e.g., a cruise mode or driving mode).

Certain further aspects of an example system are described following, any one or more of which may be present in certain embodiments. An example system includes where the coupling actuator is further structured to couple the motor/generator to the driveline at a third selected ratio in the second position. An example system includes where the coupling actuator is further structured to couple the motor/generator to the driveline at a fourth selected ratio in a third position (e.g., a creep mode or a cranking mode); a load drive shaft selectively coupled to the shared load, where the motor/generator powers the load drive shaft in the first position, and where the driveline powers the load drive shaft in the second position; where the coupling actuator is further structured to de-couple the shared load from the load drive shaft in the third position; and/or where the coupling actuator is further structured to de-couple the load drive shaft from the driveline in the first position. An example system includes where the motor/generator is further structured to charge the electrical power storage system in the second position.

Figure 21:
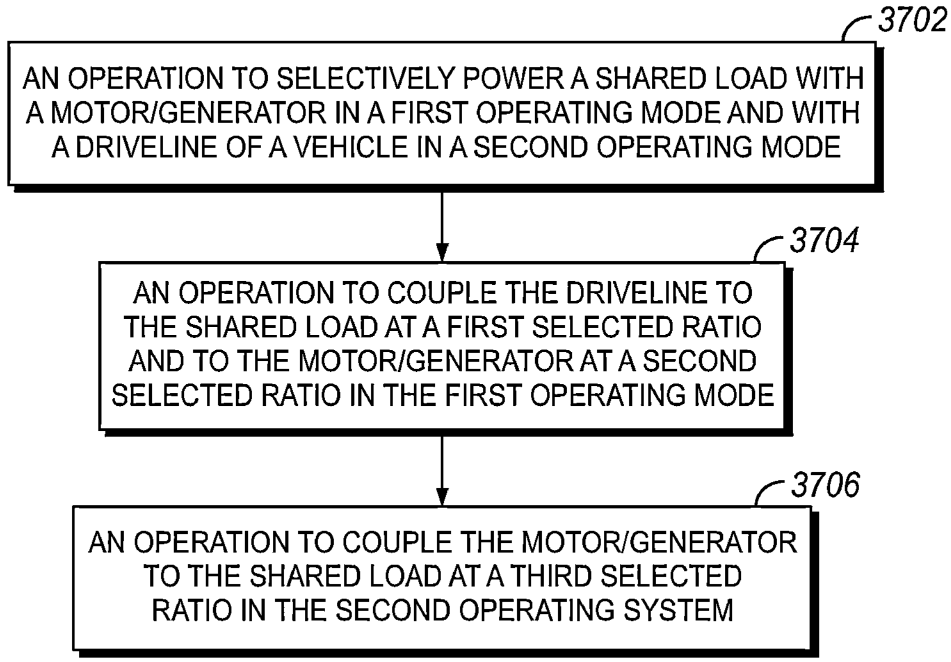
FIG. 21 is a schematic flow diagram of a procedure for operating a PTO device in selected operating modes and ratios.

Referencing FIG. 21, an example procedure includes an operation 3702 to selectively power a shared load with a motor/generator in a first operating mode and with a driveline of a vehicle in a second operating mode, where the selectively powering includes an operation 3704 to couple the driveline to the shared load at a first selected ratio and to the motor/generator at a second selected ratio in the first operating mode; and an operation 3706 to couple the motor/generator to the shared load at a third selected ratio in the second operating mode.

Certain further aspects of an example procedure are described following, any one or more of which may be present in certain embodiments. An example procedure further includes an operation to selectively power the driveline with the motor/generator in a third operating mode at a fourth selected ratio; where the third operating mode includes a creep mode, and an operation to power the driveline with the motor/generator provides motive power to the driveline; an operation to selectively power the driveline with the motor/generator in a fourth operating mode at a fifth selected ratio; and/or where the fourth operating mode includes a crank mode (e.g., providing distinct ratios between the motor/generator and the driveline between the crank mode and the creep mode), and where an operation to power the driveline with the motor/generator provides cranking power to start a prime mover coupled to the driveline.

An example system includes a PTO device structured to selectively couple to a driveline of a vehicle; a motor/generator electrically coupled to an electrical power storage system; a power flow control device (e.g., including at least one or more of an MDC 114, shift actuator 1006, gear box 108, planetary gear assembly, idler gear 1004, torque coupling, one or more clutches, and/or a coupling actuator) structured to power a shared load with a selected one of the driveline or the motor/generator; where the power flow control device is further structured to selectively transfer power between the motor/generator and the driveline; and where the power flow control device is further structured to de-couple both of the motor/generator and the shared load from the driveline when the motor/generator powers the shared load.

Certain further aspects of an example system are described following, any one or more of which may be present in certain embodiments. An example system includes where the power flow control device is further structured to power the motor/generator with the driveline to charge the electrical power storage system. An example system includes where the electrical power storage system is sized to provide a selected amount of off-line power for a selected amount of time; where the selected amount of off-line power includes at least one of the amounts consisting of: an amount of power drawn by the shared load, an amount of power to operate a climate control system of the vehicle, an amount of power to operate a climate control system of the vehicle plus vehicle living space accessories, and/or an amount of power to operate accessories of a vehicle; and/or where the selected amount of time includes at least one of the amounts of time consisting of: 30 minutes, 2 hours, 8 hours, 10 hours, 12 hours, and 24 hours. An example system includes power electronics (e.g., an inverter, a rectifier, and/or a DC/DC converter) disposed between the electrical power storage system and at least one accessory of the vehicle, where the power electronics are structured to configure electrical power provided from the electrical power storage to an electrical power format (e.g., a voltage level, an RMS voltage, a frequency, a phase, and/or a current value) for the at least one accessory; and/or where each of the at least one accessories comprise one of a nominal 12V DC (e.g., 11.5-12.5V, 10.5-14V, 9V-15V, etc.) accessory and a nominal 110V AC (e.g., 110V, 115V, 120V, 50 Hz, 60 Hz, etc.) accessory. An example system includes where the power flow control device is further structured to de-couple the motor/generator from the shared load when the motor/generator powers the driveline; and/or where the power flow control device is further structured to provide a first gear ratio between the motor/generator and the driveline when powering the motor/generator from the driveline, and to provide a second gear ratio between the motor/generator and the driveline when powering the driveline with the motor/generator. An example system includes where the power flow control device including a planetary gear assembly structured to route power between the shared load, the motor/generator, and the driveline; where the planetary gear assembly further includes a driven gear coupled to a countershaft gear; and/or where the power flow control device further includes an idler gear interposed between the driven gear and the countershaft gear.

Figure 22:
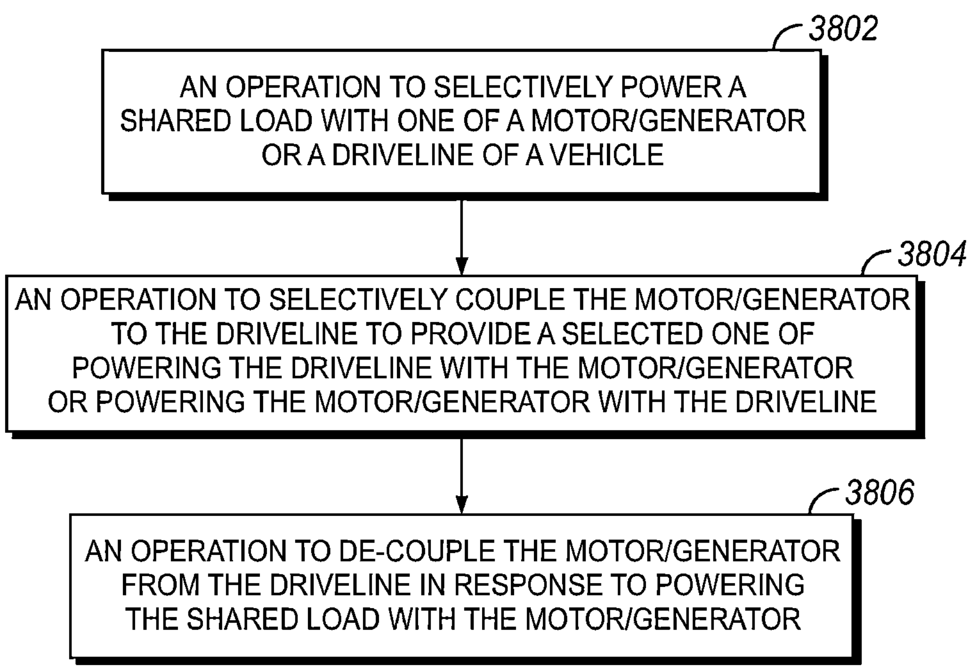
FIG. 22 is a schematic flow diagram of a procedure for operating a PTO device.

Referencing FIG. 22, an example procedure includes an operation 3802 to selectively power a shared load with one of a motor/generator or a driveline of a vehicle; an operation 3804 to selectively couple the motor/generator to the driveline to provide a selected one of powering the driveline with the motor/generator or powering the motor/generator with the driveline; and an operation 3806 to de-couple the motor/generator from the driveline in response to powering the shared load with the motor/generator.

Certain further aspects of an example procedure are described following, any one or more of which may be present in certain embodiments. An example procedure further includes an operation to couple the motor/generator to the driveline to charge an electrical power storage system; and operation to power an off-line device with at least one of the motor/generator or the electrical power storage system in response to a prime mover of the vehicle being shut down (e.g., keyswitch is off, motive power request is zero, key-switch is in an auxiliary position, a state value indicates the prime mover is shutting down, and/or a speed value of the prime mover indicates shutdown, etc.); an operation to configure electrical power from the electrical power storage system to an electrical power format for the off-line device; where the shared load includes a climate control device for the vehicle, and an operation to selectively power the shared load with the motor/generator is in response to the prime mover of the vehicle being shut down.

Figure 23:
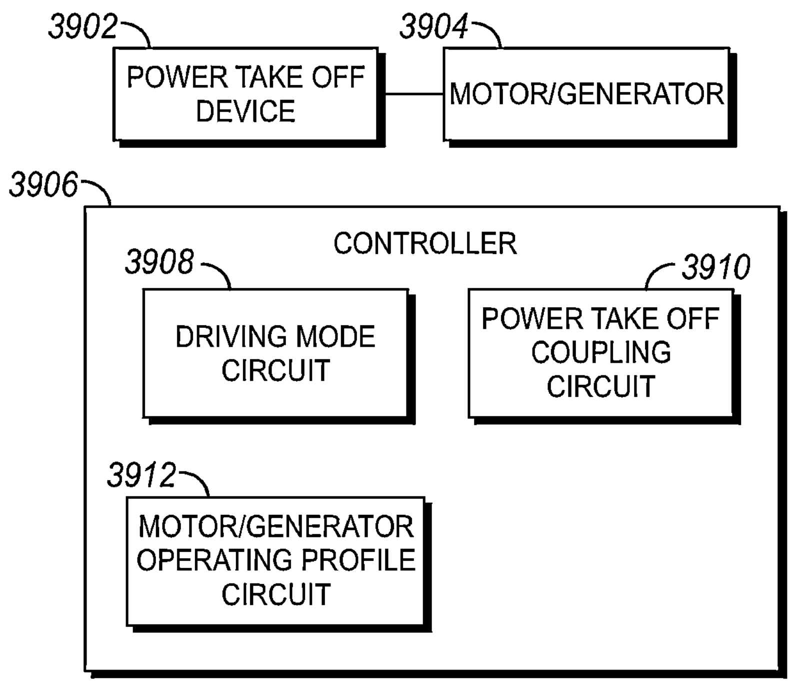
FIG. 23 is a schematic control diagram of an example PTO device.

Referencing FIG. 23, an example system includes a PTO device 3902 structured to selectively couple to a driveline of a vehicle; a motor/generator 3904 electrically coupled to an electrical power storage system; a controller 3906, including: a driving mode circuit 3908 structured to determine a current vehicle operating mode as one of a motive power mode or a charging mode; a PTO coupling circuit 3910 structured to provide a motive power coupling command in response to the motive power mode, and to provide a charge coupling command in response to the charging mode; and where the PTO device includes a coupling actuator responsive to the motive power coupling command to couple the motor/generator to the driveline of the vehicle in a first gear ratio, and responsive to the charge coupling command to couple the motor/generator to the driveline of the vehicle in a second gear ratio.

Certain further aspects of an example system are described following, any one or more of which may be present in certain embodiments. An example system includes where the motive power mode includes one of a crank mode, a creep mode, or a launch mode. An example system includes where the driving mode circuit 3908 is further structured to determine the charging mode in response to a state of charge of the electrical power storage system. An example system includes an accessory, and where the coupling actuator selectively couples the accessory to one of the driveline or the motor/generator; and/or where the driving mode circuit 3908 is further structured to determine the current vehicle operating mode as a sleep mode, where the PTO coupling circuit 3910 is further structured to provide a sleep power command in response to the sleep mode, and where the coupling actuator is further responsive to couple the motor/generator to the accessory in response to the sleep power command. An example system includes a motor/generator operating profile circuit 3912 structured to determine a motor/generator efficient operating point, and where the PTO coupling circuit 3910 is further structured to adjust the charge coupling command in response to the motor/generator efficient operating point, and where the coupling actuator is further responsive to the adjusted charge coupling command to couple the motor/generator to the driveline of the vehicle in a selected one of the first gear ratio and the second gear ratio.

Figure 24:
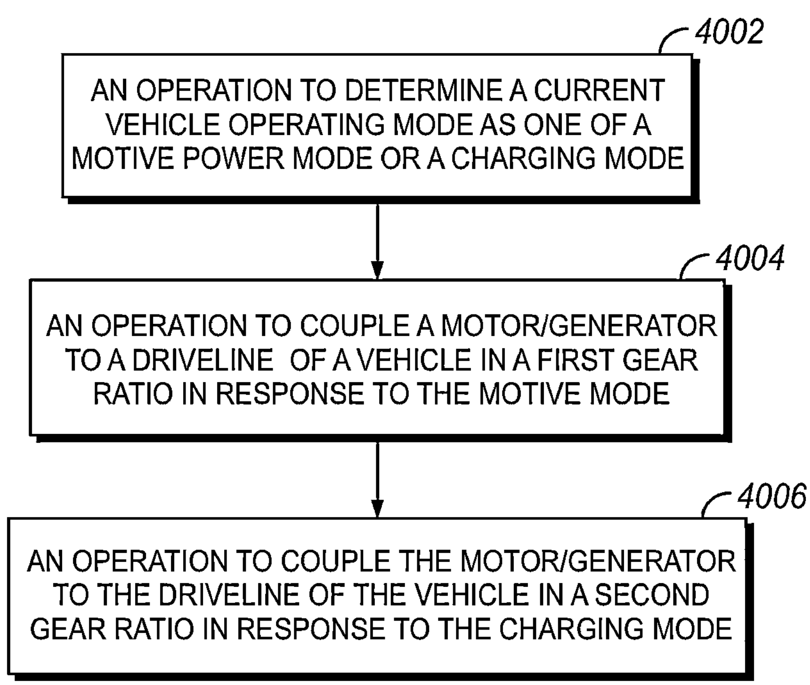
FIG. 24 is a schematic flow diagram of a procedure for operating a PTO device.

Referencing FIG. 24, an example procedure includes an operation 4002 to determine a current vehicle operating mode as one of a motive power mode or a charging mode; an operation 4004 to couple a motor/generator to a driveline of a vehicle in a first gear ratio in response to the motive power mode; and an operation 4006 to couple the motor/generator to the driveline of the vehicle in a second gear ratio in response to the charging mode.

Certain further aspects of an example procedure are described following, any one or more of which may be present in certain embodiments. An example procedure further includes an operation to determine a state of charge of an electrical power storage system electrically coupled to the motor/generator, and determining the vehicle operating mode as the charging mode further in response to the state of charge of the electrical power storage system; an operation to power an accessory from a selected one of the driveline and the motor/generator; an operation to determine the vehicle operating mode as a sleep mode, and selecting the motor/generator to power the accessory in response to the sleep mode; an operation to select the one of the driveline and the motor/generator in response to the state of charge of the electrical power storage system; and/or an operation to determine a motor/generator efficient operating point (e.g., a speed and/or torque output of the motor/generator that is in a high efficiency operating region, and/or that is in an improved efficiency operating region; where the operation to determine the motor/generator efficient operating point may further include searching the space of available operating points based on available gear ratio selections), and coupling the motor/generator to the driveline of the vehicle in a selected one of the first gear ratio and the second gear ratio further in response to the motor/generator efficient operating point.

Figure 25:
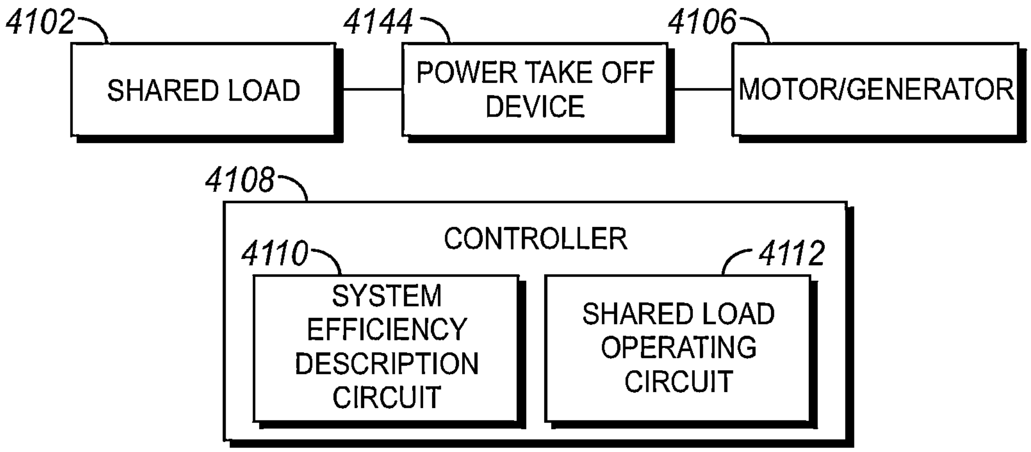
FIG. 25 is a schematic control diagram of an example PTO device.

Referencing FIG. 25, an example system includes a PTO device 4144 structured to selectively couple to a driveline of a vehicle; a motor/generator 4106 electrically coupled to an electrical power storage system; a shared load 4102 selectively powered by one of the driveline or the motor/generator; and where the PTO device further includes a coupling actuator structured to couple: the shared load to the motor/generator in a first position; the shared load and the motor/generator to the driveline in a second position; and the shared load to the driveline in a third position.

Certain further aspects of an example system are described following, any one or more of which may be present in certain embodiments. An example system includes where the coupling actuator includes a planetary gear assembly having a planetary gear with three positions, where a first position of the planetary gear couples the motor/generator to the driveline in a first gear ratio, where a second position of the planetary gear couples the motor/generator to the driveline in a second gear ratio, and where a third position de-couples the motor/generator from the driveline; a load drive shaft, where the coupling actuator further includes at least one of a clutch and a second planetary gear, and where the at least one of the clutch and the second planetary gear couple the shared load to the load drive shaft in a first position, and de-couple the shared load from the load drive shaft in a second position; and/or a third planetary gear coupling the motor/generator to the load drive shaft. An example system includes a controller 4108, the controller including a system efficiency description circuit 4110 structured to determine at least one efficiency value selected from the efficiency values consisting of: a driveline efficiency value, a motor/generator efficiency powering value, and a motor/generator efficiency charging value; and a shared load operating circuit 4112 structured to command the coupling actuator in response to the at least one efficiency value; and where the coupling actuator is responsive to the command. An example system includes where the system efficiency description circuit is further structured to determine a state of charge of the electrical power storage system, and where the shared load operating circuit is further structured to command the coupling actuator in response to the state of charge.

Figure 26:
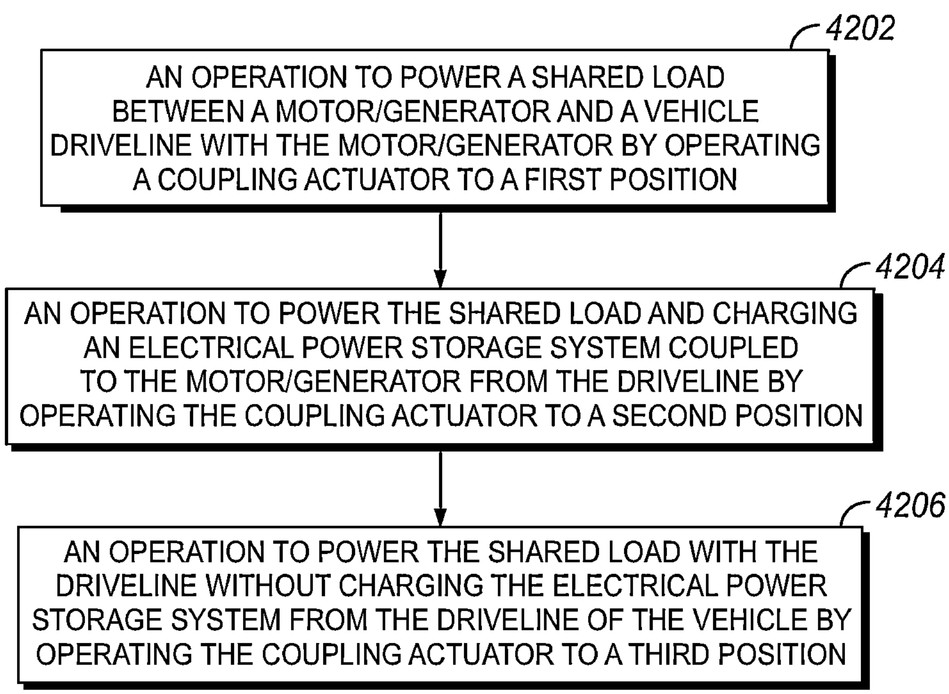
FIG. 26 is a schematic flow diagram of a procedure for operating a PTO device.

Referencing FIG. 26, an example procedure includes an operation 4202 to power a shared load between a motor/generator and a vehicle driveline with the motor/generator by operating a coupling actuator to a first position; an operation 4204 to power the shared load and to charge an electrical power storage system coupled to the motor/generator from the driveline by operating the coupling actuator to a second position; and an operation 4206 to power the shared load with the driveline without charging the electrical power storage system from the driveline of the vehicle by operating the coupling actuator to a third position.

Certain further aspects of an example procedure are described following, any one or more of which may be present in certain embodiments. An example procedure further includes where operating the coupling actuator includes an operation to operate an actuator for a planetary gear assembly; and/or operating the coupling actuator includes an operation to operate a clutch between the shared load and a load drive shaft of the planetary gear assembly. An example procedure further includes an operation to determine at least one efficiency value selected from the efficiency values consisting of: a driveline efficiency value (e.g., considering total rolling or load effective efficiency, prime mover, transmission, downstream driveline components, rolling friction, and/or wind resistance; and where efficiency is determined in terms of cost, time, and/or mission capability), a motor/generator efficiency powering value, and a motor/generator efficiency charging value; and further operating the coupling actuator in response to the at least one efficiency value; and/or an operation to determine a state of charge of the electrical power storage system, and further operating the coupling actuator in response to the state of charge.

An example system includes a PTO device including a torque coupler between an accessory load drive shaft and a driveline of a vehicle; a one-way overrunning clutch interposed between the torque coupler and the accessory load drive shaft; and a motor/generator coupled to the accessory load drive shaft. An example one-way overrunning clutch allows torque transfer from the driveline to the load drive shaft when the driveline is turning faster (after applied gear ratios) than the load drive shaft, and allows slipping when the driveline is slower than the load drive shaft.

Certain further aspects of an example system are described following, any one or more of which may be present in certain embodiments. An example system includes where the torque coupler includes at least one coupler selected from the couplers consisting of: a chain, an idler gear engaging a countershaft gear on the driveline side and a driven gear on the accessory load drive shaft side, and a layshaft interposed between the driveline side and the accessory load drive shaft side.

Figure 27:
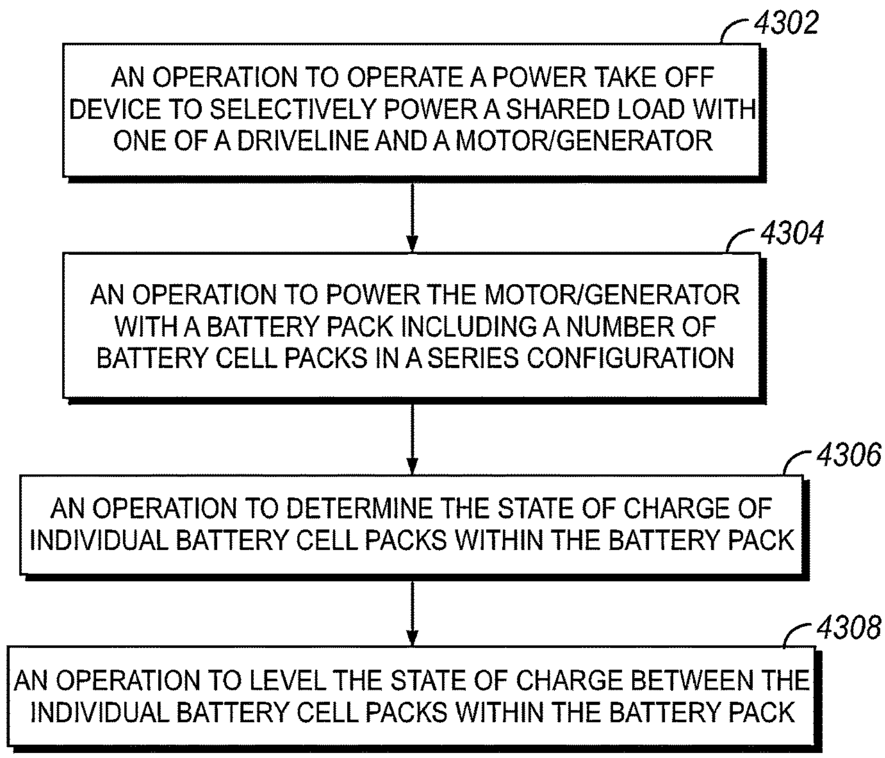
FIG. 27 is a schematic flow diagram of a procedure for operating a PTO device and management a battery pack.

Referencing FIG. 27, an example procedure includes an operation 4302 to operate a PTO device to selectively power a shared load with one of a driveline and a motor/generator; an operation 4304 to power the motor/generator with a battery pack including a number of battery cell packs in a series configuration; an operation 4306 to determine the state of charge of individual battery cell packs within the battery pack; and an operation 4308 to level the state of charge between the individual battery cell packs within the battery pack.

Certain further aspects of an example procedure are described following, any one or more of which may be present in certain embodiments. An example procedure further includes an operation to resistively discharge a higher charged battery cell pack of the battery pack. An example procedure further includes an operation to couple battery cell packs of the battery pack with a flyback converter with an isolation transformer. An example procedure further includes an operation to power a useful load with a higher charged battery cell pack of the battery pack; an operation to process the discharge power from the higher charged battery cell pack of the battery pack through power electronics to configure the discharge power to an electrical power format for the useful load. An example procedure further includes an operation to select a discharge operation in response to a state of charge difference between a higher charged battery cell pack of the battery pack and a lower charged battery cell pack of the battery pack. An example procedure further includes an operation to perform a service operation to replace at least a portion of the battery pack at 18 months of service; where the battery pack includes eight nominal 12V battery cell packs, including an operation to couple into two parallel packs of four series batteries, and where the service operation includes replacing one of the two parallel packs of batteries. An example procedure further includes an operation to perform a service operation to replace at least a portion of the battery pack at 24 months of service; where the battery pack includes eight nominal 12V battery cell packs, coupled into two parallel packs of four series batteries, and where the service operation includes replacing one of the two parallel packs of batteries.

Figure 28:
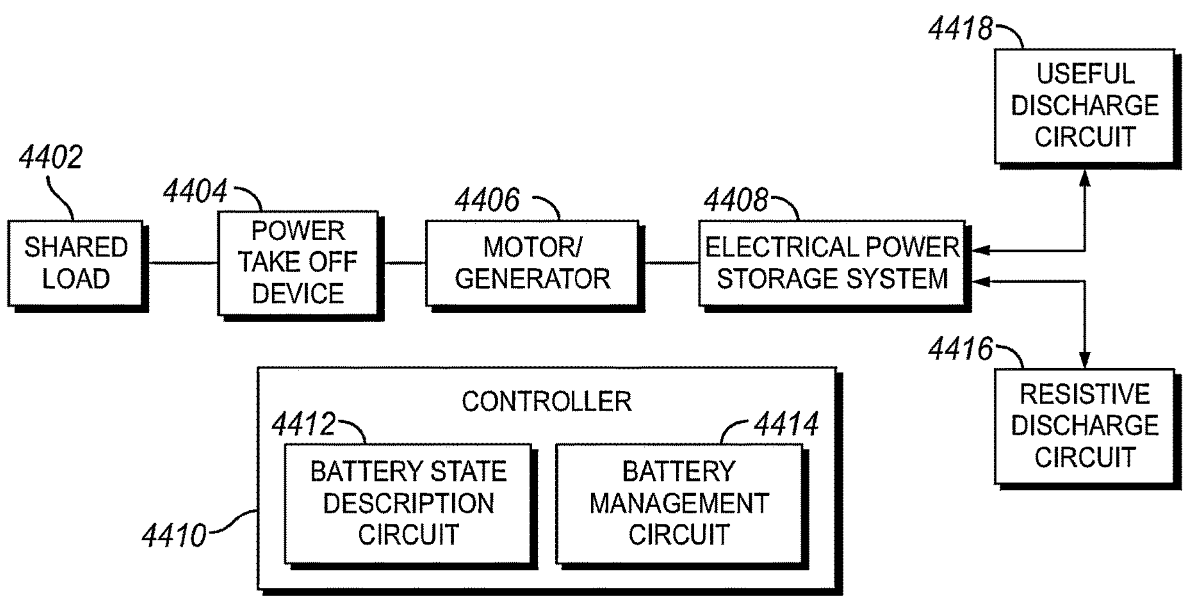
FIG. 28 is a schematic control diagram of an example PTO device.

Referencing FIG. 28, an example system includes a PTO device 4404 structured to selectively couple to a driveline of a vehicle; an electrical power storage system 4408 including a battery pack including a plurality of battery cell packs in a series configuration; a motor/generator 4406 electrically coupled to the electrical power storage system; a shared load 4402 selectively powered by one of the driveline or the motor/generator; and a controller 4410, including: a battery state description circuit 4412 structured to determine a state of charge of each of the plurality of battery cell packs; and a battery management circuit 4414 structured to provide a charge leveling command in response to the state of charge between each of the plurality of battery cell packs.

In some embodiments, a PTO device may include at least one or more of: a PTO countershaft; components of the compressor and/or load removed; a primary gear box removed (e.g., planetary gear arrangement); and a gear ratio between the PTO countershaft and the PTO mainshaft changed. Some PTO embodiments provide for reduced losses (turning losses of the motor/generator, gear mesh losses due to a reduced number of gear meshes, losses related to the load); a speed increase of the motor/generator for the same PTO countershaft and/or motive driveline speeds (e.g., allowing for lower torque operation of the motor/generator); a reduced physical footprint of the PTO device; and/or improved efficiency through a reduction in the number of sources of loss and/or fewer number of torque transfers through gear meshes. One of skill in the art can determine for a particular system whether a particular PTO arrangement is indicated for a particular system, which may include considerations around the higher motor/generator speed, the significance of neutral operations on the system efficiency (e.g., using a using neutral as the motor disconnect may result in efficiency losses), the need for capability to operate a load such as a compressor, capital cost considerations of the PTO device, and/or integration expense considerations (design & engineering, and/or available footprint consequences) for a PTO device.

In some embodiments, the PTO device is a three position PTO device with an electromagnetic clutch (EMC), which provides for a straightforward design while keeping design constraints capable of utilizing a permanent magnet motor, and provides for overspeed protection for the motor. The Three Position PTO Device may be utilized with a shared load, or without a shared load. Certain considerations for the Three Position PTO Device include the elimination of a planetary gear set (relative to certain other embodiments throughout the present disclosure), capability for a reduced gear width for a gear meshing with the countershaft, the addition of a separate motor shaft and PTO shaft, an extra PTO countershaft gear, and an electrically actuated clutch. In certain embodiments, the Three Position PTO Device provides for the elimination of a planetary gear, selectable motor de-coupling to raise system efficiency, and cruise churn losses that are lower than certain other designs in the present disclosure. In certain embodiments, the Three Position PTO Device experiences high carrier gear spin speeds, and some churn losses during sleep mode operations.

In other embodiments, the PTO device may be a Four Position Ring Actuator Plus Motor Disconnect PTO Device, which provides for a common shifting mechanism with other devices throughout the present disclosure, while providing for a motor disconnect option. The example Four Position Ring Actuator Plus Motor Disconnect PTO Device may be utilized with a shared load or without a shared load. The example PTO Device provides for crank mode operation, neutral mode operation, and cruise and coast mode operations, with or without the motor coupled to the drivetrain. The mechanism shifts the ring, and a dog clutch connects and disconnect the motor in cruise mode (and/or in coast mode). Certain considerations for the Four Position Ring Actuator Plus Motor Disconnect PTO Device include the elimination of a planetary gear set (relative to certain other embodiments throughout the present disclosure), capability for a reduced gear width for a gear meshing with the countershaft, use of a 4-position actuator, an extra PTO countershaft gear, and a dog clutch shifter. In certain embodiments, the Four Position Ring Actuator Plus Motor Disconnect PTO Device provides for the elimination of a planetary gear, selectable motor de-coupling to raise system efficiency, commonality with shifting mechanisms for other embodiments, and cruise churn losses that are lower than certain other designs in the present disclosure. In certain embodiments, the Four Position Ring Actuator Plus Motor Disconnect PTO Device experiences high carrier gear spin speeds, some churn losses during cruise mode operations, some churn losses during sleep mode operations, and risks associated with grounding a component with the shifter during undesired operating conditions.

Certain further aspects of an example system are described following, any one or more of which may be present in certain embodiments. An example system includes a voltage sensor coupled to each of the plurality of battery cell packs, and where the battery state description circuit is further structured to determine the state of charge of each of the plurality of battery cell packs in response to a voltage value from each of the voltage sensors; and/or a temperature sensor coupled to each of the plurality of battery cell packs, and where the battery state description circuit 4412 is further structured to determine the state of charge of each of the plurality of battery cell packs in response to a temperature value from each of the temperature sensors. An example system includes where the battery management circuit 4414 is further structured to provide the charge leveling command as a resistive discharge command, the system further including a resistive discharge circuit 4416 for each of the plurality of battery cell packs, where the resistive discharge circuits are responsive to the resistive discharge command. An example system includes where the battery management circuit 4414 is further structured to provide the charge leveling command as a useful discharge command, the system further including a useful discharge circuit 4418 configured to power a useful load with a higher charged battery cell pack of the plurality of battery cell packs in response to the useful discharge command; where the useful discharge circuit 4418 further includes power electronics structured to configure discharge power from the higher charged battery cell pack of the plurality of battery cell packs to an electrical power format for the useful load; where each of the plurality of battery cell packs includes a nominal 12V lead-acid battery; where the battery pack includes four of the plurality of battery cell packs coupled in series; where the battery management circuit 4414 is further structured to provide the charge leveling command as a useful discharge command, the system further including a useful discharge circuit 4418 configured to power a useful load with a higher charged battery cell pack of the plurality of battery cell packs in response to the useful discharge command; where the useful load includes a nominal 12V load on the vehicle; where the useful discharge circuit 4418 further includes power electronics structured to configure discharge power from the higher charged battery cell pack of the plurality of battery cell packs to an electrical power format for the useful load; and/or where the useful load includes a nominal 48V load on the vehicle.

An example system includes a PTO device structured to selectively couple to a driveline of a vehicle; an electrical power storage system including a battery pack including a plurality of battery cell packs in a series configuration; a motor/generator electrically coupled to an electrical power storage system; a shared load including a nominal 48V load, where the shared load is selectively powered by one of the driveline or the motor/generator; and where the PTO device further includes a coupling actuator structured to couple the shared load to the motor/generator in a first position, and to the driveline in a second position.

Certain further aspects of an example system are described following, any one or more of which may be present in certain embodiments. An example system includes where the shared load includes a 5 KW average load device. An example system includes where the shared load includes a 10 kW peak load device; where the battery pack includes eight nominal 12V battery cell packs, coupled into two parallel packs of four series batteries; where each of the battery cell packs includes a lead-acid battery; where each of the lead-acid batteries includes an absorbent glass mat battery; where the shared load includes a 2.5 kW average load device; where the shared load includes a 5 kW peak load device; where the battery pack includes four nominal 12V battery cell packs coupled in series; where each of the battery cell packs includes a lead-acid battery; and/or where each of the lead-acid batteries includes an absorbent glass mat battery.

An example system includes a PTO device structured to selectively couple to a driveline of a vehicle; a motor/generator electrically coupled to an electrical power storage system, where the motor/generator includes a nominal 48V motor; a nominal 12V power supply electrically coupled to a field coil of the motor/generator; a shared load selectively powered by one of the driveline or the motor/generator; where the PTO device further includes a coupling actuator structured to couple the shared load to the motor/generator in a first position, and to the driveline in a second position.

Referencing FIG. 18, an example system includes a PTO device 3302 structured to selectively couple to a driveline of a vehicle; a motor/generator electrically coupled to an electrical power storage system; a compressor selectively powered by one of the driveline or the motor/generator; and where the PTO device further includes a coupling actuator structured to couple the compressor to the motor/generator in a first position, and to the driveline in a second position.

Certain further aspects of an example system are described following, any one or more of which may be present in certain embodiments. An example system includes a controller 3304, the controller 3304 including a driving mode circuit 3306 structured to determine a current vehicle operating mode as one of a sleep mode or a motive mode; and a shared load operating mode circuit 3308 structured to command the coupling actuator to the first position in response to the sleep mode, and to command the coupling actuator to the second position in response to the motive mode.

Certain aspects of the present disclosure support modularity and/or standardization of one or more components, aspects, features, systems, and/or devices of embodiments of the present disclosure. Modularity and/or standardization as utilized herein should be understood broadly, where a component that supports modularity allows for the scaling, repetition, repeatability, or the like for aspects of the present disclosure, for example supporting a range of power throughput, energy storage, a number of components (e.g., more than one, potentially separate, intermediate voltage (e.g., 48V) power system), or the like. A component that supports modularity allows for a change utilizing the addition or omission of one or more repeatable units of the component, a limited change to the component in a controllable aspect, where other aspects are not changed, and/or the inclusion or omission of sub-assemblies including the component. A limited change, as utilized herein, includes a change in a limited number of dimensions (e.g., extending a length, while leaving a width and/or height unchanged), a change where the component is configured to reduce a number of interfaces thereby facilitating the change (e.g., at least some of the same couplings, connections, controls, supporting instructions for a processor, etc., and/or repeated but similar or identical ones of the interfaces), and/or a change where operations and/or physical elements of the changed system have repeated elements that can be similarly positioned with limited integration, configuration, verification, and/or certification efforts.

Example components supporting modularity and/or standardization herein include, without limitation to any other aspect of the present disclosure, inclusion of a service disconnect, a service disconnect with a fuse integrated therein or therewith, a battery housing surface allowing for case of movement of individual batteries, features for rapid securing of batteries and/or battery containment (e.g., an overlaying tray), features reducing a vibration profile of batteries in-use, features that promote accessibility of more than one voltage for power exchange, features that determine and extend battery life, features that support utilization of a single tool to access and/or service more than one component of a system, and/or features that allow for extension of components according to a desired capability of the system (e.g., an extruded housing for a DC/DC converter, allowance for more than one battery pack element, and/or case of connections between battery packs). It can be seen that aspects of the present disclosure support the utilization of standard batteries (e.g., lead-acid batteries) and/or case of utilization for variances in batteries (e.g., distinct geometry such as terminal distance, width, height, and/or depth). One of skill in the art, having the benefit of the present disclosure and information ordinarily available when contemplating a particular system, can readily determine aspects of the present disclosure that support modularity and/or standardization for the particular system. Without limitation, certain considerations for determining aspects of the present disclosure that support modularity and/or standardization include: an available footprint (e.g., geometry available, weight, and/or supporting interfaces) for a 48V battery pack(s) and/or related power electronics; costs and/or opportunities to adjust the available footprint; types of batteries available and associated costs (e.g., supply chain considerations, and/or volumes utilized and/or available); service parameters (e.g., costs of downtime, available tools at likely service locations, effects on serviceability for changes to a system due to the inclusion or exclusion of a system aspect supporting scaling and/or standardization, and/or the availability of a supporting service organization and characteristics thereof, such as geographic spread, utilization by users of the system, and/or homogeneity of service procedures, service personnel expertise, and/or service facilities); and/or effects on externalities such as service documentation, certification (or re-certification), compatibility with industry standards, compatibility with internal policies (e.g., utilization of environmentally favorable components, changes to total emissions for a system, and/or compatibility with safety protocols, such as related to lifting, lock-out/tag-out procedures, confined space access, etc.); and/or changes or updates to any of the foregoing in response to aspects selected for a system. It can be seen that a given aspect, or a cooperating group of aspects, of the present disclosure may support or improve modularity for a given system, but decrease and/or be neutral with regard to modularity for another given system. For example, aspects that support utilization of a standard lead-acid battery may enhance modularity for a first system (e.g., where a large, stable supply of particular batteries is available for the system), but do not enhance modularity for another system (e.g., where such batteries are not available, not used in current embodiments, where they are not compatible with some other aspect of the system, etc.).

Certain aspects of the present disclosure support serviceability of one or more components, aspects, features, systems, and/or devices of embodiments of the present disclosure. Serviceability, as used herein, should be understood broadly, and includes, without limitation, one or more of: a reduction in service access time and/or difficulty for a component or aspect of the system; an increase in service life (e.g., time, distance, and/or operating hours between service events); a reduction in the likelihood that service will be indicated for a component; a reduction in a service execution requirement (e.g., tools required, personnel expertise required, a reduced cost of a part for service, and/or omitting or reducing a need for a calibration, reset of a controller, or similar operation to complete a service event); a reduction in service verification (e.g., a time and/or verification effort between completion of a service event and a return to service of a system); a reduction in a mission criticality of a component (e.g., where service can be deferred on a failed or failing component, while a system having the component is capable to continue with a mission of the system); and/or a simplification in a service operation. Example components supporting serviceability include, without limitation, one or more of: a service disconnect that is accessible, is integrated with fuses for the system, and/or enforces de-energizing of high or intermediate voltage circuits before they are accessible; utilization of reduced coupling element variation (e.g., bolts, screws, etc.) and/or utilization of quick connect components (e.g., straps, cam levers); case of access of batteries in a battery pack, including opening sizes to reach batteries, and consistent orientation and access angles for batteries; case of installation and removal of batteries in a battery pack, including compliance of connections to battery terminals, case of movement of batteries during positioning, and/or visible notification elements and system protection for reverse battery orientations; dividers for terminal connection trays; slide-in installation and/or removal of terminal connection trays; high surface area and simple geometry connections between controllers, battery packs, contactors, fuses, and the like; and/or concentration of calibratable control elements into a few, or a single, controller(s). One of skill in the art, having the benefit of the present disclosure and information ordinarily available when contemplating a particular system, can readily determine aspects of the present disclosure that support serviceability for the particular system. Without limitation, certain considerations for determining aspects of the present disclosure that support serviceability include: the supply profile (e.g., supply chain, service organization, and/or availability of components) of components for the system, including serviceable components, replacement components, and/or remanufactured components; service scenarios for the system (e.g., service locations, facilities at the locations, consistency of service locations, etc.); the impact (e.g., frequency, cost of events, etc.) of serviceable/maintenance parts and scheduled downtime relative to failure occurrence, cost, and impact of non-serviceable parts (including consideration that serviceable parts may fail before a service event); consideration of capital costs versus operating costs for a system and/or related application; and/or the cost and/or availability of adjustment to an available footprint for a system versus accommodation to the system to meet a predetermined footprint.

Certain aspects of the present disclosure support disconnect and/or interconnect of one or more components, aspects, features, systems, and/or devices of embodiments of the present disclosure. Disconnection and/or interconnection as utilized herein should be understood broadly, where a component that supports disconnection and/or interconnection allows for the safety, serviceability, reliability, simplicity, modularity, or the like for aspects of the present disclosure, for example supporting a range of battery tray configurations, fusing arrangements, a number of components (e.g., more than one, potentially separate, intermediate voltage (e.g., 48V) power system), or the like. A component that supports disconnection and/or interconnection allows for improved servicing protocols, improved and flexible manufacturability, and the like.

Example components supporting disconnect and/or interconnect herein include, without limitation to any other aspect of the present disclosure, a service disconnect with a fuse integrated therein or therewith, a battery tray with over molded busbars for making connections between batteries and between batteries and the DC-to-DC converter, a two-piece battery tray with sandwiched busbars for making connections between batteries and between batteries and the DC-to-DC converter, a single battery tray with overmolded busbars connecting all components of the system, a 50/50 split alternative battery tray configuration, a bias split alternative battery tray configuration optionally with a pliable component, stacked copper foil and twisted/braided copper foil as a DC-to-DC substrate with increased dimensional flexibility, a sealed, snap-together connector block for a DC-to-DC converter, the entire battery tray is a circuit board and the circuit board may be used as an insulator between copper busbars, and cut outs on the DC-to-DC converter PCB for improving tolerancing between the connector and the board as the cut outs/fingers can accept misalignment stress.

One of skill in the art, having the benefit of the present disclosure and information ordinarily available when contemplating a particular system, can readily determine aspects of the present disclosure that support disconnection and/or interconnection for the particular system. Without limitation, certain considerations for determining aspects of the present disclosure that support disconnection and/or interconnection include: an available footprint (e.g., geometry available, weight, and/or supporting interfaces) for a 48V battery pack(s) and/or related power electronics; costs and/or opportunities to adjust the available footprint; types of batteries available and associated costs (e.g., supply chain considerations, and/or volumes utilized and/or available, differently-sized batteries); service parameters (e.g., costs of downtime, available tools at likely service locations, effects on serviceability for changes to a system due to the inclusion or exclusion of a system aspect); and/or compatibility with safety protocols, such as related to servicing the system in a de-energized state; placement of the 48V battery assembly outside the frame rail or within the vehicle engine or cab; and/or changes or updates to any of the foregoing in response to aspects selected for a system. It can be seen that a given aspect, or a cooperating group of aspects, of the present disclosure may support or improve disconnection and/or interconnection for a given system but decrease and/or be neutral with regard to disconnection and/or interconnection for another given system. For example, aspects that support utilization of a particular disconnect strategy for a first system (e.g., where the 48V battery assembly is readily accessible), may not support disconnect and/or interconnect for another system (e.g., where batteries are less accessible to a mechanic).

The term heat sink (and similar terms) as utilized herein should be understood broadly. Without limitation to any other aspect or description of the present disclosure, a heat sink includes any structure or strategy that shifts heat away from one or more components of the 48V electrical system components, such as an extruded housing for the DC-to-DC converter with valleys for capacitors, connectors, and inductors; a GORE-TEX breather vent; clamps placed over the MOSFETs on the DC-to-DC converter; substrate selection for the DC-to-DC converter; and arrangement of components on the PCB, such as with shimming. In certain embodiments, a system may be considered a component of a heat sink for some purposes but not for other purposes—for example the MOSFET clamps are used to provide localized pressure on the top of the MOSFET, loading the MOSFET into the thermal interface material and into a heat sink, but in other purposes, similar clamps are simply securing structures.

The 48V ecosystem may include power producers (e.g., inverter, P0/P1/P2 integrated power generation, etc.), power consumers (e.g. EGR pump, 120V inverter, 48V inverter, electric catalyst heater, fluid pumps, HVAC, fans, etc.), and power management (e.g. DC-to-DC converter, high voltage and low voltage power distribution units (PDU), supercapacitor, battery management, power management software, etc.). The description herein utilizes 48V DC systems as one available power integration voltage rating. Without limitation to any other aspect of the disclosure, systems may include any voltage values, including 12V, 24V, 36V, 48V, 60V, or another value. In certain embodiments, a 48V system is low enough to avoid additional power management protocols, such as isolation, grounding requirements, etc., that might be required for a higher voltage system. Voltage values set forth herein are nominal voltages, and it will be understood that voltages may vary, for example depending upon operating conditions. An example 12V battery may be operated between about 10.5V and 14V, for example depending upon the state of charge, the charging or discharging condition of the battery, and/or the current being drawn from or flowing into the battery. In certain embodiments, a 48V system may operate between about 42V and 56V, or at other values as will be understood. The described examples are illustrative and not limiting.

Various technologies disclosed herein may enable accessories for use in a 48V electrical system, particularly radiator cooling fans, electric air conditioning, coolant pumps, oil pumps or other pumping areas. While depending on the batteries to reduce emissions, in developing accessories for a 48V electrical ecosystem, consideration is given to avoiding making the battery or energy storage device an on-board diagnostic (OBD) compliant element or to otherwise affect emissions. For example, where a 48V system contributes to an emission device of an application (e.g., heating an aftertreatment system, powering a fan, powering an exhaust gas recirculation pump, etc.), alternate detection of proper operation of the emission device (e.g., feedback determination of a parameter indicating proper operation of the device, and/or direct determination of an emission result value) may be performed. In certain embodiments, a 48V system and/or battery pack may be provided as an OBD component, with attendant detection of proper operation.

48V architectures may be modular and scalable with plug and play functionality to address a variety of global commercial vehicle factors related to different engines, different transmissions, and different chassis in all of the regions of the world, and for all of the variations of vehicle/truck. The 48V architecture may be scalable to maximize reuse of investment as 48V functionality grows over time (e.g., over a number of model years of an application). Scalability may accommodate increasing accessory loads. For example, a first application may need 10 kilowatts to perform a limited number of electrical power functions, and there may be a need to scale up to 30 kilowatts over time, for example as an electrification level of an application increases. Additionally, embodiments over time having more capability may additionally utilize an increased amount of energy storage, for example with a second later application having a requirement for greater energy storage than a first earlier embodiment. In another example, a first application may use lead acid batteries while subsequent applications may utilize lithium-ion batteries. In another example, a first application may use batteries based on a first chemistry (e.g., lead acid, lithium ion, and/or nickel metal hydride), and a second application may use batteries based on a second chemistry. In yet another example, a first application may use batteries of a first type (e.g., a liquid electrolyte), and a second application may use batteries of a second type (e.g., glass matt batteries). Accordingly, an aspect of modularity contemplated herein includes compatibility to utilize distinct battery characteristics (e.g., geometry, chemistry, performance, and/or wear characteristics).

Scalability with respect to architecture may mean a powertrain coupling may dictate available functionality (e.g., power steering, motive power provision, and/or varied capability motor power provision across applications and/or over time). Scalability with respect to engine may mean de-accessorizing the engine over time (e.g., eliminating belt and starter), starter and front-end accessory drive (FEAD) elimination, or battery electric vehicle (BEV). Scalable features may include accessories, drive modes, hybrid modes, ADAS (advanced driver-assisted systems) power and redundancy (e.g., computer control will drive redundancy and power needs).

For example, a 10 KW PTO-mounted A/C can scale to a 30 KW PTO mounted electrical A/C. In another example demonstrating modularity and scalability, a 10 kW inverter with a modular 3 kW DC-to-DC converter, air-cooled may be scaled to 30 kW inverter, water-cooled and further scaled to a 20 KW, P1 inverter, water cooled. In a further example of a battery agnostic system, a 10 kWh air-cooled lead acid pack may be used as well as a 10 kWh, air-cooled lithium-ion pack.

Figure 29:
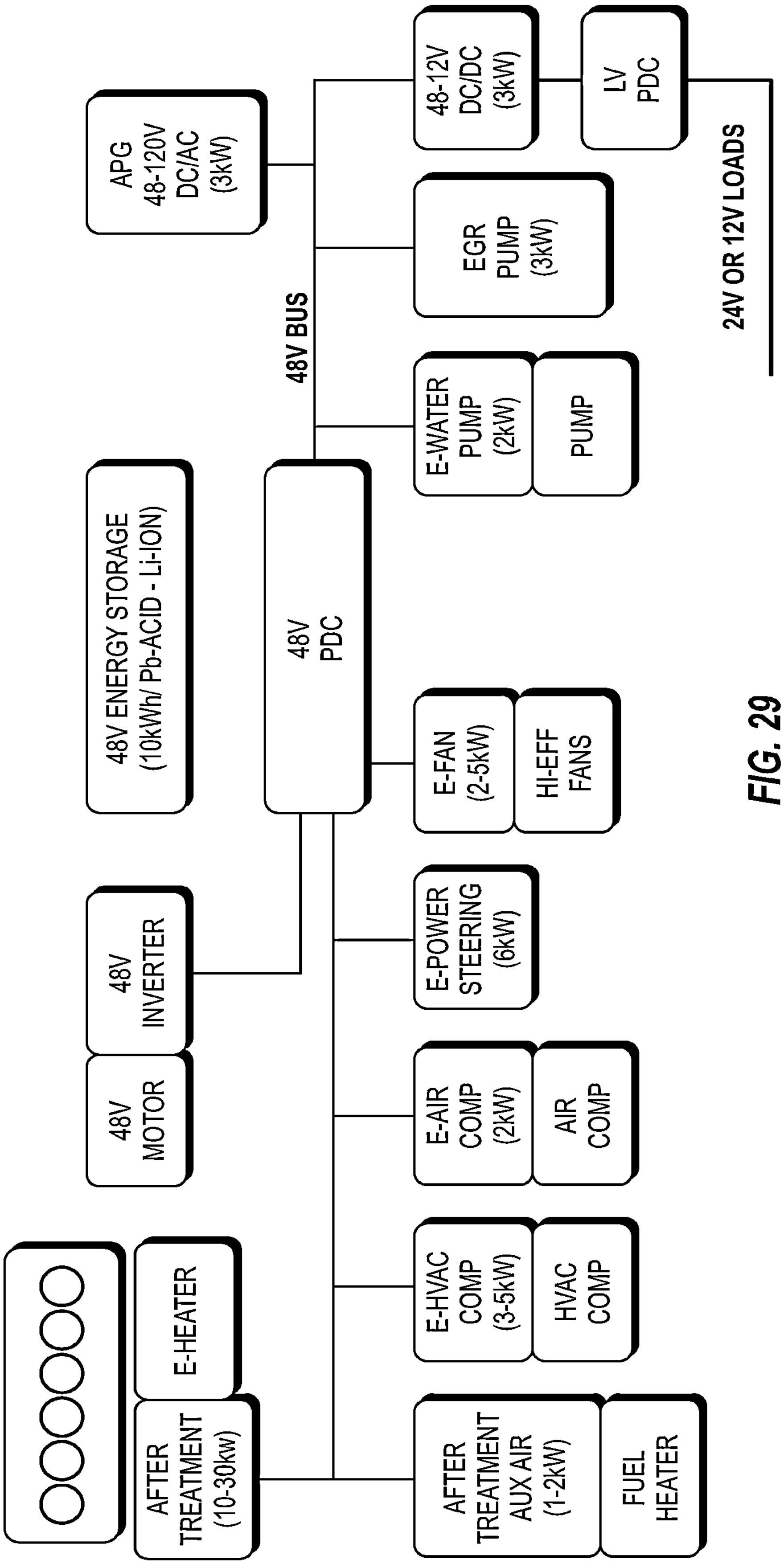
FIG. 29 depicts a 48V ecosystem.

FIG. 29 depicts a 48V ecosystem. A 48V PDC draws power from a 48V energy storage (e.g., 10 kWh/lead acid—lithium ion) for distribution on a 48V bus to power various 48V loads and to a 48V inverter to power a 48V motor. Some of the 48V accessories include air blowers for a fuel-fired heater (e.g., aftertreatment auxiliary air), powering an electrical resistance heater (e.g., a grid heater and/or a direct catalyst substrate heater), an EGR pump (e.g., 3 KW), 48V-12V DC-to-DC converter (e.g. 3 kW), 12 V or 24 V relay or fusing, and/or 120 Volt accessory power inverters (e.g. APG 48-120 V DC/AC (3 KW)). Other 48V accessories include: a fuel heater, an e-heater (e.g., catalyst heat), high efficiency fans, air compressors, coolant compressors, after treatment (10-30 KW), E-HVAC compressor (3-5 kW), E-Air compressor (2 kW), E-fan (2-5 kW), E-water pump (2 kW), pump, e-power steering (6 kW), or the like.

Certain progressive features may increase power requirements, for example in the US and/or Europe, over a time period. Certain emerging features that require more electric power may be NOx, CO2, eHeater (electrically heated catalyst), mild hybrid/regen, eHVAC, electric power steering and engine-off coasting, engine start/stop, additional accessories (e.g. coolant pumps, air compressors), electric cooling fan, eWHR. Use of an eHeater, such as with a peak power requirement of 12 kW and continuous power requirement of 4 kW may enable meeting a selected level of emissions and/or fuel efficiency. For example, a mild hybrid/regen with a peak power requirement of 10 KW and continuous power requirement of 4 kW, the electric air conditioning with a peak power requirement of 5 KW and continuous power requirement of 2 kW, and potentially engine Start/Stop and/or engine off coasting operations may be supported, providing for a system with a selected level of emissions and/or fuel efficiency, and which may be improved over the first selected level of emissions and/or fuel efficiency. In yet another system, eHVAC may be extended for sleep mode operation. Yet another system includes an electrically heated catalyst, mild hybrid/regen, electric air conditioning, and engine off coasting, providing for a system with a third selected level of emissions and/or fuel efficiency, that may be improved further relative to the second selected level of emissions and/or fuel efficiency.

Certain progressive features may increase power requirements over a time period. Changing emissions requirements results in progressively increasing power requirements across the globe, where one solution may work to meet the emissions requirement in one region at one time but may not be needed in another region or at another time. Instead, the disclosure herein describes a 48V electrical ecosystem that is modular and scalable and meets the challenge of differing and progressively increasing emissions requirements globally. For example, a P0 architecture with an eHeater may be used. In another example, either a transmission mounted P2.5 (air cooled or liquid cooled) or engine mounted P1 without eHeater may be used. In yet another example, a transmission mounted P2.5 or engine mounted P1 with an eHeater may be utilized. P refers to parallel hybrid and the architectures are: P0 is a belt-mounted alternator or front-end accessory drive, P1 is on the flywheel or engine side of clutch, P2 is the input to the transmission, P3 is the output of the transmission (e.g., transmission PTO), P4 is on the rear axle, P5 is in-wheel motor.

In a P0 hybrid architecture, there are 12 Volt batteries, such as lead acid batteries, with a ¼ tap for powering 12V loads in DC-to-DC and 48 Volt loads running directly off a belt alternator without an inverter and retention of a starter motor as a 48 Volt starter. The system features an electric catalyst heater for NOx compliance, power for all 12 Volt electrical loads, a 12 volt battery balancing and Charge/discharge regulation, P0 architecture for low cost, low risk NOx solution, and forms the base 48 Volt electrical system that is used in other hybrid architectures. The components of the system may include a 48 Volt-12 Volt 3 kW DC to DC converter, a 48 Volt PDU, a 48 Volt lead acid battery management system (for four 12 Volt batteries), a 48 Volt E-heater resistive coil (12 kilowatt peak/4 kilowatt continuous power), a 48 Volt E-heater controller (12 kilowatt peak/4 kW continuous), a 48 Volt alternator, a front end accessory drive belt, pulleys, tensioner, a 48 Volt starter, and 12 Volt lead acid batteries.

A P2.5 air-cooled hybrid architecture builds upon the P0 architecture. In prior embodiments, air conditioning was mechanically driven off the PTO using the same motor to electrically drive it when it was stopped. In this embodiment, air conditioning is electric but still with a 2 speed with the motor cranking the engine, a creep mode, engine off coasting with charging. Like the P0 architecture, the P 2.5 architecture includes A3 kW DC to DC converter, 48 Volt PDU, 48 Volt lead acid battery management system, 48 Volt eHeater resistive coil, a 48 Volt Heater controller, and lead acid batteries, but also includes an E-HVAC inverter and controls, a 2-speed PTO plus actuator, a motor/generator that is air cooled (15 kW peak/8 kW cont.), and an inverter that is air cooled (15 kW peak/8 KW cont.), but may not include a 48V alternator and starter. This architecture's features include: performs engine crank and allows for starter and alternator elimination, engine off coasting, electric HVAC for engine off air conditioning, power for all 12 Volt or 24 Volt electrical loads, 12 Volt battery balancing and charge/discharge regulation, low speed engine off creep mode, and builds upon hardware developed in P0 base system and becomes the new base for the liquid cooled system.

A P2.5 liquid-cooled hybrid architecture is liquid cooled and higher power, with reuse of the DC to DC and power distribution from the P0, reuse of HVAC inverter and controls and a 2 speed PTO plus gear change actuator from the P2.5 air cooled, then adds liquid cooled motor/generator (30 kw peak/15 kW cont.) and liquid-cooled inverter (30 kW peak/15 kW cont.) to get to higher power levels, and also adds a low temperature cooling loop and a lithium-ion battery pack. In this architecture, the 48V battery is lithium ion but lead acid batteries are retained on the 12V bus. This architecture features: engine crank, engine off coasting, electric HVAC for engine off air conditioning, electric catalyst heater for NOx compliance, power for all 12 Volt or 24 Volt electrical loads, low speed engine off creep mode, and builds upon content developed for the P2.5 air cooled and P0 architectures.

A P1 architecture uses the DC-to-DC converter, catalyst heater and PDU from the P0 architecture, and adds a P1-located motor generator, an eHVAC inverter and controls, a liquid cooled inverter (22 kW), a low temperature cooling loop, a lithium-ion battery pack, and a 48V (or 12V) starter. Some system features include: Hybrid region and alternator elimination, electric HVAC for engine off air conditioning, electric catalyst heater for NOx compliance, power for all 12 Volt or 24 Volt electrical loads, and low speed engine off creep mode.

A P2.25 architecture includes a 3 kW DC to DC converter, a 48 Volt PDU, a 2 speed PTO plus gear change actuator, an air-cooled motor generator and air cooled inverter or a liquid cooled motor generator and liquid cooled inverter. System features include: performs engine crank and allows for starter and alternator elimination, engine off coasting, power for all 12 Volt or 24 Volt electrical loads, and low speed engine off creep mode.

Figure 30A:
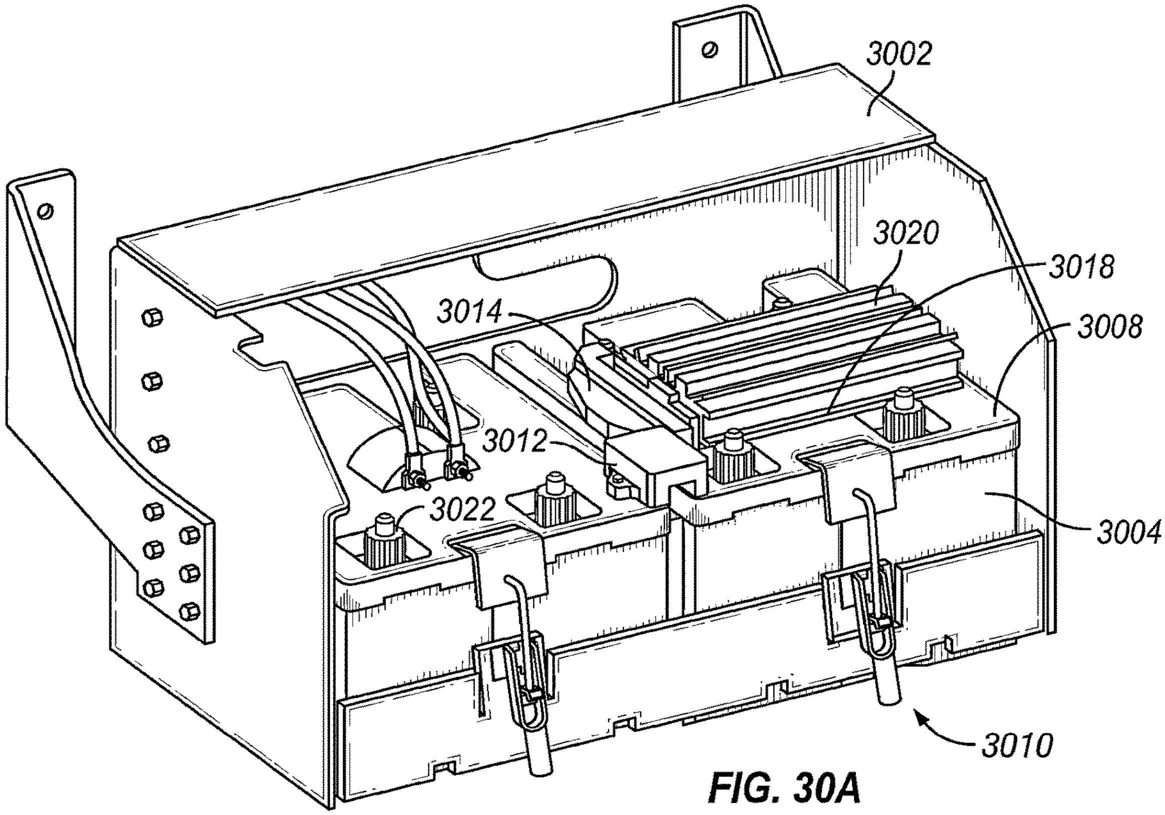
FIG. 30A depicts an embodiment of power management that is safe, simple, serviceable, and reliable.
Figure 30B:
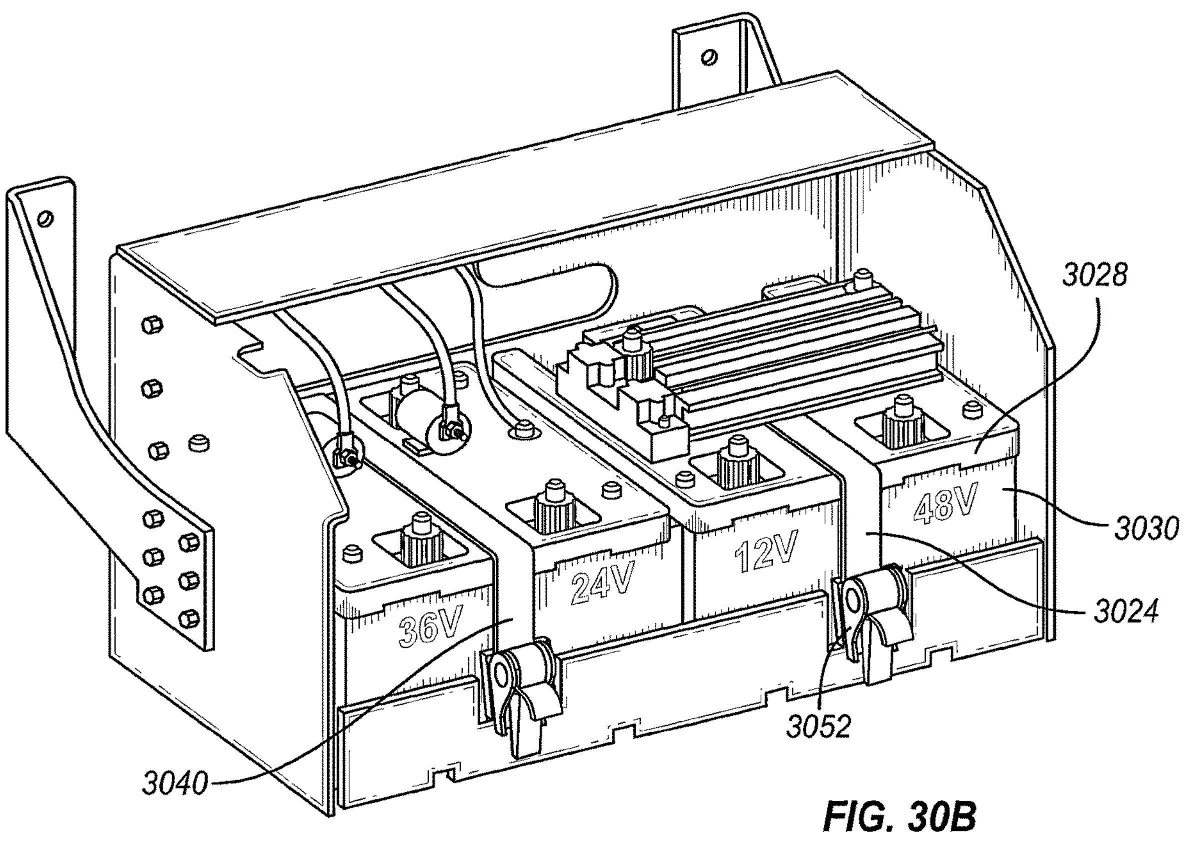
FIG. 30B depicts a battery box assembly.

FIG. 30A depicts an embodiment of power management that is safe, simple, serviceable and reliable. Going to insulated and scaled terminal connections is simpler rather than having multiple pieces of welding cable to connect all the batteries together. Integrating all the connections enables the system to reduce complexity for servicing and verifying that connections are properly accessed, de-coupled, and re-coupled, making it easier and safer to change batteries and repair it. As the standards go from a single 12 or 24 Volt system to a dual 48 and 12 Volt, or 48 and 24 Volt system in Europe, the system remains reliable, such as through controls. In the 48V architectures described herein, lead acid batteries may be described, however, it should be understood that lithium ion or other known or yet-to-be-known battery chemistries may be useful in the 48V architecture. In the 48V architecture, lead acid batteries, typically 4, although 8, or 12 or other numbers of batteries are possible, are reconfigured in series instead of parallel. FIG. 30A depicts a battery box 3002, batteries 3004, battery tray 3008, quick clamp 3010, battery interconnect 3012, service disconnect with integrated fusing 3014, integrated automatic disconnects, dual voltage battery interconnect with battery management separated from the DC-to-DC converter, DC-to-DC converter with PDU controls 3018, an extruded housing of the DC-to-DC converter 3020, battery terminals 3022, simplified vehicle connections, and contactors. The 48V battery assembly also uses firmware for battery management supervision and to read battery voltages and temperatures and report it into the processor for the DC-to-DC converter. The 48V architecture is agnostic to battery chemistry, and while lithium-ion batteries would be useful in the architecture, they remain expensive from an energy standpoint, truck standby discharge rates are less desirable than other chemistries, and are not as of this invention widely used in truck fleets. In FIG. 30B depicts a battery box assembly. In this embodiment, 48V is achieved using standard 12V batteries. The battery tray includes all battery connections and connections/contactors to the vehicle, battery sensing, and control, as well as a 48V-12V DC-to-DC converter, a service disconnect with fusing, and LEDs to indicate if the batteries are backward or defective. In this embodiment, the batteries are placed in the battery box as in a typical battery installation, but instead of wiring the batteries together, the battery tray and electrical system of this disclosure is placed on top of the batteries to connect them to each other and to the 48V electrical system. Further, the attachment 3024 in this embodiment is a strap and cam lock across the batteries as opposed to a quick clamp 3010 attached to the battery tray 3008. Battery tray groups may be interconnected to connect groups of batteries at the desired voltage and arrangement.

In an embodiment, a system may include a vehicle having a prime mover motively coupled to a drive line, a motor/generator selectively coupled to the drive line, and configured to selectively modulate power transfer between an electrical load and the drive line, a battery pack, a covering tray 3008 positioned over a plurality of batteries 3004 of the battery pack, and wherein a DC/DC converter 3018 is mounted on the covering tray, the DC/DC converter electrically interposed between the motor/generator and the electrical load, and between the battery pack and the electrical load, a DC/DC converter housing 3020 defining at least a portion of the DC/DC converter 3018, the DC/DC converter housing 3020 comprising fins thermally coupled to switching circuits of the DC/DC converter 3018, and a strap 3024 coupled to a battery box 3002 at a first position behind the DC/DC converter and to the battery box at a second position in front of the DC/DC converter housing, wherein the strap 3024 may be securingly engaged to at least one of the DC/DC converter housing or the covering tray. In embodiments, the strap 3024 may include a cam based disconnect 3052 or a clip based disconnect 3010.

In embodiments, the DC/DC converter housing may include a substantially constant cross-section, and wherein the strap 3024 may securely engage the DC/DC converter housing, such as by securingly engaging a flat portion of the DC/DC converter housing.

In an embodiment, the strap 3024 may securingly engage a flat portion of the covering tray.

In an embodiment, the strap 3024 may include a first strap 3024 securingly engaging a first one of the covering tray or the DC/DC converter housing, the system further including a second strap 3040 securingly engaging the other one of the covering tray or the DC/DC converter housing.

In an embodiment, the strap 3024 may include a first strap securingly engaging the covering tray, the system further including a second strap securingly engaging the covering tray. The first strap may securingly engage the covering tray at a first battery of the plurality of batteries, the system further including a second strap securingly engaging the covering tray at a second battery of the plurality of batteries.

In an embodiment, the system may further including wherein the battery pack further includes a second plurality of batteries, a second covering tray positioned over the second plurality of batteries, and a second strap 3040 securingly engaging the second covering tray. The strap may securingly engage the covering tray or the DC/DC converter housing.

Figure 31:
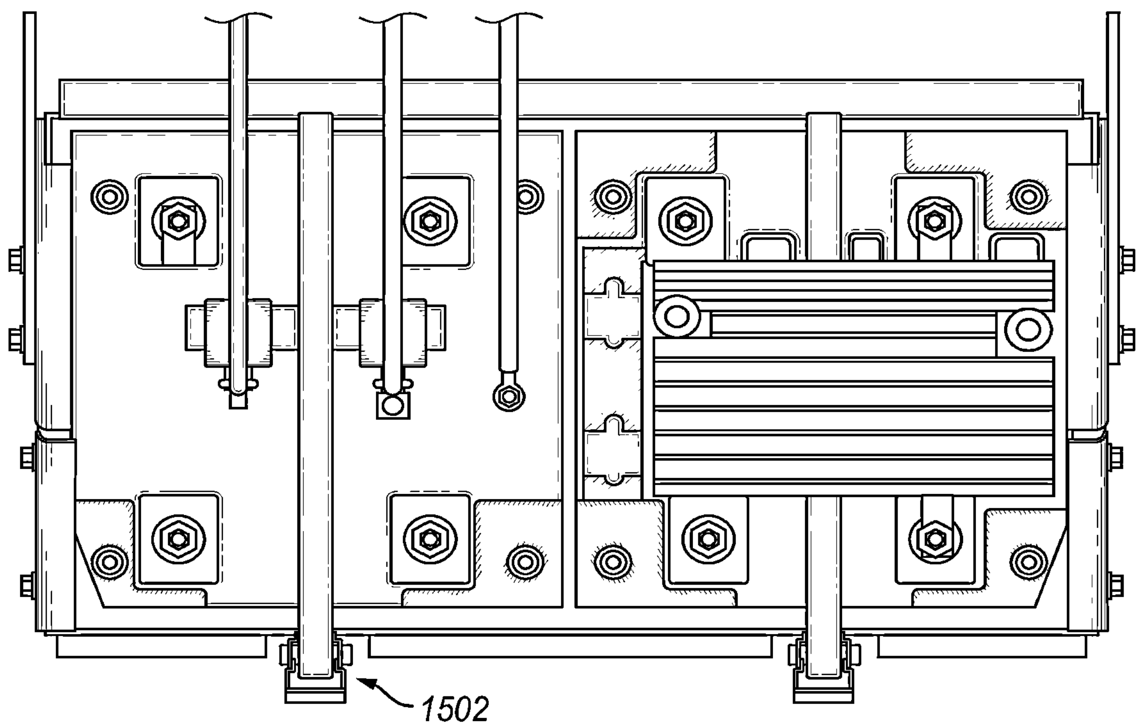
FIG. 31 depicts a top view of a battery tray.

In embodiments, some materials placed below the batteries may enable case of positioning of the batteries, such as for example if a slippery mat is placed below the batteries. Batteries may need to be secured using a strap and cam lock 1502, as shown in FIG. 31 which depicts a top view of a battery tray, to avoid further movement after positioning. A strap and cam lock may be cheap, simple, serviceable and easy compared to other securing mechanisms, and a cam lock can tolerate height variations.

In an embodiment, instead of using round cable for battery connections, using several layers of copper foil or sheet will enable flexibility in one dimension. Twisting or braiding the stack may provide flexibility in two dimensions.

In an embodiment, a single tool, such as a 9/16" wrench, may be the only tool that a mechanic needs to service the components of the 48V electrical system.

FIG. 32A, FIG. 32B, FIG. 32C, FIG. 32D, and FIG. 32E depict a sealed, snap-together connector block for a DC-to-DC converter.

The embodiment depicted is a two-piece design, which may be 3D printed or injection molded. In embodiments, all four connections 3202 (e.g., bent copper blade connector) may be identical, and may be ~200 amp connections. In other embodiments, the 48V connection may be narrower than the others, the ground may be medium size, and the 12 Volt may be wide. In embodiments, the width of the terminals may be sized to meet the current density (e.g., ¼ the current at 48 volts as at 12 Volt). This design facilitates locating features when snapped together. After everything is located, then filler holes may be filled with epoxy or silicone. The two pieces 3204, 3208 of the two-piece custom high current connector may represent a cost savings over a single piece overmolded.

Figure 32A:
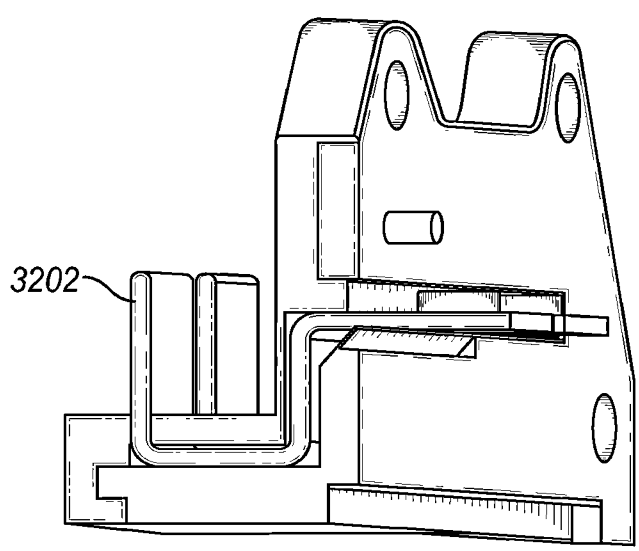
FIG. 32A, FIG. 32B, FIG. 32C, FIG. 32D, and FIG. 32E depict a sealed, snap-together connector block.
Figure 32B:
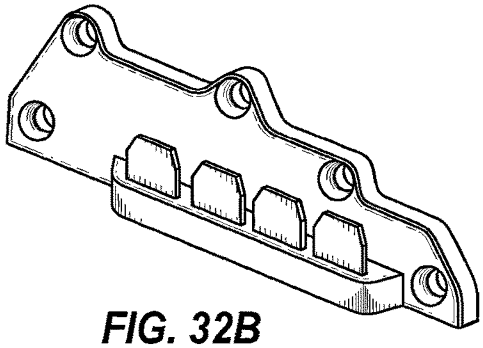
Figure 32C:
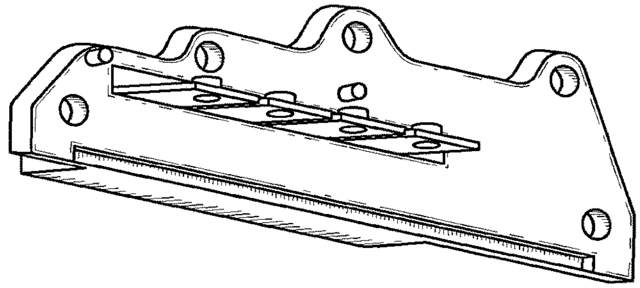
Figure 32D:
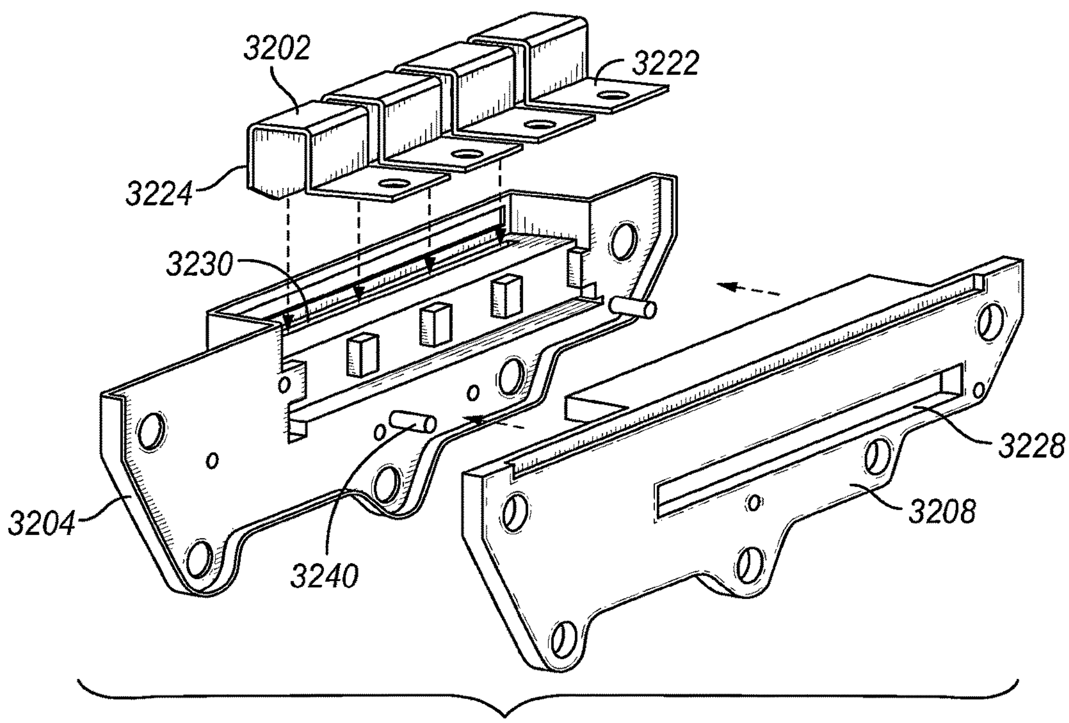
Figure 32E:
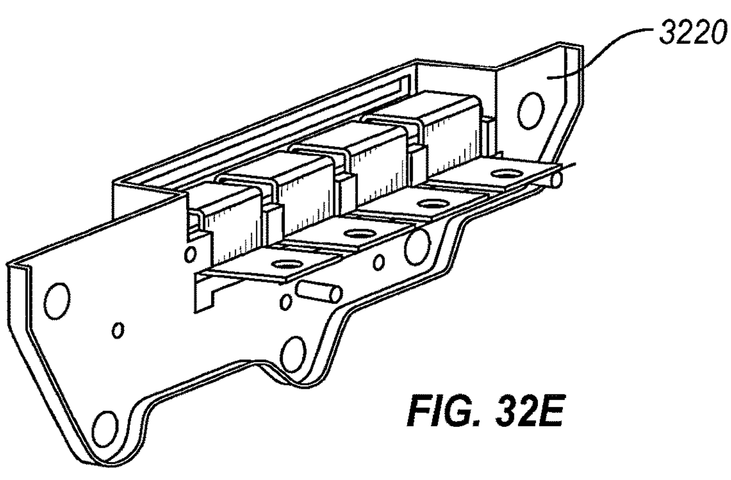

Vibration may be a significant life limiting issue for lead acid batteries. Vibration may shake the lead particles off the grid and break the grids. Battery life extension may be enabled by elements of the structural design of the housing as well as placing padding around the batteries, such as above or below them. One solution is a honeycomb rubber spacer with a slippery top to facilitate positioning the batteries. FIG. 32A depicts the assembled connector block, FIG. 32B depicts a side of one part of the connector with connectors installed and FIG. 32C depicts the other side.

Figure 33:
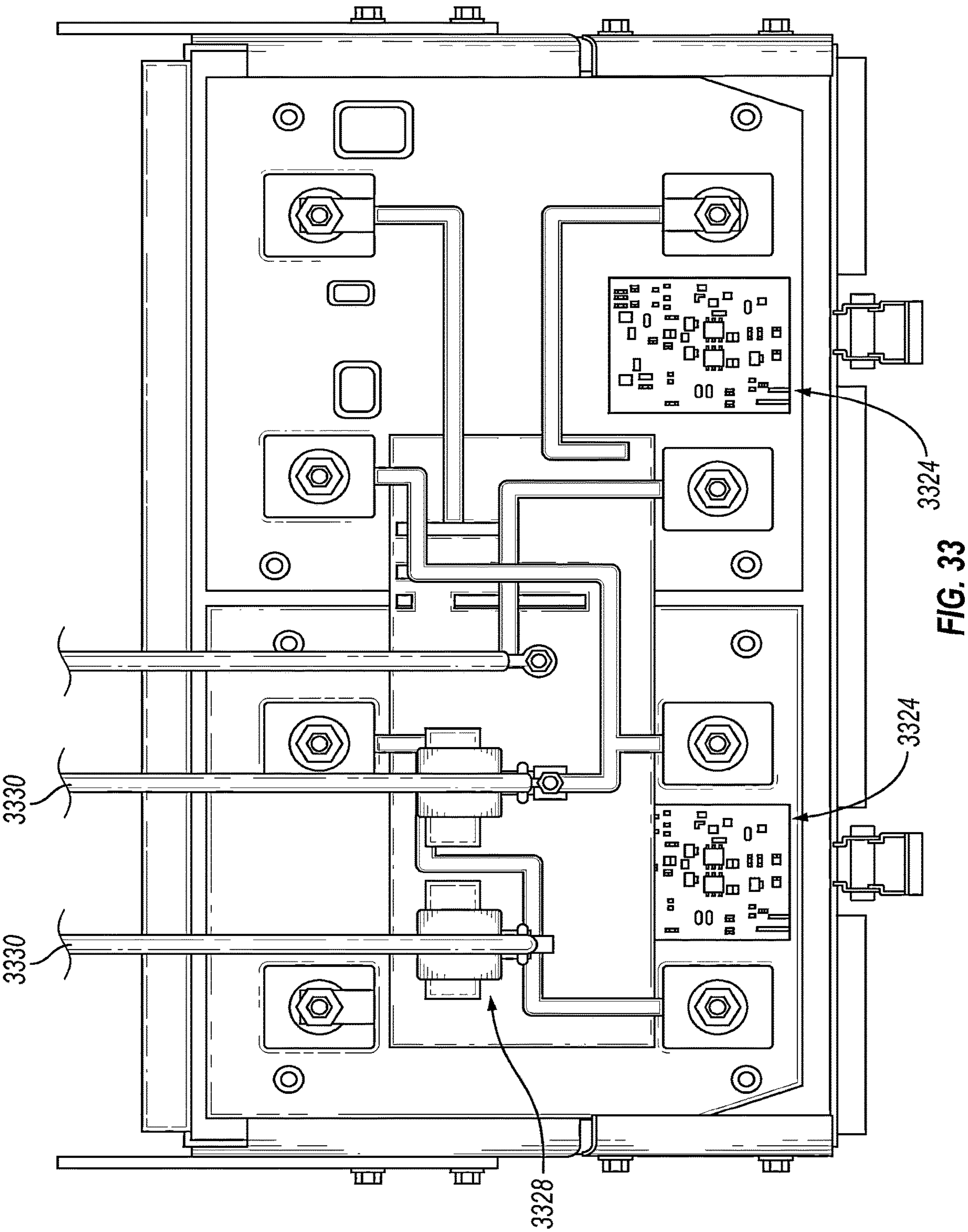
FIG. 33 depicts a battery sensing board.

FIG. 33 depicts the inside of a battery tray including a battery sensing board 3324 with firmware. LEDs over each battery are fault LEDs to indicate which battery has a problem in it. Each battery sensing board 3324 has an 8-bit microcontroller to measure voltage and temperature. Each microcontroller may be grounded to the battery it is monitoring, which happens to be 36 volts above the vehicle ground. As will be further described herein, a one amp flyback converter with a transformer on it may be able to draw power out of any one battery. In embodiments, a fifth microcontroller may control the two contactors 3330 on the left side of the battery tray. In an embodiment, an insulating sheet 3328 may separate the busbars. In an embodiment, the entire tray may be a circuit board and the circuit board may be used as an insulator between copper busbars. In this embodiment, a screw or rivet may be used to make the electrical connection from the busbar that is being monitored to the monitoring circuits. In the embodiment with the insulating sheet, a notch may be cut in the sheet where the circuit board fits in and the top of the circuit board contacts one busbar and the bottom of the circuit board contacts a second, adjacent busbar so that individual wires connecting circuit boards and busbars may be avoided.

Figure 34A:
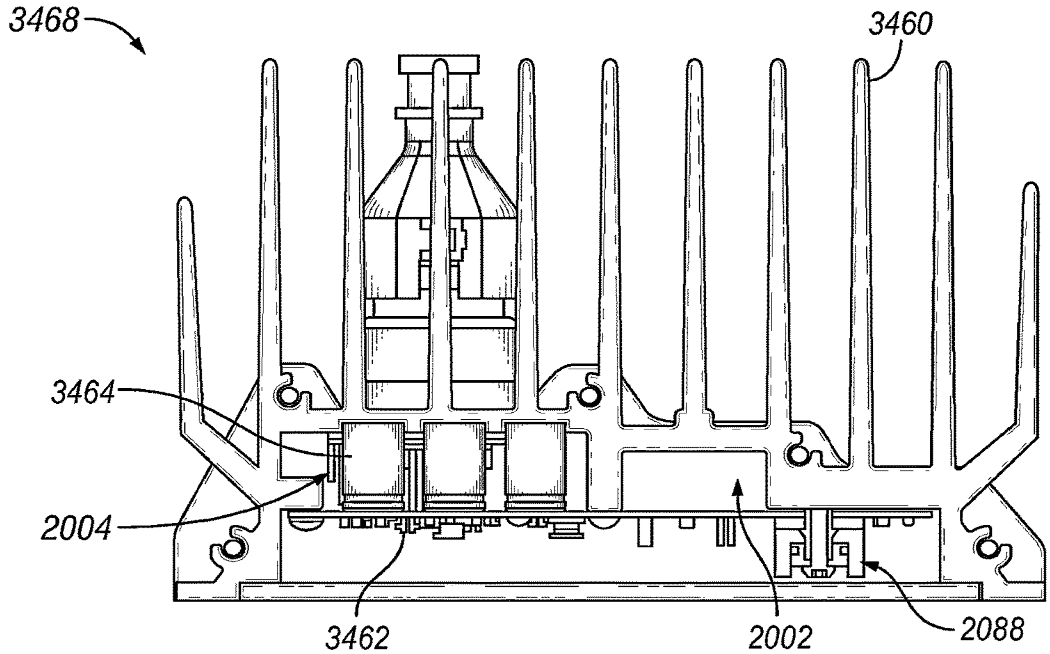
FIG. 34A, FIG. 34B, FIG. 34C.
Figure 34B:
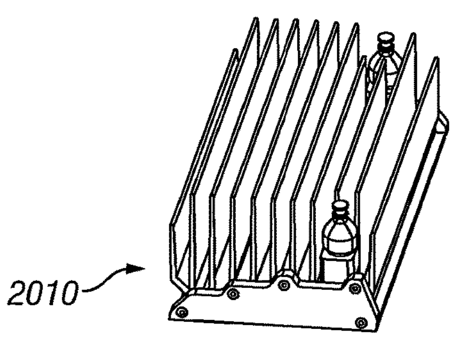
Figure 34C:
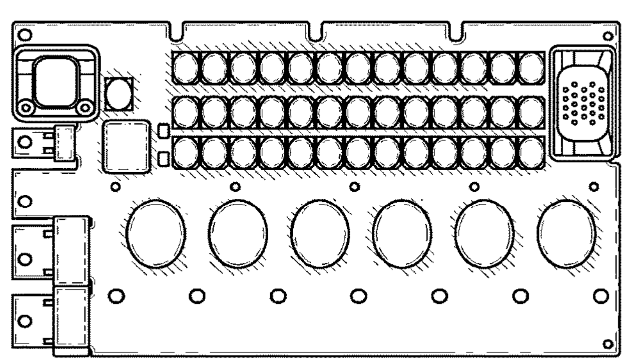
Figure 34D:
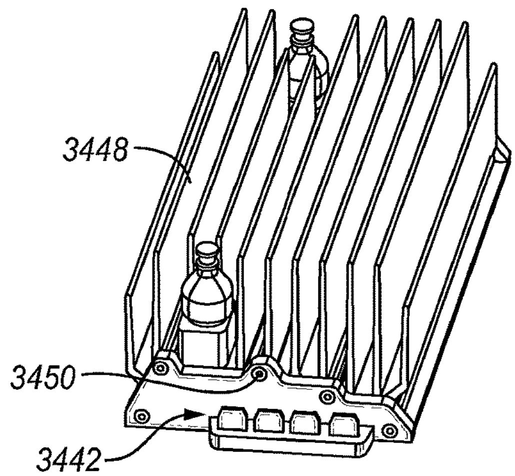
FIG. 34D depicts a DC/DC with custom heatsink.

FIG. 34A, FIG. 34B, FIG. 34C, and FIG. 34D depict a DC/DC with custom heatsink, shown fully assembled in FIG. 34A, FIG. 34B, and FIG. 34D, comprising an inductor valley, connector and capacitor valley, and FET clamp, and is able to be used for varying number of phases with minimal change of hardware. FIG. 34A is an end view of the DC-to-DC converter showing an inductor 2002 in an inductor valley of the extruded heat sink, and capacitors 3464 inside the capacitor valley 2004 of the heat sink. FIG. 34B is the opposite end as that shown in FIG. 34A, and in perspective view. FIG. 34C is a top down view of the DC-to-DC converter without the heat sink in place. In an embodiment, a custom extrusion for the housing may be used to reduce cost compared to die casting and to provide the ability to optimize for heat transfer and incorporate housing features at the same time. In FIG. 34C, the board layout depicts the phases all in a row, with the inductors in a line which then fit into the inductor valley in the extrusions so that they can be coupled to the heat sink. MOSFETs may also be disposed in a row and clamped to the heat sink with a thermal interface material with a known pressure. A capacitor valley 2004 may house the capacitors 3464. The primary life limit for power electronics may be electrolytic capacitors, which degrade with temperature (e.g., a base chemical reaction causing degradation of capacitors can be estimated as an Arrhenius wear law states, with every 10 degrees Celsius doubling the degradation rate). Accordingly, the service life of capacitors can be significantly increased by modest reduction in average and/or peak operating temperatures for the capacitors. In this embodiment, the heat generation is focused on the right side of the top right image, while the left side of the top right image remains at a lower ambient temperature. In some embodiments, there may be a 10 degree Delta between sides, which may increase (e.g. double) the life of the electrolytics in the valley. In embodiments, the heat sink fins may be sized for sufficient heat transfer through at least conduction and radiation. In embodiments, RTV may be placed between the tops of the capacitors, or between the capacitors and the extrusion to constrain vibration. A thermal epoxy may be used between the inductor and the heat sink. In a sense, the inductor supports the circuit board with screws to hold it while the epoxy cures. In embodiments, the inductors may be shimmed up and intentionally thermally decoupled and giving some compliance between the inductor lead and the extrusion. The gap between the inductor and heat sink should be as thin as possible. The mass of the inductor to be carried directly by the structural elements of the housing, not by the soldered connections to the circuit boards. Another advantage of the extrusion with this board design is the ability to go to a different number of phases and to shorten or lengthen the housing to cater for that. This design is scalable—the DC-to-DC converter can be "copy/pasted" or scaled from 80 amps with two phases, 160 amps with four phases, to 210 Amps and 8 phases, and so on, while the extrusion is stretched to accommodate the multi-phase scale, all of which results in minimal engineering and costs to scale power and length. In an embodiment, FET clamps may be used with the board. When a circuit board is screwed down to a heat sink, it compresses the thermal material of the screw hole and actually bubbles it up. In an embodiment, a U-shaped extrusion 2088 with Belleville Springs and a Silicon pad placed below the heat sink may provide localized pressure on the top of the MOSFET, loading the MOSFET into the thermal interface material and into the heat sink. In the embodiment shown in FIG. 34A, the FET clamp may be six individual pieces with two screws and Belleville springs each, or one long extrusion with seven screws, seven Belleville springs, and six rubber pads that press the heat generating source into the heat sink. An embodiment may include a PCB thermal interface and heatsink housing and a clamp providing localized pressure over the MOSFETs. In this embodiment, heat transfer occurs via thermal vias in the PCB to the thermal interface and heatsink housing. Most of the heat is in the MOSFETs and inductors and those are thermally coupled to the housing.

In embodiments, heat is shifted away from the capacitors and more of the heat can be taken off the circuit board by lifting the inductor slightly and some compliance. Through component selection, such as by choosing the control connector at the two ends of the valley to be the same height as the capacitors, manufacturability is enhanced by having a single, combined capacitor and connector valley sharing one feature on the extrusion.

In one embodiment of the DC-to-DC converter, an insulated metal substrate board with the MOSFETs carries the heat out, a heavy copper board carries the high currents backed with busbars, and a four-layer standard FR4 circuit board carries the high density microprocessor and surface mount parts.

Figure 35:
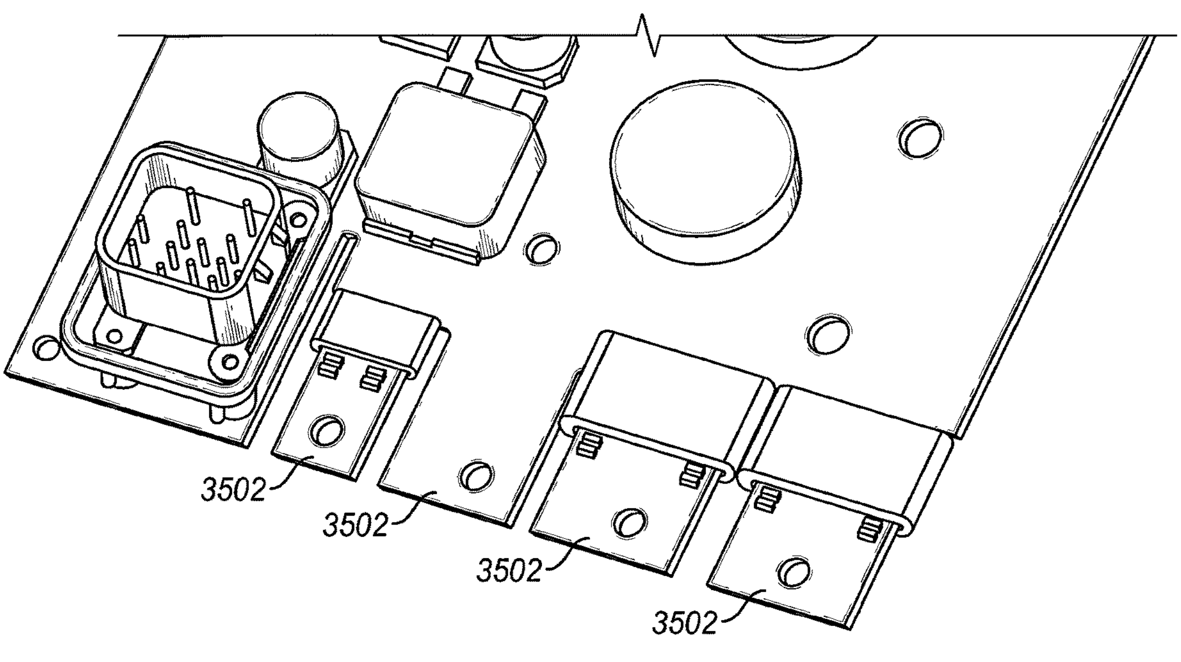
FIG. 35 depicts use of ribbon cable ferrites for EMI suppression on the power fingers of a PCB.

In another embodiment of the DC-to-DC converter, the DC-to-DC converter comprises a substrate that has good thermal performance by using a thin FR4 circuit board, very heavy copper wherein a cross section of the board is over 50% copper (e.g., a copper board separated by fiberglass layers), and wherein the outer layers are lower copper so that we can achieve high density with the inner layers being heavy copper. The connection to the outside usually involves custom copper pieces bolted to the board that typically go through a choke, however, as shown in FIG. 35, ribbon cable ferrites, or chokes, for EMI suppression are used on the power fingers 3502 of the PCB (FIG. 35 depicts a zoomed in version of the left side of the PCB shown on FIG. 34C.) In FIG. 35, ribbon cable connectors are used to create "fingers". The fingers also are for flexibility to deal with tolerancing between the connector and the board as the finger can accept the misalignment stress. In this embodiment, a ferrite choke is slipped over the finger to act as a high frequency cut, wherein the choke comprises surface mount caps. Effectively, there is a large amount of capacitance on the inside and the choke adds a little bit of capacitance on the outside for high frequency bypass. In this embodiment, the left most finger carries the 48V load, the second is ground, and the rightmost two are 12V (where one finger 3502 may be Vin and the other may be Vout, or where both may be outputs), however, 24V is also possible, possibly with a change in a Zener diode. In an embodiment, having the design include two outputs was to be able to run the vehicle at 14 volts while the 12 Volt battery fluctuates from 12½ to 14 volts with the help of a diode. There are cost and board space savings for the MOSFETs to carry 200 amps in a solid state, active diode that connects the battery to the vehicle if the DC-to-DC converter fails. In an embodiment, the outputs may be shorted together, both of them being 12 volts. This design enables an application where the power to the vehicle 12 Volt may be at a different voltage than the 12 Volt battery with the high current solid-state connection and reverse battery being on the board while keeping the same interface Referring again to FIG. 34A, FIG. 34B, and FIG. 34D, the DC-to-DC converter is assembled with stainless, self-tapping screws into the aluminum extrusion, RTV to seal the end plate, and a snap-in, GORE-TEX breather vent 2010 that snaps into a plastic injection molded part on the back end. The front end, in FIG. 34D, is a similar construction and arrangement with just three bent or four bent pieces of copper to make the connections to the circuit board. FIG. 34D is the opposite end as that shown in FIG. 34B. The DC-to-DC converter includes one connector to the vehicle for Key In and Key Switch, one to the battery tray to talk to the battery sensors and monitor.

Figure 36:
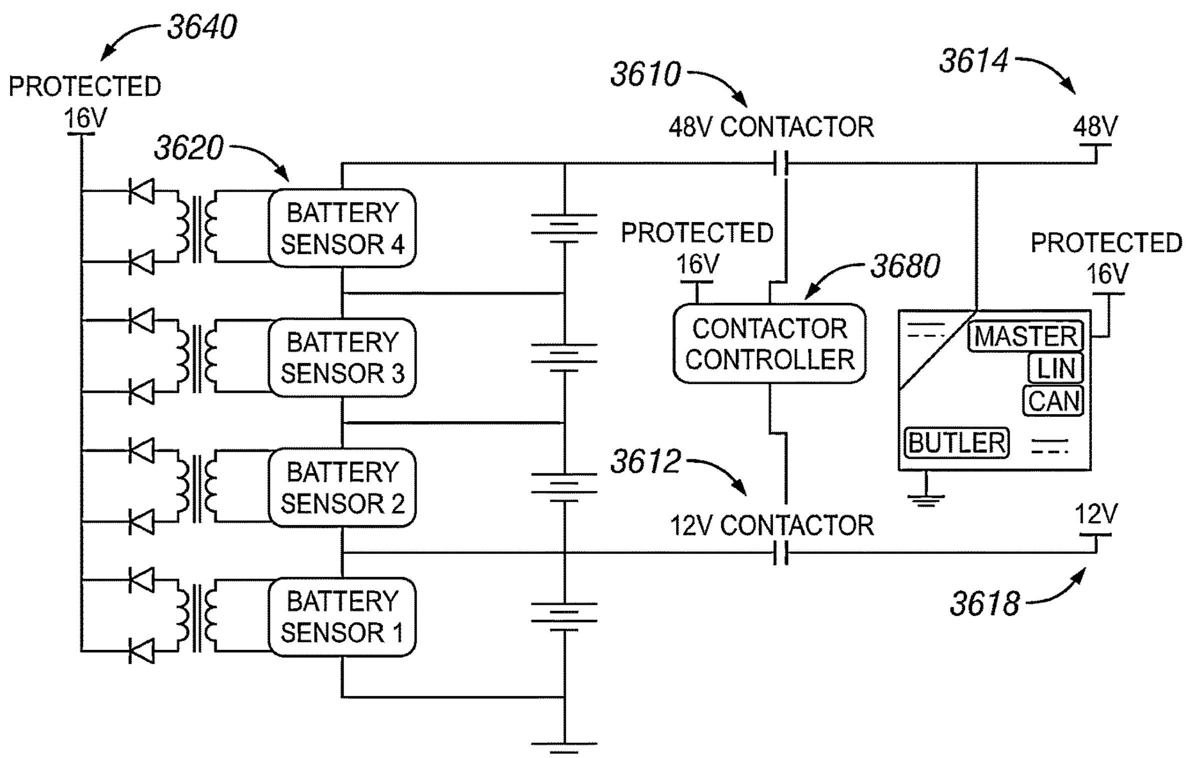
FIG. 36 depicts a block diagram of a power management circuit.

Referring to FIG. 36, there is a block diagram for an exemplary power management circuit. The exemplary circuit includes a battery pack having four batteries coupled together in series. The battery pack is coupled to a 48V power network and a 12V power network. In other embodiments, the battery pack may include more or fewer batteries.

The exemplary circuit includes battery sensors 3620, each battery sensor being coupled across one battery of the battery pack. Each battery sensor is structured to measure an electrical characteristic of one of the batteries of the battery pack. For example, each battery sensor may measure a voltage across the battery, or a current being conducted by the battery, to name but a few examples. Each battery sensor is coupled with a 16V bus 3640 by way of a transformer and two diodes.

The exemplary circuit includes a contactor controller 3680, a 48V contactor 3610, and a 12V contactor 3612. The contactor controller is structured to open and close the 48V contactor and the 12V contactor. The 48V contactor is structured to interrupt current being conducted between the battery pack and the 48V power network 3614. 12V contactor is structured to interrupt power being conducted between the battery pack and the 12V power network 3618. 12V contactor is coupled to the battery pack at a quarter tap, such that only one battery of the battery pack is coupled between 12V contactor and a ground.

The exemplary circuit includes a DC/DC power converter structured to receive DC power at first voltage and output DC power having a different voltage than the first voltage. In certain embodiments, the DC/DC power converter is a buck converter, a boost converter, or a buck/boost converter. For example, the DC/DC power converter may receive 48V power from the 48V power network, convert the received power to 12V power, and output the 12V power to the 12V power network. The DC/DC power converter includes a DC/DC converter controller structured to control power switches of the DC/DC power converter.

In certain embodiments, the battery sensors and the contactor controller are located on two circuit boards. The two circuit boards may be identical but populated with a different set of components. For example, a first circuit board may include two battery sensors, and the second circuit board may include the other battery sensors and the contactor controller. The circuit boards may communicate with each other period for example, circuit boards may communicate using a capacitively coupled UART. The circuit boards may also communicate with the DC/DC converter controller.

The protected 16V bus coupled to each of the battery sensors is also coupled to the DC/DC power converter and the contactor controller. The 16V bus receives power from the battery sensors and supplies power to the H bridges of the contactor controller. The 16V bus may also provide power to the DC/DC power converter, and transmit current to the 12V bus by way of the DC/DC converter. In certain embodiments, the magnitude of the current transmitting on the 16V bus is 1 A.

The power management circuit may be run in one of a plurality of modes. The first mode is a battery leveling mode, where one of the batteries, (e.g. battery 3) has a higher state of charge than the other batteries. In response to determining the high state of charge, the battery sensor (battery sensor 3) activates the flyback converter of the corresponding battery, transmitting power to the 16V bus, the corresponding transformer isolating the bus from the battery sensor. In this way, power is removed from the battery with the high state of charge, transmitting through the 16V bus and the DC/DC converter to the 12V bus. The 1 A current from the flyback converter may be a portion of the current being generated and consumed by the vehicle, for example 1 A out of 50 A, or the 1 A from the flyback converter may be used to power control systems during a power failure/power loss event so that the high amp DC/DC converter does not have to be activated.

In a second mode, the contactor controller is structured to open the contactors when the service disconnect is removed or any terminal of a battery is disconnected. Where the service disconnect is removed, each of the flyback converters in the battery sensors is active. For three of the battery sensors, the voltage output to the 16V bus is 15.5V. For the battery sensor corresponding to the battery with the highest state of charge, the flyback converter is configured to output 16V to the bus, so that all power is consumed from the battery with the highest state of charge. In this way, there is a dual voltage level or a continuously settable control of the battery sensors. The remaining three batteries serve as a backup power supply for the contactor controller and the DC/DC converter. Even if three batteries are unavailable, the DC/DC power converter controller may still receive power to function and communicate with the contactor controller, and the contactor controller will still be able to open the contactors.

In another mode, if the contactor controller does not receive information from the DC/DC power converter via the serial bus and the contact controller receives information from a hardware input that the vehicle is not running, the contactor controller will continue to allow the batteries to remain on. For example, if the DC/DC power converter fails while driving the vehicle down the road, the contactor controller may determine the key switch is on or the vehicle speed is nonzero, and then continue to allow the batteries to power the loads in the vehicle. Alternatively, if the vehicle running indicator is not present then the contactor controller does whatever the master tells it to.

If the vehicle is not running and the DC/DC converter controller is dead, the contactor controller assumes the service disconnect was pulled or a battery was removed or whatever, and it opens up both the 12V in the 48V contactor. The opening of the contactor in this circumstance is important for reverse battery protection. If the service disconnect were pulled, the contactors remained closed, and a battery was installed backwards, the power system would be damaged. Once the DC/DC converter controller determines the batteries are installed correctly, the contactors are closed.

In certain embodiments, an additional contactor is coupled between the DC/DC power converter and the jump charge terminal. The contactor remains open until the DC/DC power converter controller determines the voltage across the jump charge terminals is correct. In certain embodiments, the contactor may be a relay have a 50 A or 100 A current rating that passively closes in response to the correct voltage orientation.

Figure 37:
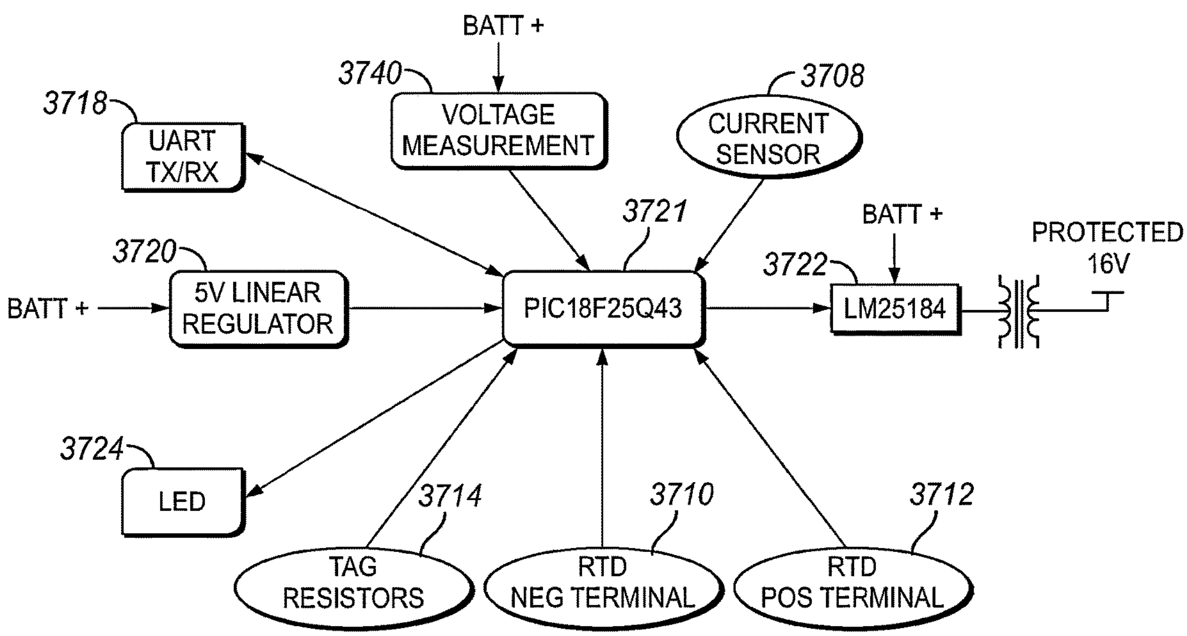
FIG. 37 depicts a block diagram of battery sensors.

Referring to FIG. 37, there is a block diagram of an exemplary battery sensor. The battery sensor includes a microcontroller 3721 configured to receive a voltage measurement 3740, a current measurement from a current sensor 3708, a temperature measurement from the negative terminal of the battery 3710, a temperature measurement from the positive terminal of the battery 3712, and a tag resistor 3714 configured to identify the battery for which the measurements are being collected. In certain embodiments, the tag resistor may identify the battery as being one of 16 batteries on the same bus. The microcontroller is configured to transmit the received information in one message or a plurality of messages to the UART transmitter 3718.

In certain embodiments, the temperature measurements collected by the battery sensor may be used to determine if there is a bad terminal connection, indicated by a terminal temperature increase from nominal temperature. The temperature measurements may also be used to determine a state of charge of the battery. A light-emitting diode (LED) 3724 may be activated in response to a determination.

Battery sensor includes a 5V linear regulator 3720 structured to receive power from with the corresponding battery and output a 5V power to the microcontroller.

The battery sensor includes a fly back controller 3722 structured to receive power from the corresponding battery, receive a signal from the microcontroller, and output power to an isolated 16V bus in response to receiving this signal from the microcontroller.

Figure 38:
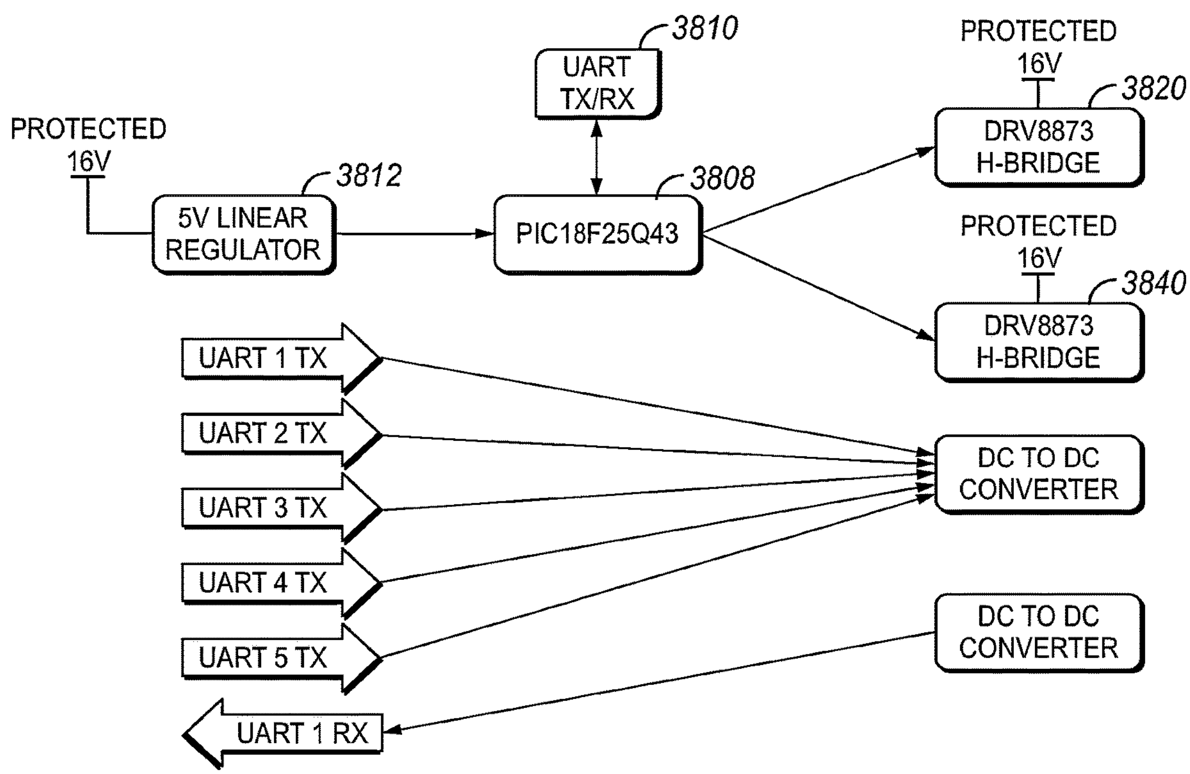
FIG. 38 depicts a block diagram of a contactor controller.

Referring to FIG. 38, there is a block diagram of an exemplary contactor controller. The controller includes a microcontroller 3808 structured to receive 5V power from a 5V linear regulator 3812. The controller includes two gate drivers 3820, 3840, each structured to receive a signal from the microcontroller, and operate one of the contactors in response to receiving this signal from the microcontroller.

The contactor controller also includes a UART transmitter 3810 and receiver in communication with the microcontroller. Using the UART transmitter and receiver, the contact controller is structured to transmit UART messages received from a plurality of microcontrollers via corresponding UART transmitters of the power management system to the DC/DC converter controller, as well as transmit UART messages received from the DC/DC converter controller to the plurality of microcontrollers.

Figure 39:
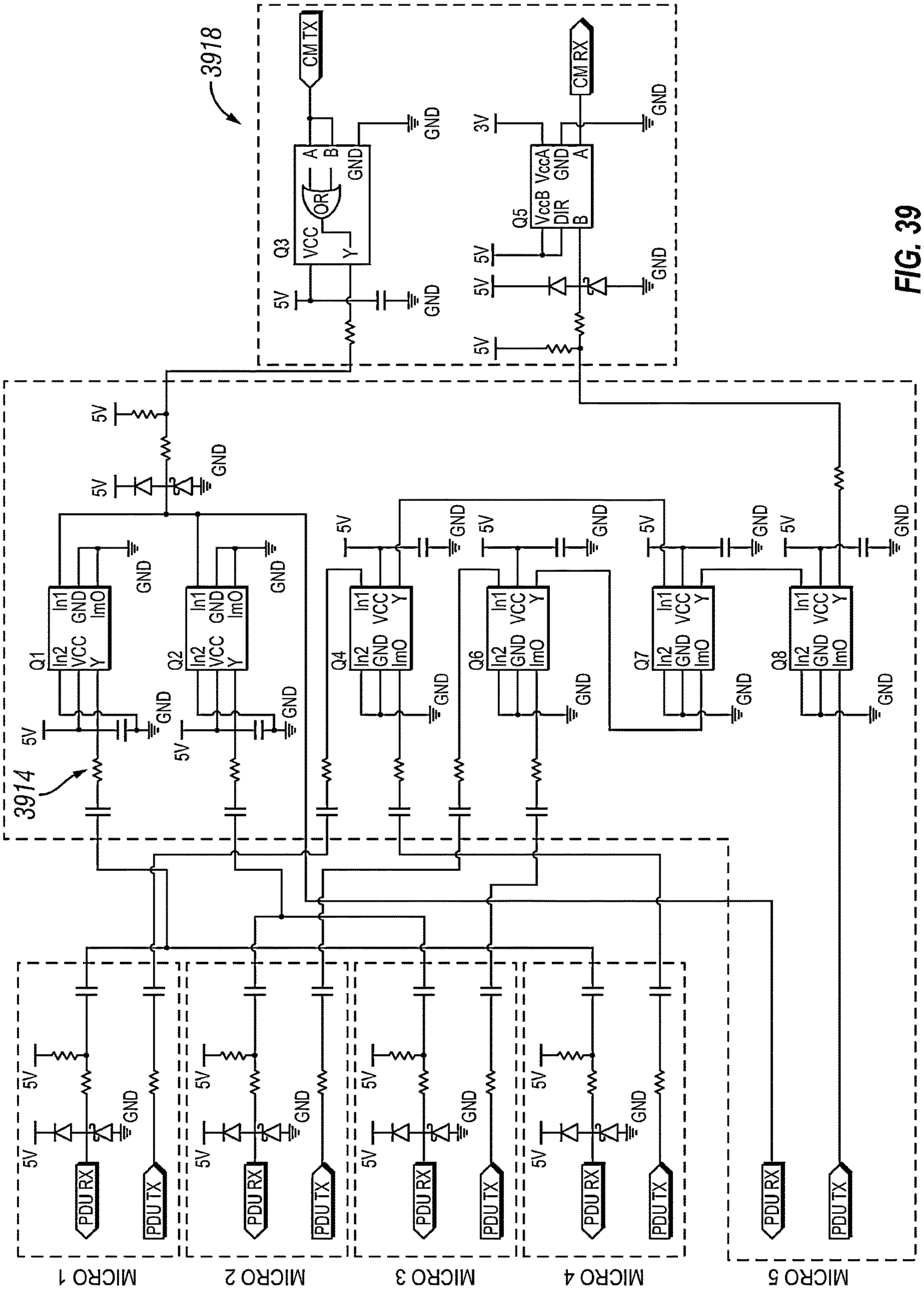
FIG. 39 depicts a voltage-shifting circuit scheme.

Referring to FIG. 39, there is an exemplary voltage shifting circuit of an exemplary power management circuit, such as the power management circuit in FIG. 36. The voltage across each battery of the battery pack, relative to a common ground, is 12, 24, 36, or 48 volts. The illustrated voltage shifting circuit is structured to reduce the voltage transmitted from each battery sensor to a voltage the contactor controller is structured to receive, such as 5V, to name but one example.

In the illustrated embodiment, each microcontroller includes a pin for transmitting messages and a pin for receiving messages. In another embodiment, one or more microcontrollers may use a single pin for receiving and transmitting messages. In one embodiment, messages from the battery sensors only transmit raw data received by the DC/DC converter 3918 for processing. The contactor includes an in-line resistor 3914. For example, each battery sensor may transmit the data received from the battery measurement without determining a state of health of the battery or another characteristic of the battery using the received measurements. In certain embodiments, the data received from the battery sensor may be scaled by a scaling factor at the DC/DC converter controller as a form of calibrating the battery sensor without updating the firmware of the battery sensor.

Figure 40:
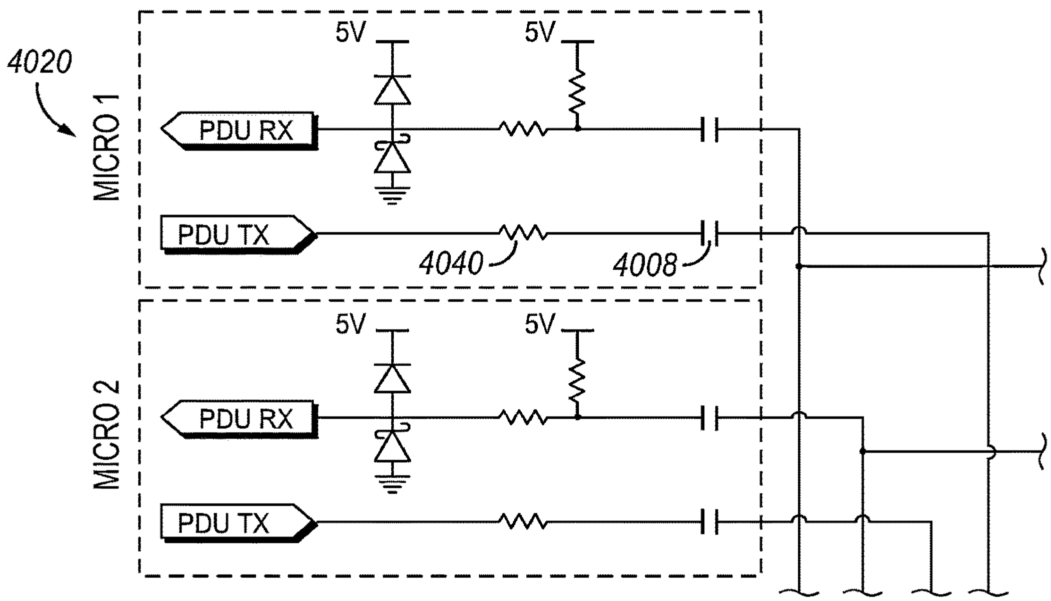
FIG. 40 depicts a portion of a voltage shifting circuit scheme.

Referring to FIG. 40, there is a portion of the voltage shifting circuit in FIG. 39. The portion illustrates a plurality of RC circuits structured to reduce the voltage of signals transmitted to/received from the contactor controller. For example, R3 4040 and C2 4008 form an RC circuit that reduces a voltage received from microcontroller 1 4020 of a battery sensor. Resistor R3 is structured to protect the contactor controller from overvoltage and current stress. Capacitor C2 is structured to pass high frequency signal but block DC power, so the capacitor will block the 36V offset that the microcontroller 4020 experiences, but the capacitor will pass the square wave of a 5V CMOS UART signal.

Figure 41:
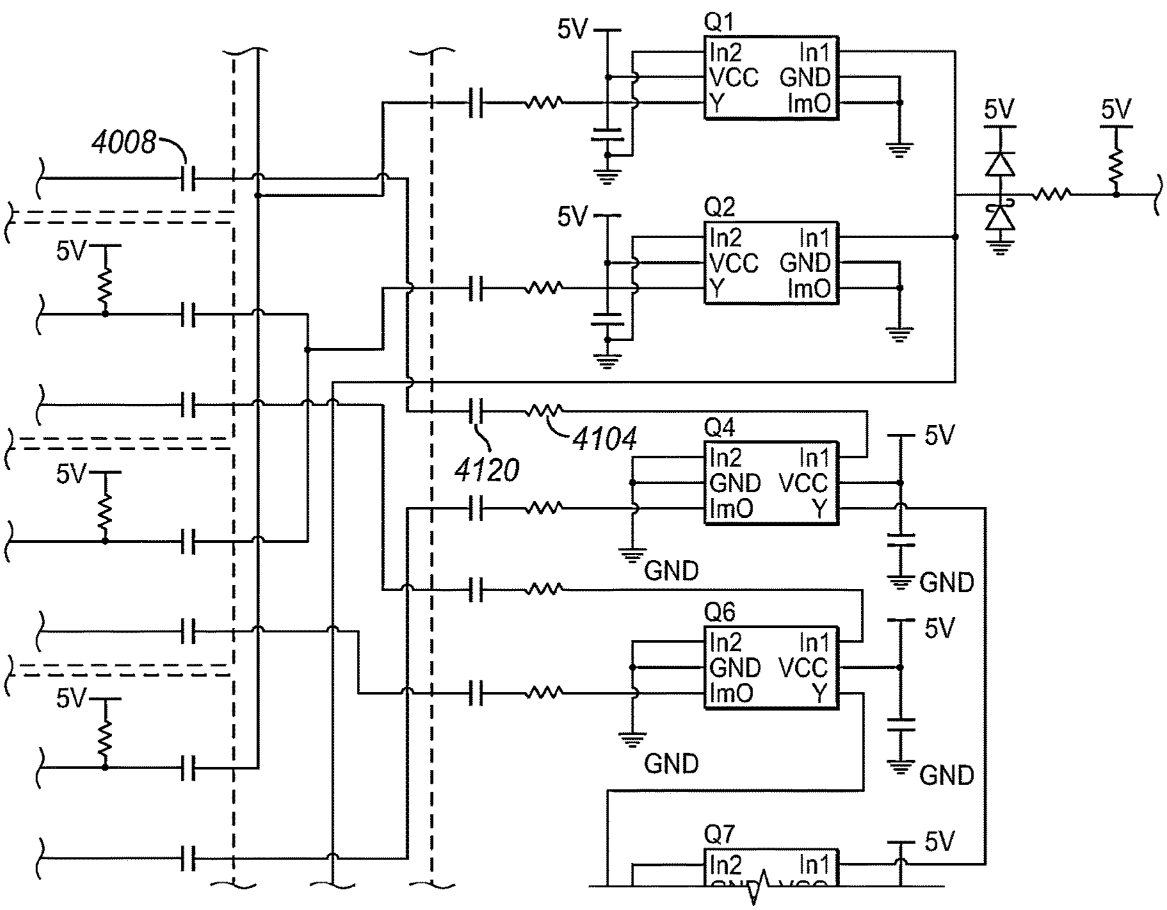
FIG. 41 depicts a portion of a voltage shifting circuit scheme.

Referring to FIG. 41, there is a portion of a voltage shifting circuit including an RC circuit coupled in series with the RC circuit formed of R3 and C2 in FIG. 40, the RC circuit including C10 4120 and R12 4104. Capacitor C10 is redundant to capacitor C2 4008, and is structured to reduce the voltage from microcontroller one 4020 in the event capacitor C2 4008 short circuits.

Figure 43:
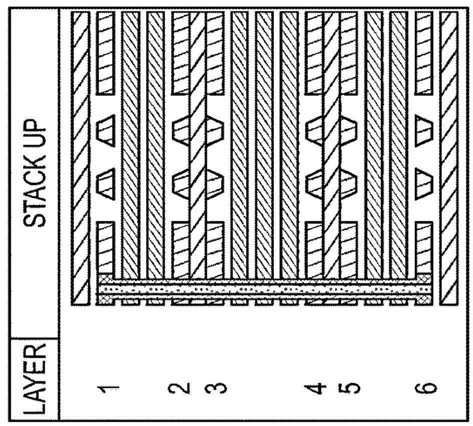
FIG. 43 depicts a dielectric stack-up for a DC-to-DC substrate.
Figure 42:
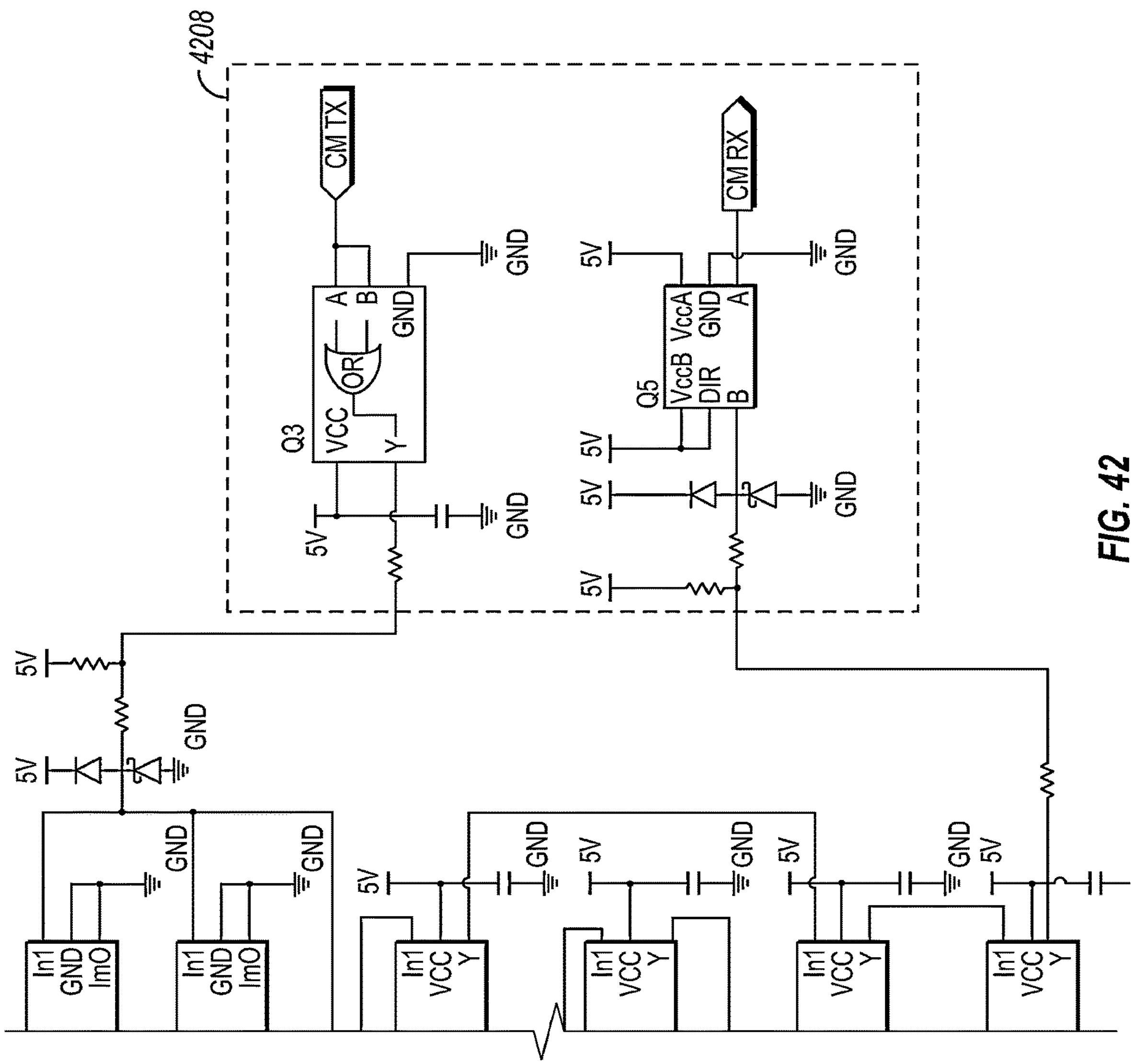
FIG. 42 depicts a portion of a voltage shifting circuit scheme.

Referring to FIG. 42, there is a portion of the voltage shifting circuit including the DC/DC power converter 4208. Referring to FIG. 43, a dielectric stack-up showing the density of copper in the controller is shown. In this embodiment, 6 layers are depicted but it should be understood that any number of layers are possible. In this embodiment, the outside layers include 2 oz. of copper while the inside layers include 3 oz. of copper, so that the inner layers replace the need for busbars. This board can carry 200 amps without any external copper bus bars or support. Effectively, in some embodiments, it's a high current, heavy copper board using 8 or 10 two ounce layers, more layers of thinner copper, or fewer layers of thicker copper. In embodiments, the cross section of the board may be ~55% copper. In some embodiments, the board may primarily be a copper board with fiberglass separators.

Figure 44:
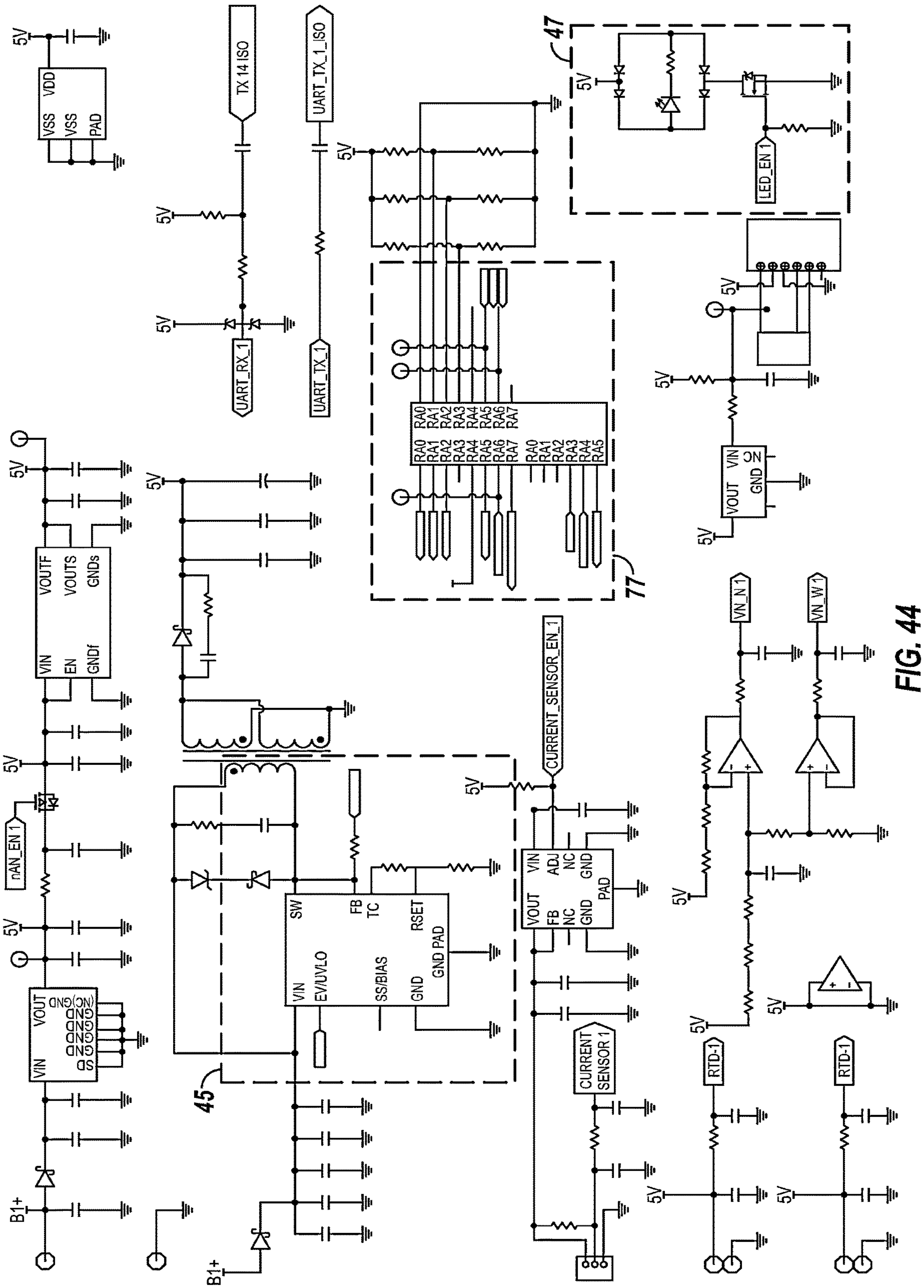
FIG. 44 depicts a circuit diagram for a battery sensor.
Figure 45:
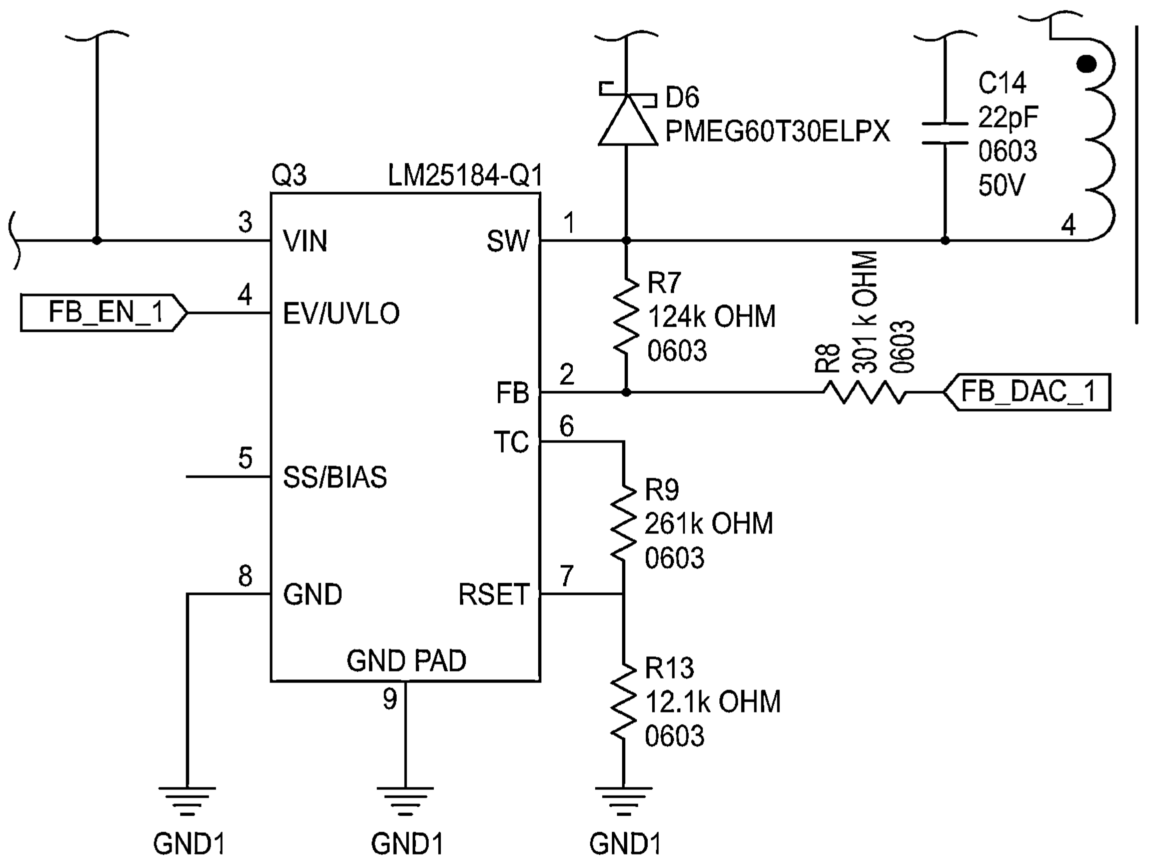
FIG. 45 depicts a portion of the battery sensor
Figure 77:
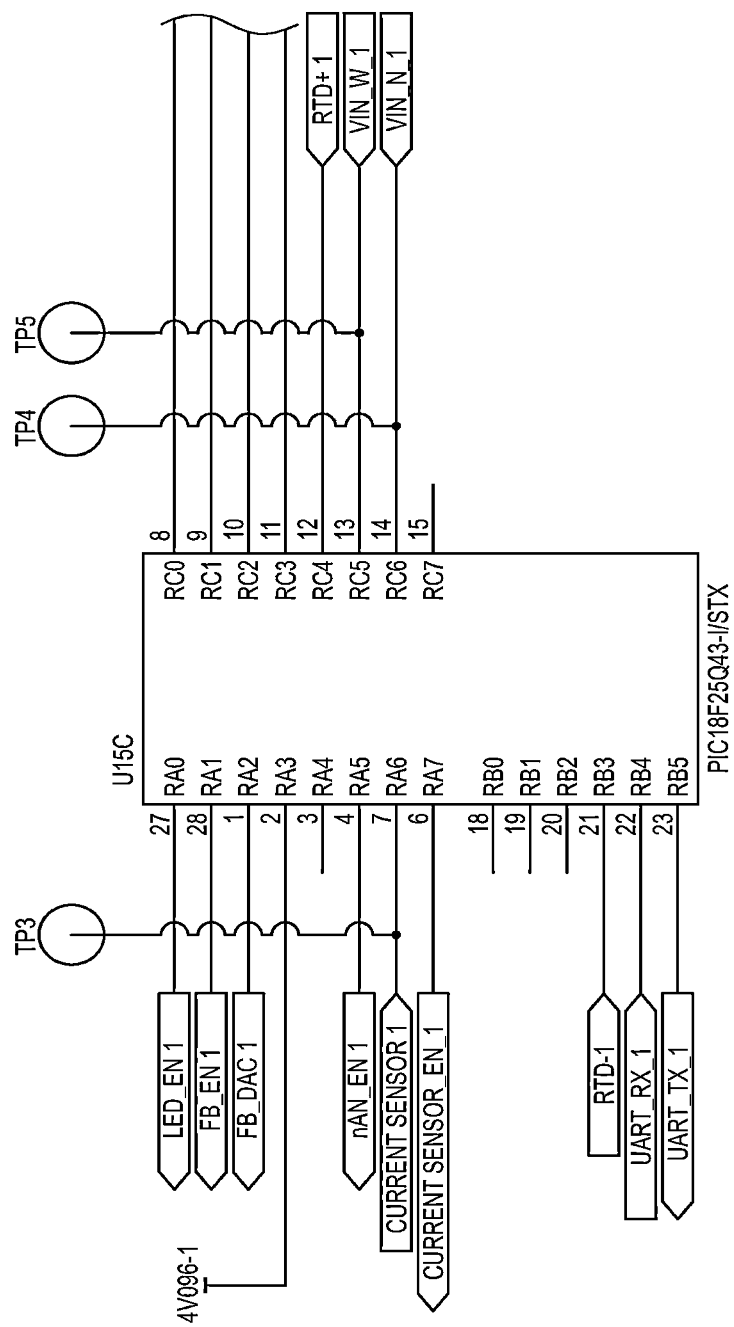
FIG. 77 depicts a portion of FIG. 44.

Referring to FIG. 44, there is a circuit diagram for the battery sensor. The overall details are less important and portions of this diagram will be enlarged in FIG. 45, FIG. 47, and FIG. 77. Referring to FIG. 45, there is a portion of the circuit diagram in FIG. 44.

Figure 46:
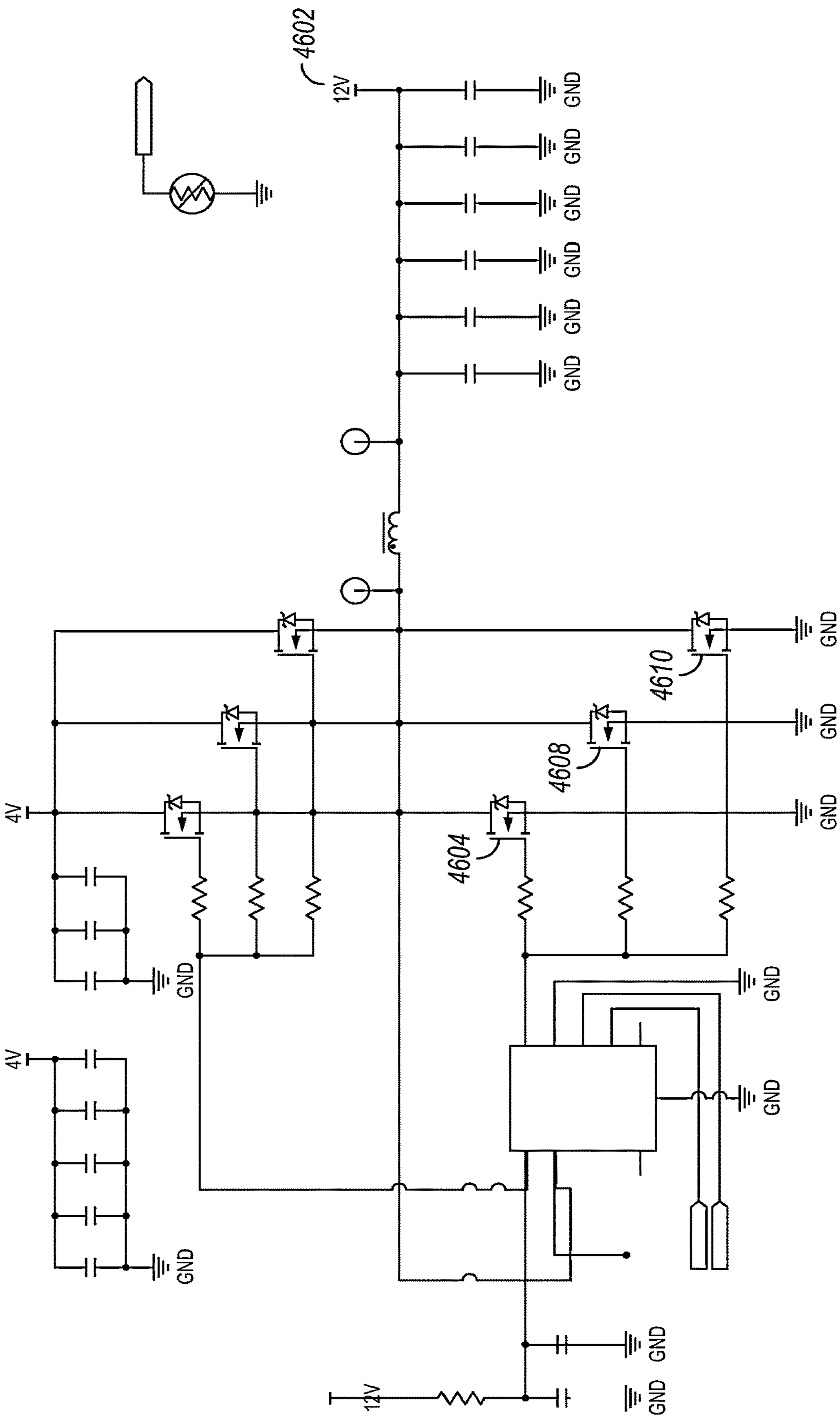
FIG. 46 depicts a portion of the battery sensor.

Referring to FIG. 46, there is a circuit diagram of the DC/DC power converter power supply. The 12V vehicle bus is coupled to the 12V terminal 4602 on the right side of the circuit diagram. Switches Q4 4604, Q5 4608, and Q6 4610 are each MOSFETs including a body diode. If the power supply received power from a 12V source with a reverse voltage, the MOSFETs would conduct the incoming current to ground, causing a fuse to blow without damaging the MOSFETs. The arrangement of MOSFETs is a less expensive alternative to a reverse battery switch.

Figure 47:
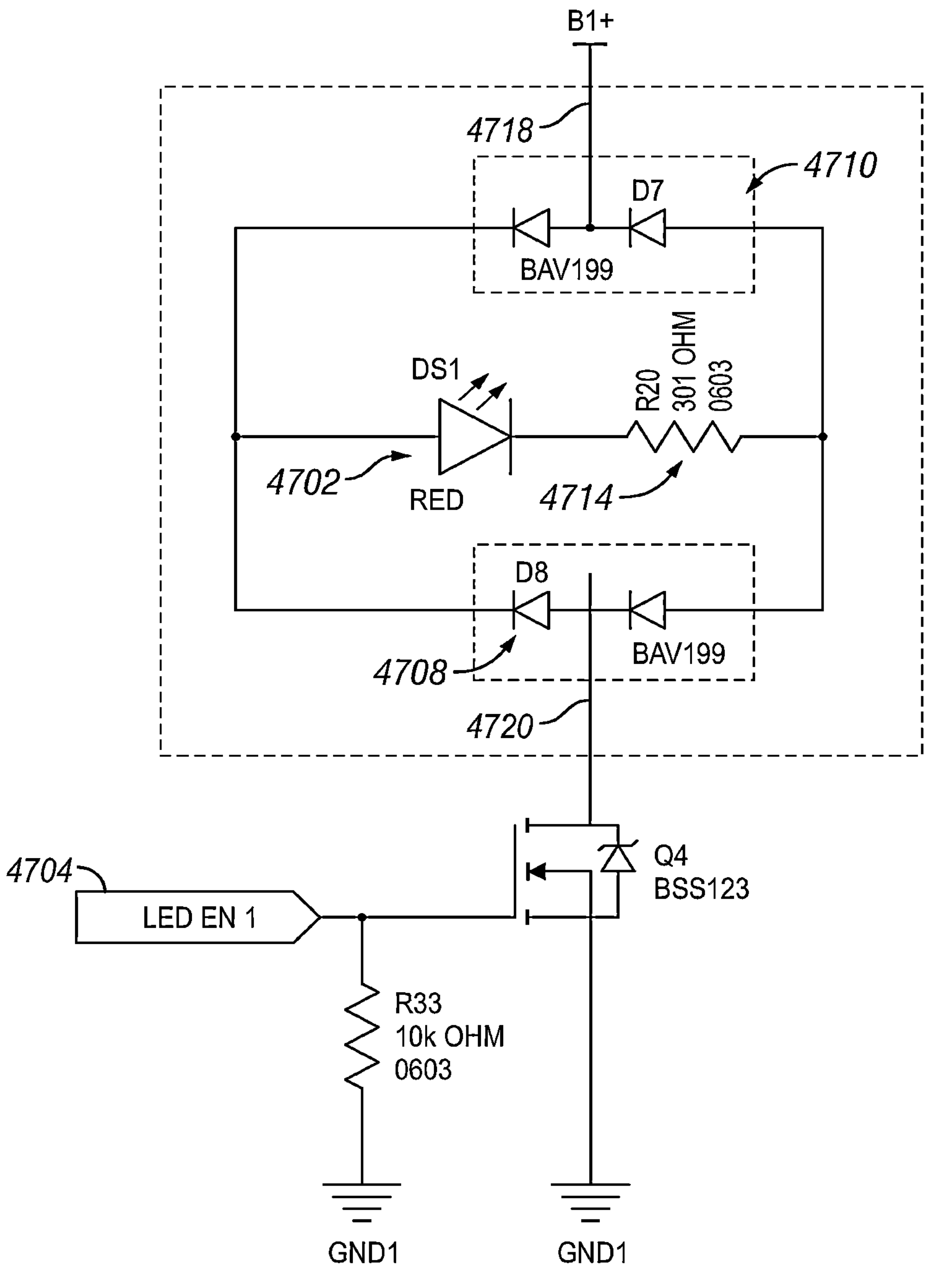
FIG. 47 depicts a portion of the battery sensor.

Referring to FIG. 47 there is a circuit diagram of a reverse battery detection circuit of the battery sensor. The reverse battery detection circuit includes a full bridge rectifier having two pairs of diodes coupled across a bus, as well as an LED 4702 and resistor coupled in series across the bus. A positive terminal of the battery is coupled to a midpoint connection of one of the pairs of diodes. A ground is coupled to the midpoint connection of the other pair of diodes by way of a MOSFET controllable using an LED enable signal 4704. In certain embodiments, the diodes are surface mount diodes.

If a negative terminal were coupled to the midpoint connection of the diodes instead of the positive terminal, current is conducted through a current path including the body diode of the MOSFET, diode D8 4708, the LED 4702, and diode D7 4710, causing the LED 4702 to turn on. In this way, the user installing the battery is notified of the reverse orientation of the battery, but the blocking diode protects the remainder of the battery sensor from being energized and damaged.

When the correct terminal, that is the positive terminal of the battery, is coupled to the midpoint connection, The LED may be turned on using the enable signal transmitted to the MOSFET.

Figure 48:
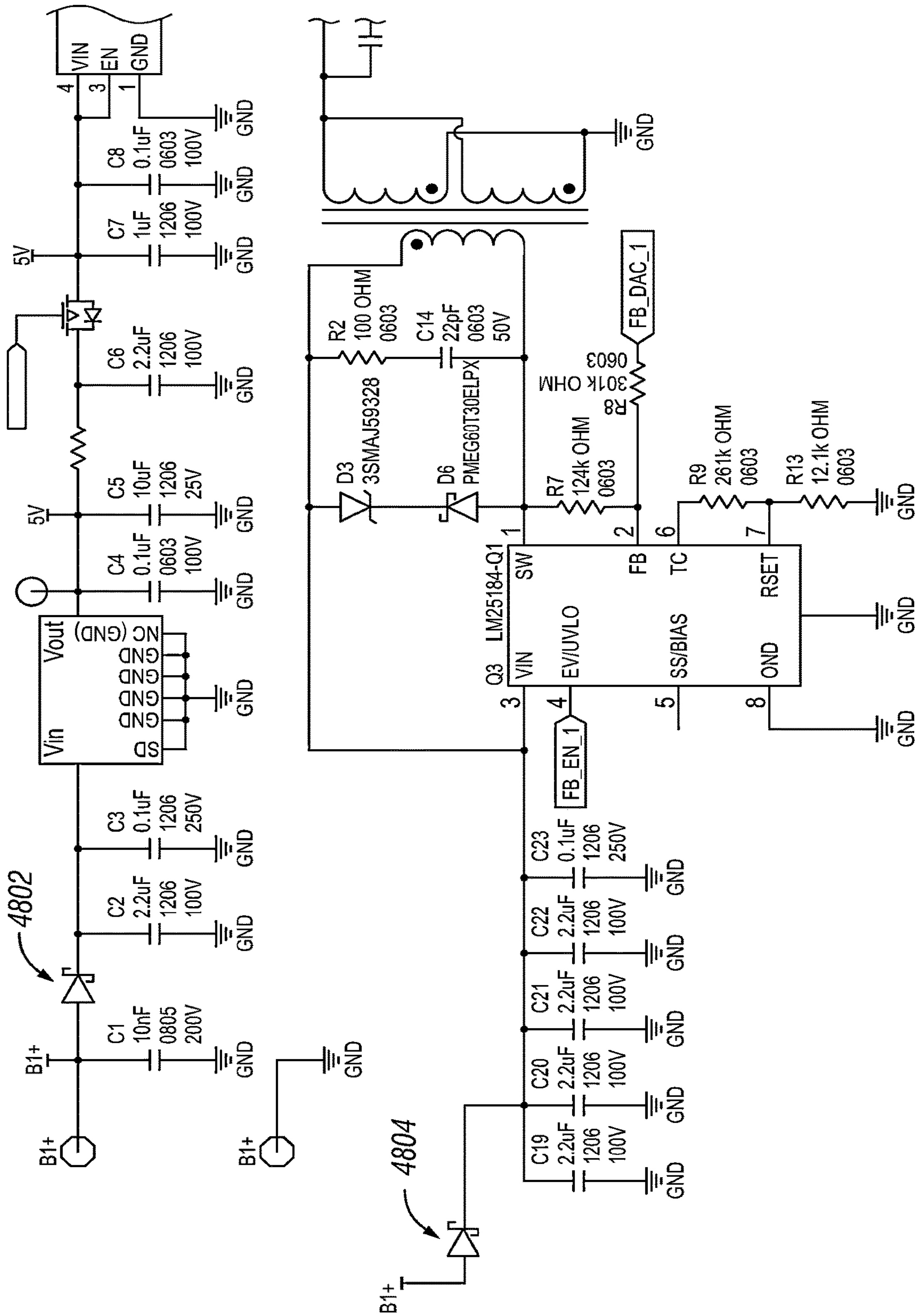
FIG. 48 depicts a portion of the battery sensor.

Referring to FIG. 48, there is a portion of the circuit diagram of the battery sensor. Diodes D1 4802 and D5 4804 are structured to block current from the battery if the battery has been connected to the battery sensor incorrectly.

The controller architecture enables a number of operating modes and commands. Many vehicle modes and power modes are supported by the architecture and can be customized by a manufacturer or other user of the system. Vehicle modes may include parked (e.g., vehicle loads disconnected), standby (e.g., waiting for first command), off(hotel) (e.g., key out of ignition), accessory (e.g., key in ACC position), crank (e.g., key in crank position, 48 V starter cranks engine, reduce engine/electrical load when possible), run/equalize (e.g., key in run position, DC/DC manages alternator and battery equalization at whatever power, Jump (e.g., 48V battery dead, max charge from 12V→48V), manual control (e.g., do not use pre-defined vehicle mode, ECU sets power, DCDC, Alt modes). Power modes, which may be customized with a power or voltage setting, for example, may include Off (e.g., "Deep sleep", lowest power consumption possible, no CAN), sensing mode (e.g., the DC/DC controller is periodically awoken and measures voltages, no CAN comms), sensing+equalize periodic wake, balance, go back to sleep), standby (CAN-enabled) key-switch ON (e.g., CAN communication fully enables, power stages off), low power (~50 A max) (e.g., CAN enables, Side A fully powered on), full power (210 A max) (e.g., CAN enables, Side A and Side B fully powered on). The modes also include voltage regulation modes, such as modes to regulate, with the DC/DC converter, the high voltage bus, the low voltage bus, and the high voltage/low voltage ratio. DCDC modes include disabled (e.g., refer to power mode for predriver stats), VL control (e.g., regulate to LV setpoint command), VH control (e.g., regulate to HV setpoint command), current control (e.g., regulate to LKV current command), equalizer (e.g., regulate to ratio of VL/VH setpoint), engineering (e.g., Allow HOG messages to work?). In an alternator regulation mode, which may be used in normal driving mode, the DC/DC controller regulates the current from the alternator to balance the high voltage bus, while the DC/DC controller uses the DC/DC converter to regulate the voltage of the low voltage bus. In a disabled mode, there is no regen.

Figure 49:
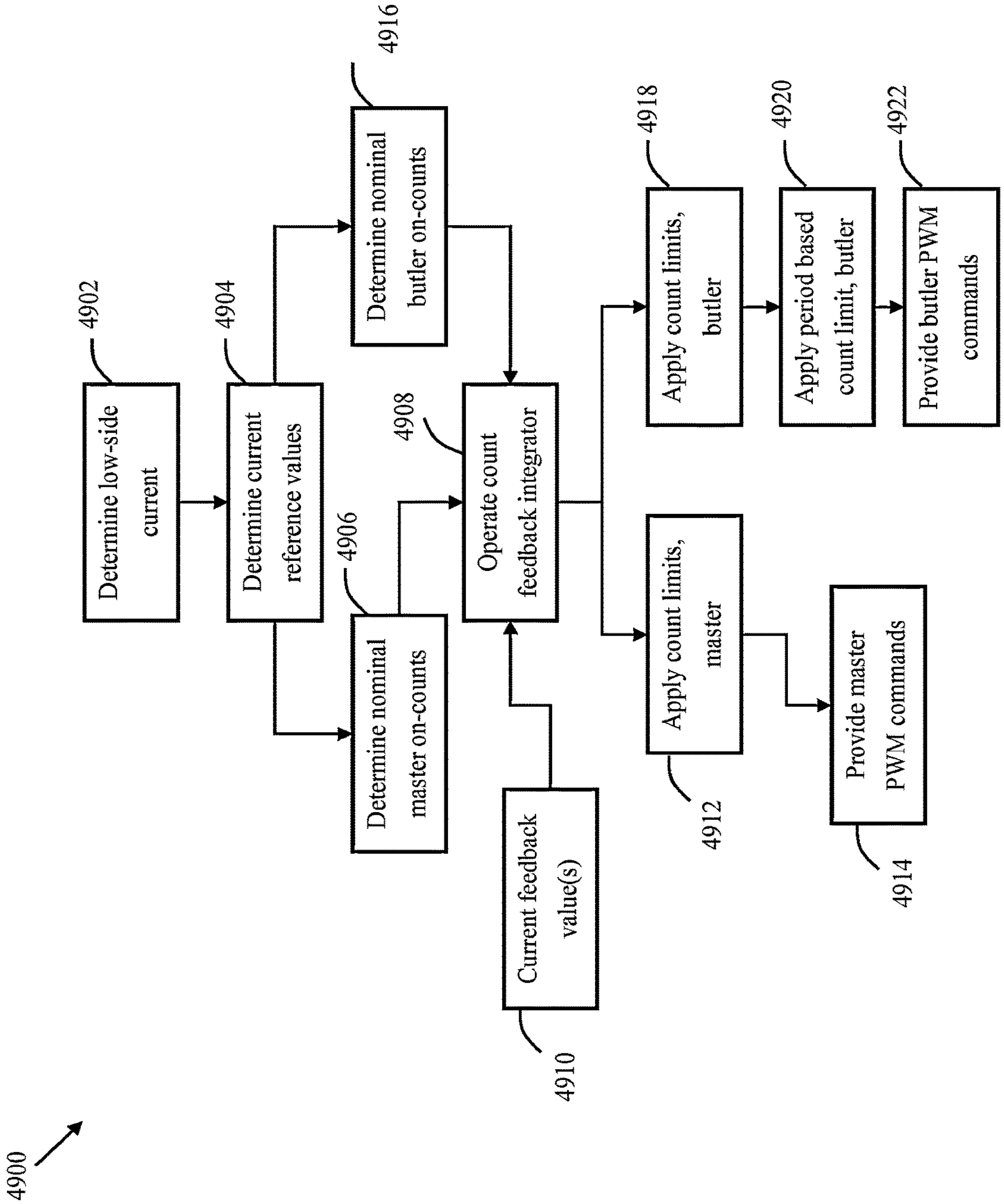
FIG. 49 depicts a flowchart of a first portion of a low-side closed-loop voltage control process and a second portion of a low-side closed-loop voltage control process.

Referencing FIG. 49, a procedure 4900 for low-side closed loop voltage control is schematically depicted. The example procedure 4900 may be performed, in whole or part, by any controller, circuit, and/or component set forth herein, including at least with reference to controllers described in reference to FIG. 205, DC/DC converters as described throughout the present disclosure including with reference to FIGS. 202 and 204, and/or may be performed in conjunction with and/or as a part of any procedure, operation, or method described herein, including for example as an implementation, in whole or part, of operations 20604, 20606 in reference to FIG. 206.

The example procedure 4900 includes an operation 4902 to determine a low-side current value. In certain embodiments, the low-side current value is determined from the high-side current value to provide the desired power to the electrical load, shared load, or other powered device by the DC/DC converter. In certain embodiments, the low-side current value is determined based on the ratio of the high side voltage and the low-side voltage. For example, if the high side voltage is 52V and the low-side voltage is 49V, the low-side current value will be slightly higher than the desired high side current value. In certain embodiments, non-linearities, efficiency differences in power transfer, or the like, may be accounted for in operation 4902 to ensure the high side current value is achieved. In certain embodiments, aspects that prevent a simple ratio from giving the correct low side current value may be corrected with operation of the feedback control (e.g., operation 4908). The voltage values for the high side and the low-side may be measured, modeled, determined based on other parameters indicative of the voltage, or the like.

The example procedure 4900 includes an operation 4904 to determine current reference values. The example procedure 4900 is depicted using a master controller and a butler controller, where the master controller is directly controlled by a controller that operates at least a portion of the procedure 4900, and is in communication with a controller implementing the butler controller. The depiction of FIG. 49 is a non-limiting illustration, and a given embodiment may be performed utilizing only a master controller (e.g., there is no butler controller in communication with the master controller, and all phases are directly controlled by the master controller), and/or utilizing only a butler controller (e.g., the controller operating at least a portion of the procedure 4900 does not control any phases directly, and is only in communication with other controllers operating the phases). In certain embodiments, multiple butler controllers may be present, with or without a master controller. The operation 4904 attributes a portion of the current duty to phases controlled by the master controller, and another portion of the current duty to phases controlled by the butler controller. The example of FIG. 49 is described as distributing the master portion evenly among master phases, and the butler portion evenly among butler phase, but the current duty may be further apportioned between individual phases in certain embodiments, and as set forth in the present disclosure.

The example procedure 4900 further includes a master side control portion (e.g., operations 4906, 4908, 4912, 4914) to determine PWM commands for the master phases, and a butler side control portion (e.g., operations 4916, 4908, 4918, 4920, 4922) to determine PWM commands for the butler phases. Where one of the master phases or butler phases are not present, relevant operations of the procedure 4900 may be omitted.

The master side control portion includes an operation 4906 to determine nominal master on-counts. For example, the nominal relationship between on-counts (e.g., defining the on-time of a given phase during the PWM period) may be stored in any manner, and may refleet a standard relationship according to the FETs and other circuit elements of the given phase. In certain embodiments, a lookup table, basic calculation, or other control feature may be utilized to determine the nominal master on-counts. The example master side control portion further includes an operation 4908 to operate an integrator, for example using an operation 4910 that determines a current feedback value for each phase, and determining an error value by comparing the current feedback value to a target current value for the phase. The current based feedback error may be determined utilizing either the high side or the low side current. The integrator may operate as a simple counter, for example increasing the counts by a set amount of counts for each operation of the integrator, and/or may be a capable integrator with a integral gain value, reset capability, and/or integrator wind-up limitations. In certain embodiments, the integrator operates well as a simple counter without further capability. The operation 4908 corrects for systemic offsets, and/or undetected conditions that make the nominal current-count relationship not work properly, whether for a known or unknown reason. In certain embodiments, the operation 4908 may be omitted, where the master controller operates in open loop. In certain embodiments, operation 4908 may utilize a different error parameter, for example using a temperature target for each phase. In certain embodiments, operation 4904 may perform re-balancing and/or redistribution of current duty between phases in response to a temperature target for each phase, and operation 4908 may operate on current error as depicted, and/or may be omitted.

The master side control portion includes an operation 4912 to apply limits, such as count limits, limits due to a fault or off-nominal condition, or the like. In certain embodiments, the limits may be applied due to the design of the given phase circuit (e.g., configured to only operate up to 1980 of 2000 counts), and/or may be applied to preserve certain phase counts for other reasons (e.g., using a portion of the PWM range as reserved for diagnostics, communications, or the like). The example master control portion includes an operation 4912 to provide master PWM commands, or the actual PWM commands to be performed by the relevant phase circuits.

The butler side control portion includes an operation 4916 to determine nominal butler on-counts, which will operate similarly to operation 4906. In certain embodiments, the butler phase circuits may have distinct hardware differences, such as cheaper or less capable components, which may drive some differences in the butler side control portion relative to the master side control portion. The example butler side control portion further includes the operation 4908 to operate the count feedback integrator, which may further utilize the operation 4910 to determine current feedback values as described preceding. As noted, the operation 4908 may be omitted, adjusted for a different error value, or the like. In certain embodiments, one of the master phase circuits or the butler phase circuits may be operated in closed loop as depicted, and the other one of the master phase circuits or the butler phase circuits may be operated in open loop. The butler side control portion includes an operation 4918 to apply count limits, similar to operation 4912, with changes if indicated based on hardware, specification, and/or configuration differences of the butler phase circuits relative to the master phase circuits. The butler side control portion further includes an operation 4920 to apply period side control limits, for example to ensure that a given count value can be executed within a period limit of the butler phase circuit. The operation 4920 is optional, and allows the procedure 4900 to account for limitations of the butler controller and/or butler phase circuits, such as delays introduced by communications or the like. In certain embodiments, operation 4920 may be omitted, and/or may be performed for the master side control portion, either in addition to or instead of performing operation 4920 on the butler side control portion. The example procedure 4900 includes an operation 4922 to provide the butler PWM commands, which are utilized to control the butler side phase circuits.

Figure 50:
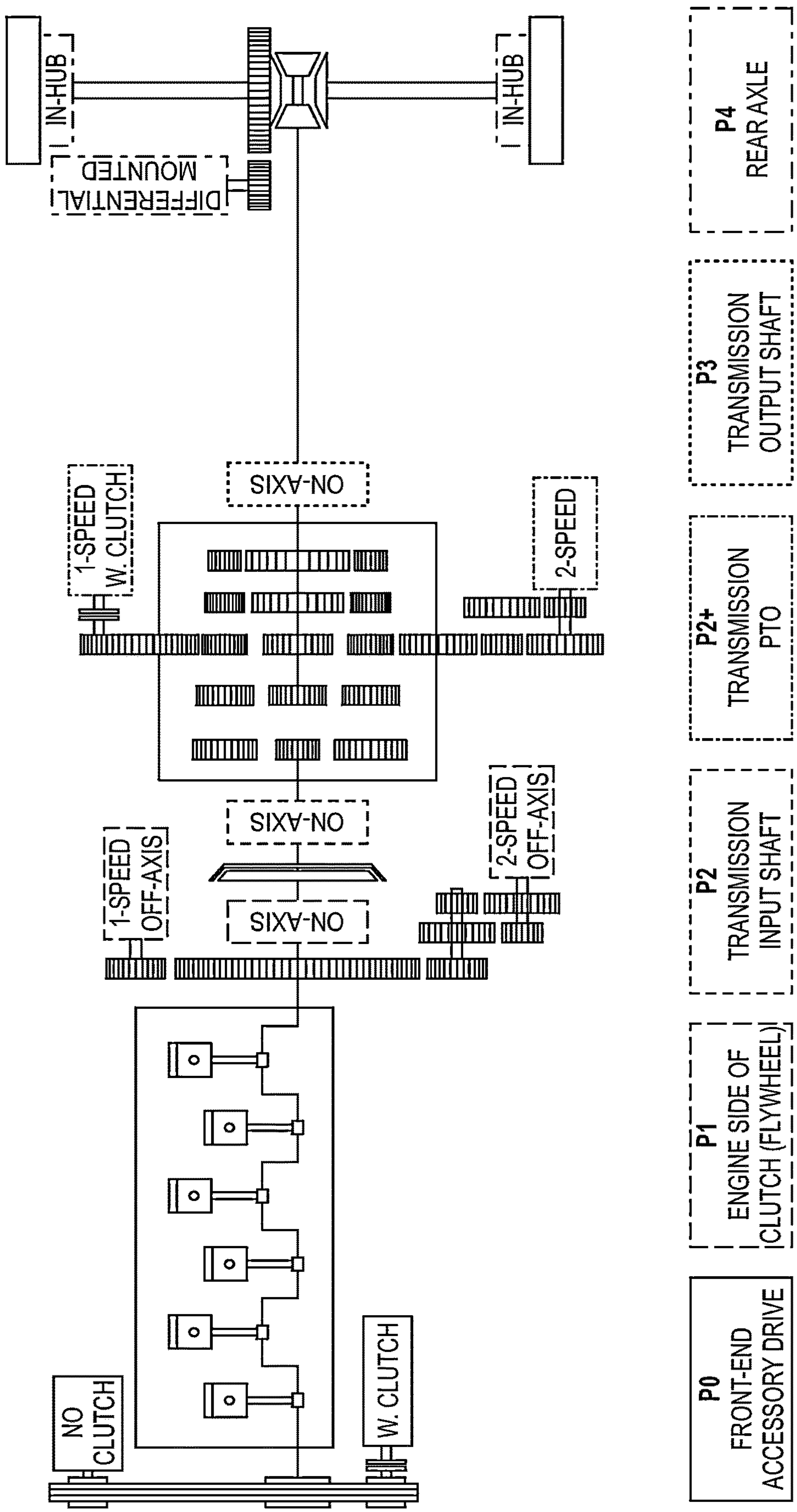
FIG. 50 depicts a hybrid vehicle architecture.

Referring to FIG. 50 there is a hybrid vehicle architecture. The architecture includes a front-end accessory drive stage P0, an engine side of the clutch stage P1, a transmission input shaft stage P2, a transmission PTO stage P2+, a transmission output shaft stage P3, and a rear axle stage P4.

Stage P0, the front-end accessory drive, includes a belt-mounted alternator, is the simplest installation, and does not use an 8-bolt PTO. P0 cons include 4 kW max regen, no engine off-coasting, separate starter motor required, separate HVAC system required for hotel, and no e-assist Stage P1, the engine side of the clutch (flywheel) includes an off-axis alternator (e.g., rear-engine gear-driven alternator) to provide power for 48V accessories and does not use an 8-bolt PTO, while cons include no engine off-coasting, separate starter motor required, separate HVAC system required for hotel, and no e-assist. Stage P1 includes an off-axis or on-axis motor/generator that does allow e-assist/start stop in addition to powering 48V accessories and not using an 8-bolt PTO while cons include no engine off-coasting, separate starter motor required, and a separate HVAC system required for hotel. Another P1 embodiment is an off-axis motor/generator and an HVAC compressor that powers 48V accessories, does not use 8-bolt PTO, allows e-assist, uses same HVAC system for running and hotel modes while cons include no engine off-coasting and separate starter motor required. A P1 off-axis motor/generator with a two speed gearbox, as well as an HVAC compressor that may be electrically powered by the two speed gearbox powers 48V accessories, does not use 8-bolt PTO, allows e-assist, uses same HVAC system for running and hotel modes, and eliminates the starter motor, while cons include no engine off-coasting and separate HVAC system required for hotel. Stage P2, the transmission input shaft, includes a transmission PTO mounted (2-speed) motor generator and an HVAC compressor mounted to the transmission PTO that powers 48V accessories, allows e-assist, uses same HVAC system for running and hotel modes, eliminates the starter motor, and enables engine-off coasting, while cons include complicated integration and 8-bolt PTO not available to end user. P2+ is the transmission PTO (1 speed with clutch or 2 speed), P3 is the transmission output shaft (on axis), and P4 is the rear axle (differential mounted or in hub).

Referring to FIG. 51, FIG. 52, FIG. 53, FIG. 54, and FIG. 55, there are multiple power management systems within a hybrid vehicle architecture, each system including a low voltage portion and a high voltage portion. For example, the low voltage portion may have a nominal voltage of 12V and the high voltage portion may have a nominal voltage of 48V, to name but one example.

Figure 51:
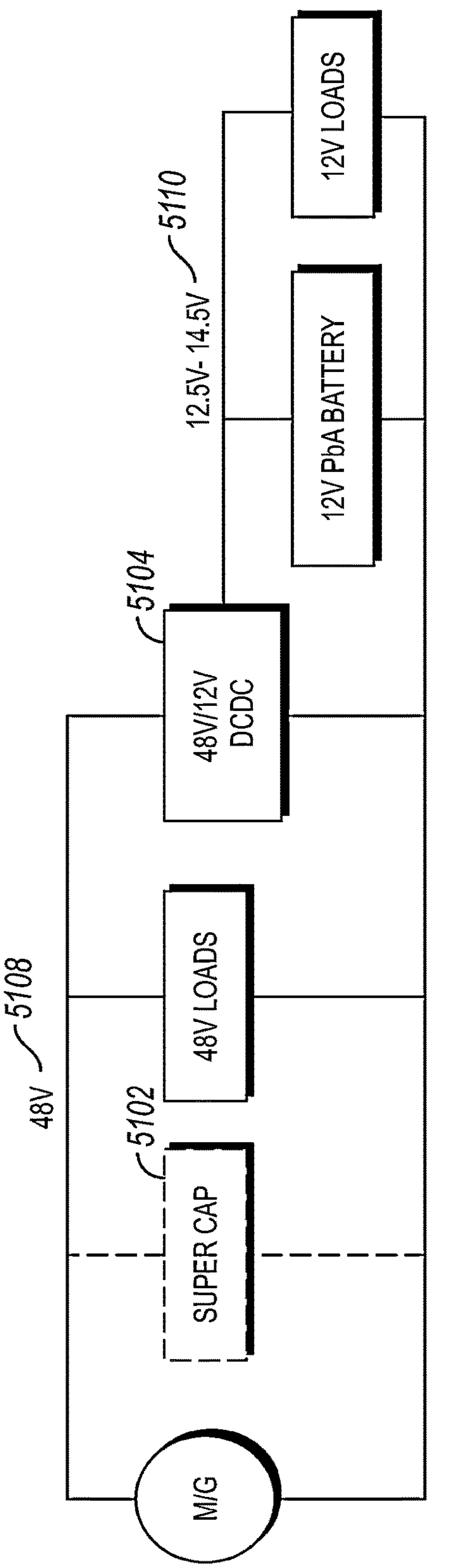
FIG. 51 depicts a power management system with high and low voltage energy storage.

FIG. 51 depicts a battery architecture including battery storage in the low voltage portion 5110 and no battery storage in the high voltage portion 5108. The battery architecture may include a current support device 5102, such as a super capacitor, ultracapacitor, or a battery, in the high voltage portion. A DC/DC power converter 5104 is coupled between the high voltage portion and low voltage portion, and is structured to regulate the bus voltage of the high voltage portion. A current support device enables current support without suffering drawbacks of operating certain lithium ion batteries, primary among them being the desire to keep the battery in a limited charge range.

The current support device (e.g., supercapacitor, ultracapacitor, conventional battery) is structured to stabilize the high voltage bus. For example, a supercapacitor may be used to stabilize the high voltage bus where a 48V load, such as an air conditioner needs to be run using power from the 12V battery storage. A supercapacitor, also known as an ultracapacitor, may be defined as an energy storage device with a charge or discharge rate greater than a battery, but less than an electrolytic capacitor. For example, a supercapacitor may have a discharge rate of 6C-3600C, which is to say the capacitor can be fully charged or discharged in a time frame between 10 minutes and one second. In another example, a supercapacitor may have a discharge rate between 360C and 3600, or between 10 seconds and 1 second. In certain embodiments, the supercapacitor may be sized based on the integral of the current the supercapacitor is structured to absorb or desorb. This architecture is closest to existing 12V architecture, and the DC-to-DC converter maintains precise control of the 48V bus voltage. A con is the lack of 48V storage so that all regenerated current must flow through the DC-to-DC to be stored, the 48V load capacity is limited by the DC-to-DC size, and there may be concerns about meeting the transient on 48V loads and may need capacitors to stabilize the bus.

Figure 52:
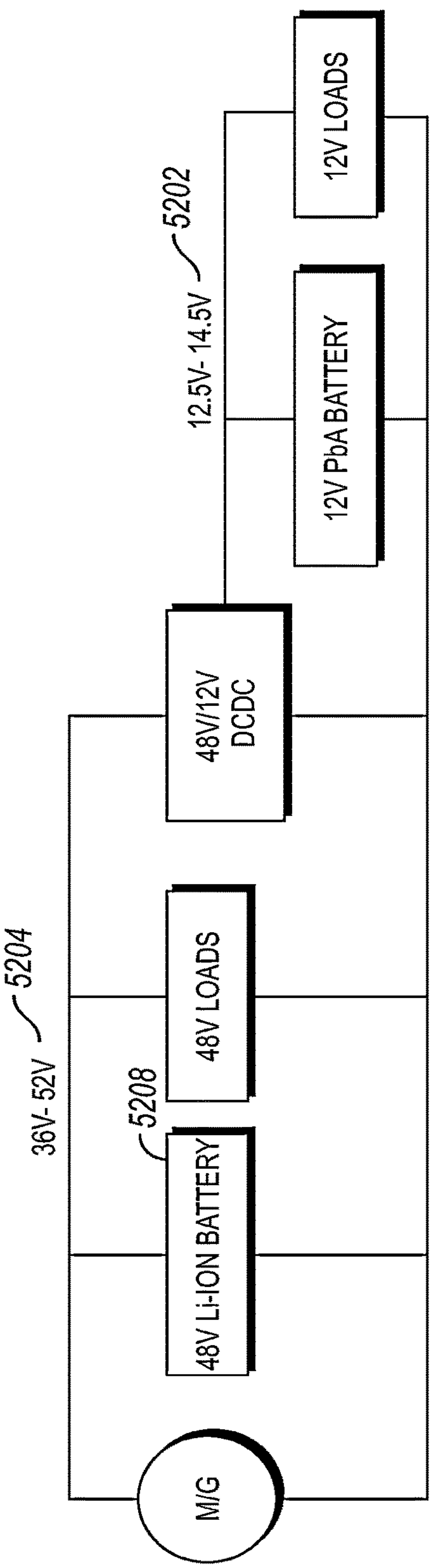
FIG. 52 depicts a power management system with high and low-voltage battery storage.

Referring to FIG. 52, there is a power management system including battery storage in the low voltage portion 5202 and a 48V Li-Ion battery-based storage 5208 in the high voltage portion 5204. A DC/DC power converter is coupled between the high voltage portion and the low voltage portion. The 48V Li-Ion battery can be designed to meet the desired voltage range. A con is that the battery plus battery management system are expensive and the battery requires a low-temp coding loop.

Figure 53:
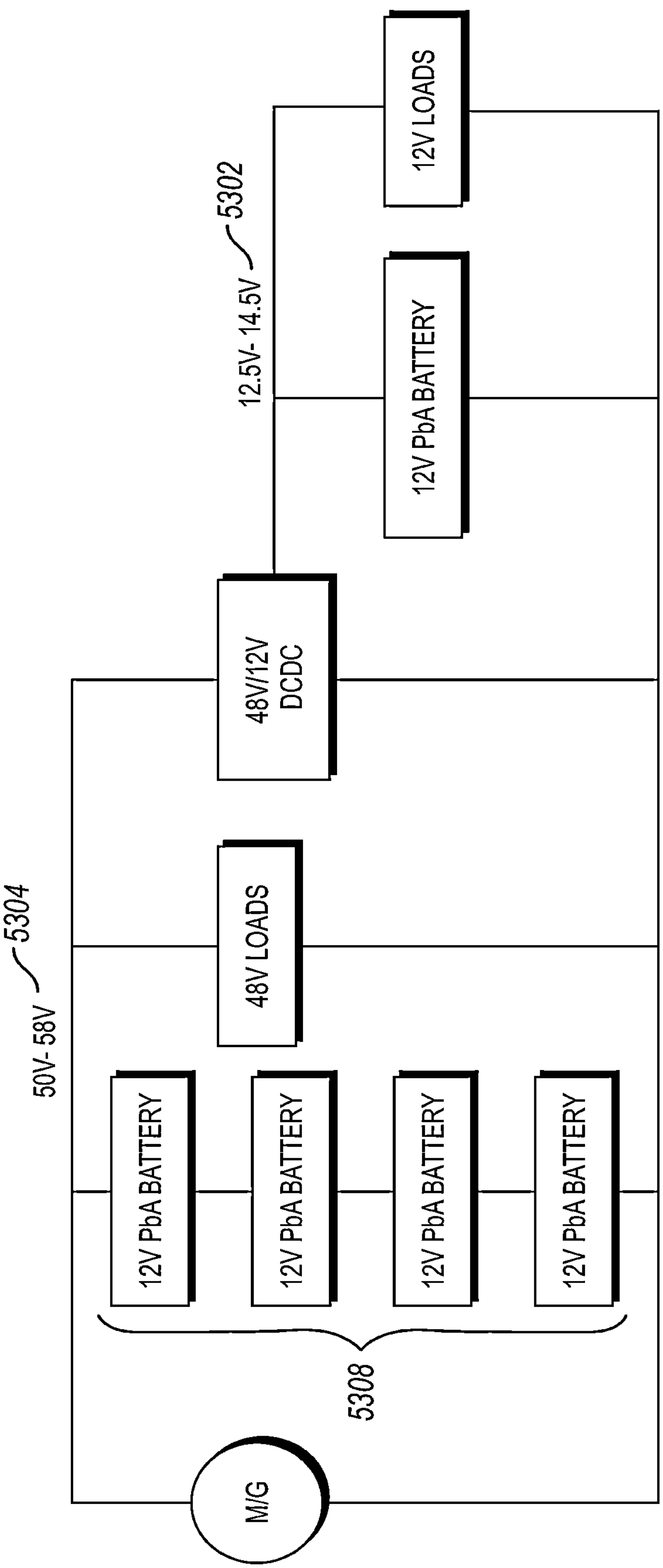
FIG. 53 depicts a power management system with lead-acid-based battery storage.

Referring to FIG. 53, there is a power management system including battery storage in the low voltage portion 5302 and battery storage in the high voltage portion 5304. The battery storage in the high voltage portion includes a plurality of batteries 5308 coupled in series. For example, the illustrated embodiment includes four 12V lead acid batteries 5308 coupled in series, which may produce an output voltage in the range of 50-58V. The lead acid battery arrangement has a lower cost compared to a 48V Li-Ion battery. This design is advantageous because this is a low cost battery, lead acid batteries do not require liquid cooling, and higher bus voltage may be better suited to 48V accessories. A con is that this requires charge balancing BMS between cells to ensure life target is met and there is an incremental cost add for 5th battery compared to 12V baseline.

Figure 54:
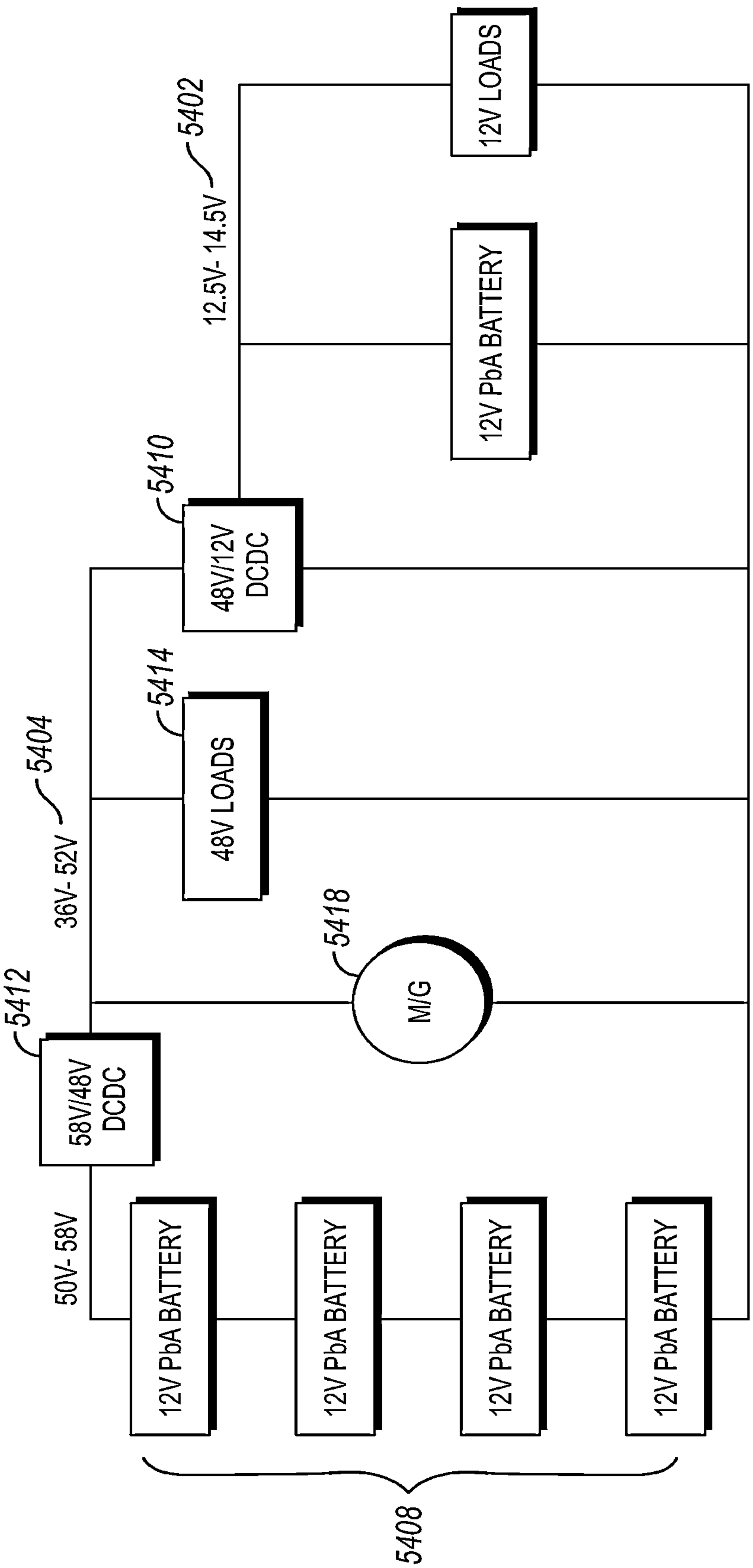
FIG. 54 depicts a power management system with lead-acid-based battery storage and a split high voltage bus.

Referring to FIG. 54, there is a power management system including battery storage in the low voltage portion 5402 and battery storage in the high voltage portion 5404. The battery storage in the high voltage portion includes a plurality of batteries 5408 coupled in series. For example, the illustrated embodiment includes four 12V lead acid batteries coupled in series, which may produce an output voltage between 50-58V. A first DC/DC power converter 5410 is coupled between the low voltage portion and the high voltage portion. The high voltage portion is divided by a second DC/DC power converter structured to step down the voltage received from the batteries before transmitting the power to the 48V loads 5414, the motor/generator 5418, and the first DC/DC power converter 5410. The second DC/DC power converter 5412 is structured to regulate the voltage of the power on the high voltage bus where some of the components are not designed to operate within the full spectrum of the operating voltage range of the 48V battery. It is important to note that the high voltage bus and low voltage bus have separate grounds, making the architecture ISO-21780 compliant. This design is advantageous because this is a low-cost battery, lead acid batteries do not require liquid cooling, and it is compliant with ISO-21780. A con is that this requires charge balancing BMS between cells to ensure life target is met and there is an incremental cost add for 5th battery compared to 12V baseline.

Figure 55:
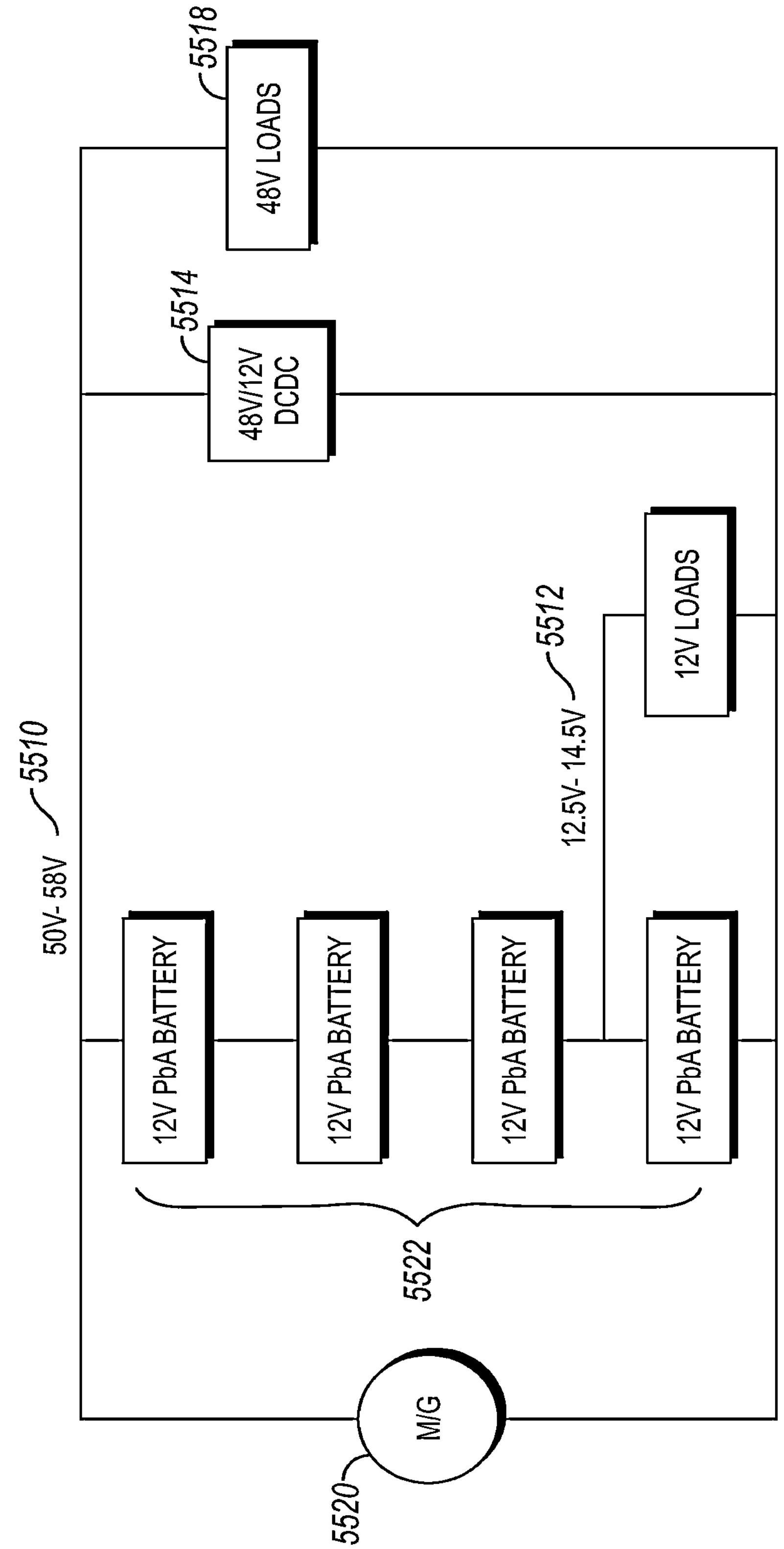
FIG. 55 depicts a power management system with a quarter tap battery architecture.

Referring to FIG. 55, there is a power management system including a high voltage battery storage coupled across a high voltage bus 5510, a DC/DC power converter 5514 coupled across the bus, 48 Volt loads 5518 coupled across the bus, and the motor/generator 5520 coupled across the bus. The high voltage battery storage includes four 12 Volt lead acid batteries 5522 coupled in series. The first of the batteries of the high voltage battery storage is tapped so that the high voltage battery storage may output a low voltage power to a low voltage bus 5512 that transmits power to 12V loads. This design is advantageous because this is the lowest cost solution, lead acid batteries do not require liquid cooling, and it fits in the existing battery compartment. A con is that this requires charge balancing BMS between cells to ensure life target is met and voltage level and ground connection point is shared for 12V and 48V so it is not ISO-21780 compliant.

Referring to FIG. 56, FIG. 57, FIG. 58, FIG. 59, and FIG. 60, there are power management systems including a quarter-tap battery architecture. Each battery architecture includes a battery pack including a plurality of batteries coupled together in series. The battery pack is structured to output DC power having a first, high voltage to a high voltage bus 5610. The battery pack is also structured to output DC power having a second, low voltage to a low voltage bus 5612. The battery pack includes a tap 5614 coupled between two batteries of the battery pack. In the illustrated embodiments, the tap is a ¼ tap located between the first battery coupled to a ground, and a second battery coupled to the first battery. The ratio of the first voltage output by the battery pack and the second voltage output by the battery pack is approximately 4:1. In other embodiments, the tap may be located between other batteries in the battery pack, and the output voltage ratio may be different.

Figure 56:
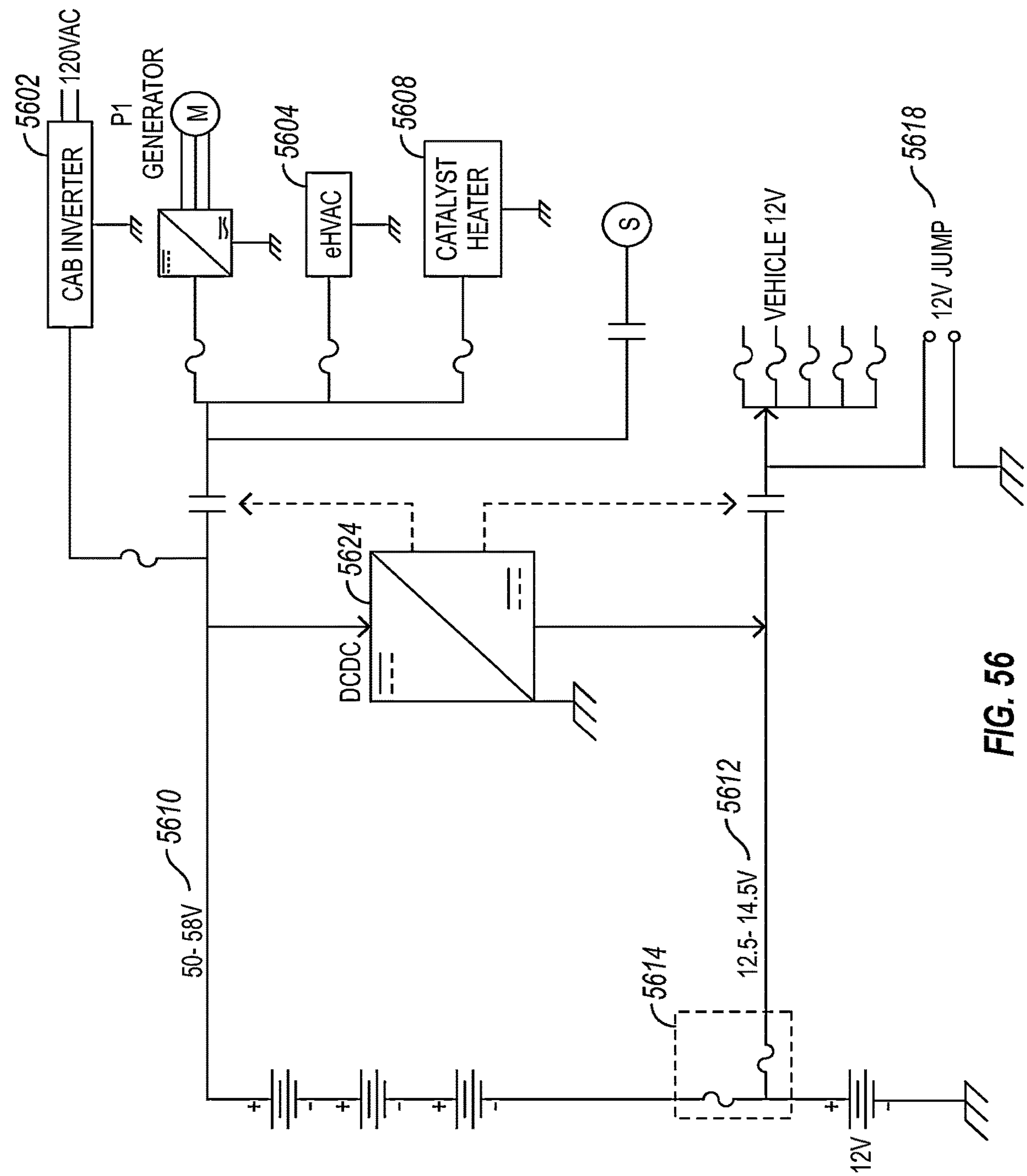
FIG. 56 depicts a power management system with a quarter tap battery architecture.

FIG. 56 depicts a ¼ tap power management system including a cab inverter 5602, eHVAC 5604, and catalyst heater 5608 all receiving power from the high voltage bus. It shall be appreciated that generated power is input to the high voltage bus, therefore reducing losses in transferring power to these loads compared to the same loads being coupled to the low voltage bus. The architecture does include loads coupled to the low voltage bus, including the illustrated jump connections. In addition to the illustrated placement of the contactors, the contactors could be placed in other locations in the battery architecture. For example, a contactor could be placed at the jump charge terminal 5618. In another example, contactors could be placed between the battery pack and the DC/DC power converter 5624.

Figure 57:
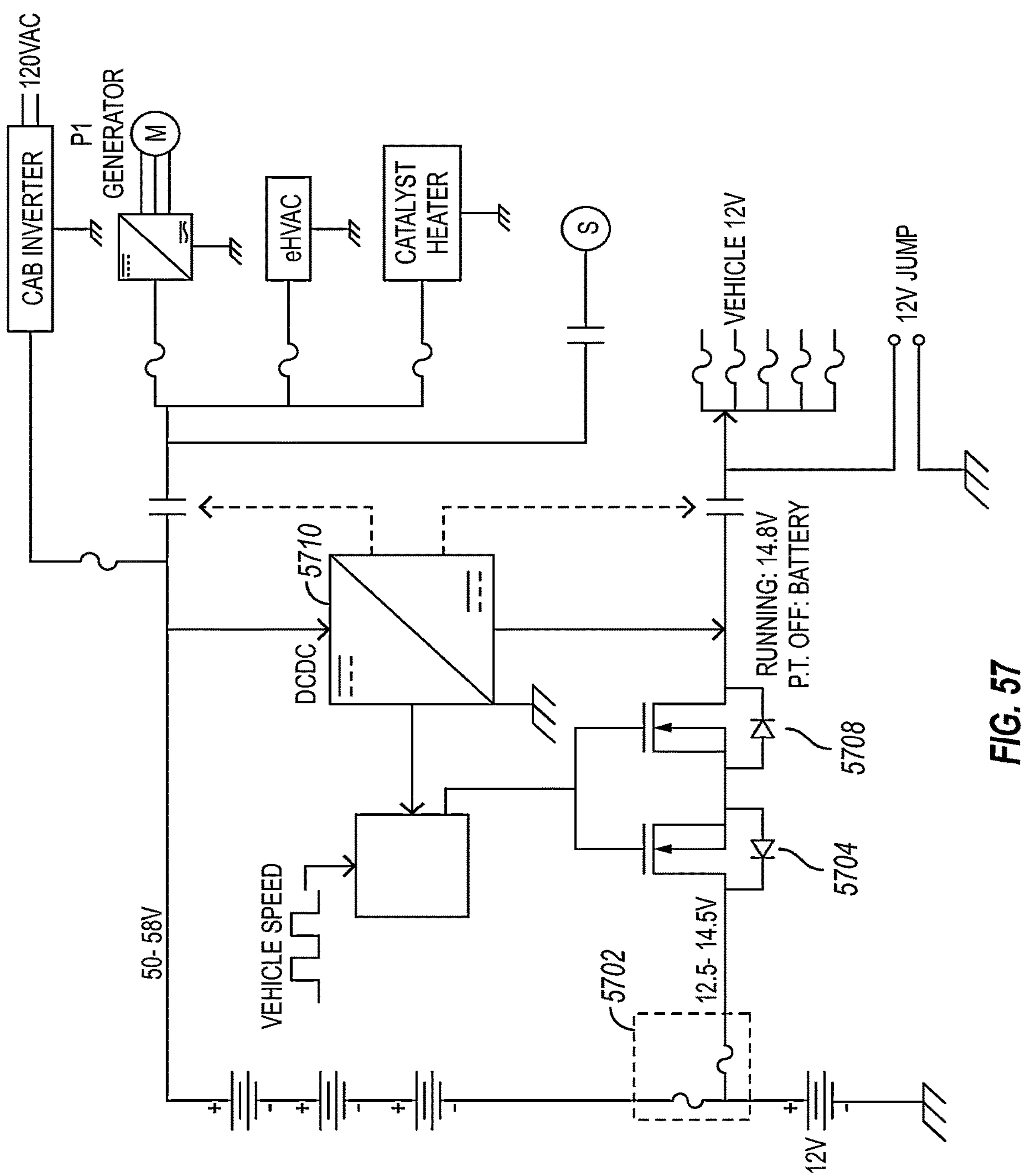
FIG. 57 depicts a power management system with a quarter tap battery architecture.

FIG. 57 depicts a power management system including a ¼ tap battery architecture including two power switches 5704, 5708, illustrated as MOSFETs, coupled to the low voltage bus between the battery pack quarter tap 5702 and the DC/DC power converter 5710. The power switches are controlled by a controller based on vehicle speed and input from the DC/DC power converter. The analog circuit prevents vehicle voltage from going under 12V ¼ tap if the truck is moving and the DC-to-DC fails. If the vehicle is moving, the DCDC LV is higher than battery voltage and the battery charges through the diode. If the vehicle is not moving or DCDC stops working, a superdiode turns on so the batteries can power the vehicle.

Changes in speed affect the bus voltages of the battery architecture. For example, as a vehicle increases speed going down a hill, the output voltage of the stage P1 generator may increase to 58 volts. In response, the battery architecture will charge the batteries in order to absorb the additional generated power. As a result of the charging, the low voltage bus voltage increases to 14.5V. Once the vehicle reaches the bottom of the hill and begins to climb, the battery architecture will stop charging the batteries and consume power from the batteries. The voltage of the high voltage bus will decrease, such as to 50V, and the voltage of the low voltage bus may decrease to 12.5 V. This fluctuation in bus voltage affects the performance of the loads. For example, varying voltage will cause headlights to become brighter and dimmer every time the vehicle goes over a hill. Low voltage loads may operate at 12 volts constantly or 14 volts constantly and are negatively affected by varying voltage.

In order to avoid the fluctuation of the voltage on the low voltage bus, the DC/DC power converter is structured to maintain a steady voltage, for example, 14.5 V, even though the quarter tap voltage is fluctuating. In normal driving mode, the DC/DC power converter provides all the power to the 12V loads while the power switches are turned off. During surge conditions, the power switches at closed to prevent surges from overloading or other failure modes. The power switches conduct high current during a peak, but do not conduct current during normal operation. For example, during battery charging during changes in vehicle operation, bus voltages may fluctuate, requiring the power switches to be turned on and off. The back to back MOSFETs may also be controlled to protect the DC/DC power converter from reverse battery hookup.

Figure 58:
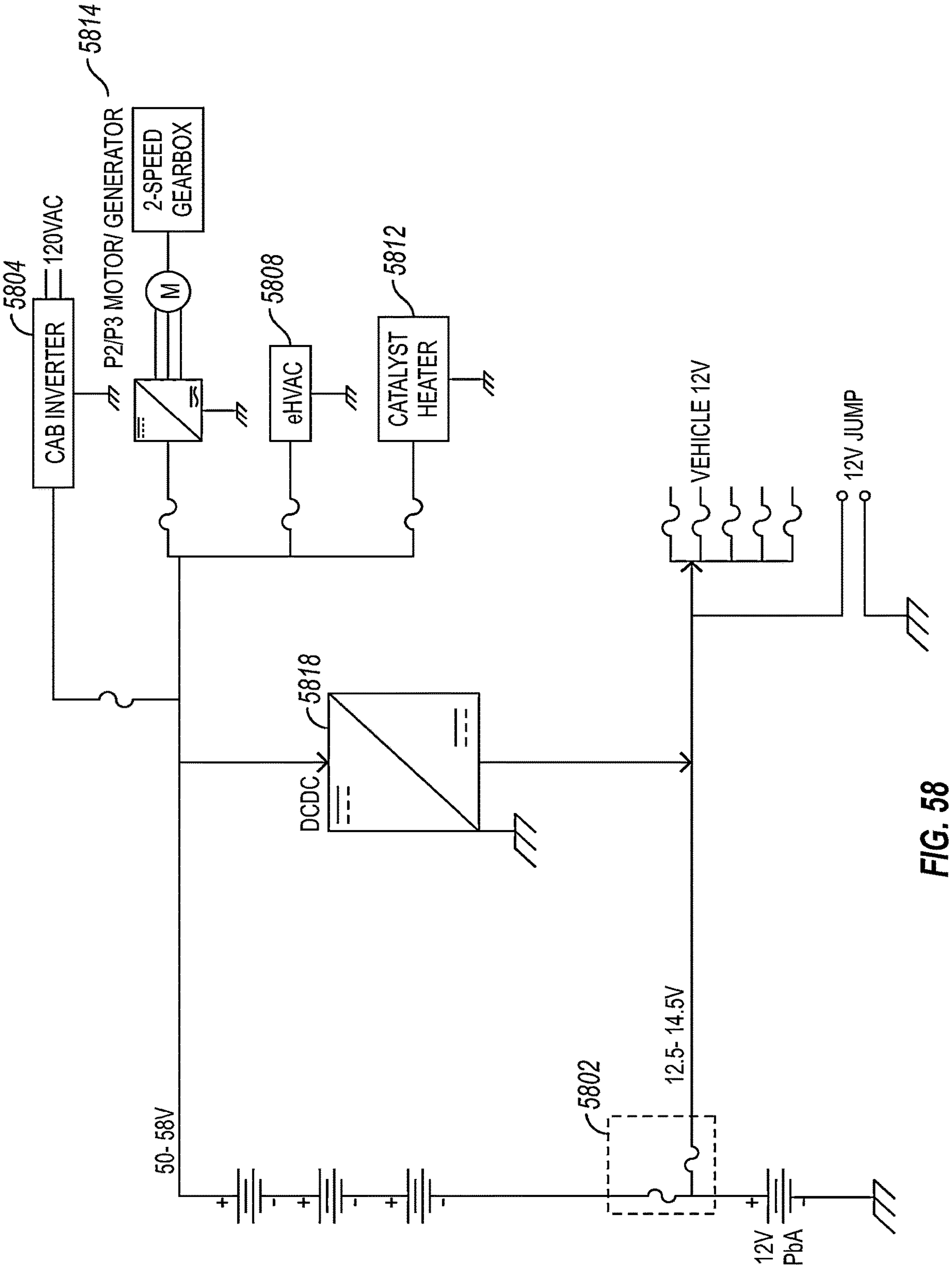
FIG. 58 depicts a power management system with a quarter tap battery architecture.

Referring to FIG. 58, there is a power management system including a quarter-tap 5802 battery architecture. The system includes a cab inverter 5804, eHVAC 5808, and catalyst heater 5812 all receiving power from the high voltage bus. The high voltage bus is also coupled to a stage P2 or stage P3 motor/generator 5814. A DC/DC power converter 5818 is coupled between the high voltage bus and the low voltage bus. The system does not include contactors controllable by the DC/DC converter controller.

Figure 59:
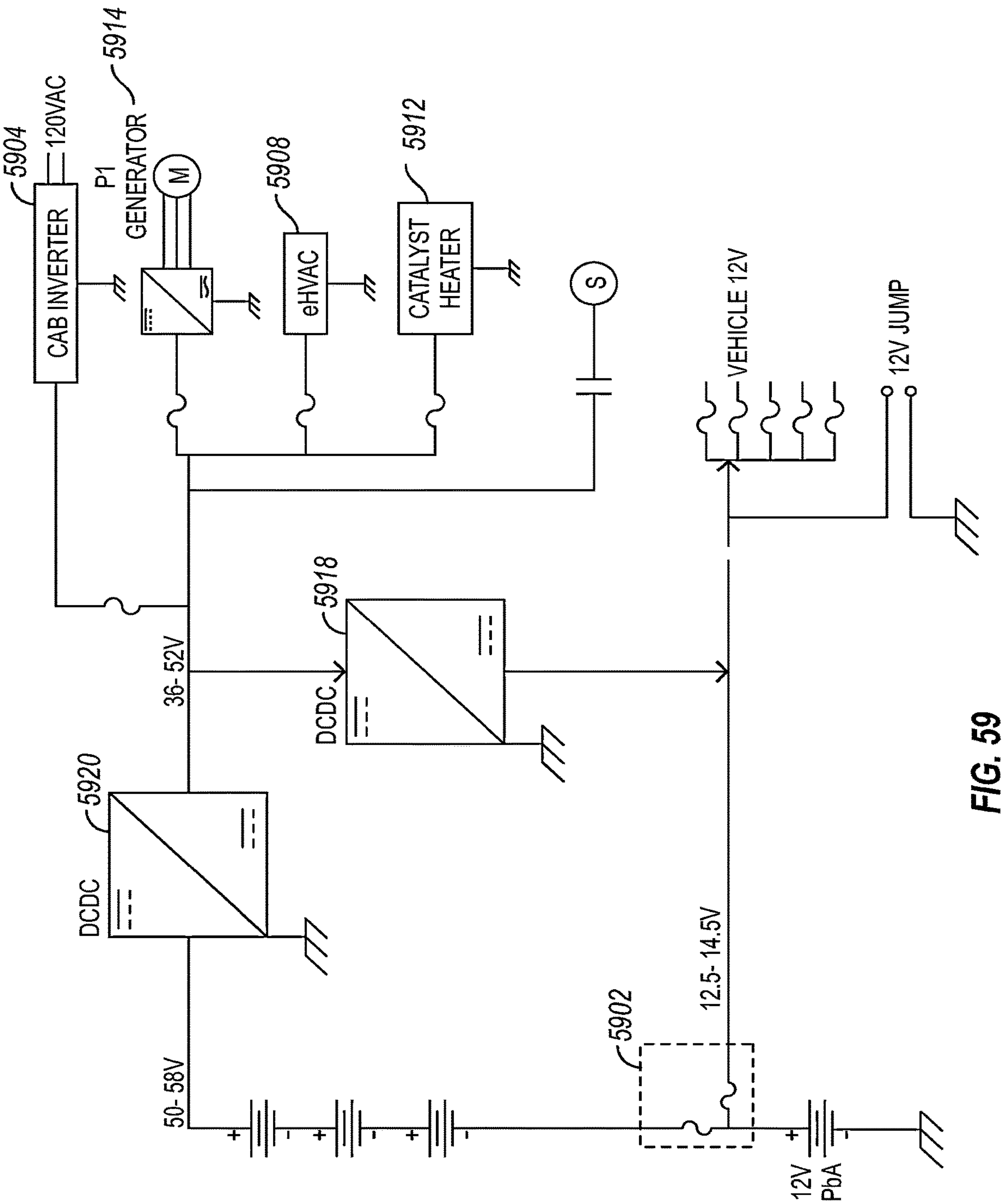
FIG. 59 depicts a power management system with a quarter tap battery architecture.

Referring to FIG. 59, there is a power management system including a quarter-tap battery architecture. The system includes a ¼ tap 5902, cab inverter 5904, eHVAC 5908, a starter motor, and catalyst heater 5912 all coupled to the high voltage bus. The high voltage bus is also coupled to a stage P1 generator 5914. A first DC/DC power converter 5918 is coupled between the high voltage bus and the low voltage bus. A second DC/DC power converter 5920 is coupled to the high voltage bus and is configured to regulate the voltage transmitted between the battery pack and the other components coupled to the high voltage bus. The system does not include contactors controllable by the DC/DC converters.

Figure 60:
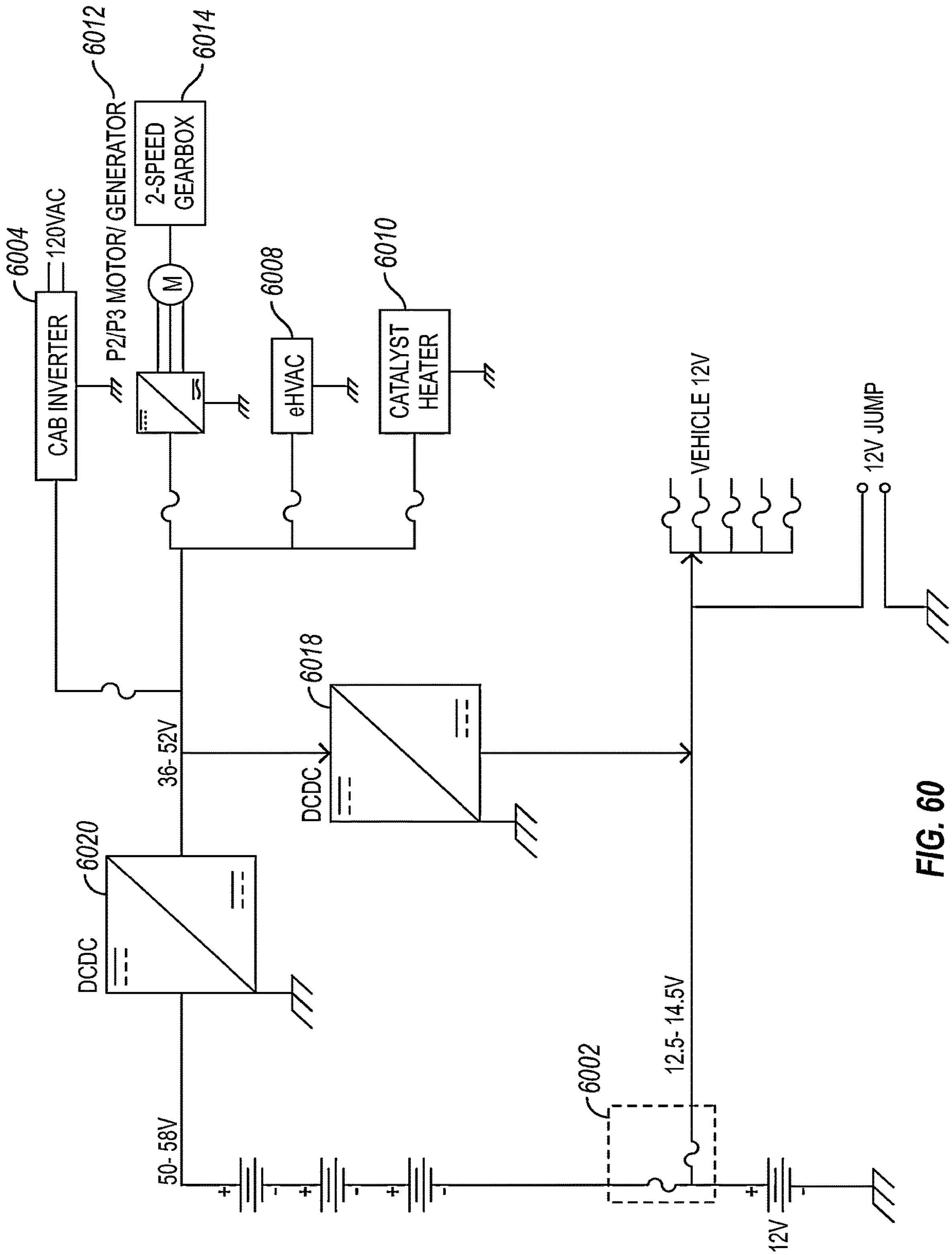
FIG. 60 depicts a power management system with a quarter tap battery architecture.

Referring to FIG. 60, there is a power management system including a quarter-tap 6002 battery architecture. The system includes a cab inverter 6004, eHVAC 6008, and catalyst heater 6010 all coupled to the high voltage bus. The high voltage bus is also coupled to a stage P2 or stage P3 motor/generator 6012 with a two speed gearbox 6014. A first DC/DC power converter 6018 is coupled between the high voltage bus and the low voltage bus. A second DC/DC power converter 6020 is coupled to the high voltage bus and is configured to regulate the voltage transmitted between the battery pack and the other components coupled to the high voltage bus. The system does not include contactors controllable by the DC/DC converters.

Figure 61:
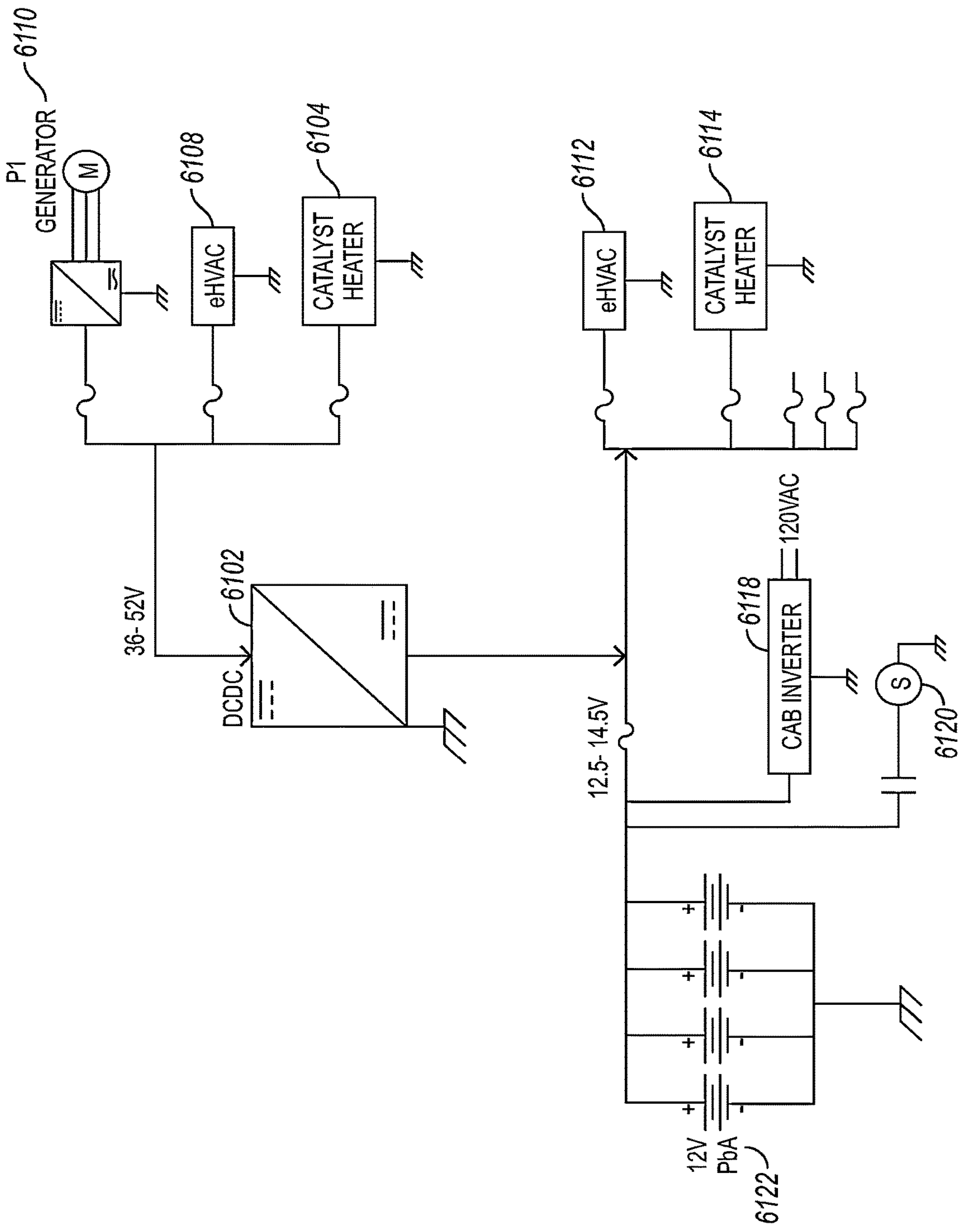
FIG. 61 depicts a power management system with low voltage battery storage.

Referring to FIG. 61, there is a power management system including a high voltage bus and a low voltage bus coupled together by a DC/DC power converter 6102. The high voltage bus is coupled to a catalyst heater 6104, an eHVAC 6108, and a stage P1 generator 6110. The low voltage bus is coupled to an eHVAC 6112, a catalyst heater 6114, a cab inverter 6118, a starter motor 6120, and a low voltage battery storage 6122 including four batteries coupled in parallel.

Figure 62:
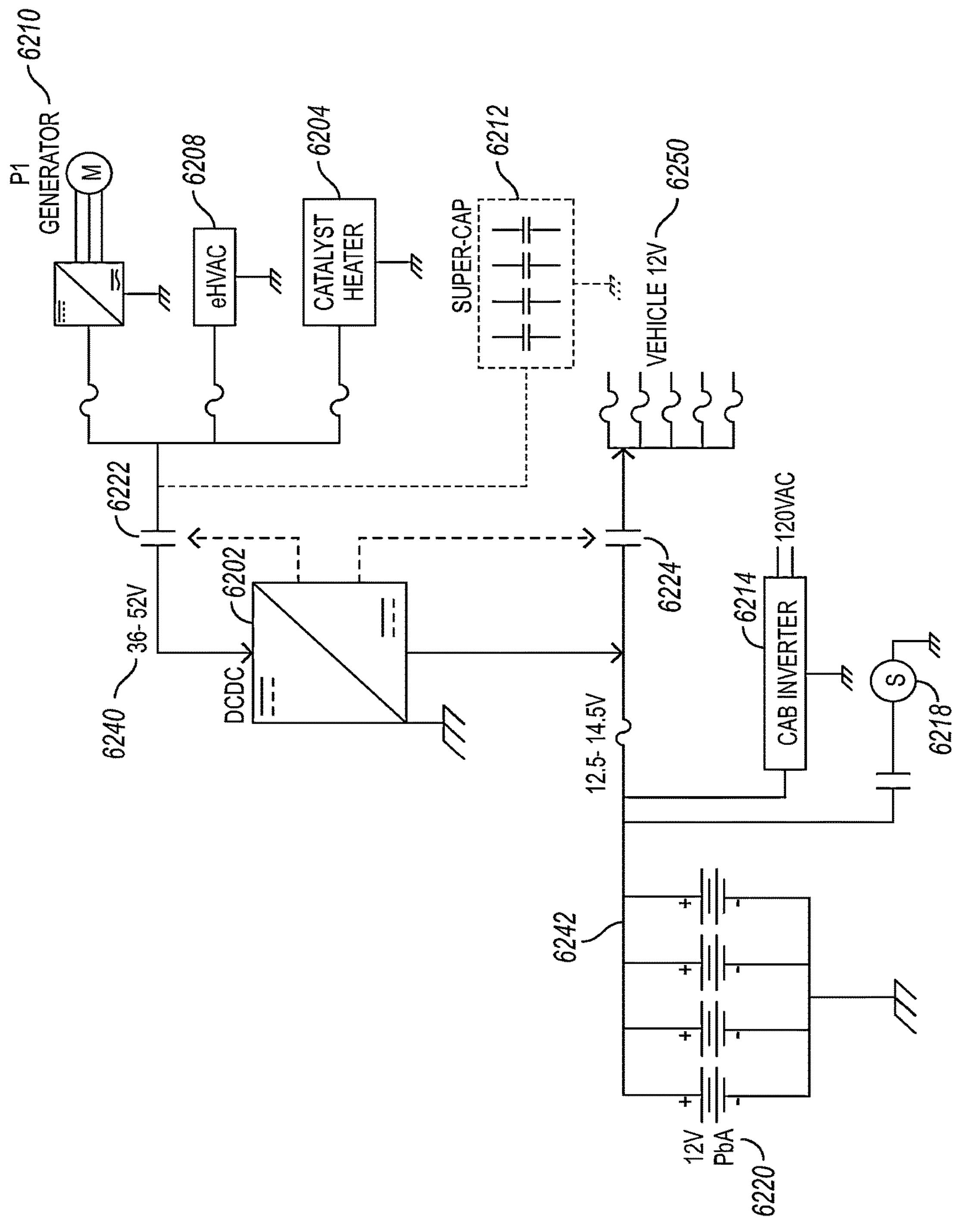
FIG. 62 depicts a power management system with high and low energy storage.

Referring to FIG. 62, there is a power management system including a high voltage bus and a low voltage bus coupled together by a DC/DC power converter 6202. The high voltage bus is coupled to a catalyst heater 6204, an eHVAC 6208, a stage P1 generator 6210, and a supercapacitor bank 6212. The low voltage bus is coupled to a plurality of loads including a cab inverter 6214 and a starter motor 6218, and a low voltage battery storage 6220 including four batteries coupled in parallel. The system also includes a contactor 6222 coupled to the high voltage bus and a contactor 6224 coupled to the low voltage bus, each contactor being controllable by the DC/DC power converter 6202.

The supercapacitor 6212 is structured to stabilize the voltage on the high voltage bus. In normal driving mode, the eHVAC may receive power from the stage P1 generator; however, when the vehicle is stopped, the eHVAC receives power from the low voltage battery storage by way of the DC/DC converter.

Figure 63:
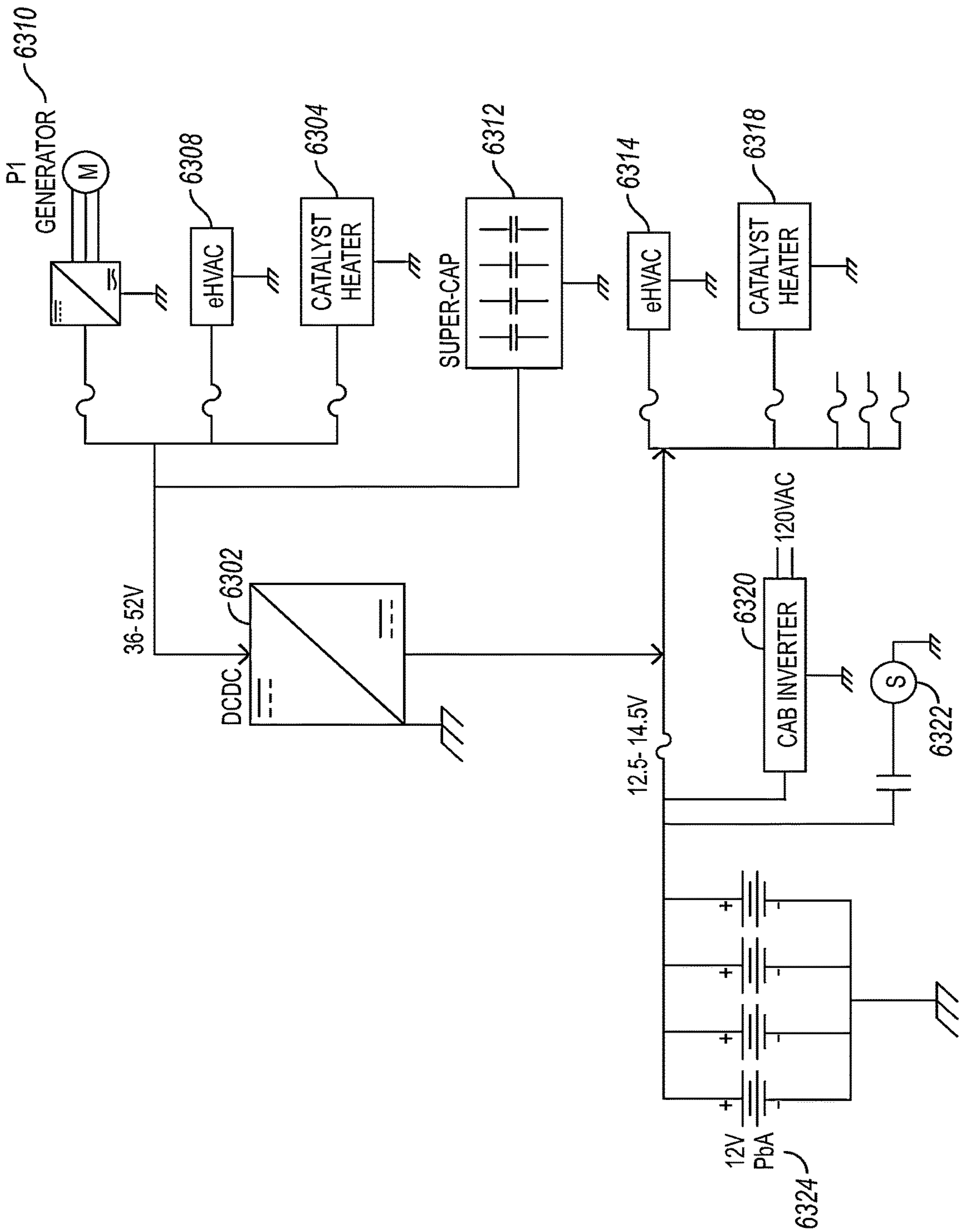
FIG. 63 depicts a power management system with high and low energy storage.

Referring to FIG. 63, there is a power management system including a high voltage bus and a low voltage bus coupled together by a DC/DC power converter 6302. The high voltage bus is coupled to a catalyst heater 6304, an eHVAC 6308, a stage P1 generator 6310, and a supercapacitor bank 6312. The low voltage bus is coupled to an eHVAC 6314, a catalyst heater 6318, a cab inverter 6320, a starter motor 6322, and a low voltage battery storage 6324 including four batteries coupled in parallel.

Figure 64:
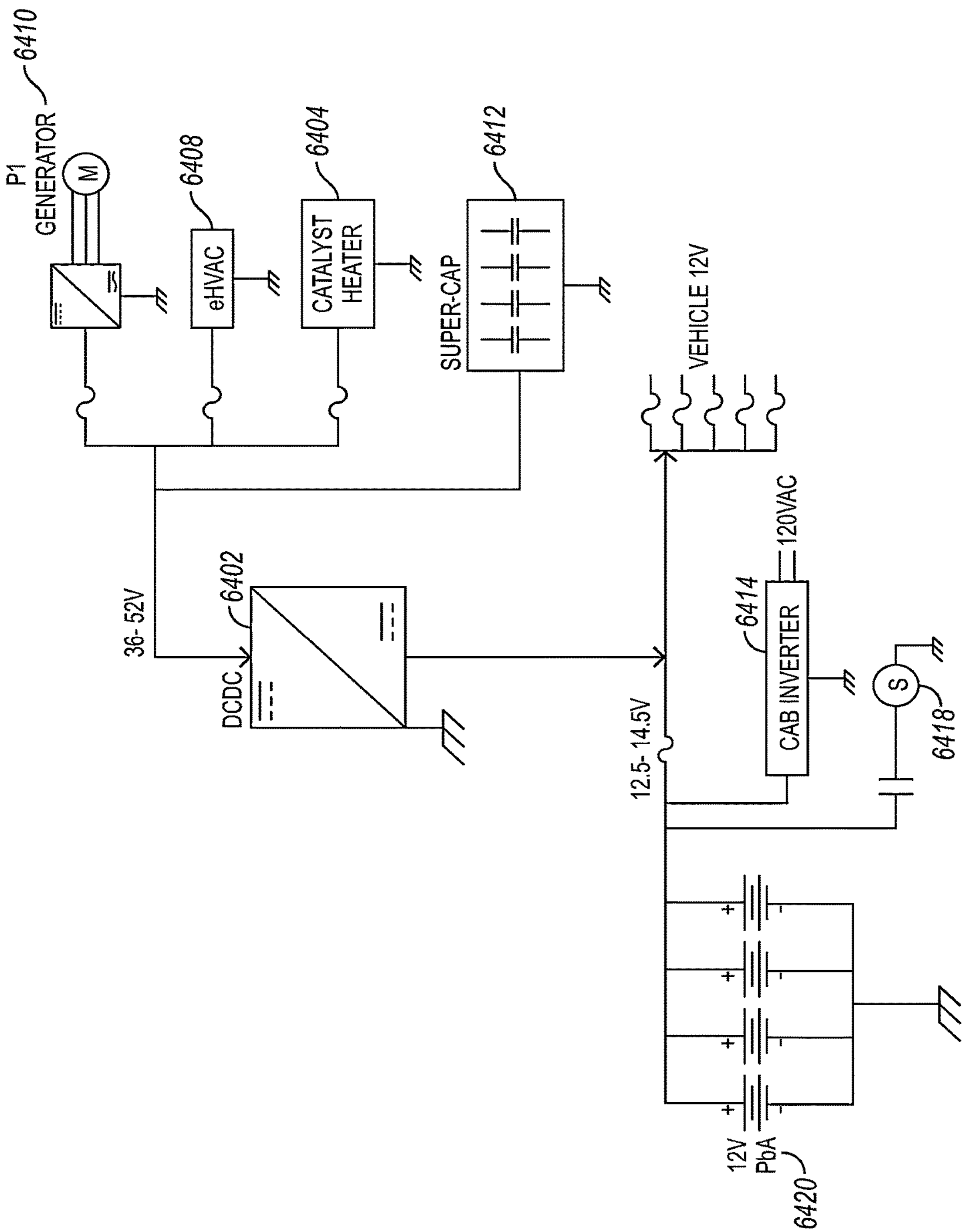
FIG. 64 depicts a power management system with high and low energy storage.

Referring to FIG. 64, there is a power management system including a high voltage bus and a low voltage bus coupled together by a DC/DC power converter 6402. The high voltage bus is coupled to a catalyst heater 6404, an eHVAC 6408, a stage P1 generator 6410, and a supercapacitor bank 6412. The low voltage bus is coupled to a plurality of loads including a cab inverter 6414 and a starter motor 6418, and a low voltage battery storage 6420 including four batteries coupled in parallel.

Figure 65:
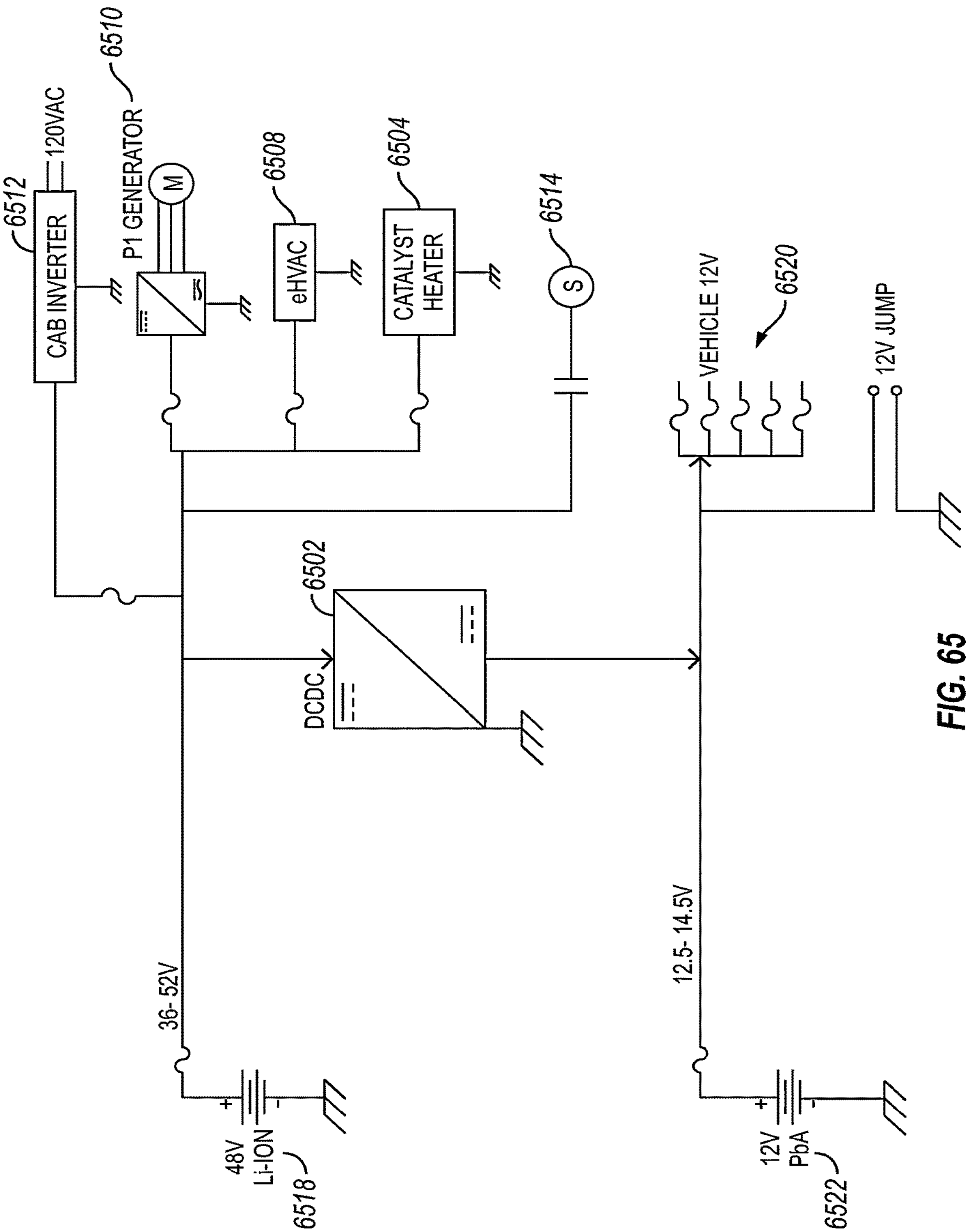
FIG. 65 depicts a power management system with high and low battery storage.

Referring to FIG. 65, there is a power management system including a high voltage bus and a low voltage bus coupled together by a DC/DC power converter 6502. The high voltage bus is coupled to a catalyst heater 6504, an eHVAC 6508, a stage P1 generator 6510, a cab inverter 6512, a motor starter 6514, and a Li-Ion-based high voltage battery storage 6518. The low voltage bus is coupled to a plurality of loads 6520 and a low voltage battery storage 6522.

Figure 66:
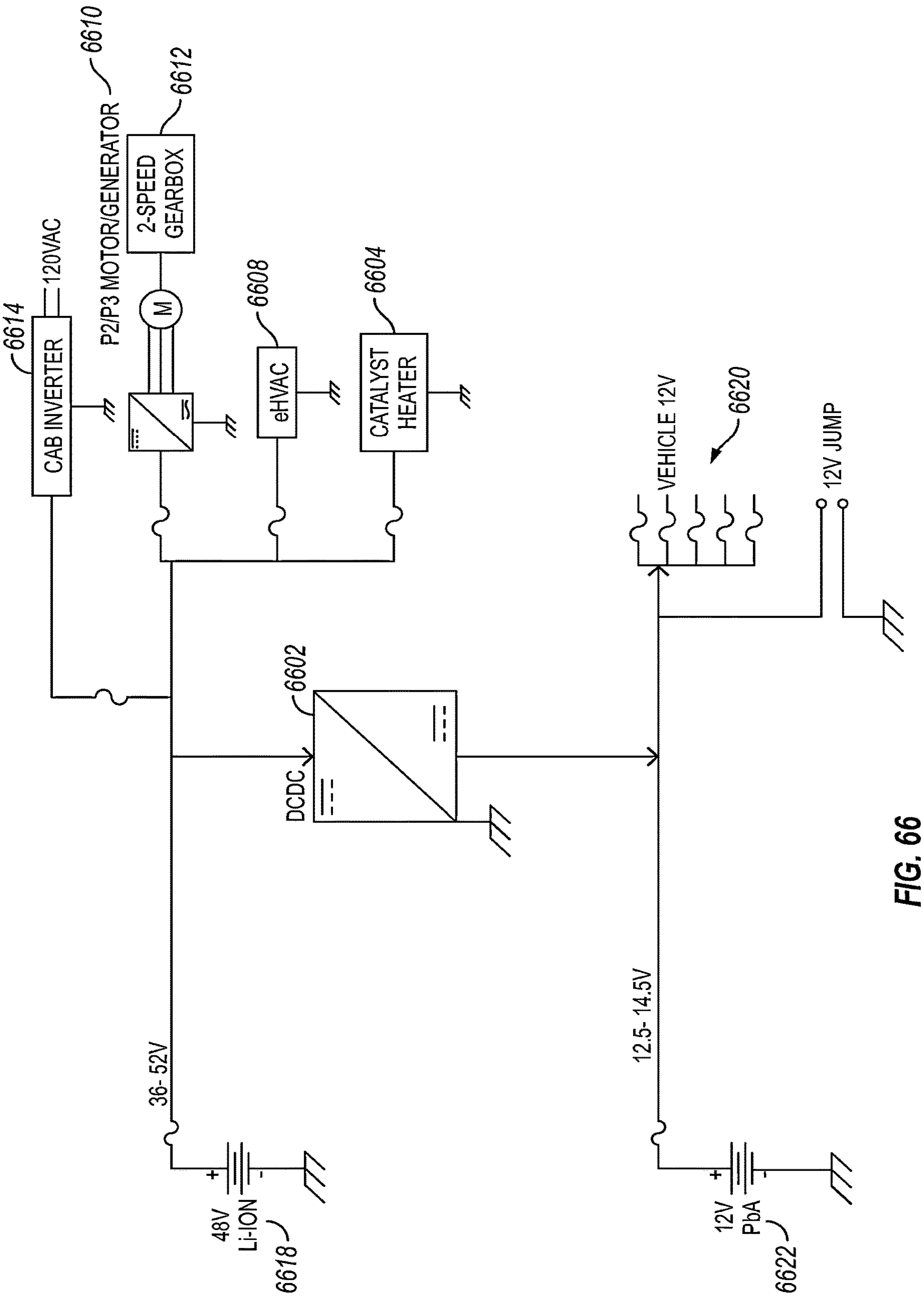
FIG. 66 depicts a power management system with high and low battery storage.

Referring to FIG. 66, there is a power management system including a high voltage bus and a low voltage bus coupled together by a DC/DC power converter 6602. The high voltage bus is coupled to a catalyst heater 6604, an eHVAC 6608, a stage P2 or P3 motor/generator 6610 with a two speed gearbox 6612, a cab inverter 6614, and a Li-Ion-based high voltage battery storage 6618. The low voltage bus is coupled to a plurality of loads 6620 and a low voltage battery storage 6622.

Figure 67:
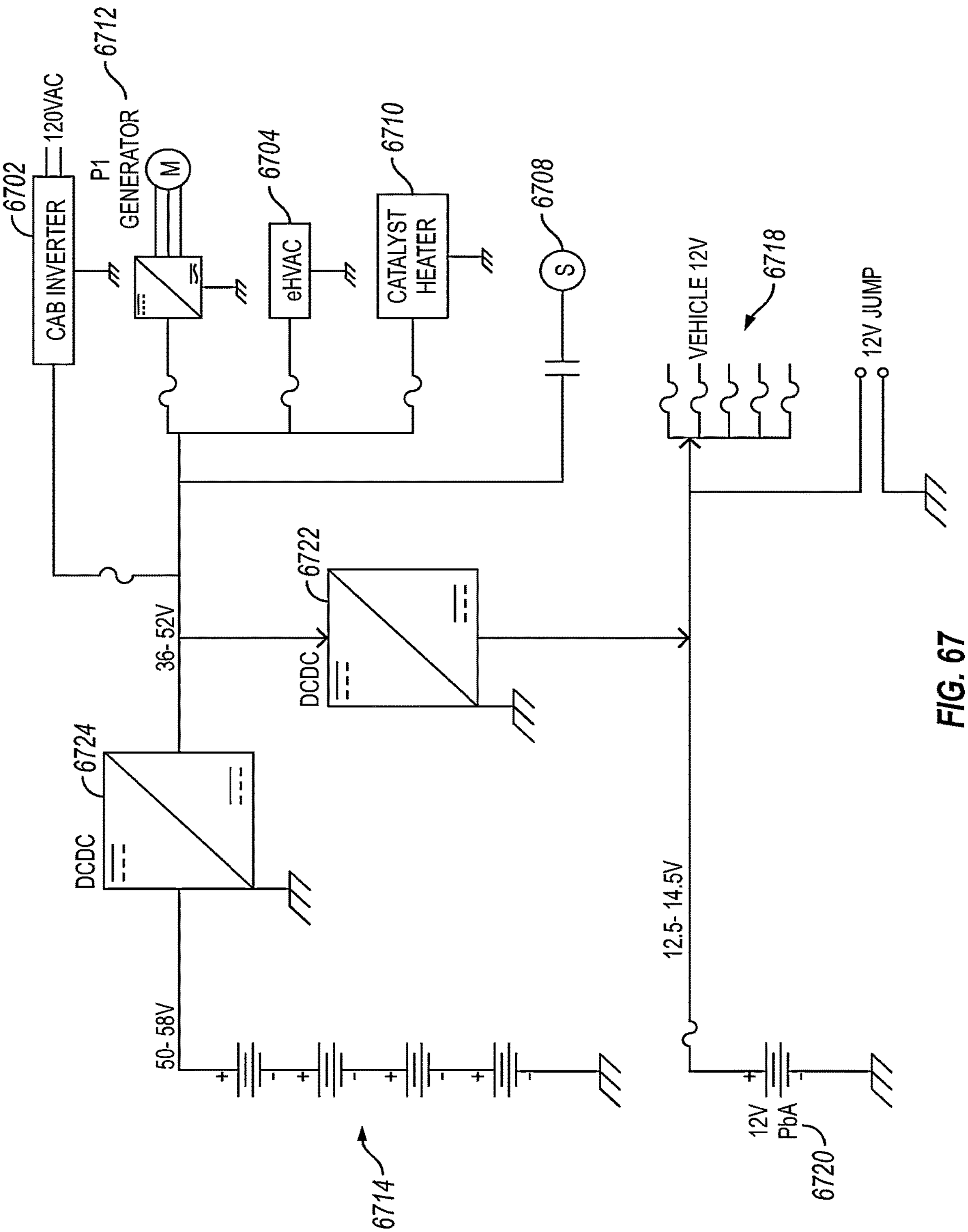
FIG. 67 depicts a power management system with high and low battery storage.

Referring to FIG. 67, there is a power management system including a high voltage bus and a low voltage bus. The system includes a cab inverter 6702, eHVAC 6704, a starter motor 6708, and catalyst heater 6710 all coupled to the high voltage bus. The high voltage bus is also coupled to a stage P1 generator 6712 and a high voltage, lead-acid-based battery pack 6714. The low voltage bus is coupled to a plurality of loads 6718 and a low voltage battery storage 6720. A first DC/DC power converter 6722 is coupled between the high voltage bus and the low voltage bus. A second DC/DC power converter 6724 is coupled to the high voltage bus and is configured to regulate the voltage transmitted between the high voltage battery storage and the other components coupled to the high voltage bus.

Figure 68:
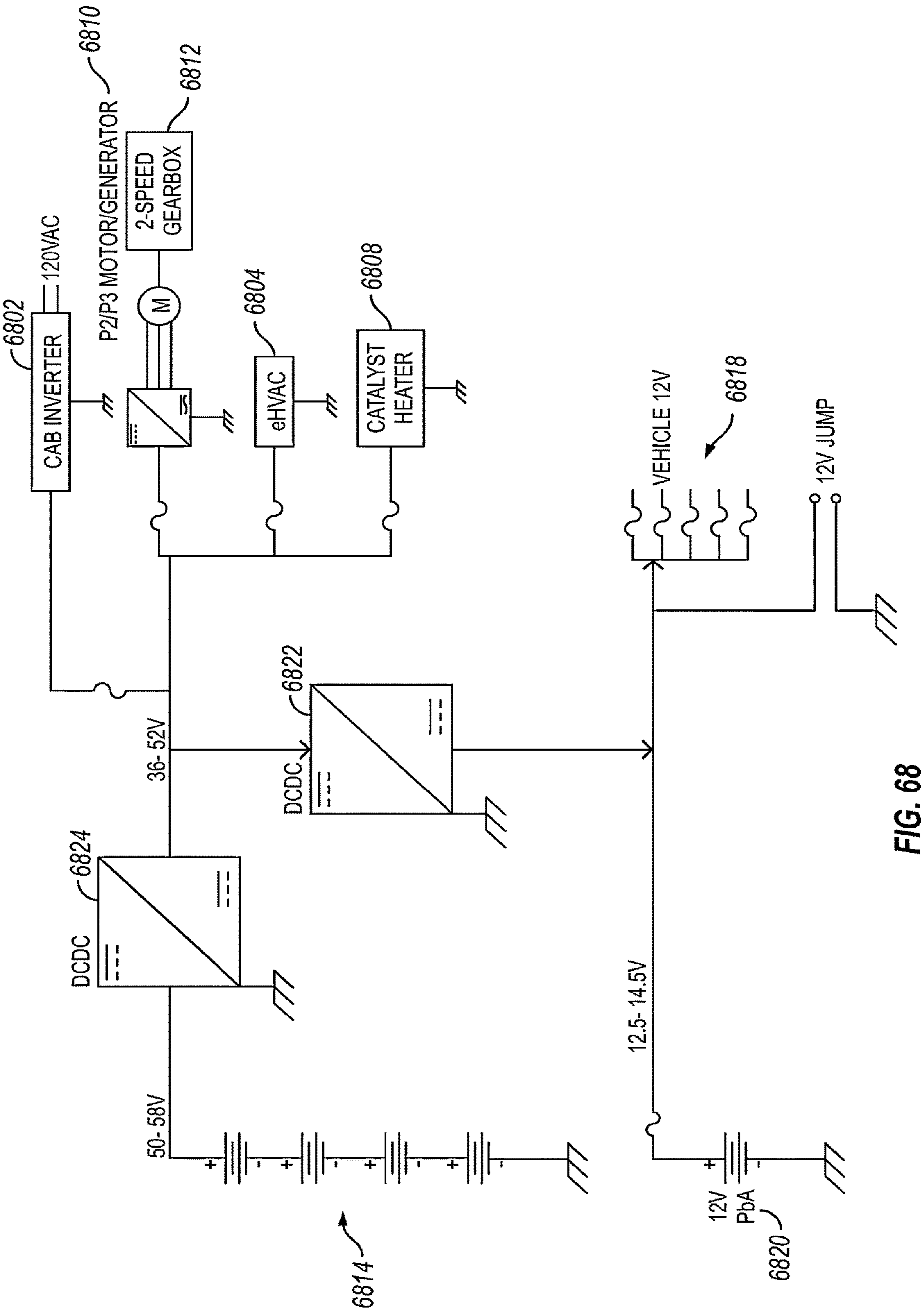
FIG. 68 depicts a power management system with high and low battery storage.

Referring to FIG. 68, there is a power management system including a high voltage bus and a low voltage bus. The system includes a cab inverter 6802, eHVAC 6804, and catalyst heater 6808 all coupled to the high voltage bus. The high voltage bus is also coupled to a stage P2 or P3 motor/generator 6810 with a two-speed gearbox 6812, and a high voltage, lead-acid-based battery pack 6814. The low voltage bus is coupled to a plurality of loads 6818 and a low voltage battery storage 6820. A first DC/DC power converter 6822 is coupled between the high voltage bus and the low voltage bus. A second DC/DC power converter 6824 is coupled to the high voltage bus and is configured to regulate the voltage transmitted between the high voltage battery storage and the other components coupled to the high voltage bus.

Various enabling technologies result in safe, simple, integrated, reliable solutions for enabling a 48V electrical system using batteries (e.g. lead acid, lithium ion), such as multiple 12V batteries or other voltage batteries in commercial vehicle applications (e.g. light/mild hybrid systems). Four batteries may be configured in series, however other numbers of batteries, such as 8, 12, or the like are contemplated. A top cover may act as an envelope to busbars and allow flexibility in connections. The busbars make series connections and also allow flexibility in connections. A service disconnect is used to disconnect power before servicing. Connectors are used to connect busbars to the DC-to-DC converter. An interconnect may couple two groups of batteries together, and may connect multiple battery trays. A battery separator may be used to prevent batteries from over draining or overcharging. An integrated service disconnect and interconnect may combine the functions of service disconnect and interconnect into a single device. Locating and locking features may be used with the DC-to-DC converter. Terminal caps may be used at battery terminals.

In a first aspect, various battery box and cover embodiments will be disclosed. The battery box may be installed outside the frame rail or indeed anywhere within the vehicle engine or cab. Some key components and features include: an optimized box structure & integrated vibration damping feature to reduce vibration and, consequentially, to improve battery life; a power disconnect to prevent deep discharge; a BMS to set charging current based on state of health (SoH); fewer interconnects means less cost and higher reliability; a quick disconnect/strap enables quick assembly and disassembly; and tabs and service disconnect ensure easy integration with other electronic components like the DC/DC converter. Generally, 48V battery assemblies described herein may reduce complexity in assembly of 48V electronic circuitry. Clamping of the batteries may result in avoiding battery movements due to shocks. Vibrations may be dampened, thus minimizing the transfer of vibration to the battery terminals and other electronics. Vibration dampening can be incorporated with the help of pads between the cover and the battery surface or underneath the batteries. Busbars may be insulated to protect them from external environmental conditions. 48V battery assemblies described herein may provide flexibility with respect to battery positions, such as for example, 1. Braided/Flexible; 2. Wire; and 3. geometric changes in the busbars (U shaped holes/multiple holes). 48V battery assemblies described herein may provide a mounting interface for electronics components. Cost may be lowered for the 48V battery assemblies described herein due to a streamlined manufacturing process, flexible busbars, and reduced number of parts. Transmission efficiency may be realized, which relates to the number of joints of the busbars. In some embodiments, some configurations may include multiple battery boxes, such as a primary battery box (e.g., 48V with a 12V quarter tap) and an auxiliary 48V battery box, and may further include an inter-battery box coupling.

Figure 69:
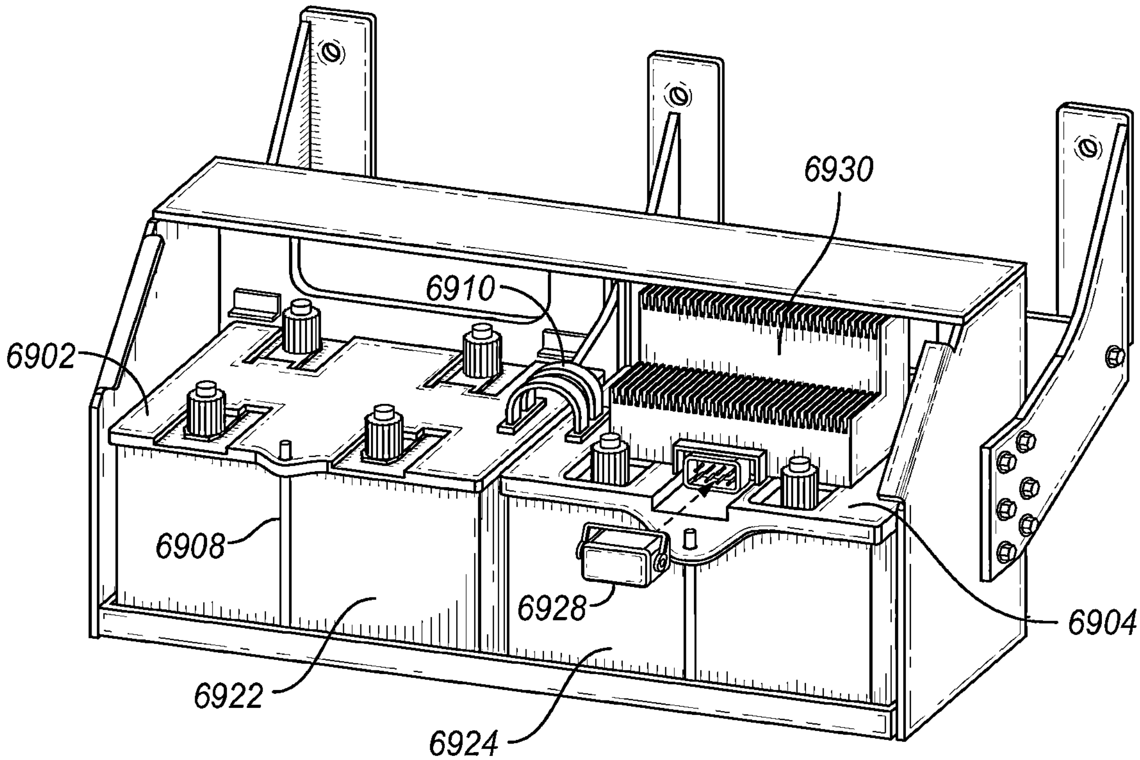
FIG. 69 depicts a baseline concept for a 48V battery assembly.

With respect to the top cover, a baseline concept is shown in FIG. 69 that features separate plastic covers 6902, 6904, a locking arrangement to secure the battery to the battery box (e.g., a vertical bar 6908 secured to a base of the battery box and the cover), and at least one busbar or jumper connection 6910 connecting the batteries 6922, 6924. A service disconnect 6928 is shown in a removed position. In a similar battery assembly embodiment depicted in FIG. 73B, the service disconnect 7314 is depicted in an installed position. In some embodiments, the battery box may include a center wall separating sets of batteries. The jumper connection 6910 may be configured to go over the height of the center wall. In some embodiments, a spring steel under a bracket may be used to keep the batteries in compression to the bottom of the battery box.

Figure 70:
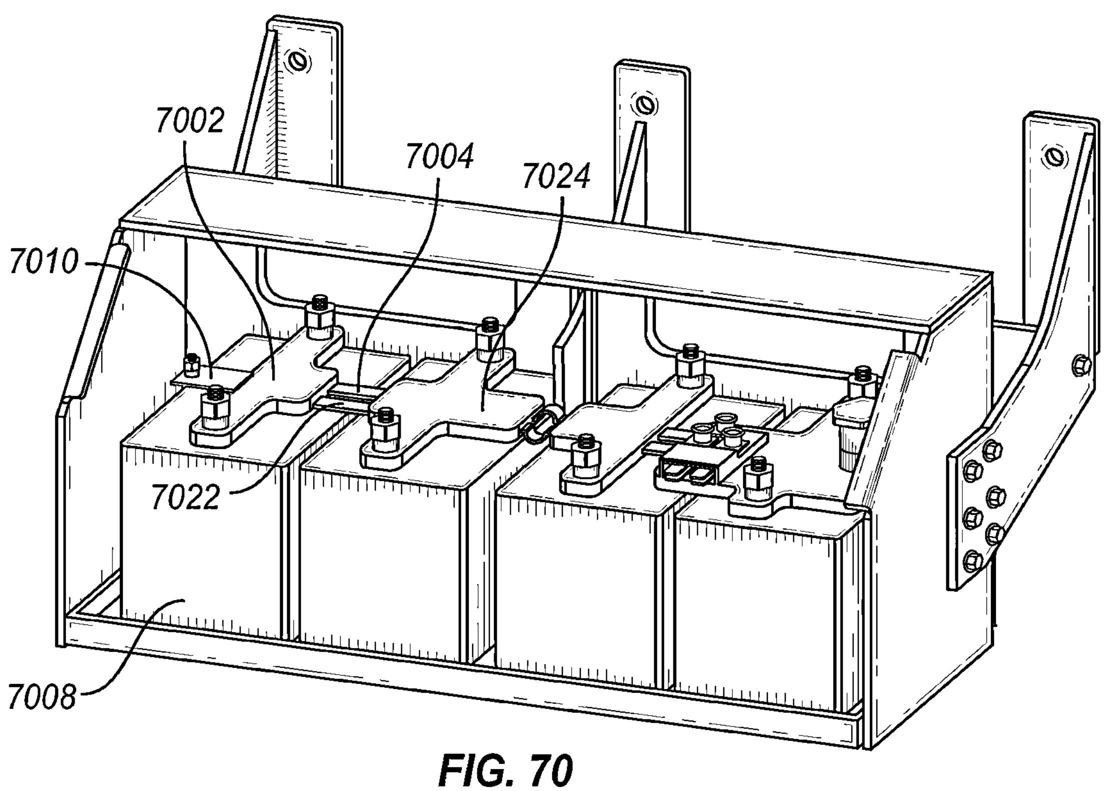
FIG. 70 depicts a 48V battery assembly with a separate cover.

Referring to FIG. 70, a 48V battery assembly features a separate cover for each battery such as tray 7002 and tray 7024, flexible busbars 7004, 7022 connecting the batteries 7008 (e.g., braided busbars), and a locking arrangement to secure the batteries to the battery box, wherein the locking arrangement includes a clamp plate 7010 including one or more rubber pads. In this embodiment, there is an individual connection at the battery level at two terminals, as well as interconnects between batteries (e.g., 7008). In embodiments, not all the batteries have to be connected and may or may not feature a snap-in to the box feature. In this embodiment, the locking arrangement and connection between the batteries are separate. As the busbars may be insert molded in the plastic cover, complexity in assembly may be minimal. With stud and bolting from above to the cover, battery movement may be restricted. Rubber pads may be included to dampen vibrations. Transmission efficiency due to a reduced number of joints of the busbars is realized with this embodiment.

Figure 71:
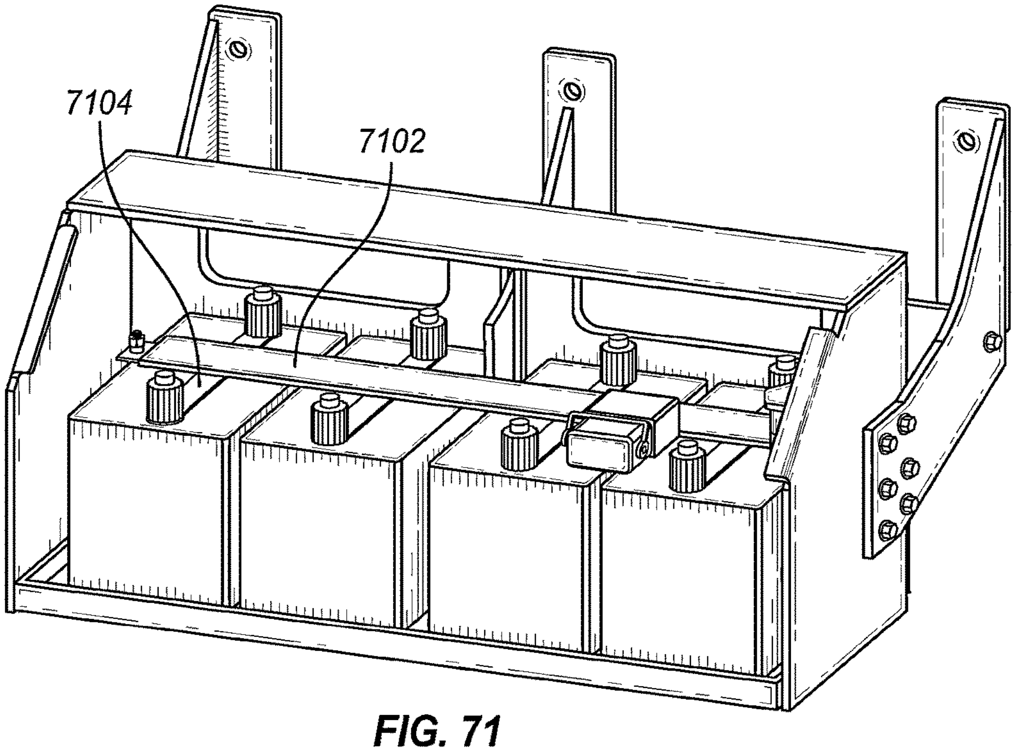
FIG. 71 depicts a 48V battery assembly with a single cover with rigid and flexible busbars.

Referring to FIG. 71, a 48V battery assembly features a single tray 7102 with busbars 7104 and clamp plate as insert molds, flexible busbars (e.g. braided), a locking arrangement into the battery box, and one or more rubber pads associated with the clamp plate. As the busbars may be insert molded in the plastic cover, complexity in assembly may be minimal. A rubber pad between the clamp plate and cover, and between the clamp plate and the battery may reduce vibrations reaching the battery terminals. As these may be braided/flexible busbars between the two plastic covers, the plastic cover can be assembled irrespective of battery positions. Busbars may be insulated from external conditions. Flexibility with respect to battery positions is realized with this embodiment.

Figure 72A:
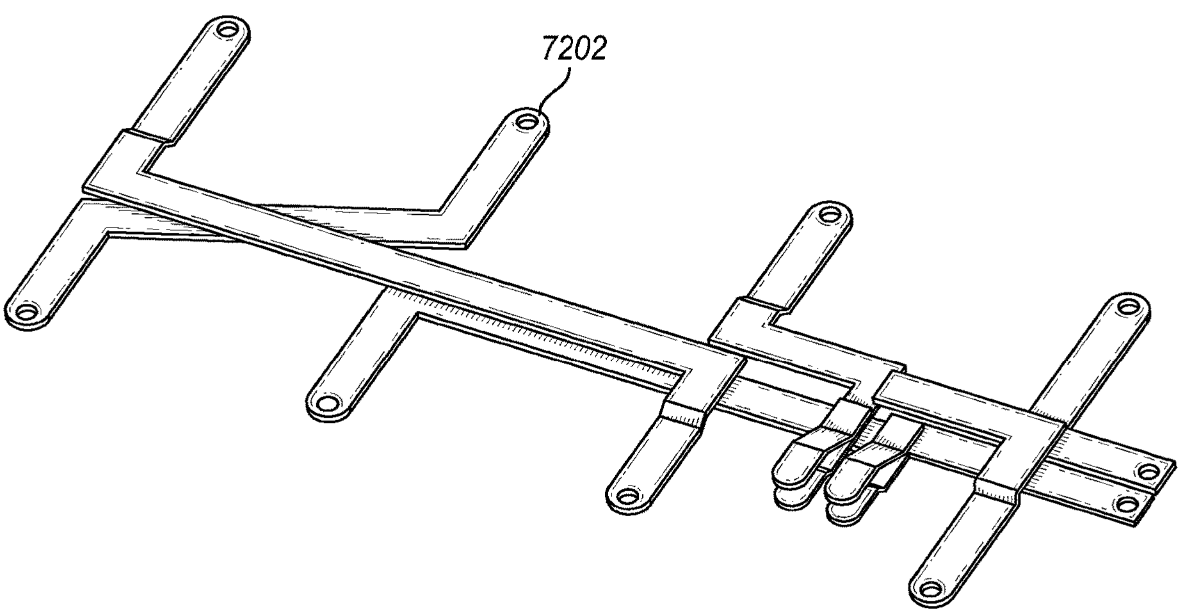
FIG. 72A, FIG. 72B, and FIG. 72C depict a single integrated top battery tray.
Figure 72B:
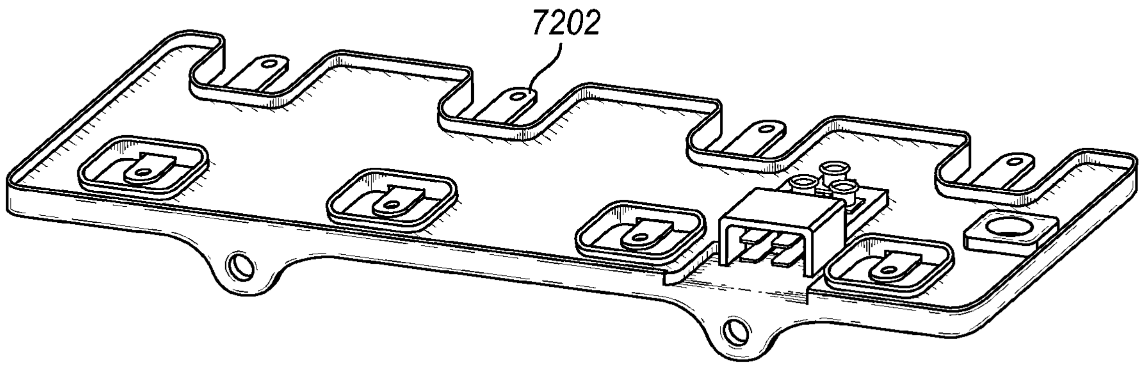
Figure 72C:
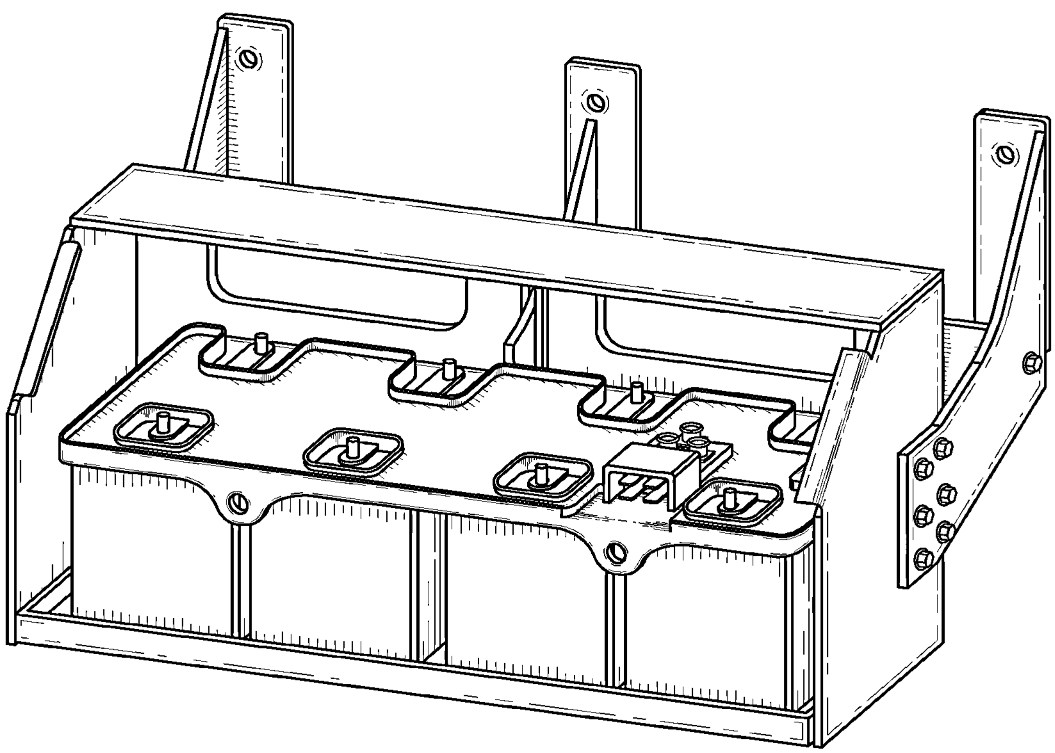

FIG. 72A, FIG. 72B, and FIG. 72C depict a single integrated top battery tray with all of the busbars together and its placement on batteries. FIG. 72A depicts the busbar arrangement. FIG. 72B depicts a single tray for all batteries features over molding of busbars 7202 and easy terminal connections. Busbars may have a thickness of 0.5 mm and be stacked in a pack of three. The plastic cover with injection molding may have battery locking features in all directions. FIG. 72C depicts the tray with busbars depicted in FIG. 72B in place on the batteries. As the busbars may be insert molded in the plastic cover, complexity in assembly may be minimal. A rubber pad between the clamp plate and cover, and between the clamp plate and the battery may reduce vibrations reaching the battery terminals. As these are braided/flexible busbars between the two plastic covers, the plastic cover can be assembled irrespective of battery positions. Flexibility with respect to battery positions is realized with this embodiment.

Figure 73A:
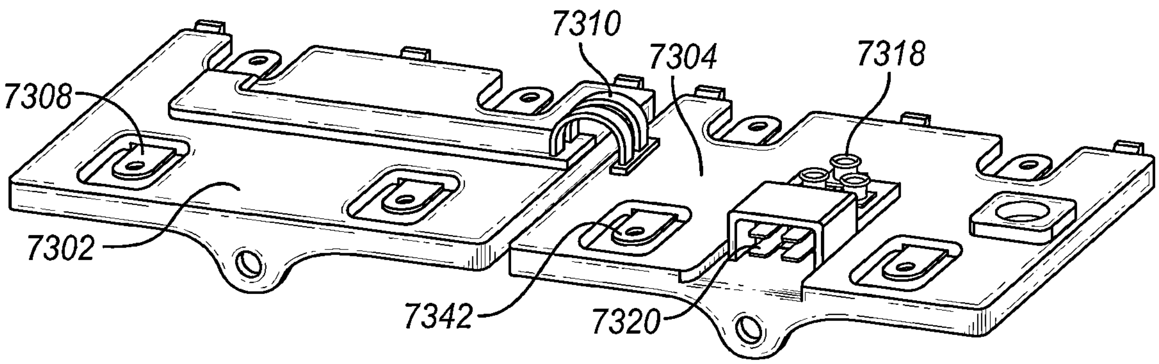
FIG. 73A and FIG. 73B depict a two-split top tray for a 48V battery assembly.
Figure 73B:
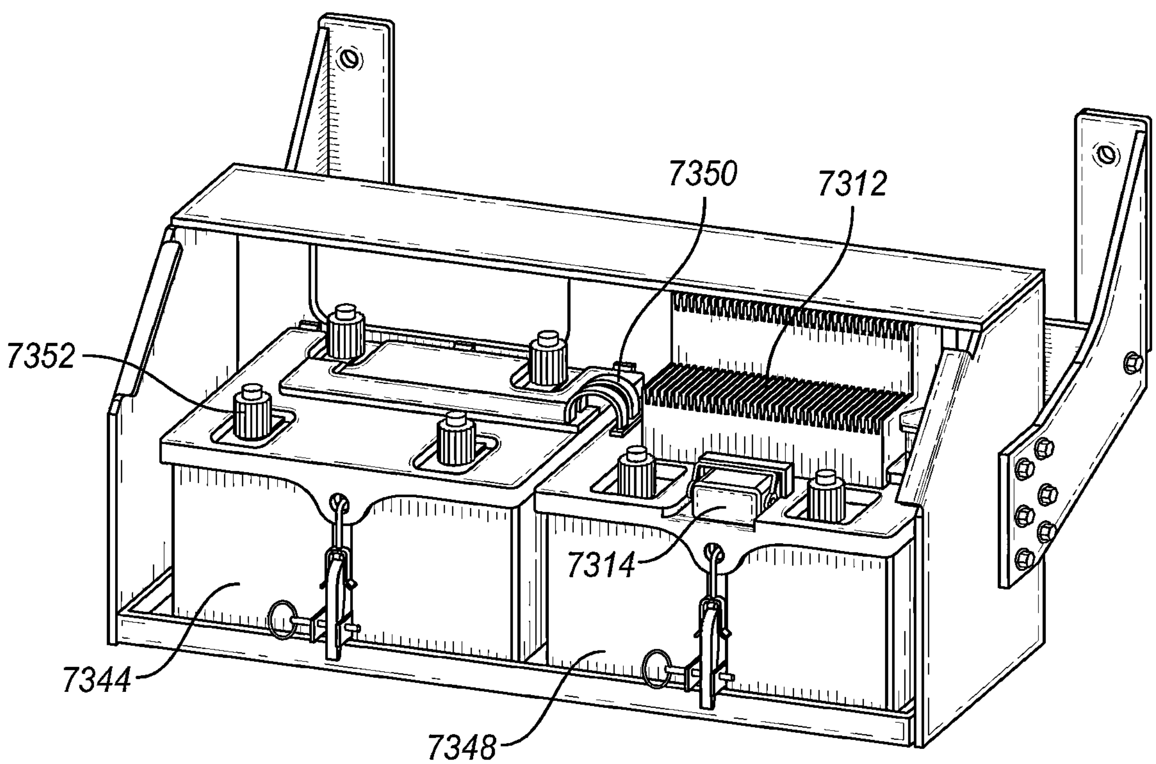

FIG. 73A and FIG. 73B depict a two split top tray for a 48V battery assembly, wherein the two split tray 7302, 7304 enables more flexibility. In this embodiment, featured is over-molding of busbars 7308, 7342 and easy terminal connections. In this embodiment, the fuse box may be on the right side. There are a number of ways to minimize costs and minimize number of interconnects. The jumper connection 7310 in the middle may be a braided busbar or stacks of foil to provide flexibility. Whether welding copper busbar to braid and back to copper busbar, or over-molding the stack of foil or the braid all the way to the end termination and then just putting a solid crimp termination on the end, many embodiments are possible to minimize cost and interconnects. In an embodiment, the design may involve picking where there may be flexibility to tolerate misalignment and where you have rigidity to assure proper connection order and mechanical fastening of the batteries 7344, 7348. Iteration on what is fixed and what is flexible is contemplated in the scope of these embodiments. The DC-to-DC converter 7312 and integrated MDC disconnect 7314 have a connection 7318 at the bottom of the tray and may be inserted to a connector 7320 from the front side.

FIG. 73A depicts busbar connections between trays in the form of circular bend busbars which may be shielded by an insulator. Assembly may be difficult as both covers need to be assembled at the same time and both covers need to be manufactured in one mold, but connection is ensured.

In some embodiments, vertical bend busbars in between trays which may be shielded by an insulator. This is relatively easy to assemble as two covers can be separately assembled on the battery, there may be lost contact between busbars. In other embodiments, busbars from one tray extend over another busbar on another tray which then can be bolted. Finally, it can be covered with a plastic cover for insulation. While connection is ensured and assembly is easy, the number of parts needed may increase.

In embodiments, the interconnect may comprise at least one of a circular bend busbar, a vertical busbar, or a horizontal busbar. In embodiments, the horizontal and vertical busbars may overlap.

In an embodiment, and with reference to FIG. 73B as an example (it should be understood that the following disclosure may be embodied by other battery assemblies described herein), a system may include a vehicle having a prime mover motively coupled to a drive line, a motor/generator selectively coupled to the drive line, and configured to selectively modulate power transfer between an electrical load and the drive line, a battery pack, a DC/DC converter 7312 electrically interposed between the motor/generator and the electrical load, and between the battery pack and the electrical load, and a covering tray 7302, 7304 positioned over a plurality of batteries 7344, 7348 of the battery pack, the covering tray 7302, 7304 comprising a connectivity layer, such as connectivity layers including one or more busbars 7308, 7342, 7320, configured to provide electrical connectivity to terminals, such as terminals 7352, of the plurality of batteries. The connectivity layer may include a first voltage. The covering tray 7302, 7304 may further include a second connectivity layer coupling the plurality of batteries to the DC/DC converter 7312, wherein the second connectivity layer may also include one or more busbars (e.g., busbars 7308, 7342, 7320). The second connectivity layer may include a second voltage, wherein the second voltage may include a distinct voltage from the first voltage.

In embodiments, the first voltage may include a voltage of each battery of the plurality of batteries. The second voltage may include a voltage of two batteries of the plurality of batteries coupled in series. The second voltage may include a voltage of three batteries of the plurality of batteries coupled in series. The second voltage may include a voltage of four batteries of the plurality of batteries coupled in series.

In embodiments, the covering tray 7302, 7304 may further include an insulating layer electrically interposed between the connectivity layer and the second connectivity layer. The insulating layer may include at least one of an electrically insulating material, such as insulating sheet 3328, a dielectric material, or a designed air gap.

In an embodiment, the insulating layer may include a printed circuit board (PCB), such as shown in FIG. 34C. In an embodiment, the system may further include a plurality of battery microcontrollers, each of the plurality of battery microcontrollers associated with a corresponding one of the plurality of batteries, and a primary DC/DC controller configured to command operations of the DC/DC converter 7312, wherein the plurality of battery microcontrollers may be operationally coupled to the primary DC/DC controller through a circuit of the PCB. The plurality of battery microcontrollers may be communicatively coupled to the primary DC/DC controller through the circuit of the PCB. In embodiments, the plurality of battery microcontrollers and the primary DC/DC controller may share a ground traversing at least partially through the PCB. The shared ground may have a low voltage state that is elevated relative to a chassis of the vehicle. The elevated low voltage state may include the first voltage. The elevated low voltage state may include a voltage selected from the voltages consisting of: 12V nominal, 24V nominal, or 36V nominal.

In an embodiment, the PCB and the DC/DC converter may include a unified interface assembly, and a connector 6928 having a first engaged position with the unified interface assembly, represented by the position the connector 6928 of FIG. 69 would take if it were positioned as indicated by the arrow head, and a second disengaged position, as shown in FIG. 69, wherein the connector in the first engaged position electrically couples the battery pack 6922, 6924 to the DC/DC converter 6930, and wherein the connector 6928 in the second disengaged position electrically decouples the battery pack 6922, 6924 from the DC/DC converter 6930. The connector in the first engaged position may electrically couple at least a portion of the plurality of batteries in a serial arrangement, and the connector in the second disengaged position may electrically de-couple the at least a portion of the plurality of batteries from the serial arrangement.

Figure 84:
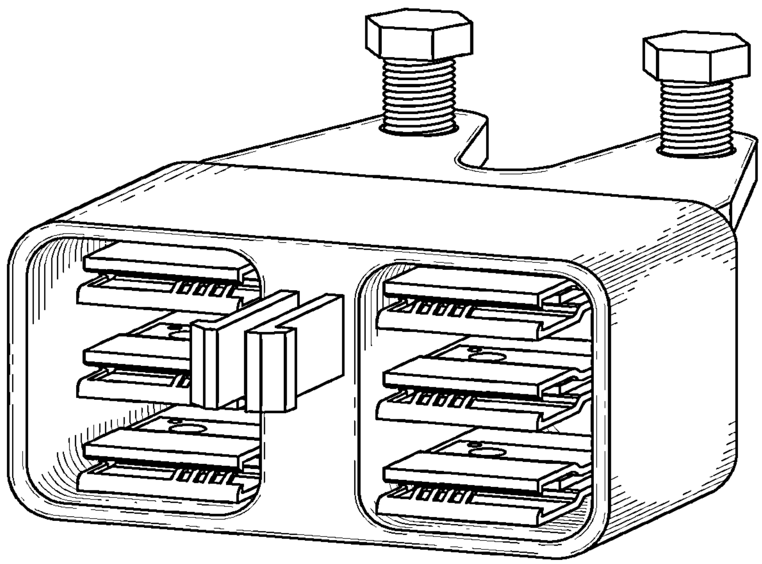
FIG. 84 depicts features of the front interconnect.
Figure 85:
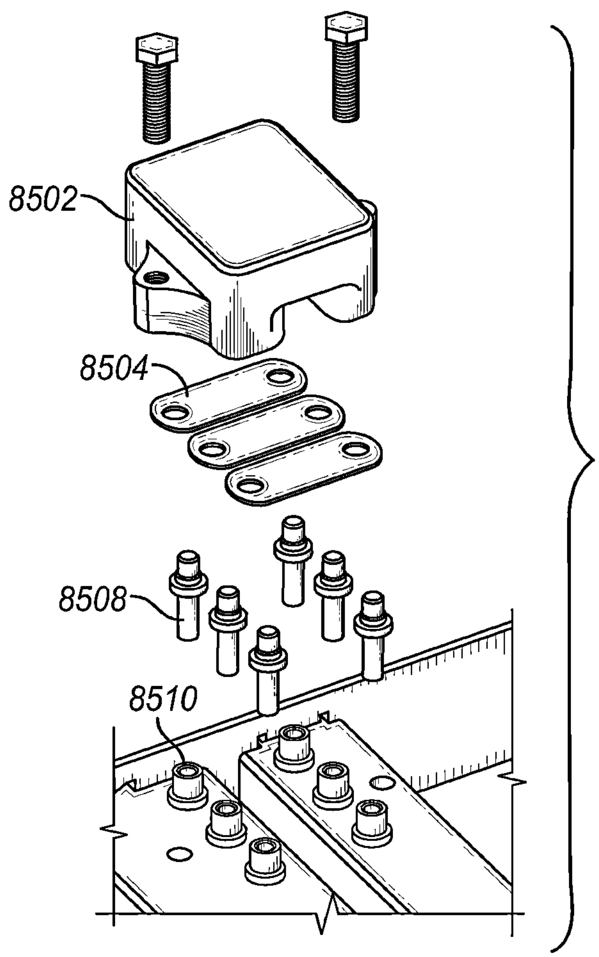
FIG. 85 depicts a vertical, or top-mount, interconnect for battery trays.
Figure 86:
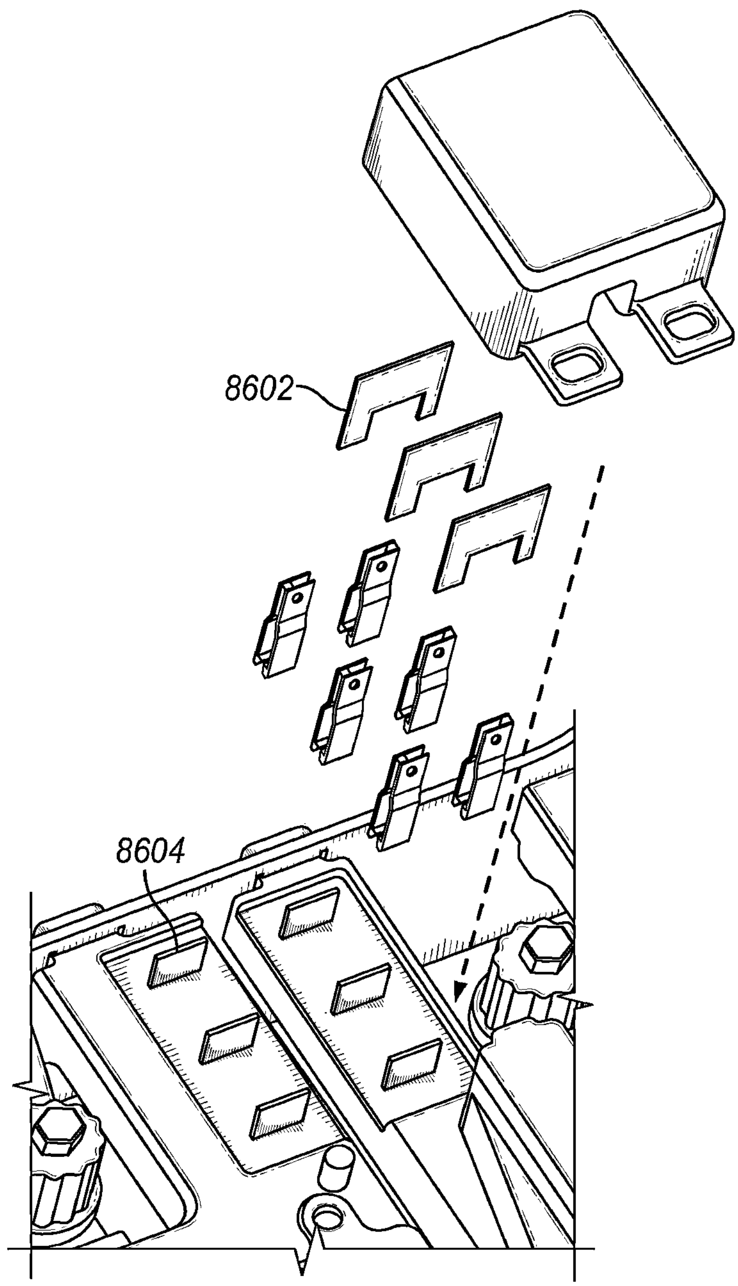
FIG. 86 depicts a vertical, rear positioned interconnect for battery trays with increased horizontal positioning flexibility.
Figure 112:
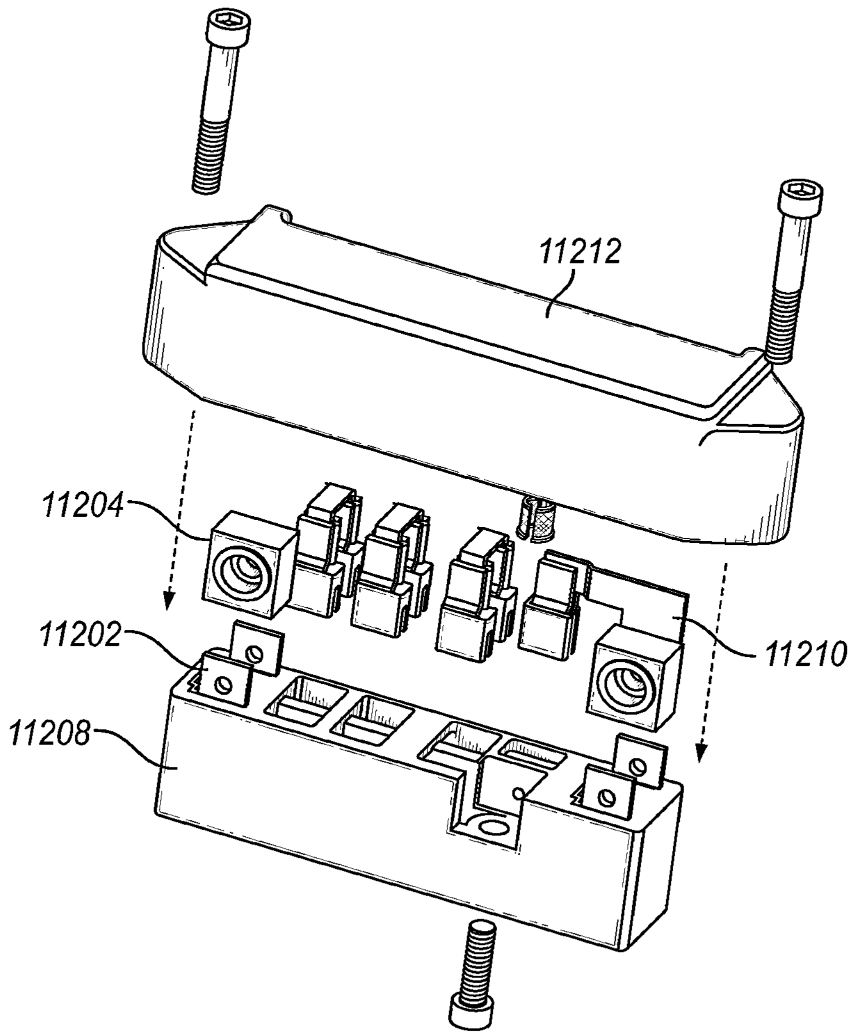
FIG. 112 depicts a compact service disconnect device that may be vertically pushed and then bolted to the top tray.
Figure 114:
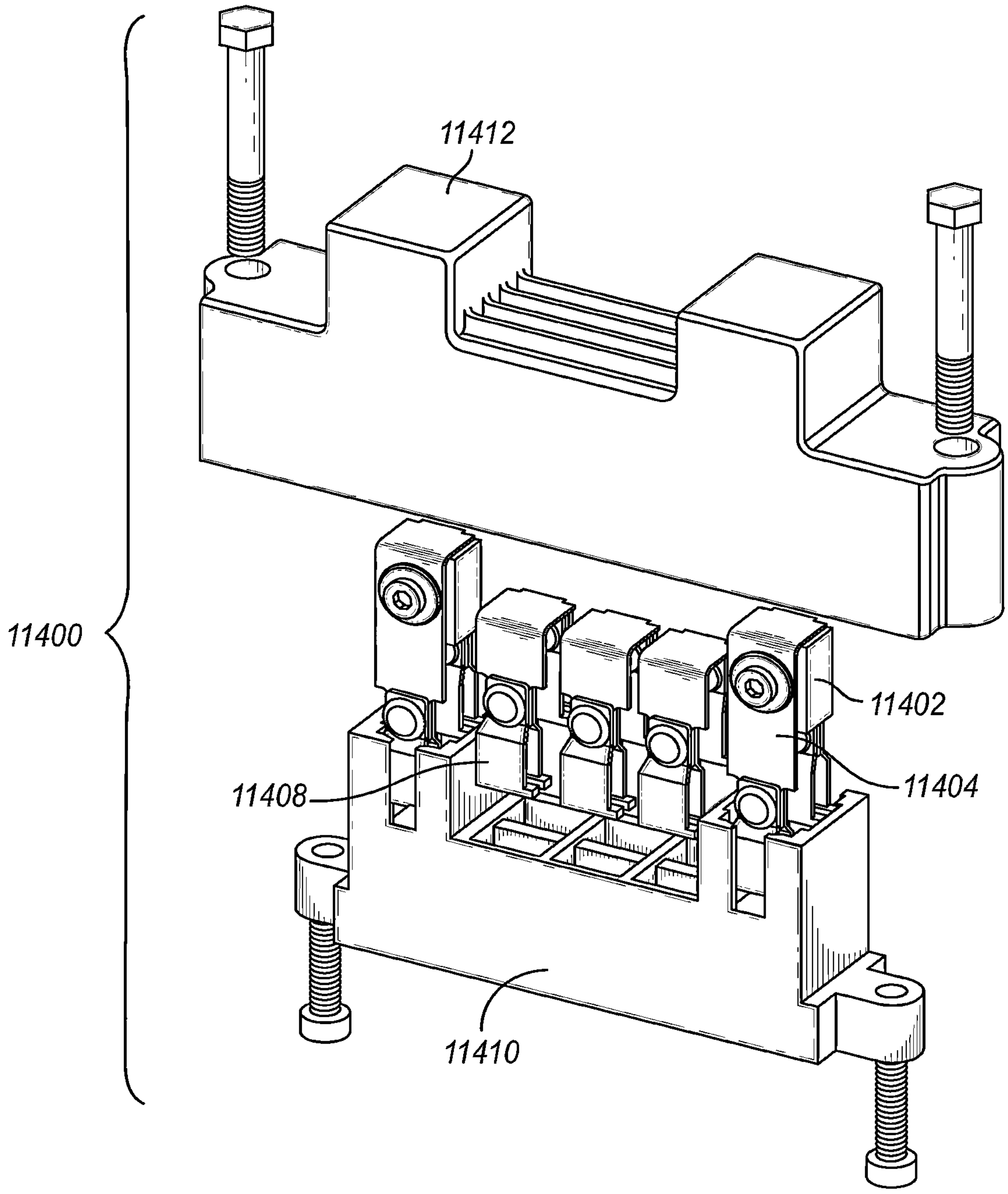
FIG. 114, FIG. 115A, FIG. 115B, and FIG. 115C depict vertical assembly of a service disconnect device with a guide on the DC/DC converter.

In an embodiment, the system may further include wherein the PCB comprises an inter-connection assembly, and a connector, such as interconnect 3012 or 8310 or interconnects depicted in FIG. 84, FIG. 85, FIG. 86 or others, having a first engaged position 8314 with the interconnection assembly and a second disengaged position 8318, wherein the connector in the first engaged position may electrically couple a first plurality of batteries of the battery pack to a second plurality of batteries of the battery pack. In embodiments, the connector may include a service disconnect. In embodiments, the connector may further include at least one fuse, as shown in FIG. 11, FIG. 112, FIG. 114, and others, and wherein the connector in the first engaged position may electrically interpose the at least one fuse into the connection between the battery pack and the DC/DC converter. In embodiments, the connector may move vertically or horizontally between the first engaged position and the second disengaged position. The connector may be fixed in the first engaged position using a tab-and-slot arrangement, a cam lever arm, or a self-tapping screw. In embodiments, the connector in the first engaged position may further electrically couple the motor/generator with the DC/DC converter, or an electrical system of the vehicle with the DC/DC converter.

Figure 74A:
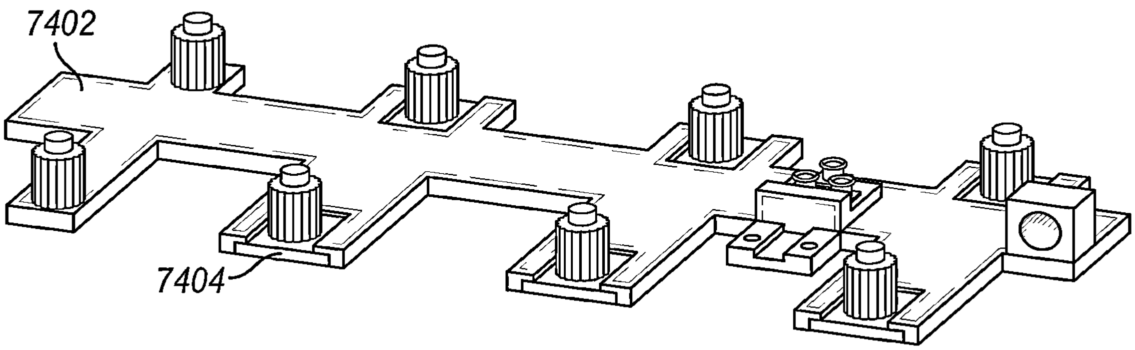
FIG. 74A and FIG. 74B depict a tray with plastic ends at the terminals for a 48V battery assembly.
Figure 74B:
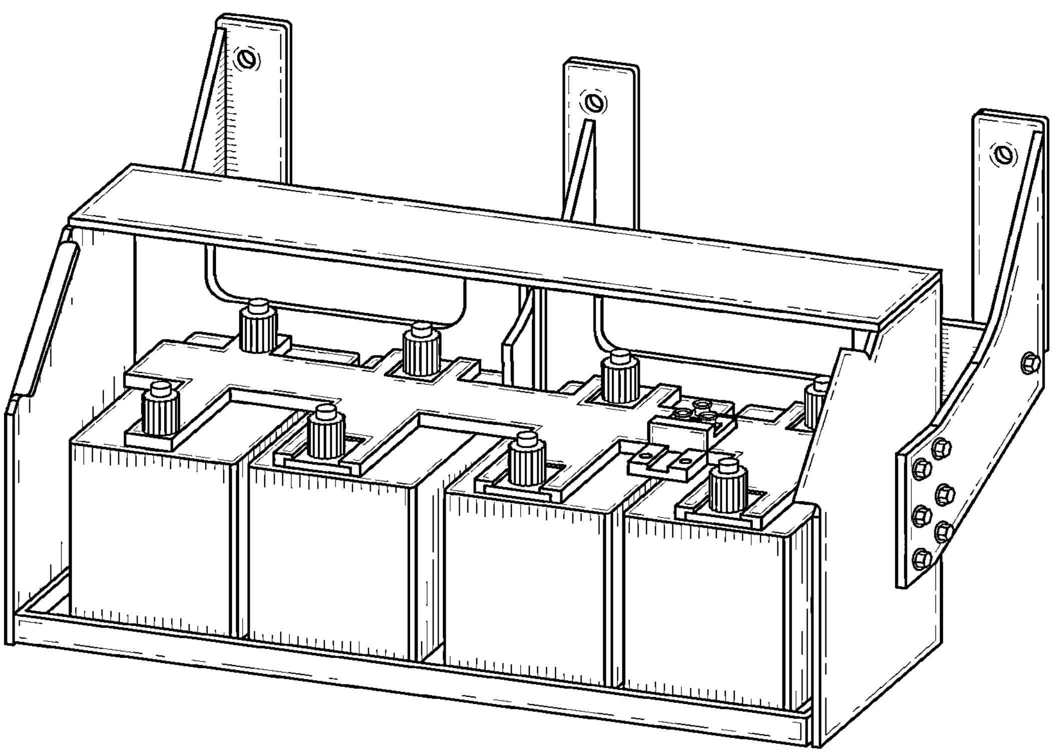

FIG. 74A and FIG. 74B depicts a tray with plastic ends at the terminals for a 48V battery assembly. In this embodiment, there is over-molding of busbars, a single tray 7402 for all batteries, easy terminal connections with the help of plastic ends, and flexibility at the terminal ends of busbars. This embodiment comprises a sliding feature 7404, which may comprise a busbar end, to connect at the battery terminals. The sliding feature enables some tolerance on terminal location. FIG. 74B features the tray and busbars depicted in FIG. 74A in place on the batteries.

Figure 75A:
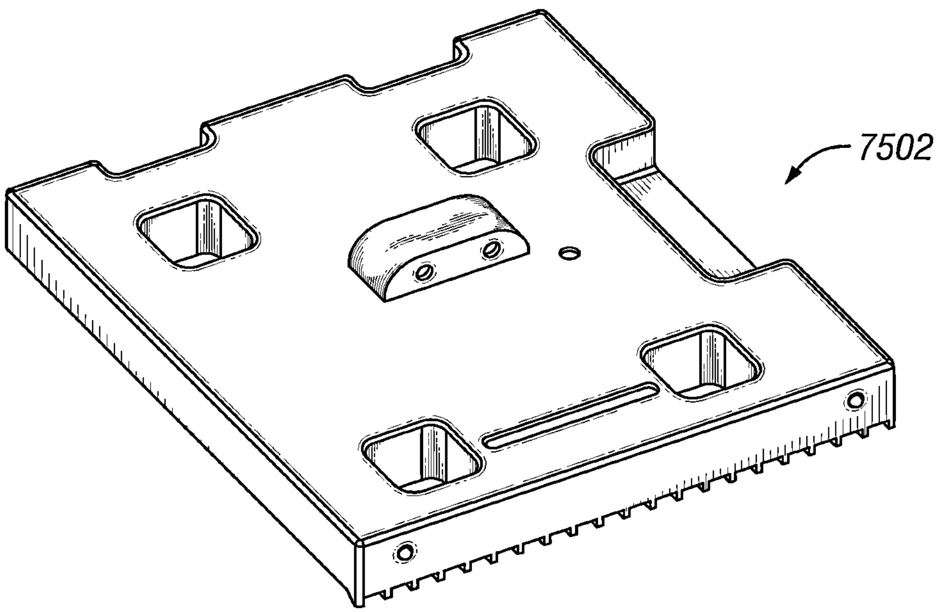
FIG. 75A, FIG. 75B, and FIG. 75C depict an over-molding battery tray for a 48V battery assembly.
Figure 75B:
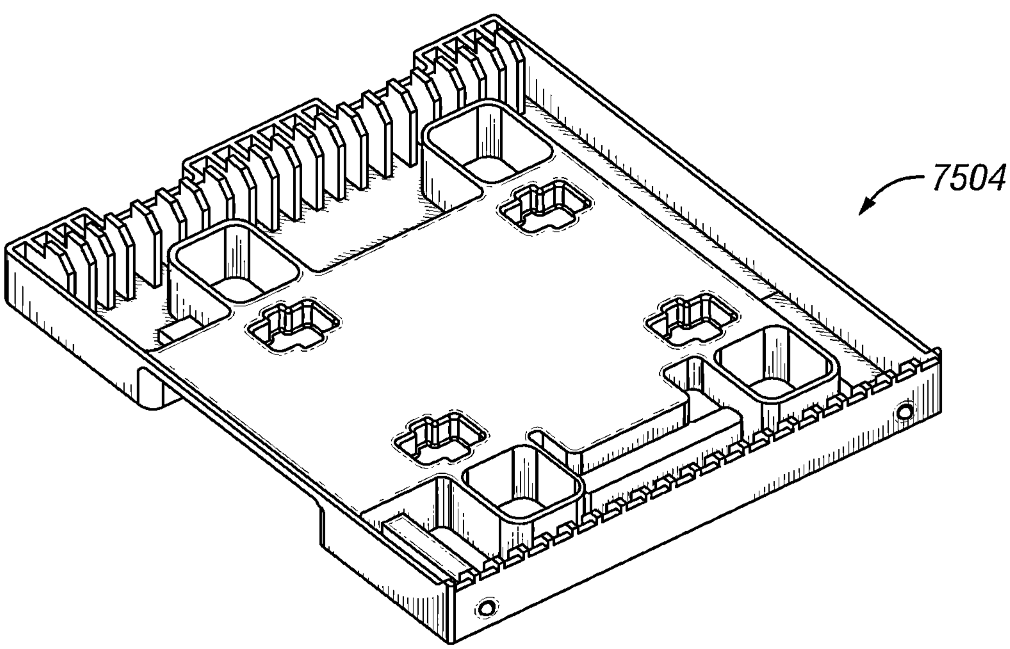
Figure 75C:
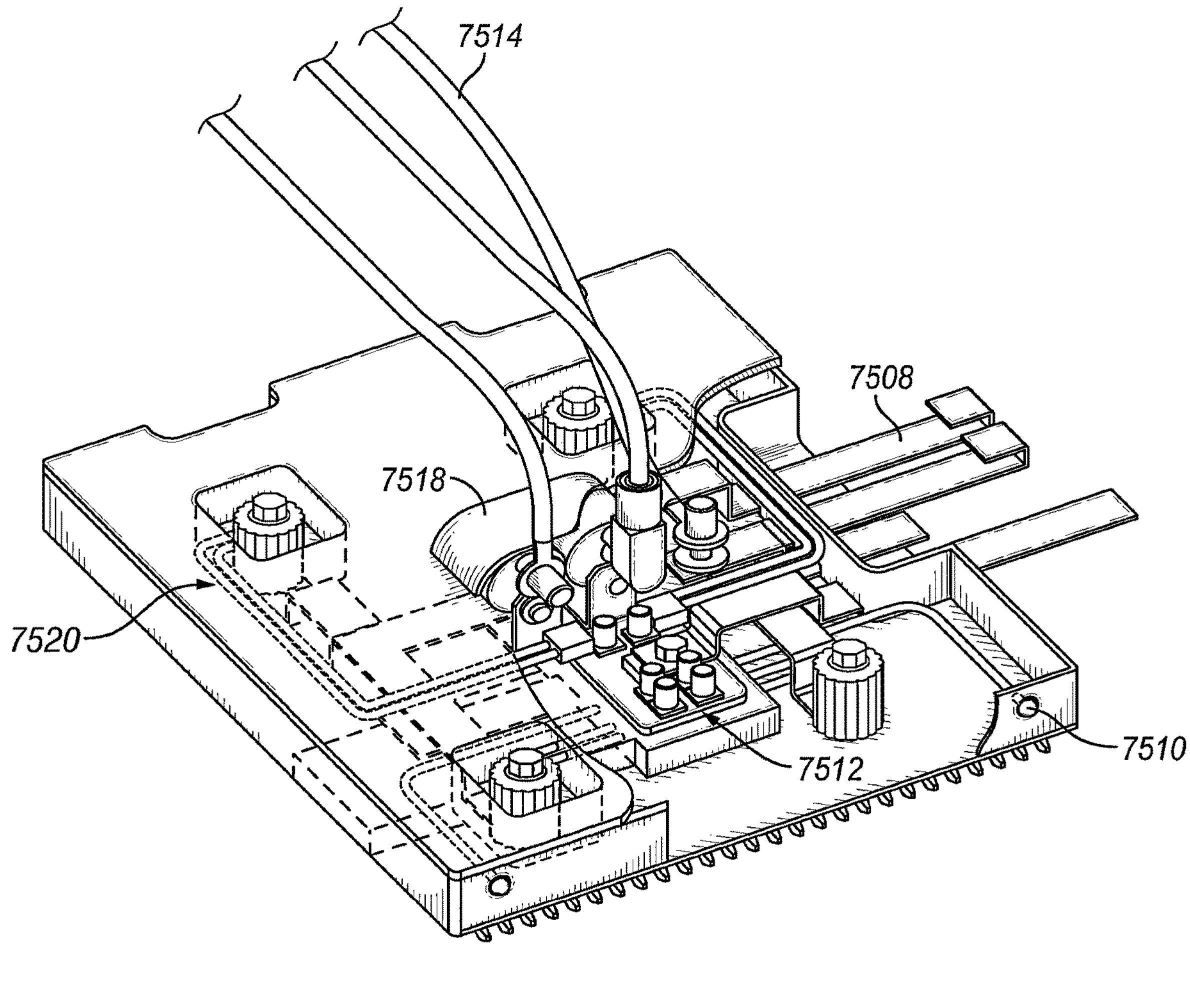

FIG. 75A, FIG. 75B, and FIG. 75C depict over-molding a battery tray for a 48V battery assembly to obtain integrated, overmolded busbars inside a tray. This embodiment may include the plastic battery tray, the terminals, the circuit board, sensing board over molded, busbar over molded, battery sensing unit 7512, LED 7510, temperature and current sensor wires 7520, battery separators over molded 7518 (so an over-molding in the tray matches the shape of the battery separator(s)), power output cables 7514, and copper busbars. The battery separator may also be known as a bi-stable relay, which may be relay suitable for use with certain embodiments of a battery assembly. A bi-stable relay can operate in both the open or closed position without power, and switches only under power. An example embodiment utilizes a bi-stable relay that is normally open (disconnecting 12V, 48V, and auxiliary battery pack) that disconnects when 12V power is lost, which will allow a low holding current state. Another example embodiment utilizes a bi-stable relay with a capacitor that ensures the bi-stable relay opens on a loss of power. An example embodiment utilizes a control circuit that ensures all batteries are correctly coupled before re-connecting power. In certain embodiments, two bi-stable relays (e.g., 12V and 48V) are utilized, and overmolded into the MDC primary. In certain embodiments, an additional bi-stable relay is on the auxiliary battery tray (where present).

The battery microcontroller may run to two batteries at a time. There may be two battery sensors in each tray, and each tray is servicing two batteries to primarily monitor battery voltage and battery temperature. In an embodiment, monitoring both battery terminal temperatures and seeing an imbalance is potentially a connection fault. In other embodiments depicted elsewhere, the controller for the two contactors may be a third microcontroller on the battery sensing unit, so the power distribution control can be integrated on the same circuit board. In this embodiment, separate wires coming off the circuit board are used for sensing, however it should be understood that a direct connection of the busbars may be made using the circuit board as a spacer to minimize the number of wires. In some embodiments, there may be two overmolded trays 7502, 7504 and busbars 7508 spanning both trays. The top tray 7502 rests atop the lower tray 7504 with the busbars 7508 in between, as seen in FIG. 75C.

Figure 76A:
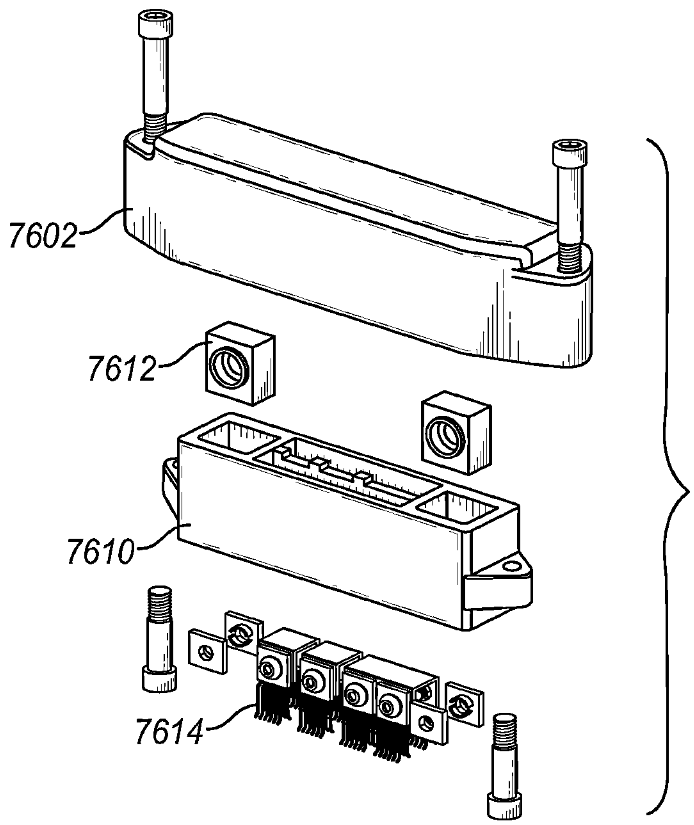
FIG. 76A and FIG. 76B depict an embodiment of the 48V battery assembly.
Figure 76B:
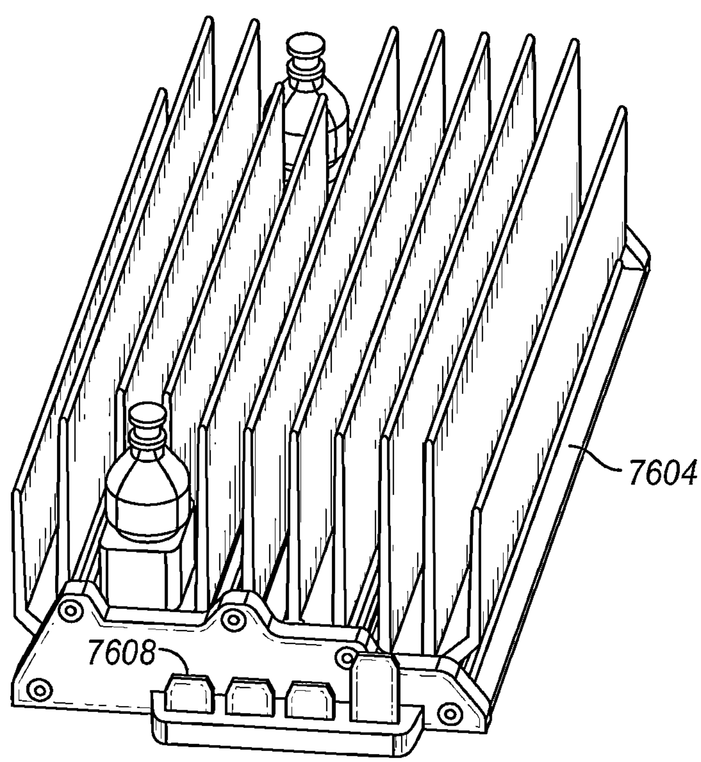

FIG. 76A and FIG. 76B depict an embodiment of a service disconnect device (depicted in FIG. 76A) structured to connect to a DC-to-DC converter 7604 through connectors 7608 of the converter 7604. The service disconnect device includes an outer housing 7602, an inner housing 7610, fuses 7612, and busbar connectors 7614.

Figure 78:
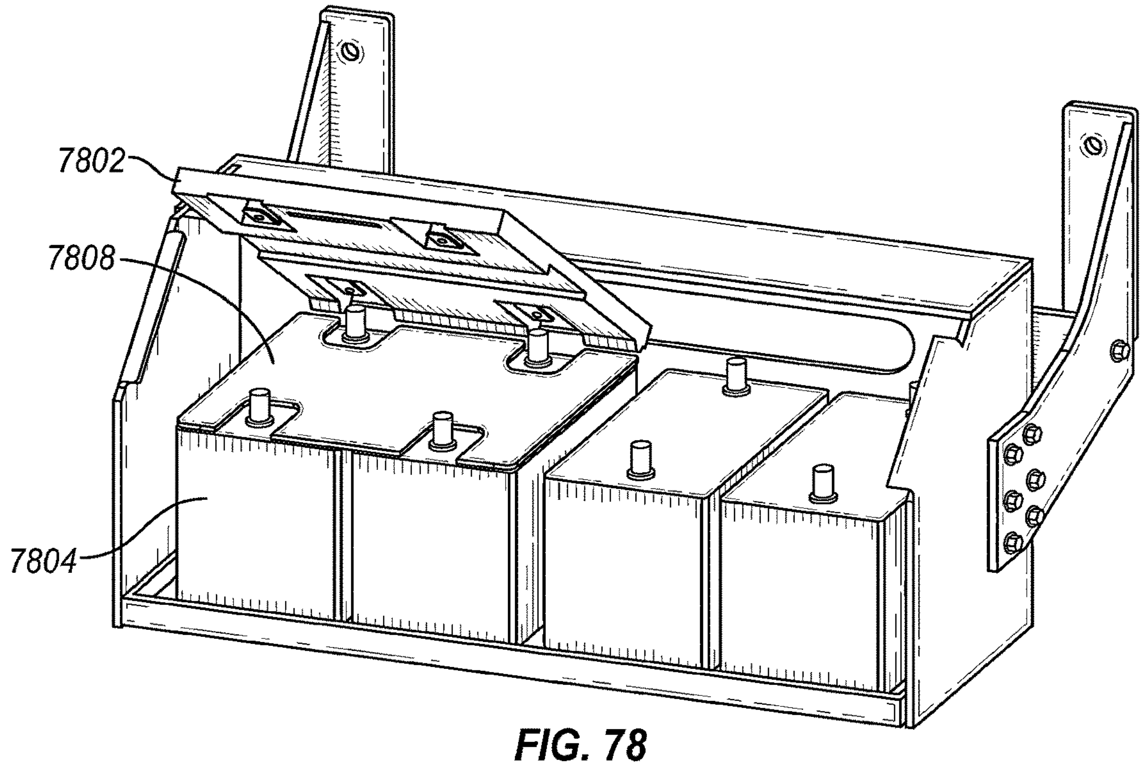
FIG. 78 depicts an over-molding battery tray for a 48V battery assembly.

In FIG. 78, an over-molded battery tray with top part 7802 and lower part 7808 is shown in place on batteries 7804 of a 48V battery assembly similar to the embodiment depicted in FIG. 75C.

Figure 79A:
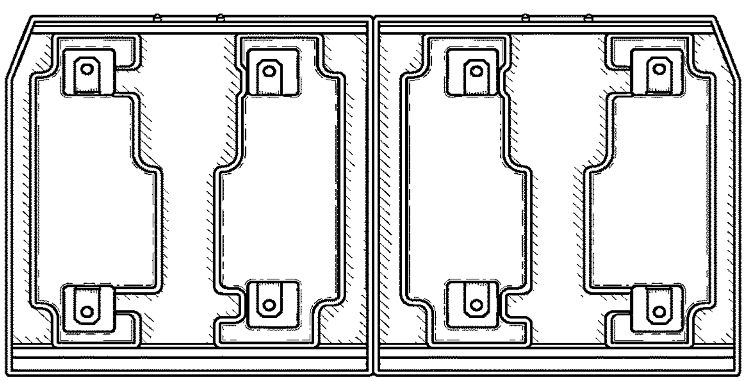
FIG. 79A and FIG. 79B depict a two plate embodiment of a 48V battery assembly.
Figure 79B:
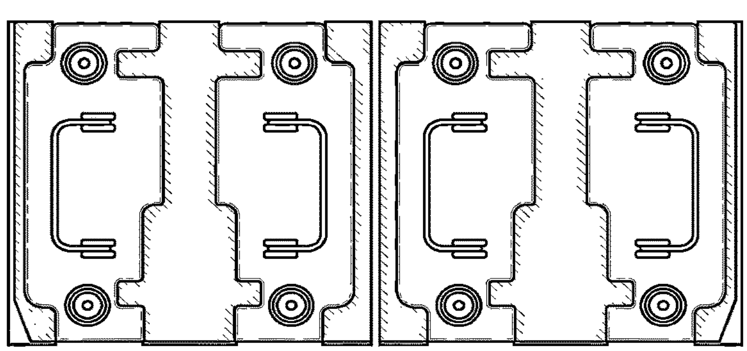
Figure 81:
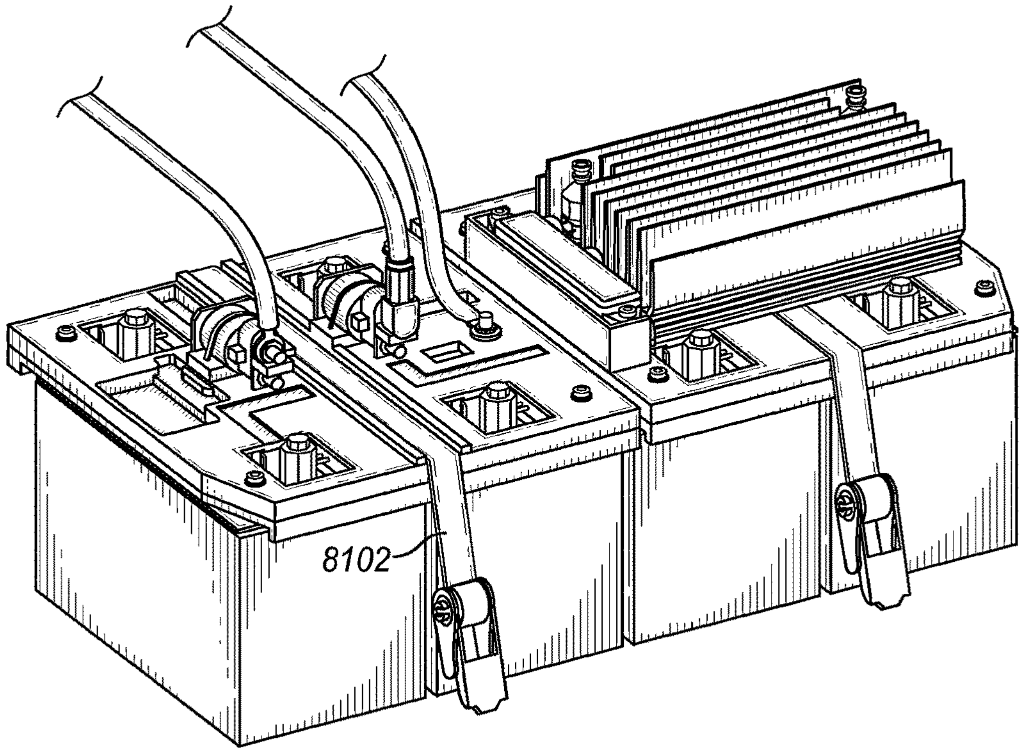
FIG. 81 depicts a simplified assembly of the two plate embodiment.

FIG. 79A and FIG. 79B depict a two-plate embodiment of a 48V battery assembly. In these embodiments, the busbars are sandwiched between a top plate and a bottom plate instead of being overmolded. The busbars would be located in the bottom plate or top plate with a locating feature. With the help of bolts, the plates can be tightened together. If scaling the plates is desired, plates may be sealed with an ultrasonic weld or vibration weld. In this embodiment, a rubber pad may be located below the bottom tray and a belt may be used to secure the batteries and trays to a battery box. Components of the top tray include battery separators, terminals (e.g., negative, service disconnect), and bolts (e.g., Allen). FIG. 79A depicts loading surfaces of the bottom cover and FIG. 79B depicts loading surfaces of the battery. Top trays are may be placed on the bottom tray assembly. Allen bolts may be tightened to make the assembly firm. A nut may need to be tightened at the negative terminal. All the components may be assembled on the bottom tray so that bottom portion of sandwich is ready. FIG. 81 depicts a simplified assembly of the two plate embodiment depicted in FIG. 79A and FIG. 79B with a strap 8102 holding batteries. Battery separators, busbars, sensor board circuit and LEDs are shown separate from the sandwich trays, which comprise a terminal cap. The batteries are shown with the two trays placed on top and secured with a strap belt. The DC/DC converter and service disconnect are also placed on top of the battery tray. The batteries and tray may be placed into a sheet metal battery box.

Various battery tray interconnect embodiments that result in safe, simple, integrated, reliable solutions for 48V batteries in commercial vehicle applications will now be described.

Figure 82:
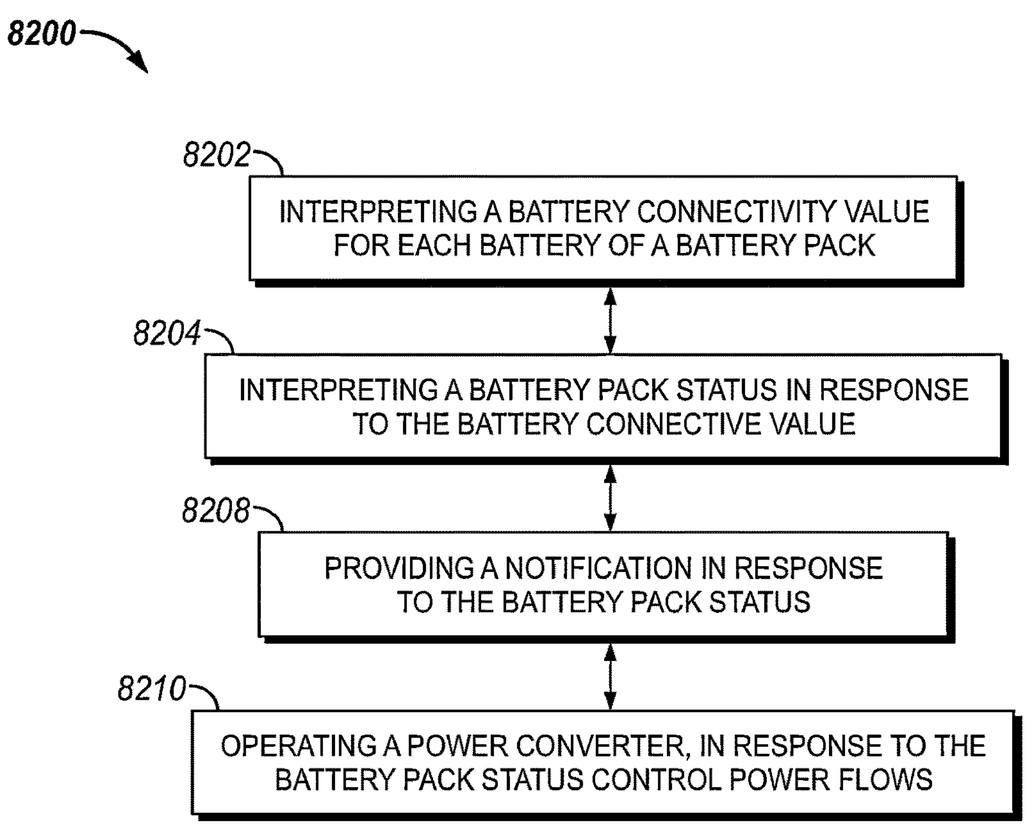
FIG. 82 depicts a battery monitoring method.

FIG. 82 depicts busbar connections between trays. FIG. 82 depicts circular bend busbars which may be shielded by an insulator. Assembly may be difficult as both covers need to be assembled at the same time and both covers need to be manufactured in one mold, but connection is ensured.

In some embodiments, vertical bend busbars in between trays which may be shielded by an insulator. This is relatively easy to assemble as two covers can be separately assembled on the battery, there may be lost contact between busbars. In other embodiments, busbars from one tray extend over another busbar on another tray which then can be bolted. Finally, it can be covered with a plastic cover for insulation. While connection is ensured and assembly is easy, the number of parts needed may increase.

Figure 83A:
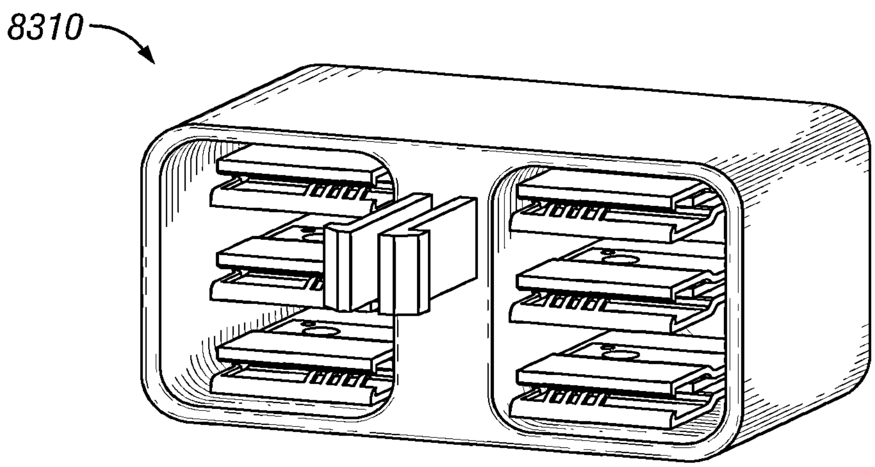
FIG. 83A and FIG. 83B depict a front interconnect for battery trays.
Figure 83B:
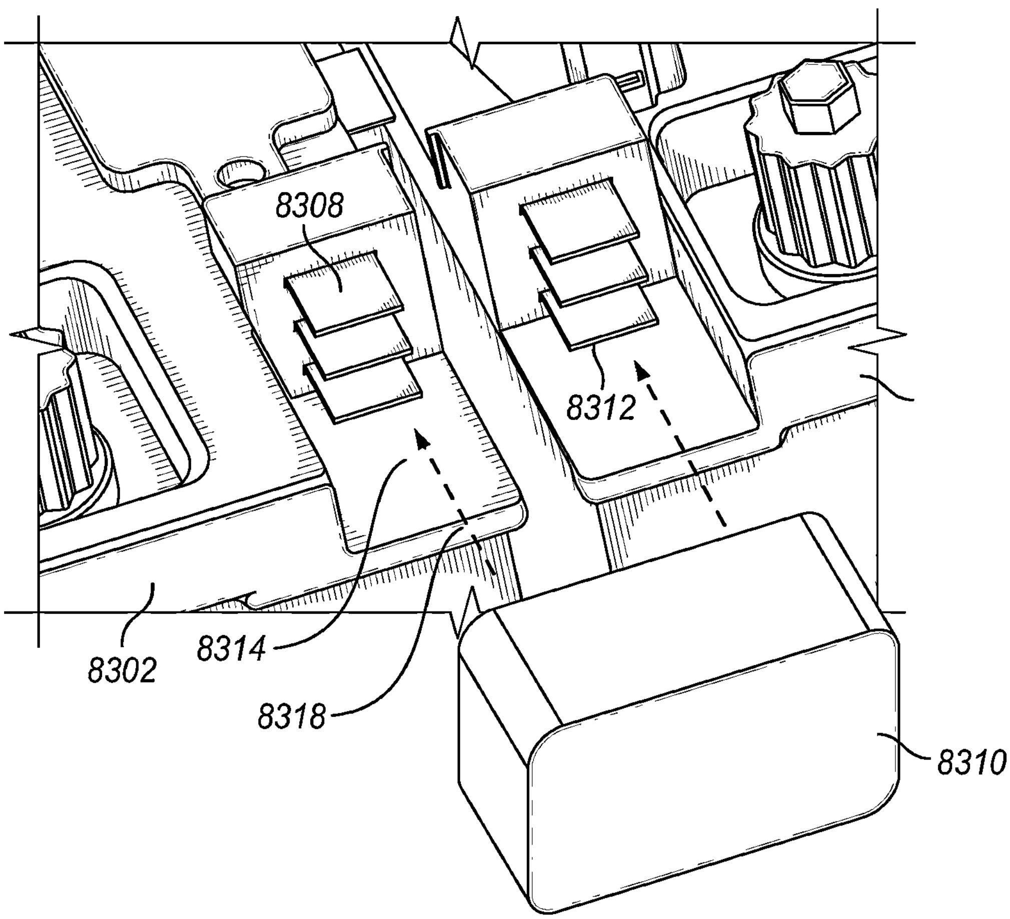

FIG. 83A and FIG. 83B depict a front interconnect for battery trays where an interconnect device 8310 acts as a bridge between the left tray 8302 and right tray 8304. The battery trays may be connected by an interconnect device, where horizontal busbars 8308 on each of the left tray and right tray connect to the interconnect device. Since the busbar does not need to be located at a particular position, this embodiment accommodates movement or misalignment of the left and right side trays. An interconnect device such as the one shown here can also be used for the service disconnect. In such an embodiment, the service disconnect would connect the trays and fuses may be separate. In some embodiments, there may be busbars that additionally connect the trays in the middle (e.g. by overlapping) and may be bolted together. FIG. 84 further depicts features of the front interconnect device. The interconnect device may feature an external plastic housing, an internal plastic housing to connect left tray to right tray and provided with bottom sealing, internal busbars over molded in the internal plastic housing, spring connectors which will pair with busbars fitted in the tray, and pins to fit connectors with the internal busbars. A standard bolt, which can be optionally be tightened with a 9/16 wrench, may be used to secure the interconnect device.

FIG. 85 depicts a vertical, or top mount, interconnect for battery trays where an interconnect device acts as a bridge between the left tray and right tray. In this embodiment, the device includes a plastic housing 8502 to connect left tray to right tray and provide bottom scaling, internal busbars 8504 overmolded in the plastic housing, and vertically oriented connectors 8508 which will pair with connectors 8510 fitted in the tray (e.g. Radsert connectors connecting to Radsock connectors in the tray). A standard bolt, which can be optionally be tightened with a 9/16 wrench, may be used to secure the interconnect device. The placement of the interconnect device and connectors thereof on the tray may be placed anywhere along the length of the tray.

FIG. 86 depicts a vertical, rear positioned interconnect for battery trays with increased horizontal positioning flexibility. Unlike round pins, which may have one seating arrangement, the interconnect device of this embodiment can make a connection in multiple positions along the width of the busbars. The busbar powerblade may be wider than the terminal to provide effectively unlimited tolerancing in one dimension. Vertically oriented busbars 8602 of the interconnect device connect with busbars 8604 from the battery tray.

In embodiments, a middle interconnect for battery trays may include busbars overlapping each other. A plate can be used to cover the busbars. A spring may be used with the plate to keep compression. There may be a slot on one or more battery trays to receive busbars from the other tray. In embodiments, the busbars may employ a connector or other form of blade engagement in making contact between trays.

Various service disconnect embodiments and geometry options that result in safe, simple, integrated, reliable solutions for 48V batteries in commercial vehicle applications will now be described. Some of the advantages of the service disconnect devices disclosed herein include: reduced complexity in assembly of 48V electronic circuitry; clamping of the DC/DC converter with the tray to avoid movement due to shocks (e.g. integrated containment of the DC/DC converter); insulate/seal the connections from the external environment; provide a mounting interface for electronics components; reduces cost in the manufacturing process, the number of parts needed, and the types of connectors needed; ensures stability against vibration; avoids heat generation due to loose contacts; minimizes modifications required in mating parts; and makes busbar connections.

Figure 88A:
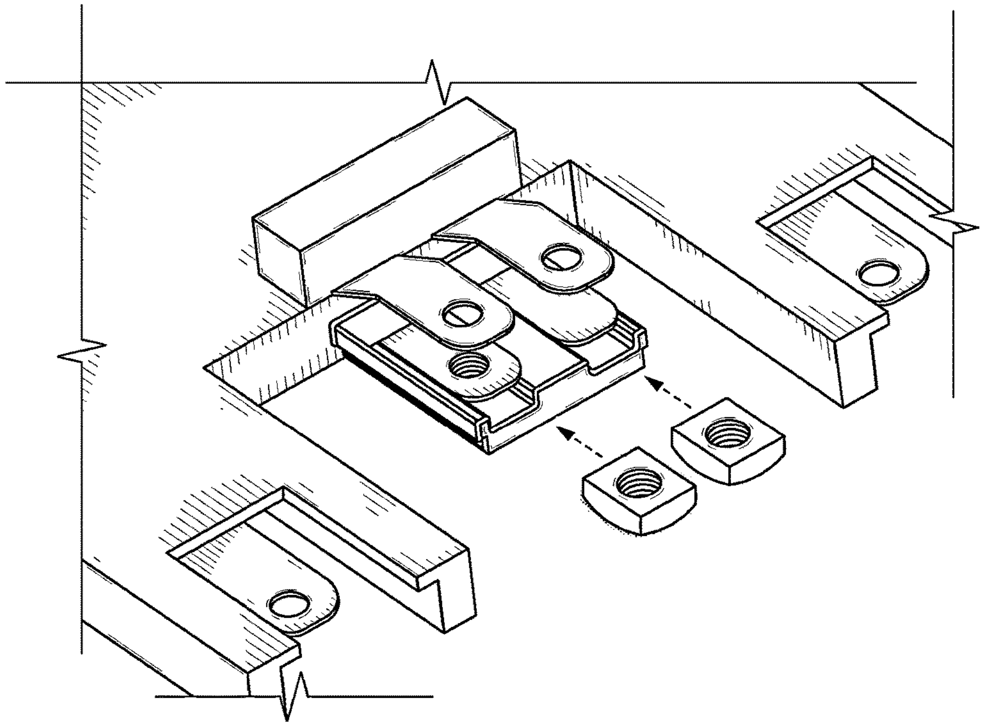
FIG. 88A and FIG. 88B depict a service disconnect for an integrated MDC.
Figure 88B:
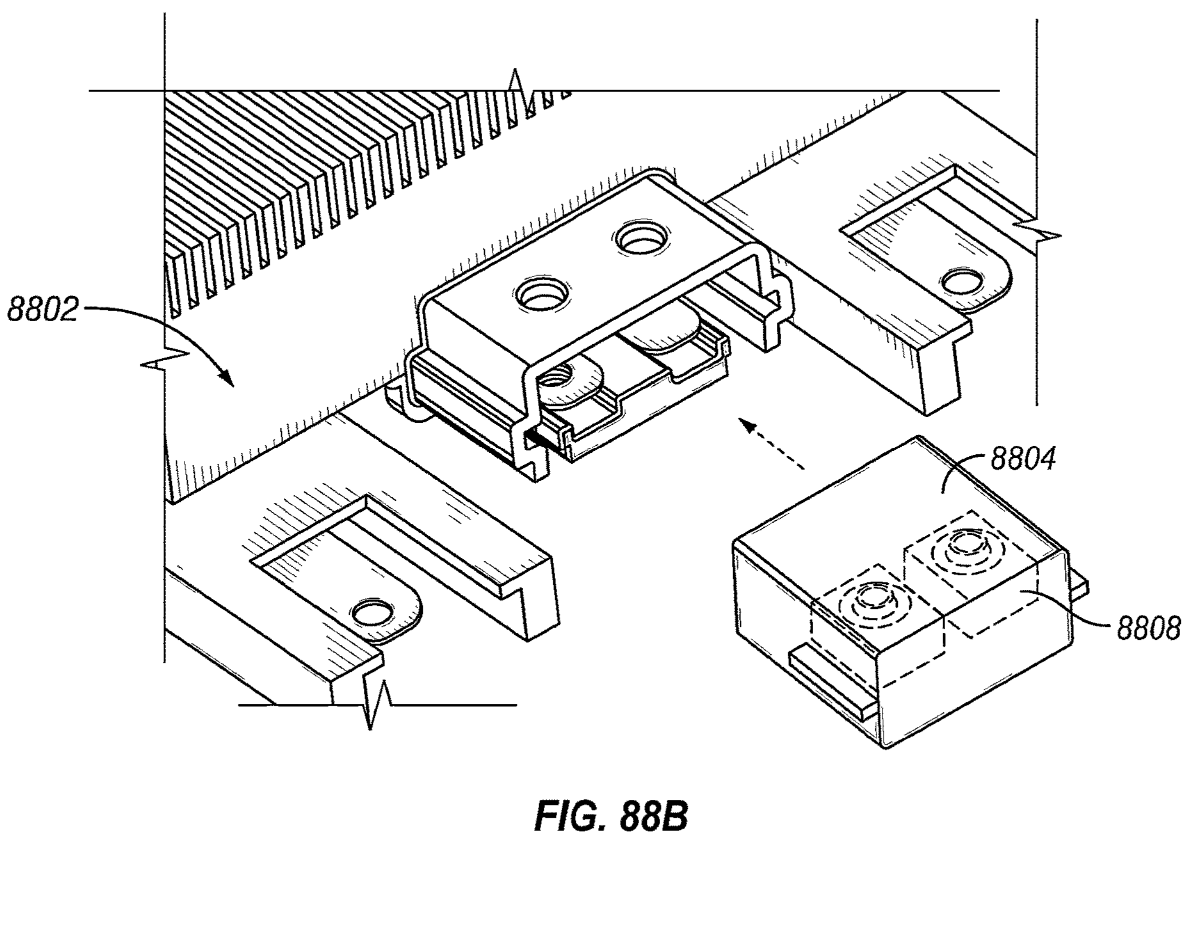
Figure 89:
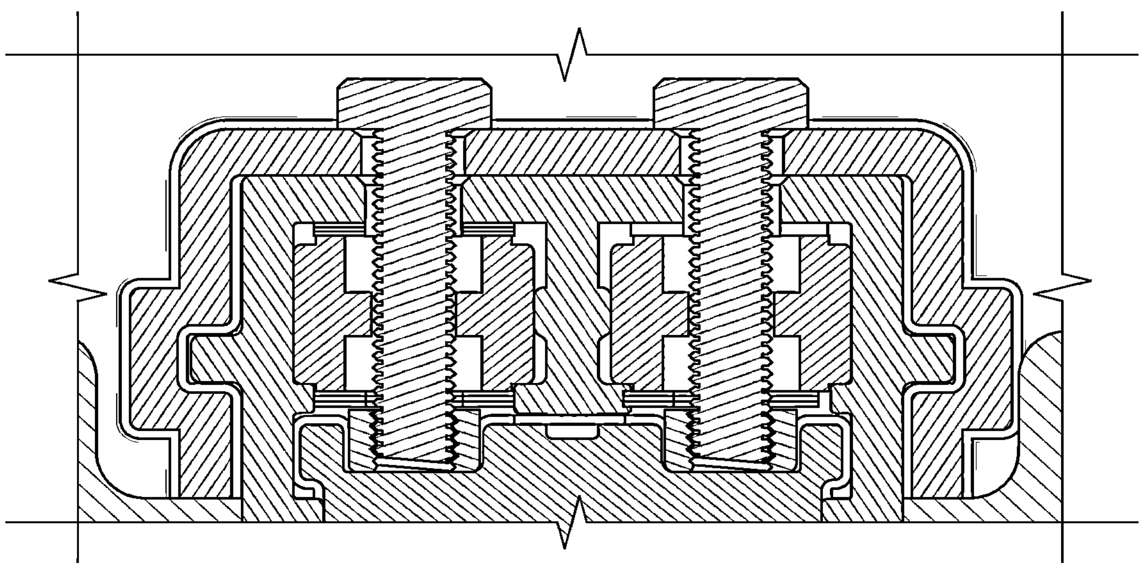
FIG. 89 depicts a service disconnect for an integrated MDC with bolts through the fuses.

FIG. 88A and FIG. 88B depict a service disconnect for an integrated MDC, or motor drive converter. In embodiments, the MDC integrates the three phase motor inverter and the DC-DC converter into a single power electronics assembly. As it is a horizontal push service disconnect and it is from the front side, assembly and disassembly is relatively easy. Movement may be restricted with the help of cams. In some embodiments, only the DC to DC converter is in the integrated Power Distribution with the inverter remote mounted or using an alternator. In an embodiment, the MDC may include inverter plus DC to DC plus system intelligence, hybrid control and power management in a single box on the battery tray. FIG. 88A depicts the tray without the DC-to-DC converter in place and depicting the direction fusing is to be installed. FIG. 88B depicts the DC/DC converter 8802 sitting atop the tray with the service disconnect device 8804, which includes fuses 8808, approaching for horizontal insertion. Insertion of the service disconnect device makes the connection between the DC/DC converter and battery tray with bolts through the DC-to-DC converter holding the busbars and fuses in place with the device, as further depicted in side cutaway detail in FIG. 89. Without removing the service disconnect device, the MDC may not be removed. In an embodiment, the MDC may have busbars on a lower surface to connect to the battery tray.

Figure 91A:
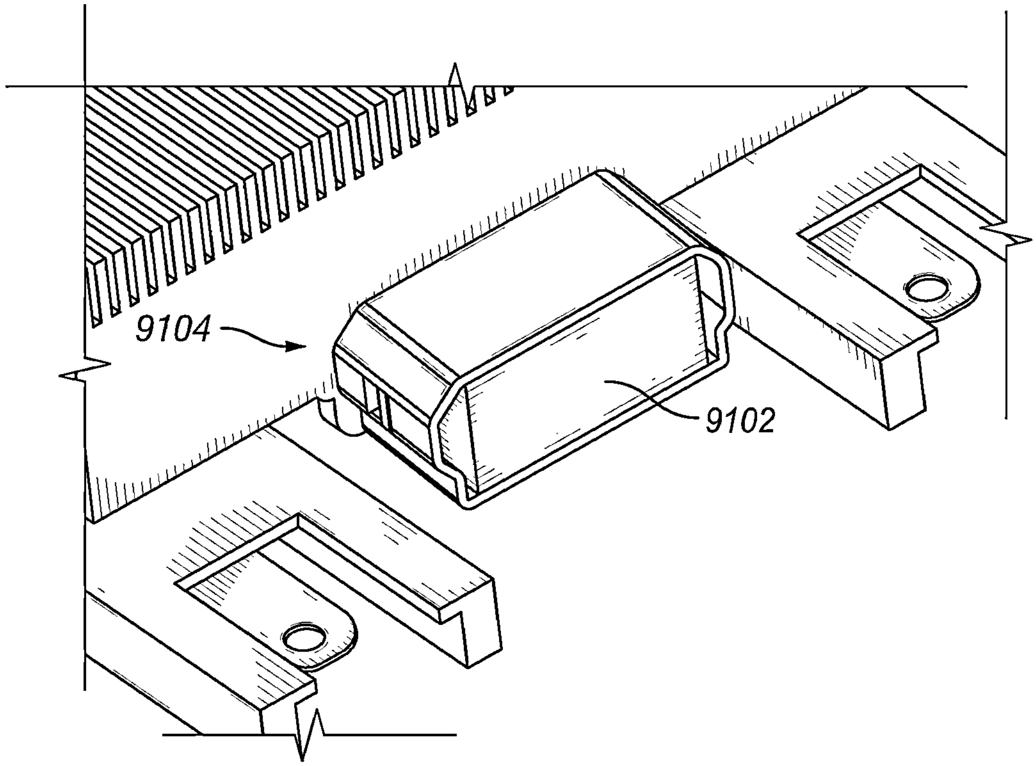
FIG. 91A and FIG. 91B depict a service disconnect device with a snap-fit connector.
Figure 91B:
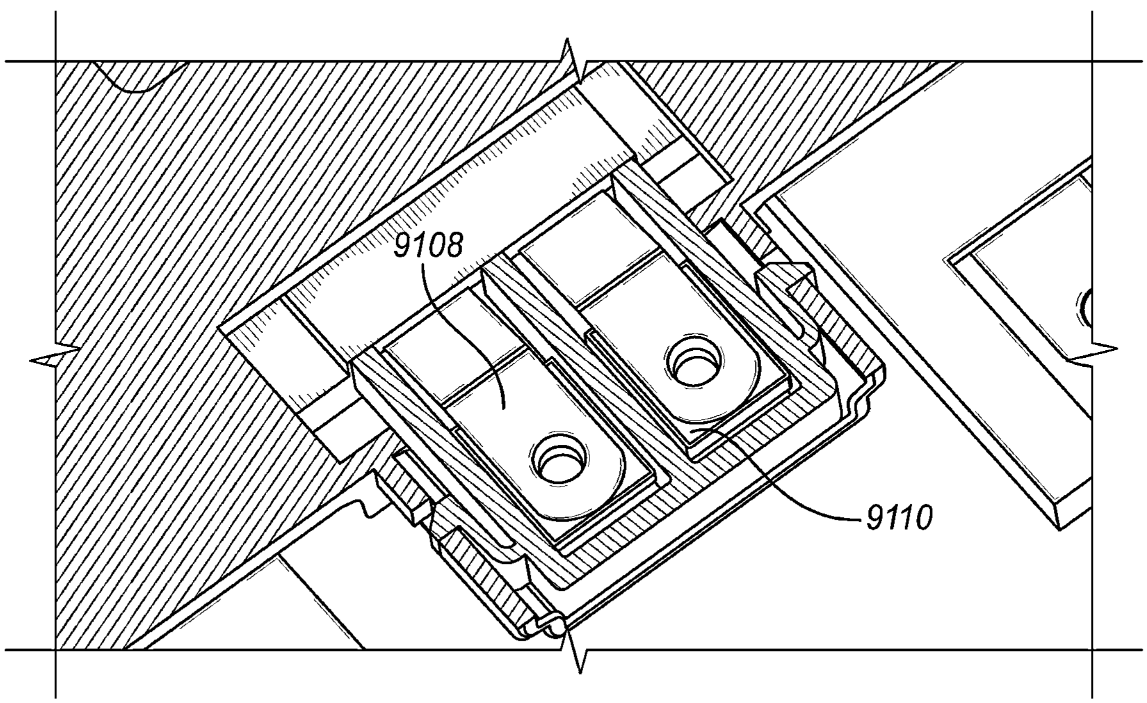

Referring now to FIG. 91A and FIG. 91B, a service disconnect device may be a snap-fit connector. FIG. 91A depicts the assembled tray, snap fit service disconnect device 9102 and DC/DC converter 9104, and FIG. 91B depicts the busbars 9108 make contact with the fuses 9110 within the snap fit connector. In embodiments, the snap-fit connector may be removed with a specially designed tool in one embodiment, or by hand in other embodiments.

Figure 92:
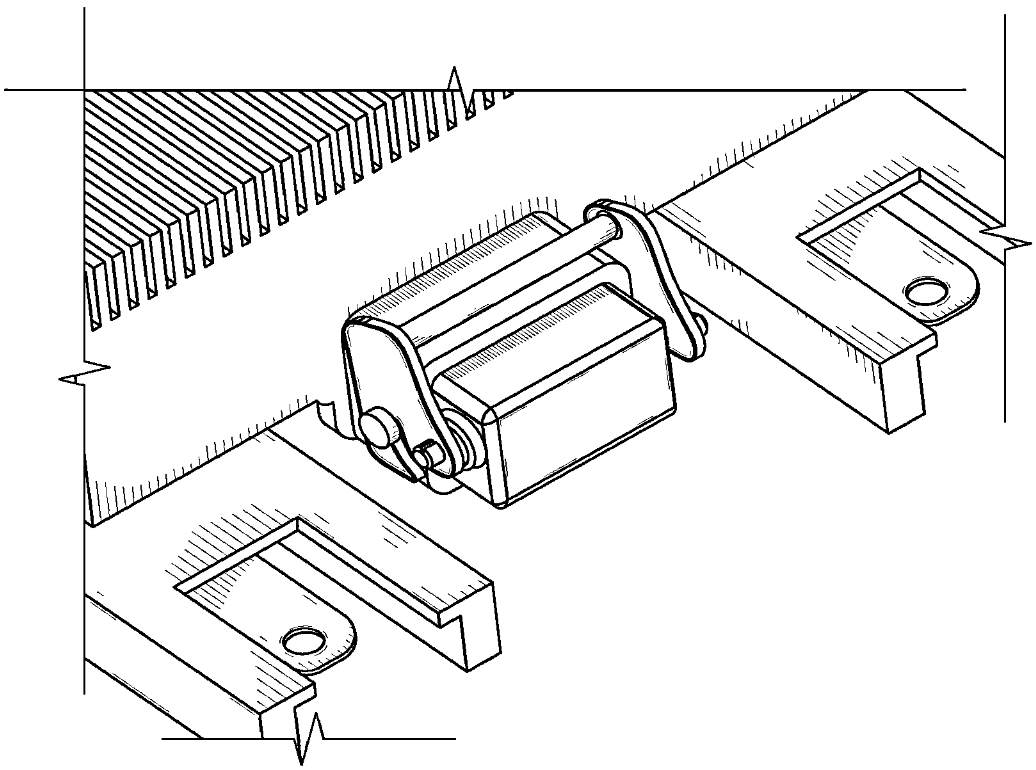
FIG. 92 depicts an embodiment of the service disconnect device with cam locking.
Figure 93:
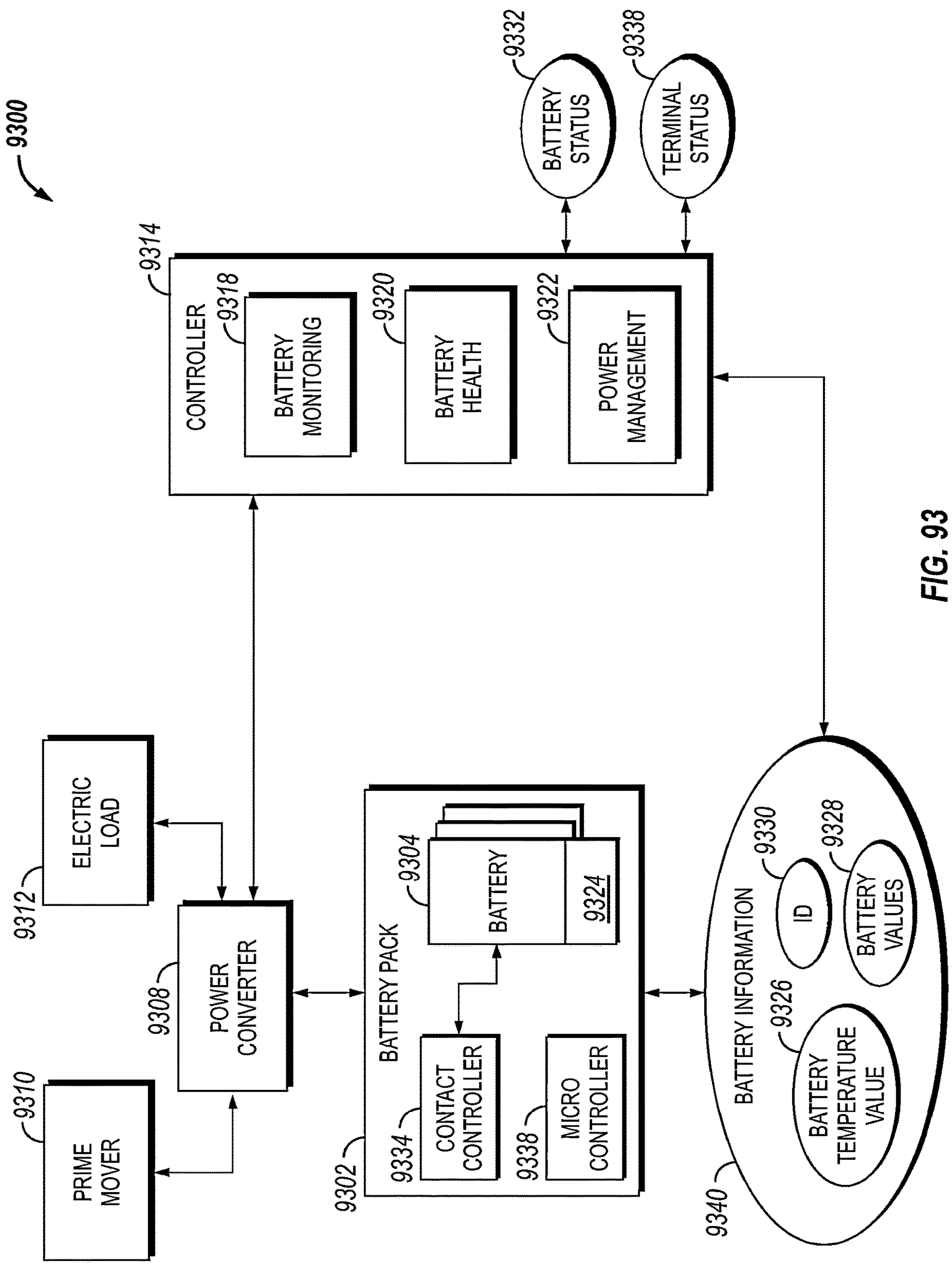
FIG. 93 depicts a system schematic for monitoring a vehicle battery.
Figure 94:
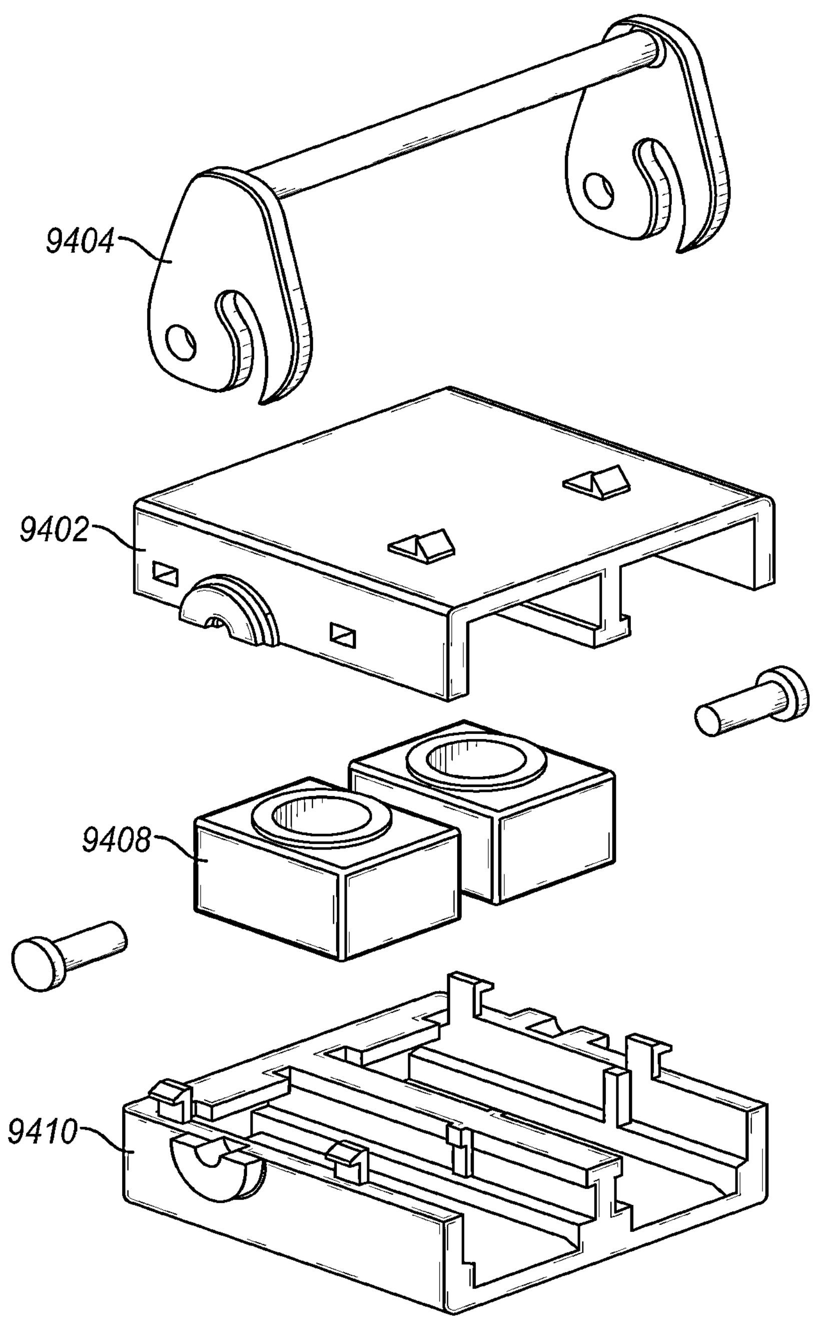
FIG. 94 depicts an embodiment of the service disconnect device with cam locking.
Figure 95:
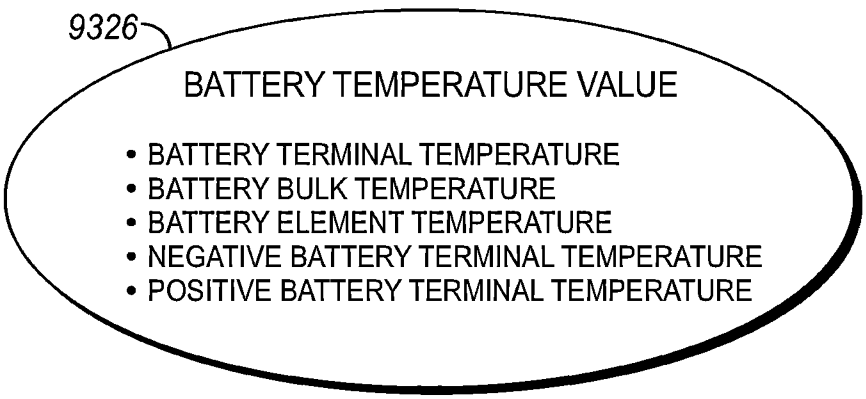
FIG. 95 depicts temperature value options.
Figure 96:
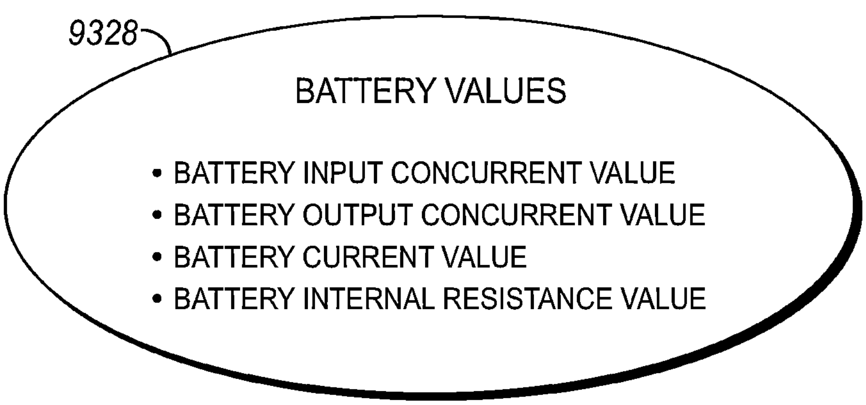
FIG. 96 depicts battery value options.

FIG. 92, and FIG. 94 depict embodiments of the service disconnect device with cam locking, which may also include secondary locking in some embodiments. FIG. 94 depicts the service disconnect device as a two-part structure, with a top part 9402, cam lock 9404, fuse 9408, and bottom part 9410. that snaps to lock the body together. In some embodiments, connection features on a face of the device enable a snap lock to the MDC. The example disconnect includes a cam lock for removing the fuses, providing a positive lock of the fuses into position, as well as a positive release ensuring that the disconnection is predictable to the operator. The example disconnect includes fuses, which may be marine quality fuses, for both the 48V and 12V sides (where present) of the DC circuits of the battery assembly, which may be coupled and decoupled with the same actuation of the disconnect. In certain embodiments, the battery assembly may be isolated from the vehicle 12V or 48V system in the event of power loss (e.g., using an appropriately configured contactor) such that when the disconnect is opened, all sources of 48V and/or 12V into the battery assembly are isolated.

Figure 98:
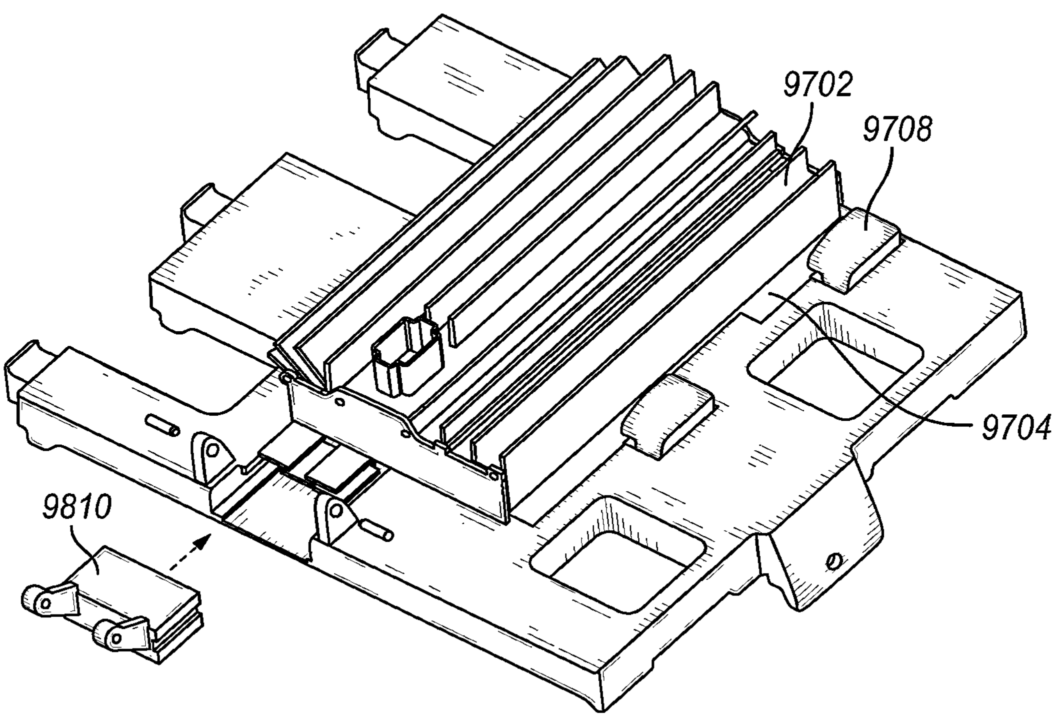
FIG. 98 depicts a service disconnect device being introduced from the vertical direction to engage with the MDC.
Figure 99:
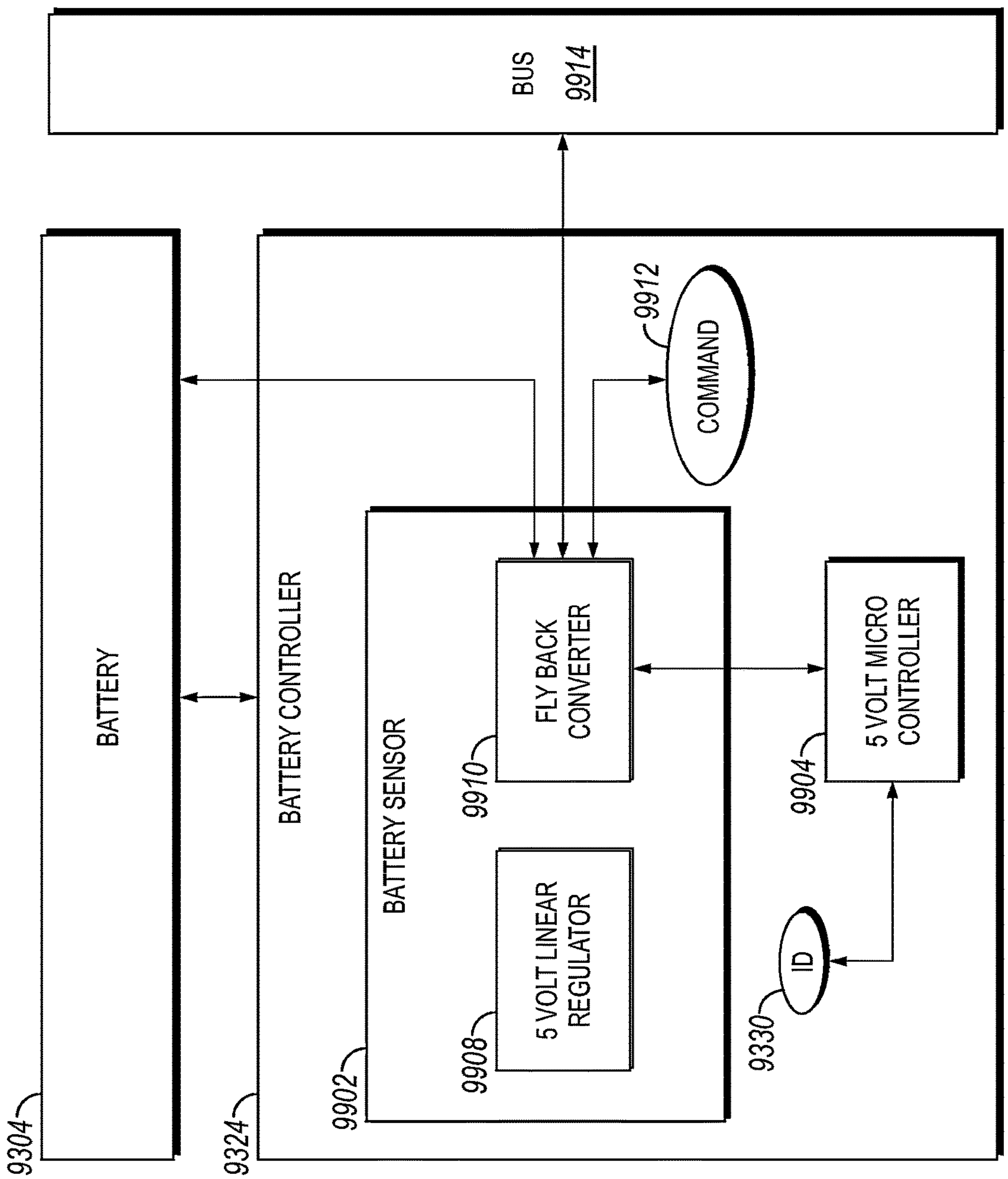
FIG. 99 depicts a schematic of a battery controller.

Referring now to FIG. 98, the service disconnect device 9810 and fusing may be introduced from the horizontal direction to engage with the MDC. The MDC may have an extruded housing 9702 with a long surface to dissipate heat and an end cap that facilitates the horizontal engagement. Slots in flanges 9704 along the lower length of the extruded DC-to-DC converter facilitate engagement with tabs 9708 shown on the right side of the DC-to-DC converter on the tray such that the DC-to-DC converter may be slid in horizontally along the surface of the battery tray. In this embodiment, the plastic end cap of the DC-to-DC converter may need additional support to withstand vibrations.

Figure 97:
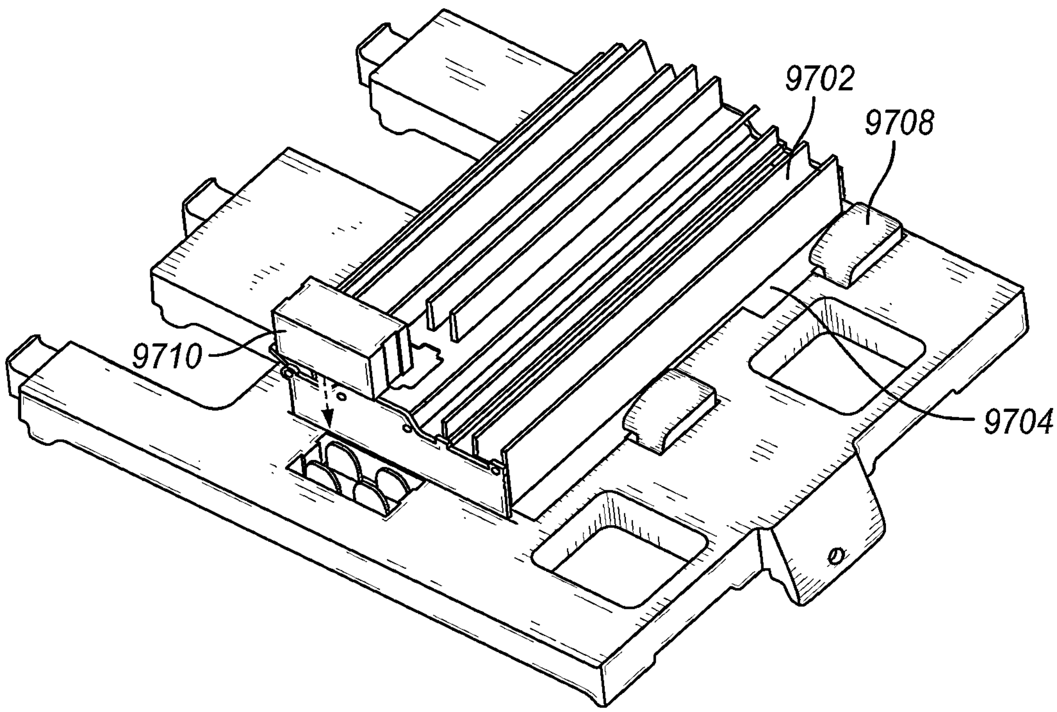
FIG. 97 depicts a service disconnect device being introduced from the horizontal direction to engage with the MDC.

In FIG. 97, the service disconnect device 9710 and fusing may be introduced from the vertical, top direction to engage with the MDC. Connectors may be at the bottom of the DC/DC converter.

Figure 100:
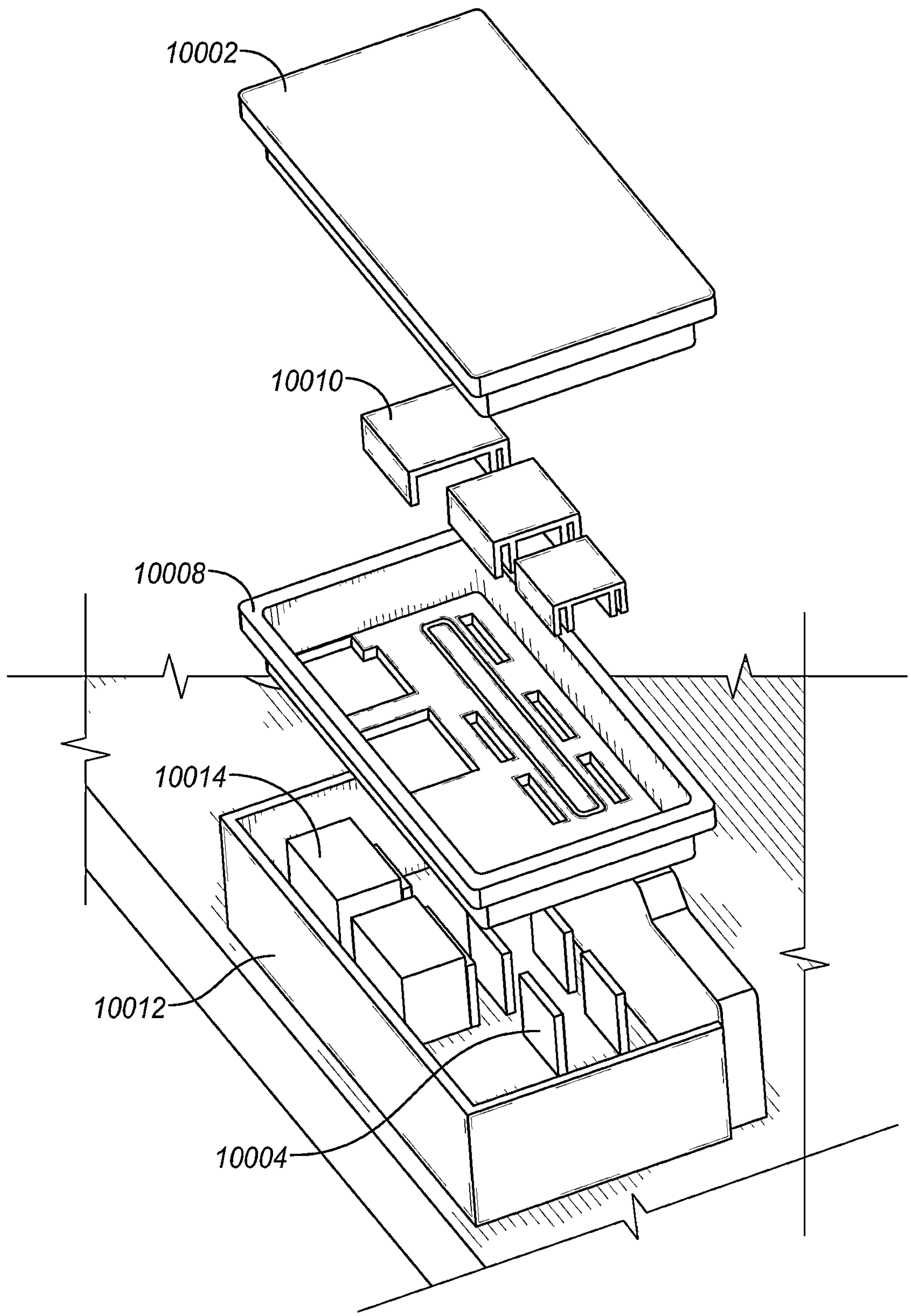
FIG. 100 depicts a vertical push service disconnect with a top plate.

FIG. 100 depicts a vertical push service disconnect with a top plate 10002. In FIG. 100, busbars from the tray 10004, gaskets/scaling 10008, connecting busbars 10010, and fuses 10014 are shown in the service disconnect device. A guide 10012 on the tray may facilitate the placement of the service disconnect device. A top plate 10002 may cover the service disconnect device.

Figure 102:
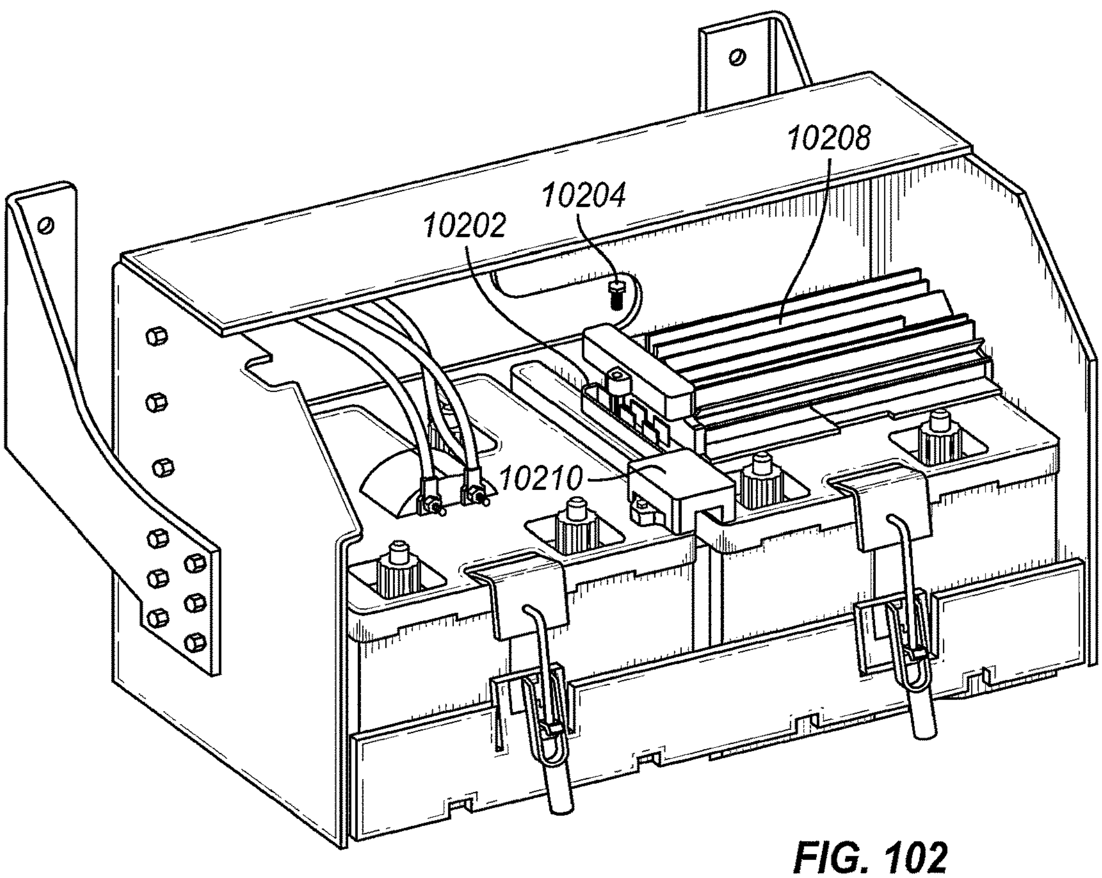
FIG. 102 depicts a vertical push service disconnect device embodiment with bolts to secure the device.

FIG. 102 depicts a vertical push service disconnect device 10202 embodiment with outside bolts 10204 to secure the device. In an embodiment, the device may help mechanically retain the DC-to-DC converter 10208. In some embodiments, connections to the tray and to the DC-to-DC device may be separated in the service disconnect device into separate areas and there may be separate sealing for each area. This embodiment also features an interconnect 10210 between battery trays.

Figure 104:
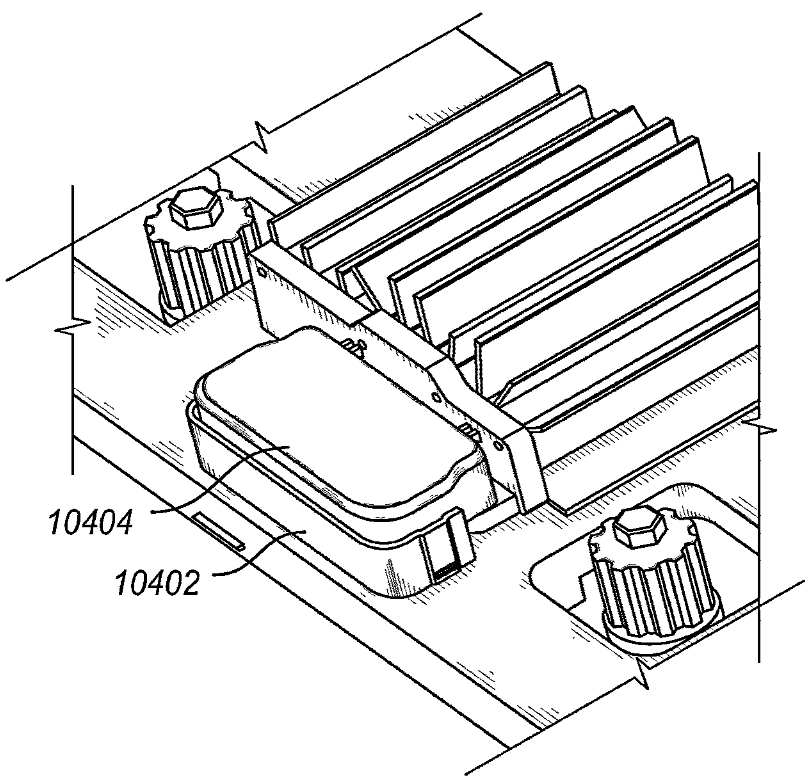
FIG. 104 depicts a vertical push, snap-fit service disconnect device embodiment.
Figure 105:
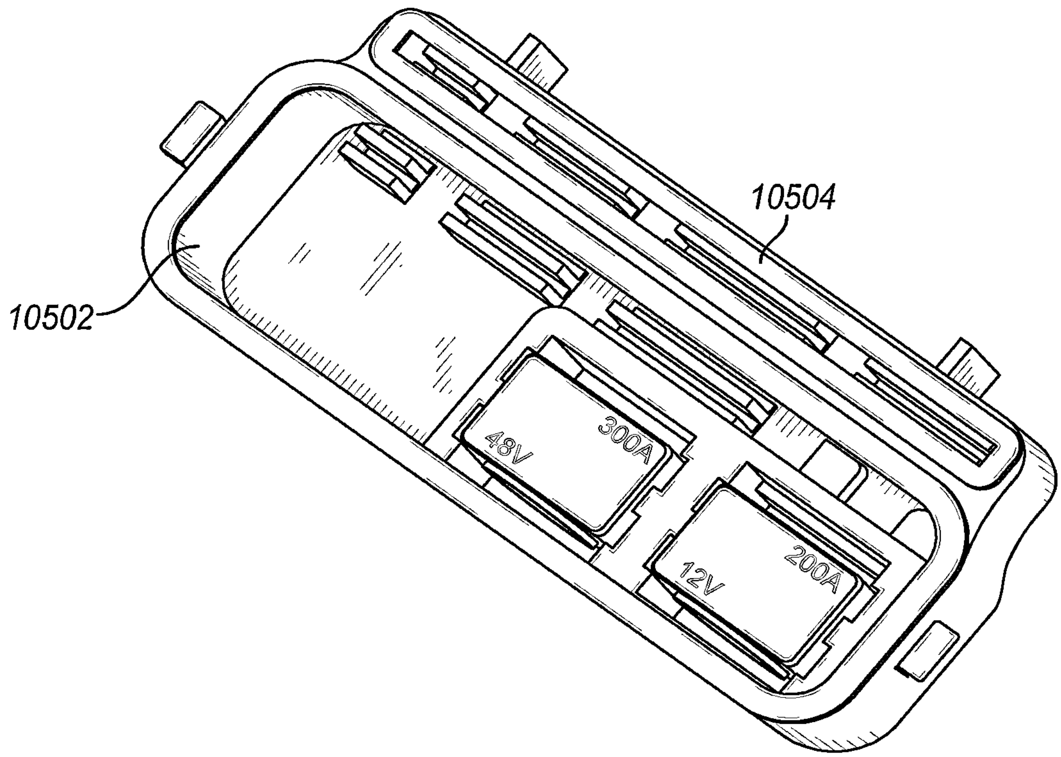
FIG. 105 depicts a vertical push, snap-fit service disconnect device embodiment

FIG. 104 and FIG. 105 depict a vertical push, snap fit service disconnect device embodiment. As shown in FIG.

104, the tray may contain a guide 10402 to facilitate seating the device 10404. FIG. 105 depicts various views of the service disconnect device with separate, sealed areas for busbar tray and DC-to-DC connections. For example, one area 10502 may have fusing while the other sealed area 10504 does not.

In some embodiments, a vertical push service disconnect device embodiment may include an inside bolt. Connectors inside the device receive busbar connections. While various examples include 12 Volt associated with 200 Amps and the 48 Volt associated with the 300 amp, the particular combination may depend on the schematic embodiments, such as if the starter is 12 Volt or 48 Volt starter, and if the fuses are protecting the DC to DC and power export, or the charging system as well. In one embodiment, an 80 amp fuse is on the 48 Volt input to the DC to DC, along with an unfused connection to the starter. Power export on 48 volts may be limited in the battery off case. In some current trucks, there is a 160 amp alternator and the DC-to-DC converter is rated to output 200 Amps continuously running 12 Volt loads not including starting for the truck. Truck crank currents may be up to 2000 amps on a diesel engine 12 Volt starter. In some embodiments, it is 1200 Amps Peak on a 48 Volt brush start.

Figure 109A:
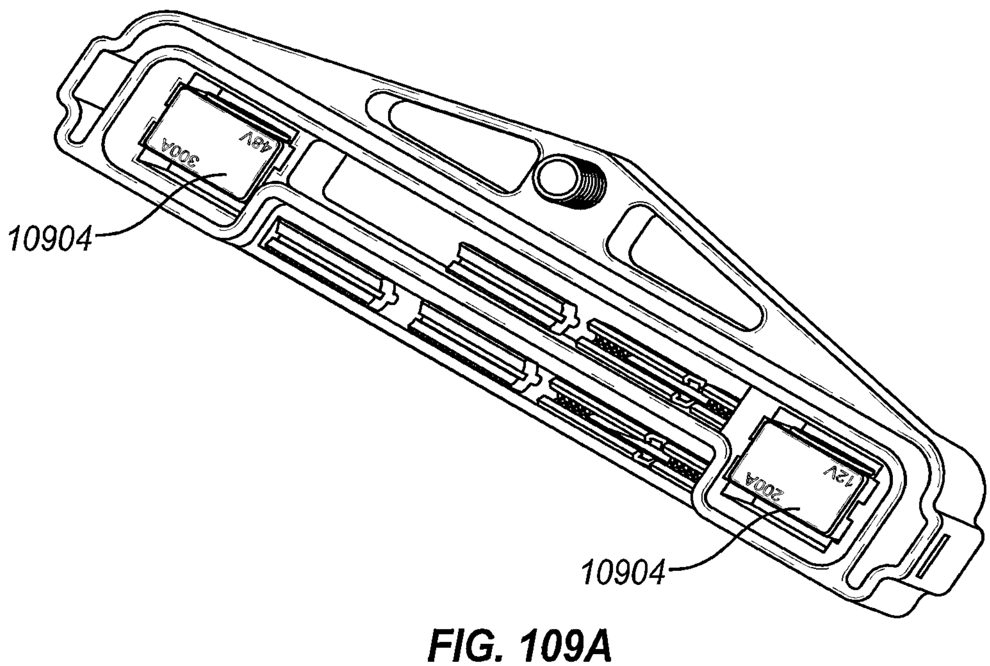
FIG. 109A and FIG. 109B depict a service disconnect device with a busbar connected through a spring connector.
Figure 109B:
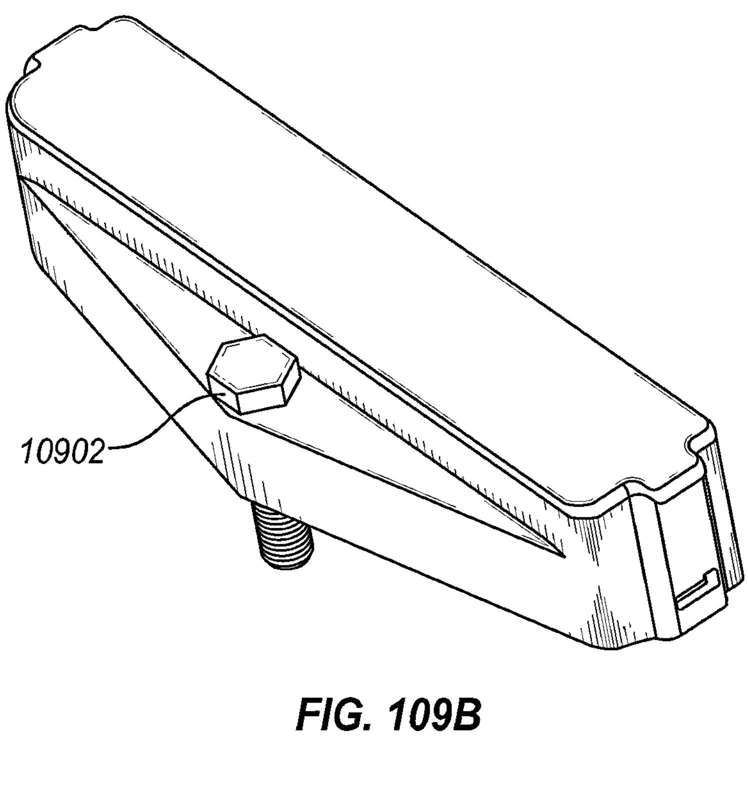

In some embodiments, the fuses 10904 may be on either end of the service disconnect device, FIG. 109A and FIG. 109B depict a service disconnect device with a busbar connected through a spring connector. In this embodiment, the bolt 10902 is placed outside of the fuse and busbar areas of the device and helps restrict movement. The 48 Volt terminal is depicted as narrower than the other terminals. This sizing is due to commonality in prototype procurement and to re-use the package for a heater controller where there is 200 amps, 48 Volt in and 200 amps at zero to 48 volts out depending on the heater current. Another embodiment may be optimized for 50-80 amps in at 48 volts, and 200 amps out, and, in accordance with Kirchhoff's current law which says that the ground current will be the difference between the two, roughly speaking, 50 amps in, 200 amps out and 150 amps at ground current is roughly what one would expect at Max load for 48 to 12V. In embodiments, the current paths may be sized for constant current density, such as by using 5 amps per square millimeter of copper cross section on the interconnect, and using the same thickness of copper and varying the width to maintain constant current density.

Figure 111:
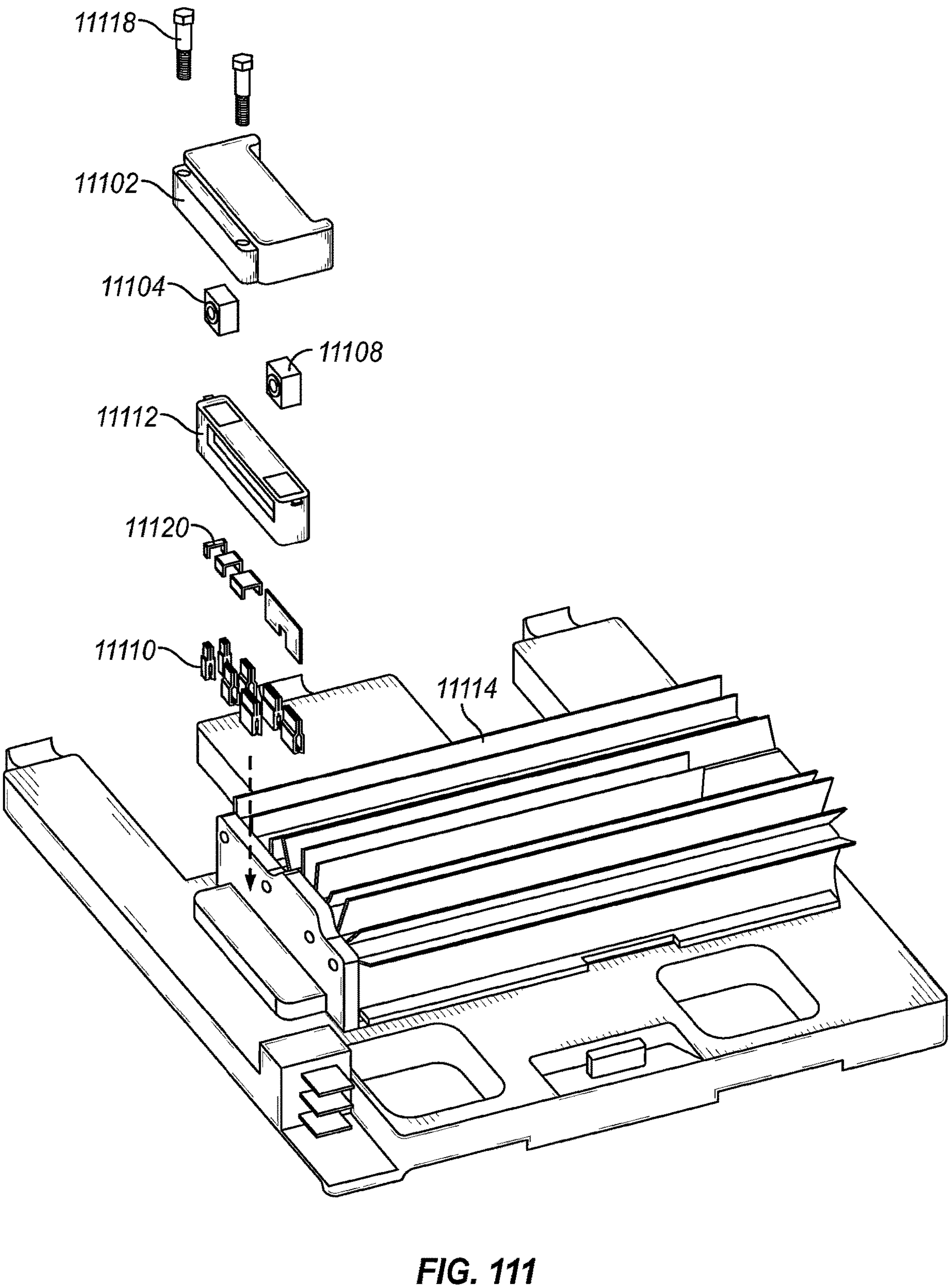
FIG. 111 depicts a service disconnect device with two housings.

In some embodiments, a service disconnect device may include two housings. The busbars and fuses may be assembled into an inner housing then bolted with an outer housing to protect from the environment. The inner housing also helps with sealing. FIG. 111 shows the service disconnect, which will disconnect the whole circuit ensuring safety during servicing, in an exploded view, and also as it is seated in its assembled state with the DC-to-DC converter. FIG. 111 depicts the service disconnect's external plastic housing 11102, a 48V fuse 11104, a 12V fuse 11108, spring connectors 11110 to connect busbars 11120 between tray and the DC/DC converter, and internal plastic housing 11112 having snap fit features and a lower sealing surface, and the DC/DC converter 11114 for 12V and 48V power. A standard bolt 11118 which can be tightened with a 9/16" wrench may be used in assembly of the service disconnect device.

FIG. 112 depicts a compact service disconnect device that may be vertically pushed and then bolted to the top tray. This embodiment is also a two part housing with bolts between housing element and for the cover connection. The internal housing 11208 may comprise spring nuts 11202 to connect with the fuse 11204, which may be challenging to maintain in compression. Busbars 11210 and associated connectors may be sandwiched between the top part 11212 and internal housing 11208. In embodiments, one of the busbars from the battery tray may make contact to the fuse directly versus sandwiching the fuse within contacts inside of the housing. In embodiments, standardized standalone connections for the fuses, or any trusted connection from the face of the fuse to some other piece of copper that already exists in the circuit, may be used in the service disconnect device.

In embodiments of the 48V battery assembly, strap belts may hold down the batteries wherein the strap belt may pass under the DC-to-DC converter.

FIG. 114 and FIG. 115A, FIG. 115B, and FIG. 115C depict vertical assembly of a service disconnect device 11400 with a guide on the DC/DC converter. In this embodiment, as shown in FIG. 114, each fuse 11402, which is vertically oriented, is bolted to a busbar 11404 with an insulator, and each of three connectors 11408 (e.g. T-type connector) to the DC-to-DC converter are also bolted together. This embodiment has an internal housing 11410 and an external housing 11412. In an embodiment, instead of field servicing the service disconnect, such as to replace a fuse, the entire service disconnect may be replaced or the core may be removed and shipped back to the manufacturer for servicing. In these embodiments, the service disconnect may be riveted together or ultrasonically welded together. In embodiments, the service disconnect device may comprise a custom fuse or a blade-type fuse, or in other embodiments, such as one where the service disconnect device is fully replaceable, the service disconnect device may also be known as the fuse element.

Figure 115A:
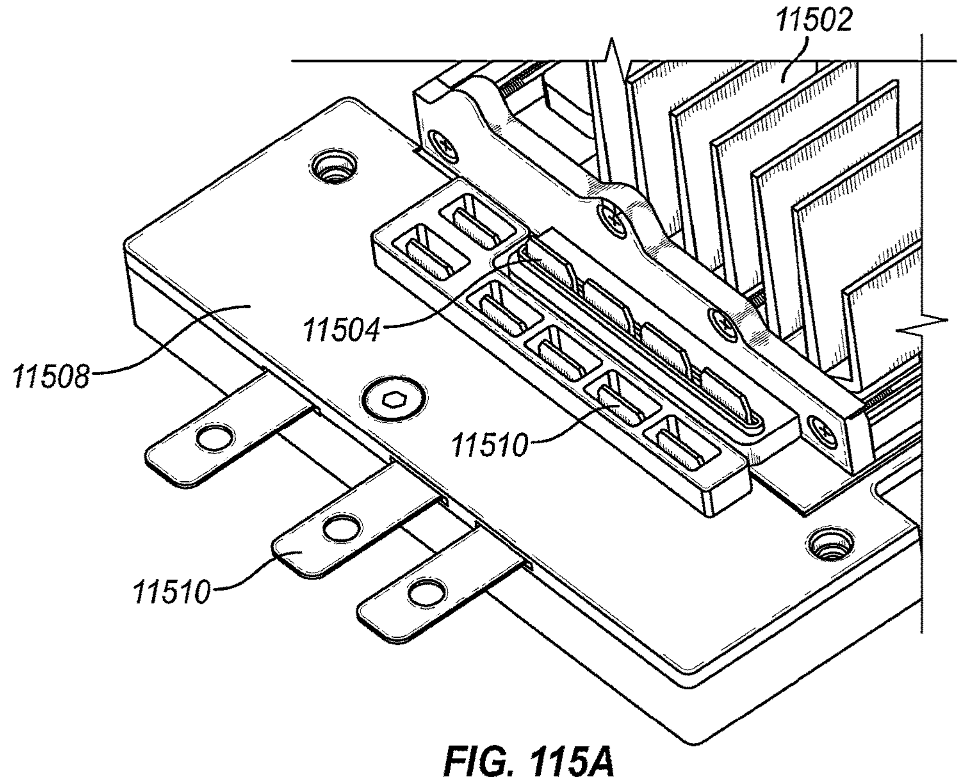
Figure 115B:
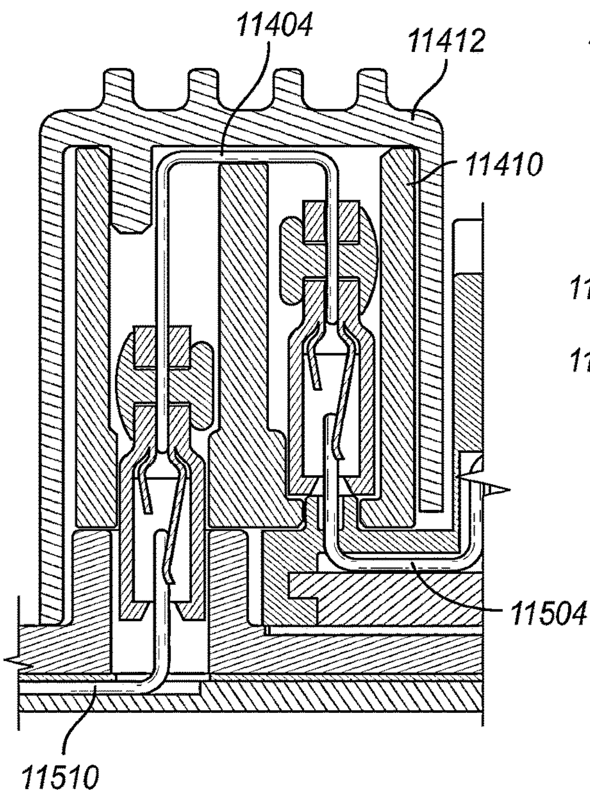
Figure 115C:
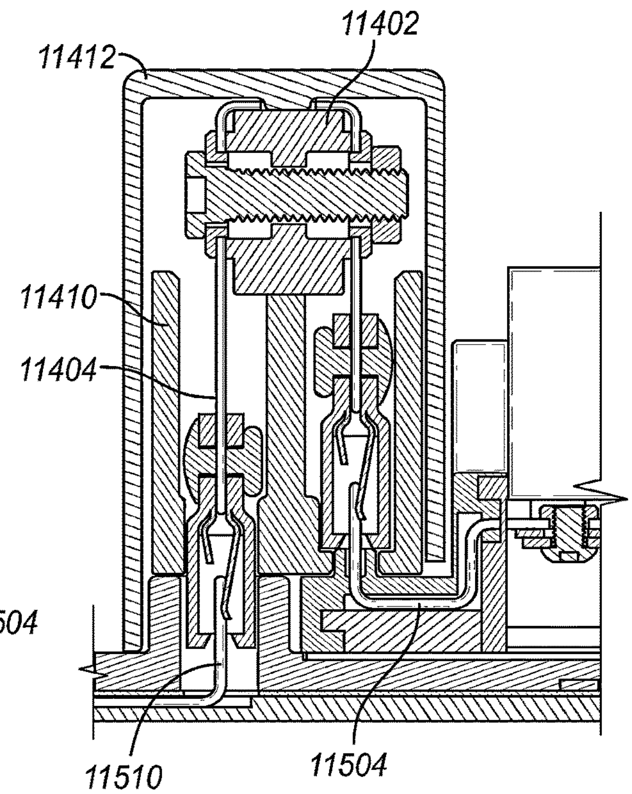

In an embodiment, the insertion force of the service disconnect device may be reduced by staging the length of the fuse blades. In embodiments, there may be a maximum insertion force for each of the busbar blades (e.g. 6 pounds), which translates to 50 to 60 pounds when all of the blades engage at the same time. However, once the spring fingers are separated in the device, the engagement force is reduced. In this embodiment where there is staging, the fuse connectors may be inserted first, then the middle three connectors may be inserted. In some embodiments, the ground connector in the center may be the first connection made and the fuse power may be the last connection to be made. As shown in FIG. 115B, the service disconnect device, and its outer housing or busbars in embodiments, may help to locate and align the DC/DC converter. FIG. 115A depicts the DC-to-DC converter 11502 with its connectors 11504 and a guide 11508 for aligning connections 11510 from the battery assembly. The battery connections are recessed in the plastic so that they are finger safe and avoid having an energized battery connection accessible with the disconnect removed. FIG. 115B depicts a side, cutaway view of the service disconnect device 11400 at the level of connectors between the DC-to-DC converter and battery assembly. FIG. 115C depicts a side, cutaway view of the service disconnect device 11400 at the level of the fusing.

Figure 117:
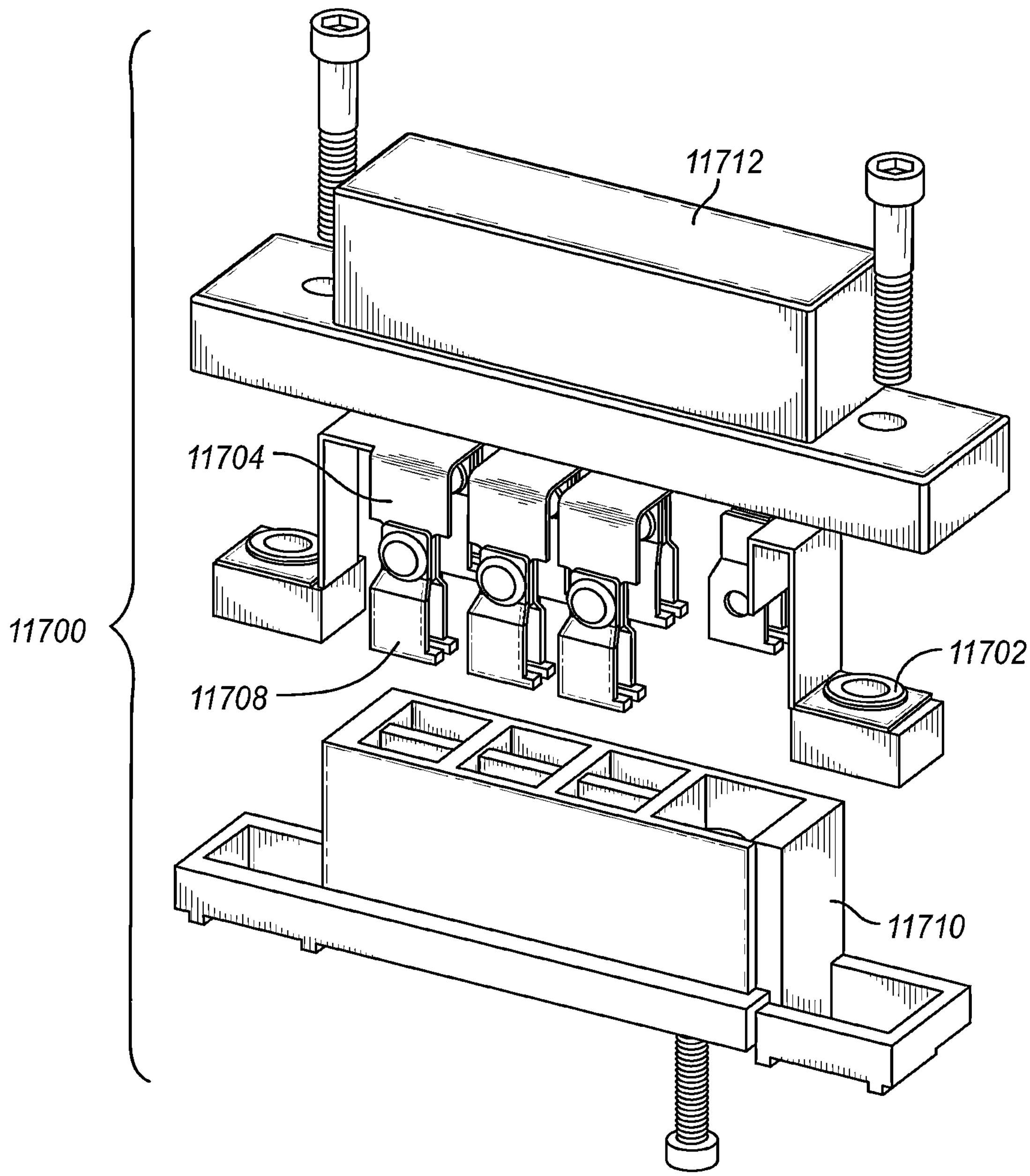
FIG. 117 and FIG. 118 depicts a service disconnect device that is vertically assembled with a horizontally placed and bolted fuse.
Figure 118:
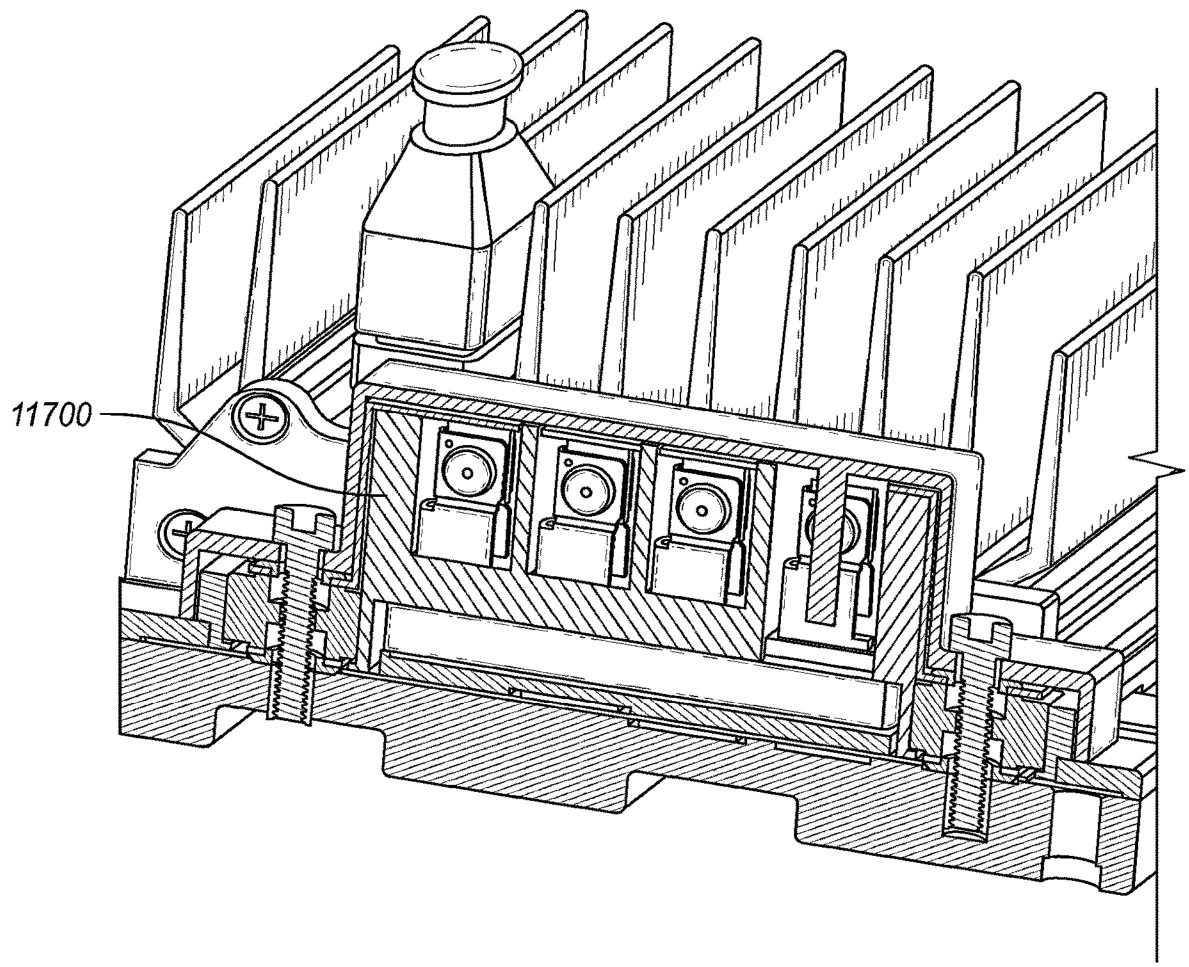

FIG. 117 and FIG. 118 depict a service disconnect device that is vertically assembled with a horizontally placed and bolted fuse that engages the surface of the tray. In this embodiment, each fuse 11702 is horizontally oriented, there are busbars 11704 with an insulator, and each of three connectors 11708 (e.g. T-type connector) to the DC-to-DC converter are also bolted together. This embodiment has an internal housing 11710 and an external housing 11712. The bolt serves at least two purposes—it secures the housing as well as ensures compression and a tight connection to the DC-to-DC busbars. The horizontal fuse placement also aids with airflow for natural convection through the heat sink of the DC-to-DC converter. In FIG. 118, the service disconnect device 11700 is shown connected to the DC-to-DC converter in a cutaway view.

Figure 119A:
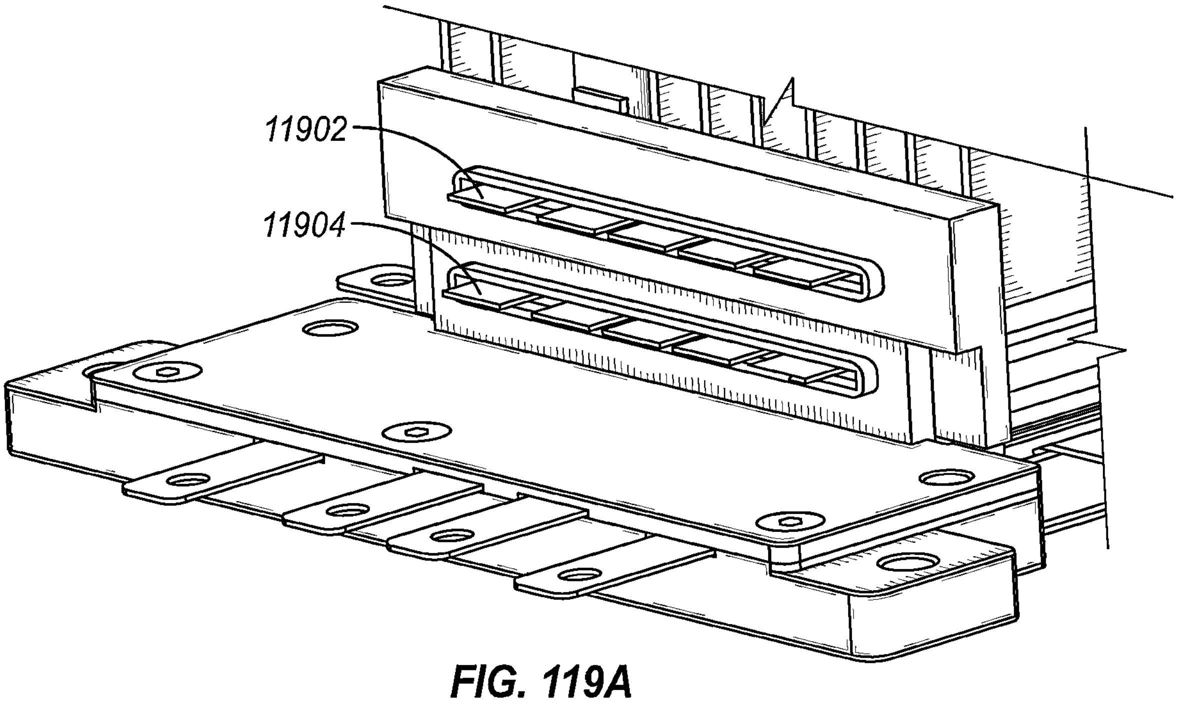
FIG. 119A, FIG. 119B, and FIG. 119C depicts a horizontally assembled service disconnect.
Figure 119B:
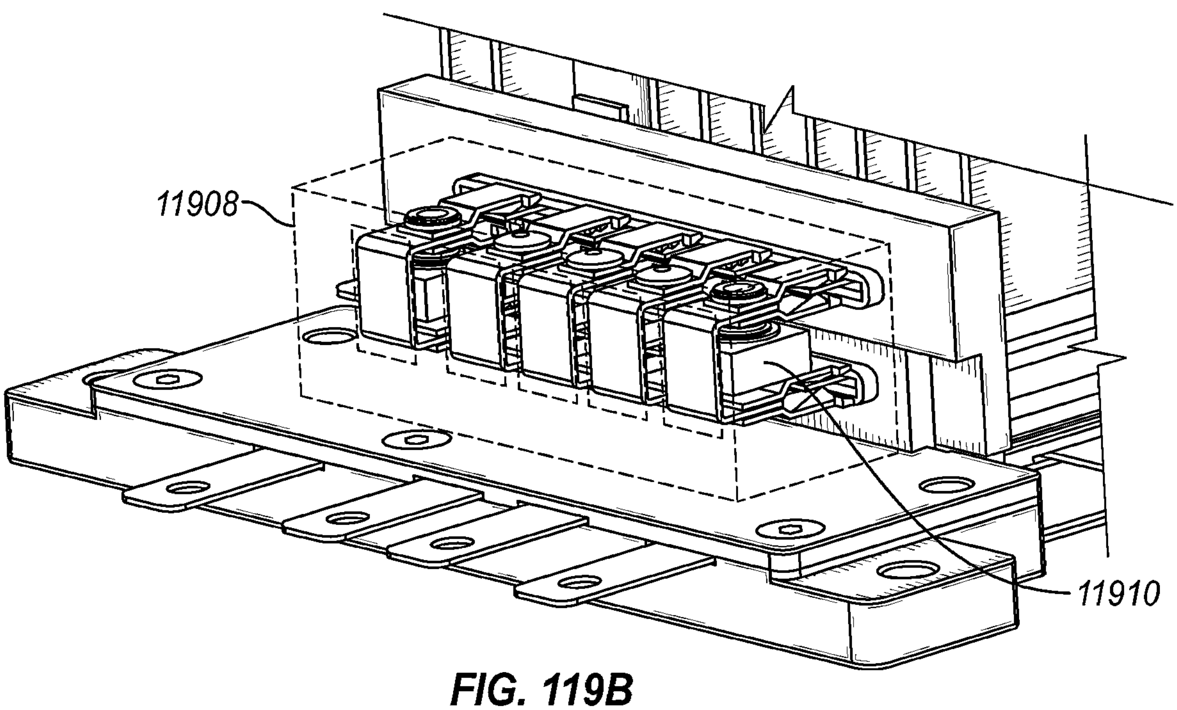
Figure 119C:
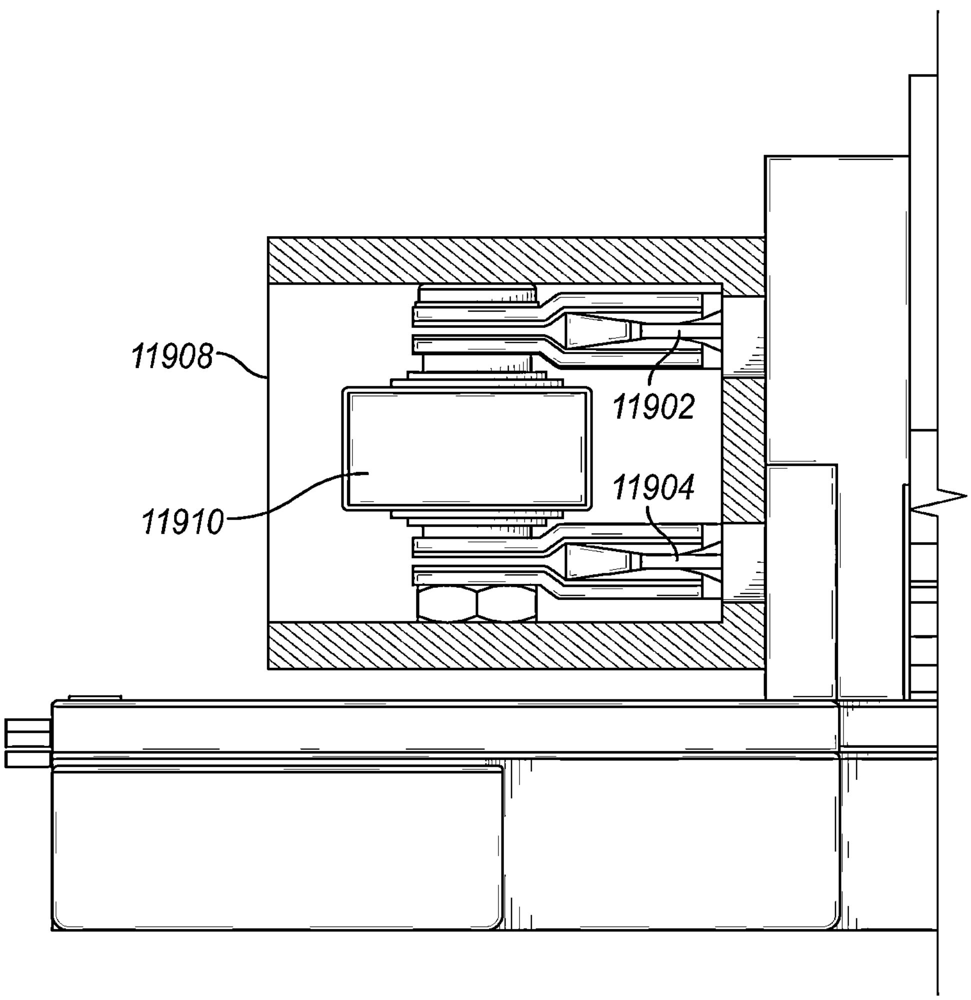

FIG. 119A, FIG. 119B, and FIG. 119C depicts the case where the service disconnect 11908 is placed horizontally with respect to horizontal terminals on the DC-to-DC converter 11902, wherein the fuses 11910 are also horizontal, as shown in FIG. 119B. An advantage of assembling in the horizontal orientation is that there is a larger sealing surface in the vertical direction, which may also simplify location and alignment. FIG. 119A depicts the horizontal connectors 11902 from the DC-to-DC converter and the horizontal connectors 11904 from the battery assembly. FIG. 119C depicts a side cutaway view of the device 11908 connected to the DC-to-DC converter.

Various integrated service disconnect and interconnect embodiments that result in safe, simple, integrated, reliable solutions for 48V batteries in commercial vehicle applications will now be described.

In some embodiments, the functionalities of an integrated service disconnect and battery tray interconnect may be embodied in a single structure. Receiving connections on the battery trays (e.g., Radsock female connectors) may have gasket/scaling placed around the connectors, plus fuses sandwiched between battery tray busbars and DC-to-DC converter busbars. A guide may be on at least one tray to facilitate seating the integrated service disconnect and battery tray interconnect device. In this embodiment, no busbars have to cross the battery tray interface. Instead, busbars may be seated inside the integrated service disconnect and battery tray interconnect device using connectors (e.g. Radsert male connectors) that connect to the aligned connector on the battery tray.

Various DC/DC converter locating and locking embodiments that result in safe, simple, integrated, reliable solutions for 48V batteries in commercial vehicle applications will now be described.

In certain embodiments, the DC/DC converter connection may be directly press fitted into the top cover only. In certain embodiments, the fuse disconnect to the DC/DC converter may be through a cam lock or a press fit and bolting. In certain embodiments, the DC/DC converter may be located location through tabs or bolts. In certain embodiments, the 48V battery assembly sequence may be structured so that the DC/DC converter cannot be disconnected before disconnecting the fuse links/power.

In some embodiments, the service disconnect must first be removed before removing the DC/DC converter.

FIG. 123A, FIG. 123B, and FIG. 123C depict an embodiment of DC/DC converter locating and locking using tabs and service disconnect. FIG. 123A depicts a two-part tray 12302 design with an insulating plate, and a silicon rubber component 12304 on top of the tray. Assembly proceeds by vertically placing the DC/DC converter 12308 down, as in FIG. 123A, and engaging tabs 12310 on the sides through cutouts on the surface of the DC/DC converter. The DC/DC converter is slid into place from the front to the rear and its rearward motion is stopped by tabs, as shown in FIG. 123B. Its motion is restricted by tabs 12310 on the rear and right side, and then gets macro-aligned or locked in place by installation of the service disconnect 12300, as in FIG. 123C, such as any of the service disconnect embodiments described herein, which restricts the leftward and vertical motion. The silicon rubber component ensures tolerance in the vertical direction due to the thermal expansion of the DC/DC converter or because of the changing tolerance of individual parts, but also facilitates sealing the service disconnect. In this embodiment, because the tabs engage the side of the DC-to-DC converter, the plastic end cap may withstand vibration well. This embodiment may include a standalone mounting tray that may be attached to the battery or frame rail or elsewhere in the vehicle.

FIG. 124 depicts the DC-to-DC converter 12402 with slots in flanges 9704 along the lower length of the extruded DC-to-DC converter to facilitate engagement with tabs 9708 shown along the length of the DC-to-DC converter on the battery tray such that the DC-to-DC converter may be slid in horizontally along the surface of the battery tray. In this embodiment, the plastic end cap of the DC-to-DC converter may need additional support to withstand vibrations. In this embodiment, an upper connector 12404 is on the opposite side of the DC-to-DC connector depicted in FIG. 97 and FIG. 98. A connector 12408 is also depicted.

It can be seen that the battery assembly arrangements described herein provide for a minimal number of electrical components, a reduced length of high-current electrical paths, protected wiring from debris, road spray, and environmental intrusion, provide enhanced air cooling to batteries, wires, power electronics, and the motor, and provides an integrated solution for ease of installation and a reduced number of integration interfaces.

Various terminal cap embodiments that result in safe, simple, integrated, reliable solutions for 48V batteries in commercial vehicle applications will now be described. Various terminal cap embodiments, which may be metal, may have the following functions or features: torque transfer to thread, slip after locking, sealing, avoid loosening due to vibrations, standard wrench size, assembly, avoid contact to external environment to prevent corrosion, and other chemical reactions (due to dirt particles) (galvanic corrosion), and shock proof (e.g. electrical insulation).

FIG. 125 depicts a summary of terminal cap embodiments. Concept 1, also shown in FIG. 133A and FIG. 133B, includes a plastic cap with metal threaded insert 13302, and may include a wedge threaded metal part 13304 and O-ring 13308, and includes the following functions: torque transfer to thread, standard wrench size, assembly, and sealing. Concept 2 includes a cap lockout and includes plastic with a metal threaded insert. Concept 2 includes the following functions and features: torque transfer to thread, sealing, avoid loosening due to vibrations, standard wrench size, and assembly. Concept 3, also seen in FIGS. 127 A-B and FIG. 133A, includes a plastic threaded bush 12702, a plastic cap with features 12704, a locking feature 12708 and sealing 12710. FIG. 127B is a view of the bottom of the embodiment. Concept 3 includes the following functions or features: torque transfer to thread, slip after locking, sealing, standard wrench size, and assembly. The plastic threaded bush has three ball type extrusions on the surface. The plastic cap has passages. When the plastic cap is rotated, it will cause the plastic bush to engage with the terminals. When the plastic bush gets completely tightened with the terminal, the extrusions will come out of the passage and slip. This will prevent overtightening of the cap. At the bottom of the cap, integrated sealing features will prevent any leakage from battery terminals. Concept 4 includes a plastic cap with metal threaded insert and spring washer and includes the following functions or features: torque transfer to thread, sealing, avoid loosening due to vibrations, standard wrench size, and assembly. Concept 5, also shown in FIGS. 128 A-C, includes a stainless steel nut with cap 12802 and self-sealing/spring washer or self sealing lock washer 12804 and includes the following functions or features:

torque transfer to thread, sealing, avoid loosening due to vibrations, standard wrench size, and assembly. Using self sealing lock washers will ensure scaling and locking. FIG. 128B and FIG. 128C depict different views of the stainless steel nut with cap 12802. Stainless steel nut with crown caps are readily available and close down the terminal completely. Concept 6, also shown in FIGS. 129 A-B, includes a stainless steel nut as an insert with plastic cap 12902 and self sealing/locking nut 12904 shown in place and stand alone in FIG. 129B, and includes the following functions or features: torque transfer to thread, scaling, avoid loosening due to vibrations, standard wrench size, and assembly. The locknut with integrated seal can be inserted in the plastic mold to have a plastic cap over it. When the cap is tightened on the terminal, the nut will engage and ensure both sealing and locking at the same time.

FIG. 133B depicts an embodiment with cap locknut 13310 and plastic with threaded metal insert 13312.

Figure 126A:
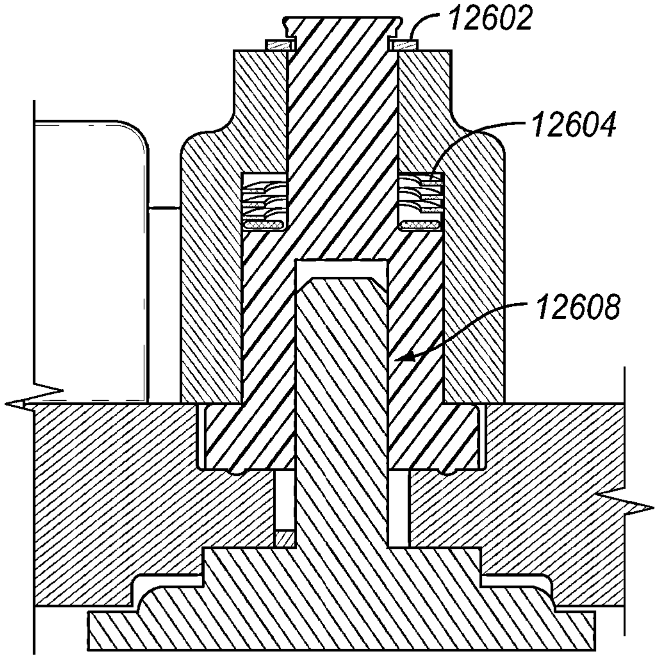
Figure 126B:
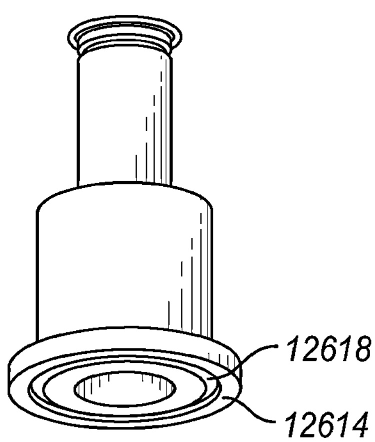
Figure 126C:
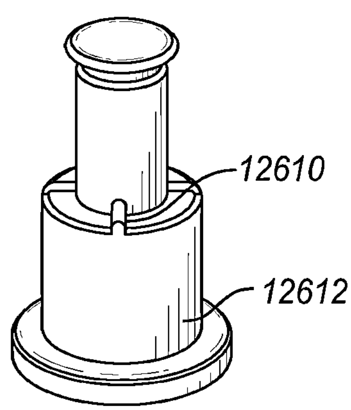
Figure 126D:
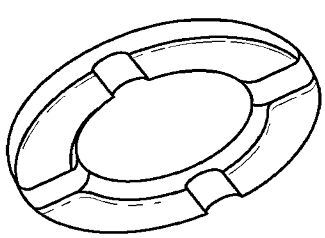
Figure 126E:
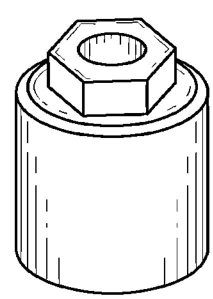

FIG. 126A depicts a terminal cap embodiment which can be threaded to a battery terminal, prevent leakage from the terminal and prevent thread damage of terminal due to overtightening (e.g. torque-limited). This terminal cap includes a clamp plate 12602, wave spring 12604, ⅜"×16 threads 12608, serrations 12610 on a threaded plastic part 12612 as shown in FIG. 126C, a serrated plate in FIG. 126D, a ⅜" nut in FIG. 126E, and FIG. 126B depicts a sealing feature 12614 with a wavy feature 12618 at bottom. When the nut is rotated with the help of a standard 9⁄16 wrench, the wave spring will apply pressure on the serrated plate and cause the serrated plate to rotate inside the threaded part and engage with terminal threads. Once the threaded part gets locked with the terminal, the serrated plate will start slipping to avoid overtightening of threads. The clamp plate will hold the nut at its position. The wavy feature at the bottom will act as a locking feature for the threaded part. A scaling feature of the threaded plastic part will help to seal leakage from the battery terminal.

FIG. 130A and FIG. 130B depict another torque limited terminal cap featuring a clamp plate 13002, wave spring 13004, serrated plate 13008 (and standalone in FIG. 130B), nut 13010, threaded plastic part 13012, and a wavy feature 13014 at bottom. When the nut is rotated with the help of a standard 9⁄16 wrench 9⁄16, the wave spring will apply pressure on the serrated plate and cause the serrated plate to rotate inside the threaded part and engage with terminal threads. Once the threaded part gets locked with the terminal, the serrated plate will start slipping to avoid overtightening of threads. The clamp plate will hold the nut at its position. The wavy feature at the bottom will act as a locking feature for the threaded part.

FIG. 131A and FIG. 131B depict another torque limited terminal cap featuring a clamp cap 13102, a nut 13104, a threaded plastic part 13108, and a wavy feature 13110 at bottom. FIG. 131B depicts a bottom view of the embodiment shown in FIG. 131A. When the nut is rotated, the wavy feature inside nut will rotate the threaded plastic part. Once the threaded part gets locked with the terminal, the wavy feature will start slipping to avoid overtightening of threads. The clamp cap will hold nut at its position. The wavy feature at bottom will act as a locking feature for the threaded part.

FIG. 132A and FIG. 132B depict another torque limited terminal cap featuring a clamp cap 13202, wave spring 13204, serrated plate 13208 (also in FIG. 132B), nut 13218, plastic part 13210, metal insert 13212, and wavy feature 13214 at the bottom. The metal insert may be molded in the plastic part.

When the nut is rotated, the wave spring will apply pressure on the serrated plate and cause the serrated plate to rotate inside threaded part. Once the threaded part gets locked with the terminal, the serrated plate will start slipping to avoid overtightening of threads. A clamp plate will hold the nut at its position. The wavy feature at bottom will act as a locking feature for the threaded part.

FIG. 134A, FIG. 134B, and FIG. 134C depict terminal cap sealing using a threaded insert 13404 inside a plastic cap 13402 and an O-ring 13408. FIG. 134A is the embodiment of FIG. 134B with the insert 13404 and O-ring 13408 in place. FIG. 134C depicts the embodiment of FIG. 134A in place on a battery terminal.

Various embodiments relate to a driveline PTO system and related method for operating a motor/generator with management of system power including power management during hoteling and/or non-motive operation.

FIG. 135 is a top-level schematic block diagram for a system including a driveline PTO device 13502 of the present disclosure. The example system includes a prime mover 13504 (e.g., an internal combustion engine) and a transmission 13508 which provides selectable gear ratios between the prime mover and a load, such as a motive load 13510 (e.g., wheels, tracks, and/or a driveline of a vehicle). The example system includes a clutch 13512 positioned between the prime mover and the transmission, which can selectively disengage the prime mover from the transmission. In certain embodiments, the system may be referenced as a hybrid vehicle, a light hybrid vehicle, or the like.

The example system includes a shift assist 13514, such as an inertial brake for the transmission, although any other shift assist device is contemplated herein. Certain operations of a PTO device as described herein provide for the ability to adjust shift events for a transmission, such as speeding up a shaft, slowing down a shaft, and/or synchronizing shaft speeds. Operations of the PTO device may cooperate with, replace, and/or provide for greater capability for a shift assist device. In certain embodiments, the shift assist device, the clutch, and/or the transmission (e.g., the transmission shifting actuator) may be pneumatic.

The example system includes a PTO device. In the example of FIG. 135, the PTO device includes several components, including a coupling device 13518, a gear box 13520, a motor/generator (M/G) 13522 and one or more battery packs 13524. A given PTO device may omit one or more components (e.g., the gear box and/or the coupling device), and/or may have a different arrangement of components. In certain embodiments, a power management apparatus is provided as one or more aspects of a controller 13526, sensors, actuators, and/or communications (e.g., a CAN, vehicle network, and/or wireless communications), and the power management apparatus may include one or more components of the PTO device, or omit all components of the PTO device.

The example coupling device couples a driveline and/or main torque line of the prime mover to the other components of the PTO device. For example, the coupling device may include one or more idler gears engaged with a gear in the transmission, a chain, a jack shaft, and/or combinations of these. An example coupling device engages a countershaft of the transmission, and may further engage the countershaft of the transmission at a PTO interface (e.g., an access at the side or rear of the transmission). Any other arrangement to couple the PTO device to the driveline and/or main torque line of the prime mover is contemplated herein. It will be understood that certain aspects of the present disclosure may not be available if the PTO device engages the driveline at a position that is upstream of the clutch, or otherwise not in torque communication with a countershaft or the transmission main shaft. In certain embodiments, certain other aspects of the present disclosure may be available, and accordingly other coupling positions are contemplated herein. The term PTO device is used herein for convenience and clarity of description. Where the PTO device is coupled to the driveline and/or main torque line of the prime mover at a position other than a PTO interface to the transmission, the PTO device may be referenced as some other term than a PTO device, but are contemplated within the meaning of a PTO device for consistency of the present description.

The example gear box includes an actuator of any type that is capable to provide torque coupling between the driveline (e.g., via the coupling device) and the M/G at more than one gear ratio. In certain embodiments, the gear box may provide torque coupling at only a single ratio, in only a single direction (e.g., with a slipping clutch or the like), and/or may provide for selected disconnection. In certain embodiments, the gear box may be omitted, with the M/G coupled to the driveline directly with the coupling device, and/or only with a clutch. The selected available gear ratios in the gear box depend upon the torque and speed operations of the prime mover, the gear ratios in the transmission, the torque and speed capabilities of the M/G, and the desired operations and features of the PTO device. An example gear box provides a first torque ratio between the M/G and the driveline for motive power operations of the M/G (e.g., the M/G starting the prime mover, or “crank” mode; the M/G powering the motive load, a “creep” mode; and/or the M/G providing shift assist operations, or “shift” mode), and a second torque ratio between the M/G for electrical power operations of the PTO device (e.g., a “motive” mode, “cruise” mode, or “drive” mode while the vehicle is moving, which may be used to regeneratively charge the battery pack, and/or provide for a minimum torque disturbance to the driveline from the M/G), and/or operations to power the shared load 13528 (e.g., a “sleep” mode, or other shared load powering mode). In certain embodiments, the gear box and/or other components in the system can selectively couple the M/G to the driveline, the M/G to the shared load, the shared load to the driveline (and/or directly to the prime mover, such as an HVAC operating from a belt), and/or combinations of these. The actuator(s) for the gear box, such as sliding clutches, shift forks, or any other type of actuator, may be powered by any known source, including pneumatic, hydraulic, and/or electric. An example system includes the gear box having electrically actuated actuators, while the clutch and/or transmission include one or more pneumatic actuators.

The example M/G may be any type of motor and/or motor generator. In certain embodiments, for example where the M/G provides torque to the transmission and/or the shared load, but does not accept torque from the transmission, the M/G may be a motor only (e.g., where the battery pack is re-charged using shore power or another mechanism). In certain embodiments, the M/G is capable to provide torque to the transmission and/or the shared load, and to receive torque from the transmission and/or the shared load (e.g., to regenerate the battery pack, and/or to recover energy from the shared load). In certain embodiments, the M/G is additionally capable to operate in a motoring mode, whereby received energy is dissipated—for example to provide for braking operations or the like where the battery pack is not capable to receive regenerative energy (e.g., if the battery pack is fully charged. The M/G may be any type, including permanent magnet, induction, or any other type of motor.

The example battery pack is depicted as a 48V battery pack, which may be one or more packs of 12V batteries, with a 12V vehicle system connection (a “quarter-tap” where each battery pack includes 4 12V batteries). The M/G voltage and/or vehicle system voltage may be any values according to the specific system, and the depicted voltages are examples for illustration. In certain embodiments, the connection to the vehicle system power may be omitted, and/or the battery pack may be used to replace or supplement the primary vehicle system voltage battery. The vehicle system connection power may be the same power environment that the keyswitch and/or other low voltage accessories are operated on. In certain embodiments, the battery packs may be lead-acid batteries, and/or may be glass mat (AGM) lead-acid batteries. In certain embodiments, the battery packs may all have the same battery chemistry, and/or each battery pack may have a consistent chemistry that may be distinct from the battery chemistry of an offset battery pack. The number of batteries in each pack, the connection arrangement (e.g., series and/or parallel), the actuators available to switch connection arrangements (e.g., isolating battery packs and/or individual batteries, changing output voltages, and/or changing current capacities) may vary with the planned capability of the system. The M/G and/or the battery pack(s) may have associated power electronics—such as an inverter to configure the power from the battery pack to the characteristics of the motor (e.g., matching number of phases, frequency, etc.), a rectifier to configure the power from the M/G to the characteristics of the battery pack(s), and/or DC/DC converters to change voltages within the PTO device and/or vehicle. Additional electronics may be provided, for example to provide filtering, isolation, sensing of current, voltage, phase, and/or frequency characteristics of various power connections, and the like. In certain embodiments, the system and/or PTO device include a shore power interface 13530—for example to allow for charging and/or powering devices on the system from a charging station (e.g., an AC plug at a truck stop). Where a shore power interface is included, the power electronics may be further capable to configure shore power for the electrical characteristics of the system, and/or dedicated power electronics for interfacing with shore power and/or a charging station may be provided.

The shared load 13528 may be a load of any type that is capable to be selectively powered by the prime mover or a vehicle electrical system, and alternatively or additionally by the M/G during certain operating conditions. An example shared load includes an HVAC for climate control of a vehicle cab. In certain embodiments, the shared load additionally or alternatively includes accessories for the vehicle (e.g., a fan, power steering, water pump, oil pump, etc.) and/or cab power accessories (e.g., outlets and/or powered devices in the cab, such as a microwave, convenience outlets, CPAP machine, television, etc.). The example shared loads are non-limiting and provided for purposes of illustration.

The example system includes a controller having one or more circuits configured to functionally execute the operations of the controller. An example controller is in communication with any device throughout the system, and/or further in communication with any sensor or actuator throughout the system. In certain embodiments, a sensor or actuator forms a part of the controller. In certain embodiments, a sensor or actuator is in communication with the controller, but is a separate component from the controller. The controller is schematically depicted as a single, separate component for purposes of illustration. Example controllers may be distributed, with aspects of the controller associated with one or more computing devices distributed throughout the system (e.g., a vehicle controller, engine controller, and/or transmission controller) with elements combined to form a logical construct making up the controller. In certain embodiments, the controller and/or aspects of the controller may be provided in a housing with the M/G, the battery pack, and/or the power electronics of the system, although aspects of the controller may be provided anywhere in the system. Any configuration of the controller is contemplated, and the current description references the controller as a separate component for clarity of the description in setting forth the operations and properties of the controller.

FIG. 136 is a schematic block diagram of an apparatus for controlling start-up operations for a mobile application. The example apparatus includes a controller 13602 having a start-up management circuit 13604 configured to perform certain operations in relation to a start-up of the vehicle and/or the prime mover of a system—for example a system consistent with the system depicted in FIG. 135. The example apparatus further includes a start-up calibration circuit 13608.

Example operations of the start-up management circuit include operations to support a start-up operation of the vehicle and/or the prime mover. Example operations include an operation to avoid interference of the M/G with the driveline during start operations, such as de-coupling the M/G from the driveline (e.g., with a clutch), and/or to reduce the impact of the M/G during start operations. Example operations to reduce the impact of the M/G include eliminating or reducing the torque of the M/G relative to the driveline, such as turning the M/G at an appropriate speed such that zero torque and/or reduced torque is provided between the driveline and the M/G, and/or reducing the rotating inertia of the M/G (e.g., turning of an energizing coil of the M/G, where present, and/or selecting a gear ratio with the gear box that reduces the impact of the M/G on the driveline). In certain further embodiments, example operations include utilizing the M/G to assist in the start event, such as utilizing the M/G to turn the transmission (and coupled prime mover) to reduce the start-up time, start-up required torque, and/or to provide for a desired speed-time trajectory for the prime mover. In certain further embodiments, the M/G may be utilized as a starting motor (e.g., in place of a standard starter and/or alternator/starter) for the prime mover.

In certain embodiments, the start-up management circuit performs operations to assist the start event by providing a starting torque to turn the prime mover with the M/G, and further adjusting a fueling scheme of the prime mover during start events. For example, a nominal fueling scheme for the prime mover may involve beginning fueling of the prime mover at a target speed (e.g., 200 RPM). Previously known systems provide excess fueling during start events to ensure that the prime mover progresses from the initial fueling speed to the target speed (e.g., an idle speed for the prime mover). Previously known systems result in an overshoot of the prime mover speed (e.g., an overshoot to a higher speed than the target idle speed), and further can result in increased emissions (e.g., where the air/fuel ratio may not be correct for emissions control), difficulty starting in off-nominal conditions (e.g., cold ambient temperatures, low ambient air pressures, and/or cold lubricant fluids), which can affect emissions compliance and/or require that other operating conditions 13612 (e.g., normal driving operation) have a lower emissions target to make up the difference for the effect of start-up emissions. In certain embodiments, adjustments to the fueling scheme include one or more of the following operations: start fueling at a lower or higher speed than previously known operations (e.g., starting fueling at 150 RPM or 300 RPM, instead of a nominal 200 RPM); ramp in fueling with a soft start to reduce emissions and/or NVH (noise, vibration, and harshness) such as a lower fueling amount tailored to smooth and/or low emissions operation instead of just required torque to successfully progress to the idle speed; and/or withholding fueling until the target idle speed is reached (e.g., the M/G brings the prime mover to full idle speed before prime mover fueling is started). The selected fueling scheme may additionally or alternatively be selected according to present operating conditions, such as an engine block temperature, engine lubricant temperature, ambient temperature, and/or ambient air pressure. The selected fueling scheme may additionally or alternatively be selected according to a duty cycle of the vehicle (e.g., light haul stop-and-go versus heavy long haul operations), a present state-of-charge (SOC) of the battery pack(s), and/or an elapsed time since a last operating time of the prime mover (e.g., sitting in two minutes of traffic, an overnight off period, and/or sitting for an extended period).

The example controller includes a start-up calibration circuit that performs and/or assists in performing certain calibration operations of the system, including transmission related calibration operations. An example start-up calibration circuit is configured to perform operations to determine or assist in determining parameters for the clutch and/or for the shift assist component.

For example, a system may perform a calibration to determine a clutch touch point (e.g., a position where the clutch begins to exhibit significant torque coupling between the prime mover and the transmission), a clutch engagement point (e.g., a position where the clutch is fully engaged, or is not significantly slipping thereby enforcing a same rotating speed between the prime mover and an input shaft of the transmission), and/or a clutch engagement trajectory (e.g., a relationship between the clutch position and engagement torque of the clutch, that may be determined at several positions). Previously known systems rely upon pneumatic actuators to perform calibration operations for the clutch, which suffer from slow response times and low accuracy in determining the actuator position and/or engaging torque. The M/G provides for both a highly responsive torque application, and a high accuracy torque application. Accordingly, the use of the start-up calibration circuit improves both the time required to perform the clutch calibrations, and the accuracy of the clutch calibrations.

In another example, a system may perform a calibration to determine a shift assist component touch point, engagement point, and/or engagement trajectory. Similar to a pneumatic clutch actuator, previously known systems suffer from slow response times and low accuracy in determining the actuator position and/or engaging torque of the shift assist component (e.g., an inertial brake). The M/G provides for both a highly responsive torque application, and a high accuracy torque application. Accordingly, the use of the start-up calibration circuit improves both the time required to perform the shift assist component calibrations, and the accuracy of the shift assist component calibrations.

In another example, a system may perform a calibration to determine a rotational inertia of one or more transmission components, and/or to determine a drag amount of one or more transmission components. For example, during start-up operations, components of the transmission may be powered utilizing a known torque (or torque trajectory), where the acceleration of the component(s) may be utilized to determine the rotational inertia of the component(s). In another example, during start-up operations, components of the transmission may be allowed to decelerate, where the deceleration of the component(s) may be utilized to determine the drag amount of the component(s).

In certain embodiments, operating conditions such as cold ambient temperatures make pneumatic actuators less responsive and/or less accurate. Operating conditions such as cold lubricant may increase the rotational forces, which results in an increased amount of time to successfully execute calibration operations for low capability systems. Accordingly, the utilization of the M/G to assist and/or perform calibration operations may depend upon the operating conditions, for example to utilize the M/G and/or increase utilization of the M/G for conditions that render pneumatic actuators less capable or incapable to perform calibration operations within an acceptable time and accuracy.

The example controller interprets operating conditions 13612 (e.g., ambient air temperature, ambient air pressure, prime mover speed, prime mover speed targets, prime mover fueling, lubricant temperature, keyswitch status, etc.) to support operations of the start-up management circuit and/or the start-up calibration circuit, and provides PTO gear box commands 13614 and/or M/G commands 13618 to execute the operations of the start-up management circuit and/or the start-up calibration circuit. The example operating conditions and/or commands are illustrative and non-limiting examples. It can be seen that operations of the controller as depicted in FIG. 136 provide, in certain embodiments, one or more of the following: improved calibration time and/or accuracy; reduced emissions during start events and calibration events; enhanced capability to succeed in performing calibrations and/or start events across a broader range of operating conditions; reduced interference with mission activities during calibrations and/or start events (e.g., a reduced time between keyswitch ON and ability to perform mission functions such as vehicle movement); and/or improved operator perception of the system (e.g., reduced start-up and/or calibration time, reduced NVH, and/or improved consistency of start events and/or calibration events).

The example controller in FIG. 136 further includes a shift assistance circuit 13610 configured to perform certain shift assistance operations.

An example shift assistance circuit performs a shift assistance by providing for a zero or reduced torque impact of the M/G to the driveline during a shift event. For example, when a shift event is performed in the transmission, a rotational speed of a target gear may be matched or partially matched before a shift is completed (e.g., before the target gear is fully engaged). The speed of the target gear may, in certain embodiments, be a shaft speed associated with the target gear (e.g., where all gears are engaged on a countershaft, the target gear may be speed-matched all the time, but the rotationally separate associated shaft may spin at a different speed until the shaft is rotationally coupled to the target gear). Similarly, the engagement of a target gear may be the rotational coupling of an associated shaft to the target gear, rather than a movement associated with the target gear itself. During a shift event, the speed synchronization may be performed by one or more of: allowing an overspeed component to slow down toward the target speed (e.g., utilizing drag and/or a shift assist component such as an inertial brake); and/or accelerating an underspeed component toward the target speed (e.g., utilizing a synchronizer cone, clutch slipping, or the like). In the example depicted in FIG. 135, the M/G may be engaged with the transmission during a shift event, providing additional drag torque to the transmission, and accordingly changing the shift event. Accordingly, the M/G may be de-coupled from the transmission, and/or effectively de-coupled from the transmission, during a shift event. Example operations to de-couple the M/G from the transmission include providing a M/G command that: matches the M/G speed to the coupled transmission component speed (e.g., a countershaft gear; "matching" the speed may include accounting for gear ratios); that has a reduced speed difference between the M/G speed and the coupled transmission component speed; and/or providing a M/G speed that provides for zero torque transfer between the M/G and the coupled transmission component (e.g., a matched speed, accounting for backlash, sitting on a selected side of a backlash gap, or the like).

An example shift assistance circuit performs a shift assistance by providing for an improved speed matching between components in the transmission. For example, the shift assistance circuit may provide a M/G command that provides for a more rapid acceleration or deceleration of a transmission component to achieve a target speed in a shorter time period. In another example, the shift assistance circuit may provide a M/G command that provides for a more accurate target speed match of the transmission component, for example due to the higher resolution speed determination capability of the M/G compared to speed determination sensors ordinarily available within a transmission for various shafts and other components. In certain embodiments, the inclusion of the shift assistance circuit may provide the ability to omit one or more shaft or component speed sensors within the transmission, and/or to reduce a cost of one or more shaft or component speed sensors (e.g., having a reduced resolution, accuracy, and/or valid operating range). The operations of the shift assistance circuit may be combined with, and/or coordinated with, other shift assistance operations (e.g., an inertial brake, and/or clutch manipulation operations). In certain embodiments, operations of the controller depicted in FIG. 136 may provide for improved diagnostic and/or fault handling capability (e.g., utilizing the high resolution and responsive M/G speed detection, and/or the high resolution and responsive M/G torque determination), and/or may be utilized as a back-up operation for one or more aspects of the transmission (e.g., within the fault handling response tree for an inertial brake or other component, providing back up capability to continue the mission or to move the vehicle to a more desirable location such as off of a roadway).

FIG. 137 is a schematic block diagram of an apparatus for controlling start-up and/or shut-down operations for a mobile application. The example apparatus includes a controller 13702 having a start-up implementation circuit 13704 configured to perform certain operations in relation to a start-up of the vehicle and/or the prime mover of a system—for example a system consistent with the system depicted in FIG. 135. The example apparatus further includes a shut-down implementation circuit 13708 configured to perform certain operations in relation to a shut-down of the vehicle and/or the prime mover of the system. In certain embodiments, a system utilizing one or more aspects of the apparatus in FIG. 137 further includes a position sensor and/or a speed sensor for the M/G, and/or an air pressure sensor to determine an air pressure condition for an air storage tank on the vehicle that is utilized to operate one or more actuators on the system.

The example controller includes a shut-down implementation circuit that performs and/or assists in configuring the system to ensure that torque can be transmitted between the M/G and the prime mover on a subsequent start-up of the vehicle or prime mover. For example, the shut-down implementation circuit may include clutch controls, and/or may communicate with another controller (e.g., a transmission controller), to ensure that the clutch is positioned to couple the prime mover to the transmission at shut-down. In a further example, the shut-down implementation circuit may include transmission gear shift controls, and/or may communicate with another controller, to ensure that the transmission is engaged in a gear that allows the M/G to turn the prime mover acceptably to initiate a prime mover start at shut-down. In certain embodiments, the shut-down implementation circuit may be configured to position the gear box in a neutral position such that torque is not transmitted from the driveline to the M/G during a shut-down period, for example allowing the M/G to power the shared load or other components during the shut-down period, without transferring torque to the driveline. In certain embodiments, the may include transmission gear shift controls, and/or may communicate with another controller, to ensure that the transmission output shaft is de-coupled from the prime mover at shut-down (e.g., disengaging the input shaft from the main shaft, and/or disengaging the main shaft from the output shaft, depending on the desired configuration and the available configurations). Additionally or alternatively, the shut-down implementation circuit may be configured to position the gear box in a position such that torque is transmitted from the driveline to the M/G during a shut-down period (e.g., where another power source such as shore power is available for the shared load, and/or where the shared load is not powered during the shut-down period). In certain embodiments, actuators for the clutch and/or transmission are pneumatic, while actuators for the gear box and/or M/G are electric, and accordingly the operations of the shut-down implementation circuit provide for the ability to start the prime mover even is air pressure is not present at the time of the start-up request.

The example controller further includes a start-up implementation circuit configured to perform certain operations to assist in start-up operations of the prime mover and/or vehicle. An example start-up implementation circuit provides for a start-up operation of the prime mover using the M/G (e.g., moving the gear box from the neutral position to an engaged position, and/or activating the M/G to turn the prime mover according to a selected start-up scheme). In certain embodiments, the start-up implementation circuit determines whether air pressure is available, allowing for another component of the M/G to perform the start-up of the prime mover, and/or enabling calibration operations (e.g., see the disclosure referencing FIG. 136) to be performed, which may include operating the clutch, a shift assist component, and/or certain gear shift operations in the transmission. In certain embodiments, the start-up implementation circuit determines that air pressure is not available, and the start-up implementation circuit performs one or more of: delaying or canceling calibration operations for that start-up event; performing the start-up of the prime mover with the M/G; and/or powering an air compressor (e.g., utilizing the M/G) until sufficient air pressure is available to perform the desired start-up operations.

The example controller interprets operating conditions 13712 (e.g., ambient air temperature, ambient air pressure, prime mover speed, prime mover speed targets, prime mover fueling, lubricant temperature, keyswitch status, etc.) to support operations of the start-up implementation circuit 13704 and/or the shut-down implementation circuit 13708, and provides PTO gear box commands 13714 and/or M/G commands 13718 to execute the operations of the start-up implementation circuit 13704 and/or the shut-down implementation circuit 13708. The example operating conditions 13712 and/or commands are illustrative and non-limiting examples.

FIG. 138 is a schematic block diagram for controlling cranking operations of a prime mover for a mobile application. The example apparatus includes a controller 13802 having a start-up implementation circuit 13804 configured to perform certain operations in relation to a start-up of the vehicle and/or the prime mover of a system—for example a system consistent with the system depicted in FIG. 135. The example apparatus further includes a shut-down implementation circuit 13808 configured to perform certain operations in relation to a shut-down of the vehicle and/or the prime mover of the system. The example apparatus further includes a M/G calibration circuit 13810 configured to perform certain calibration and validation operations for the M/G, and/or for an actuator of the gear box. The example apparatus further includes a sleep mode implementation circuit 13812 configured to perform operations to power the shared load during the shut-down period. In certain embodiments, a system utilizing one or more aspects of the apparatus in FIG. 137 further includes a position sensor and/or a speed sensor for the M/G, and/or an air pressure sensor to determine an air pressure condition for an air storage tank on the vehicle that is utilized to operate one or more actuators on the system.

Example operations of the shut-down implementation circuit include operations to pre-position transmission and shifter actuators to a crank configuration such that an engine re-start can be performed if air pressure is not present on a subsequent start-up event (e.g., reference operations described in relation to FIG. 137). Example operations of the start-up implementation circuit include operations to: start the prime mover with the M/G; to start the prime mover with the M/G if air pressure is not present during the start-up period; to develop air pressure in the system before performing the start-up operations; and/or to delay or cancel calibration operations of the clutch and/or shift assist component during when sufficient air pressure is not available (e.g., reference operations described in relation to FIG. 137).

Example operations of the sleep mode implementation circuit include operations to ensure the gear box is positioned where M/G torque is not transmitted to the driveline during the shut-down period (e.g., positioning the gear box into a neutral position or other de-coupled position). Further example operations of the sleep mode implementation circuit include operations to provide power from the battery pack(s) to the shared load and/or other desired loads to be powered during the shut-down period (e.g., via operations of the M/G).

Example operations of the M/G calibration circuit include operations to determine a motor position sensor offset or correction, to determine the M/G phase connectivity; and/or to determine tolerance values for actuators of the M/G and/or gear box. Example operations to determine calibrations for the motor position sensor include: pulling the gear box to neutral (and/or confirming the gear box is in neutral), energizing a phase of the M/G, and learning the position relationship of the M/G with respect to the sensor reading based on the energized phase and the position sensor response. Example operations to determine proper indexing of the motor of the M/G include: pulling the gear box to neutral (and/or confirming the gear box is in neutral), engaging a low gear of the gear box, and determining whether the current calibration of the M/G position sensor has the correct indexing. A three-phase motor can be confirmed by checking a single phase (pole interface), and/or confirmed or defined by checking two phases. In certain embodiments, calibration of the M/G position sensor and/or proper indexing may be performed at each start-up event, in a selected schedule of start-up events, and/or in response to a service tool request, service event, and/or upon request (e.g., a pedal dance or other implementation scheme that can be performed by an operator or service technician). Where an improper indexing, or an indexing that is inconsistent with the current M/G position sensor calibrations, is detected, example operations of the M/G calibration circuit include performing one or more of: performing a M/G position sensor calibration; providing a notification (e.g., to the operator, a service technician, and/or an external controller); and/or providing a fault value, diagnostic value, and/or commanding a warning or service light. It can be seen that the operations of the M/G calibration circuit provide for the capability to maintain a proper calibration of the M/G position sensor and proper phase indexing. In certain embodiments, operations of the M/G calibration circuit can provide for a system that is agnostic to a specific phase plug-in order, allowing for the system to adapt to any phase plug-in order. In certain embodiments, operations of the M/G calibration circuit can provide for a system that can detect a phase plug-in order anomaly, providing for the ability to notify the operator and/or a service technician of an improper installation before undesirable system operations are performed that may damage one or more components of the system.

The example controller interprets operating conditions 13814 (e.g., ambient air temperature, ambient air pressure, prime mover speed, prime mover speed targets, prime mover fueling, lubricant temperature, keyswitch status, etc.) to support operations of the start-up implementation circuit 13804, shut-down implementation circuit 13808, M/G calibration circuit 13810 and/or sleep mode implementation circuit 13812, and provides PTO gear box commands 13818 and/or M/G commands 13820 to execute the operations of the start-up implementation circuit 13804, shut-down implementation circuit 13808, M/G calibration circuit 13810 and/or sleep mode implementation circuit 13812. The example operating conditions 13814 and/or commands are illustrative and non-limiting examples.

FIG. 139 is a schematic block diagram of an apparatus for providing overspeed protection for a motor/generator of a PTO device for a mobile application. The example apparatus includes a controller 13902 having a start-up implementation circuit 13904 configured to perform certain operations in relation to a start-up of the vehicle and/or the prime mover of a system—for example a system consistent with the system depicted in FIG. 135. An example system having a M/G coupled to the prime mover and performing operations to start the prime mover may include a high gear ratio between the M/G and the prime mover—for example to allow an M/G having a torque rating that is configured to be efficient for powering the shared load and/or regenerating energy from the driveline and/or shared load, but that is not oversized to produce high torque for starting the prime mover. In the example, the high gear ratio provides for high leverage between the prime mover rotating speed and the M/G rotating speed, and accordingly a small overshoot of the prime mover speed during start-up can lead to an overspeed event for the M/G. Previously known systems regularly experience overshoot speed excursions during start-up operations. The example start-up implementation circuit provides for overspeed protection operations for the M/G, allowing for a M/G with a lower power rating to be utilized for prime mover start operations, thereby reducing the cost of the M/G, providing for a smaller physical footprint of the M/G, and allowing for the sizing of the M/G to be improved and/or optimized for efficiency during operations that provide power the shared load and/or during regeneration operations of the M/G.

The example start-up implementation circuit provides for coordinated operations with the prime mover start operations, including: delaying a start of fueling (e.g., at a higher speed than a nominal speed such as 200 RPM); operations to soft-start fueling of the prime mover (e.g., a lower initial fueling amount, and/or a slower ramp-up of the fueling rate); operations to open the clutch as the prime mover approaches or crosses a target speed value; operations to disconnect the M/G from the driveline (e.g., using the gear box) as the prime mover approaches or crosses a target speed value; operations to implement negative torque from the M/G as the prime mover approaches or crosses a target speed value (e.g., utilizing M/G regeneration and/or motoring functions); and/or combinations of the foregoing. In certain embodiments, the selected operations of the start-up implementation circuit are selected according to the operating conditions, such as: engine temperature (e.g., block, coolant, lubrication, etc.); air pressure (e.g., accounting for variability in clutch response); fault conditions of related components (e.g., for a direct component such as a clutch actuator, and/or a dependent condition such as an engine temperature or air pressure, where a fault or failed sensor may introduce uncertainty); and/or a SOC for the battery pack (e.g., increasing the penalty for a failed start event, and/or reducing a capability to perform certain functions during the start-up such as regeneration). Adjustments to the selected operations of the start-up implementation circuit in response to the operating conditions include one or more of: enabling, disabling, and/or re-ordering one or more overspeed protection actions; and/or changing a value utilized in one or more overspeed protection actions (e.g., adjusting the prime mover target speed where overspeed protection is utilized). In certain embodiments, one or more prime mover operations may be adjusted by the start-up implementation circuit to provide for overspeed protection of the M/G, such as: a cylinder deactivation; a cylinder effective compression ratio; a variable geometry or wastegate turbocharger position; and/or an exhaust brake position. In certain embodiments, adjustments to the prime mover operations may reduce the turnover torque of the prime mover, allowing for a different progression through the start-up speed trajectory and/or a reduced prime mover fueling requirement and/or a reduced M/G torque requirement; and/or an increase of the turnover torque of the prime mover, allowing a reduction in the rate of prime mover speed increase, which may adjust the rate of closure to the target speed and/or reduce an overshoot of the prime mover speed relative to the target speed. In certain embodiments, adjustments to the prime mover operations may include operations to reduce the turnover torque of the prime mover during certain portions of the start-up sequence (e.g., early in the start-up sequence), and operations to increase the turnover torque of the prime mover during other portions of the start-up sequence (e.g., late in the start-up sequence). In certain embodiments, the start-up implementation circuit performs one or more overspeed protection actions in response to feedback in the system, such as a rate of change of the prime mover speed, an expected versus observed value in the system (e.g., prime mover speed, M/G torque command, and/or trajectories of these).

The example controller 13902 interprets operating conditions 13908 (e.g., ambient air temperature, ambient air pressure, prime mover speed, prime mover speed targets, prime mover fueling, lubricant temperature, keyswitch status, etc.) to support operations of the start-up implementation circuit 13904, and provides PTO gear box commands 13910 and/or M/G commands 13912 to execute the operations of the start-up implementation circuit 13904. The example operating conditions 13908 and/or commands are illustrative and non-limiting examples.

FIG. 140 is a schematic block diagram for providing power management operations for a mobile application. The example apparatus includes a controller 14002 having an HVAC implementation circuit 14004 configured to perform certain operations to improve and/or optimize HVAC efficiency in relation to sleep mode operation of a system—for example a system consistent with the system depicted in FIG. 135. In the example of FIG. 140, the shared load includes an HVAC system, such as a compressor, condenser fan, evaporator fan, and/or compressor fan. HVAC efficiency, as described herein, should be understood broadly, and includes any relevant output (e.g., benefit) provided per unit of any relevant input (e.g., cost), and/or combinations of relevant outputs and/or inputs. In certain embodiments, without limitation, HVAC efficiency values include: air conditioning capability per unit of SOC consumed; air conditioning time capability (e.g., selected number of hours) for a given battery pack discharge event; air conditioning capability per unit of undesirable noise generated; a cab quality index value generated per unit of SOC consumed; any of the foregoing based on time bucket values (e.g., a particular capability between 10 PM-6 AM may be a higher benefit than a similar capability between 6 PM to 10 PM); any of the foregoing based on a number of hours (consecutive and/or with interruptions) that it can be maintained (e.g., a non-linear relationship between hours, such as zero value below 4 hours, rapidly increasing value up to 9 hours, slowly increasing value up to 11 hours, and zero extra value above 11 hours); and/or combinations of any of the foregoing. The provided examples are non-limiting illustrations, and further the specific examples are provided to illustrate certain aspects of the present disclosure but are not limiting.

Air conditioning capability includes, without limitation, the capability of the system to maintain a desired temperature, humidity, and/or perceived air flow for the desired vehicle space (e.g., the cab, driver's seat, and/or sleeping area). In certain embodiments, air conditioning quality may be understood to be a threshold response (e.g., capable to reach a target value, or not capable), and/or air conditioning quality may be related to the distance between the capability and the target value (e.g., a first value for reaching the target, a second value for a one-degree differential, a third value for a two-degree differential, etc.). Additionally, interactions between the air conditioning capability parameters may be utilized (e.g., a two-dimensional value based on temperature and humidity, etc.).

Air conditioning time capability includes a value consideration based on the available time that an air conditioning capability can be met—for example a first value based on a 4-hour capability, and a second value based on a 6-hour capability. In certain embodiments, the air conditioning capability may vary with time, and the variance may be considered in the value determination—for example, three distinct value determinations may be made from: a 6-hour capability to meet the target air conditioning capability; a 5-hour capability to meet the target air conditioning capability and a further 3-hour capability to meet a reduced target air conditioning capability; and a 9-hour capability to meet a reduced target air conditioning capability. Accordingly, operations of the HVAC implementation circuit can be configured to improve or optimize the HVAC efficiency by improving the value function in relation to the cost function (e.g., consumption of a selected SOC, consumption of the full battery pack available energy, etc.).

Undesirable noise generated includes any noise generation for the system that can be detected by, or determined by, the HVAC implementation circuit. For example, fan operations, actuator operations, prime mover start-up operations, and/or M/G operations, may each include a noise component that can be determined by the HVAC implementation circuit 14004 and implemented in determining the resulting HVAC efficiency. In certain embodiments, noise determinations may be made from absolute operations (e.g., a fan operating at a certain speed), changes in operations (e.g., a fan noise generated during a speed change event for the fan), and/or changes in operations over time (e.g., a time duration of a noise, which may increase or decrease the cost—e.g. a loud noise occurring over a long period of time may be a high cost event, and a white noise event occurring over a long period of time may be a lower cost event than the same white noise event occurring briefly or intermittently). In certain embodiments, noise operations may include time considerations, such as: a time of day that the noise occurs, a time since the vehicle stopped that the noise occurs, and/or a time until the vehicle is expected to move that the noise occurs. In certain embodiments, the example controller includes a user interface circuit 14008 that interprets operator interface parameters 14010, and the HVAC implementation circuit 14004 further determines the HVAC efficiency, including noise cost evaluations, in response to the operator interface parameters. For example, an operator interface parameter may include a "quiet time" request (e.g., from 10 PM to 6 AM, the next 6 hours, until 7 AM, etc.), and the cost evaluations for noise events occurring within the indicated time period may be increased, while the cost evaluations for noise events occurring outside of the indicated time period may be reduced, left at default values, and/or eliminated from consideration. In certain embodiments, the operator interface parameters may include a noise request, such as a white noise (or other noise color such as pink noise or brown noise), and the HVAC implementation circuit may further determine the HVAC efficiency accounting for a value determined from the noise request. In certain embodiment, the HVAC implementation circuit may implement fan operations and/or operations of another system (e.g., the M/G, an explicit noise generator, etc.) as a part of providing an improved and/or optimized HVAC efficiency for the system. In certain embodiments, operations of actuators in the system may have a noise profile (e.g., color of noise approximated at various frequencies, noise volume at various operating conditions, etc.) that is interpreted by the HVAC implementation circuit and utilized to improve and/or optimize the HVAC efficiency for the system.

A cab quality index value includes any determination of relevant cab environment parameters that can be detected, determined, and/or adjusted by the HVAC implementation circuit. In certain embodiments, parameters that may be considered in determining the cab quality index value include one or more of the following: a noise value; a temperature value; a humidity value; a perceived air flow value; event values (e.g., starting or stopping an actuator, fan, the M/G, and/or the prime mover; changes in the air conditioning capability; changes in any relevant cab environment parameter; and/or a change in the rate of change of any of the foregoing); time related or time bucketed values of any of the foregoing; and/or rates of change of any of the foregoing. In certain embodiments, the cab quality index value includes the value side of the HVAC efficiency determination. In certain embodiments, the cab quality index value further includes the cost side of the HVAC efficiency determination (e.g., such that the HVAC implementation circuit can utilize the cab quality index value as a proxy for the HVAC efficiency).

In certain embodiments, the operator interface parameters 14010 include any one or more of: a cab temperature set point; a cab humidity set point; a cab air flow (or perceived air flow) request value; auxiliary component powering values (e.g., a microwave, TV, CPAP device, auxiliary power outlet, etc.); a stop time value (e.g., an expected prime mover start time; travel time description; etc.); an out-of-cab time value (e.g., an indication that the cab will not be occupied during a particular time period); a sleep time (or quiet time) value; qualitative descriptions of any of the foregoing (e.g., an amount of time that a microwave will be operated); and/or time bucketed descriptions of any of the foregoing. In certain embodiments, one or more operator interface parameters may be provided by any one or more of the following: an operator input on a user interface provided to the operator (e.g., a cab screen or other input device, a smartphone application, a fleet provided input device, etc.); determinations made from historical use patterns (e.g., which may be determined from the vehicle, route, and/or specific operator history); determinations made from log entries, trip entries, or other available information such as fleet dispatch data; determinations made from other data such as an alarm clock and/or smartphone application; default values which may be adjusted if other available data is later accessed; geographic location of the vehicle and/or operator; policy based entries (e.g., from a vehicle owner, fleet system, regulatory information, or the like); filtered values of any of the foregoing; time bucketed and/or calendar synchronized values of any of the foregoing; and/or rate of change values of any of the foregoing.

In certain embodiments, the HVAC implementation circuit is configured to provide any one or more of the following adjustments to improve and/or optimize HVAC efficiency: adjusting a target SOC for the battery pack(s) at system shutdown; perform one or more prime mover automated restarts at selected times and/or in response to a SOC value for the battery pack(s); change the M/G duty cycle (e.g., run at a lower speed for an extended period; run at an increased speed during selected periods; and/or extend a run-time or terminate a run-time operation of the M/G); change a rate of heat flux into the cab; adjust a fan speed of the compressor, evaporator, and/or condenser; adjust operations during a pull-down phase (e.g., when the cab is initially cooling or heating toward the target temperature or other target parameter) relative to steady state operations (e.g., when the cab has reached or is acceptably close to the target temperature or other target parameter); time shift operations (e.g., prime mover start/stop; actuator engagements/disengagements; fan engagements/disengagements; and/or M/G engagement/disengagements) from a less desirable time to a more desirable time; and/or determine an operating space map between a current value of the cab (e.g., the current cab state of temperature, humidity, noise, and/or air flow) and a target value of the cab (e.g., the desired cab state of temperature, humidity, noise, and/or air flow), and follow an optimized cost and/or reduced cost path between the current value of the cab and the target value of the cab (e.g., minimizing SOC consumption, noise generation, event occurrences, etc.) in response to the operating space map. Example and non-limiting operations of the HVAC implementation circuit include one or more of the following: increasing a performance value of the HVAC system during a pull-down phase relative to a steady state phase; time-shifting lower performance capability to a less costly time (e.g., allowing cab temperature to vary from the target in the middle of the stop time, and reducing the variance during an early and late portion of the stop time); performing a higher cost operation during a selected time period (e.g., performing a prime mover re-start at a time when the operator has indicated that s/he is away from the vehicle or has a lower concern about noise generation); selecting a power load that will not be supported and/or that will be only partially supported during a stop time; selecting higher priority loads (e.g., favoring a CPAP power consumption over an auxiliary outlet power consumption; a microwave load over a TV load, or vice versa) for increased or full support over a lower priority load; providing a user selection menu to the user interface when all loads will not be supportable over the entire stop time (e.g., allowing the user, through the operator interface parameters, to pick a different cab temperature, cab comfort index, or the like; relax a noise constraint; and/or provide a load priority description through); providing a recommendation to the operator to the user of a change to be made when all loads will not be supportable over the entire stop time; and/or providing a notification to the operator of a change to be made when all loads will not be supportable over the entire stop time. In certain embodiments, for example when it is determined that an operating event will occur during the stop time, a notification provided to the user interface allows the HVAC implementation circuit to configure the operating event in response to an operator interface parameter. In a further example, the operating event may include an event such as a prime mover automated start event, cab temperature change, and/or cab comfort index change, and the notification provided to the user interface allows the operator to schedule the event change to occur at a desired time and/or over a desired time period.

The example controller interprets operating conditions 14012 (e.g., ambient air temperature, ambient air pressure, prime mover speed, prime mover speed targets, prime mover fueling, lubricant temperature, keyswitch status, etc.) to support operations of the HVAC implementation circuit 14004 and/or the user interface circuit 14008, and provides PTO gear box commands 14014 and/or M/G commands 14018 to execute the operations of the HVAC implementation circuit 14004 and/or the user interface circuit 14008. The example operating conditions 14012 and/or commands are illustrative and non-limiting examples.

FIG. 141 is a schematic block diagram of an apparatus for providing automatic prime mover starting operations for a mobile application. The example apparatus includes a controller 14102 having a restart implementation circuit 14104 configured to perform certain operations to perform automated restarts for the prime mover of a system—for example a system consistent with the system depicted in FIG. 135. In certain embodiments, the restart implementation circuit 14104 determines that a prime mover automated restart is required or desirable (e.g., as determined by the HVAC implementation circuit, and/or as determined according to the battery pack SOC and required power to be provided due to the remaining power consumption and stop time of the vehicle), and provides automated restart commands 14114 (e.g., commands to the gear box and/or M/G to start the prime mover) in response to the automated restart being required or desirable. In certain embodiments, the restart implementation circuit interacts with driver parameters (keyswitch, shift lever and pedal positions, cab controls and sleeping area control positions, utilization, and/or power consumption) to determine whether and when to perform the automated restart. In certain embodiments, the controller includes a user interface circuit 14108 that provides a user interface to the operator that the automated restart is required or desirable, and performs the automated restart in response to operator interface parameters 14110 provided by the operator (and/or determined in response to a lack of a response by the operator). For example, the operator may provide a desired time and/or desired time frame for the automated restart to be performed. In certain embodiments, the desired time and/or desired time frame for the automated restart may be determined from other parameters, either as entered by the operator or determined from operating conditions 14112. For example, an alarm clock set time may allow the system to deduce an automated restart time (e.g., at least 5-7 hours before the alarm clock set time, as close to the alarm clock set time as possible, etc.). In another example, a proximity of the driver to the vehicle may be utilized to deduce an automated restart time (e.g., a lack of proximity may indicate a good time to restart the prime mover, such as when the driver steps out for dinner; in certain embodiments, a fleet policy may dictate that the driver must be present during the prime mover restart event; etc.). In certain embodiments, the determined restart time may also be related to the restart operating time—for example where a restart is permitted where the prime mover can be operated at a high speed, the restart operating time may be shorter than where a restart is permitted where the prime over can only be operated at a lower speed. In a further example, a restart time before 10 PM may indicate that a higher speed operation of the prime mover is allowed than a restart time after 12 AM, and accordingly the earlier restart time may be indicated (e.g., where a full charge at 10 PM would provide sufficient SOC for the battery pack to power the system until the expected vehicle start time the next day). In a still further example, an earlier, more capable, restart may nevertheless extend into an undesirable time period, providing for a staged restart operation (e.g., a high prime mover speed for a period, and then a lower prime mover speed for a second period), or providing for a later restart operation (e.g., utilizing a lower noise, extended restart during a later period).

In certain embodiments, the restart implementation circuit may further determine whether shore power is available, and/or the parameters of the shore power. For example, where shore power is provided as a 120V AC input, which passes power to the 12V vehicle electrical system, the utilization of the shore power may be scheduled to charge the 48V batteries, the vehicle primary 12V battery, and/or avoid a restart operation. In certain embodiments, a higher HVAC efficiency may be provided by performing a restart operation in addition to, or instead of, utilizing shore power, due to the limited throughput of the shore power. In certain embodiments, a more capable shore power system may change the HVAC efficiency parameters, whereby a greater utilization of shore power may avoid the restart operation. In certain embodiments, the HVAC implementation circuit (reference FIG. 140) further determines the shore power capability and interface to the vehicle to determine the HVAC efficiency, and the corresponding operations of the system. In certain embodiments, a system such as that shown in FIG. 135 provides enhanced capability for battery charging relative to previously known hybrid systems, and/or hybrid systems where the shared load is not shared, but is instead fully powered by the electronics on the system. For example, where the system of FIG. 135 has restarted the prime mover, the PTO device is capable to charge the battery pack(s) with the full power takeoff from the driveline (e.g., up to 5 kW, or greater depending on the PTO interface position, system configuration, and the like), with the prime mover powering the shared load during the recharge operations. A previously known hybrid system powers the (un) shared load during recharge operations, providing only a portion of the power takeoff from the driveline for battery charging. Accordingly, a PTO device system of the present disclosure having a 5 kW power takeoff capability provides a similar hybrid capacity equivalent of a much larger previously known hybrid system. It can be seen that the PTO device of the present system can provide for reduced automated restart operations, reduced automated restart runtimes, and enhanced control over the SOC of the battery pack(s) at the end of a use cycle (e.g., when the driving is completed for the vehicle), due to the improved charging capacity of the battery pack(s) relative to previously known hybrid systems.

FIG. 142 is a schematic block diagram of an apparatus for providing user interface and power management operations for a mobile application. The example apparatus includes a controller 14202 having a PTO device state management circuit 14204 configured to perform certain operations to provide navigation of PTO device states for a system having a PTO device—for example a system consistent with the system depicted in FIG. 135. An example PTO device state management circuit is configured to navigate the PTO device states 14214 between three states (modes), enumerated as a sleep mode, a drive mode, and a creep mode. Additionally or alternatively, the PTO device state management circuit navigates between two transient states, including a transmission initialization state and a transmission in-gear state. In certain embodiments, the PTO device state management circuit may navigate between shift assist states (which may differ by gear and/or by upshift/downshift variability), transmission calibration states, shift device component calibration states, and/or M/G phase and/or position sensor calibration sates. Any other operating mode described throughout the present disclosure, and/or otherwise available to the PTO device for a particular system, are contemplated herein. Operations described in the present disclosure and as presented in reference to FIG. 143 are non-limiting operations providing an example for purposes of illustration. The specific operations described are non-limiting, and operations may be omitted, combined, re-ordered, and/or operations may be added, and any such operations are contemplated within the scope of the present disclosure.

An example procedure for starting a vehicle having a PTO device, such as depicted in FIG. 135, is listed following. Certain operations of the example procedure may be performed by any controller as set forth throughout the present disclosure. Specific values stated in the procedure, and locations of components, are non-limiting illustrative examples. Certain aspects described as performed by the operator (e.g., battery disconnect operations, brake applications, etc.) may be performed instead by a controller, and/or may be enforced through interlocks, intelligent analysis of the vehicle state, and the like. Certain aspects such as colors, output types (e.g., beeping), and the like may be altered qualitatively, including having distinct values within the output type (e.g., a different color) and/or a distinct output type (e.g., bumps or texturing in addition to or as an alternative to color; and/or a flashing light or haptic feedback in addition to or as an alternative to a beeping). The operator may be an intended driver, a support person, service personnel, a fleet operator, or the like.

1. Operator approaches the vehicle
2. If a charger is connected to the battery pack(s), disconnect it
3. Turn on the 12V battery disconnect switch (e.g., red) located to the left rear of the driver seat
4. Turn on the 48V battery disconnect switch (e.g., blue) located to the left rear of the driver seat
5. Enter the vehicle through the driver or passenger door.
6. Turn the ignition key (keyswitch) to the ON position, but do not move to the crank position.
7. Make sure the parking brake is applied
8. Make sure both the driver and passenger door are closed
9. A beeping will occur during a crank readiness period, during which time the key should not be moved to the crank position
10. When the beeping has stopped, rotate the key to the crank position and start the engine
11. After the transmission powerup sequence completes, the PTO device should engage the PTO and begin operating in alternator mode. The 12V battery voltage should begin to rise to operating voltage (e.g., ~13.6 volts) as the battery is charged
12. Select a desired operating mode from the user interface (e.g., sleep, creep, and/or drive)
13. When operations are complete, move the ignition key to the OFF position to begin vehicle shutdown An example controller includes a user interface circuit 14208 providing a user interface having mode selection buttons for the operator to request a mode. For example, the user interface may include a sleep mode, creep mode, and driving mode selection. In certain embodiments, other modes such as shift assistance, starting mode requests (e.g., bypassing the standard starter/alternator), and/or any other user interface elements described throughout the present disclosure may be provided on the user interface. In certain embodiments, the PTO device state management circuit automatically determines a state of the PTO device, and/or provides feedback for unavailable states (e.g., providing a user notification of an invalid request based on the operating conditions 14212, and/or providing an indication—such as a grayed-out text—that a particular state is unavailable based on the operating conditions).

An example driving mode includes a PTO device state wherein normal vehicle driving or motive operation is allowed. During the driving mode, the shared load may be powered by the prime mover, and/or may be selectively powered by the prime mover or the PTO device. During the driving mode, certain sub-states may be entered, such as a shift assist state, which may be considered as a separate state from the driving mode, and/or may be considered as a sub-state of the driving mode.

An example sleep mode provides for powering of the shared load, and/or other configured loads throughout the system, from the battery pack(s) via the M/G. In certain embodiments, the sleep mode is exited at a selected battery SOC, at a selected voltage of the battery pack(s), and/or in accordance with operator interface parameters 14210 (e.g., requesting XX hours of sleep mode operation). In certain embodiments, sleep mode operations are adjusted at a selected battery SOC, at a selected voltage of the battery pack(s), and/or in accordance with operator interface parameters (e.g., prioritization descriptions for various load types), for example to provide for scheduled disabling of some powered components with continued support for other powered components. In certain embodiments, for example during automated start operations (including charging the battery pack with the prime mover, and/or powering the shared load with the prime mover), the automated start operations of the prime mover may be considered as a separate state from the sleep mode, and/or may be considered as a sub-state of the sleep mode. An example embodiment includes allowing the sleep mode during any period where the keyswitch is in the ON position, including time periods before the prime mover is started. In certain embodiments, a sleep mode request and entry will shut down the prime mover if the prime mover is started. In certain embodiments, moving the keyswitch to the crank or OFF position will cause the PTO device state management circuit to exit the sleep mode. Parameters developed during the sleep mode (e.g., operating times for powered components, set points and/or requested values, accumulated values, path progression through an operating space map, etc.) may be either deleted or cleared upon the exit of the sleep mode, saved for the next entry of the sleep mode, and/or saved for a period of time after the sleep mode has been exited (e.g., 5 minutes, 15 minutes, one hour, until the vehicle moves, etc.). Accordingly, brief interruptions to the sleep mode may clear parameters, if desired, or be managed to allow for a smooth transition back into the sleep mode. In certain embodiments, the 12V and/or the 48V battery disconnect switches are disabled (e.g., cannot physically be moved to the engaged (disconnect) position, and/or they are bypassed by the system) if the keyswitch is in the ON position. In certain further embodiments, the controller provides a notification to the user interface in response to one or more of: the keyswitch in the ON position for an extended period without a user interaction with the vehicle; a movement of the 12V and/or the 48V battery disconnect switch to the engaged position while the keyswitch is in the ON position; and/or an attempt by the user to move the 12V and/or 48V battery disconnect switch to the engaged position while the keyswitch is in the ON position.

An example creep mode includes a torque coupling between the M/G and the motive load, allowing the M/G to provide highly controllable torque to move the vehicle at low speeds. Example and non-limiting benefits include avoidance of using an internal combustion engine in confined and/or low circulation spaces (e.g., enclosed or partially enclosed loading docks), and/or near an air entry location for a building air circulation system (e.g., where the building air circulation has an intake in a low-traffic location such as near a loading dock), and/or highly controller trailer coupling operations. In certain embodiments, the PTO device state management circuit allows entry into the creep mode from either the sleep mode or the drive mode, after transmission initialization operations are completed. In certain embodiments, transmission initialization is performed after the parking brake is set, and the vehicle doors are closed. In certain embodiments, the transmission initialization performance further requires cither an engine start event, or a request to enter the creep mode from the sleep mode.

An example procedure to enter creep mode is listed following. Certain operations of the example procedure may be performed by any controller as set forth throughout the present disclosure. Specific values stated in the procedure, and locations of components, are non-limiting illustrative examples. Certain aspects described as performed by the operator (e.g., battery disconnect operations, brake applications, etc.) may be performed instead by a controller, and/or may be enforced through interlocks, intelligent analysis of the vehicle state, and the like. Certain aspects such as colors, output types (e.g., beeping), and the like may be altered qualitatively, including having distinct values within the output type (e.g., a different color) and/or a distinct output type (e.g., bumps or texturing in addition to or as an alternative to color; and/or a flashing light or haptic feedback in addition to or as an alternative to a beeping). The operator may be an intended driver, a support person, service personnel, a fleet operator, or the like.

1. Select the creep icon on the user interface
2. Wait for the clutch to disengage, and the PTO device to shift the gear box to the creep ratio
3. Move the vehicle gear selector to D or R, while applying the service brake. The controller will shift the transmission into either a forward or reverse gear according to the vehicle gear selector
4. Utilize the accelerator pedal to move the vehicle. An example includes utilizing the accelerator pedal as a torque governor (e.g., pedal position equates to requested torque). In certain embodiments, the accelerator pedal may operate as a speed governor
5. The keyswitch should not be moved to the crank position during creep operations (selectively—keyswitch may be locked out, creep may be disengaged, and/or transmission may shift to neutral)
6. If the service brake air pressure falls below a threshold, the PTO device state management circuit may perform one or more of: 1) Exit creep mode, 2) Shift the transmission and/or PTO device gear box to neutral, and/or 3) Power the air compressor from the M/G (if this configuration is available)

An example procedure to exit creep mode and drive the vehicle is listed following. Certain operations of the example procedure may be performed by any controller as set forth throughout the present disclosure. Specific values stated in the procedure, and locations of components, are non-limiting illustrative examples. Certain aspects described as performed by the operator (e.g., battery disconnect operations, brake applications, etc.) may be performed instead by a controller, and/or may be enforced through interlocks, intelligent analysis of the vehicle state, and the like. Certain aspects such as colors, output types (e.g., beeping), and the like may be altered qualitatively, including having distinct values within the output type (e.g., a different color) and/or a distinct output type (e.g., bumps or texturing in addition to or as an alternative to color; and/or a flashing light or haptic feedback in addition to or as an alternative to a beeping). The operator may be an intended driver, a support person, service personnel, a fleet operator, or the like.

1. Shift the vehicle gear selector to N
2. Select the drive mode on the user interface
3. Start the prime mover using the crank position on the keyswitch In certain embodiments, the user interface is provided on a screen in proximity of the dashboard, to an electronic device (e.g., a smartphone, tablet, laptop, or other consumer electronic device), to a electronic device otherwise available to the operator (e.g., a fleet electronic logging device, dashboard based screen, navigation device, etc.). In certain embodiments, aspects of the user interface are provided in various locations in the vehicle, for example in proximity to the driver location, and/or a service location (e.g., mounted near the PTO device, within or on a housing of a PTO device location, and/or under the hood in the prime mover compartment). In certain embodiments, aspects of the user interface are provided in a web application and/or on a computing device communicatively coupled to the vehicle (e.g., a fleet management computer, a service tool, a service computer, or the like).

Referencing FIG. 143, an example state diagram depicting certain operations of the PTO device state management circuit are schematically depicted. The operations are consistent for a mobile application having a PTO device such as that depicted in FIG. 135. As described throughout the present disclosure, additional states for the PTO device may be present in a particular system, and aspects of FIG. 143 may be omitted and/or added. Additionally, in certain embodiments, a PTO device may be operated without having discrete identifiable states, and/or without all of the states, such as those depicted in FIG. 143.

FIG. 144 is a schematic block diagram of an apparatus for providing operations to discriminate between loads of a mobile application. The example controller 14402 includes a load priority circuit 14404 that determines load priority values 14414 for loads (e.g., motive power loads, accessory loads, shared loads, and/or cab related loads) in the system. In certain embodiments, a user interface circuit 14408 provides a user interface allowing the user (e.g., an operator, fleet owner, dispatcher, or service technician, and/or any other user) to provide operator interface parameters 14410 include a description of priority values between loads in the system. In certain embodiments, load priorities may be determined by the load priority circuit in response to the source of the load and/or the type of load—for example a mission critical load such as a motive power load and/or an engine cranking load may be determined to be a highest priority load. In certain embodiments, the load priority may be user entered—for example the user providing an indication that a particular load (e.g., a microwave) is a higher priority than another load (e.g., a television). In certain embodiments, the user may provide an indication that a particular load source (e.g., the outlet at the back of the cab sleeping area) is a higher priority than another load (e.g., the outlet at the front of the cab sleeping area). In certain embodiments, the user interface circuit may provide the user interface with a diagram of the loads, for example mapped onto a simple vehicle diagram, with a selection interface (e.g., high/medium/low; drag-and-drop ordering of loads; etc.). In certain embodiments, the user interface circuit may omit certain loads from the diagram, such as motive power loads, vehicle accessory loads that are not optional (e.g., power steering, vehicle fluid pumps, etc.). In certain embodiments, the load priority circuit may determine load priorities based on previous user behavior, general default settings entered by an OEM, fleet owner, or other relevant entity, and/or based on the current operating condition 14412 of the vehicle. In certain embodiments, various controllers and/or circuits throughout the present disclosure, such as the HVAC implementation circuit and/or the restart implementation circuit, may utilize the load priority values to determine operations of the PTO device. For example, and without limitation, loads having a lower priority may be shut down and/or de-rated before loads having a higher priority. In another example, loads having a lower priority may have a lower cost value than a load having a higher priority (e.g., where the loss of the ability to support that load is considered as a cost in an efficiency determination). In another example, loads having a lower priority may have a lower benefit value than a load having a higher priority (e.g., where the ability to fully support that load is considered as a benefit in an efficiency determination). The stated examples are non-limiting illustrations.

The present disclosure relates generally to a driveline PTO system and related method for operating a motor/generator with battery management, including management of battery state-of-charge (SOC), battery state-of-health (SOH), and battery state-of-life (SOL).

As referenced throughout the present disclosure, a battery state-of-charge (SOC) as used herein references the available charge and/or usable energy from a battery. The SOC for a battery pack (e.g., a group of related batteries treated together for certain purposes) may be considered together as a single unit in certain embodiments. The SOC is related to the amount of energy that the battery can discharge before recharging is required. Because certain operations of a PTO device may allow the SOC of the battery to dissipate further than other operations, a SOC for a particular battery may have a first value for one purpose, and a second value for another purpose.

As referenced throughout the present disclosure, a battery state-of-health (SOH) as used herein references either or both of: 1) the power throughput available from the battery (e.g., a combination of the voltage and current capacity of the battery) and/or 2) an amount of charge that can be put into the battery (e.g., the energy carrying capacity of the battery if fully charged). Because both the battery voltage and current capacity can degrade within a battery and at different rates and according to different degradation mechanisms, the relative SOH between two batteries for one purpose may be different than the relative SOH between the two batteries for another purpose. The SOH for a battery pack (e.g., a group of related batteries treated together for certain purposes) may be considered together as a single unit in certain embodiments.

As referenced throughout the present disclosure, a battery state-of-life (SOL) as used herein references any one or more of: 1) a number of charge/discharge cycles remaining for the battery; 2) a time frame (calendar time, operating time, total power throughput, etc.) remaining for the battery; and/or 3) a qualitative indicator whether the battery should be replaced, and/or whether a mitigating activity is available that may recover some life of the battery. The SOL for a battery pack (e.g., a group of related batteries treated together for certain purposes) may be considered together as a single unit in certain embodiments.

Previously known battery systems for mobile applications, including battery systems having a battery pack that supports one or more loads beyond ordinary loads (e.g., providing power for lights, starting, and/or low voltage accessories) experienced by a battery on a mobile application, suffer from a number of drawbacks. Mobile applications have a wide variety of duty cycles between applications, and within a given application. Accordingly, battery packs to support loads suffer from high cycle variability, extended discharge periods, extended operating periods without charging, low priority for thermal management (e.g., the mobile application may not be configured to provide a high quality cooling flow of air or coolant for battery and/or related electronics cooling), and other complexities in the duty cycle which lead to degradation and premature failure of the battery pack. The benefits of battery management, especially for lead-acid batteries to support low voltage loads, are limited in previously known mobile applications, and accordingly previously known systems do not prioritize management of such batteries. As utilized herein, battery management encompasses, without limitation, at least one or more of: planning charge/recharge cycles (charge and/or discharge thresholds, targets, and/or timing); detection of battery condition and/or degradation; development of faults, fault responses, and diagnostic schemes; hardware configuration and integration designed for battery pack conditioning, protection, and/or management; determination and management of battery state-of-charge; determination and management of battery state-of-health; and/or determination and management of battery state-of-life. In certain embodiments, battery management further encompasses any of the foregoing in relation to: a group of battery packs within a particular mobile application; a group of battery packs within a fleet of vehicles; the mission needs of a particular mobile application (e.g., on a particular trip, a group of trips, and/or over a specified time period); and/or a total cost of operations for any of the foregoing. In certain embodiments, battery management further encompasses consideration of one or more individual batteries within a battery pack.

Previously known operations to determine a state-of-charge for battery packs suffer from a number of drawbacks and challenges. Previously known operations to determine a state-of-charge suffer from one or more of: a requirement for offline operations, a requirement for a long rest time for battery voltage stabilization, a requirement for offset reference data, a need for training data and complex modeling operations, a high temperature sensitivity, a requirement for certain battery charge states (e.g., low state-of-charge operation), a high computational cost to operate a complex model, and/or a need for high resolution and/or unusual sensors. Additionally, certain previously known operations to determine a state-of-charge may be suitable for certain duty cycles but not other duty cycles, and accordingly are not as suitable for high variability in operations as experienced in mobile applications. In certain embodiments, a combination of techniques may be utilized, as set forth in examples of the present disclosure, that accommodate the limitations of previously known techniques for determining battery state-of-charge, state-of-health, and/or state-of-life, for mobile applications.

In certain embodiments, determinations about the batteries of the battery pack for a PTO device set forth herein provide for relative improvements to previously known systems. Accordingly, systems and operations herein provide for a reduced incidence of loss of a battery, reduced replacement rates of the batteries, and/or reduced incidence of battery caused mission disabling events (e.g., fail-to-start). While the operations, systems, and procedures herein include a theoretical underpinning, the present disclosure provides for empirical improvements in the management, utilization, and life cycle for lead-acid battery packs, and does not rely upon the correctness or universal applicability of any particular theory of operation. Previously known lead-acid battery systems do not include significant battery management. Based upon simulation information, modeling, and some testing, it is believed that the operations, systems, and procedures of the present disclosure can provide for approximately a doubling of the commercially reasonable battery life for lead-acid battery packs utilized in mobile applications, including mobile applications having a PTO device with a shared load.

FIG. 145 is an example lead-acid battery circuit model 14502 and illustrative matching data 14504. It has been found that utilization of a lead-acid battery specific circuit model, including internal resistance stages and leakage current provides for an improved matching of the SOC over time relative to utilization of previously known models, for example a resistive-capacitive model as typically utilized for a lithium ion battery. An example operation to predict the battery SOC includes utilizing a current-time integrator (e.g., amp-hours, or Ah) to track the SOC of the battery over time, with resets performed at periodic intervals where the true SOC can be determined through feedback (e.g., where the battery rest voltage can be measured, after an extended recharge event, etc.). The right side lower graph depicts an example SOC over time for an example duty cycle using an example test cycle, and the right side upper graph depicts the measured versus model estimated SOC for the example test cycle.

Referencing FIG. 149, an example SOC model using an RC model circuit, such as used for lithium ion batteries, is depicted. It can be seen in graph 14902 that the modeled SOC varies significantly from the actual measured SOC for the battery (based on terminal voltage measurement), due to a failure of the model to sufficiently simulate the current-time response of the battery. Referencing FIG. 150 and FIG. 151, the example SOC model, adding leakage current and internal resistance, is depicted showing a much better match to the actual measured SOC for the battery (again, based on terminal voltage measurement). The examples depicted in FIG. 145, FIG. 149, and FIG. 150 model the entire battery pack (e.g., 4 batteries in series) as a unit. In certain embodiments, individual batteries may be modeled and/or measured. In certain embodiments, a more complex pack model may be utilized (e.g., modeling leakage current between individual batteries, or jars, of the battery pack). In certain embodiments, a more complex model utilizing individual cell voltages and leakage currents may be utilized. For most applications, the pack model as depicted in FIG. 150 (15002) and FIG. 151 is sufficient to provide for improved battery SOC determinations, allowing the battery management system as described herein to provide for improved battery management, battery life, and mission performance (e.g., ensuring sufficient power in the battery pack at various operating conditions to deliver effective performance to meet the mission goals for the mobile application). Data depicted in FIG. 151 is illustrative and is a representation based on experimentation and previous experience.

Referencing FIG. 146, a schematic diagram of degradation mechanisms and stress factors for a lead-acid battery is depicted. The diagram of FIG. 146 provides for a conceptual framework that allows the battery management system to determine operating conditions and mitigating actions for various degradation mechanisms, and thereby achieve improved battery management. The diagram of FIG. 146 is grounded in actual degradation mechanisms of lead-acid batteries, and further the stress factors depicted are grounded in actual stress factors that relate to the depicted degradation mechanisms. Accordingly, the battery management system using all or portions of the framework depicted in FIG. 146 provides for measurable operating conditions that can be related to battery degradation, allow for the performance of mitigating actions to reduce that degradation, and allow for superior characterization of the battery SOC, SOH, and SOL in a quantifiable manner for utilization by the battery management system in operation on a mobile application. However, the actual degradation mechanisms, and/or the actual relationship of various stress factors and events to those degradation mechanisms, do not need to be specifically determined for a system in use. It is believed, based on modeling, simulation, and initial testing, that a battery management according to embodiments herein, provides for numerous improvements, including one or more of: improved battery and/or battery pack characterization; improved service life of batteries and/or battery packs; improved cost of operation and/or ownership for a battery, battery pack, or a related mobile application; and/or an improved capability to meet mission goals for mobile applications having a PTO device.

In the example of FIG. 146, degradation mechanisms such as irreversible sulfation (e.g., of cells, active mass coverage, terminals, and/or electrolyte precipitates), active mass shedding (e.g., loss of active mass of the cells, through consolidation, breaking off or electrically separating from a cell, etc.), active mass degradation (e.g., loss of active surface area, loss of porosity, loss of permeability, etc.), water loss (e.g., reducing active surface area of cells in effective contact with the electrolyte), grid corrosion (e.g., grids holding active material, substrate degradation, disturbance of nominal cell macro structure, etc.), and electrolyte stratification (e.g., settling of precipitates, gravity distribution of heavier ions, etc.) are referenced, which may relate generally to various stress factors that tend to cause those degradation mechanisms. The example stress factors include a time value between full charges (e.g., extended periods without a full charge on a battery), a time spent at a low SOC value, a discharge rate of the battery, energy throughput of the battery (e.g., total energy discharged and/or charged for the battery), and/or the charge put into or taken out of the battery. Stress factors may be normalized (e.g., per unit of battery capacity, throughput capacity, per charge cycle, etc.) and/or bucketed (e.g., per unit of calendar time, operating time, operating event, etc.). Stress factor estimation may be related to thresholds (e.g., a stress weighting ignored below a certain value, having a weighting increased above or below certain values, etc.), and/or related to secondary effects such as temperature, vibration, operating condition, and the like. In certain embodiments, relationships between a stress factor and an accumulated stress value (e.g., stress related degradation attributed to a particular stress condition) may be linearized, piecewise linearized (e.g., with linear relationships between particular thresholds), discretized (e.g., stresses between particular thresholds are accumulated at a same rate, with changes at the thresholds), and/or weighted (e.g., a first stress factor or secondary effect provided as a multiplier or other modifier for a second stress factor). In certain embodiments, the stress factor relationships are accumulated to determine a total amount of degradation accumulated for a battery (e.g., to determine a SOH and/or a SOL), and/or stress factor relationships are utilized to provide operating conditions for the battery that avoid rapid accumulation of degradation for the battery (e.g., providing operations to avoid a high first stress condition value; to avoid a high multiplier by a second stress condition when the first stress condition value is high; and/or to avoid a high multiplier from a secondary effect when the first stress condition value is high). In certain embodiments, certain mitigating operations may be available, such as reducing an extended period time between full charge conditions, reducing an amount of time spent at a low SOC condition, performing a rapid (or slow) charge or discharge condition, and the like. In certain embodiments, mitigating operations are performed to avoid a high stress factor condition from occurring, and/or performed to reduce one or more types of degradation of the battery. In certain embodiments, operations to reduce the stress and/or perform mitigating operations are performed according to the SOC, SOH, and/or SOL of the battery—for example performing more aggressive stress avoidance and/or mitigating operations as the battery SOH and/or SOL degrades over time.

FIG. 147 is a schematic flow diagram of an operating cycle for a battery management system, which may be implemented on a controller, for example on a system having a PTO device such as that depicted in FIG. 135. The example operating cycle includes an operation to determine a desired battery pack duty cycle 14702. Operations to determine the desired battery pack duty cycle include planned operations such as: charge targets during operation, discharge targets during operation, planned time between charged states, and/or charging/discharging rates of the battery or battery pack. Aspects of the desired battery pack duty cycle may further include related operating conditions, such as time-of-day values, and/or values during a drive cycle (e.g., charge targets planned for shutdown time, start-up time, etc.). In certain embodiments, the desired battery pack duty cycle may depend upon a battery pack definition (e.g., chemistry, type, and/or configuration of batteries in a battery pack, total charge energy of the batteries, current throughput capacity of the batteries, and/or stress parameters of the batteries according to operating conditions of the mobile application such as vibration profile, temperatures, etc.). In certain embodiments, the desired battery pack duty cycle may depend upon the application duty cycle (e.g., the expected and/or observed operations of the PTO device to support the mobile application operations), and/or the PTO device design parameters (e.g., gear ratios, M/G throughput and duty cycle, voltages, temperatures and/or thermal control devices, efficiencies at various operating conditions, etc.). In certain embodiments, the desired battery pack duty cycle may be defined at design time, and/or provided as a calibration (e.g., according to a manufacturing specification or rating, programmed by an OEM, programmed by a service tool, and/or programmed by a fleet operator). In certain embodiments, the desired battery pack duty cycle may be modified and/or created during run-time, for example in response to the observed duty cycle and/or operating conditions of the mobile application and/or PTO device in service.

The example operating cycle further includes an operation to execute the battery manager to minimize (and/or improve) stress factors on the battery pack in-use 14704. Example and non-limiting operations, without limitation to any other aspect of the present disclosure, include operations to modify charge and/or discharge targets, charge and/or discharge rates, temperature controls, and/or the time between charged and/or discharged states.

The example operating cycle further includes an operation to execute the duty cycle of the battery pack in-use 14708, for example to support operations of the PTO device and/or the mobile application. The operation to execute the duty cycle of the battery pack in-use may be performed in view of the planned battery pack duty cycle as modified by the battery manager, which may be varied according to the mission requirements for the mobile application and/or PTO device.

The example operating cycle further includes an operation to observe the stress factors experienced by the battery pack, and/or to model the stress factors experienced by the battery pack in response to the observed stress factors 14710. The example operating cycle then includes an operation to observe and/or model degradation of the battery pack in response to the observed and/or modeled stress factors (and/or mitigating operations) 14712. The example operating cycle then includes an operation to update the SOH value and/or the SOL value of the battery pack in response to the observed and/or modeled degradation of the battery pack 14714. In certain embodiments, the battery manager is iterative, updating the desired battery pack duty cycle in response to observed operation conditions and/or mission requirements of the mobile application and/or the PTO device, and/or further in response to the updated SOH value and/or SOL value for the battery pack. In certain embodiments, the operations to minimize stress factors may further be performed in response to observed operation conditions and/or mission requirements of the mobile application and/or the PTO device, and/or further in response to the updated SOH value and/or SOL value for the battery pack. For example, where an observed operating condition is not within an expected range (e.g., actual temperature is higher or lower than observed), a different stress factor avoidance scheme may be utilized by the battery manager (e.g., reducing charging and/or discharging rates) to preserve an expected life of the battery pack. In certain embodiments, one or more mitigating techniques may be available or unavailable based on the run-time information of the operating mobile application and/or PTO device, which were estimated to be unavailable or available during an initial or previous operation of the battery manager.

Lead-acid battery structures may include: 1) Positive: Lead peroxide ($PbO2$); 2) Negative: Sponge lead; 3) electrolyte: ~ 30% sulfuric acid in water; 4) separators: thin sheets of non-conducting material (porous rubber, mats of glass fiber) insulating +/− from each other; and 5) battery terminals. Electrochemically, a fully charged battery may comprise $PbO2$, $H2SO4$ (aq.), and Pb while a fully discharged battery may comprise $PbSO4$ and dilute $H2SO4$. At the positive terminal, the following reaction may take place: $PbO2+H2SO4$ (aq.)+3H+(aq.)+2e−→$PbSO4+2H2O$. At the negative terminal, the following reaction may take place: Pb+HSO4-(aq.)→PbSO4+H+(aq.)+2e−

FIG. 148 is a schematic diagram of a battery management system, including a battery management system (BMS) that accesses various operating conditions, and/or aspects of the PTO device. Certain considerations of example operating modes of the PTO device are depicted on FIG. 148 as a non-limiting example and described herein. For example, there may be vastly different duty cycles in each mode which may correspond to different state of charge (SoC) estimation techniques could be used for each mode. Park mode may include: small currents most of the time, high current at crank time, and use idle time to evaluate state of health (SoH). Drive mode (coast, cruise, . . . ) may include: SoC important in steady state; SoH more important in drive mode; running high current through an old battery results in overheating and damage; limit dynamic power by controlling how much regen braking to prevent overcharge/undercharge. Sleep mode may include: SoC more reliable than Vterminal as Vterminal depends on current etc.; allows devising a better strategy for sleep mode. For example, the functions to shut down as a function of SoC include: sleeper HVAC (<55%); 12V truck inverter, CPAP, fridge (<45%); lights, locks/black out (<40%); start margin (<30%); emergency power/lights/radio . . . (<20%); and dead battery (0).

Referencing FIG. 152, certain example and non-limiting considerations relating to degradation mechanisms of a lead-acid battery are depicted. Lead-Acid Battery (LAB) failure mechanisms are described herein. LABs degrade and age due to various mechanisms including: grid corrosion: grid holding active electrode materials is corroded; water loss\drying out: water evaporates or breaks down; active mass degradation (recrystallization, porosity, loss of surface); active mass shedding: active mass removed from electrode; irreversible sulfation: formation of large PbSO4 crystals no longer participate in normal charge/discharge reactions; and electrolyte stratification: PbSO4 dense→accumulates at the bottom.

Certain considerations relating to differences between degradation of a flooded lead-acid battery versus an absorbent glass mat (AGM) lead-acid battery are depicted. In the flooded LAB, the electrolyte (sulfuric acid) filled in the space between electrodes. The AGM LAB features: A glass membrane is used to absorb and contain the acid to localize the acid an reduce stratification; sealed battery; and reduced water loss and stratification. Referencing FIG. 146, certain example considerations relating to stress factors for a lead-acid battery are depicted. Any time frames, units, or other specific details depicted in FIG. 146 are non-limiting examples. Stress factors, determined by battery duty cycle, affect lead acid battery aging mechanisms to determine lead acid battery life, including: charge factor: charge in/charge out; Ah throughput: total charge discharged per year, normalized by battery capacity; Highest discharge rate: Max current in which 1% total charge was discharged. Calculated using PDF of discharge current period; time between full charge: average time (days) between recharging the battery to full state of charge; time at low state of charge: cumulative operating time % of year at state of charge less than 35%; Temperature; (partial cycling).

Example operating modes and power flows for a PTO device include: coast: accessories driven by wheels; engine-off; crank: start engine from 48V machine; cruise: accessories driven by engine; creep: motor drives truck in low-PTO ultra-precision backing 0-2 mph; sleep: motor drives HVAC with engine off (electric motor wired to a pack of lead acid batteries, 48V). Referencing FIG. 155, example configurations for battery packs for a PTO device are depicted. Any time frames set forth in FIG. 155 (e.g., existing and/or "new arrangement") are relative examples to a particular considered system, and are not an indication that any particular system is, or is not, previously known. In certain embodiments, a battery pack arrangement may be previously known in part, but may be contemplated within the present disclosure in the context of a particular embodiment of a PTO device, battery manager, and/or having one or more aspects of systems, operations, or procedures described herein for battery management.

Referencing FIG. 156, an example system is depicted showing a distributed controller, which may be utilized in whole or part with any other aspect of the present disclosure. Without limitation to any other descriptions herein, the controller in FIG. 156 is distributed among one or more of: a vehicle based controller 15602 (e.g., a transmission controller, prime move controller, a vehicle controller, a dedicated controller for the PTO device, one or more local controllers, and/or combinations of these); a fleet/service based controller 15604 (e.g., a controller utilized by a fleet operator, service facility, etc.) that may be at least intermittently in communication with the mobile application or vehicle; and/or a cloud based controller 15608 (e.g., a controller accessible by the vehicle based controller, and/or any device at least intermittently in communication with the vehicle based controller, that may be accessible using the internet, an intranet, or other network infrastructure). The example of FIG. 156 depicts certain options for the distribution of controller functions. In certain embodiments, calculations and/or data storage for the battery management system may be distributed across various controllers, for example to relieve the performance burden on the vehicle based controller, to enable long-term data storage, to enable data aggregation across multiple vehicles, and/or to enable data mining across a number of vehicles. In certain embodiments, operations of the controller may be performed at one controller location at a first time period, and performed at another controller location at a second time period. In certain embodiments, operations of one of the distributed controllers may be performed with greater resolution, a greater capability model, and/or as a consistency check relative to operations of another one of the distributed controllers. In certain embodiments, one of the distributed controllers may be configured to update calibrations, state parameters, accumulated parameters, or other data values in another of the distributed controllers. In certain embodiments, one of the distributed controllers may be configured to interrogate one or more of the other distributed controllers, where the interrogation includes any information related to operations of the battery management system, and where the interrogation may occur upon a request, at selected intervals, and/or in response to operations of one of the controllers (e.g., detecting a threshold condition, determining an off nominal condition has occurred, etc.).

An example mixer duty cycle for a system having a non-motive load present, such as for a concrete mixer, is described. In the example mixer duty cycle, an action along with an associated speed and duration are described. The actions and their associated speeds and durations in hours are: Loading (2 rpm CCW, 0.5); Transit (2 rpm CCW, 1-2); Waiting (2 rpm CCW, 0.5-1); Mixing (20 rpm CCW, 0.05 (3 min)); Unloading (14-15 rpm CW, 0.25); and Transit & Washing (2 rpm CCW, 2-3). The example system describes a number of operating phases (Actions) for the non-motive load system, such as "loading", "transit", "waiting," etc. The described number and characteristics of each of the operating phases is a non-limiting example, and any duty cycle description is contemplated herein. A speed-based turndown ratio is at least about 10:1 (e.g., 2 RPM to 20 RPM). The example duty cycle includes operating states requiring a variety of power input levels, from very low power (e.g., low speed and low flow or pressure) to high power levels (e.g., high speed and/or high flow or pressure). In certain embodiments, a power-based turndown ratio is at least about 6:1 (e.g., not calculated using zero-power operating regions). The example duty cycle further includes operating states where the load reverses—e.g., clockwise and counter clockwise operating states are both present.

The example duty cycle description includes time-based buckets or divisions of certain operating regions, which may be developed based upon a worst-case analysis, a given likelihood or fraction of a target segment of vehicles, an average vehicle, and/or based upon any other engineering principles to develop a duty cycle descriptive of a target system. In certain embodiments, for example during operations to design and/or size a battery pack or the like, a duty cycle description may additionally or alternatively include a progressive relationship component between duty cycle operating conditions—for example a time-based trajectory of load values over a predetermined period of time, operating shift, planned trip, representative shift or trip, etc.

Referencing Table 1, an example set of specifications for hydraulic-based non-motive load systems is depicted. The example set of specifications includes a description of the hydraulic-side load parameters (e.g., pump speed and fluid pressure), sizing of pump and motor parameters, and/or descriptions of the prime mover (e.g., an engine, which may be the motive engine or an auxiliary engine). In certain embodiments, engineering judgements or rules of thumb may be utilized to specify components sufficient to perform the intended non-motive load operations. In the example, efficiency losses in the hydraulic (or other intermediary power) system should be accounted for.

TABLE 1

Example Hydraulic-Based System Specifications

| TM Size in Cu m | Pressure in Bar | Pump cc | Motor cc | Gear Box Ratio | Engine RPM | Pump Flow in LPM | Motor Torque with Gear Box NM | Out-Put Torque Required in NM, as per Thumb Rule of 5000 NM per cu m | Approx. Motor RPM | Approx. Mixer RPM |
|---|---|---|---|---|---|---|---|---|---|---|
| 4 | 200 | 49 | 49 | 141 | 2000 | 98 | 22003 | 20000 | 2000 | 14 |
| 6 | 280 | 49 | 49 | 141 | 2000 | 98 | 30804 | 30000 | 2000 | 14 |
| 7 | 315 | 49 | 49 | 141 | 2000 | 98 | 34655 | 35000 | 2000 | 14 |

An example system for a vehicle having a motive engine and an auxiliary engine to provide power for non-motive loads includes a motive prime mover (e.g., vehicle engine 135 kW) and a non-motive prime mover (e.g., auxiliary engine 52 kW). The auxiliary prime mover, in the example, is sized to account for peak loads needed on the non-motive loads, as well as down-stream inefficiency, such as for hydraulic power conversion. The vehicle engine may include a 5 kW alternator. The auxiliary engine may power a hydraulic pump, hydraulic motor and gearbox, and drum.

Described herein is an adaptive system for power management in vehicles having significant non-motive loads, and more specifically but not exclusively in vehicles where the non-motive load is a mixer and/or a power takeoff (PTO) driven load.

Referencing FIG. 157, an example system for a vehicle having non-motive power loads, and having electrical power for those loads, is schematically depicted. The example system is set up for a 48V electrical system, although any voltage is contemplated herein. In certain embodiments, a 48V system is desirable because 48V DC may not be considered high voltage, and accordingly may not have expensive integration and component requirements. Additionally, or alternatively, 48V may be high enough such that the required current to meet a load demand does not exceed certain thresholds, or require certain components (e.g., wiring having an unusual size or gauge). The example system additionally includes an alternator 15702 on a power takeoff of the vehicle, which may allow for selective charging of an electrical energy storage 15704 (16× Pb-acid batteries, in the example of FIG. 157). In certain embodiments, the PTO is capable to, or is structured to, output 40 kW of power to the electrical system. In certain embodiments, 40 kW is available to take off of the PTO without significant changes or upgrades to the driveline for a typical vehicle utilizing the system. In certain embodiments, 40 kW to the electrical system, where a previously known system would use about 52 kW off of an auxiliary engine, is sufficient to provide similar non-motive load support. For example, in the system of FIG. 157, electrical power from the batteries is used to drive the load directly, reducing the losses from systems including a motive engine and auxiliary engine, which converts auxiliary engine mechanical power to hydraulic pressure first, and a hydraulic motor 15710 that then converts hydraulic pressure to rotational motion of a drum 15708 (e.g., through a gear box). Accordingly, a system of FIG. 157 can be driven off of a PTO (e.g., where the non-motive load on a system with auxiliary engine described herein is too high for a PTO-driven embodiment, but can be supported by a system as in FIG. 157 with lower losses). In certain further embodiments, a system of FIG. 157 includes the motors or motor/generators on an electrical system isolated from the vehicle electrical system (e.g., coupled to the 5 kW alternator 15712 on the engine 15714 side).

In certain embodiments, a system of FIG. 157 includes two electric motors to support the non-motive loads. The utilization of two electric motors rather than one electric motor provides a number of advantages, a few of which are listed herein. For example, the use of two electric motors provides for a high-power output of the system at a given voltage, without exceeding a current limitation in the system. In another example, the use of two electric motors allows for a greater power turndown ratio while keeping the motors operating more closely to an efficient operating condition for the motor (e.g., by turning off a motor at low power output levels). In another example, the use of two electric motors allows for redundant protection for the vehicle mission—for example providing a backup power source where a motor is lost at low power output such as mixing or standby operation.

Referencing FIG. 158, another example system is schematically depicted for driving a non-motive load using electrical power, which may be consistent with the example system of FIG. 157. The example system of FIG. 158 includes two electric motors (M1 15802, M2 15804) coupled to a non-motive load 15808 (e.g., a mixer drum) through a main gear 15810 (any type) and to an inverter and motor controller 15814. The arrangement of FIG. 158 allows for either one or both of the electric motors M1, M2 to operate the non-motive load. Additionally, or alternatively, each electric motor (M1, M2) has an associated battery pack 15812 (e.g., 8 batteries each, in the embodiment of FIG. 158. The battery packs may be separated and isolated to each motor, or they may be integrated together. Additionally, one or more battery packs may be electrically coupled (or couplable) to a main vehicle electrical system, and/or one or more, or all, battery packs may be isolated from the main vehicle electrical system. The example system utilizes an inverter to utilize DC power and thereby operate one or more AC motors. The example system further includes an on-board charger (not shown) that can power the battery packs for the electric motors M1, M2. In certain embodiments, the system may include (not shown) one or more alternators couplable to the driveline (e.g., using a PTO and/or countershaft gear interface). An example system includes two alternators having 20 kW capability each powered from the driveline.

Referencing FIG. 159, another example system is schematically depicted for driving a non-motive load using electrical power, which may be consistent with the example system of FIG. 157 and/or FIG. 158. The example system includes each motor 15902 (or motor/generator) coupled to the non-motive load 15904 (e.g., a drum) through a gear box (and/or through a main gear 15908). Accordingly, operation of one or both motors M1, M2 results in turning the drum, with the direction of the drum turning dependent upon the turning direction of the motor M1, M2 and the gearing in the gear box and main gear. The example system includes a PTO gearbox 15910 coupled to two alternators 15912, 15914 in a configuration to selectively charge the batteries 15918, and an inverter 15920 (or inverters) that use batter power to drive the motors M1, M2. The example system includes 8 batteries on each battery pack, although the number of batteries on each battery pack is configurable to any number. In certain embodiments, the number of batteries is selected according a number of batteries in a group to provide sufficient selected voltage, and a number of groups of the batteries to provide the desired current output and total amp-hour support desired for the system. The example system includes an on-board plug-in charger 15922.

An example system includes two motors, allowing for reduced power for each motor and improved system redundancy. Additionally, the lower power motors reduce the packaging cost (size, weight, interface hardware costs, and design time) of the solution. Additionally, a system includes an onboard charger for battery charging, which can be used instead of or as an augmentation to PTO alternator charging. In certain embodiments, the plug-in charger can be used during washing, loading, and/or parking (e.g., overnight) of the vehicle. It can be seen that a system of the present disclosure can be designed with an equivalent, or reduced, cost relative to an auxiliary engine-hydraulic power solution. Additionally, a system of the present disclosure has equivalent or improved operational capability, and a reduced power consumption relative to previously known systems.

It can be seen that the systems described in the present disclosure provide for a more efficient delivery of non-motive power, both in terms of power consumed to support the non-motive load, and further in terms of system weight, number of interfaces, maintenance requirements, and the like. It can further be seen that the system described in the present disclosure are adaptable to be installed (e.g., as an upgrade) on previously known systems, for example using interfaces within the typical capabilities of such interfaces on previously known systems (e.g., a PTO interface), thus allowing for ready conversion of previously known systems, rapid design of systems that will be newly built, and/or maximizing the commonality of treatment (e.g., maintenance, parking, cleaning, and other routine treatment) between previously known systems and systems of the present disclosure.

As shown in FIG. 160, kinetic energy of the input shaft speed is being used to roll-crank an engine during a shift. This will reduce Fuel consumption and increase Passenger comfort, as opposed to other systems using a different HEV architecture and Motor torque for engine cranking.

For Hybrid Electric buses, a feature called Engine Off While Driving may be implemented. Once the engine is switched off, the vehicle may be run only using motor which is splined to the Input Shaft of the transmission. If the need for extra torque arises, then the engine may be switched on. One way of cranking the engine is rolling crank using the vehicle's kinetic energy. In rolling cranking, the kinetic energy from Input shaft+Motor+rotating gears is transferred to engine by slowly closing the clutch until it cranks. This method allows the engine to be cranked without shifting to neutral gear. But during rolling cranking, passengers may experience slight discomfort because the clutch is closed and there are some drive-line oscillations for a brief period. Also in existing implementation, rolling cranking may require that Input Shaft Speed (ISS) should be sufficiently high and shift should not be in process. In certain implementations, rolling cranking may happen in the phase just after 2-3 or 3-4 upshift is completed and the vehicle is accelerating. Rolling crank may happen in acceleration phase and may cause slight discomfort to passengers.

In some embodiments, rolling crank may happen just before the next upshift event. In this case, the Engine may be cranked and then fuel is burnt and as the upshift starts, the clutch may be opened again as ISS needs to drop for the next upper gear and engine speed again drops down to idle speed. In this embodiment, fuel may be wasted. Then again after the upshift, the clutch may be closed and passengers may experience discomfort again due to drive-line oscillations. The clutch may be closed twice, once for rolling crank and again for shift recovery.

This method, depicted in FIG. 160, executes rolling cranking just when the upshift starts and both the upshift and rolling cranking get completed together. If both the rolling cranking and upshift are timed together, then as the clutch is closed, ISS will lose sufficient kinetic energy to bring it to the sync speed for next gear and simultaneously Engine speed will gain kinetic energy bringing it up until the engine cranks. The embodiment involves pulling to neutral during the unlock phase of shift and then during the sync phase, closing the clutch slowly transferring the rotational energy from ISS+motor+clutch to the Engine.

After complete clutch closure, both ISS and Engine speed will be same. This speed will be above the engine cranking speed. In case the common speed is below the sync speed for next gear, positive motor torque may be provided to increase the ISS to sync speed. In case, the common speed is higher than the sync speed, negative motor torque may be provided to lower the ISS to sync speed. In case the common speed is close to sync speed, motor torque may not be needed. In embodiments, the engine may be cranked primarily using the Kinetic energy from ISS+Motor+Clutch and motor torque, if needed, is serving an assisting function to correct for sync speed of next gear. Since clutch may be required both for shifting and rolling cranking, precise operation may be desired.

Advantages of the method depicted in FIG. 160 include: 1. Clutch is closed only once instead of two times in existing implementation, so passenger discomfort is reduced; 2. Fuel is saved as rolling cranking is not done before upshift but it is done simultaneously with upshift; 3. In an existing implementation, rolling cranking is done during acceleration phase. So the vehicle kinetic energy used to crank engine includes the energy which was earlier provided by the motor for acceleration up to that point. If the rolling cranking happens during upshift, then the extra motor battery energy which is used after upshift to increase ISS before rolling cranking in existing implementations will be saved; 4. Based on the frequency of rolling cranking, appropriate fuel saving will be observed with the proposed method.

Referring to FIGS. 93, 95, 96, and 99, a system for monitoring a vehicle battery 9300 may include a battery pack 9302 which may include a plurality of batteries 9304, and a power converter 9308 to modulate the flow of power between a prime mover 9310 of a vehicle, an electric load 9312 of the vehicle and the battery pack 9302. A controller 9314 may include a battery monitoring circuit 8318, a battery health circuit 9320, and a power management circuit 9322. The controller 9314 interpret battery information 9340 such as battery temperature value 9326, battery ID 9330, and battery values 9328.

The battery monitoring circuit 9318 interprets battery temperature values 9326 including battery terminal temperature, battery bulk temperature, battery element temperature, negative battery terminal temperature, positive battery terminal temperature, and the like. The battery health circuit 9320 determines a battery status 9332, a terminal status 9338, or both, for one of the plurality of batteries 9304 in response to the battery temperature value from the corresponding battery 9304. The power management circuit 9322 may then adjust operations of the power converter 9308 in response to the battery status 9332, or terminal status 9338, or both.

The battery monitoring circuit 9318 may also interpret other battery values 9328 such as battery input current value, battery output current value, battery current value, battery internal resistance value, and the like. The battery monitoring circuit 9318 may also interpret a battery ID for a given battery. The battery health circuit 9320 may use these battery values 9328 and/or the battery ID 9330 as part of determining the battery status 9332, or the terminal status 9338. Battery status 9332 may include a battery status of charge, a battery state of health, a battery capacity value, a battery age value, a battery history value, or the like. The terminal status 9338 may include a terminal connection status, a terminal connectivity status, a terminal resistance value, or the like.

In embodiments, each battery 9304 in the battery pack 9302 may include a corresponding battery controller 9324. The battery controller 9324 provides battery information 9340 for its corresponding battery 9304, such as battery temperature value 9326, battery ID 9330, or battery values 9328, to the controller 9314 and associated battery monitoring circuit 9318 and battery health circuit 9320.

A battery controller 9324 may include a battery sensor 9902, and a 5 volt microcontroller 9904. The battery sensor 9902, may include a 5V linear regulator 9908, a fly back controller 9910. The fly back controller 9910 may receive a command value 9912 from the 5V microcontroller 9904 and output power to a bus 9914 in response to the command value 9912. The bus 9914 may be low voltage (5V, 3V, or the like) and electrically isolated from the rest of the vehicle.

The system for monitoring a vehicle battery 9300 may also include a contact controller 9334 to isolate one or more batteries 9304 of the battery pack 9302, provide reverse polarity protection, provide service protection for the battery pack 9302 or the like. The contact controller 9334 receives battery information 9340 from the battery sensor 9902.

Figure 101:
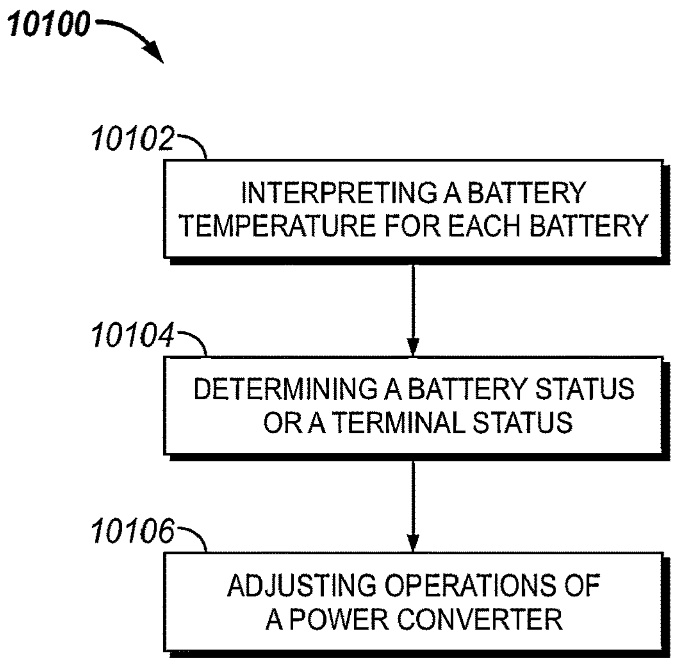
FIG. 101 depicts a method for monitoring a vehicle battery.
Figure 103:
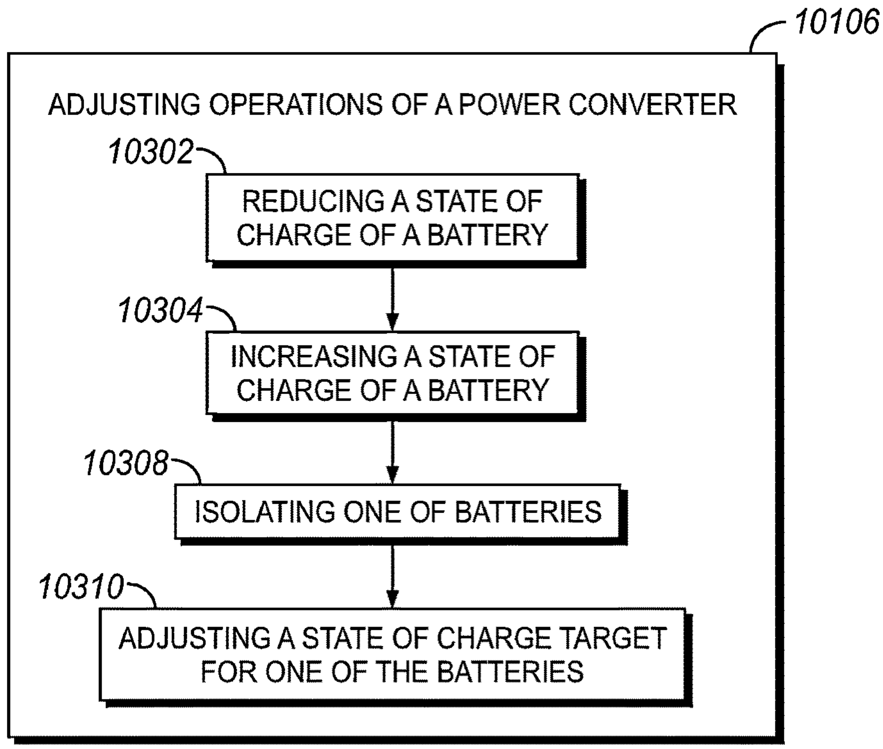
FIG. 103 depicts options for adjusting operations of a power converter.
Figure 106:
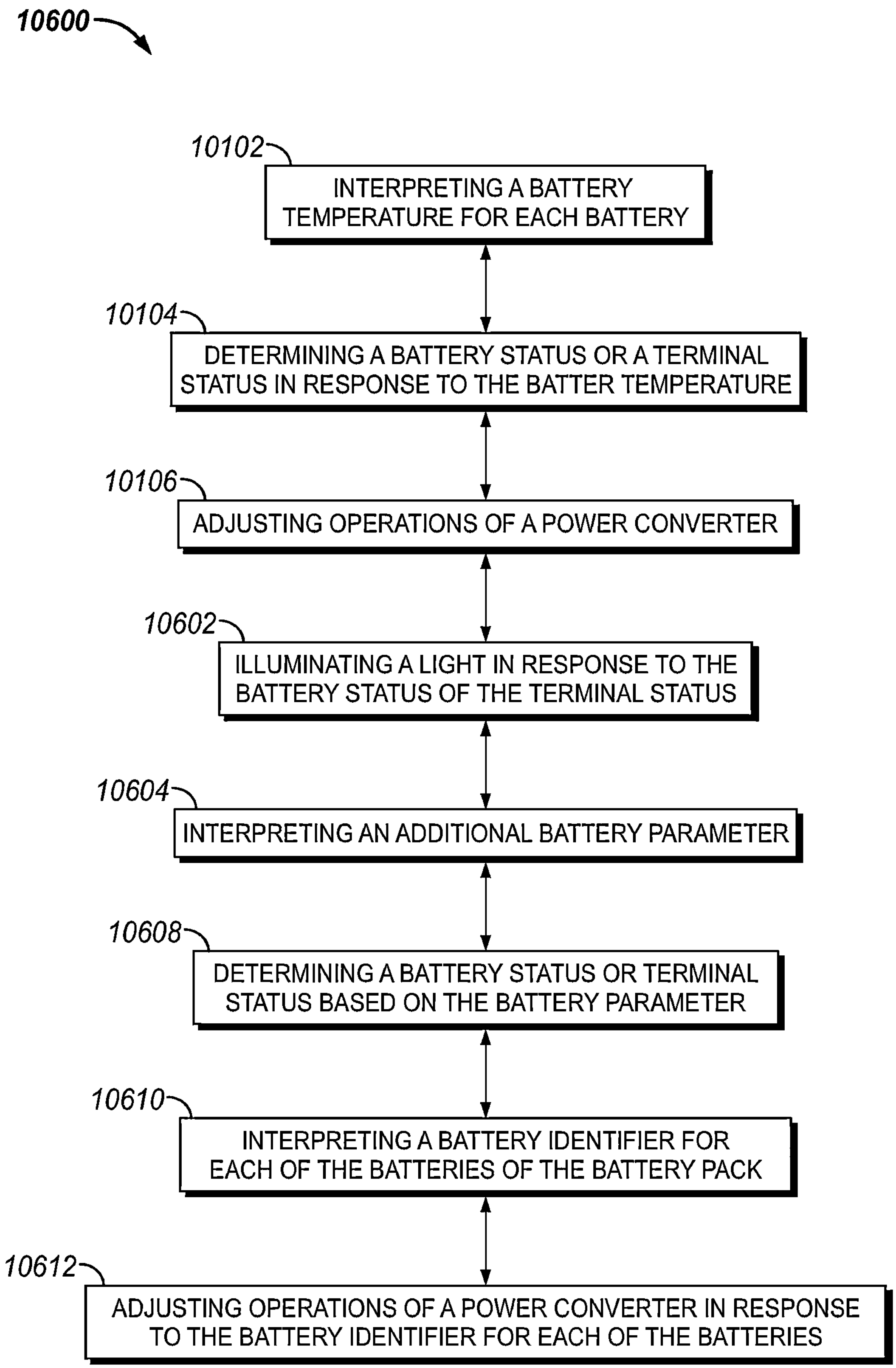
FIG. 106 depicts a method for monitoring a vehicle battery.

Referring to FIGS. 101, 103, and 106, a method for battery management 10100 may include interpreting 10102 a battery temperature for each battery of a battery pack, determining 10104, at least partially in response to the battery temperature value, a battery status, or a terminal status of the corresponding battery. In response to the battery status or terminal status, the method may further include adjusting operations 10106 of a power converter which moderates the flow of power between a prime mover of the vehicle, an electric load, and the battery pack. Adjusting operations 10106 may include reducing a state of charge of a battery 10302, increasing a state of charge of a battery 10304, isolating one of the batteries 10308, adjusting a state of charge target for one of the batteries 10310, or the like.

A method for battery management 10600 may include interpreting 10102 a battery temperature for each battery of a battery pack, determining 10106, at least partially in response to the battery temperature value, a battery status of the corresponding battery, or a terminal status of the corresponding battery. In response to the battery status or terminal status, the method may further include adjusting operations 10106 of a power converter which moderates the flow of power between a prime mover of the vehicle, an electric load, and the battery pack. The method for battery management 10600 may include illuminating 10602 a light in response to the battery status or terminal status, interpreting 10604 additional battery values or parameters, and determining 10608 a battery status or terminal status based on the additional battery values or parameters. The method for battery management 10600 may include interpreting 10610 a battery identifier for one or more batteries in the battery pack (including for each of the batteries of the battery pack), and adjusting 10612 operations of a power converter in response to the battery identifiers.

Figure 80:
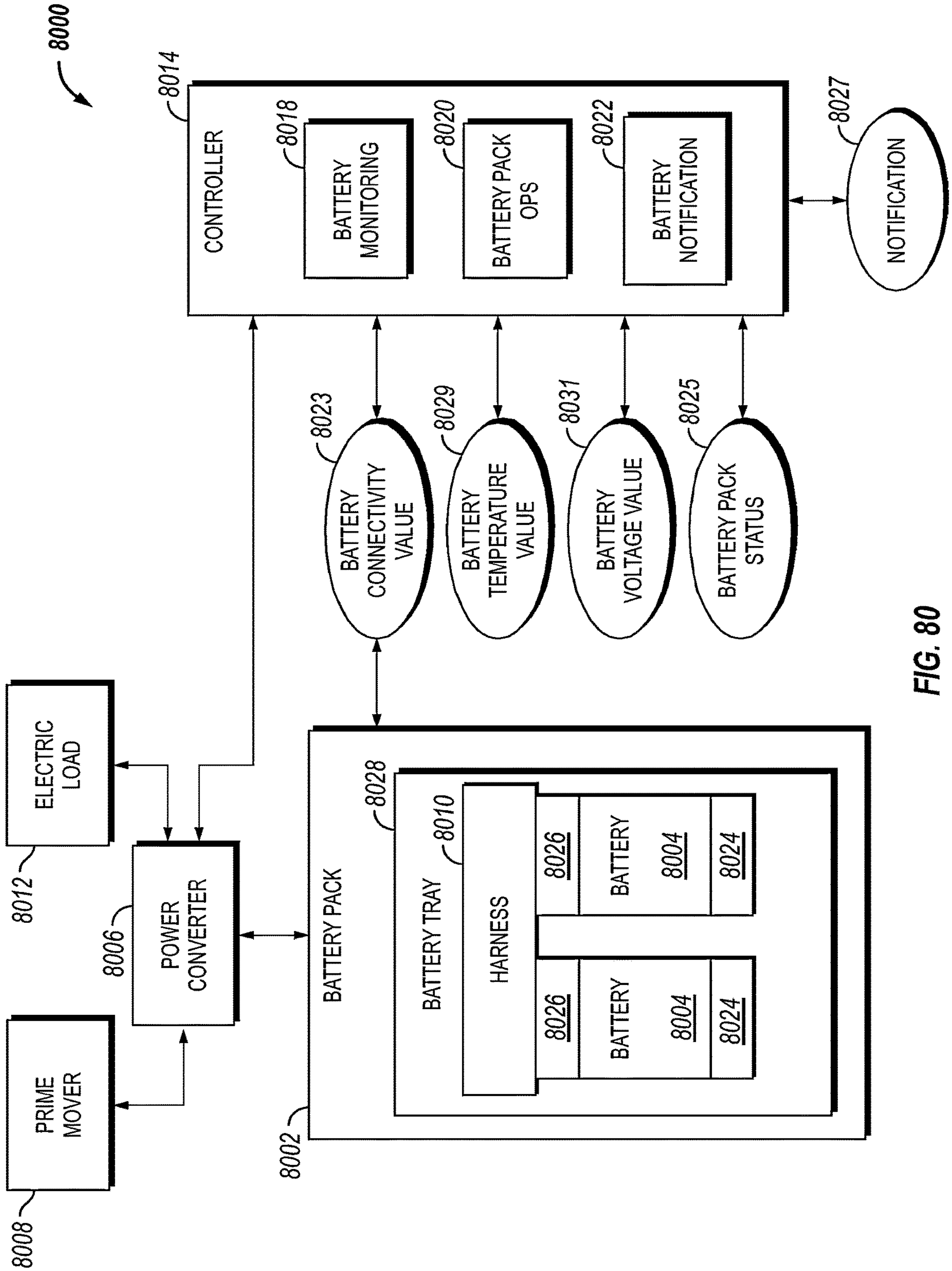
FIG. 80 depicts a schematic of a battery monitoring system.

Referring to FIG. 80, a battery monitoring system 8000 may include a battery pack 8002 holding a plurality of batteries 8004, a power converter 8006, and a controller 8014. The power converter 8006 modulates the flow of power between a prime mover 8008 of a vehicle, the battery pack 8002, and an electric load 8012. The controller 8014 includes a battery monitoring circuit 8018, a battery pack operation circuit 8020, and a battery pack notification circuit 8022.

The battery pack 8002 includes a battery tray 8028 structured to house at least two batteries 8004 of the battery pack 8002. The battery tray 8028 may also include a wiring/battery connection harness 8010 for the batteries 8004.

Each battery 8004 in the battery pack 8002 includes a reverse battery detection circuit 8024, coupled across the power bus connecting the battery positive terminal to ground, to provide a battery connectivity value 8023 for each battery 8004. Referring to FIG. 47, the reverse battery detection circuit 8024 includes a full bridge rectifier 4712. The rectifier 4712 includes two pairs of diodes 4708, 4710 connected in parallel, and a light emitting diode (LED) 4702 connected in series with a resister 4714, the combination connected in parallel with the pairs of diodes 4708, 4710. There is an input connector 4718, interposed between the diodes of the first pair of diodes 4710, that is couplable to the positive terminal of the battery 8004. There is a ground connector 4720, interposed between the diodes of the second pair of diodes 4708. Then the battery is installed improperly (connected in reverse) current will be conducted (i.e. flow) through the LED 4702, which will illuminate, indicating an error in battery 8004 installation. In embodiments the LED 4702 for each battery may be visible on a vertically upper side of the battery tray (see LED 7510 in FIG. 75C). Each reverse battery detection circuit 8024 is electrically coupled to the battery tray and grounded to at least one battery 8004 of the battery pack 8002.

Each battery 8004 in the battery pack 8002 may have an associated battery sensor 8026 which provide a battery temperature value 8029 for the associated battery 8004. The battery temperature value 8029 may include a temperature at the negative terminal of the associated battery 8004, a temperature at the positive terminal of the associated battery 8004. The associated battery sensor 8026 may also provide a battery voltage value 8031.

The battery monitoring circuit 8018 interprets a battery connectivity value 8023 for each battery 8004. In embodiments, the battery connectivity value may be interpreted in view of a battery temperature value 8029 exceeding a threshold temperature value, a rate of change of the battery temperature value 8029, an amount of temperature change, an amount of temperature rise, and the like. The battery connectivity value may be interpreted in view of a battery voltage value 8031. The battery pack operation circuit interprets a battery pack status 8025 in response to the battery connectivity value 8023. The battery pack notification circuit 8022 then provides a notification 8027 in response to the battery pack status 8025.

Referring to FIG. 82, a method 8200 for monitoring a battery pack is shown. The method may include interpreting a battery connectivity value 8202 for each battery in a battery pack. The method may further include interpreting a battery pack status 8204, in response to the battery connectivity value, and then providing a notification 8208 in response to the battery pack status where the notification may include lighting a selected light emitting diode (LED) in response to a reverse connection or a disconnected value. Finally, the method 8700 may include operating a power converter 8210, in response to the battery pack status, to control power flows between the battery pack, a prime mover for the vehicle, and an electric load.

Figure 87:
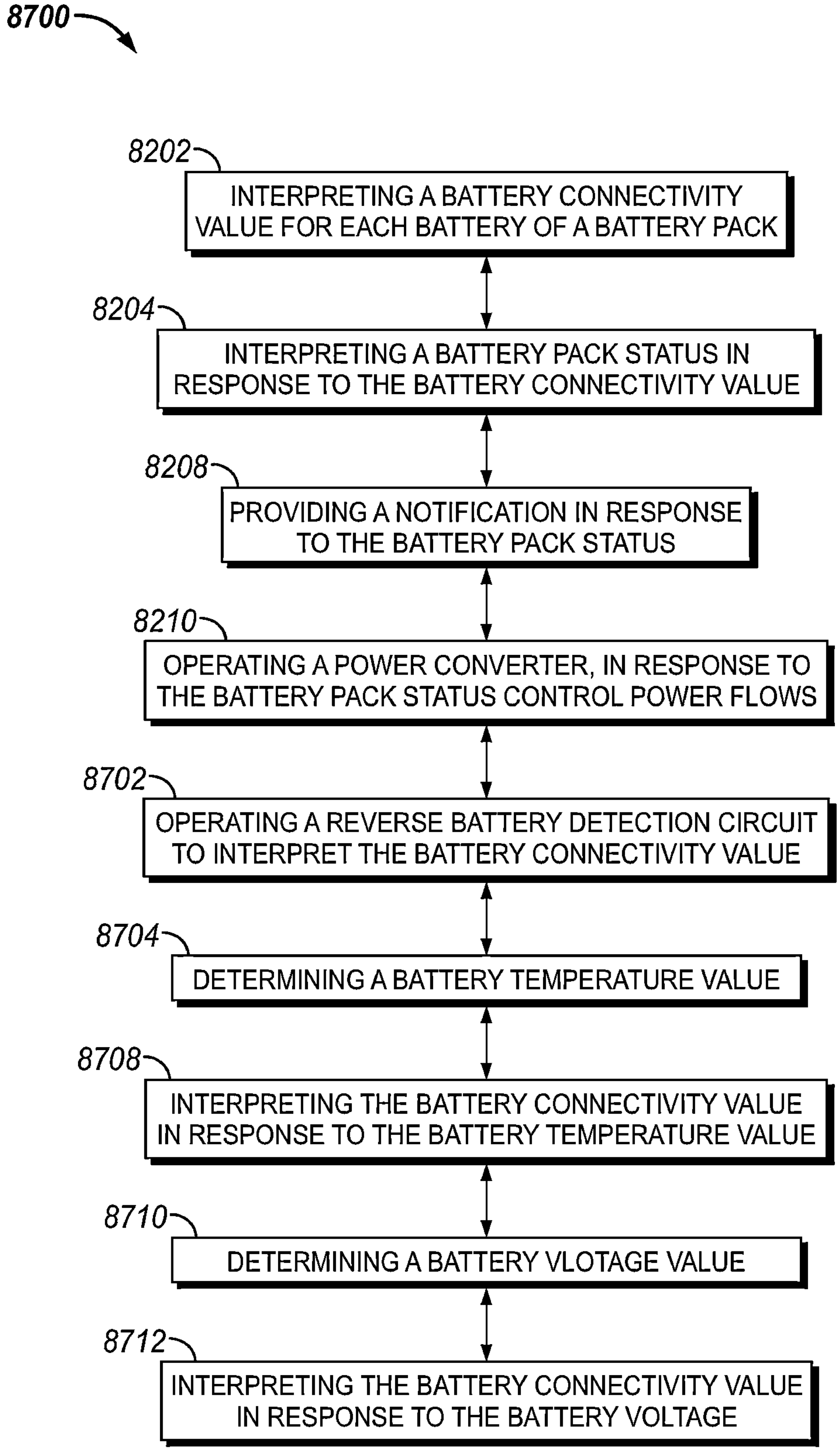
FIG. 87 depicts a battery monitoring method.

Referring to FIG. 87, a method 8700 for monitoring a battery pack is shown. In addition to the steps of method 8200, the method 8700 includes operating a reverse battery detection circuit 8702 to interpret the battery connectivity value for each battery of the battery pack. For each battery, the method may further include determining a battery temperature value 8704 and interpreting the battery connectivity value 8708 in response to the battery temperature voltage value. For each battery, the method may further include determining a battery voltage value 8710 and interpreting the battery connectivity value 8712 in response to the battery temperature voltage value.

Figure 90:
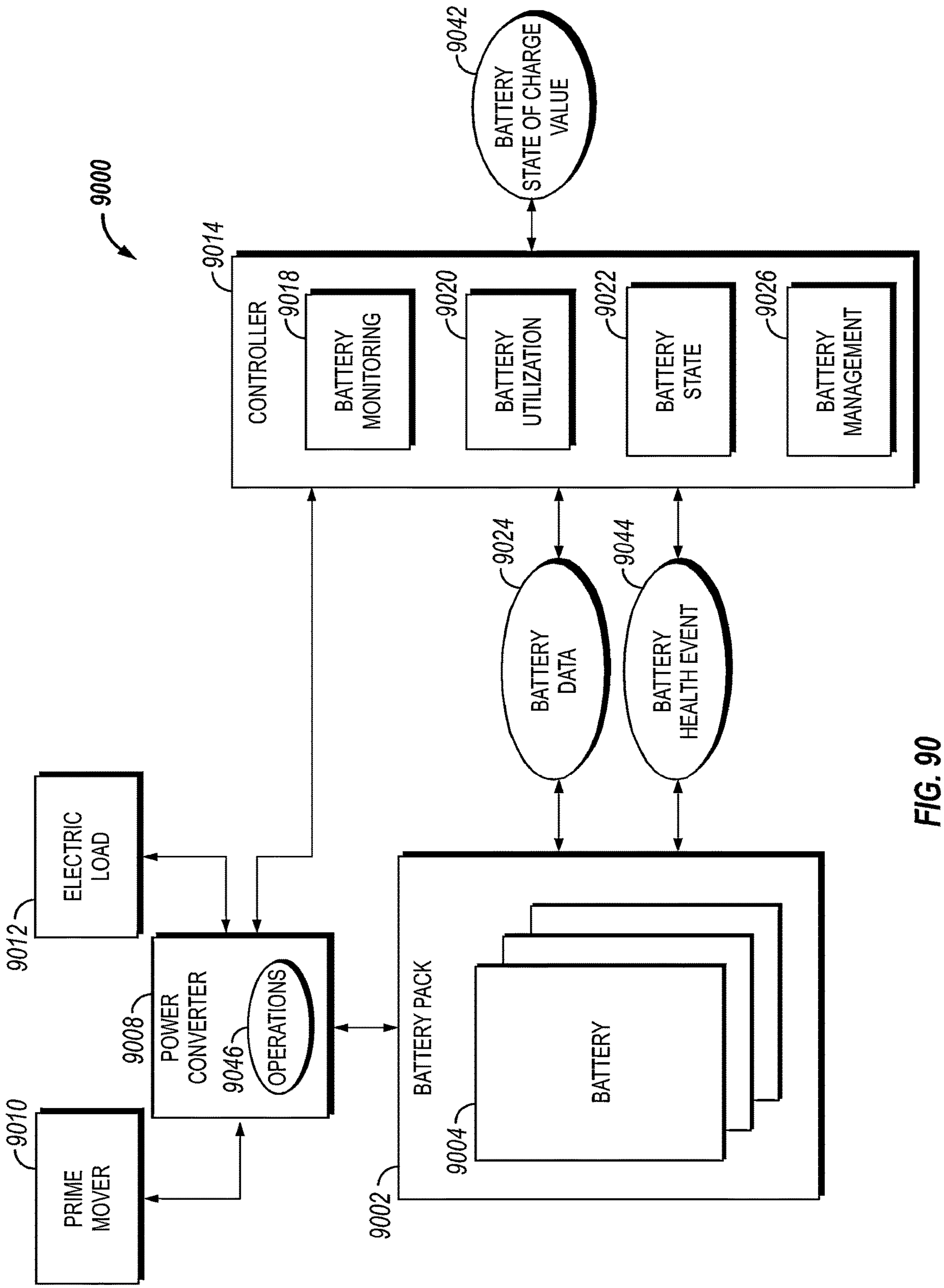
FIG. 90 depicts a schematic of a battery monitoring system.

Referring to FIG. 90, a battery monitoring system 9000 is depicted. The battery monitoring system includes a battery pack 9002 including a plurality of batteries 9004 connected in series. A power converter 9008 modulates the flow of power between a prime mover 9010 of a vehicle, the battery pack 9002, and an electric load 9012. The battery monitoring system 9000 also includes a controller 9014 including a battery monitoring circuit 9018, a battery utilization circuit 9020, a battery state circuit 9022, and a battery management circuit 9026. The battery pack 9002 may provide battery data 9024 to the controller 9014 for use by the battery monitoring circuit 9018. The controller and the battery utilization circuit 9020 may determine a battery state of charge value 9042 based on battery data 9024 or a battery health event 9044.

Referring to FIG. 154, battery data 9024 may include, for at least one battery 9004 of the battery pack 9002, an internal resistance estimate 15402, an internal resistance feedback estimate 15404, a battery current value 15406, a battery state of charge feedback value 15408, a leakage current value 15410, a leakage current feedback value 15412, or the like.

Figure 107:
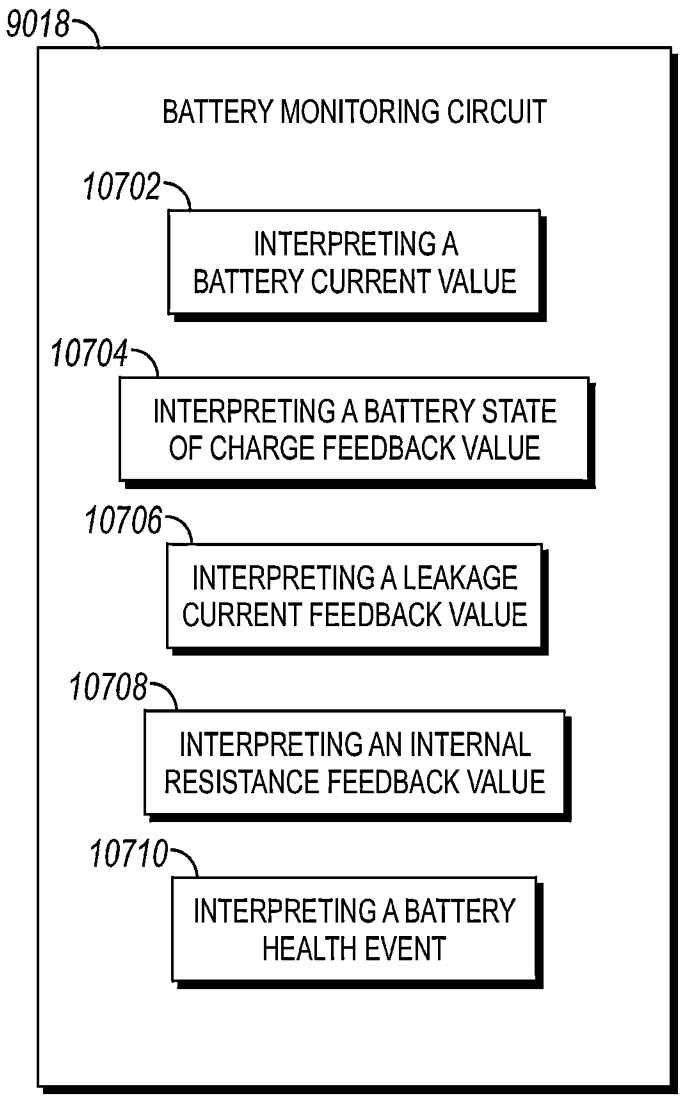
FIG. 107 depicts a schematic of a battery monitoring circuit.
Figure 108:
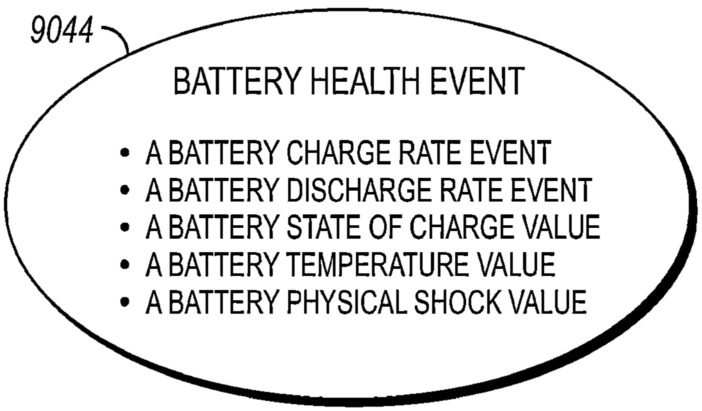
FIG. 108 depicts battery health events.

Referring to FIG. 107, the battery monitoring circuit 9018, may be structured to interpret battery data 9024, for each battery of the battery pack. This may include interpreting a battery current value 10702, interpreting a battery state of charge feedback value 10704, interpreting a leakage current feedback value 10706, interpreting an internal resistance feedback value 10708, interpreting a battery health event 10710, or the like. Referring to FIG. 108, a battery health event may include one or more of: a battery charge rate event, a battery discharge rate event, a battery state of charge value, a battery temperature value, a battery physical shock value, or the like.

Figure 110:
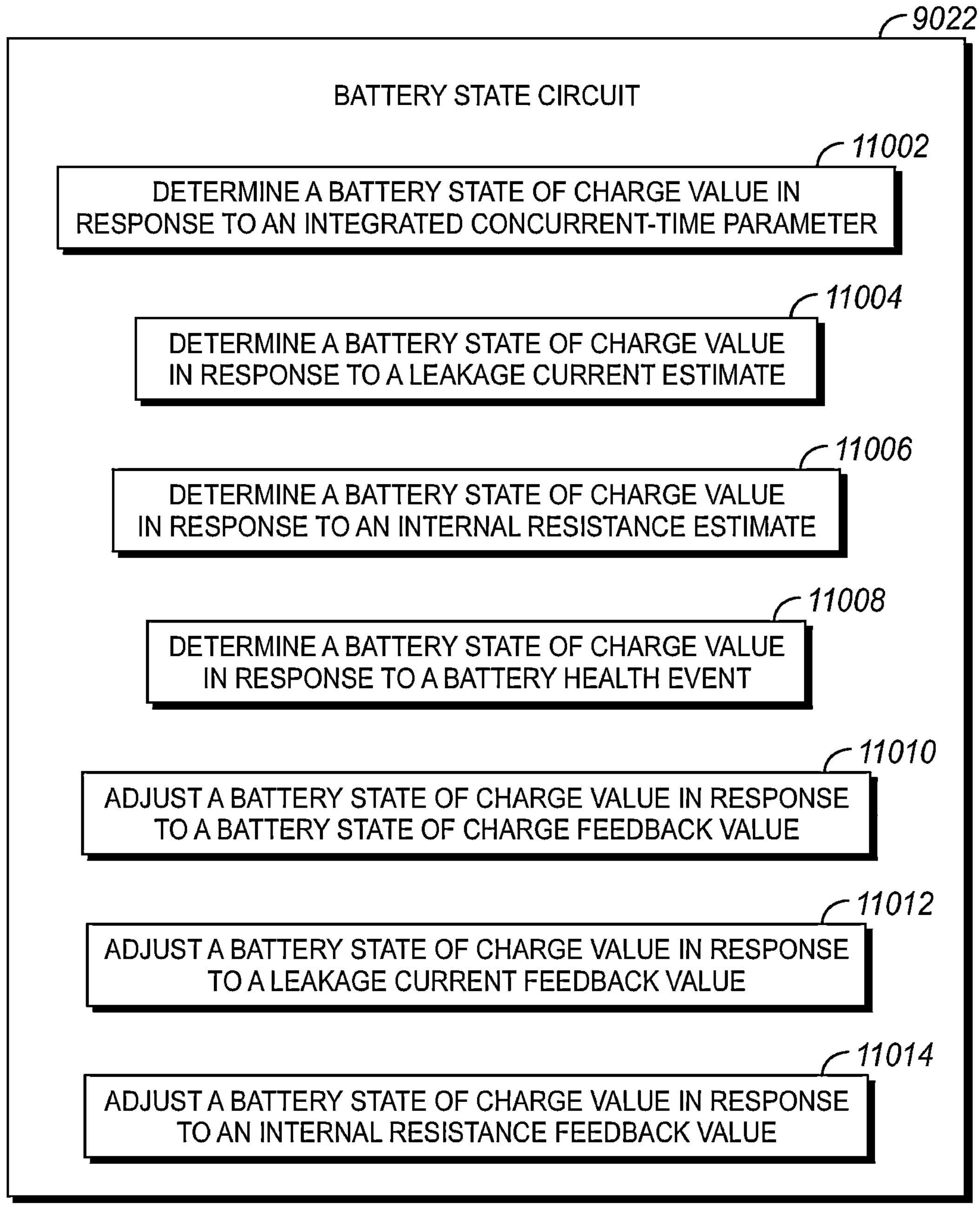
FIG. 110 a schematic of battery state circuit

Referring to FIG. 110, the battery state circuit 9022 may, for one or all batteries of the battery pack, determine a battery state of charge value 9042 and adjust the battery state of charge value 9042. This may include determining a battery state of charge value in response to an integrated current-time parameter 11002, determining a battery state of charge value in response to a leakage current estimate 11004, determining a battery state of charge value in response to an internal resistance estimate 11006, determining a battery state of charge value in response to a battery health event 11008, and the like. This may further include adjusting a battery state of charge in response to a battery state of charge feedback value 11010, adjusting a battery state of charge value in response to a leakage current feedback value 11012, adjusting a battery state of charge value in response to an internal resistance feedback value 11014, or the like.

Figure 113:
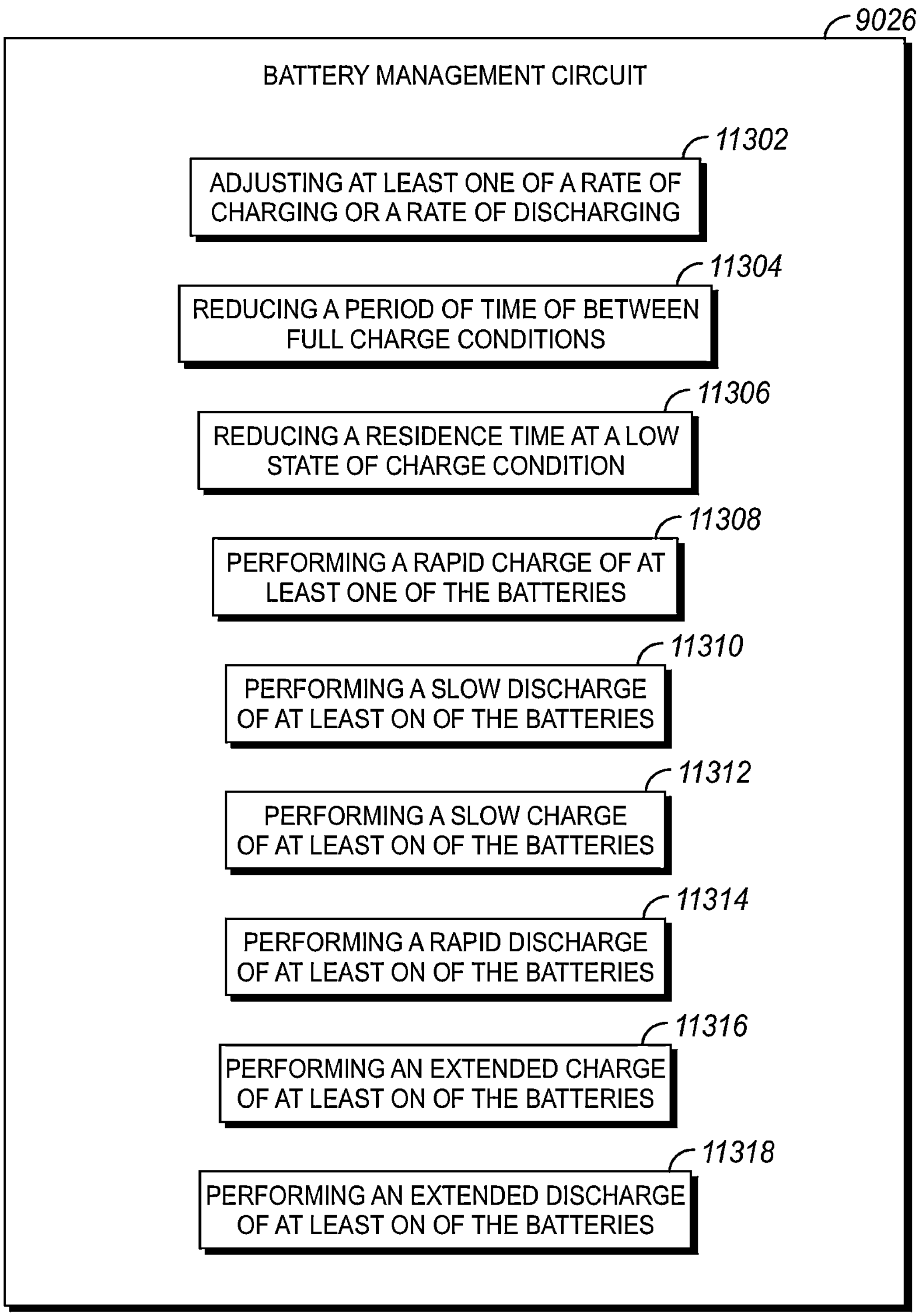
FIG. 113 a schematic of a battery management circuit

Referring to FIG. 113, the battery management circuit 9026 adjusts operations 9046 of the power converter 9008. Adjusting operations of the power converter 9008 may be include, for one or more of the batteries: adjusting a rate of charging or a rate of discharging 11302, reducing a period of time between full charge conditions 11304, reducing a residence time at a low state of charge 11306, performing a rapid charge 11308, performing a slow charge 11312, performing a slow discharge 11310, performing a rapid discharge 11314, performing an extended charge 11316, performing an extended discharge 11318, or the like.

Figure 116:
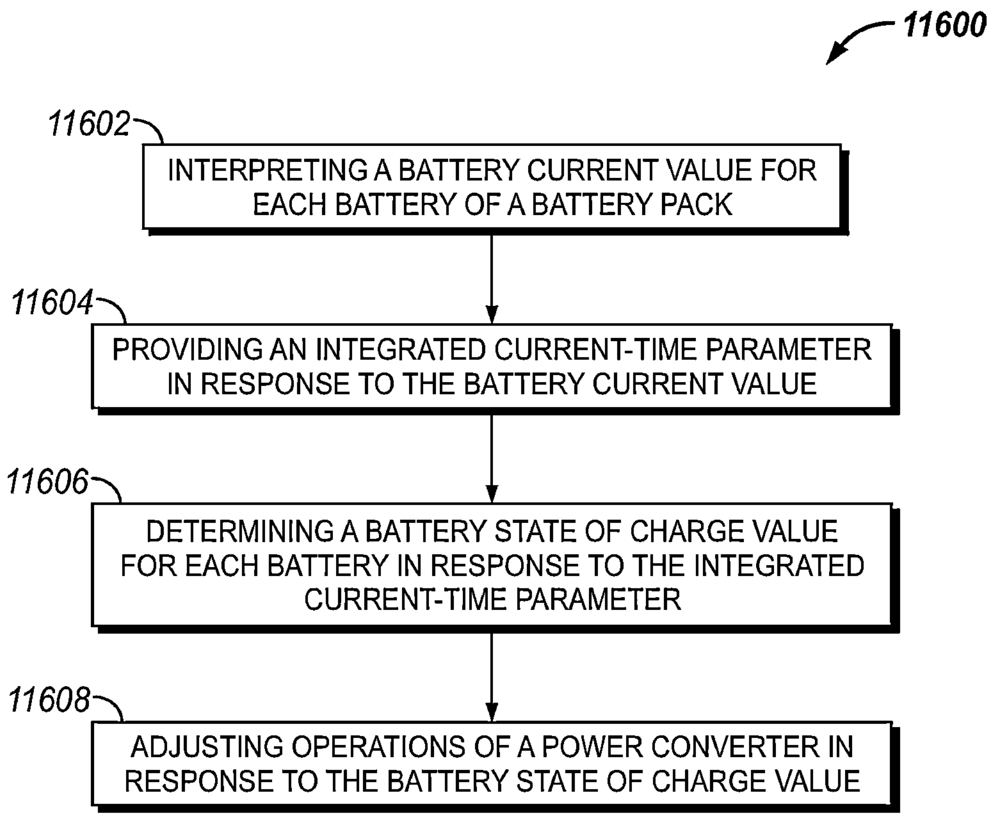
FIG. 116 a flow chart for monitoring and managing a battery.

Referring to FIG. 116, a method 11600 for monitoring a battery and managing power flow may include interpreting a battery current value for each battery of a battery pack 11602 and providing an integrated current-time parameter in response to the battery current value 11604. The method 11600 may further include determining a battery state of charge value in response to the integrated current-time parameter 11606 and adjusting operations of a power converter in response to the battery state of charge value 11608.

Figure 120:
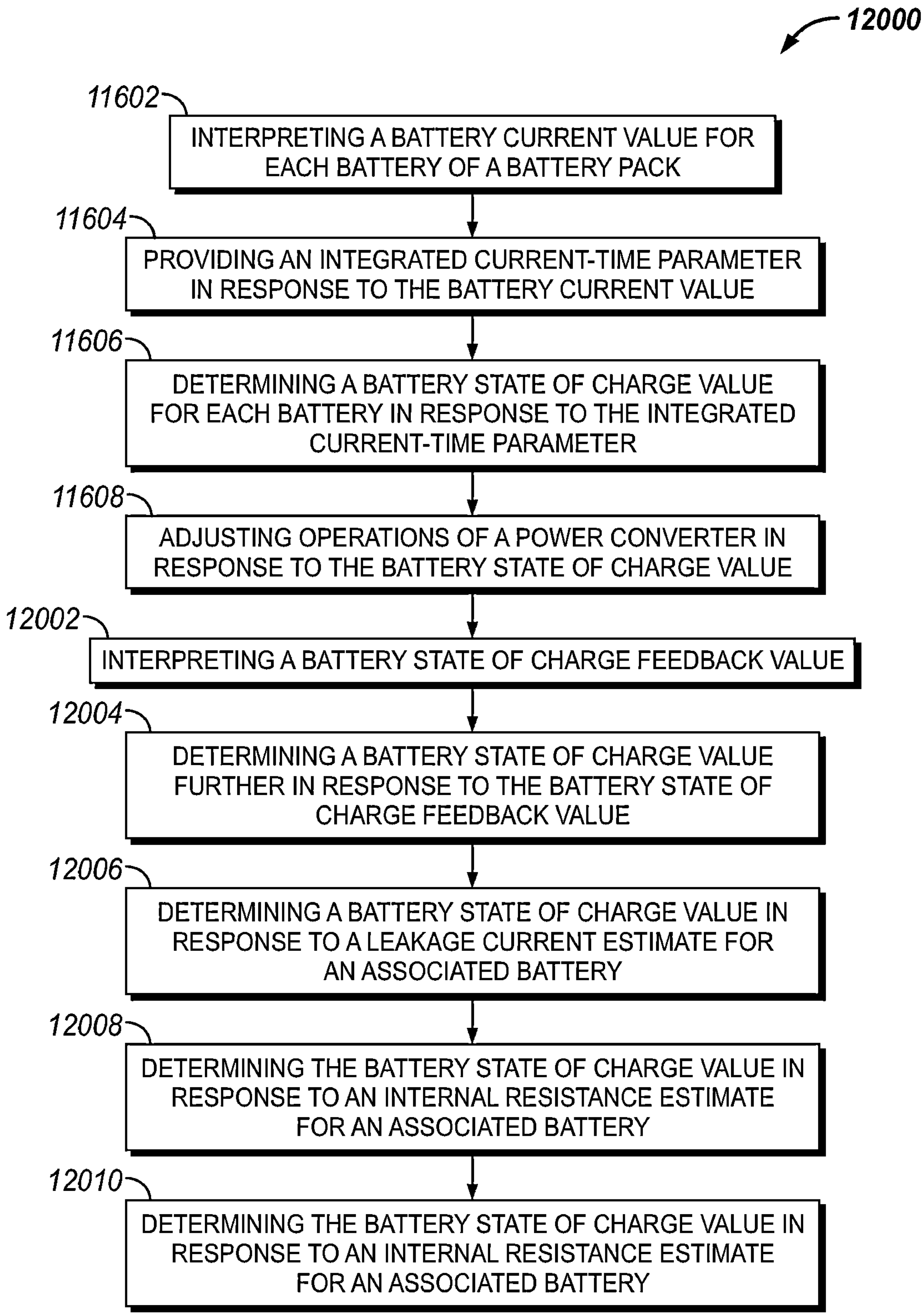

Referring to FIG. 120, a method 12000 for monitoring a battery and managing power flow may also include interpreting a battery current value for each battery of a battery pack 11602 and providing an integrated current-time parameter in response to the battery current value 11604. The method 11600 may further include determining a battery state of charge value in response to the integrated current-time parameter 11606 and adjusting operations of a power converter in response to the battery state of charge value 11608. The method 12000 may further include interpreting a battery state of charge feedback value 12002, determining a battery state of charge value further in response to a battery state of charge feedback value 12004. The method 12000 may further include determining a battery state of charge value in response to a leakage current estimate for an associated battery 12006, determining the battery state of charge value in response to an internal resistance estimate for an associated battery 12008, and determining the battery state of charge value in response to an internal resistance estimate for an associated battery 12010.

Figure 121:
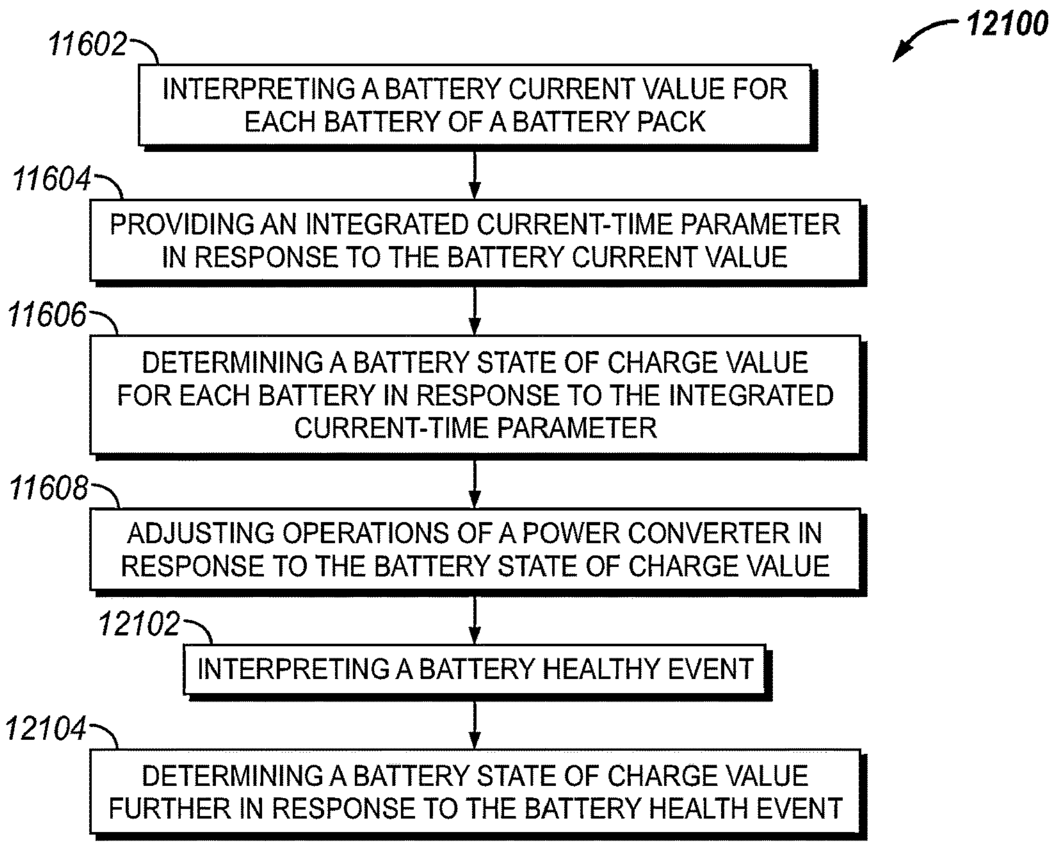
Figure 122:
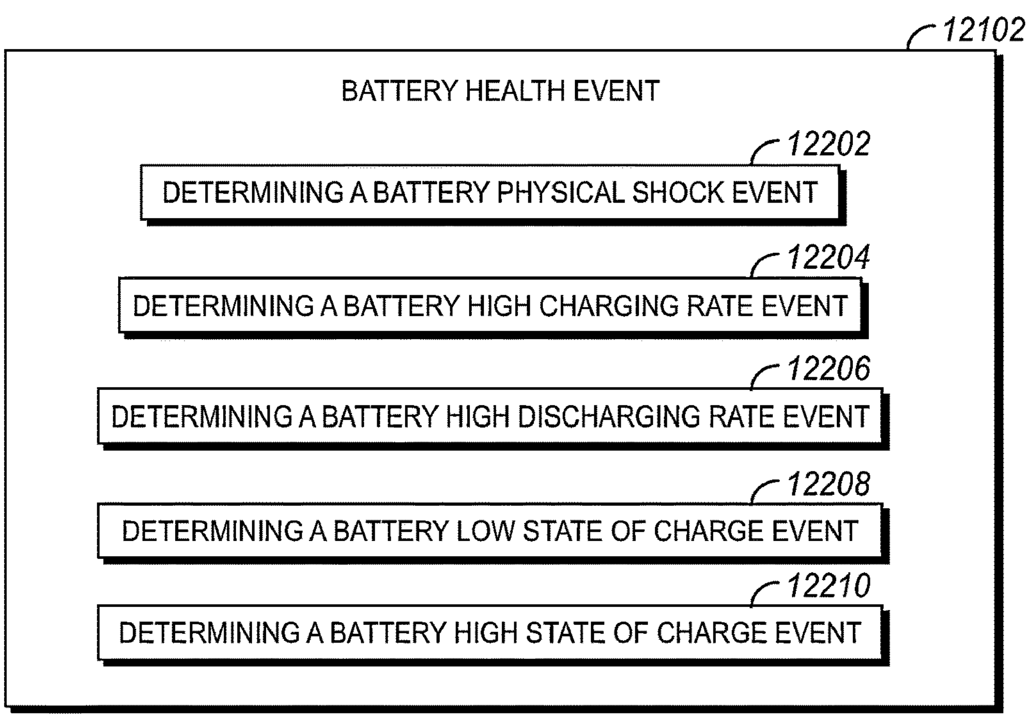

Referring to FIG. 121, a method 12100 for monitoring a battery and managing power flow may also include interpreting a battery current value for each battery of a battery pack 11602 and providing an integrated current-time parameter in response to the battery current value 11604. The method 11600 may further include determining a battery state of charge value in response to the integrated current-time parameter 11606 and adjusting operations of a power converter in response to the battery state of charge value 11608. The method 12100 may further include interpreting a battery health event 12102 and determining a battery state of charge value further in response to the battery health event 12104. Referring to FIG. 122, interpreting a battery health event 12102 may include determining a battery physical shock event 12202, determining a battery high charging rate event 12204, determining a battery high discharging rate event 12206, determining a battery low state of charge event 12208, determining a battery high state of charge event 12210, or the like.

Referring to FIG. 153, adjusting operations of a power converter in response to the battery state of charge value 11608 may include adjusting a charging rate of at least one of the batteries 15302, adjusting a discharging rate of at least one of the batteries 15304, liming an amount of time between charged states of at least one of the batteries 15306, and the like.

FIG. 30A, FIG. 30B, FIG. 33, FIG. 69, FIG. 70, FIG. 71, FIG. 72C, FIG. 73B, FIG. 78, FIG. 81, and FIG. 102 depict various embodiments of a battery assembly for a vehicle. An example battery assembly for a vehicle may include a plurality of batteries 7008; a busbar 6910, 7004 coupled to a tray 6902, 7002, wherein the busbar 6910, 7004 provides for selected coupling between the plurality of batteries 7008 in response to the tray 6902, 7002 being positioned on top of the plurality of batteries 7008; and a locking arrangement 6908, 7010, 3010, 3024 to secure the plurality of batteries in a battery box 3002.

The tray 7002 may be configured for a single battery, and wherein the busbar 7004 couples to an adjacent battery by coupling to a second busbar 7022 of a second tray 7024. The busbar may be coupled to the tray by one of mechanical coupling, insert molding, or over molding.

In embodiments, the plurality of batteries may be arranged to provide for a 48V nominal power source. In embodiments, the plurality of batteries may each comprise at least one of lead acid, lithium ion, or 12V batteries. In embodiments, the plurality of batteries comprises at least four (4) batteries.

In embodiments, the plurality of batteries includes a first group of batteries 7344; a second group of batteries 7348 comprising a second plurality of batteries; and a second busbar 7342 providing for selected coupling between the second group of batteries in response to a second tray 7304 being positioned on top of the second plurality of batteries. In embodiments, each of the first group of batteries and the second group of batteries includes two batteries. A jumper connection 7310, which may be a curved busbar, may couple the busbar 7308 to the second busbar 7342.

In embodiments, the battery assembly may further include an insulating sheet 3328 separating busbars, wherein the insulating sheet 3328 may include a notch to expose a portion of a circuit board of the battery assembly, wherein the top of the circuit board contacts one busbar and a bottom of the circuit board contacts a second, adjacent busbar.

In embodiments, the tray comprises a circuit board, wherein the circuit board is used as an insulator between the busbar and the second busbar, wherein a metal fastener electrically couples the busbar to a monitoring circuit.

In embodiments, the tray comprises a single tray 7102, 7402 placed across the plurality of batteries, and wherein the busbar 7202, 7404 is molded into the single tray and connects the plurality of batteries in series.

In embodiments, wherein the locking arrangement may include a strap belt 3024 securing the tray 3028 to the plurality of batteries 3030.

In embodiments, the tray may be a two-part tray as shown in FIG. 75A and FIG. 75B, and the busbar is interposed between the two parts of the tray, as shown in FIG. 75C.

In embodiments, a vibration absorbing pad may be placed below at least one of the plurality of batteries. The vibration absorbing pad may include at least one of a rubber pad, an elastomeric pad, or a mat. The vibration absorbing pad may include a surface, such as at least one of a grooved surface or a low friction surface, promoting mobility of the plurality of batteries in an installation direction. In embodiments, the battery box 3002 may comprise a rectangular box, and wherein installation direction comprises a direction toward a long side of the battery box, and the long side of the battery box 3002 may include an externally facing side of the battery box.

In embodiments, the first group of batteries and the second group of batteries each comprises a same number of batteries, such as two or four. In other embodiments, the first group of batteries and the second group of batteries each comprise a distinct number of batteries, such as wherein the first group of batteries comprises two batteries, and wherein the second group of batteries comprises four batteries. In this example, the trays may be configured as a 2/4 split. In yet other embodiments, the first group of batteries comprises two batteries, and wherein the second group of batteries comprises six batteries. In these other embodiments, the trays may be configured as a 2/2/4 split.

In embodiments, the busbar may include a pliable component to accommodate variable battery terminal spacings or variable battery terminal heights of the plurality of batteries, such as braided connections, springs, or foil.

In embodiments, the busbar may include a plurality of layers of at least one of a copper foil or a copper sheet.

In embodiments, the busbar may include a plurality of layers of at least one of a copper foil, copper wire, or copper sheet, and wherein at least a portion of the plurality of layers are at least one of twisted or braided to provide flexibility in at least two dimensions.

In embodiments, the battery assembly may further include an insulating sheet separating one or more layers of the busbar, wherein the insulating sheet may include a notch to expose a portion of a circuit board of the battery assembly, wherein the top of the circuit board contacts one layer of the busbar and a bottom of the circuit board contacts a second layer of the busbar.

In embodiments, the battery assembly may include a service disconnect 8310 interposed between the busbar 8308 and the second busbar 8312, wherein the service disconnect 8310 in a first installed position 8314 locks the tray with the second tray 8318, and electrically couples a jumper connection or the first tray 8302 to the second tray 8304, and wherein the service disconnect 8310 in a second removed position 8318 de-couples the jumper connection or the first tray 8302 from the second tray 8304. In another example, the service disconnect 7314 is shown in the installed position in FIG. 73B, where the jumper connection 7350 is electrically coupling the two trays. In embodiments, the service disconnect may further include a fuse 7612, 8808 9408, wherein the service disconnect in the first installed position interposes the fuse in series with at least one of the first group of batteries or the second group of batteries. In embodiments, the fuse may be part of the disconnect, or may be at the interconnect location. There may be a single fuse for all the batteries, or separate fuses for each battery group.

In embodiments, at least one of the busbar or the second busbar comprise an interconnect, such as interconnect 3012, coupling the busbar to the second busbar in response to the tray and the second tray each being positioned on top of the respective group of batteries.

In embodiments, the service disconnect further connects at least one of the plurality of batteries to a DC-to-DC converter, such as service disconnect 3014, 6928, 7314, 8310, 9102, 9710, 9810, 12300 or any service disconnects depicted in FIG. 76A, FIG. 81, FIG. 88B, FIG. 92, FIG. 94, FIG. 102, FIG. 104, FIG. 11, FIG. 112, FIG. 114, FIG. 115B, FIG. 115C. FIG. 117, FIG. 118, FIG. 119B, FIG. 119C, or FIG. 124. As an example, service disconnects, such as the service disconnect 11700, may include a housing 11712, 11710, interconnect busbars 11704, and connectors 11708 to align the interconnect busbars with the busbar and second busbar. Movement of the service disconnect between a first installed position and a second removed position may be horizontal, as depicted at least in FIG. 83B and FIG. 98. Movement of the service disconnect between the first installed position and the second removed position may be vertical, as depicted in FIG. 97. In embodiments, the service disconnect may include a housing, interconnect busbars molded into the housing, and connectors that pair with connectors fitted in each of the tray and the second tray, wherein movement of the service disconnect between the first installed position and the second removed position is vertical, such as the embodiment depicted in FIG. 86.

In embodiments, a DC-to-DC converter may be placed on the tray in electrical communication with the busbar, such as DC-to-DC converter 3018, 7312, 10208, 11114, 11502, 12308, 12402 or the embodiments depicted in FIG. 30B, FIG. 69, FIG. 81, FIG. 97, FIG. 98, FIG. 118, FIG. 119A, and FIG. 119B. The DC-to-DC converter may include an extruded housing, such as extruded housing 9702, having fins and a selected length to provide a selected heat transfer area. The DC-to-DC converter may include an end cap, such as end cap 12322 that facilitates a horizontal engagement with the tray. The DC-to-DC converter may include a flange 9704 having a slot disposed along a lower length of the extruded housing to facilitate engagement with at least one tab 12310, 9708 on the tray. In embodiments, the DC-to-DC converter may be directly press fitted into the tray.

In an embodiment, a fuse disconnect to the DC-to-DC converter may be positioned at an end of the extruded housing, and may be coupled to the DC-to-DC converter using a cam lock, a press fit, or a press fit and a bolt. In embodiments, the DC-to-DC converter may be secured to the tray using at least one of tabs 12310, 9708, or bolts.

In embodiments, the battery assembly may further include at least one LED 7510 on the tray in electrical communication with the busbar.

In embodiments, the battery assembly may further include at least one temperature sensor on the tray operatively coupled with the busbar. In embodiments, the battery assembly may further include at least one current sensor on the tray in electrical communication with the busbar. Microcontrollers may be in communication with the current and/or temperature sensor to provide sensed information to another controller on the DC-to-DC converter. There may be a microcontroller for groups of batteries, for each separate group of batteries, and/or for each individual battery. Communication can be on a network (e.g., a CAN) or over a same coupling that provides power (e.g., a dedicated 5V circuit, or even over 12V, 48V, or at some other voltage level). In an embodiment, a battery microcontroller may control a subset of the plurality of batteries.

In an embodiment, serviceable components of the battery assembly may be sized to be serviced using a 9/16" wrench. It should be understood that any and all components of the 48V electrical system may be sized as selected, and servicing, installing, or otherwise manipulating the component could involve more than one basic tool (e.g., a cross-head screwdriver and a 9/16" wrench).

In an embodiment, methods directed at safely operating the battery assembly include using a service disconnect and methods to remove the service disconnect, thereby breaking electrical connections and avoiding exposure of any high voltage terminals, and/or remove fuses from the assembly. Service disconnects may be combinable with any arrangement of battery trays, DC/DC converter, interconnects, etc. throughout the disclosure.

In an embodiment, a connector block 3220 for a DC-to-DC converter, may include a first part 3208 that is at least one of 3D printed or injection molded, wherein the first part 3208 comprises at least one opening 3228 sized to accommodate at least a first portion 3222 of at least one terminal 3202, a second part 3204 that is at least one of 3D printed or injection molded, wherein the second part 3204 comprises at least one opening 3230 sized to accommodate at least a second portion 3224 of the at least one terminal 3202, wherein the first portion 3222 of the at least one terminal 3202 protruding through the at least one opening 3228 of the first part 3208 is structured to make a first connection with the DC-to-DC converter, and wherein the second portion 3204 of the at least one terminal 3202 protruding through the at least one opening 3230 of the second part 3204 is structured to make a second connection with at least one of a battery, a battery tray, or an interconnect. An installed connector block 3442 is depicted in FIG. 34D.

In embodiments, the connector block may include at least one first connecting feature on the first part 3208 configured to couple with at least one second connecting feature on the second part 3204. In embodiments, the at least one second connecting feature may be connecting feature 3240. In embodiments, one of the first connecting feature or the second connecting feature may include a slot, and wherein the other one of the first connecting feature or the second connecting feature may include a tab. In embodiments, a bolt may couple the first connecting feature with the second connecting feature.

In embodiments, the at least one terminal 3202 includes bent copper blade connectors or a connection rated for at least 200 amps.

In an embodiment, the connector block may further include a filler positioned at least partially between the first part and the second part, wherein the filler includes a seal for the connector block, a mechanical support for the at least one terminal, or at least one material selected from the material consisting of: a silicone, a room temperature vulcanizing silicone, or an epoxy.

In embodiments, the first portion and the second portion of the at least one terminal may be positioned to make the first connection and the second connection in response to the at least one first connecting feature coupled with the at least one second connecting feature. In embodiments, the at least one first connecting feature coupled with the at least one second connecting feature are sized to accommodate the at least one terminal 3202 having a range of current ratings between 40 amps and 200 amps, inclusive. In an embodiment, the DC-to-DC converter may include an extruded housing 3448 having fins and a selected length to provide a selected heat transfer area, wherein the second connection may include a connection to a busbar of a battery tray. In embodiments, the connector block 3442 may be coupled to one of the extruded housing 3448 or the battery tray at an end of the extruded housing.

In embodiments, the connector block may be configured to mount vertically or horizontally on one of the battery tray or the extruded housing.

In embodiments, the connector block may further include a stainless steel, self tapping screw 3450 coupling the connector block 3442 to at least one of the extruded housing 3448 or the battery tray.

In embodiments, the connector block may include a service disconnect configured to couple power to the DC-to-DC converter in a first position, and to disconnect power from the DC-to-DC converter in a second position, wherein movement of the service disconnect between the first position and the second position is vertical or horizontal. For example, FIG. 76A depicts a service disconnect configured for vertical engagement with connectors emerging from the connector block (including connector 7608) of the DC-to-DC converter shown in FIG. 76B.

In an embodiment, a connector block for a DC-to-DC converter may include at least one terminal structured to couple to the DC-to-DC converter on a first end and to a battery on a second end, and a block formed from a non-metallic insulator with at least one first through-passage on a first side and at least one second through-passage on a second side, wherein the block is molded onto the at least one terminal so that the first end emerges from the first through-passage, the second end emerges from the second through-passage, the block defining at least a portion of the at least one terminal. The at least one terminal may include bent copper blade connectors or at least one terminal including a current rating of between 25 amps and 200 amps, inclusive. In embodiments, the DC-to-DC converter includes an extruded housing having fins and a selected length to provide a selected heat transfer area; and wherein the at least one terminal may be coupled to a busbar of a battery tray on the second end. The connector block may be coupled to one of the extruded housing or the battery tray at an end of the extruded housing, wherein the connector block may be configured to mount vertically or horizontally on one of the battery tray or the extruded housing. In an embodiment, the connector block may further include a stainless steel, self tapping screw coupling the connector block to at least one of the extruded housing or the battery tray. The connector block may include a service disconnect configured to couple power to the DC-to-DC converter in a first position, and to disconnect power from the DC-to-DC converter in a second position, wherein movement of the service disconnect between the first position and the second position may be vertical or horizontal.

In an embodiment, a system may include a vehicle having a prime mover motively coupled to a drive line, a motor/generator selectively coupled to the drive line, and configured to selectively modulate power transfer between an electrical load and the drive line. a battery pack. a DC/DC converter electrically interposed between the motor/generator and the electrical load, and between the battery pack and the electrical load, and a DC/DC converter housing 3448 defining at least a portion of the DC/DC converter 3468, the DC/DC converter housing comprising fins 3460 thermally coupled to switching circuits 3462 of the DC/DC converter 3468, and the DC/DC converter housing having a substantially constant cross-section. Having a substantially constant cross-section may allow for machining operations to provide for one or more of: 1) control connection through the top, 2) tab forming for securing to the tray, or 3) accommodation for the connector/service disconnect.

In an embodiment, the DC/DC converter housing comprises an extruded housing, such as housing 9702. The DC/DC converter housing may include an aluminum housing.

In an embodiment, the system may further include a covering tray 12302 positioned over a plurality of batteries of the battery pack, and wherein the DC/DC converter is mounted on the covering tray, such as shown in FIG. 123A, 123B, 123C, and elsewhere. The DC/DC converter housing may include one of a tab or slot configured to securely engage to a matching one of a slot or a tab of the covering tray, as shown in FIG. 97, FIG. 98, FIG. 123A-C, and elsewhere. The covering tray may be positioned over between two and four of the plurality of batteries, inclusive. The covering tray may include a connectivity layer configured to provide electrical connectivity to terminals of the plurality of batteries.

In embodiments, the DC/DC converter housing may include a control connector accommodation 12404 configured to expose a control connector of the DC/DC converter from a vertically upper side of the DC/DC converter housing. The DC/DC converter may include between four and eight switching circuits, inclusive.

In an embodiment, vehicle power systems including supercapacitors are depicted in FIG. 62, FIG. 63, and FIG. 64. In an embodiment, and referring to the example vehicle power system depicted in FIG. 62, a DC/DC power converter 6202 may be coupled between a high voltage bus 6240 and a low voltage bus 6242, a motor/generator 6210 and at least one electrical load 6208, 6204 coupled to the high voltage bus 6240, a plurality of batteries 6220 coupled to the low voltage bus 6242, at least one low voltage electrical load 6250 coupled to the low voltage bus 6242, and a supercapacitor 6212 coupled to the high voltage bus 6240 structured to stabilize the high voltage bus 6240. The high voltage bus 6240 may include a 48V nominal voltage bus. The example supercapacitor 6212 is depicted and described as coupled to the high voltage bus 6240 for illustration, but the supercapacitor 6212 may additionally or alternatively be coupled to the low voltage bus 6242.

In embodiments, the supercapacitor 6212 may be sized to support a disturbance of up to 10 msec, 300 msec, 10 seconds, 30 seconds, or 120 seconds.

In embodiments, the supercapacitor 6212 may include a capacitance of at least 0.3 F, between 0.2 F and 20 F inclusive, between 10 F and 100 F inclusive, or between 50 F and 1000 F inclusive.

In embodiments, the at least one electrical load includes at least one of an HVAC 6208 or a catalyst heater 6204. In embodiments, the at least one low voltage electrical load 6250 includes at least one load selected from the loads consisting of: a fan load, a steering load, an HVAC load, or a catalyst heater. The low voltage bus 6242 may include a 12V nominal voltage bus.

In embodiments, a voltage ratio of the high voltage bus 6240 to the low voltage bus 6242 may be nominally 4:1. In embodiments, the motor/generator 6210 may be structured to selectively power the at least one electrical load.

In embodiments, the DC/DC power converter 6202 may be further structured to modulate power flow between the plurality of batteries 6220 and the at least one electrical load. In embodiments, the DC/DC power converter 6202 may be further structured to modulate power flow between an electrical system of the vehicle, and at least one of the low voltage bus or the high voltage bus. In embodiments, the DC/DC power converter 6202 may be further structured to modulate power flow between the motor/generator and a prime mover of a vehicle hosting the vehicle power system.

In embodiments, the vehicle power system may further include at least one of a starter 6218 or a cab inverter 6214 coupled to the low voltage bus 6242.

The size of the supercapacitor that may be useful may be 144 Farads. Supercapacitors may be useful for transient response and managing ripple. For example, 0.3 F may be useful for managing alternator ripple, which is a moderately sized capacitor. For dealing with large system transients on the scale of seconds, 10-100 F may be useful. For dealing with transients on the order of a minute, 1000 F may be needed for certain embodiments. Regenerative braking applications may utilize more than 1000 F of capacitance, depending upon the amount of regeneration operations, the maximum size of a given regenerative operation, and/or the current flow between the motor/generator and the battery pack that is not detrimental to battery life. Li-ion in the 20 kWh storage range is relatively expensive, and a supercapacitor can meet this storage capacity with a wider operating temperature range, in a smaller package, and with less weight. For start-up support, the supercapacitor may be charged before the engine starts and the supercapacitor helps to crank the engine and reduces the peak demand so that the batteries do not see cold crank inrush currents. Some typical transients that a supercapacitor may help with are: ripple (10 s msec); load dump (100 msec); engine ramp up (10 sec); heater (e.g., an aftertreatment heater, which might typically operate for about 30 sec); and/or a fuel economy drive cycle (hybrid regen; 60-120 seconds, also potentially relevant for large system aftertreatment heaters).

In embodiments, various battery terminal cap embodiments enable convenience of service, rapid integration with battery trays, and the like. In embodiments, a battery terminal cap as in FIG. 133A may include a plastic cap 13302 with an inner portion defining a volume to accommodate an insert, a wedge-threaded metal insert 13304 sized to fit in the volume, and an O-ring 13308 disposed in a volume of a lower end of the insert 13304. The wedge-threaded metal insert 13304 may be structured to slip at a selected torque rating in a tightening direction.

In an embodiment, a battery terminal cap as shown in FIG. 133B may include a cap locknut 13310 disposed on top of a plastic cap, the plastic cap 13312 with an inner portion defining a volume to accommodate an insert 13318. and a threaded metal insert 13318 sized to fit in the volume. The threaded metal insert may be structured to slip at a selected torque rating in a tightening direction.

In an embodiment, a battery terminal cap, as depicted in FIG. 127A, may include a plastic threaded bush 12702 having at least one ball-type extrusion on a surface, a plastic cap 12704 with an inner portion defining a volume to accommodate the plastic threaded bush 12702, wherein the plastic cap 12704 has at least one passage structured to accommodate the at least one ball-type extrusion, at least one locking feature 12708 of the plastic threaded bush, and wherein the plastic threaded bush sealingly 12710 engages a battery terminal in response to the plastic cap being rotated in a tightening direction. The plastic threaded bush may have three ball-type extrusions on the surface. The at least one ball-type extrusion may slip in response to the plastic cap being rotated in the tightening direction at a selected torque rating. The sealing engagement of the plastic threaded bush may prevent ambient fluid ingress to the battery terminal. The sealing engagement of the plastic threaded bush may prevent egress of fluid from the battery terminal.

In an embodiment, a battery terminal cap, as shown in FIG. 125, may include a plastic cap with an inner portion defining a volume to accommodate an insert, a threaded metal insert sized to fit in the volume, and a spring washer disposed in a second volume of a lower end of the insert. The spring washer may be captured in the second volume.

In an embodiment, a battery terminal cap, as shown in FIG. 128A, may include a stainless steel nut with cap 12802, and a washer 12804, such as at least one of a self-sealing/spring washer or a self sealing lock washer, disposed between the stainless steel nut with cap 12802 and a battery terminal.

In an embodiment, a battery terminal cap, as depicted in FIG. 129A, may include a plastic cap 12902 with an inner portion defining a volume to accommodate an insert, and a stainless steel, self sealing/locking nut 12904 with an integrated seal sized to fit in the volume. The stainless steel, self sealing/locking nut may be captured within the volume.

In an embodiment, a battery terminal cap, as depicted in FIG. 126A and FIG. 130A, may include a threaded plastic part 13012, 12608 having an undulating lower face 13014, 12618 contacting a portion of a battery terminal, the threaded plastic part comprising a lower portion having the undulating lower face and an interior threading configured to engage the battery terminal, a body portion 13020 having a smaller diameter or other characteristic length than the lower portion 13022, and an upper portion 13018 having a smaller diameter or other characteristic length than the body portion 13020, and a partially closed nut 13010, 13218 having a top surface defining a hole sized to accommodate the upper portion, and a side wall 13024 sized to accommodate the body portion, a clamp plate 13002 sized to fit over the upper portion above the partially closed nut, a wave spring 13004 interposed between the partially closed nut and the upper end, the wave spring positioned to contact the partially closed nut at a vertically upper side of the wave spring, and to contact a serrated plate 13008 at a vertically lower side of the wave spring, and wherein the serrated plate 13008 is interposed between the wave spring 13004 and the body portion of the threaded plastic part, wherein the wave spring and serrated plate cooperate to transfer rotational force from the partially closed nut to the threaded plastic part. In embodiments, the lower portion includes a metal insert 13212 molded into the threaded plastic part, as depicted in FIG. 132A, wherein the metal insert comprises the interior threading. The serrated plate may slip against the wave spring in response to a rotation of the partially closed nut in a tightening direction at a selected torque rating. The undulating lower face may be configured to at least partially compress in response to a tightening of the threaded plastic portion to the battery terminal. The side wall 13024 may include a ⅜" exterior dimension. The interior threading may include ⅜"×16 threads.

In an embodiment, a battery terminal cap, as depicted in FIGS. 131 A-B, may include a threaded plastic part 13108 having an undulating lower face 13110 contacting a portion of a battery terminal, the threaded plastic part comprising a lower portion having the undulating lower face and an interior threading configured to engage the battery terminal, a body portion 13118 having a smaller diameter than the lower portion 13120 and an undulating exterior surface 13114, and an upper portion 13122 having a smaller diameter than the body portion; a partially closed nut 13104 having a top surface defining a hole sized to accommodate the upper portion, and a side wall 13124 sized to accommodate the body portion 13118, a clamp cap 13102 sized to fit on top of and around the upper portion 13122, and wherein the side wall 13124 and the undulating exterior surface 13114 are sized to transfer rotational force from the partially closed nut to the threaded plastic part. In embodiments, as depicted in FIG. 132A, the lower portion may include a metal insert 13212 molded into the threaded plastic part, wherein the metal insert comprises the interior threading. In an embodiment, the undulating exterior surface may slip against the side wall in response to a rotation of the partially closed nut in a tightening direction at a selected torque rating. The lobes of the partially closed nut may not be symmetrical—e.g., to allow for a greater force transfer in the loosening direction than the tightening direction. In an embodiment, the undulating lower face may be configured to at least partially compress in response to a tightening of the threaded plastic portion to the battery terminal. In an embodiment, the side wall may include a ⅜" exterior dimension. In an embodiment, the interior threading may include ⅜"×16 threads.

Referring to FIG. 161, a vehicle battery charging system 16100 may include a policy management circuit 16102, a vehicle power management circuit 16104, a power flow circuit 16106, and a charging execution circuit 16108. The policy management circuit 16102 may select a first charging policy 16114 based on a vehicle operating condition value 16112. The policy management circuit 16102 may select a second charging policy 16114 based on a change in a vehicle operating condition value 16112.

The vehicle power management circuit 16104 may determine a target for a vehicle operation parameter 16116 such as a state of charge target 16119, a charging rate target 16118, or the like, in response to the selected charging policy 16114. The vehicle power management circuit 16104 may adjust the vehicle operation parameter target 16116 in response to a change in selected charging policy 16114. The power flow circuit 16106 determines a charging rate target 16118 in response to the selected charging policy 16114 and may also adjust the charging rate target 16118 in response to a new selected charging policy 16114. The charging execution circuit 16108 then selectively charges a vehicle energy storage system 16120 (to a state of charge 16121) in response to the charging rate target 16118 and the target for the vehicle operation parameter 16116.

Referring to FIG. 162, a selected charging policy 16114 may include a policy indication 16202, a performance priority description value 16204, and the like. A policy indication 16202 may include a policy state variable 16212 that influences the charging logic. This policy state variable 16212 may result in changes in logic of performance of other circuits. A state variable 16212 may refleet a state of the overall vehicle that may change the charging logic. For example, A state variable 16212 may indicate a very low state of charge and that the system should prioritize charging aggressively. A policy instruction 16214 may or may not accompany the policy state variable 16212. The performance priority description value 16204 may include a prioritization description between different performance targets, identifying which performance target 16218 to optimize when there are multiple conflicting performance targets 16218. A selected charging policy 16114 may further include an efficiency policy 16220, an operator policy 16222, an emissions policy 16224, and the like.

Referring to FIG. 163, a performance target 16218 may include an emissions performance 16232 such as a maximum level of regulated material discharged within a time period, within a distance driven, relative to a power generated, a rate of discharge, and the like. A performance target 16218 may include an operator comfort performance target 16234 such as ratio of power devoted to operator comforts (e.g. heating, air conditioning, power for user electronics, and the like) relative to power supplied to support vehicle performance, a minimum amount of power available to support operator comforts, and the like. A performance target 16218 may include a vehicle power performance 16236 which may include a level of torque available for acceleration, a minimum power availability for cruising, and the like. A performance target 16218 may include a primary vehicle mission performance 16238 which may include maintaining sufficient power to move the vehicle, either to the side of the road, a minimum distance, or sufficient to return home. A primary vehicle mission performance may include being able to start the engine on a cold morning. A primary vehicle mission performance may include maintaining compliance with emissions regulations while idling, which may lower the temperature and reduce performance of an emissions treatment system. In embodiments, a user may enter a primary vehicle mission performance goal.

Referring to FIG. 164, a policy indication 16202 may serve to identify the theme of the policy such as an emissions policy 16402, an operator comfort policy 16404, an efficiency policy 16406, a performance policy 16408, an operator policy 16410, or the like where the policy indication 16202 describes the focus of a given charging policy. For example, an emissions policy 16402 may be designed to minimize emissions.

There may be a variety of efficiency polices 16406 directed to different types of efficiency. Efficiency may refer to the power utilization efficiency (how much power is wasted via heat and the like, fuel efficiency (e.g. miles per gallon or miles per KW), maintenance/wear efficiency (miles between service, part replacement), delivery time efficiency (e.g. maximum speed capability to reduce trip time), operator convenience efficiency, operator time efficiency, efficient resource utilization when stopped or idling (e.g. minimize power utilization or being prepared for rapid acceleration), and the like.

Referring to FIG. 165, a vehicle operating condition value 16112 may include shutdown values 16502. Shutdown values 16502 may include a shutdown time of day, a shutdown duration, a shutdown location, a shutdown duty cycle, and the like. A vehicle operating condition value 16112 may include an energy storage system values 16504 such as a vehicle energy storage system state of charge, a vehicle energy storage system state of health, a vehicle energy storage system capacity, a maximum charging threshold, an energy storage system type, an energy storage system age, an energy storage system maintenance cycle, or the like. Forecast values 16506 such as an ambient condition forecast, a load forecast, a forecast regeneration condition, a trajectory (anticipated state over time, for example, a route condition that will affect power consumption/recharging, anticipated idling time, or the like), or the like. A vehicle operating condition value 16112 may include a load forecast, pre-shutdown duration (amount of operational time left unless conditions change), a forecast regeneration condition, a load forecast, a vehicle energy storage system capacity, an ambient condition forecast (e.g. weather forecast includes extremely low temperatures which will affect vehicle performance), or a projected change trajectory of one of these values (e.g. weekly temperature forecast, a change in energy storage system capacity over time or number of charge/discharge cycles, or the like). A vehicle operating condition value 16112 may include a maximum charging threshold, an energy storage system type, an energy storage system age, an energy storage system maintenance cycle, or the like.

A vehicle operation parameter target 16116 is based on both the current vehicle operating condition value and the charging policy. In some situations a current vehicle operating condition value may override the charging policy. For example, if the charging policy includes a performance target such as vehicle power performance target but the vehicle operating condition is indicative of a may include a begin engine shutdown condition, a time before vehicle shutdown, an idling constraint, and the like. The charging execution circuit may charge the vehicle energy storage system 16120 based on the vehicle operating condition value 16112 even if the state of charge of the vehicle energy storage system 16120 exceeds the vehicle operating parameter target 16116.

Referring to FIG. 166, a vehicle battery charging system 16600 may include a policy management circuit 16602, a battery management circuit 16604, and a charging execution circuit 16608. The policy management circuit 16602 may determine a future engine shutdown condition 16612 and select a charging policy 16114 from a plurality of charging policies 16114 in response to the future engine shutdown condition. In embodiments, the policy management circuit 16602 may select a second charging policy 16114 in response to a pre-engine shutdown condition.

The battery management circuit 16604 may determine a state of charge target 16610 in response to the selected charging policy 16114. The charging execution circuit 16608 then selectively charges a vehicle energy storage system 16120 in response to the state of charge target 16610.

Referring to FIG. 167, a future engine shutdown condition 16612 may include a combined shutdown time 16702 and a shutdown duration 16704, where a shutdown time 16702 may be an amount of time until the engine shuts down or a time of day when the engine will shut down. A future engine shutdown condition 16612 may include a shutdown facility description 16710 including ambient environmental conditions at the shutdown facility, what facilities are available (e.g. shore power availability), facility requirements or government regulations such as: engine idling requirements, lighting requirements, noise requirements, and the like. A future engine shutdown condition 16612 may include a combined shutdown location 16708 and a shutdown duration 16704, where a shutdown location may be a type of location (e.g. home, a truck stop, a weigh station, or the like), or a specific geographic location. A future engine shutdown condition 16612 may include an idling constraint 16714 such as maximum idling duration 16715, maximum idling count 16716, and the like. A future engine shutdown condition 16612 may include an operator or user support value 16718 indicating what needs to be supported in the cab of the vehicle on an overnight stop. For example, the vehicle operator may have devices such as temperature control or a Continuous Positive Air Pressure (CPAP) machine that need sufficient power to run all night. Further power may be needed to support a radio, a television, a gaming system, a computer, a microwave, or the like for at least a portion of the night. The operator devices may be assigned different priority such that, if there are power concerns, lower priority items will be shut down first to keep higher priority operator devices operational. In embodiments, the policy management circuit 16602 may determine intermediate engine shutdown conditions 16618 that will occur prior to the future engine shutdown condition 16612 and select or change a charging policy 16114 from the plurality of charging policies 16114 in view of the intermediate engine shutdown conditions 16618. The policy management circuit 16602 may determine an ambient condition at a shutdown location 16616 and base the selection of a charging policy 16114 based, at least in part, on the ambient conditions at the shutdown location 16616, either current ambient conditions or future ambient conditions.

Referring to FIG. 168, a vehicle battery charging system 16800 may include a policy management circuit 16802, a battery management circuit 16804, and a charging execution circuit 16808. The policy management circuit 16802 may determine a future engine shutdown condition 16810 and a pre-engine shutdown condition 16818, and select a charging policy 16114 from a plurality of charging policies 16114 in response to the future engine shutdown condition 16810 and the pre-engine shutdown condition 16818. In embodiments, the policy management circuit 16802 may select a second charging policy 16114 in response to a pre-engine shutdown condition.

The battery management circuit 16804 may determine a forecast regeneration event 16814, and, in response to the selected charging policy 16114, determine an intermediate state of charge target 16816. The charging execution circuit 16808 then selectively charges a vehicle energy storage system 16120 in response to the intermediate state of charge target 16816. The intermediate state of charge target 16816 may be determined at least partly in response to a maximum charging threshold. The battery management circuit 16804 may determine a future state of charge target 16812 corresponding to a desired level of charge at the beginning of the future engine shutdown condition so that, when the engine is shutdown, the battery will have sufficient charge to provide operator or user support 16718, meet idling constraints 16714, and the like as discussed elsewhere herein.

The intermediate state of charge target 16816 may be less that the future state of charge target 16812. The battery management circuit 16804 may determine the intermediate state of charge target 16816 in response to a regeneration value 16822 of the forecast regeneration event 16814 where the regeneration value 16822 is the amount of power the forecast regeneration event 16814 is expected to provide. The intermediate state of charge target 16816 may be less that the future state of charge target 16812 by at least the regeneration value. After a regeneration event, the battery management circuit may determine if there will be subsequent regeneration events or forecast regeneration events 16814 prior to a shutdown corresponding to a further engine shutdown condition 16810. The battery management circuit 16804 may determine that there are no forecast regeneration events 16814 anticipated prior to a shutdown corresponding the future engine shutdown condition 16810. This determination may be made in response to the occurrence of a charging event that corresponds to the forecast regeneration event 16814, in response to a change in route, in response to a change in future engine shutdown condition that changes the forecast regeneration event or the regeneration value, and the like. If the battery determines that there are no forecast regeneration events 16814 anticipated prior to a shutdown, or that the anticipated regeneration value would not cause the vehicle energy storage system 16120 to exceed the maximum charging threshold if the vehicle energy storage system 16120 were already at the future state of charge target 16812, the charging execution circuit 16808 may elect to charge the vehicle energy storage system 16120 to the future state of charge target 16812. Additionally, the charging execution circuit 16808 may elected to charge the vehicle energy storage system 16120 to the future state of charge target 16812 if it appears that the forecast regeneration event 16814 will not occur, or that the charge will be less than the regeneration value 16822 anticipated. In embodiments, the charging execution target 16808 may charge the vehicle energy storage system 16120 in response to the vehicle operating condition value even though a state of charge 16824 of the vehicle energy storage system 16120 exceeds a nominal target state of charge or the future state of charge target 16812.

Referring to FIG. 169, a vehicle battery charging system 16900 may include a policy management circuit 16902, a battery management circuit 16904, a charging execution circuit 16908, and a power flow circuit 16910. The policy management circuit 16902 may determine an essential vehicle load 16906, and select a charging policy 16114 from a plurality of charging policies 16114 in response to the essential vehicle load 16906.

An essential vehicle load may include maintaining the ability to start the engine (the amount of power may vary with ambient conditions), maintaining comfortable environmental conditions in the cab (e.g. heat, air-conditioning), running a CPAP machine the length of a rest cycle, for example overnight, supporting communications infrastructure such as radio, internet, and the like, maintaining emissions within a certain range through appropriate aftertreatment, running a security system of the vehicle, maintaining environmental conditions of a load (e.g. refrigerator trucks), maintaining a minimum margin or reserve power, and the like. In embodiments, the owner/operator may be able to define other loads as essential such as a microwave, cab refrigerator, and the like. What is essential may vary with the ambient conditions such as additional heat needed in very cold climates, or air conditioning in hot, humid ambient environments. What is essential may also vary with available facilities at a current or future shutdown location such as whether an external power source will be available at an anticipated shutdown location, anticipated regeneration events between current location and future shutdown location and the like.

In embodiments, the policy management circuit 16902 may further determine the essential vehicle load 16906 in response to an ambient condition 16916 and select the charging policy 16114 in response to an ambient condition 16916. The policy management circuit 16902 may determine the essential vehicle load 16906 in response to a load type. The policy management circuit 16902 may be iterative in that, after selecting a charging policy 16114 in response to the essential vehicle load 16906, the policy management circuit 16902 may reassess/determine the essential vehicle load 16906 based on the selected charging policy 16114. In embodiments, the policy management circuit 16902 may be further structured to determine a plurality of forecast vehicle loads 16903 including the essential vehicle load 16906 and a plurality of remaining vehicle loads 16905 in response to a future engine shutdown condition 17002 (see FIG. 170).

A future engine shutdown condition 17002 may include a shutdown duration 17004, a shutdown duty cycle 17006, a pre-shutdown time duration 17008, a shutdown location 17010, a shutdown facility description 17012, an external power source availability 17014, an uncertainty description 17018, a trajectory 17016 of any of these future engine shutdown conditions 17002 as described here and elsewhere herein. For example, a shutdown duty cycle 17006 may vary greatly. A local delivery truck making multiple stops in within short distances may have limited time to recharge the vehicle energy storage system 16120 between stops and, possibly, frequent engagement of the starter motor for the truck. At the end of the day the delivery truck may be turned off completely. Alternatively, a long distance trailer truck may have long times between stops, resulting in plenty of time to recharge the vehicle energy storage system 16120, but be required to maintain some vehicle loads at night. Pre-shutdown time duration 17008 may be used to calculate extent of potential regeneration/recharging of the vehicle energy storage system 16120. An uncertainty description 17018 may be based on variability in historic usage such as variation in shutdown duration, differences in shutdown facility descriptions 17012 and historic variability in external power source availability 17014, and the like.

The policy management circuit 16902 may determine a plurality of essential vehicle loads 16906 (including an initial essential vehicle load 16906) and select the charging policy 16114 in response to the plurality of essential vehicle loads 16906. For example, overnight essential vehicle loads might include maintaining the ability to start the engine, the CPAP machine, and cab environmental requirements. Further, based on the selected charging policy 16114, the policy management circuit 16902 may redetermine/confirm the plurality of essential vehicle loads 16906. The policy management circuit 16902 may determine a plurality of essential vehicle loads 16906 in response to an ambient condition 16916, an operator input value, a future engine shutdown condition 17002, or the like. The policy management circuit 16902 may further select the charging policy 16114 from a plurality of charting policies in response to an ambient condition 16916, an operator input value, and the like. The battery management circuit 16904 determines a state of charge target 16912 for a vehicle energy storage system 16120 in response to the selected charging policy 16114. The battery management circuit 16904 may further determine the state of charge target 16912 in response to an energy support value 16918 in response to the essential vehicle load 16906. The battery management circuit 16904 may determine the state of charge target 16912 in response to an energy support value 16918 corresponding to the essential vehicle load 16906. The battery management circuit 16904 may determine the energy support value 16918 in response to an ambient condition 16916. The battery management circuit 16904 may determine a plurality of load priorities 16922 for remaining vehicle loads 16905 in response to the selected charging policy 16114. The battery management circuit 16904 may further determine the state of charge target 16912 in response to the essential vehicle load 16906 and the plurality of load priorities 16922.

The charging execution circuit 16908 may selectively charge the vehicle energy storage system 16120 in response to the state of charge target 16912. The charging execution circuit 16908 may command an engine operation value 16920 in response to the selected charging policy 16114, a state of charge 16911 of the vehicle energy storage system 16120. The state of charge 16911 may be an immediate state of charge 16911, or a future state of charge 16926 of the vehicle energy storage system 16120. The charging execution circuit 16908 may power the essential vehicle load 16906 and at least a portion of the other, remaining vehicle loads 16905 during the future engine shutdown condition 17002 based on the selected charging policy 16114.

A power flow circuit 16910 may determine a charging rate 16914 of the vehicle energy storage system 16120 in response to the selected charging policy 16114.

Referring to FIG. 171, a vehicle battery charging system 17100 may include a policy management circuit 17102, a battery management circuit 17104, a charging execution circuit 17108, and a power flow circuit 17110. The policy management circuit 17102 may determine a future ambient condition during a future engine shutdown condition 17112, and select a charging policy 16114 from a plurality of charging policies 16114 in response to the future ambient condition 17106. The battery management circuit 17104 may then determine a state of charge target 17114 for the vehicle's energy storage system in response to the selected charging policy 16114. The charging execution circuit 17108 selectively charges the vehicle energy storage system 16120 in response to the state of charge target 17114. A power flow circuit 17110 determines a charging rate 17116 for the vehicle storage system 16120 in response to the selected charging policy 16114.

The policy management circuit 17102 may determine an ambient power demand 17118 for an ambient-sensitive load (e.g. a refrigerated truck, a fuel truck, a life stock truck, a cabin heating system, a cabin cooling system, etc.) during the future engine shutdown condition 17002 in response to the future ambient condition 17106 and selects the charging policy 16114 from the plurality of charging policies 16114 in response to the ambient power demand 17118.

The policy management circuit 16902 may determine a plurality of essential vehicle loads 16906 and other vehicle loads. The policy management circuit 17102 may determine a plurality of essential vehicle loads 17120 and a plurality of remaining vehicle loads 17122. The policy management circuit 17102 may select the charging policy 16114 in response to a demand forecast of the plurality of essential vehicle loads 17120 and the plurality of other, remaining vehicle loads 17122 during a future engine shutdown condition 17002.

The battery management circuit 17104 then determines a plurality of load priorities 17124 for the plurality of remaining vehicle loads 17122 in response to the selected charging policy 16114 and determines the state of charge target 17114 for the vehicle energy storage system 16120 in response to the plurality of essential vehicle loads 1120 and the plurality of load priorities 17124 for the remaining vehicle loads 17122. The charging execution circuit 17108 powers an ambient sensitive load during the future engine shutdown condition 17002 in response to the selected charging policy 16114.

Referring to FIG. 172, a vehicle 17200 may include a prime mover 17202 motively coupled to a drive line 17204. There may be a motor/generator 17206 also connection to the drive line 17204 designed to modulate the transfer of power from the drive line 17204 to an electric load 17210. There may be a DC-DC converter 17208 electrically interposed between the motor/generator 17206 and the electric load 17210. The DC-DC converter 17208, 7312 (FIGS. 73A-73B) may be a smart converter such that the electric load 17210 may negotiate with the DC-DC converter 17208 regarding the power needs of electric load 17210 (e.g. voltage and current) and what the DC-DC converter 17208 may be able to supply (again voltage and current). A battery pack 17212, having a first and a second plurality of batteries 17214, 17216 may also be connected to the electric load 17210 through the DC-DC converter 17208, 7312. In embodiments, there may be a covering tray 17218, 7302, 7304 7314 (FIGS. 73A-73B) positioned over at least one of the first or second plurality of batteries 17214, 17216. There may be a contactor 17220, either separate, integrated into the battery pack, or integrated into the covering tray 17218. The contactor 17220, 7318 electrically connects the battery pack 17212 and the DC-DC converter 17208. The contactor 17220, 7318 may be structured to respond to a contactor command 17228. and open in response to a reverse voltage connection to the battery pack 17212.

The vehicle 17200 may also include a controller 17222 having a reverse connection circuit 17226 that determines that a reverse voltage connection has been coupled to the battery pack (i.e. a battery has been installed backwards). The controller 17222 may further include a protection circuit 17224 that provide a contactor command 17228 in response to the determined reverse voltage connection 17230. For example, if there is a reverse voltage connection, the contactor command 17228 may cause the contactor 17220 to disconnect the battery pack 17212 from the DC-DC converter 17208 in order to protect the other electronic components of the vehicle.

The reverse voltage connection may include a reverse connection between the two pluralities of batteries, a reversed installation of at least one of the batteries in the battery pack, a jump charge reverse connection, and the like.

Referring to FIG. 173, an apparatus 17300 comprising an operating state circuit 17302, a power management circuit 17304 and a DC/DC converter 17308. The operating state circuit 17302 determines an operating mode 17310 for a vehicle where the vehicle includes a prime mover 17312 with a driveline 17314, a motor/generator 17318 selectively couplable to the driveline 17314, and an electrical load 17320 selectively couplable to the motor/generator 17318.

The operating modes may include a cruise mode, a coast mode, a crank mode, a creep mode, a sleep mode, a black out mode, a parked mode, a security mode, and the like. The operating state circuit may further determine a state of charge 17328 of the battery pack 17324, a vehicle operating condition 17330, and the like.

The power management circuit 17304 determines a power flow command 17322 in response to the operating mode 17310. In response to the power flow command 17322, the DC/DC converter 17308 selectively powers the electrical load 17320 using the motor/generator 17318. Further in response to the power flow command 17322, the DC/DC converter 17308 may selectively power the electrical load 17320 with a battery pack 17324 selectively couplable to the electrical load 17320. Further in response to the power flow command 17322, the DC/DC converter 17308 may selectively provide power to the battery pack 17324 from the motor/generator 17318.

Referring to FIG. 174, the power flow command 17322 may indicate a power flow arrangement 17332. Power flow arrangements 17332 may include providing power transfer between the motor/generator and the driveline 17402, providing power transfer between the battery pack and the motor/generator 17404, providing power transfer between the electrical load and the motor/generator 17408, providing power transfer between the electrical load and a vehicle electrical system 17410, providing power transfer between the electrical load and the driveline 17412, providing power transfer between the battery pack and the driveline 17414, providing power transfer between the electrical load and the battery pack 17418, providing power transfer between a vehicle electrical system and the driveline 17420, providing power transfer between a vehicle electrical system and the battery pack 17422, providing power transfer between a vehicle electrical system and the motor/generator 17424, and the like.

The power management circuit 17304 may further determine the power flow command 17322 in response to the state of charge 17328 of the battery pack 17324, a vehicle operating condition 17330, a priority 17332 of the electrical load 17320, or the like. The power management circuit 17304 may determine the priority of the electrical load 17320 in response to the vehicle operating condition 17330.

Referring now to FIG. 179, a heat pump for an HVAC may include two-way power transfer hybrid. Systems described herein may be directed at powering a heat pump for HVAC support. A system 17900 may include a vehicle 17902 having a prime mover 17904 motively coupled to a drive line 17908, a motor/generator 17910 selectively coupled to the drive line 17908, and configured to selectively modulate power transfer between an electrical load 17912 and the drive line 17908, and wherein the electrical load 17912 comprises a heat pump 17914 comprising at least a portion of a heating, ventilation, and air conditioning (HVAC) system 17918 of the vehicle 17902. The drive line 17908 may enable mobility by driving any aspect of the vehicle, such as including at least a wheel or a track. In some embodiments, modulating power transfer includes power going in either direction (e.g., to or from the driveline) in systems that are capable of two-way power transfer. In some embodiments, the drive line 17908 may directly power the electrical load 17912 (e.g., a clutched belt, or a separate HVAC system).

In embodiments, the motor/generator 17910 may be selectively coupled to the drive line at a transmission input shaft position, a transmission counter shaft position, a transmission main shaft position, or a transmission output shaft position.

In embodiments, the system 17900 may further include a battery pack 17924, and a DC/DC power converter 17928 configured to selectively provide power from at least one of the drive line 17908 or the battery pack 17924 to the heat pump 17914.

In embodiments, the system 17900 may include a controller 17930, as further depicted in FIG. 180. The controller 17930 may include a battery monitoring circuit 18002 structured to interpret a state of charge value 18004 for each battery 18012 of the battery pack 18010, and an HVAC support circuit 18008 structured to selectively power the heat pump 18018 from the at least one of the drive line 18014 or the battery pack 18010 in response to the state of charge value 18004 for each battery 18012 of the battery pack 18010.

For example, and in one embodiment, the heat pump may be powered from the battery pack if the state of charge value 18004 is determined to be OK. In another embodiment, powering the heat pump may be disabled from the battery pack if the state of charge value 18004 is determined to not be OK. In yet another embodiment, powering the heat pump from the drive line may be enabled if the state of charge (SOC) value 18004 is determined to not be or mixed (e.g., the power is reduced, but some power is obtained from the battery pack). In still another embodiment, power may be delivered preferentially from the battery pack if the state of charge value is high (e.g., to get to a target state of charge, to reserve margin for regeneration, and/or as part of battery wear management)

In embodiments, the state of charge value 18004 may be a characteristic state of charge, such as something determined from the aggregate battery pack 18010 rather than requiring a state of charge value 18004 for each battery 18012. In embodiments, the state of charge value 18004 may be determined empirically (e.g., response on the bus to various operating conditions) or it may be modeled.

In an embodiment, the controller 17930 may further include an operating state circuit 18020 structured to determine an ambient temperature value 18022. The HVAC support circuit 18008 may be further structured to selectively power the heat pump from at least one of the drive line or the battery pack in response to the ambient temperature value 18022. For example, an ambient temperature may indicate that HVAC is really needed. In another example, the ambient temperature may indicate that HVAC is one of a high or low priority right now. In yet another example, ambient temperature may indicate that an HVAC load may be too high/low right now, so the HVAC load may need to be turned off or may only work on a partial load (i.e., ambient temperature figures into load estimate and response). In still another example, ambient temperature may indicate that the heat pump is efficient right now (e.g., in a system where an alternate temperature management is available, where heat pump efficiency and capability is highly dependent on the temperature difference), inefficient right now, and/or incapable right now.

In an embodiment, the controller 17930 may further include an HVAC priority circuit 18024 structured to interpret an HVAC load priority value 18028, and wherein the HVAC support circuit 18008 may be further structured to selectively power the heat pump from the at least one of the drive line or the battery pack in response to the HVAC load priority value 18028. The HVAC priority circuit 18024 may be further structured to interpret the HVAC load priority value 18028 in response to the ambient temperature value 18022. In embodiments, the operating state circuit 18020 may be further structured to determine a vehicle operating condition (VOC) 18030, and wherein the HVAC support circuit 18008 may be further structured to selectively power the heat pump from the at least one of the drive line or the battery pack in response to the vehicle operating condition 18030.

In embodiments, vehicle operating conditions 18030 may include one or more of a running/shutdown state, an allowed mechanical interaction state (i.e., power can be taken off right now), or an allowed electrical interaction state (i.e., power can be taken off from the alternator right now). In embodiments, vehicle operating conditions 18030 may be used to set one or more of the SOC target (i.e., HVAC would still be powered from this SOC, but the VOC indicates we can charge batteries instead), the HVAC load priority value, or the load balance (e.g., partial power from each drive line and battery pack).

In an embodiments, the motor/generator 17910 may be selectively coupled to the drive line 17908 using a power take off (PTO) interface 17932. In embodiments, the PTO interface 17932 may include an 8 bolt side interface 17934 to a counter shaft 17942 of a transmission 17940. In embodiments, the PTO interface 17932 may include an end engaging spline interface 17938 to a counter shaft 17942 of a transmission 17940. In embodiments, the heat pump 17914 comprises the electrical load 17912 having an operating voltage between 12V and 48V nominal, and wherein the DC/DC converter 17928 may be configured to provide power from the battery pack 17924 at the operating voltage of the heat pump 17914.

In embodiments, the system 17900 may further include the DC/DC converter 17928 electrically interposed between at least one of: the vehicle electrical system 17920 and the motor/generator 17910, or the vehicle electrical system 17920 and the heat pump 17914.

In embodiments, the system 17900 may further include a vehicle electrical system 17920 having an alternator 17922 that is at least selectively coupled to the prime mover 17904, and wherein the motor/generator 17910 may be selectively coupled to the drive line 17908 via an electrical coupling to the vehicle electrical system 17920. In this embodiment, the system 17900 may further include a battery pack 17924, and a DC/DC power converter 17928 configured to selectively provide power from at least one of the drive line 17908 or the battery pack 17924 to the heat pump 17914. The DC/DC converter 17928 may be electrically interposed between at least one of: the vehicle electrical system 17920 and the motor/generator 17910, the vehicle electrical system 17920 and the battery pack 17924, the vehicle electrical system 17920 and the heat pump 17914. The vehicle electrical system 17920 may operate at a first nominal voltage, and wherein the battery pack 17924 operates at second nominal voltage, wherein the first nominal voltage is distinct from the second nominal voltage. The heat pump 17913 may operate at a selected voltage, wherein the selected voltage is distinct from the first nominal voltage, and may be distinct from the second nominal voltage during at least certain vehicle operating conditions. The second nominal voltage may be higher than the selected voltage during at least certain vehicle operating conditions, and the DC/DC converter 17928 may be buck-capable. The second nominal voltage may be lower than the selected voltage during at least certain vehicle operating conditions, and the DC/DC converter 17928 may be boost-capable. In this embodiment, the system 17900 may further include a controller 17930, the controller 17930 including the battery monitoring circuit 18002 structured to interpret the second nominal voltage of the battery pack 18010; and the HVAC support circuit 18008 structured to selectively command the DC/DC converter 17928 to operate in a selected one of boost mode or buck mode in response to the second nominal voltage of the battery pack 18010. The DC/DC converter 17928 may be electrically interposed between at least one of: the battery pack 17924 and the motor/generator 17910, the battery pack 17924 and the heat pump 17914, or the motor/generator 17910 and the heat pump 17914.

Figure 181A:
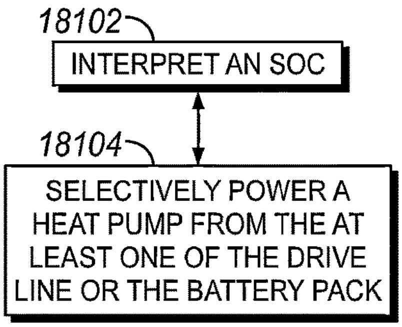

Referring to FIG. 181A, the battery monitoring circuit may be structured to interpret 18102 a state of charge value for each battery of the battery pack, and the HVAC support circuit may be structured to selectively power the heat pump from the at least one of the drive line or the battery pack 18104 in response to the state of charge value for each battery of the battery pack.

Figure 181B:
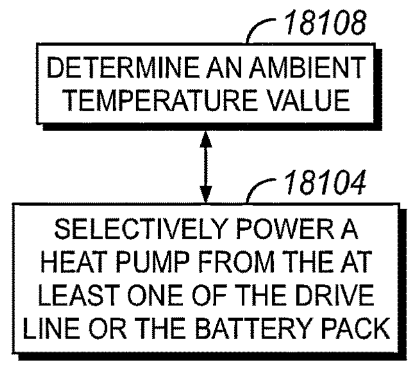
Figure 181C:
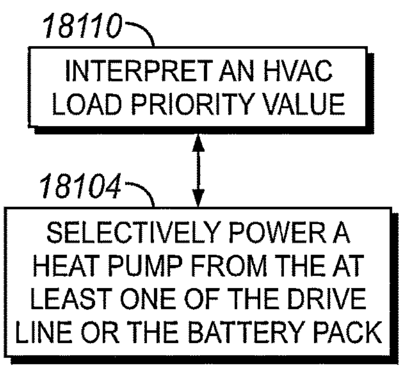
Figure 181D:
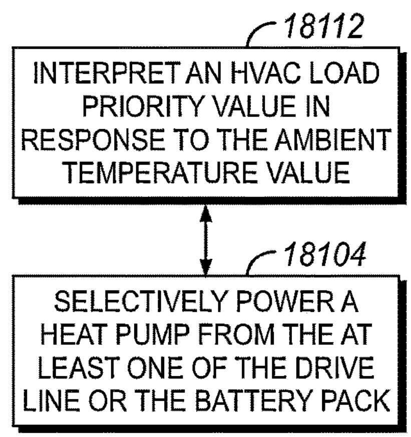
Figure 181E:
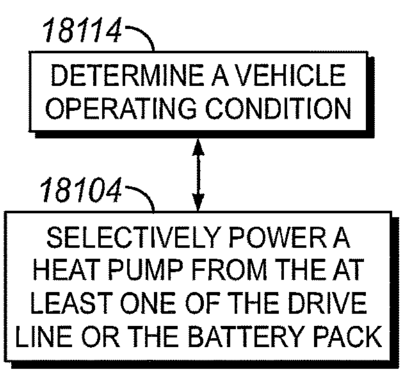
Figure 181F:
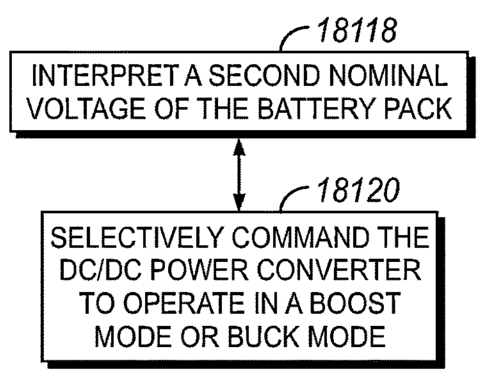

Referring to FIG. 181B, an operating state circuit may be structured to determine an ambient temperature value 18108 and the HVAC support circuit may be further structured to selectively power the heat pump from the at least one of the drive line or the battery pack 18104 in response to the ambient temperature value. Referring to FIG. 181C, an HVAC priority circuit may be structured to interpret an HVAC load priority value 18110, and the HVAC support circuit may be further structured to selectively power the heat pump from the at least one of the drive line or the battery pack 18104 in response to the HVAC load priority value. Referring to FIG. 181D, the HVAC priority circuit may be further structured to interpret the HVAC load priority value in response to the ambient temperature value 18112. Referring to FIG. 181E, the operating state circuit may be further structured to determine a vehicle operating condition 18114 and the HVAC support circuit may be further structured to selectively power the heat pump from the at least one of the drive line or the battery pack 18104 in response to the vehicle operating condition. Referring to FIG. 181F, a battery monitoring circuit may be structured to interpret the second nominal voltage of the battery pack 18118, and an HVAC support circuit may be structured to selectively command the DC/DC power converter to operate in a selected one of boost mode or buck mode 18120 in response to the second nominal voltage of the battery pack.

It should be understood that for any load described herein, including the heat pump, the voltage may be tuned. For example, it may be desired or designed to run the heat pump 17914 at a particular voltage, such as 48V, wherein full batteries exceeding this operating voltage (e.g., 52V) may be tweaked to the 48V needed by the heat pump 17914. In should also be understood that for any load described herein, including the heat pump, large voltage step-ups may be experienced. For example, operating a 36V-42V battery pack after the loss of a battery may allow for some limited operation back up to 48V. It should be understood that for any load described herein, including the heat pump, all other thresholds may be adjusted when operating off-nominally, such as: SOC targets, criticality determinations, priority determinations, and/or policy selections.

FIG. 182A is a schematic depiction of a battery assembly embodiment, with the DC-to-DC converter 18202 exploded to provide a clear view of certain aspects. FIG. 182B is the same embodiment shown in FIG. 182A with the DC-to-DC converter depicted in an installed position. The battery assembly embodiment includes a top tray 18214 providing battery 18222 connections, which may be made of an insulating and flexible material such as plastic. Flexibility in the tray provides for imprecisely tolerance battery terminals 18224 (which are common) to be presented to the DC-to-DC converter 18202 in a tightly tolerance manner (at the high current and signal connections plug 18204 depicted). In certain embodiments, two trays are utilized, each coupling to two batteries, which reduces the complexity in coupling each tray. In this embodiment, a PTO device 18208 and motor/generator 18210 are shown with connections 18220 to the DC-to-DC converter 18202. The battery assembly includes batteries 18222 assembled into a battery box 18218 including brackets 18212 to attach to a vehicle chassis or frame rail. A service disconnect device 18228 may connect with the DC-to-DC converter and be used to quickly de-energize the circuits in the battery assembly when removed (as is shown in FIG. 182A and FIG. 182B).

Top, or covering, tray 18214 may be a rigid U-shaped arrangement for the terminal connection, which allows for ease of installation, and may not provide a seal for the electrical connection. The example of FIG. 183 may include a flexible braid arrangement. In the example of FIG. 183, installation may require raising the braid and fitting onto each terminal, but may provide for an easy seal at the top and bottom of the electrical interface. In certain embodiments, one tray (or a portion of a tray) may have the rigid U-shaped arrangement for one or more terminal connections, and another tray (or another portion of the tray) may have a flexible braid for one or more terminal connections. For example, and without limitation, a tray that is more likely to be serviced (e.g., the tray housing the DC-to-DC converter) may have a rigid U-shaped arrangement, while another tray less likely to be serviced may have a flexible braid arrangement.

In an embodiment, a system may include a vehicle having a prime mover motively coupled to a drive line, a motor/generator selectively coupled to the drive line, and configured to selectively modulate power transfer between an electrical load and the drive line, a battery pack, a DC/DC converter electrically interposed between the motor/generator and the electrical load, and between the battery pack and the electrical load, and a covering tray 18302 positioned over a plurality of batteries of the battery pack, the covering tray comprising a connectivity layer configured to provide electrical connectivity to terminals of the plurality of batteries, wherein the connectivity layer comprises a flexible terminal connection assembly 18304 configured to accommodate at least one of a battery height variability or a battery length variability. The flexible terminal connection assembly 18304 may include a biased connection for each of the plurality of batteries to accommodate the battery height variability, or a copper leaf spring connection for each of the plurality of batteries to accommodate the battery height variability. In embodiments, the flexible terminal connection assembly 18304 may include a copper landing strip connection for each of the plurality of batteries to accommodate the battery length variability. Each copper landing strip connection may include at least one of: a copper sheet portion, a copper foil portion, or a braided copper portion.

In embodiments, the flexible terminal connection assembly 18304 may include a malleable connection appendage for each of the plurality of batteries to accommodate both of the battery height variability and the battery length variability. Each malleable connection appendage may include a copper foil appendage or a braided copper appendage.

In embodiments, the flexible terminal connection assembly 18304 may include a plurality of connection members, the plurality of connection members positioned to accommodate a battery having a selected one of a plurality of battery length parameters, and wherein the connectivity layer is configured to provide electrical connectivity to the terminals of the plurality of batteries in response to each of the plurality of batteries matching at least one of the selected one of the plurality of battery length parameters.

In embodiments, the flexible terminal connection assembly 18304 may include a plurality of ring connectors 18308, each configured to engage a terminal of one of the plurality of batteries.

In embodiments, the flexible terminal connection assembly 18304 may include a plurality of sleeve connectors, each configured to engage a terminal of one of the plurality of batteries. Any battery terminal cap described herein, such as those depicted in FIGS. 125-134 and throughout this Specification and figures, may be used in conjunction with the flexible terminal connection assembly 18304.

Referring to FIG. 184, a system of a vehicle is shown and described including elements, any of which may be present or not present in embodiments. In an embodiment, a system 18400 may include a vehicle 18402 having a prime mover 18404 motively coupled to a drive line 18408, a motor/generator 18412 selectively coupled to the drive line 18408, and configured to selectively modulate power transfer between an electrical load 18414 and the drive line 18408, a battery pack 18418, a DC/DC converter 18420 electrically interposed between the motor/generator 18412 and the electrical load 18414, and between the battery pack 18418 and the electrical load 18414, a covering tray 18430 positioned over a plurality of batteries 18422 of the battery pack 18418, the covering tray comprising a connectivity layer 18442 configured to provide electrical connectivity to terminals of the plurality of batteries 18422, and wherein the connectivity layer 18442 comprises a charging circuit 18454 allowing each of the plurality of batteries 18422 to be discharged individually, a plurality of battery microcontrollers 18424 (as shown in FIG. 39 MICRO 1 through MICRO 5 or FIG. 184), each of the plurality of battery microcontrollers 18424 associated with a corresponding one of a plurality of batteries 18422 of the battery pack 18418, and a primary DC/DC controller 18428 configured to command operations of the DC/DC converter 18420, wherein the plurality of battery microcontrollers MICRO 1-MICRO 5 are operationally coupled to the primary DC/DC controller 18428.

In embodiments, each of the plurality of battery microcontrollers may be grounded to the associated battery. The connectivity layer 18442 may further include a plurality of capacitive couplings to remove DC voltage offsets between grounding connections of the plurality of battery microcontrollers.

In embodiments, the primary DC/DC controller 18428 may be grounded to one of the plurality of batteries 18422. The primary DC/DC controller 18428 may be grounded to a higher voltage than a vehicle chassis voltage. The higher voltage may include at least one of: 12V nominal, 24V nominal, or 36V nominal. In embodiments, each charging circuit 18454 may include a flyback transformer, as discussed with respect to FIG. 33. In some embodiments, the system may further include a battery leveling controller 18460, such as discussed further with respect to FIG. 36, operatively coupled to each of the plurality of battery microcontrollers 18424, the battery leveling controller 18460 configured to execute at least one of battery charging or battery discharging of each of the plurality of batteries.

In an embodiment, a system 18400 may include a vehicle 18402 having a prime mover 18404 motively coupled to a drive line 18408, a motor/generator 18412 selectively coupled to the drive line, and configured to selectively modulate power transfer between an electrical load 18414 and the drive line 18408, a battery pack 18418, a DC/DC converter 18420 electrically interposed between the motor/generator 18412 and the electrical load 18414, and between the battery pack 18418 and the electrical load 18414, a plurality of battery microcontrollers 18424, each of the plurality of battery microcontrollers associated with a corresponding one of a plurality of batteries 18422 of the battery pack 18418, a primary DC/DC controller 18428 configured to command operations of the DC/DC converter, and wherein the plurality of battery microcontrollers 18424 are operationally coupled to the primary DC/DC controller 18428.

The system 18400 may further include a covering tray 18430 positioned over the plurality of batteries 18422 of the battery pack 18418, the covering tray 18430 including a printed circuit board (PCB) 18432 having a circuit 18434 coupling the plurality of battery microcontrollers 18424 to the primary DC/DC controller 18428. The covering tray 18430 may be also as shown and described elsewhere herein, such as trays 6902, 7002, 7102, 7302, 7304, 7402, 7502, 7802, 3008, 3028.

For example, as in FIG. 73A and FIG. 73B, covering tray 7304 may include a connectivity layer 7342, 7320, 18442 configured to provide electrical connectivity to terminals 7352 of the plurality of batteries 7344, 7348, and a second connectivity layer 7318, 18444 coupling the plurality of batteries 7344, 7348 to the DC/DC converter 7312. The PCB 18432 may include at least a portion of an insulating layer 18438 electrically interposed between the connectivity layer 18442 and the second connectivity layer 18444. Each of the plurality of microcontrollers 18424 may be configured to determine a battery temperature value for each associated battery 18422. The battery temperature value may include at least one of: a positive terminal temperature value, a negative terminal temperature value, or a battery characteristic temperature value. Each of the plurality of microcontrollers 18424 may be configured to determine a current value for each associated battery 18422. Each of the plurality of microcontrollers 18424 may be configured to determine a voltage value for each associated battery 18422.

In embodiments, each of the plurality of microcontrollers 18424 may further include a light emitting diode (LED) 18440, 7510, and may be configured to provide an LED indication command, wherein each LED 18440, 7510 may be responsive to the LED indication command of the associated one of the plurality of microcontrollers 18422. The LED indication command may include at least one of an illumination command, an illumination color, or an illumination sequence. The LED indication command may be provided in response to a state of charge value, a state of health value, a reverse connection arrangement, or a temperature value for the associated battery 18422. The LED indication command may be provided as an illumination sequence to communicate at least one of a state value, a fault value, a diagnostic value, or a quantitative value.

In an embodiment, a system 18400 may include a vehicle 18402 having a prime mover 18404 motively coupled to a drive line 18408, a motor/generator 18412 selectively coupled to the drive line 18408, and configured to selectively modulate power transfer between an electrical load 18414 and the drive line 18408, a battery pack 18418, a DC/DC converter 18420 electrically interposed between the motor/generator 18412 and the electrical load 18414, and between the battery pack 18418 and the electrical load 18414, a plurality of battery microcontrollers 18424, each of the plurality of battery microcontrollers 18424 associated with a corresponding one of a plurality of batteries 18422 of the battery pack 18418, a primary DC/DC controller 18428 configured to command operations of the DC/DC converter 18420, and wherein the plurality of battery microcontrollers 18424 are communicatively coupled to the primary DC/DC controller 18428.

In an embodiment, the system 18400 may further include a covering tray 18430 positioned over a plurality of batteries 18422 of the battery pack 18418, the covering tray 18430 comprising a connectivity layer 18442 configured to provide electrical connectivity to terminals of the plurality of batteries 18422, and wherein the connectivity layer 18442 electrically couples the plurality of battery microcontrollers 18424 to the primary DC/DC controller 18428.

In an embodiment, the communicative coupling between the plurality of battery microcontrollers 18424 to the primary DC/DC controller 18428 includes a universal asynchronous receive-transmitter communication protocol.

In an embodiment, the communicative coupling comprises communicative voltage disturbances on the connectivity layer 18442.

In an embodiment, the connectivity layer 18442 comprises separate couplings for communication and power, single wire communication, or two wire communication.

In an embodiment, the system 18400 may further include a capacitor 18450 electrically coupled to the connectivity layer 18442, wherein the capacitor 18450 includes a 100V capacitor.

In an embodiment, the primary DC/DC controller 18428 may be at least selectively communicatively coupled to a service device 18452, and configured to update at least one of firmware or calibrations in response to communications from the service device 18452.

In an embodiment, at least a portion of the primary DC/DC controller may be positioned on a printed circuit board (PCB). The PCB may include a plurality of capacitors 18450 mounted thereon, wherein the plurality of capacitors may be thermally separated from a plurality of switching circuits of the DC/DC converter. The PCB may include a layered PCB, such as depicted in FIG. 43, and wherein power circuits coupling the connectivity layer to the plurality of switching circuits may each be present in at least one layer of the layered PCB. Each of the power circuits may be present in a plurality of layers of the layered PCB. Each of the power circuits may include at least four (4) layers of the layered PCB, with inner layers comprising a heavier copper loading than outer layers. In an example, each of the power circuits may include at least six (6) layers of the layered PCB, with inner layers comprising a heavier copper loading than outer layers. Adjacent layers of the layered PCB to the power circuits may provide at least one of: electrical insulation, thermal insulation, electrical connectivity, or thermal connectivity. Each power circuit may further include an electrical conditioning assembly, wherein each electrical conditioning assembly may include an inductor 2002 and an electromagnetic interference shield.

In an embodiment, the system may further include a DC/DC converter housing 3460 defining at least a portion of the DC/DC converter 3468, 18420 and the primary DC/DC controller. The DC/DC converter housing may include a substantially constant cross-section. In an embodiment, the system may yet further include a plurality of switching circuits of the DC/DC converter positioned on a printed circuit board (PCB). The DC/DC converter may include between two (2) and twelve (12) of the plurality of switching circuits. The PCB may include a layered PCB, and wherein at least one layer of the layered PCB provides a thermal coupling between the plurality of switching circuits and the DC/DC converter housing. The PCB may further include a plurality of power circuits, each power circuit coupling the connectivity layer to the plurality of switching circuits. Each power circuit may further include an electrical conditioning assembly. Each electrical conditioning assembly may include an inductor 2002. Each inductor 2002 may be structurally supported by the DC/DC converter housing 3460.

In embodiments, a system 17500 may include a vehicle having a prime mover 17504 motively coupled to a drive line 17508, a motor/generator 17510 selectively coupled to the drive line 17508, and configured to selectively modulate power transfer between an electrical load 17514 and the drive line 17508, a DC/DC converter 17512 electrically interposed between the motor/generator 17510 and the electrical load 17514, a controller 17518, comprising a policy management circuit 17520 structured to interpret an electrical power policy 17528; and an electrical power management circuit 17522 structured to determine a criticality description 17534 for the electrical load 17514, and to determine an electrical power strategy 17530 for the electrical load 17514 in response to the electric power policy 17528 and the criticality description 17534; a response circuit 17524 structured to provide an electrical power command 17532 in response to the electrical power strategy 17530; and wherein the DC/DC converter 17512 is responsive to the electrical power command to selectively provide electrical power flow between the motor/generator 17510 and the electrical load 17514.

In embodiments, the system 17500 may further include a battery pack 17540, wherein the DC/DC converter 17512 may be electrically interposed between the battery pack 17540 and the electrical load 17514, and responsive to the electrical power command 17532 to selectively provide electrical power flow between the battery pack 17540 and the electrical load 17514. The DC/DC converter 17512 may be further electrically interposed between the battery pack 17540 and the motor/generator 17510, and responsive to the electrical power command 17532 to selectively provide electrical power flow between the battery pack 17540 and the motor/generator 17510.

In an embodiment, the electrical power management circuit 17522 may be further structured to determine the criticality description 17534 for the electrical load 17514 in response to a load type of the electrical load. The electrical power management circuit 17522 may be further structured to determine the criticality description 17534 for the electrical load 17514 in response to a load identifier of the electrical load.

In embodiments and referring to FIG. 211, an embodiment 21100 of the controller 17518 may further include an operating state circuit 21102 structured to determine an ambient temperature value 21104, wherein the electrical power management circuit 17522 may be further structured to determine the criticality description 17534 for the electrical load 17514 in response to the ambient temperature value 21104.

In embodiments, the controller 17518 may further include an operating state circuit 21102 structured to determine a vehicle operating condition 21108, wherein the electrical power management circuit 17522 may be further structured to determine the criticality description 17534 for the electrical load 17514 in response to the vehicle operating condition 21108.

In embodiments, the controller 17518 may further include an operating state circuit 21102 structured to determine an operator priority request value 21110, wherein the electrical power management circuit 17522 may be further structured to determine the criticality description 17534 for the electrical load 17514 in response to the operator priority request value 21110.

In a method and referring to FIG. 212A, an operating state circuit may be structured to determine an ambient temperature value 21202, wherein the electrical power management circuit may be further structured to determine the criticality description for the electrical load 21204 in response to the ambient temperature value. In a method and referring to FIG. 212B, an operating state circuit may be structured to determine a vehicle operating condition 21208, wherein the electrical power management circuit may be further structured to determine the criticality description for the electrical load 21204 in response to the vehicle operating condition. In a method and referring to FIG. 212C, an operating state circuit may be structured to determine an operator priority request value 21210, wherein the electrical power management circuit may be further structured to determine the criticality description for the electrical load 21204 in response to the operator priority request value.

In embodiments and referring to FIG. 185, a system 18500 may include a vehicle 18502 having a prime mover 18504 motively coupled to a drive line 18508, a motor/generator 18512 selectively coupled to the drive line 18508, and configured to selectively modulate power transfer between an electrical load 18514 and the drive line 18508, a battery pack 18518, a DC/DC converter 18520 electrically interposed between the motor/generator 18512 and the electrical load 18514, and between the battery pack 18518 and the electrical load 18514, and a covering tray 18530 positioned over a plurality of batteries 18522*a*, 18522*b* of the battery pack 18518, the covering tray 18530 comprising a connectivity layer 18542 configured to provide electrical connectivity to terminals of the plurality of batteries 18522*a*, 18522*b*. The battery pack 18518 may include four (4) batteries, wherein the covering tray 18530 further includes a first tray 18524 positioned over a first two batteries 18522*a* of the battery pack, and wherein the plurality of batteries 18522*a*, 18522*b* comprises the first two batteries 18522*a*, and further includes a second tray 18528 positioned over a second two batteries 18522*b* of the battery pack 18518, the second tray 18528 comprising a connectivity layer 18544 configured to provide electrical connectivity to terminals of the second two batteries 18522*b*.

In embodiments, the system 18500 may further include a jumper connection 18548 configured to provide electrical connectivity between the first two batteries 18522*a* and the second two batteries 18522*b*.

In embodiments, the battery pack 18518 may include four (4) batteries, wherein the plurality of batteries comprises the four batteries.

In embodiments, the connectivity layer 18542, 18544 may include a copper bus configured to provide selected connectivity of the terminals of the plurality of batteries. In embodiments, the connectivity layer 18542, 18544 may include a printed circuit board (PCB) 18532 configured to provide selected connectivity of the terminals of the plurality of batteries. The PCB 18532 may be coupled to the terminals of the plurality of batteries using a ribbon cable 18550, wherein the ribbon cable 18550 may include a ferrite ribbon cable. The PCB 18532 may be coupled to the DC/DC converter 18520 using a ribbon cable 18550, wherein the ribbon cable 18550 may include a ferrite ribbon cable. The PCB may be coupled to a converter interface 18552 using a ribbon cable 18550, wherein the ribbon cable 18550 may include a ferrite ribbon cable.

In embodiments, the converter interface 18552 may include a PCB coupling member 18554 and a converter coupling member 18558, and the system 18500 may further include a connector 18560 configured to engage the PCB coupling member and the converter coupling member, wherein the connector 18560 in a first position electrically couples the battery pack 18518 to the DC/DC converter 18520, and wherein the connector 18560 in a second position disconnects the battery pack 18518 from the DC/DC converter 18520. The connector 18560 may include a service disconnect. The connector 18560 may include at least one fuse 18562, wherein the connector 18560 in the first position may electrically interpose the at least one fuse 18562 into the electrical coupling of the battery pack 18518 to the DC/DC converter 18520. The connector 18560 may move vertically or horizontally between the first position and the second position.

In an embodiment, the converter interface 18552 may be positioned adjacent to a housing 18564 at least partially defining the DC/DC converter 18520. The converter interface 18552 may be positioned on the covering tray 18530. The converter interface 18552 may be positioned toward an outer surface of the covering tray 18530, the outer surface comprising a surface that is away from the motor/generator 18512.

In an embodiment, the system 18500 may further include a battery box 18568 defining at least a portion of the battery pack, wherein a power coupling from the DC/DC converter 18520 to the motor/generator 18512 traverses an inner surface of the battery box 18568. The power coupling from the DC/DC converter 18520 to the motor/generator 18512 may be positioned within an air duct 18570, the air duct 18570 coupled to the battery box 18568 at a first end, and to the motor/generator 18512 at a second end.

In an embodiment, the connectivity layer 18542, 18544 may be coupled to a converter interface 18552, wherein the connectivity layer may be coupled to the converter interface using a ribbon cable, wherein the ribbon cable may include a ferrite ribbon cable. The converter interface comprises a connectivity layer coupling member 18572 and a converter coupling member 18558; and a connector 18560 configured to engage the connectivity layer coupling member and the converter coupling member, wherein the connector in a first position electrically couples the battery pack to the DC/DC converter, and wherein the connector in a second position disconnects the battery pack from the DC/DC converter. The connector may include a service disconnect. The connector may include at least one fuse 18562, wherein the connector in the first position electrically interposes the at least one fuse 18562 into the electrical coupling of the battery pack to the DC/DC converter. The connector 18560 may move vertically or horizontally between the first position and the second position. The converter interface 18552 may be positioned adjacent to a housing 18564 at least partially defining the DC/DC converter. The converter interface 18552 may be positioned on the covering tray 18530. The converter interface 18552 may be positioned toward an outer surface of the covering tray 18530, the outer surface comprising a surface that is away from the motor/generator.

Referring to FIG. 175, a vehicle transportation system 17500 may include a prime mover 17504 motively coupled to a driveline 17508, a motor/generator 17510 selectively coupled to the driveline 17508, a DC/DC converter 17512 (which may or may not be electrically interposed between the motor/generator 17510) and an electrical load 17514, and a controller 17518. The motor/generator 17510 is configured to selectively modulate power transfer between an electrical load 17514 and the driveline 17508. The controller 17518 may include a policy management circuit 17520, an electrical power management circuit 17522, and a response circuit 17524. In some embodiments, the system may further include a battery pack 17540 and the DC/DC converter 17512 may be interposed between the battery pack 17540 and the electrical load 17514. The DC/DC converter 17512 may be interposed between the battery pack 17540 and the motor/generator 17510.

The policy management circuit 17520 may interpret an electrical power policy 17528, in response to which the electrical power management circuit 17522 determines an electrical power strategy 17530. The response circuit 17524 provides an electrical power command 17532 in response to the electrical power strategy 17530. The DC/DC converter 17512 is responsive to the electrical power command 17532 and selectively provides electrical power from the motor/generator to the electrical load 17514. The DC/DC converter 17512 may be responsive to the electrical power command 17532 and selectively provides electrical power from the battery pack 17540 to the electrical load 17514 or from the motor/generator 17510 to the battery pack 17540.

Referring to FIGS. 176-177, the electrical power strategy 17530 may include future and interim state of charge targets, future and interim charging rate targets, charging rate philosophy, where to source the power from (e.g., a battery pack, a motor/generator, a driveline, a vehicle electrical system, and the like. The electrical power strategy 17530 may include warning 17702 to be provided to the operator such as shutdown times, time remaining before a change in the state of the system will happen, features that will be shut down and when, and the like. The electrical power strategy 17530 may be related to emissions such as supporting an emissions component, describing a load relationship to emissions (e.g. if the load can't go no emissions may be released) and the like.

The electrical power management circuit 17522 may further determine a criticality description 17534 for the electrical load and determine the electrical power strategy 17530 in response to the criticality description 17534.

A criticality description 17534 may include an emissions load value 17542, a comfort load value 17544, a primary mission value 17548, or the like. An emissions load value 17542 may indicate a critical emissions parameter, such as indicating critical support needed for an emissions component, a description of a load relationship to emissions (e.g., if the load can't go, then emissions cannot be emitted), a maximum emissions threshold, or the like. A comfort load value 17544 may indicate a critical HVAC parameter. In some embodiments, there may be a drop in HVAC performance; vehicle performance affect below the level of mission affecting, but may affect driver perception; feature that can, at least intermittently, be disabled without affecting emissions or mission, possibly with or without warning. A primary mission value 17548 include a minimum fuel efficiency target, maintaining environmental conditions in the truck (e.g. maintaining temperature for a refrigerated truck), retaining the ability to perform a cold start, and the like.

The electrical power management circuit 17522 may further determine an operational capability description 17538 for at least one of the motor/generator 17510, a coupling device 17550 interposed between the motor/generator 17510 and the driveline 17508, the DC/DC converter 17512, or the like. The electrical power management circuit 17522 may further determine the electrical power strategy 17530 in response to the operational capability description 17538. The operational capability description 17538 may include a nominal operation value, a faulted operation value, a failed operation value, and the like. A faulted operation value may indicate a parameter out of optimate or typical operating range, a failed operation value indicates a failed operation such as failing to provide adequate power for an electrical load, failing to charge the battery pack, and the like.

Referring to FIG. 178, a method 17800 may include interpreting an electrical power policy (17802), and determining an electrical power strategy for an electric load (17804) in response to the electrical power policy. Based on the electrical power strategy, the method may further include providing an electrical power command (17808), selectively providing electrical power from a motor/generator to the electric load (17810), and selectively providing electrical power from a motor/generator to a battery pack (17812).

Referencing FIG. 202, an example system 20200 is schematically depicted for providing power to an electrical load 20220 of a mobile application. The example system 20200 includes a DC/DC converter 20212 interposed between a battery pack 20214 and the electrical load 20220, where the DC/DC converter 20212 includes more than one phase for supplying power, for example provided by field-effect transistor (FET) circuits as otherwise depicted and described throughout the present disclosure, and/or according to any DC/DC conversion arrangement understood in the art. The DC/DC converter 20212 may be according to any description throughout the present disclosure.

Referencing FIG. 204, an example DC/DC converter 20212 is schematically depicted, with a first power supply phase 20402 and a second power supply phase 20404. The example of FIG. 204 depicts six (6) phases, where operations using the first and second phases 20402, 20404 are described to illustrate aspects of the present disclosure. In certain embodiments, the number of phases is determined depending upon the total current flow through the DC/DC converter 20212, and may be readily extended (e.g., extending a PCB on which the phases are disposed, and adding phases), for example utilizing a standardized housing (e.g., a housing that is extruded, that has a substantially constant cross-section along the length of the housing, etc.), utilizing a simplified arrangement of the PCB in the region of the phases, and/or positioning the phases near an end of the PCB to allow for accommodation of additional phases by extending the PCB, and/or providing the PCB and housing such that the PCB does not structurally support the phases, and/or other components of the PCB having significant mass, such as inductors, shields, and/or capacitors, and/or to allow for removal of phases by de-coupling unused phases from appropriate circuits, and/or allowing for removal of phases by reducing the size of the PCB and the related phases, which has a reduced impact on the design and integration by the simplified arrangement moving other components of the PCB, such as a processor, memory, capacitors, power connection and routing, current detection, and the like, away from related PCB portions that may be removed in a reduced-phase embodiment. The example of FIG. 204 depicts connection to power supply 20406, 20408 (e.g., from the battery pack 20214, motor/generator 20216, and/or vehicle electrical system 20200) positioned away from the phases and related PCB portions that are removable in embodiments utilizing a reduced number of phases. In certain embodiments, the DC/DC converter 20212 includes two (2) phases, four (4) phases, six (6) phases, eight (8) phases, ten (10) phases, and/or twelve (12) phases.

Again referencing FIG. 202, the example system 20200 includes controller 20222 having a number of circuits configured to functionally execute operations of the controller 20222. The controller 20222 may include any aspects of a controller and/or a circuit as set forth throughout the present disclosure. Example embodiments of the controller 20222 are depicted, without limitation to any other aspect of the present disclosure, in FIGS. 205, 207, 210. The controller 20222 may be included, in whole or part, in or with any DC/DC converter as set forth throughout the present disclosure. The controller 20222 may include, in whole or part, any aspect of a controller or circuit as set forth throughout the present disclosure. The example controller 20222 may be provided as a part of a vehicle controller, prime mover controller, transmission controller, and/or as a dedicated controller for the DC/DC converter. In certain embodiments, the controller 20222 may be distributed across one or more of these. In certain embodiments, the controller 20222 may include any sensors or actuators configured to support operations of the controller 20222, and/or may be in communication with any sensors or actuators configured to support operations of the controller 20222, such as contactors, temperature sensors, voltage sensors, current sensors, solid state switches and/or transistors, or the like.

An example system 20200 includes a first power supply phase 20402 and a second power supply phase 20404, where the first power supply phase 20402 has a first current capacity value (e.g., 5 A, 10 A, 20 A, 40 A, 50 A, etc.) and the second power supply phase 20404 has a second current capacity value, where the first current capacity value is distinct from the second current capacity value. In certain embodiments, the ratio of the current capacity between the first current capacity value and the second current capacity value may be between 1.5:1 to 5:1 (e.g., 10 A and 15 A; 20 A and 40 A; 10 A and 50 A, etc.). In certain embodiments, the ratio of the current capacity between the first current capacity value and the second current capacity value may be between 2:1 to 400:1 (e.g., 20 A and 40 A; 2 A and 400 A, etc.). The utilization of power supply phases having distinct current capacities allows for a number of operations to improve the capability of the system 20200 and the efficiency of the system—for example according to the amount of power supplied at the converter output relative to the amount of power supplied at the converter input. In certain embodiments, the power supply phases have an inefficient region of operation, which may be at low duty cycles (e.g., a low percentage of the current capacity being transferred through the phase), and/or at intermediate duty cycles such as between 70% to 95% of the maximum current capacity. In certain embodiments, the inefficient region relates to percentage losses (e.g., power out versus power in), and/or relates to temperature generation (e.g., a minor loss of efficiency at a higher power throughput generates more heat than a more significant loss of efficiency at a very low power throughput). In certain embodiments, the controller 20222 is configured to utilize the differential current capacity values to minimize the operating regions of the various phases in inefficient operating regions. In certain embodiments, the controller 20222 is configured to utilize the differential current capacity values to reduce power losses during certain operating conditions—for example during keyoff operations, operations where the prime mover is shutdown, and/or during accessory support operations (e.g., a dome light, radio, cab accessory, or the like). For example, if a keyoff operation or accessory support operation is expected to need only a few amps to support those operations, an example DC/DC converter 20212 includes a power supply phase having a current capacity value allowing those operations to be supported while the power supply phase operates in an efficient region for the power phase (e.g., 2 A, 5 A, 10 A, etc.), and another power supply phase includes a current capacity value allowing for support of higher current operations (e.g., motive power, cranking operations, HVAC support, high power accessory support, etc.).

The example system 20200 includes a number of components that are optional, and are not exhaustive. The system 20200 may include any components or arrangements as depicted throughout the present disclosure, with the component depicted in FIG. 202 as an example to illustrate certain features and operations of the present disclosure. The example system 20200 includes the prime mover 20202, which may be any type of prime mover, including at least a reciprocating engine, a turbine engine, a hydraulic prime mover, an electrical prime mover, or the like. The example system 20202 includes a flywheel 20208 associated with the prime mover 20202 and a clutch 20210 configured to selectively couple a driveline to the prime mover. The example driveline includes a transmission 20204 and a motive load 20206 (e.g., wheels of a vehicle). The example system 20200 includes the motor/generator 20216 at least selectively coupled to the driveline, for example by engaging a gear of the transmission 20204, engaging the flywheel 20208, and/or engaging (electrically) a vehicle electrical system 20201. In certain embodiments, the motor/generator 20216 engages the driveline using a gear box 20218, for example allowing for selective engagement (e.g., engaging and/or disengaging), engagement at selected gear ratios, and/or engagement at selected positions. Referencing FIG. 203, an example transmission 20204 is schematically depicted, depicting example engagement positions for a gear box 20218. The example transmission 20204 includes an input shaft 20302 rotationally coupled to the clutch 20210, and an output shaft 20306 rotationally coupled to a remainder of the driveline to the motive load (20206)—for example a driveline, differential, reduction gearing, and/or the wheels and/or related axles. In the example of FIG. 203, the transmission 20204 includes a main shaft 20304 and a countershaft 20308, allowing for variable gear ratios through the transmission 20204 by coupling and de-coupling shafts having engaged gears that rotate relative to each shaft, with synchronizers moved by shift actuators (not shown) to fix selected gears to the related shaft, thereby applying a selected gear ratio. In certain embodiments, a gear may be positioned in neutral (e.g., no related gear is fixed to the shaft), for example allowing the countershaft 20308 to be coupled to the input shaft 20302 but de-coupled from the main shaft 20304 and/or the output shaft 20306. The example arrangement depicts the gear box 20218 coupled to the countershaft 20308 by engaging a gear (e.g., the lower left gear box 20218 example) or by engaging the countershaft 20308 at an end (e.g., coupling using a spline).

The example gear box 20218 may utilize one of these coupling positions, both of these coupling positions, or another coupling position as described herein. The coupling of the gear box 20218 may utilize a direct gear mesh, a spacing mechanism such as an idler gear, belt, or chain, a spline engagement, and/or combinations of these. In certain embodiments, the gear box 20218 includes a decoupling mechanism allowing for selective engagement, for example using a clutch, a slipping clutch, a neutral position, or the like. In certain embodiments, the motor/generator 20216 allows for selective engagement, for example by powering down a coil allowing for a free spin operation. In certain embodiments, the motor/generator 20216 is configured for power transfer from the driveline (e.g., taking mechanical power from the driveline, and/or electrical power from the vehicle electrical system 20201 that is ultimately provided by the prime mover 20202 and/or a dedicated energy source for the prime mover, such as an alternator, battery pack, fuel cell, etc.), which may be utilized to recharge the battery pack 20214, to power the electrical load 20220, and/or otherwise provided to the DC/DC converter 20212 for utilization to support any operations of the DC/DC converter 20212. In certain embodiments, the motor/generator 20216 may be configured to power the electrical and/or shared load 20220, and/or the gear box 20218 may be configured to power the shared load 20220. In certain embodiments, the motor/generator 20216 may be configured to provide power to the driveline, for example to assist in creep operations, start operations, and/or to reduce fuel consumption by providing motive power to the driveline from previously stored electrical power. The example DC/DC converter 20212 may be configured to control electrical power transfer operations between the motor/generator 20216, the battery pack 20214, an electrical load 20220, and/or the vehicle electrical system 20201—and/or to configured power transfer operations at selected voltages, current values, or the like.

Without limitation to any other aspect of the present disclosure, example electrical and/or shared loads 20220 are described following. Any one or more of these loads may be present in certain embodiments. Certain example loads may be powered by the driveline in certain operating conditions, and by the motor/generator 20216 and/or the DC/DC converter 20212 at other operating conditions. In certain embodiments, a load may be powered mechanically during certain operating conditions, and powered electrically during other operating conditions. Example and non-limiting electrical and/or shared loads include one or more of: an electric heater, an HVAC device, a cab power load (e.g., an outlet, dedicated electrical device power supply, cab accessory such as a light, actuator, sound system, etc.), a fan, a power steering pump, a mixer, a drum, a sprayer, a spreader, a driven shaft, a shift actuator, a clutch actuator, and/or any type of device that may typically be a PTO driven device.

Referencing FIG. 205, an embodiment 20500 of an example controller 20222 includes a power request circuit 20502, a power provision circuit 20504, and a power command circuit 20506. The example power request circuit 20502 interprets a power request 20508 for an electrical load (and/or a shared load). The example power request 20508 may be provided as a communication from another controller (e.g., a vehicle controller, engine controller, transmission controller, etc.), determined by another request or command (e.g., a shaft speed, instructed temperature, etc., from which the power request 20508 is determined), and/or according to operating conditions (e.g., providing power in response to a keyswitch ON value, a cab temperature value, a vehicle speed value, a prime mover speed value, etc.). The example power provision circuit 20504 determines a current value 20510 for each phase (e.g., a first power supply phase 20402 and second power supply phase 20404, and/or for all of the phases present) of the DC/DC converter 20212. In certain embodiments, each of the phases includes a low efficiency current range—for example a region of the operating range of the phase whereby energy conversion losses are higher than other regions, a region where temperature generation is increased, a region where utilization of service life and/or wear of the phase components (e.g., transistors, capacitors, switches, etc.) are increased, or the like. In certain embodiments, the low efficiency current range 20519 may be changed based on operating conditions (e.g., ambient temperature, active cooling capability, etc.), and/or the state of components (e.g., balancing utilization of similar phases by considering further utilization of highly utilized components to be "low efficiency" relative to components with lower utilization, and/or by considering utilization of higher temperature components under present operating conditions to be "low efficiency" relative to lower temperature components). An example operation of the power provision circuit 20504 determines the current value 20510 to avoid the low efficiency current range of each phase. Operations to avoid the low efficiency current range of each phase include one or more of: avoiding operation within the range completely, reducing time spent in the range, and/or minimizing and/or reducing a total cost (e.g., determined according to time, utilization, wear contribution, temperature energy generated, etc.) of phases operating within the low efficiency range. The example controller 20222 includes a power command circuit 20506 that provides a phase power command value 20512 in response to the current value(s) 20510 for each power supply phase. The example phase power command value(s) 20512 may include one or more of: PWM command parameters 20518 (e.g., duty cycle values, period values, amplitude values (where present)); contactor commands (e.g., providing a selected electrical coupling between the battery pack, vehicle electrical system, motor/generator, and/or electrical load(s)); and/or cooling commands (e.g., flow rates for active cooling where present). In certain embodiments, the phase power command values 20512 implement the current value(s) 20510, and/or progress the power provision toward the current value(s) 20510 (e.g., during transient operations, and/or where an off-nominal operating condition prevents achieving the current value(s) 20510, current capacity value(s) 20516), for each phase. In certain embodiments, for example where an off-nominal condition (e.g., a failed component, faulted component, failed or faulted sensor, temperature value, etc. prevents full capability to meet the current value 20510) prevents achieving the current value(s) 20510, the power command circuit 20506 may adjust the phase power command value(s) 20512 to achieve the power request 20508 (e.g., utilizing a different set of the phases despite the determinations of the power provision circuit 20504), and/or may provide a fault or diagnostic notification if the power request 20508 cannot be met, the power provision between phases is changed, a full power provision capability cannot be met, and/or a component is in a faulted or failed condition.

An example power provision circuit 20504 utilizes three power regimes to determine the current value(s) 20510 for each phase. For example, in a first power regime, the power provision circuit 20504 utilizes a first power supply phase, in a second power regime, the power provision circuit 20504 utilizes a second power supply phase, and in a third power regime, the power provision circuit 20504 utilizes both the first and second power supply phase. In the example, the first power regime, second power regime, and third power regime are increasing power regimes—for example up to 20 A (e.g., at 48V nominal, or about 1 kWh) for the first power regime, 20 A-40 A for the second power regime, and above 40 A for the third power regime. In certain embodiments, the power provision circuit 20504 may determine the current values 20510 using a hysteresis and/or filtering (e.g., of the power request 20508 and/or current values 20510) to reduce undesired behavior such as dithering, limit cycling, or the like. In the example, the first power supply phase may have current capability range that is more limited than the second power supply phase. The utilization of power regimes, the number of power regimes utilized, and the number of power supply phases utilized in total and within each power regime, are non-limiting illustrations used for this and other examples.

An example power provision circuit 20504 utilizes four power regimes to determine the current value(s) 20510 for each phase. For example, in a first power regime, the power provision circuit 20504 utilizes a first power supply phase, in a second power regime, the power provision circuit 20504 utilizes a second power supply phase, in a third power regime, the power provision circuit 20504 utilizes again the first power supply phase, and in a fourth power regime, the power provision circuit 20504 utilizes both the first power supply phase and the second power supply phase. The operations of the example allow for the second power supply phase to be utilized to avoid an inefficient region of the first power supply phase, for example utilizing the first power supply phase for 0 A-5 A, utilizing the second power supply phase for 5 A-10 A, and again utilizing the first power supply phase for 10 A-20 A operation.

An example power provision circuit 20504 utilizes five power regimes to determine the current value(s) 20510 for each phase. For example, in a first power regime, the power provision circuit 20504 utilizes a first power supply phase, in a second power regime, the power provision circuit 20504 utilizes a second power supply phase, in a third power regime, the power provision circuit 20504 utilizes both the first and second power supply phases, in a fourth power regime, the power provision circuit 20504 utilizes again the second power supply phase, and in a fifth power regime the power provision circuit 20504 utilizes again both the first and second power supply phases. The operations of the example allow for the first power supply phase to be utilized to avoid an inefficient region of the second power supply phase, for example utilizing the first power supply phase for 0 A-20 A, the second power supply phase for 20 A-30 A, utilizing both the first and second power supply phases for 30 A-35 A, utilizing just the second power supply phase for 35 A-40 A, and utilizing both power supply phases above 40 A operation.

Again referencing FIG. 205, an example controller 20222 includes the power command circuit 20506 that provides the phase power command values(s) 20512 including a duty cycle command (e.g., as a PWM command parameter) for each of the power supply phases. In certain embodiments, the power command circuit 20506 provides the phase power command value(s) 20512 using an open loop control scheme—for example determining the PWM duty cycle for each phase that is expected to nominally provide the scheduled power amount. In certain embodiments, the power command circuit 20506 provides the phase power command value(s) using a feedback control scheme, for example using current values from each phase, and balancing the current provided by each phase (and/or providing a selected amount of current through each phase), and/or using temperature values from each phase (e.g., balancing the temperature of each phase, and/or adjusting each phase to a selected temperature for that phase). In certain embodiments, the power provision circuit 20504 determines temperature values for each phase of the power supply phases, and provides the temperature values for utilization by the power command circuit 20506. In certain embodiments, the power provision circuit 20504 interprets a DC ripple value (e.g., a transient disturbance in the voltage and/or current provided at the power output, for example due to PWM operations to provide a DC current, and/or due to transient response resulting from changes in the power request 20508, switching of phases providing the power conversion, or the like), and the power command circuit 20506 provides the phase power command value(s) 20512 in response to the DC ripple value (e.g., to reduce or eliminate the ripple). In certain embodiments, the power provision circuit 20504 determines a measured low side voltage value, and the power command circuit 20506 provides the phase power command(s) 20512 (and/or the power provision circuit 20504 adjusts the current value(s) 20510) in response to the measured low side voltage value—for example allowing for compensation due to a low or high battery pack voltage, or other supply voltage such as from the motor/generator and/or vehicle electrical system. In certain embodiments, the power provision circuit 20504 determines a measured high side voltage value, and the power command circuit 20506 provides the phase power command(s) 20512 (and/or the power provision circuit 20504 adjusts the current value(s) 20510) in response to the measured high side voltage value—for example allowing for a feedback based adjustment to the provided power regardless of the cause. In certain embodiments, a first portion of the power supply phases operate at a first switching frequency, and a second portion of the power supply phases operate at a second switching frequency. In a further example, the power command circuit 20506 includes a master control unit configured to transmit control signals effective to operate the first portion of the plurality of power supply phases, and a butler control unit configured to transmit control signals effective to operate the second portion of the plurality of power supply phases. In certain embodiments, the second portion of the power supply phases has a higher switching frequency than the first portion of the power supply phases.

Referencing FIG. 206, an example procedure 20600 for controller power supply phases of a DC/DC converter is schematically depicted. The example procedure may be performed by any controller, circuit, or component of the present disclosure, including at least a controller 20222 in FIG. 205. The example procedure 20600 includes an operation 20602 to interpret a power request, an operation 20604 to determine a current value for each power supply phase in response to the power request, and an operation 20608 to provide phase power commands in response to the current value(s).

Referencing FIG. 186, an example system 18600 for providing shift assistance operations using a PTO device 18612 is schematically depicted. FIG. 186 is an example arrangement, and one or more components depicted in FIG. 186 may be omitted in certain embodiments. In certain embodiments, the system 18600 may be included in whole or part, and/or may incorporate in whole or part, with any systems, components, controllers, and/or circuits as set forth throughout the present disclosure. An example system 18600 includes a vehicle 18602 having a prime mover 18604 and a driveline 18608, where the driveline 18608 includes a transmission 18610 interposed between the prime more 18604 and a mechanical load 18614. In certain embodiments, the mechanical load 18614 may be a motive load 18634 (e.g., driving wheels of a vehicle). In certain embodiments, the motive load 18634 may additionally or alternatively be a PTO load 18638, which may be driven by the driveline 18608 or the motor/generator 18618, and/or which may be a shared load. In certain embodiments, shift assistance operations are performed for a shift event that occurs to support the PTO load 18638 instead of, or in addition to, support for a motive load 18634. For example, a PTO load 18638 may be operated to perform pumping operations, where a gear shift adjusts the speed ratio between the prime mover 18604 and the PTO load 18638.

The example system 18600 includes a PTO device 18612 configured to at least selectively transfer power between the driveline 18608 and a motor/generator 18618. The example PTO device 18612 may be any device as set forth throughout the present disclosure, and may be coupled to a flywheel 18622 of the prime mover 18604, an input shaft 18624, a countershaft 18628, an output shaft 18630, and/or a main shaft 18632.

The example system 18600 includes a controller 18620 configured to functionally execute shift assistance operations as set forth herein, for example and without limitation as depicted in FIG. 187 or 136. Referencing FIG. 187, an example controller 18620 includes a shift determination circuit 18702 that determines a shift operation value 18704 (e.g., determining that an operator and/or automated transmission controller is performing a shift operation such as an upshift, downshift, or gear engagement from neutral), and a shift assistance circuit 18708 that provides a shift assistance command 18710 in response to the shift operation value 18704. The example system 18600 includes a PTO device 18612 configured to at least selectively transfer power between the driveline 18608 and the motor/generator 18618, where the PTO device 18612 is responsive to perform a shift assistance operation 18712 in response to the shift assistance command 18710. Example and non-limiting shift assistance operations 18712 include one or more of: modulating a shaft speed (e.g., a rotational speed of a shaft of the transmission, and/or a shaft of the PTO device 18612, such as a shaft of the motor/generator 18618); modulating a shaft speed trajectory (e.g., adjusting a rate of change of a speed of a shaft, a time trajectory of the shaft, and/or moving the shaft speed toward a target value, which may be a fixed, moving, or calculated target value); and/or modulating a motor/generator torque impact value (e.g., a torque transferred to, or taken from, the driveline where the motor/generator is coupled to the driveline). In certain embodiments, the motor/generator torque impact value may be modulated to a zero torque value, for example to remove an impact of the PTO device 18612 and/or motor/generator 18618 from affecting the transmission shift operation, while allowing the PTO device 18612 to keep the motor/generator 18618 coupled to the driveline (and/or where the motor/generator 18618 is always coupled to the driveline 18608). The example operations, including a shaft speed modulation operation 18714, a shaft speed trajectory operation 18718, a motor/generator torque impact modulation operation 18720, and/or a motor/generator zero torque operation 18722, allow for the controller 18620 to implement shift assistance operations with the PTO device 18612, improving shift execution speed, shifting smoothness (e.g., improved synchronization capability and synchronization rate), and/or allow for installation of a PTO device 18612 onto a system 18600 without affecting a previously configured driveline, transmission, and/or shifting scheme. In certain embodiments, operations of the controller 18620 include speeding up a shaft to a target speed (e.g., toward a synchronizing speed), slowing down a shaft to a target speed (e.g., toward a synchronizing speed), regenerating energy from the driveline (e.g., by capturing rotational inertia from the driveline), and/or reducing an impact of the installed PTO device 18612 on drive response and/or shift response. In certain embodiments, the shift assistance operations 18712 performed will be determined based upon the type of shift event, for example an upshift event or a downshift event, but additionally or alternatively may be determined based on gear ratios and/or vehicle speeds (e.g., accounting for the final speed of components after a target gear is engaged), and/or a change of speeds during the shift operation (e.g., accounting for components slowing down during an extended shift event). In certain embodiments, the shift determination circuit 18702 determines the shift operation value 18704 in response to one or more of: a gear change value (e.g., where an engaged gear of the transmission is known and/or communicated by a transmission controller, and/or where a position of shift actuators of the transmission is known and/or communicated by a transmission controller), a clutch engagement or disengagement value (e.g., predicting a shift in response to an engagement or disengagement of the clutch), and/or a gear increase value or gear decrease value (e.g., determining the shift event and/or target speeds for the shift assistance based on an increase and/or decrease in the gear ratio, which may be determined by actuator positions and/or calculated based on vehicle speed and/or shaft speeds). In certain embodiments, the shift determination circuit 18702 may determine a shift event in response to vehicle history, such as a general pattern of acceleration or deceleration, application of a brake and/or accelerator, and/or a recent launch of the vehicle. In certain embodiments, the shift determination circuit 18702 may determine the shift event based on other operating conditions, such as a gear lever position, an indicated gear request, a geographical location (e.g., within a parking lot, on an entrance or exit ramp for a highway, climbing or descending a hill, approaching an indicated destination, etc.), and/or an operational schedule and/or operational history for a PTO load 18638 (e.g., a pump schedule for a job, where the shift event occurs at a change of rate and/or pumping pressure for the job).

Referencing FIG. 188, an example system 18800 includes a vehicle 18802 having a prime mover 18804 and a driveline 18808, the driveline 18808 including a transmission 18810 interposed between the prime mover 18804 and a mechanical load 18814 (e.g., a motive load, and/or a PTO load). The example system 18800 includes a PTO device 18812 configured to at least selectively transfer power between the driveline 18808 and a motor/generator 18818. The PTO device 18812 may be embodied in whole or part as any PTO device described herein, and may be coupled to the driveline at any position described herein. In certain embodiments, the system 18800 may be included in whole or part, and/or may incorporate in whole or part, with any systems, components, controllers, and/or circuits as set forth throughout the present disclosure. The example system 18800 includes a controller 18820 configured to perform a start-up operation (or start-up sequence) as set forth herein, for example and without limitation as depicted in FIG. 189, or 136-139. In certain embodiments, the system 18800 includes one or more of a pneumatic actuator shifter 18824, a battery pack 18850 (e.g., used to power the motor/generator 18818 and/or receive power from the motor/generator 18818), a clutch 18848 (e.g., interposed between the prime mover 18804 and the transmission 18810), a pneumatically operated clutch 18840, an air tank 18842 (e.g., used to store compressed air for braking, shifting, and/or clutch actuation), and/or an air compressor 18844 (e.g., used to charge the air tank 18842). In certain embodiments, where present, the air compressor 18844 may be powered by the motor/generator 18818, by the prime mover 18804 (e.g., from a belt), by an auxiliary electric motor using the vehicle electrical system, and/or the air compressor 18844 may be a shared load.

Referencing FIG. 189, an example controller 18820 includes a start-up management circuit 18902 that determines a start-up operation value 18908, and a start-up implementation circuit 18904 that provides a start-up sequence command 18910 in response to the start-up operation value 18908. An example start-up sequence command 18910 includes a command to determine an air pressure value of an air tank, and a command for the PTO device (e.g., using the motor/generator) to power an air compressor in response to the air pressure value being below a threshold value (e.g., ensuring that the air compressor has enough power to disengage the clutch, disengage the brakes, and/or operate shift actuators before starting, and/or as quickly as possible after the start-up operation such as a keyswitch ON signal, keyswitch position, prime mover speed value, actuation of an operator input such as a brake pedal, accelerator pedal, clutch pedal, gear shift lever, or the like). In certain embodiments, the PTO device is configured to perform start assistance operations 18914 (e.g., initiating or supporting rotation of the prime mover), where the start-up sequence command 18910 includes a command to delay start assistance operations 18914 in response to the air pressure value 18912 being below a threshold value.

An example controller 18820 includes a start-up calibration circuit 18918 responsive to a start-up sequence command 18910 including a clutch calibration command 18920, that performs a clutch calibration operation 18922 in response to the clutch calibration command 18920. Example operations to perform the clutch calibration command 18920 include determining a clutch touch point position (e.g., a position of the clutch actuator at which the clutch begins to transfer torque between the driveline and the transmission), a clutch engagement point (e.g., a position of the clutch actuator at which the clutch transfers torque exceeding an engagement threshold, engages with a selected force, and/or has moved a selected distance past the touch point), and/or a clutch engagement trajectory (e.g., an engaging parameter such as engagement force against an actuation parameter such as actuator position). In certain embodiments, the clutch calibration is performed utilizing a speed of the prime mover and a speed of the input shaft, and/or further utilizing an estimated, modeled, and/or updated (e.g., based on engagement operations and shaft speeds) friction description of the clutch. In certain embodiments, the clutch calibration is performed utilizing the clutch position (e.g., actual movement of the clutch actuator) and engagement force (e.g., force of a biasing member less an opposing force, for example where the biasing member is spring forcing the clutch open or closed, and where the opposing force is from the clutch actuator).

An example controller 18820 includes the start-up calibration circuit 18918 responsive to a start-up sequence command 18910 including a shift calibration command 18924, that performs a shift calibration operation 18928 in response to the shift calibration command 18924. Example operations to perform the shift calibration operation 18928 include a shift assist component touch point (e.g., a time and/or rotational distance between a command of the PTO device to interact with the driveline, and when torque transfer begins), a shift assist component engagement point (e.g., a time and/or rotational distance between a command of the PTO device to interact with the driveline, and when rotational torque transfer exceeds a threshold value), and/or a shift assist component engagement trajectory (e.g., an engaging parameter such as a time and/or rotational distance against an actuating parameter such as a torque value and/or a position value of an engaged component such as the flywheel, input shaft, countershaft, main shaft, and/or output shaft). In certain embodiments, the shift calibration provides feedback to improved various operations throughout the present disclosure, such as prime mover start operations, creep mode operations, and/or shift assistance operations. Certain operations herein are time sensitive, such as shift assistance operations, and/or positionally sensitive (e.g., creep mode, where vehicle movement may result or be intended). Additionally or alternatively, depending upon the specific gear arrangement, for example the engaged gear of the transmission and/or a gear box of the PTO device, a different amount of lash, backlash, or other mechanical differences may be stacked up depending upon the gear of the transmission and/or the gear box, and accordingly the shift calibration operations may be performed for different gear positions and arrangements, which may be performed over time (e.g., cycling through different arrangements for different start-up events, and/or as available according to the arrangement of start-up operations). In certain embodiments, operations of controller 18820 of FIG. 190 may be performed on shutdown to provide a selected gear arrangement for start-up calibration, for example a gear arrangement that has not been calibrated for a selected period of time, number of operating hours, number of trips, or the like.

An example controller 18820 includes the start-up calibration circuit 18918 responsive to a start-up sequence command 18910 including a rotational description command 18930, where the start-up calibration circuit 18918 performs a rotational description calibration operation 18932 in response to the rotational description command 18930. In certain embodiments, the rotational description calibration operation 18932 includes determining a rotational inertia and/or a drag amount of at least one component of the transmission. In certain embodiments, the rotational inertia may be determined according to a known torque transfer amount (e.g., a scheduled amount of torque from the motor/generator) and a rotational response (e.g., acceleration and/or deceleration rate) of the rotating components of the transmission. In certain embodiments, depending upon the specific gear arrangement, distinct components of the transmission (e.g., shafts and/or gears) rotate, and the calibration may be performed separately for distinct gear arrangements. In certain embodiments, a calibration may be performed to determine certain primary components, for example the input shaft and/or the clutch, with estimates or compensation utilized to determine rotational inertia for other components. In certain embodiments, drag calibrations may be performed utilizing a deceleration operation (e.g., allowing the rotating components to freely decelerate) and/or pseudo steady state operation (e.g., applying a known torque to maintain a constant speed of the rotating components, where the drag is associated with the known torque to maintain the constant speed). The availability of rotational inertia and/or drag for transmission components may be utilized to improve certain operations throughout the present disclosure, including at least shift assistance operations, prime mover restart operations—e.g., reference FIGS. 191 and 195, cost determinations, and/or efficiency determinations—for example determining competing costs between fuel and electrical power utilization, state of charge targets, and the like. In certain embodiments, the rotational description calibration operation 18932 may be performed in view of various gear arrangements, such as described in the context of the shift calibration operations 18928.

In certain embodiments, calibrations may be performed further in view of operating conditions that may affect the engagement torque, drag, and/or effective rotational inertia of various components, such as ambient temperature, air pressure, rotational speed of components (e.g., for non-linear effects), fluid age (e.g., which may affect the viscosity, lubricity, or other aspects of the transmission fluid or other relevant fluid), and/or fluid temperatures (e.g., cold and/or marginally lubricated parts of the transmission after a cold start, versus a hot start where transmission fluid is warm and well distributed). Calibration performed in view of operating conditions may include compensation for the operating conditions (e.g., storing calibrations at a nominal value, and compensating for conditions at the time of calibration and/or operation using the calibrations), include operating conditions as a part of the calibration (e.g., storing multiple tables of engagement parameters based on operating conditions), and/or a combination of these (e.g., storing calibrations for several operating conditions, and interpolating or extrapolating to current conditions at the time of calibration and/or operations using the calibration).

An example start-up sequence command 18910 includes a prime mover start command 18934, where the PTO device is responsive to the prime mover start command 18934 to assist a start of the prime mover. Any operations to assist a prime mover start are contemplated herein, including at least operations described in relation to FIGS. 136-139. Example operations include an operation to rotate the prime mover, for example through torque transfer from the motor/generator to the prime mover (e.g., through at least one shaft of the transmission and the clutch, and/or directly to the flywheel of the prime mover) to spin the prime mover up to a target rotational speed (e.g., idle speed, or some lower speed combined with fueling or other prime mover power), and/or to spin the prime mover according to a target rotational speed trajectory (e.g., according to a rotational speed versus time, and/or versus rotational position), for example to reduce fuel consumption or emissions during prime mover start operations, to ensure the prime mover is started within a specified time, and/or to improve an operator experience (e.g., to provide a consistent start, a low impact start, a quiet start, or the like). In certain embodiments, the PTO device is configured to assist the start of the prime mover by coupling the motor/generator to the prime mover, and decoupling the motor/generator from the mechanical load (e.g., decoupling the countershaft from the output shaft to ensure the vehicle does not move, a PTO device such as a pump or mixer is not powered during the start assistance operations, and/or to avoid a disturbance in motive operations during the prime mover start). In certain embodiments, the mechanical load is not decoupled from the motor/generator, for example on a launch of the vehicle that is performed with the prime mover start, during a prime mover start event while the vehicle is moving, or the like. Without limitation to any other aspect of the present disclosure, controller 18820 may be configured to perform any startup and/or calibration operations described herein, including operations described in relation to FIG. 136-139, or 198-200.

Referencing FIG. 190, an example controller 18820 includes a shut-down management circuit 19002 that determines a shut-down operation value 19008, and a shut-down implementation circuit 19004 that provides a shut-down sequence command 19010 in response to the shut-down operation value 19008. An example shut-down sequence command 19010 includes an operation to engage the clutch with the prime mover, for example allowing the motor/generator and/or PTO device to perform prime mover start and/or calibration operations on a subsequent prime mover start and/or keyswitch ON event. In certain embodiments, a shut-down sequence command 19010 includes an operation to disengage the clutch from the prime mover (e.g., allowing the motor/generator to power a shared load during a shut-down period, and/or to perform certain calibration operations on a subsequent prime mover start and/or keyswitch ON event), and/or an operation to command a position of the transmission into a selected gear, and/or into a neutral position. Operations of the shut-down sequence command 19010 allow the controller 18820 to position the driveline and PTO device into selected configurations to ensure that a restart can be performed, to ensure that calibration operations can be performed, and/or to secure the driveline according to a selected configuration during the shutdown. An example shut-down sequence command 19010 includes a command to couple the motor/generator to the prime mover or the mechanical load, and to decouple the motor/generator from the other one of the prime mover or the mechanical load (e.g., to allow the motor/generator to perform a hill holding maneuver or a creep maneuver, and/or to allow the motor/generator to perform a prime mover start operation). Without limitation to any other aspect of the present disclosure, controller 18820 may be configured to perform any shut-down operations described herein, including operations described in relation to FIG. 137-138, or 201.

Referencing FIG. 191, an example controller 18820 is schematically depicted and configured to perform prime mover restart operations. The example controller 18820 may be included, in whole or part, in any system herein, and may be embodied by and/or include, in whole or part, any controller, circuit, or component described herein. Without limitation to any other aspect of the present disclosure, controller 18820 may be configured to perform any restart operations described herein, including operations described in relation to FIG. 141, or 194-196. The example controller 18820 includes a restart management circuit 19102 that determines a prime mover automated restart value 19108, and a restart implementation circuit 19104 that provides a restart sequence command 19110 in response to the prime mover automated restart value 19108. An example restart management circuit 19102 determines the prime mover restart value 19108 in response to a state of charge 19112 for the battery pack, where the PTO device is configured to transfer power between the battery pack and the motor/generator (e.g., to charge the battery pack using energy from the driveline) responsive to the restart sequence command 19110. An example restart management circuit 19102 determines the prime mover automated restart value 19108 by performing one or more operations such as: determining that a state of charge 19112 is below a threshold value; reserving a sufficient state of charge 19112 to perform a prime mover restart operation (e.g., preserving enough energy in the battery pack to restart the prime mover at a later time), reserving a sufficient state of charge 19112 to support critical loads during a shutdown, and/or reserving a sufficient state of charge 19112 to support selected loads during a shut-down, such as HVAC loads. In certain embodiments, the criticality and/or priority of loads may be determined according to any descriptions herein, which may depend upon the operating conditions (e.g., ambient temperature, geographic location, availability of shore power at a shutdown location, etc.). In certain embodiments, the restart management circuit 19102 determines the prime mover automated restart value 19108 in response to one or more operating conditions such as: a keyswitch value (e.g., disabling a restart with the keyswitch OFF or in another position); a shift actuator position value (e.g., according to permitted gear arrangements, and/or ensuring that a restart will not cause unintended movement of the vehicle and/or powering of a mechanical load); a pedal position (e.g., allowing or disallowing a restart based on pedal positions, such as the clutch pedal, accelerator pedal, and/or brake pedal); a cab control value (e.g., an operator actuator allowing or disallowing automatic restarts, a cab control indicating the operator is present or not present, in a driver position, in a sleep compartment, entering or exiting the vehicle, etc.); and/or a power utilization value (e.g., where the power utilization is higher or lower than an estimated value, which may change an estimate of whether a current state of charge is sufficient until a next expected operator start event). An example restart management circuit 19102 further determines the prime mover automated restart value 19108 in response to an operating condition 19114 such as: an ambient temperature value (e.g., utilized to determine a criticality and/or priority of one or more loads such as an HVAC system, to determine a power requirement to perform a restart, and/or otherwise utilized to determine likely power consumption until an operator restart); a time of day value (e.g., utilized to determine likely shutdown times and/or restart times, power consumption, criticality or priority of loads, availability of facilities at a stop location, etc.); a geographic location value (e.g., utilized to determine regeneration availability until a stop, likelihood of facilities such as shore power at a stop location, prediction of a stop location, determination of applicable regulations such as allowed idle times, etc.); a shore power availability value (e.g., determining whether shore power is likely to be available at a stop location, a cost parameter for the shore power—e.g., compared to fuel consumption of the prime mover, and/or the likelihood of available shore power not being available due to limited parking/facilities, previously experienced availability, or the like); an estimated restart time value (e.g., based on operator availability, scheduling, prior history, or the like); and/or a predicted trajectory of any one or more of the foregoing.

An example controller 18820 includes a user interface circuit 19118 that provides a user interface 19120 to the operator, and where the restart management circuit 19102 further determines the prime mover automated restart value 19108 in response to an operator interface parameter 19122 received on the user interface 19120. The user interface 19120 may be of any type, for example operated as a mobile application available to an operator device, as a web portal access, an intranet access (e.g., linking to a fleet management intranet or the like), and/or as an interface associated with the vehicle, such as a dashboard computer interface, a touchscreen provided in a sleeper area of the vehicle, and/or an interpreted interface such as switches (e.g., a "disable automated restart" or "enable automated restart" switch), pedal positions, sensors (e.g., a door position sensor, hood position sensor, or the like). In certain embodiments, the operator interface parameter 19122 includes a restart time description, for example setting a time (e.g., a discrete time, or time range(s)) when restart cannot be performed, and/or a time when restart can be performed. In certain embodiments, the operator interface parameter 19122 includes a restart condition description, for example: setting a condition when restart can be performed (e.g., when the operator is present or away, when a sleeper light is on, when ambient noise is greater than a threshold value, and/or when ambient temperature is below a threshold value, above a threshold value, and/or outside a threshold range). In certain embodiments, the restart condition description includes one or more parameters related to the restart operation, such as a prime mover speed trajectory during the restart (e.g., to limit restart noise), a prime mover speed value during the restart (e.g., allowing for a higher idle speed under certain conditions such as a time of day, and/or setting a lower idle speed), a number of restarts allowed for a given period (e.g., restarts per hour, number of restarts during a stop, etc.), a time of the restart (e.g., how long the prime mover is allowed to run during a restart), and/or an indication of whether an automatic shutdown of the prime mover is allowed (e.g., preventing or allowing an automated shutdown, for example when a state of charge target is reached for the battery pack). In certain embodiments, the user interface circuit 19118 determines an operator location value 19124 (e.g., determined according to operator presence in detectable location such as in a driver's seat, sleeper compartment, etc., according to operator interaction with one more switches and/or actuators of the vehicle, and/or determined directly such as using a location finder for an operator device such as a mobile phone), where the restart management circuit 19104 determines the prime mover automated restart value 19108 in response to the operator location value 19124. For example, the restart management circuit 19104 may provide for starting only when the operator is in a selected location (e.g., in the driver's seat), when the operator is away (e.g., charging the battery pack while the operator gets dinner, during a switch of operators, etc.), and/or a scheduled combination of these—for example the time of day may be combined with the operator location to determine whether the prime mover should be started. An operator, as used herein, should be understood broadly, and can include without limitation, a driver, a passenger, a service person, a fleet operator, an owner, or the like. Without limitation to any other aspect of the present disclosure, controller 18820 may be configured to perform any restart operations described herein, including operations described in relation to FIG. 141 or 194-195.

Referencing FIG. 192, an example system 19200 for controlling operations of a PTO device 19212 based on a PTO device state and/or specific device types and/or loads of the vehicle is schematically depicted. The example system includes a vehicle 19202 having a prime mover 19204 and a driveline 19208 including a transmission 19210 interposed between the prime mover 19204 and a mechanical load 19214. The mechanical load 19214 may be any type of load provided throughout the present disclosure, including at least a hydraulic load (e.g., powered from a PTO interface, which may be the same or a separate interface from the interface of the PTO device 19212), a motive power load, a salt spreader load, a dump truck load, a vacuum truck load, an HVAC load, an auxiliary air compressor load, a pump load, a heater load (e.g., an aftertreatment heater, an asphalt heater, etc.), and/or a mixer load. The example system 19200 includes the PTO device 19212 configured to at least selectively transfer power among: the driveline 19208, a motor/generator 19218, a battery pack 19250, an electrical load 19222, and/or a shared load 19224. The PTO device 19212 may be of any type as set forth throughout the present disclosure, and may include a gear box or other mechanical coupling between the motor/generator 19218 and the driveline 19208, and/or an electrical coupling between the motor/generator 19218 and/or the battery pack 19250 and an electrical system of the vehicle 19202. The example PTO device 19212 includes a DC/DC converter 19228 interposed between the battery pack 19250 and the electrical load 19222 and/or shared load 19224. In certain embodiments, the DC/DC converter 19228 is interposed between the motor/generator 19218 and the battery pack 19250, between the battery pack 19250 and an electrical system of the vehicle 19202, and/or between the motor/generator 19218 and the electrical system of the vehicle 19202. The description of FIG. 192 references a PTO device 19212, but it will be understood that a PTO device throughout the present disclosure may be mechanically coupled to the driveline in certain embodiments, and may not be mechanically coupled to the driveline in other embodiments. Additionally, a PTO device may be mechanically coupled to the driveline at any position, including traditional "PTO" positions, such as coupling to a countershaft, or at any other position such as the flywheel, input shaft, main shaft, output shaft, or other location.

The example system 19200 includes a controller 19220 configured to perform operations responsive to a priority of one or more loads of the vehicle. The example controller 19200 may be included, in whole or part, in any system herein, and may be embodied by and/or include, in whole or part, any controller, circuit, or component described herein. Without limitation to any other aspect of the present disclosure, controller 19220 may be configured to perform any load prioritization operations described herein, including operations described in relation to FIG. 144, or 196-197. Referencing FIG. 193, an example controller 19220 includes a load priority circuit 19302 that determines a load priority value 19308 for an electrical load and/or a shared load, an electrical power management circuit 19304 that determines an electrical power strategy 19310 for the at least one of the electrical load or the shared load in response to the load priority value 19308, and a response circuit 19312 that provides an electrical power command 19314 in response to the electrical power strategy 19310. An electrical power strategy as used herein should be understood broadly, and includes any operations to power, reserve power, charge a battery pack, and/or otherwise provide electrical support for a load and/or group of loads. In certain embodiments, an electrical power strategy includes one or more of: shift assistance descriptions (e.g., gear shift operations to be supported, determining criteria to detect a gear shift, and parameters for shift assistance such as response times, torque values, etc.); start-up sequence operations (e.g., start up calibrations, prime mover start support parameters, etc.); shut-down sequence operations (e.g., system configurations to implement on shutdown, and/or performance of one or more calibrations on shutdown instead of start-up); phase power selections (e.g., power regimes and supporting phases to be utilized); and/or automated restart operations for the prime mover (e.g., criteria to allow automatic restarts, and/or restart parameters such as gear selections, torque values, and/or speed targets). Without limitation to any aspect of the present disclosure, an electrical power strategy includes aspects such as: electrical energy to be reserved for the load; a cost value associated with a reduction of capability to fully support the load; a cost value associated with a loss of capability to fully support the load; notifications, alerts, and/or fault values to be sent, stored, and/or communicated associated with a reduction of capability and/or loss of capability to fully support the load; support sources available for, and to be utilized to support, the load, including direct driveline, motor/generator, battery pack, and/or vehicle electrical system; a utilization description for the load (e.g., utilization by time of day, geographic location, trip type, per trip, per shutdown, per operating hour, per operating mile, etc.); and/or priority adjustments for the load (e.g., by time of day, ambient conditions, operating conditions, etc.).

An example system 19200 including the controller 19220 includes the PTO device responsive to the electrical power command 19314 to modulate the power transfer among the driveline, motor/generator, battery pack, and/or the at least one of the electrical load or the shared load. Operations responsive to the electrical power command 19314 include one or more of: powering or disabling a load; charging the battery pack to support a load; and/or selecting a power source for the load (e.g., battery pack, vehicle electrical system, motor/generator, and/or driveline). Example and non-limiting load priority value(s) 19308 include one or more load priorities such as: a mission critical priority (e.g., a load where a lack of power available for the load results in an inability of the vehicle, the system, or the load to meet mission capability); a numerical priority (e.g., a quantitative value utilized to prioritize between loads); a categorical priority (e.g., a value, which may be digital, quantitative, nominal, or the like, utilized to provide selected treatment categories among loads); an operator comfort priority (e.g., a load where a lack of power available for the load results in operator inconvenience, but is not disabling to the mission); and/or an emissions priority (e.g., a load where a lack of power available for the load results in a degradation of emissions performance, a failure to meet emissions, and/or affects other emissions parameters related to the vehicle, for example which can be exchanged for credits, that affect other related vehicles as a group, and/or that can be made up through other operations such as derating a performance value or the like). In certain embodiments, the load priority value(s) 19308 are utilized to determine required and/or desirable state of charge values for the battery pack, to sequence loads that will not be supported during certain operating conditions (e.g., as the battery pack gets low), to reserve state of charge in the battery pack to support specific loads, to adjust operations of the vehicle (e.g., reducing available performance to mitigate an inability to support the load and/or reduced support for the load, and/or as a direct response to the loss or reduction of support for the load, for example increasing a cab temperature value above or below a desired cab temperature value), and/or to shut down the vehicle and/or place the vehicle in a limited operating condition (e.g., a limp-home mode, preventing motive operation, limiting maximum vehicle speed, or the like).

An example controller 19220 includes a user interface circuit 19318 that provides a user interface 19320, where the electrical power management circuit 19304 determines the electrical power strategy 19310 for the electrical load and/or shared load in response to an operator interface parameter 19322 received on the user interface 19320. Without limitation to any other aspect of the present disclosure, aspects of a user interface throughout the present disclosure, including at least with regard to FIGS. 140-142, 144, and 191, may be utilized with the user interface circuit 19318 and/or user interface 19320. An example user interface circuit 19318 provides priority value description(s) 19324 for one or more loads of the vehicle, for example including an electrical load and/or a shared load, where the operator interface parameter(s) 19322 include responses from the user on the user interface 19320 to the priority value description(s) 19324. For example, the user interface circuit 19318 may provide a depiction of one or more loads (e.g., HVAC, cab outlets, sound system, etc.) with a depiction and/or selection of priority values for the user. In certain embodiments, depicted loads may be limited to loads where the user has authorization to adjust the priority values, and/or the priority value selections may be limited to values or ranges that the user has authorization to adjust. For example, the user may be allowed to adjust the priority value of a cab outlet to any value, for example to support power for a CPAP machine, but may have limited authorization to adjust priority for a sound system (e.g., from a low to moderate range, from a value indicating no priority consideration up to an operator comfort priority consideration, etc.). In certain embodiments, a first user may have a first set of authorizations (e.g., a driver for a fleet owned vehicle), and a second user may have a second set of authorization (e.g., an owner, service personnel, regulatory compliance personnel, etc.). In certain embodiments, a depiction of loads and priority values may be presented as a list, as a graphical depiction (e.g., a simplified view of the vehicle), as a diagram of the one or more load (e.g., an icon relevant to the loads, etc.), or the like. Example and non-limiting devices 19328 to interact with the user interface 19320 include one or more of: an operator device, a fleet owner device, a dispatcher device, and/or a service technician device.

Referencing FIG. 194, an example procedure 19400 to provide a restart sequence command is schematically depicted. The example procedure 19400 includes an operation 19402 to determine a prime mover restart value, and an operation 19404 to provide a restart sequence command in response to the prime mover restart value.

Referencing FIG. 195, an example procedure 19500 to determine a prime mover restart value is schematically depicted. The example procedure 19500 includes an operation 19502 to provide a user interface to an operator, and an operation 19504 to determine the prime mover restart value in response to an operator interface parameter provided on the user interface.

Referencing FIG. 196, an example procedure 19600 to determine a prime mover restart value is schematically depicted. The example procedure 19600 includes an operation 19602 to determine a load priority value for an electrical and/or shared load, and an operation 19604 to determine an electrical power strategy for the electrical and/or shared load in response to the load priority value. The example procedure 19600 further includes an operation 19606 to provide an electrical power command in response to the electrical power strategy, and an operation 19504 to determine the prime mover restart value in response to an operator interface parameter provided on the user interface.

Referencing FIG. 197, an example procedure 19700 to determine a load priority value in response to an operator interface parameter is schematically depicted. The example procedure includes an operation 19702 to provide a user interface to an operator, and an operation 19704 to determine the load priority value in response to an operator interface parameter provided on the user interface.

Referencing FIG. 198, an example procedure 19800 to provide a shift assistance command in response to a shift operation value is schematically depicted. The example procedure 19800 includes an operation 19802 to determine a shift operation value, and an operation 19804 to provide a shift assistance command in response to the shift operation value.

Referencing FIG. 199, an example procedure 19900 to provide a start-up sequence command is schematically depicted. The example procedure 19900 includes an operation 19902 to determine a start-up operation value, and an operation 19904 to provide a start-up sequence command in response to the start-up operation value.

Referencing FIG. 200, an example procedure 20000 to perform calibration operations is schematically depicted. Procedure 20000 may be performed, in whole or part, as all or a part of operation 19904, responsive to the start-up sequence command. Procedure 20000 includes an operation 20002 to perform a clutch calibration operation, and an operation 20004 to perform a shift calibration operation.

Referencing FIG. 201, an example procedure 20100 to provide a shut-down sequence is schematically depicted. Procedure 20100 includes an operation 20102 to determine a shut-down operation value, and an operation 20104 to provide a shut-down sequence command in response to the shut-down operation value.

Referencing FIG. 207, an embodiment 20700 of an example controller 15602 configured to perform fleet interaction operations for a vehicle is schematically depicted. The example controller 15602 may be included, in whole or part, in any system herein, and may be embodied by and/or include, in whole or part, any controller, circuit, or component described herein. Without limitation to any other aspect of the present disclosure, controller 15602 may be configured to perform any fleet interaction operations described herein, including operations described in relation to FIG. 156 or 208. An example controller 15602 includes a vehicle operating condition circuit 20702 that interprets at least one vehicle operating parameter 20710. Example and non-limiting vehicle operating parameters 20710 include parameters such as: a state of charge value for a battery or the battery pack; a state of health value for a battery or the battery pack; load information for an electrical load and/or a shared load; a shift assist description; a duty cycle description for a vehicle; an ambient temperature value; a time of day value; a geographic location value; a shore power availability value; an estimated restart time value; and/or a predicted trajectory of any one or more of the foregoing.

The example controller 15602 includes an electrical power management circuit 20704 that determines an electrical power strategy 20514 for an electrical load and/or a shared load of a vehicle, in response to the vehicle operating parameter 20710. The example controller 15602 further includes a response circuit 20706 that provides an electrical power command 20714 in response to the electrical power strategy 20514, and a fleet interaction circuit 20708 that communicates the vehicle operating parameter 20710, a state of charge of a battery pack of the vehicle, and/or an outcome of the electrical power strategy 20514 to an external device (e.g., as a fleet communication 20712). An example fleet interaction circuit 20708 further receives an updated electrical power strategy from the external device (e.g., as a fleet communication 20712), where the response circuit 20706 further provides the electrical power command(s) 20714 in response to the updated electrical power strategy. Accordingly, the controller 15602 allows for an external computing device to perform one or more operations to improve the electrical power strategy 20514, for example: to improve a fuel efficiency outcome, mission capability outcome, performance capability outcome, operator comfort outcome, and/or emissions capability outcome, based on monitored parameters of the vehicle and associated outcomes; capability to perform high resource operations such as machine learning operations to incrementally improve outcomes; and/or capability to aggregate data across vehicles, and/or utilize information from many vehicles, allowing for knowledge of facilities, geographic regions, and the like, to be utilized within a vehicle based on information from other vehicles without the specific vehicle having to previously traverse the associated facilities, geographic regions, or the like. An example fleet interaction circuit 20708 shifts data storage to an external device, for example sending historical data for the vehicle through fleet communications 20712 for storage off the vehicle and available for future use by the controller 15602 and/or an external device aggregating data among vehicles of a fleet. A fleet, as used herein, may reference any set of more than one vehicle, such as: a formal fleet of vehicles associated with an entity, and/or a group of vehicles sharing a characteristic (e.g., model year, prime mover type, battery pack configuration, DC/DC converter configuration, PTO device arrangement, driveline arrangement, or the like). An example fleet interaction circuit 20708 shifts processing operations to an external device, for example operating a machine learning algorithm, modeling operations, or the like to the external device, with the outcomes of the processing operations (e.g., an updated electrical power strategy 20514) retrieved from the external device periodically, upon request, and/or as a push operation from the external device. Example an non-limiting processing operations that may be shifted by the fleet interaction circuit 20708 to an external device include a state of charge model operation and/or a state of health model operation for the battery pack. An example fleet interaction circuit 20708 receives an updated state of charge target description (e.g., state of charge targets, including relative to certain conditions such as time of day, load priority values, time until shutdown, distance until shutdown, etc.), where the response circuit 20706 provides the electrical power command(s) 20714 in response to the updated state of charge target. An example fleet interaction circuit 20708 receives at least one additional vehicle operating parameter from the external device (e.g., as a fleet communication 20712), where the vehicle operating condition circuit 20702 interprets the at least one additional vehicle operating parameter, for example by taking data from additional sensor(s), operating a virtual sensor to determine the additional parameter, or the like, and where the electrical power management circuit 20704 determines the electrical power strategy 20514 in response to the additional vehicle operating parameter(s). For example, an improved model, improved electrical power strategy, or the like, as indicated by the external device examining monitored operating parameters and outcomes across a number of vehicles and/or based on analysis of historical data for the vehicle, may determine that an additional parameter (e.g., time of day, location of the vehicle, average vehicle speed and/or load, etc.) has improved predictive value and/or correlation with an improved outcome of electrical power provision on the vehicle, and operations of the controller 15602 allow for the addition and utilization of the additional parameter(s) to determine and apply the electrical power strategy 20514. An example fleet interaction circuit 20708 receives a load priority description (e.g., as a fleet communication 20712) from the external device, where the electrical power management circuit 20704 further determines the electrical power strategy 20514 in response to the load priority description. The operations of the controller 15602 allow for the updating of load priority values, for example in response to a change of priorities (e.g., due to a change of operator, change of vehicle mission, change of regulations, change of fleet policies, or the like), and allow for the electrical power management circuit 20704 to determine and apply the electrical power strategy 20514 in response to the change of load priorities.

Referencing FIG. 156, an example system includes a fleet based controller 15604, which may additionally or alternatively be a service controller and/or a cloud controller, that receives, from at least a subset of a fleet of vehicles, at least two parameters such as: state of charge values for a battery pack associated with each of the subset of the fleet of vehicles, state of health values for the battery pack associated with each of the subset of the fleet of vehicles, load information for at least one of an electrical load or a shared load of each of the subset of the fleet of vehicles, and/or an outcome description for each vehicle of the subset of the fleet of vehicles. The example fleet based controller 15604 that determines an updated electrical power strategy for at least one vehicle of the fleet of vehicles in response to the at least two parameters. The example fleet based controller 15604 transmits the updated electrical power strategy to the at least one vehicle, where a controller 15602 of the vehicle is responsive to the updated electrical power strategy to transfer power among a driveline, motor/generator, battery pack, electrical load, and/or shared load of the vehicle.

An example fleet based controller 15604 further receives at least one additional parameter from the vehicles, where the additional parameter(s) include one or more of: a state of charge target value for the battery pack associated with each of the plurality of vehicles, a shift assist description for each of the plurality of vehicles, a DC/DC converter configuration for each of the plurality of vehicles, a duty cycle description for each of the plurality of vehicles, a geographic description for each of the plurality of vehicles, and/or an ambient conditions description for each of the plurality of vehicles. The example fleet based controller 15604 further determines the updated electrical power strategy for the at least one vehicle in response to the additional parameter(s).

An example fleet based controller 15604 further receives at least one additional parameter from the vehicles, where the additional parameter(s) include one or more of: a shore power availability description, a shutdown/restart outcome description, an operator satisfaction description, an energy efficiency description, a service event description, and/or a service outcome description for each of the plurality of vehicles. The example fleet based controller 15604 further determines the updated electrical power strategy for the at least one vehicle in response to the additional parameter(s).

An example fleet based controller 15604 iteratively improves an outcome value for one or more of the fleet of vehicles by iteratively update the electrical power strategy for vehicles of the fleet of vehicles. An example fleet based controller 15604 aggregates parameters over at least a subset of the fleet of vehicles, and determines the updated electrical power strategy for one or more of the vehicles in response to the aggregated parameters.

An example fleet based controller 15604 further determines an updated set of the parameters, receives from at least a subset of the fleet of vehicles the updated set of parameters, and determines the electrical power strategy for at least one vehicle based on the updated set of parameters. A further example fleet based controller 15604 determines the updated parameters in response to parameters that are correlated with an outcome of the transferred power among the driveline, motor/generator, battery pack, electrical load, and/or shared load of the fleet of vehicles. Example and non-limiting outcomes of the transferred power include one or more of: a mission capability description (e.g., uptime, downtime, delivery performance, etc.); a cost of operation description (e.g., fuel and/or electrical power cost, operating costs, facility costs, tax cost, service costs, and/or delivery costs); an operator satisfaction description (e.g., based on operator adjustments, waivers, operator interface parameters, etc.); and/or a nominal operation description (e.g., determining off-nominal operation events such as running out of state-of-charge events, disabling of load events, idling times and/or unusual idling events, and/or outliers of any of the outcome descriptions for one or more vehicles relative to other vehicles, whether positive or negative outliers).

An example fleet based controller 15604 further determines the updated parameters in response to parameters that exhibit a selected sensitivity with an outcome of the transferred power. For example, a parameter may correlate with an outcome of the power transfer operations (e.g., checking ambient temperature positively improves the overall outcome of the power transfer operations), but exhibit an elevated sensitivity to the outcome—for example a highly non-linear response, a chaotic response (e.g., large changes in the outcome based on small changes in the parameter), or the like. In certain embodiments, the fleet based controller 15604 may replace a parameter exhibiting a high sensitivity, for example if another parameter is found that has a similar correlation or predictive power with a lower sensitivity value, and/or adjust the treatment of the parameter (e.g., filtering the parameter, changing a utilization of the parameter in a model, and/or combining the parameter with other parameters that preserve the predictive power while reducing the sensitivity) within the electrical power strategy 20514. In certain embodiments, the fleet based controller 15604 may remove a parameter from consideration in the electrical power strategy 20514 despite correlation and/or predictive power to the outcomes, for example where the sensitivity drives negative outcomes despite the predictive power (e.g., at some operating conditions, the parameter provides negative outcomes that are greater than positive outcomes from other operating conditions; and/or where the sensitivity drives an externality such as operator frustration or the like).

Referencing FIG. 208, an example procedure 20800 to update vehicle operating parameters and/or electrical power strategy values for a fleet of vehicles is schematically depicted. The example procedure 20800 includes an operation 20802 to interpret vehicle operating parameters, an operation 20804 to determine an electrical power strategy, and an operation to provide electrical power command(s) in response to the electrical power strategy 20806. The example procedure 20800 includes an operation 20808 to communicate vehicle operating parameter(s) to an external device, and an operation 20810 to receive updated vehicle operating parameter(s) and/or an updated electrical power strategy from the external device.

Referencing FIG. 209, an example procedure 20900 to perform a shift assistance operation is schematically depicted. The example procedure 20900 may be performed, in whole or part, by controllers, circuits, and/or components of systems set forth throughout the present disclosure, including at least aspects described in relation to FIG. 157-159 or 210. The example procedure 20900 includes an operation 20902 to determine that an upshift event is in progress, an operation 20904 to position a transmission into neutral in response to an unlock phase (e.g., a synchronizer rotationally decoupling a gear from a shaft, such as a countershaft) of the upshift event, and an operation 20905 to commence a synchronization phase after positioning the transmission into neutral. The example procedure 20900 further includes an operation 20906 to close a clutch at a scheduled rate, allowing the input shaft and the prime mover to move toward a common speed resulting from the rotational inertia of the coupling components, such as the input shaft, the countershaft, and the motor/generator of the PTO device. The example procedure 20900 includes an operation 20908 to determine a speed differential between the common speed (e.g., the speed that the input shaft side of the driveline will end up at) and a synchronization speed (e.g., the speed that the input shaft side will be coupled to during the synchronization, such as the main shaft speed and/or input shaft speed, which will be coupled to the wheels and/or mechanical load). In response to operation 20908 determining that the common speed is too high (e.g., greater than a threshold value over the synchronization speed), the procedure 20900 includes an operation 20910 to provide a negative torque command to a motor/generator (e.g., to slow down the common speed), and/or an operation 20912 to charge a battery pack of the vehicle and/or to power an electrical load of the vehicle (e.g., recovering some of the excess rotational energy as usable electrical energy). In response to operation 20908 determining that the common speed is too low (e.g., lower than a threshold value below the synchronization speed), the procedure 20900 includes an operation 20914 to provide a positive torque command to a motor/generator (e.g., to speed up the common speed). In response to operation 20908 determining that the common speed is acceptable (e.g., common speed is within a threshold value of the synchronization speed, which may be symmetrical or not), the procedure 20900 includes an optional operation 20916 to provide a zero torque command to a motor/generator (e.g., removing the motor/generator from interfering with the shift operations of the transmission). The thresholds that are utilized to determine whether the common speed is too high or too low depend upon the criteria for the shift. For example, the common speed being too high or too low may be acceptable for certain systems, while the common speed being too low or too high may not be acceptable. In certain embodiments, a speed differential that is not significantly noticeable to the operator may be acceptable, and/or a speed differential that performs similarly to an offset vehicle (e.g., a vehicle similarly configured, but without the PTO device) may be acceptable to provide a consistent operator experience across a group of vehicles. In certain embodiments, a speed differential that is acceptable may be determined from a wear parameter, for example an acceptable speed that provides for a sufficient life of synchronizers or other components of the transmission that experience wear based on the speed differential. In certain embodiments, speed differentials within 25 RPM, within 50 RPM, and/or within 100 RPM are acceptable. In certain embodiments, motor/generator torque is performed regardless of the speed differential in a closed loop manner, and/or performed in a closed loop manner with a hysteresis around a torque switch (e.g., positive to negative torque, and/or negative to positive torque), and/or with a backlash pause (e.g., reducing torque across the zero line, until a backlash between the PTO device and the driveline is traversed) on a torque switch. In certain embodiments, the procedure 20900 is performed only to provide positive torque capability or negative torque capability (e.g., a configuration to provide only common speed increase or common speed decrease operations). In certain embodiments, operations 20908 to determine the speed differential are further performed in response to a gear ratio after the upshift event (e.g., to predict the synchronization speed, and/or to avoid over-torque operations on a component of the transmission). In certain embodiments, operations 20908 to determine the speed differential are performed in response to a measured shaft speed of a shaft of the transmission, and/or in response to a vehicle speed (e.g., allowing for an estimate of the synchronization speed based on gear ratios, and/or to determine acceptable speed differentials due to differential disturbance of the driveline, for example where a high vehicle speed generally results in a lower percentage of disturbance from a given engagement torque effect).

In certain embodiments, the procedure 20900 includes an operation (not shown) to being fueling of the prime mover after the closing of the clutch. In certain embodiments, the procedure 20900 includes an operation (not shown) to being fueling of the prime mover during the closing of the clutch, for example after a target speed of the prime mover is achieved, and/or after the adjusting of the common speed to an acceptable value. In certain embodiments, the determination of the positive torque and/or negative torque to be applied (a torque adjustment value) is in response to the speed differential and a rotational kinetic energy conservation value, for example to ensure that the common speed adjustment is completed within a planned time frame. In certain embodiments, the rotational kinetic energy conservation value is determined in response to a rotational inertia of one or more of the prime mover, the input shaft, the motor/generator, and/or the clutch.

Referencing FIG. 210, an embodiment 21000 of an example controller 20222 for performing shift assistance operations is schematically depicted. The example controller 20222 may be included, in whole or part, in any system herein, and may be embodied by and/or include, in whole or part, any controller, circuit, or component described herein. Without limitation to any other aspect of the present disclosure, controller 20222 may be configured to perform any shift assistance operations described herein, including operations described in relation to FIG. 156, 160, or 209. The example controller 20222 includes a shift determination circuit 21002 that determines that an upshift event is in progress. In certain embodiments, the shift determination circuit 21002 determines that an upshift event 21010 is in progress includes one or more operations such as: determining the upshift event is in progress in response to a clutch position and/or vehicle speed value; determining the upshift event is in progress in response to a gear selector value; and/or determining the upshift event is in progress in response to a vehicle position value.

The example controller 20222 further includes a shift execution circuit 21004 that positions the transmission in neutral (e.g., providing a shift command 21014) in response to an unlock phase of the upshift, commences a synchronization phase of the upshift event after positioning the transmission into neutral, commencing a clutch closing operation (e.g., providing a clutch command 21012) at a scheduled rate during the synchronization phase, thereby bringing a rotational speed of the prime mover and the input shaft to a common speed, determining a speed differential 21018 between the common speed and a synchronization speed, and providing a motor/generator torque command 21016 in response to the speed differential 21018. An example system includes a motor/generator responsive to the motor/generator torque command 21016 to adjust the common speed. An example shift execution circuit 21004 determines the motor/generator torque command 21016 as a positive torque value in response to the common speed being lower than the synchronization speed, and/or as a negative torque value in response to the common speed being higher than the synchronization speed. An example controller 20222 includes an electrical power management circuit 21006 that charges a battery pack at least selectively electrically coupled to the motor/generator in response to the negative torque value. An example controller 20222 includes the electrical power management circuit 21006 powering a load, such as an electrical load, shared load, and/or an electrical accessory, in response to the negative torque value.

Again referencing FIGS. 158-159, an example system is described following. The example system includes a number of electrical motors 15802, 15804 coupled to a non-motive load 15808, and a number of battery packs 15812 electrically coupled to the number of electrical motors 15802, 15804. An example system optionally includes the number of battery packs 15812 operationally coupled to a driveline of a vehicle through an alternator PTO interface (e.g., electrical coupling to a vehicle electrical system). In certain embodiments, the battery packs 15812 are each coupled to only one of the motors 15802, 15804, or are both coupled to both (or all) of the motors 15802, 15804. In certain embodiments, the battery packs 15812 are coupled through a DC/DC converter and/or an inverter and motor controller 15814. In certain embodiments, the battery packs 15812 are electrically isolated from the vehicle electrical system. Each of the battery packs includes one or more battery groups, where a number of batteries in each battery group are selected to provide a desired driving voltage (e.g., battery numbers and parallel/series arrangement to provide the desired driving voltage) and/or to provide a desired energy storage amount (e.g., a number and sizing of batteries to provide a total energy storage amount). The desired energy storage amount may be selected to provide a full trip (e.g., operations of the electrical motors 15802, 15804 according to an expected duty cycle, and time between charge opportunities, to allow for completion of a number of jobs and/or other operations during a trip) and/or for a selected number of trips (e.g., where more than one trip is to be performed between charging opportunities). In certain embodiments, the desired driving voltage is a 48V nominal voltage (e.g., the battery packs including groups of 4 12V nominal batteries provided in series). In certain embodiments, one or more, or all, batteries of the battery packs 15812 are 12V nominal lead-acid batteries. In certain embodiments, one or more battery packs include more than one group of batteries, for example with batteries within each group coupled in series, and the groups in parallel. In certain embodiments, the battery packs include eight (8) total batteries, twelve (12) total batteries, or sixteen (16) total batteries. In certain embodiments, the non-motive load is a load having up to a 40 kW power requirement. In certain embodiments, the non-motive load includes a sparse duty cycle, with a low power requirement for a majority of the operating time, and a high power requirement for a small part of the operating time. An example non-motive load includes an operational turndown ratio (e.g., high power requirement versus low power requirement) of at least 6:1, or at least 10:1. An example system includes the battery packs having a total storage energy of at least 30 kWh. An example non-motive load includes a duty cycle having less than 20% of operating time spent at the high power requirement (e.g., 60% of a maximum power delivery). An example non-motive load includes a duty cycle having less than 15% of operating time spent at the high power requirement (e.g., 70% of a maximum power delivery). An example system includes an onboard plug-in charger 15922 (e.g., reference FIG. 159) interface configured to couple shore power to the battery packs 15812. It can be seen that the example system provides for an electrical power provision for loads having a high power requirement with a limited duty cycle at high power operations, providing for a reduced cost system that is capable to service the mission requirements of the non-motive load without requiring excessive energy storage, or a high capability coupling to pull sufficient power from the driveline. Without limitation to any other aspect of the present disclosure, example and non-limiting non-motive loads include one or more loads such as: a mixing drum load; a pump load; an asphalt heater load; and/or a salt spreader load.

Certain operations described herein include interpreting, receiving, and/or determining one or more values, parameters, inputs, data, or other information ("receiving data"). Operations to receive data include, without limitation: receiving data via a user input; receiving data over a network of any type; reading a data value from a memory location in communication with the receiving device; utilizing a default value as a received data value; estimating, calculating, or deriving a data value based on other information available to the receiving device; and/or updating any of these in response to a later received data value. In certain embodiments, a data value may be received by a first operation, and later updated by a second operation, as part of the receiving a data value. For example, when communications are down, intermittent, or interrupted, a first receiving operation may be performed, and when communications are restored an updated receiving operation may be performed.

Certain logical groupings of operations herein, for example methods or procedures of the current disclosure, are provided to illustrate aspects of the present disclosure. Operations described herein are schematically described and/or depicted, and operations may be combined, divided, re-ordered, added, or removed in a manner consistent with the disclosure herein. It is understood that the context of an operational description may require an ordering for one or more operations, and/or an order for one or more operations may be explicitly disclosed, but the order of operations should be understood broadly, where any equivalent grouping of operations to provide an equivalent outcome of operations is specifically contemplated herein. For example, if a value is used in one operational step, the determining of the value may be required before that operational step in certain contexts (e.g. where the time delay of data for an operation to achieve a certain effect is important), but may not be required before that operation step in other contexts (e.g. where usage of the value from a previous execution cycle of the operations would be sufficient for those purposes). Accordingly, in certain embodiments an order of operations and grouping of operations as described is explicitly contemplated herein, and in certain embodiments re-ordering, subdivision, and/or different grouping of operations is explicitly contemplated herein.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The programmed methods and/or instructions described herein may be deployed in part or in whole through a machine that executes computer instructions on a computer-readable media, program codes, and/or instructions on a processor or processors. "Processor" used herein is synonymous with the plural "processors" and the two terms may be used interchangeably unless context clearly indicates otherwise. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer readable instructions on a server, client, firewall, gateway, hub, router, or other such computer and/or networking hardware. The computer readable instructions may be associated with a server that may include a file server, print server, domain server, Internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope. In addition, any of the devices attached to the server through an interface may include at least one storage medium capable of storing methods, programs, code, and/or instructions. A central repository may provide program instructions to be executed on different devices. In this implementation, the remote repository may act as a storage medium for program code, instructions, and programs.

The computer readable instructions may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of a program across the network. The networking of some or all of these devices may facilitate parallel processing of a program or method at one or more location without deviating from the scope. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, LTE, EVDO, mesh, or other networks types.

The methods, programs, codes, and instructions described herein and elsewhere may be implemented on or through mobile devices. The mobile devices may include navigation devices, vehicle remote network access devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM, and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer instructions, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in procedure descriptions, methods, flow charts, and block diagrams imply logical boundaries between the elements. However, any operations described herein may be divided in whole or part, combined in whole or part, re-ordered in whole or part, and/or have certain operations omitted in certain embodiments. As such, the depiction and/or description of an order for various steps should not be understood to require a particular order of execution for those steps, unless required by a particular application, or explicitly stated or otherwise clear from the context. Operations described herein may be implemented by a computing device having access to computer executable instructions stored on a computer readable media, wherein the computing device executing the instructions thereby performs one or more aspects of the described operations herein. Additionally or alternatively, operations described herein may be performed by hardware arrangements, logic circuits, and/or electrical devices configured to perform one or more aspects of operations described herein. Examples of certain computing devices may include, but may not be limited to, one or more controllers positioned on or associated with a vehicle, engine, transmission, and/or PTO device system, personal digital assistants, laptops, personal computers, mobile phones, other handheld computing devices, wired or wireless communication devices, transducers, chips, calculators, satellites, tablet PCs, electronic books, gadgets, electronic devices, devices having artificial intelligence, networking equipment, servers, routers, and the like. Thus, while the foregoing drawings and descriptions set forth functional aspects of the disclosed systems, the descriptions herein are not limited to a particular arrangement of computer instructions, hardware devices, logic circuits, or the like for implementing operations, procedures, or methods described herein, unless explicitly stated or otherwise clear from the context.

The methods and/or processes described above, and steps thereof, may be realized in hardware, instructions stored on a computer readable medium, or any combination thereof for a particular application. The hardware may include a general-purpose computer, a dedicated computing device or specific computing device, a logic circuit, a hardware arrangement configured to perform described operations, a sensor of any type, and/or an actuator of any type. Aspects of a process executed on a computing device may be realized in one or more microprocessors, microcontrollers, embedded microcontrollers, programmable digital signal processors, or other programmable device, along with internal and/or external memory. The processes may also, or instead, be embodied in an application specific integrated circuit, a programmable gate array, programmable array logic, or any other device or combination of devices that may be configured to process electronic signals. It may further be appreciated that one or more of the processes may be realized as a computer executable code capable of being executed on a machine-readable medium.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or computer readable instructions described above. All such permutations and combinations are intended to fall within the scope of the present disclosure.

While the methods and systems described herein have been disclosed in connection with certain example embodiments shown and described in detail, various modifications and improvements thereon may become readily apparent to those skilled in the art. Accordingly, the spirit and scope of the methods and systems described herein is not to be limited by the foregoing examples, but is to be understood in the broadest sense allowable by law.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A system, comprising:

a motor/generator selectively coupled to a drive line of a vehicle, and configured to selectively modulate power transfer between an electrical load and the drive line;

a battery pack;

a DC/DC converter electrically interposed between the motor/generator and the electrical load, and between the battery pack and the electrical load;

a covering tray positioned over a plurality of batteries of the battery pack, the covering tray comprising a connectivity layer configured to provide electrical connectivity to terminals of the plurality of batteries, and wherein the connectivity layer comprises a charging circuit allowing each of the plurality of batteries to be discharged individually;

a plurality of battery microcontrollers, each of the plurality of battery microcontrollers associated with a corresponding one of a plurality of batteries of the battery pack; and a primary DC/DC controller configured to command operations of the DC/DC converter;

wherein the plurality of battery microcontrollers are operationally coupled to the primary DC/DC controller.

2. The system of claim 1, wherein each of the plurality of battery microcontrollers is grounded to the associated battery.

3. The system of claim 2, wherein the connectivity layer further comprises a plurality of capacitive couplings to remove DC voltage offsets between grounding connections of the plurality of battery microcontrollers.

4. The system of claim 1, wherein the primary DC/DC controller is grounded to one of the plurality of batteries.

5. The system of claim 4, wherein the primary DC/DC controller is grounded to a higher voltage than a vehicle chassis voltage.

6. The system of claim 5, wherein the higher voltage comprises at least one of 12V nominal, 24V nominal, or 36V nominal.

7. The system of claim 1, wherein each charging circuit comprises a flyback transformer.

8. The system of claim 7, further comprising a battery leveling controller operatively coupled to each of the plurality of battery microcontrollers, the battery leveling controller configured to execute at least one of battery charging or battery discharging of each of the plurality of batteries.

9. The system of claim 1, wherein at least a portion of the primary DC/DC controller is positioned on a printed circuit board (PCB).

10. The system of claim 9, wherein the PCB comprises a plurality of capacitors mounted thereon, wherein the plurality of capacitors are thermally separated from a plurality of switching circuits of the DC/DC converter.

11. The system of claim 10, wherein the PCB comprises a layered PCB, and wherein power circuits coupling the connectivity layer to the plurality of switching circuits are each present in at least one layer of the layered PCB.

12. The system of claim 11, wherein each of the power circuits comprises at least four (4) layers of the layered PCB, with inner layers comprising a heavier copper loading than outer layers.

13. The system of claim 11, wherein adjacent layers of the layered PCB to the power circuits provide at least one of: electrical insulation, thermal insulation, electrical connectivity, or thermal connectivity.

14. The system of claim 11, wherein each power circuit further comprises an electrical conditioning assembly.

15. The system of claim 14, wherein each electrical conditioning assembly comprises an inductor and an electromagnetic interference shield.

16. The system of claim 1, further comprising a DC/DC converter housing defining at least a portion of the DC/DC converter and the primary DC/DC controller.

17. The system of claim 16, wherein the DC/DC converter housing comprises a substantially constant cross-section.

18. The system of claim 17, further comprising a plurality of switching circuits of the DC/DC converter positioned on a printed circuit board (PCB).

19. The system of claim 18, wherein the PCB comprises a layered PCB, and wherein at least one layer of the layered PCB provides a thermal coupling between the plurality of switching circuits and the DC/DC converter housing.

20. The system of claim 19, wherein the PCB further comprises a plurality of power circuits, each power circuit coupling the connectivity layer to the plurality of switching circuits.

* * * * *